United States Patent
Parkvall et al.

(10) Patent No.: US 12,021,609 B2
(45) Date of Patent: **\*Jun. 25, 2024**

(54) NETWORK ARCHITECTURE, METHODS, AND DEVICES FOR A WIRELESS COMMUNICATIONS NETWORK

(71) Applicant: Telefonaktiebolaget LM Ericsson (publ), Stockholm (SE)

(72) Inventors: Stefan Parkvall, Bromma (SE); Janne Peisa, Espoo (FI); Gunnar Mildh, Sollentuna (SE); Robert Baldemair, Solna (SE); Stefan Wager, Espoo (FI); Jonas Kronander, Knivsta (SE); Karl Werner, Segeltorp (SE); Richard Abrahamsson, Kvivsta (SE); Ismet Aktas, Aachen (DE); Peter Alriksson, Hörby (SE); Junaid Ansari, Aachen (DE); Shehzad Ali Ashraf, Aachen (DE); Henrik Asplund, Stockholm (SE); Fredrik Athley, Kullavik (SE); Håkan Axelsson, Linköping (SE);

(Continued)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 64 days.

This patent is subject to a terminal disclaimer.

(21) Appl. No.: 18/093,572

(22) Filed: Jan. 5, 2023

(65) Prior Publication Data
US 2023/0224059 A1 Jul. 13, 2023

Related U.S. Application Data

(63) Continuation of application No. 17/139,409, filed on Dec. 31, 2020, now Pat. No. 11,652,562, which is a
(Continued)

(51) Int. Cl.
*H04W 8/18* (2009.01)
*H04B 7/0452* (2017.01)
(Continued)

(52) U.S. Cl.
CPC ........ *H04J 11/0079* (2013.01); *H04B 7/0452* (2013.01); *H04B 7/0848* (2013.01);
(Continued)

(58) Field of Classification Search
CPC ...................................................... H04W 8/18
(Continued)

(56) References Cited

U.S. PATENT DOCUMENTS 8,983,557 B1   3/2015   Sun et al.
9,307,496 B2   4/2016   Saitoh
(Continued)

FOREIGN PATENT DOCUMENTS

CN   101009896 A   8/2007
CN   101281052 A   10/2008
(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.7.0, Sep. 2015, 1-254.
(Continued)

*Primary Examiner* — Angel T Brockman
(74) *Attorney, Agent, or Firm* — Murphy, Bilak & Homiller, PLLC

(57) ABSTRACT

Methods and apparatus in a fifth-generation wireless communications, including an example method, in a wireless
(Continued)

device, that includes receiving a downlink signal comprising an uplink access configuration index, using the uplink access configuration index to identify an uplink access configuration from among a predetermined plurality of uplink access configurations, and transmitting to the wireless communications network according to the identified uplink access configuration. The example method further includes, in the same wireless device, receiving, in a first subframe, a first Orthogonal Frequency-Division Multiplexing (OFDM) transmission formatted according to a first numerology and receiving, in a second subframe, a second OFDM transmission formatted according to a second numerology, the second numerology differing from the first numerology. Variants of this method, corresponding apparatuses, and corresponding network-side methods and apparatuses are also disclosed.

17 Claims, 134 Drawing Sheets

(72) Inventors: Joakim Axmon, Kävlinge (SE); Johan Axnäs, Solna (SE); Kumar Balachandran, Pleasanton, CA (US); Gunnar Bark, Linköping (SE); Jan-Erik Berg, Sollentuna (SE); Andreas Bergström, Vikingstad (SE); Håkan Björkegren, Täby (SE); Nadia Brahmi, Hildesheim (DE); Cagatay Capar, Santa Clara, CA (US); Anders Carlsson, Lund (SE); Andreas Cedergren, Bjärred (SE); Mikael Coldrey, Landvetter (SE); Icaro L. J. da Silva, Solna (SE); Erik Dahlman, Stockholm (SE); Ali El Essaili, Aachen (DE); Ulrika Engström, Floda (SE); Mårten Ericson, Luleå (SE); Erik Eriksson, Linköping (SE); Mikael Fallgren, Kista (SE); Rui Fan, Beijing (CN); Gabor Fodor, Hässelby (SE); Pål Frenger, Linköping (SE); Jonas Fridén, Mölndal (SE); Jonas Fröberg Olsson, Ljungsbro (SE); Anders Furuskär, Stockholm (SE); Johan Furuskog, Stockholm (SE); Virgile Garcia, Beijing (CN); Ather Gattami, Stockholm (SE); Fredrik Gunnarsson, Linköping (SE); Ulf Gustavsson, Gothenburg (SE); Bo Hagerman, Tyresö (SE); Fredrik Harrysson, Gothenburg (SE); Ning He, Sollentuna (SE); Martin Hessler, Linköping (SE); Kimmo Hiltunen, Esbo (FI); Songnam Hong, Yongin-Si (KR); Dennis Hui, Sunnyvale, CA (US); Jörg Huschke, Aachen (DE); Tim Irnich, Neuss (DE); Sven Jacobsson, Gothenburg (SE); Niklas Jaldén, Enköping (SE); Simon Järmyr, Skarpnäck (SE); Zhiyuan Jiang, Beijing (CN); Martin Johansson, Mölndal (SE); Niklas Johansson, Uppsala (SE); Du Ho Kang, Sollentuna (SE); Eleftherios Karipidis, Stockholm (SE); Patrik Karlsson, Sollentuna (SE); Ali S. Khayrallah, Mountain View, CA (US); Caner Kilinc, Luleå (SE); Göran N. Klang, Enskede (SE); Sara Landström, Luleå (SE); Christina Larsson, Mölndal (SE); Gen Li, Beijing (CN); Lars Lindbom, Karlstad (SE); Robert Lindgren, Västra Frölunda (SE); Bengt Lindoff, Bjärred (SE); Fredrik Lindqvist, Järfälla (SE); Jinhua Liu, Beijing (CN); Thorsten Lohmar, Aachen (DE); Qianxi Lu, Beijing (CN); Lars Manholm, Gothenburg (SE); Ivana Maric, Sunnyvale, CA (US); Jonas Medbo, Uppsala (SE); Qingyu Miao, Beijing (CN); Reza Moosavi, Linköping (SE); Walter Müller, Upplands Väsby (SE); Elena Myhre, Järfälla (SE); Karl Norrman, Stockholm (SE); Bengt-Erik Olsson, Hovås (SE); Torgny Palenius, Barsebäck (SE); Sven Petersson, Sävedalen (SE); Jose Luis Pradas, Stockholm (SE); Mikael Prytz, Rönninge (SE); Olav Queseth, Solna (SE); Pradeepa Ramachandra, Linköping (SE); Edgar Ramos, Kirkkonummi (FI); Andres Reial, Malmö (SE); Thomas Rimhagen, Linköping (SE); Emil Ringh, Stockholm (SE); Patrik Rugeland, Stockholm (SE); Johan Rune, Lidingö (SE); Joachim Sachs, Sollentuna (SE); Henrik Sahlin, Mölnlycke (SE); Vidit Saxena, Solna (SE); Nima Seifi, Solna (SE); Yngve Selén, Uppsala (SE); Eliane Semaan, Vällingby (SE); Sachin Sharma, Huddinge (SE); Cong Shi, Beijing (CN); Johan Sköld, Solna (SE); Magnus Stattin, Upplands Väsby (SE); Anders Stjernman, Lindome (SE); Dennis Sundman, Solna (SE); Lars Sundström, Södra Sandby (SE); Miurel Isabel Tercero Vargas, Sollentuna (SE); Claes Tidestav, Bålsta (SE); Sibel Tombaz, Stockholm (SE); Johan Torsner, Kyrkslätt (FI); Hugo Tullberg, Nyköping (SE); Jari Vikberg, Järna (SE); Peter von Wrycza, Stockholm (SE); Thomas Walldeen, Linköping (SE); Pontus Wallentin, Linköping (SE); Hai Wang, Beijing (CN); Ke Wang Helmersson, Linköping (SE); Jianfeng Wang, Beijing (CN); Yi-Pin Eric Wang, Fremont, CA (US); Niclas Wiberg, Linköping (SE); Emma Wittenmark, Lund (SE); Osman Nuri Can Yilmaz, Espoo (FI); Ali Zaidi, Järfälla (SE); Zhan Zhang, Beijing (CN); Zhang Zhang, Beijing (CN); Yanli Zheng, Beijing (CN)

Related U.S. Application Data continuation of application No. 16/714,350, filed on Dec. 13, 2019, now Pat. No. 10,938,497, which is a continuation of application No. 16/290,596, filed on Mar. 1, 2019, now Pat. No. 10,638,253, which is a continuation of application No. 15/154,212, filed on May 13, 2016, now Pat. No. 10,630,410.

(51) Int. Cl.
| | |
|---|---|
| *H04B 7/08* | (2006.01) |
| *H04J 11/00* | (2006.01) |
| *H04L 5/00* | (2006.01) |
| *H04L 5/14* | (2006.01) |
| *H04L 65/1023* | (2022.01) |
| *H04W 4/00* | (2018.01) |
| *H04W 72/12* | (2023.01) |
| *H04W 74/02* | (2009.01) |
| *H04W 74/0816* | (2024.01) |
| *H04W 74/0833* | (2024.01) |

(52) U.S. Cl.
CPC .......... *H04L 5/0053* (2013.01); *H04L 5/1469* (2013.01); *H04L 65/1023* (2013.01); *H04W 4/00* (2013.01); *H04W 8/18* (2013.01); *H04L 5/0007* (2013.01); *H04L 5/0028* (2013.01); *H04L 5/0091* (2013.01); *H04W 72/12* (2013.01); *H04W 74/02* (2013.01); *H04W 74/0816* (2013.01); *H04W 74/0833* (2013.01)

(58) Field of Classification Search
USPC ......................................................... 370/321
See application file for complete search history.

(56) References Cited

U.S. PATENT DOCUMENTS

| | | | |
|---|---|---|---|
| 9,780,856 | B2 | 10/2017 | Cai |
| 10,014,918 | B2 | 7/2018 | Capar et al. |
| 10,110,398 | B2 | 10/2018 | Almalfouh et al. |
| 10,367,677 | B2 | 7/2019 | Parkvall et al. |
| 10,756,946 | B2 | 8/2020 | Lincoln et al. |
| 10,771,310 | B2 | 9/2020 | Palenius et al. |
| 11,038,742 | B2 | 6/2021 | Lincoln et al. |
| 11,444,822 | B2 | 9/2022 | Palenius et al. |
| 11,652,562 | B2 * | 5/2023 | Parkvall .............. H04L 65/1023 370/208 |
| 2001/0024956 | A1 | 9/2001 | You et al. |
| 2004/0002333 | A1 | 1/2004 | Neufeld |
| 2004/0160925 | A1 | 8/2004 | Heo et al. |
| 2005/0259673 | A1 | 11/2005 | Lu et al. |
| 2007/0087756 | A1 | 4/2007 | Hoffberg |
| 2008/0160918 | A1 | 7/2008 | Jeong et al. |
| 2008/0189360 | A1 | 8/2008 | Kiley et al. |
| 2008/0219210 | A1 | 9/2008 | Shuey et al. |
| 2008/0268863 | A1 | 10/2008 | Pedersen et al. |
| 2009/0029652 | A1 | 1/2009 | Xie et al. |
| 2009/0093222 | A1 | 4/2009 | Sarkar |
| 2009/0185632 | A1 | 7/2009 | Cai et al. |
| 2009/0323541 | A1 | 12/2009 | Sägfors et al. |
| 2010/0005363 | A1 | 1/2010 | Eroz et al. |
| 2010/0067496 | A1 | 3/2010 | Choi |
| 2010/0080112 | A1 | 4/2010 | Bertrand et al. |
| 2010/0232345 | A1 | 9/2010 | Tsai et al. |
| 2011/0111766 | A1 | 5/2011 | Yang et al. |
| 2012/0081267 | A1 | 4/2012 | Sirpal et al. |
| 2012/0114021 | A1 | 5/2012 | Chung et al. |
| 2012/0140743 | A1 | 6/2012 | Pelletier et al. |
| 2012/0163305 | A1 | 6/2012 | Nimbalker et al. |
| 2012/0260211 | A1 | 10/2012 | Sathish et al. |
| 2012/0263460 | A1 | 10/2012 | Movassaghi et al. |
| 2012/0275401 | A1 | 11/2012 | Sun |
| 2013/0051364 | A1 | 2/2013 | Seol et al. |
| 2013/0059583 | A1 | 3/2013 | Van Phan et al. |
| 2013/0114391 | A1 | 5/2013 | Jang et al. |
| 2013/0229931 | A1 | 9/2013 | Kim |
| 2014/0010126 | A1 | 1/2014 | Sayana et al. |
| 2014/0016573 | A1 | 1/2014 | Nuggehalli et al. |
| 2014/0079038 | A1 | 3/2014 | Maeda et al. |
| 2014/0146788 | A1 | 5/2014 | Wallentin et al. |
| 2014/0185481 | A1 | 7/2014 | Seol et al. |
| 2014/0294111 | A1 | 10/2014 | Zhang et al. |
| 2014/0341310 | A1 | 11/2014 | Rahman et al. |
| 2015/0215929 | A1 | 7/2015 | Damnjanovic et al. |
| 2015/0256308 | A1 | 9/2015 | Ma et al. |
| 2015/0264557 | A1 | 9/2015 | Exterman |
| 2015/0327079 | A1 | 11/2015 | Wu et al. |
| 2015/0365975 | A1 | 12/2015 | Sahlin et al. |
| 2015/0373667 | A1 | 12/2015 | Rajurkar et al. |
| 2016/0050643 | A1 | 2/2016 | Pudney et al. |
| 2016/0072572 | A1 | 3/2016 | Kang et al. |
| 2016/0073344 | A1 | 3/2016 | Vutukuri et al. |
| 2016/0087765 | A1 | 3/2016 | Guey et al. |
| 2016/0127140 | A1 | 5/2016 | Seo et al. |
| 2016/0135247 | A1 | 5/2016 | Ozturk et al. |
| 2016/0142922 | A1 | 5/2016 | Chen et al. |
| 2016/0157148 | A1 | 6/2016 | Kato et al. |
| 2016/0352551 | A1 | 12/2016 | Zhang et al. |
| 2017/0086141 | A1 | 3/2017 | Gal |
| 2017/0230869 | A1 | 8/2017 | Kubota et al. |
| 2017/0257842 | A1 | 9/2017 | Hessler et al. |
| 2017/0290008 | A1 | 10/2017 | Tooher et al. |
| 2017/0325164 | A1 | 11/2017 | Lee et al. |
| 2017/0331577 | A1 | 11/2017 | Parkvall et al. |
| 2017/0353257 | A1 | 12/2017 | Islam et al. |
| 2018/0063834 | A1 | 3/2018 | Abedini et al. |
| 2018/0124733 | A1 | 5/2018 | Vilaipornsawai et al. |
| 2018/0234153 | A1 | 8/2018 | Lincoln et al. |
| 2018/0270717 | A1 | 9/2018 | Kakishima et al. |
| 2019/0021085 | A1 | 1/2019 | Mochizuki et al. |
| 2019/0069289 | A1 | 2/2019 | Kishiyama et al. |
| 2019/0260549 | A1 | 8/2019 | Mccoy et al. |
| 2020/0028745 | A1 | 1/2020 | Parkvall et al. |
| 2021/0409256 | A1 | 12/2021 | Lincoln et al. |

FOREIGN PATENT DOCUMENTS

| | | |
|---|---|---|
| CN | 101312575 A | 11/2008 |
| CN | 101433102 A | 5/2009 |
| CN | 101610102 A | 12/2009 |
| CN | 101610538 A | 12/2009 |
| CN | 101945417 A | 1/2011 |
| CN | 102065040 A | 5/2011 |
| CN | 102131225 A | 7/2011 |
| CN | 102160323 A | 8/2011 |
| CN | 102291762 A | 12/2011 |
| CN | 102754496 A | 10/2012 |
| CN | 102823290 A | 12/2012 |
| CN | 102859896 A | 1/2013 |
| CN | 102934504 A | 2/2013 |
| CN | 102948226 A | 2/2013 |
| CN | 103220796 A | 7/2013 |
| CN | 103460788 A | 12/2013 |
| CN | 103716081 A | 4/2014 |
| CN | 103891161 A | 6/2014 |
| CN | 103906123 A | 7/2014 |
| CN | 104041149 A | 9/2014 |
| CN | 104205993 A | 12/2014 |
| CN | 104349378 A | 2/2015 |
| CN | 104363624 A | 2/2015 |
| CN | 104769998 A | 7/2015 |
| CN | 104796930 A | 7/2015 |
| CN | 105009640 A | 10/2015 |
| CN | 105052192 A | 11/2015 |
| CN | 105357692 A | 2/2016 |
| EP | 2095661 A2 | 9/2009 |
| EP | 2341678 A1 | 7/2011 |
| EP | 2499750 A2 | 9/2012 |
| EP | 2557864 A1 | 2/2013 |
| EP | 3097649 A4 | 9/2017 |
| EP | 3455952 A1 | 3/2019 |
| EP | 3456107 A1 | 3/2019 |
| EP | 3456107 B1 | 2/2020 |
| EP | 3456083 B8 | 6/2020 |
| EP | 3681197 A1 | 7/2020 |
| EP | 3681197 B1 | 1/2022 |
| EP | 4021066 A1 | 6/2022 |

(56) References Cited

FOREIGN PATENT DOCUMENTS

| | | |
|---|---|---|
| JP | 109247063 A | 9/1997 |
| JP | 2003284135 A | 10/2003 |
| JP | 2005311857 A | 11/2005 |
| JP | 2013516820 A | 5/2013 |
| JP | 2013149283 A | 8/2013 |
| JP | 2014519780 A | 8/2014 |
| JP | 2016019016 A | 2/2016 |
| JP | 2017197063 A | 11/2017 |
| JP | 2019523575 A | 8/2019 |
| KR | 20110091535 A | 8/2011 |
| KR | 101312876 B1 | 9/2013 |
| KR | 20130100716 A | 9/2013 |
| KR | 20150143769 A | 12/2015 |
| KR | 20160027969 A | 3/2016 |
| NO | 2014175656 A1 | 10/2014 |
| RU | 2330387 C2 | 7/2008 |
| RU | 2012135692 A | 2/2014 |
| WO | 2007060494 A1 | 5/2007 |
| WO | 2008076063 A2 | 6/2008 |
| WO | 2009123955 A1 | 10/2009 |
| WO | 2010033989 A1 | 3/2010 |
| WO | 2010107358 A1 | 9/2010 |
| WO | 2011059568 A2 | 5/2011 |
| WO | 2013015726 A1 | 1/2013 |
| WO | 2014126136 A1 | 8/2014 |
| WO | 2015111891 A1 | 7/2015 |
| WO | 2016055102 A1 | 4/2016 |
| WO | 2016064048 A1 | 4/2016 |
| WO | 2017196243 A1 | 11/2017 |
| WO | 2017196244 A1 | 11/2017 |
| WO | 2017196247 A1 | 11/2017 |
| WO | 2017196249 A1 | 11/2017 |
| WO | 2017197063 A1 | 11/2017 |
| WO | 2018129085 A1 | 7/2018 |

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.3.0, Mar. 2016, 1-295.

3GPP, "3rd Generation Partnership Project; Technical Specification Group Radio Access Network; Evolved Universal Terrestrial Radio Access (E-UTRA); Physical channels and modulation (Release 13)", 3GPP TS 36.211 V13.1.0, Mar. 2016, 1-155.

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.7.0, Sep. 2015, 1-453.

3GPP, "3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.1.0, Mar. 2016, 1-551.

3GPP, "3rd Generation Partnership Project; Technical Specification Group Radio Access Network; Feasibility study for evolved Universal Terrestrial Radio Access (UTRA) and Universal Terrestrial Radio Access Network (UTRAN) (Release 13)", 3GPP TR 25.912 V13.0.0, Dec. 2015, 1-64.

3GPP, "3rd Generation Partnership Project; Technical Specification Group Radio Access Network; Radio Resource Control (RRC); Protocol specification (Release 11)", 3GPP TS 25.331 V11.9.0, Mar. 2014, 1-2081.

3GPP, "3rd Generation Partnership Project; Technical Specification Group Radio Access Network; Requirements for Evolved Utra (E-UTRA) and Evolved Utran (E-UTRAN) (Release 9)", 3GPP TR 25.913 V9.0.0, Dec. 2009, 1-18.

3GPP, "3rd Generation Partnership Project; Technical Specification Group Radio Access Network; Requirements for further advancements for Evolved Universal Terrestrial Radio Access (E-UTRA) (LTE-Advanced) (Release 13)", 3GPP TR 36.913 V13.0.0, Dec. 2015, 1-15.

3GPP, "3rd Generation Partnership Project; Technical Specification Group Radio Access Network; Scenarios and requirements for small cell enhancements for E-UTRA and E-UTRAN (Release 13)", 3GPP TR 36.932 V13.0.0, Dec. 2015, 1-14.

3GPP, "3rd Generation Partnership Project; Technical Specification Group Radio Access Network; Study on further enhancements of small cell high layer aspects for LTE (Release 13)", 3GPP TR 36.876 V13.0.0, Sep. 2015, 1-8.

3GPP, "3rd Generation Partnership Project; Technical Specification Group Radio Access Network; Study on indoor positioning enhancements for UTRA and LTE (Release 13)", 3GPP TR 37.857 V13.0.0, Sep. 2015, 1-82.

3GPP, "3rd Generation Partnership Project; Technical Specification Group Radio Access Network; Study on performance enhancements for high speed scenario in LTE (Release 13)", 3GPP TR 36.878 V13.0.0, Jan. 2016, 1-92.

3GPP, "3rd Generation Partnership Project; Technical Specification Group Services and System Aspects; 3GPP System Architecture Evolution: Report on Technical Options and Conclusions (Release 8)", 3GPP TR 23.882 V8.0.0, Sep. 2008, 1-234.

3GPP, "3rd Generation Partnership Project; Technical Specification Group Services and System Aspects; Earthquake and Tsunami Warning System (ETWS) requirements; Stage 1 (Release 9)", 3GPP TS 22.168 V9.0.0, Jun. 2008, 1-12.

3GPP, "3rd Generation Partnership Project; Technical Specification Group Services and System Aspects; Feasibility study for Proximity Services (ProSe) (Release 12)", 3GPP TR 22.803 V12.2.0, Jun. 2013, 1-45.

3GPP, "3rd Generation Partnership Project; Technical Specification Group Services and System Aspects; Network Sharing; Architecture and functional description (Release 13)", 3GPP TS 23.251 V13.1.0, Mar. 2015, 1-39.

3GPP, "3rd Generation Partnership Project; Technical Specification Group Services and System Aspects; Public Warning System (PWS) requirements (Release 13)", 3GPP TS 22.268 V13.0.0, Dec. 2015, 1-16.

3GPP, "3rd Generation Partnership Project; Technical Specification Group Services and System Aspects; Service accessibility (Release 14)", 3GPP TS 22.011 V14.2.0, Mar. 2016, 1-30.

3GPP, "3rd Generation Partnership Project; Technical Specification Group Services and System Aspects; Study on Architecture for Next Generation System (Release 14)", 3GPP TR 23.799 V0.4.0, Apr. 2016, 1-96.

3GPP, "3rd Generation Partnership Project; Technical Specification Group Services and System Aspects; Study on LTE Support for V2X Services (Release 14)", 3GPP TR 22.885 V1.0.0, Sep. 2015, 1-42.

Abrardo, Andrea, et al., "Network Coding Schemes for Device-to-Device Communications Based Relaying for Cellular Coverage Extension", IEEE Signal Processing Advancements for Wireless Communications (SPAWC), Stockholm, Jun. 2015, 1-9.

Arikan, Erdal, "Channel polarization: A method for constructing capacity-achieving codes for symmetric binary-input memoryless channels", IEEE Transactions on Information Theory, vol. 55, Jul. 2009, 3051-3073.

Ashraf, S. A., et al., "Control Channel Design Trade-offs for Ultra-Reliable and Low-Latency Communication System", Globecom, Dec. 2015, 1-6.

Astely, David, et al., "LTE Release 12 and Beyond", IEEE Communications Magazine, vol. 51, No. 7, Jul. 2013, 154-160.

Athley, Fredrik, et al., "Providing Extreme Mobile Broadband Using Higher Frequency Bands, Beamforming, and Carrier Aggregation", 2015 IEEE 26th International Symposium on Personal, Indoor and Mobile Radio Communications—(PIMRC): Mobile and Wireless Networks, 1370-1374.

Atsan, Emre, et al., "Towards integrating Quantize-Map-Forward relaying into LTE", 2012 IEEE Information Theory Workshop, 212-216.

Aydin, Osman, et al., "Final Report on Network-Level Solutions", METIS, Seventh Framework Programme, Document No. ICT-317669-METIS/D4.3, Project Name: Mobile and wireless communications Enablers for the Twenty-twenty Information Society (METIS), Mar. 1, 2015, pp. 1-148.

(56) References Cited

OTHER PUBLICATIONS

Aydin, Osman, et al., "Final report on trade-off investigations", METIS, Seventh Framework Programme, Document No. ICT-317669-METIS/D4.2, Project Name: Mobile and wireless communications Enablers for the Twenty-twenty Information Society (METIS), Version 1, Aug. 29, 2014, 1-96.

Belleschi, Marco, et al., "Benchmarking Practical RRM Algorithms for D2D Communications in LTE Advanced", Wireless Personal Communications, vol. 82, Issue 2, May 2015, 883-910.

Colombi, D., et al., "Implications of EMF Exposure Limits on Output Power Levels for 5G Devices above 6 GHz", IEEE Antennas and Wireless Propagation Letters ( vol. 14 ), Feb. 4, 2015, 1247-1249.

Da Silva, Icaro, et al., "Tight integration of LTE and new 5G air interface to fulfill 5G requirements", Workshop on 5G Architecture, VTC Spring 2014, Glasgow, Spring 2014, 1-5.

Da Silva Jr., José Mairton B., et al., "Performance Analysis of Network-Assisted Two-Hop D2D Communications", 10th IEEE Broadband Wireless Access Workshop, Austin, TX, USA, Dec. 2014, 1-8.

Dahlman, Erik, et al., "4G LTE/LTE-Advanced for Mobile Broadband", ELSEVIER, 2011, 1-509.

Duarte, Melissa, et al., "Quantize-Map-Forward (QMF) Relaying: An Experimental Study", Proceedings of the fourteenth ACM international symposium on Mobile ad hoc networking and computing (MobiHoc '13), 2013, 227-236.

El Hattachi, Rachid, et al., "NGMN 5G White Paper", A Deliverable by the NGMN Alliance, Version 1.0, Feb. 17, 2015, 1-125.

Felström, Alberto Jiménez, et al., "Time-Varying Periodic Convolutional Codes With Low-Density Parity-Check Matrix", IEEE Transactions on Information Theory, vol. 45, No. 6, Sep. 1999, 2181-2191.

Fodor, Gabor, et al., "A Comparative Study of Power Control Approaches for Device-to-Device Communications", IEEE International Conference on Communications (ICC), Budapest, Hungary, Jun. 2013, 1-7.

Fodor, G., et al., "Device-to-Device Communications for National Security and Public Safety", IEEE Access, vol. 2, Dec. 18, 2014, 1510-1520.

Furuskar, A., et al., "5G Use Cases", Media Delivery Use Cases, 1-18.

Garg, Nikhil, "Fair Use and Innovation in Unlicensed Wireless Spectrum", Wise, IEEE, Jul. 31, 2015, 1-74.

Giard, Pascal, et al., "Unrolled Polar Decoders, Part I: Hardware Architectures", 1-10.

Gunnarsson, Fredrik, et al., "Particle Filtering for Network-Based Positioning Terrestrial Radio Networks", Data Fusion and Target Tracking Conference, Liverpool, UK, Apr. 2014, 1-7.

Gustavsson, Ulf, et al., "On the Impact of Hardware Impairments on Massive MIMO", IEEE Globecom 2014, Austin, Texas, USA, 2014, 1-7.

Hemachandra, Kasun T., et al., "Sum-Rate Analysis for Full-Duplex Underlay Device-to-Device Networks", IEEE Wireless Communications and Networking Conference (WCNC), Istanbul, Turkey, Apr. 6-9, 2014, 1-6.

Imran, Muhammad Ali, et al., "Deliverable D6.4 Final Integrated Concept", Energy Aware Radio and network Technologies (EARTH) INFSO-ICT-247733 EARTH https://bscw.ictearth.eu/pub/bscw.cgi/d49431/EARTH_WP6_D6.4.pdf., Jun. 2012, 1-95.

Inomata, Minoru, et al., "ICNIRP Publication", IEICE Communications Express, vol. 4, No. 5, May 29, 2015, 149-154.

Jacobsson, Sven, et al., "One-Bit Massive MIMO: Channel Estimation and High-Order Modulations", IEEE ICC2015 Communications Workshop, London, UK, 2015, 1-6.

Johansson, Niklas A., et al., "Radio Access for Ultra-Reliable and Low-Latency 5G Communications", IEEE ICC 2015—Workshop on 5G & Beyond—Enabling Technologies and Applications, Jun. 8-12, 2015, 1184-1189.

Kleinrock, Leonard, et al., "Packet Switching in Radio Channels: Part I—Carrier Sense Multiple-Access Modes and Their Throughput-Delay Characteristics", IEEE Transactions on Communications, vol. COM-23, No. 12, Dec. 1975, 1400-1416.

Wiemann, Henning, et al., "A Novel Multi-Hop ARQ Concept", Vehicular Technology Conference, 2005, VTC 2005, IEEE 61st (vol. 5), Spring 2005, 1-5.

Wigard, Jeroen, et al., "On the User Performance of LTE UE Power Savings Schemes with Discontinuous Reception in LTE", Nokia Siemens Networks, Research Center Aalborg, 2009, 1-5.

Yilmaz, Osman N. C., et al., "Analysis of Ultra-Reliable and Low-Latency 5G Communication for a Factory Automation Use Case", ICC Workshop on 5G Enablers and Applications, Spring 2015, 1-6.

Yilmaz, Osman N. C., et al., "Smart Mobility Management for D2D Communications in 5G Networks", IEEE WCNC 2014, Istanbul, Turkey, Apr. 6-9, 2014, 1-5.

Korada, Satish Babu, "Polar Codes for Channel and Source Coding", Ph.D. thesis, E'cole Polytechnique Federale de Lausanne (EPFL), Jul. 15, 2009, 1-181.

Kusume, Katsutoshi, et al., "Updated scenarios, requirements and KPIs for 5G mobile and wireless system with recommendations for future investigations", Metis, Seventh Framework Programme, Document No. ICT-317669-METIS/D1.5,Project Name: Mobile and wireless communications Enablers for the Twenty-twenty Information Society (METIS), Apr. 30, 2015, 1-57.

Kwon, Sang-Wook, et al., "Performance Analysis of DRX Mechanism Considering Analogue Beamforming in Millimeter-Wave Mobile Broadband System", IEEE Globecom Workshops, 2014, 802-807.

Li, Gen, et al., "5G Spectrum: Is China ready?", IEEE Communications Magazine, Jul. 2015, 58-65.

Li, Gen, et al., "Coordination context-based spectrum sharing for 5G millimeter-wave networks", 2014 9th International Conference on Cognitive Radio Oriented Wireless Networks (CROWNCOM), Oulu, Finland, Jun. 2014, 32-38.

Li, Zhe, "Performance Analysis of Network Assisted Neighbor Discovery Algorithms", KTH Electrical Engineering, Degree Project in Automatic Control, Second Level, Stockholm, Sweden, XR-EE-RT 2012:026, 2012, 1-64.

Luby, Michael G., et al., "Improved Low-Density Parity-Check Codes Using Irregular Graphs", IEEE Transactions on Information Theory, vol. 47, No. 2, Feb. 2001, 585-598.

Marsch, Patrick, et al., "Preliminary Views and Initial Considerations on 5G RAN Architecture and Functional Design", 5G PPP, METIS II, White Paper, Mar. 8, 2016, 1-27.

Medbo, J., et al., "Channel Modelling for the Fifth Generation Mobile Communications", Antennas and Propagation (EuCAP), 2014 8th European Conference on. IEEE, 2014, 1-5.

Meinilä, Juha, et al., "D5.3: Winner+ Final Channel Models", Winner +, Celtic Telecommunication Solutions, Project No. CELTIC/CP5-026, Project Title: Wireless World Initiative New Radio—Winner+, Version 1.0, Jun. 30, 2010, 1-107.

Mollén, Christopher, et al., "Out-of-Band Radiation Measure for MIMO Arrays with Beamformed Transmission", Submitted to ICC 2016, Kuala Lumpur, Malaysia, 2016, 1-6.

Motoyama, Shusaburo, "Flexible Polling-based Scheduling with QoS Capability for Wireless Body Sensor Network", 8th IEEE International Workshop on Performance and Management of Wireless and Mobile Networks, P2MNET 2012, Clearwater, Florida, 2012, 745-752.

Nagpal, Vinayak, "Quantize-Map-and-Forward Relaying: Coding and System Design", Forty-Eighth Annual Allerton Conference, Allerton House, UIUC, Illinois, USA, Sep. 29-Oct. 1, 2010, 443-450.

Nazer, Bobak, et al., "Compute-and-Forward: Harnessing Interference through Structured Codes", IEEE Trans Info Theory, vol. 57, Oct. 2011, 6463-6486.

Nurmela, Vuokko, et al., "METIS Channel Models", METIS, Seventh Framework Programme, Document No. ICT-317669-METIS/D1.4, Project Name: Mobile and wireless communications Enablers for the Twenty-twenty Information Society (METIS), Jul. 14, 2015, 1-223.

Popovski, Petar, "Ultra-Reliable Communication in 5G Wireless Systems", 1st International Conference on 5G for Ubiquitous Connectivity, Levi, Finland, Nov. 2014, 1-6.

(56) References Cited

OTHER PUBLICATIONS

Pradini, Aidilla, et al., "Near-Optimal Practical Power Control Schemes for D2D Communications in Cellular Networks", European Conference on Networks and Communications (EuCNC), Bologna, Italy, Jun. 23-26, 2014, 1-5.
Qianxi, Lu, et al., "Clustering Schemes for D2D Communications Under Partial/No Network Coverage", 79th IEEE VTC Spring, May 18-21, 2014, 1-6.
Rangan, Sundeep, et al., "Millimeter Wave Cellular Wireless Networks: Potentials and Challenges", Proceedings of the IEEE, vol. 102, Issue 3, Feb. 5, 2014, 366-384.
Rosowski, Thomas, et al., "Description of the spectrum needs and usage principles", METIS, Seventh Framework Programme, Document No. ICT-317669-METIS/D5.3, Project Name: Mobile and wireless communications Enablers for the Twenty-twenty Information Society (METIS), Aug. 29, 2014, 1-106.
Sachs, Joachim, et al., "Virtual Radio—A Framework for Configurable Radio Networks", Proceedings of the 4th Annual International Conference on Wireless Internet (WICON '08), Maui, Hawaii, USA, Nov. 17-19, 2008, 1-7.
Sahlin, Henrik, et al., "Random Access Preamble Format for Systems with Many Antennas", International Workshop on Emerging Technologies for 5G Wireless Cellular Networks, IEEE Globecom 2014, Austin, TX, USA, Dec. 8, 2014, 1-6.
Sattiraju, Raja, "Reliability Modeling, Analysis and Prediction of Wireless Mobile Communications", Chair for Wireless Communication and Navigation, University of Kaiserslautern, Kaiserslautern, Germany, 2014, 1-6.
Schotten, Hans D, et al., "Availability Indication as Key Enabler for Ultra-Reliable Communication in 5G", 2014, 1-5.
Ström, Erik G., et al., "5G Ultra—Reliable Vehicular Communication", http://arxiv.org/abs/1510.01288, Version 1.1, Oct. 3, 2015, 1-13.
Sun, Shu, et al., "Millimeter Wave Multi-beam Antenna Combining for 5G Cellular Link Improvement in New York City", 2014 IEEE International Conference on Communications (ICC),, Jun. 2014, 5468-5473.
Sun, Wanlu, et al., "Resource Sharing and Power Allocation for D2D-based Safety-Critical V2X Communications", IEEE ICC 2015, London, UK, Jun. 8-12, 2015, 1-7.
Svensson, Stefan, "Challenges of Wireless Communication in Industrial Systems", ABB Corporate Research, 1-18.
Tal, I., et al., "List Decoding of Polar Codes", Proceedings of IEEE Symp. Inf. Theory, 2011, 1-81.
Thorpe, J., "Low-Density Parity-Check (LDPC) Codes Constructed from Protographs", IPN Progress Report 42-154, Aug. 15, 2003, 1-7.
Ting, Kuo-Chang, et al., "Energy-Efficient DRX Scheduling for QoS Traffic in LTE Networks", Ninth IEEE International Symposium on Parallel and Distributed Processing with Applications, 2011, 213-218.
Unknown, Author, "5G—Key Component of the Networked Society", RWS-150009, 3GPP RAN Workshop on 5G, Phoenix, Arizona, USA, Sep. 17-18, 2015, 1-55.
Unknown, Author, "5G Automotive Vision", 5G-Infrastructure-Association, https://5g-ppp.eu/white-papers/, Oct. 20, 2015, 1-67.
Unknown, Author, "5G Radio Access", Ericsson White Paper, Uen 284 23-3204 Rev B, Apr. 2016, 1-10.
Unknown, Author, "5G Systems", Ericsson White Paper, Uen 284 23-3244, Jan. 2015, 1-14.
Unknown, Author, "Active Mode Mobility in NR: SINR drops in higher frequencies", 3GPP TSG-RAN WG2 #93bis, R2-162762, Dubrovnik, Croatia, Ericsson, Apr. 11-15, 2016, 1-4.
Unknown, Author, "Active Transmission/Reception Time Reduction for DL Control Signaling", Samsung, 3GPP TSG RAN WG1 #80, R1-150349, Athens, Greece, Feb. 9-13, 2015, 1-4.
Unknown, Author, "Carrier aggregation in LTE-Advanced", Ericsson, TSG-RAN WG1 #53bis, R1-082468, Warsaw, Poland, Jun. 30-Jul. 4, 2008, 1-6.

Unknown, Author, "Channel coding for new radio interface", Intel Corporation, 3GPP TSG RAN WG1 Meeting #84bis, R1-162387, Busan, South Korea, Apr. 11-15, 2016, 1-4.
Unknown, Author, "Channel interleaver correction for eMTC", 3GPP TSG RAN WG1 Meeting #84bis, R1-163349, Busan, Korea, Apr. 11-15, 2016, 1-2.
Unknown, Author, "Channeling Coding for NR", 3GPP TSG RAN WG1 Meeting #84bis, RI-163114, Busan, Korea, Apr. 11-15, 2016, 1-10.
Unknown, Author, "Comments and suggestions on baseline RRC CR for DC", 3GPP TSG RAN WG2 #88 R2-145109, San Francisco, USA, Nov. 17 to Nov. 21, 2014, 1-76.
Unknown, Author, "Consideration on higher layer procedures in 5G NR", 3GPP TSG-RAN WG2 Meeting #93bis, R2-162568, Dubrovnik, Croatia, Apr. 11-15, 2016, 1-3.
Unknown, Author, "Consideration on System Information Broadcast in New Rat", 3GPP TSG-RAN WG2 Meeting #93bis, R2-162629, Dubrovnik, Croatia, Apr. 11-15, 2016, 1-4.
Unknown, Author, "Considerations on channel coding for NR", 3GPP TSG RAN WG1 Meeting #84bis, R1-163130, Busan, Korea, Apr. 11-15, 2016, 1-3.
Unknown, Author, "Control details for UL scheduling in LAA", Qualcomm Incorporated, 3GPP TSG RAN WG1 #84bis, R1-163022, Busan, Korea, Apr. 11-15, 2016, 1-6.
Unknown, Author, "Council Recommendation of Jul. 12, 1999 on the limitation of exposure of the general public to electromagnetic fields (0 Hz to 300 GHz)", Official Journal of the European Communities, L199, Jul. 30, 1999, 59-70.
Unknown, Author, "Deliverable D4.1 Draft air interface harmonization and user plane design", METIS II, Mobile and wireless communications Enablers for the Twenty-twenty Information Society-II, May 4, 2016, 1-129.
Unknown, Author, "Design aspects of control signaling for V2V communication", Intel Corporation, 3GPP TSG RAN WG1 Meeting #84, R1-160701, St Julian's, Malta, Feb. 15-19, 2016, 1-8.
Unknown, Author, "Details on NR impact to support unlicensed operation", Ericsson, 3GPP TSG-RAN WG2 #93bis, R2-162751, Dubrovnik, Croatia, Apr. 11-15, 2016, 1-3.
Unknown, Author, "Discussion on MTC Idle states", 3GPP TSG-WG #69-bis, R2-102033, Beijing, April, 12-16, 2010, 1-4.
Unknown, Author, "Discussion on numerology and frame structure", 3GPP TSG RAN WG1 meeting #84 bis, R1-162549, Busan, Korea, Apr. 11-15, 2016, 1-6.
Unknown, Author, "DL channel design for shortened TTI", 3GPP TSG RAN WG1 #84bis, R1-163068, Busan, Korea, Apr. 11-15, 2016, 1-7.
Unknown, Author, "Electronic Code of Federal Regulations, Title 47: Telecommunication, Chapter 1, Subchapter A, Part 2—Frequency Allocations and Radio Treaty Matters; General Rules and Regulations", eCFR—Code of Federal Regulations, http://www.ecfr.gov/cgi-bin/text-idx?SID=088e5625b9e603b91aa3601b . . . , Jun. 20, 2016, 1-217.
Unknown, Author, "ETSI TR 102 889-2 V1.1.1", Electromagnetic compatibility and Radio spectrum Matters (ERM); System Reference Doc; Short Range Devices(SRD); Part 2: Technical characteristics for SRD equipment for wireless industrial applications using technologies different from Ultra-Wide Band(UWB), Aug. 2011, 1-37.
Unknown, Author, "Flexible air interface of NR", 3GPP TSG-RAN2 Meeting #93-bis, R2-162660, Dubrovnik, Croatia, Apr. 11-15, 2016, 1-5.
Unknown, Author, "FlexWare Flexible Wireless Automation in Real-Time Environments", Seventh Framework Programme, PNR 224350, Work Package 1 ystem Architecture, Task 1.1 System Requirements Analysis, Deliverable D1.1, FP7-224350, 2008, 1-197.
Unknown, Author, "Frame structure design of new RAT", ZTE, 3GPP TSG RAN WG1 Meeting #84bis, R1-162228, Busan, Korea, Apr. 11-15, 2016, 1-5.
Unknown, Author, "Frame structure for NR", TSG-RAN WG1 #84bis, R1-163226, Busan, South Korea, Apr. 11-15, 2016, 1-2.
Unknown, Author, "Furthe discussion on E-PDCCH structure", 3GPP TSG RAN WG1 #68, R1-120187, Dresden, Germany, Feb. 6-10, 2012, 1-6.

(56) References Cited

OTHER PUBLICATIONS

Unknown, Author , "Guidelines for evaluation of radio interface", International Telecommunication Union; ITU-R, Radiocommunication Sector of ITU; Rep. ITU-R M.2135-1; M Series, Mobile, radiodetermination, amateur and related satellites services, Dec. 2009, 1-72.

Unknown, Author , "Handling of inactive UEs", 3GPP TSG-RAN WG3 #91bis R3-160845 Bangalore, India, Apr. 11-15, 2016, 1-4.

Unknown, Author , "ICNIRP Guidelines for Limiting Exposure to Time-Varying Electric, Magnetic and Electromagnetic Fields (up to 300 GHz)", International Commission on Non-Ionizing Radiation Protection, ICNIRP Publication, 1998, 1-34.

Unknown, Author , "IMT Vision—Framework and overall objectives of the future development of IMT for 2020 and beyond", International Telecommunication Union; ITU-R Radiocommunication Sector of ITU; Recommendation ITU-R M.2083-0; M series, Mobile, radiodetermination, amateur and related satellite services, Sep. 2015, 1-21.

Unknown, Author , "Initial considerations on system access in NR", Ericsson, 3GPP TSG RAN WG1 Meeting #84, R1-163237, Busan, South Korea, Apr. 11-15, 2016, 1-3.

Unknown, Author , "Initial views on frame structure for NR access technology", 3GPP TSG RAN WG1 Meeting #84bis, R1-163112, Busan, Korea, Apr. 11-15, 2016, 1-7.

Unknown, Author , "Initial views on numerology for NR access techonology", 3GPP TSG RAN WG1 Meeting #84bis R1-163113, Busan, Korea, Apr. 11-15, 2016, 1-12.

Unknown, Author , "LDPC Codes—HARQ, rate", 3GPP TSG-RAN WG1 #84b, R1-162209, Busan, Korea, Apr. 11-15, 2016, 1-4.

Unknown, Author , "LS on a New PRACH Cyclic Shift Restriction Set", 3GPP TSG RAN WG1 Meeting #84bis, R1-163371, Busan, Korea, Apr. 11-15, 2016, 1-2.

Unknown, Author , "LTE; Evolved Universal Terrestrial Radio Access (E-UTRA); Physical layer procedures (3GPP TS 36.213 version 13.1.1 Release 13)", ETSI TS 136 213 V13.1.1, May 2016, pp. 1-363.

Unknown, Author , "MIMO/beamforming for 5G new radio interface for over-6GHz: system architecture and design aspects", Samsung, 3GPP TSG RAN WG1 #84bis, R1-162183, Busan, Korea, Apr. 11-15, 2016, 1-7.

Unknown, Author , "Multiplexing and multiple access for mmWave networks", 3GPP TSG RAN WG1 Meeting #84bis, R1-162568, Busan, Korea, Apr. 11-15, 2016, 1-3.

Unknown, Author , "NB-IoT—NPRACH Sequences", 3GPP TSG RAN WG1 NB-IoT Ad-Hoc Meeting, R1-161834, Sophia Antipolis, France, Mar. 22-24, 2016, 1-6.

Unknown, Author , "NR C-DRX Operations with Beam Management", Samsung, 3GPP TSG.RAN WG2 2017 RAN2 #97 Meeting, R2-1701994, Athens, Greece, Feb. 13-17, 2017, 1-5.

Unknown, Author , "Numerology Requirements", 3GPP TSG RAN WG1 Meeting #84bis, R1-163397, version of R1-162204, Busan, Korea, Apr. 11-15, 2016, 1-8.

Unknown, Author , "On numerology determination during initial access", 3GPP TSG RAN WG1 Meeting #89, R1-1706978, Hangzhou, China, May 15-19, 2017, 1-4.

Unknown, Author , "Overall radio protocol and NW architecture for NR", NTT Docomo, R2-162573, 2016, 1-17.

Unknown, Author , "Overview of 5G frame structure", Huall'ei, HiSilicon; 3GPP TSG RAN WG I Meeting #84bis, R1-162157, Busan, Korea, Apr. 11-15, 2016, 1-6.

Unknown, Author , "Overview of new radio access technology requirements and designs", 3GPP TSG TAN WG1 Meeting #84bis, R1-162379, Busan, Korea, Apr. 11-15, 2016, 1-4.

Unknown, Author , "Overview of Polar Codes", 3GPP TSG RAN WG1 Meeting #84bis, R1-162161, Busan, Korea, Apr. 11-15, 2016, 1-7.

Unknown, Author , "PDSCH Transmissions for Low Cost UEs", Samsung, 3GPP TSG RAN WG1 #82bis, R1-155431, Malmo, Sweden, Oct. 5-9, 2015, 1-4.

Unknown, Author , "Performance and complexity of Turbo, LDPC and Polar codes", Nokia, Alcatel-Lucent Shanghai Bell, 3GPP TSG-RAN WG1 #84bis, R1-162897, Busan, Korea, Apr. 11-15, 2016, 1-5.

Unknown, Author , "Preliminary view on Initial Access in 5G", 3GPP TSG-RAN WG2 Meeting #93bis, R2-162300, Dubrovnik, Croatia, Apr. 15-15, 2016, 1-3.

Unknown, Author , "Proposal for Study on a Next Generation System Architecture", China Mobile et al., SA WG2 Meeting #111, S2-153651 (revision of S2-153573), ChengDu, China (revision, Oct. 19-23, 2015, 1-6.

Unknown, Author , "Remaining Details on DCI Contents", Samsung, 3GPP TSG RAN WG1 Meeting #84bis, R1-163275, Busan, Korea, Apr. 11-15, 2016, 1-4.

Unknown, Author , "RRM requirements for New Radio Access Technology", Ericsson, 3GPP TSG-RAN WG4 Meeting # 78bis, R4-161726, San Jose del Cabo, Mexico, Apr. 11-15, 2016, 1-5.

Unknown, Author , "Scenario & design criteria on flexible numerologies", Huawei, HiSilicon; 3GPPTSG RAN WGI Meeting #84bis, R1-162156, Busan, Korea, Apr. 11-15, 2016, 1-7.

Unknown, Author , "Solution for selection of a network slice instance", Ericsson, SA WG2 Meeting #114, S2- 161480, Sophia Antipolis, Apr. 11-15, 2016, 1-4.

Unknown, Author , "Solution: Network Slicing", SA WG2 Meeting #S2-113ah, S2- 161009, Sophia Antipolis, FR, Feb. 23-26, 2016, 1-6.

Unknown, Author , "Solution: PDU Sessions served by different Network Slices", Motorola Mobility, Lenovo, SA WG2 Meeting #114, S2-161574, Apr. 11-15, 2016, 1-4.

Unknown, Author , "Summary of email discussion RACH open cases", 3GPP TSG-RAN WG2 NB-IoT AdHoc, R2-163251, Sophia Antipolis, France, May 3-4, 2016, 1-14.

Unknown, Author , "Support for Beam Based Common Control Plane in 5G New Radio", Nokia, Alcatel-Lucent Shanghai Bell, 3GPP TSG-RAN WG1 #84bis, R1-162895, Busan, Korea, Apr. 11-15, 2016, 1-4.

Unknown, Author , "System Information Signalling in NR", 3GPP TSG-RAN WG2 Meeting #93bis, R2-162215, Dubrovnik, Croatia, Apr. 11-15, 2016, 1-7.

Unknown, Author , "Tight integration of the New Radio interface (NR) and LTE: Control Plane design", 3GPP TSG-RAN WG2 #93bis, Tdoc R2-162753, Dubrovnik, Croatia, Apr. 11-15, 2016, 1-5.

Unknown, Author , "UL scheduling for Rel-14 eLAA", CATT, 3GPP TSG RAN WG1 Meeting #84bis, R1-162260, Busan, Korea, Apr. 11-15, 2016, 1-3.

Unknown, Author , "Unified CSI framework in NR", 3GPP TSG RAN WG1 Meeting #84, R1-163238, Busan, South Korea, Apr. 11-15, 2016, 1-6.

Unknown, Author , "Uplink latency reduction with prescheduling", HTC, 3GPP TSG RAN WG1 Meeting #84bis, R1-162530, Busan, Korea, Apr. 11-15, 2016, 1-2.

Unknown, Author , "Waveform for NR", Ericsson, 3GPP TSG-RAN WG1 #84bis, R1-163222, Busan, South Korea, Apr. 11-15, 2016, 1-5.

Wang, Xinhua , "Joint Antenna Selection and Beamforming Algorithms for Physical Layer Multicasting with Massive Antennas", MDPI, Algorithms 2016, vol. 9, Issue 2, 2016, 1-9.

Wang, Zhi-Heng , et al., "System Modeling and Performance Optimization for the Power Saving Strategy of DRX in LTE", LTE DRX, College of Computer Science and Technology, Dec. 16, 2014, 1-9.

\* cited by examiner

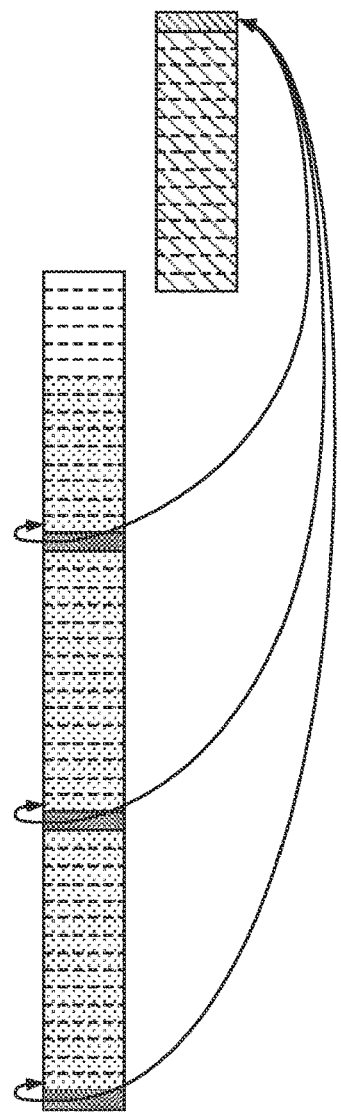
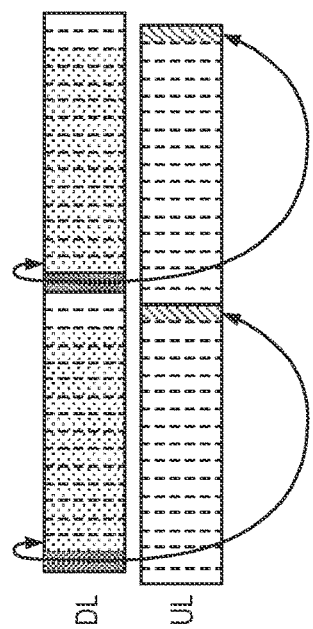
FIG. 33
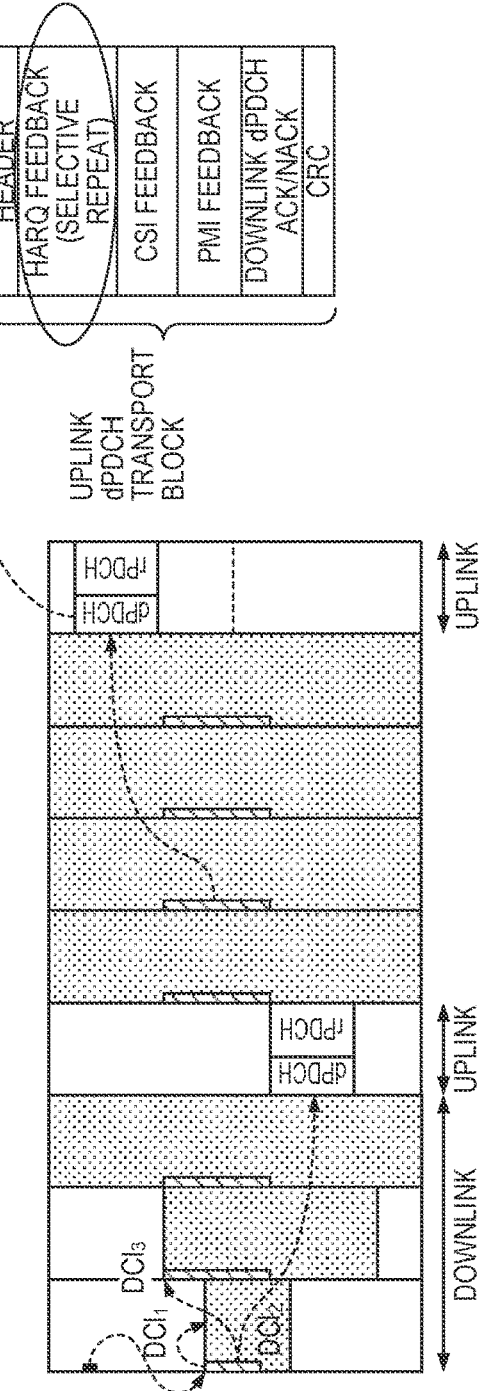
FIG. 34

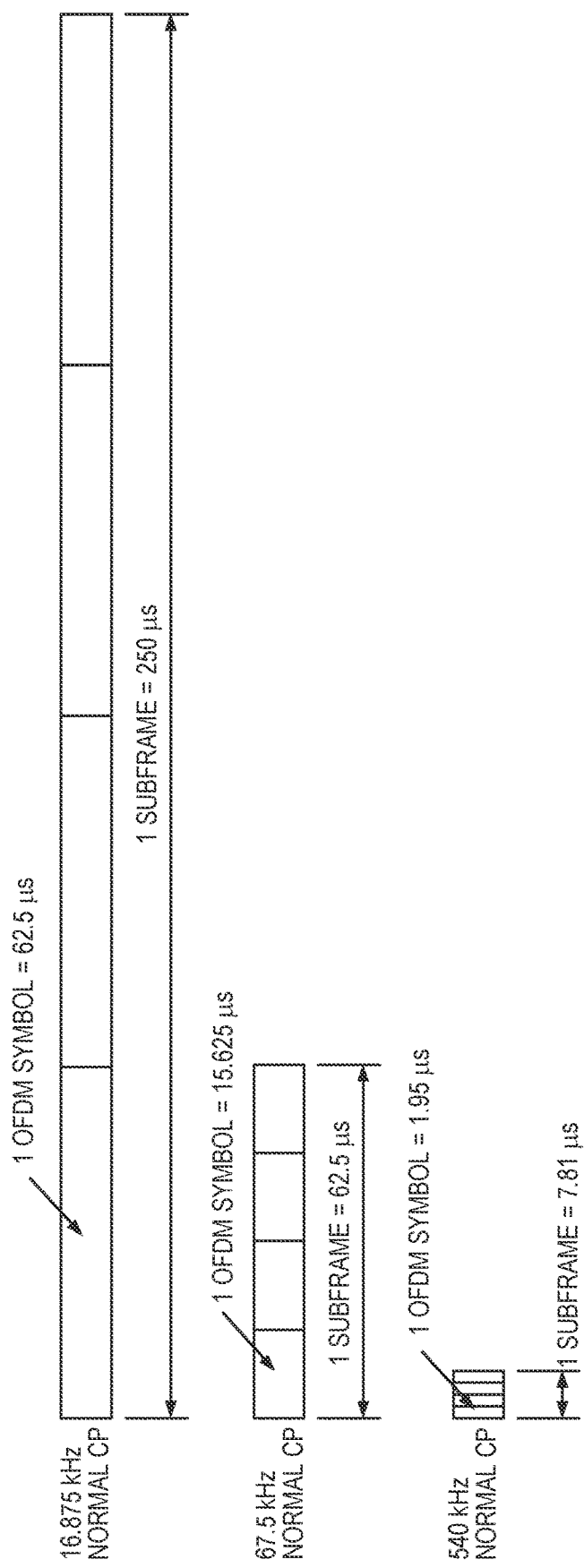
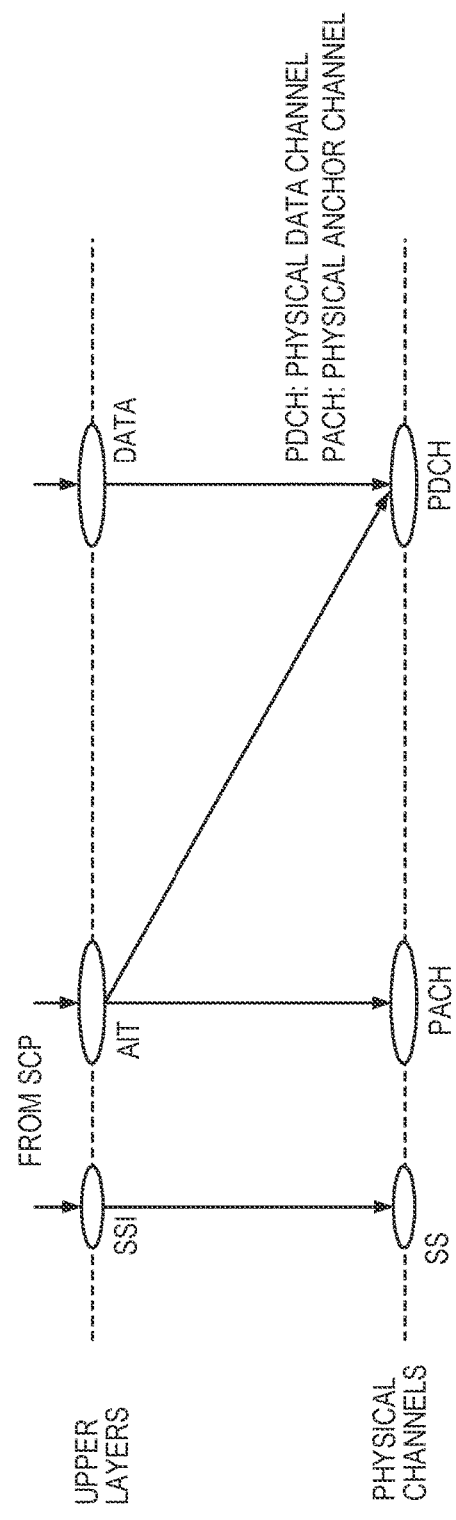
FIG. 53
FIG. 54

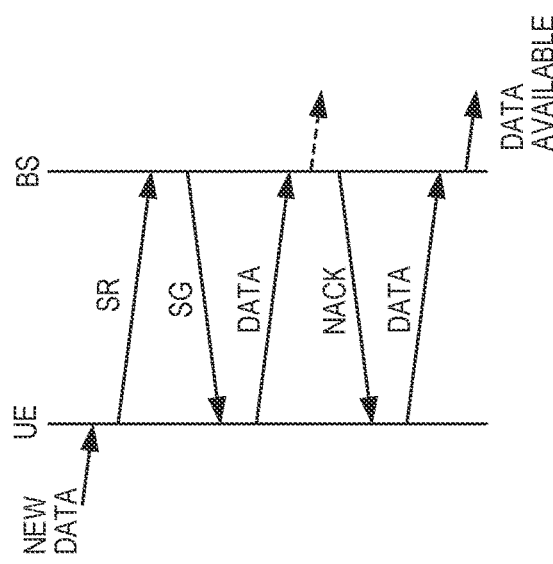

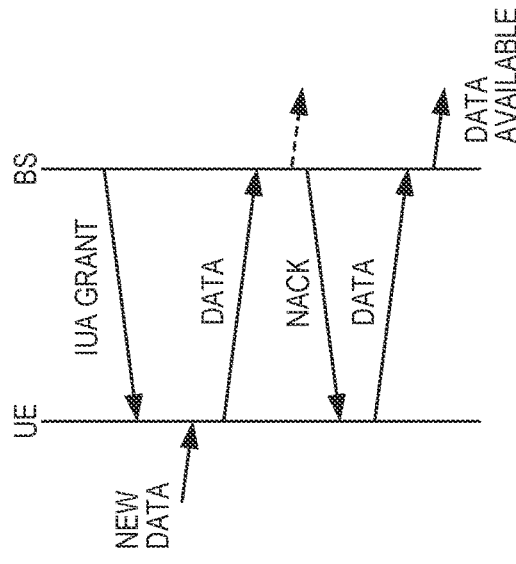

SCHEDULED TRANSMISSION

| COMPONENT | DESCRIPTION | SUBFRAME (OPTIMAL) | SUBFRAME (RELAXED) |
|---|---|---|---|
| 1 | DATA IS AVAILABLE JUST AFTER START OF SUBFRAME N | | |
| 2 | SCHEDULING REQUEST (SR) | N+1 | N+1 |
| 3 | TRANSMISSION OF SCHEDULING GRANT (SG) | N+2 | N+3 |
| 4 | TRANSMISSION OF UL DATA | N+3 | N+5 |
| 5 | TRANSMISSION OF ACK/NACK | N+4 | N+7 |
| 6 | RETRANSMISSION OF UL DATA | N+5 | N+9 |
| | TOTAL DELAY UNACKNOWLEDGED DATA | 4 SUBFRAMES | 6 SUBFRAMES |
| | TOTAL DELAY INCLUDING k RETRANSMISSIONS | $4 + 2*k$ SUBFRAMES | $6 + 4*k$ SUBFRAMES |

FIG. 74

IUA TRANSMISSION

| COMPONENT | DESCRIPTION | SUBFRAME (OPTIMAL) | SUBFRAME (RELAXED) |
|---|---|---|---|
| 1 | DATA IS AVAILABLE JUST AFTER START OF SUBFRAME N | | |
| 2 | TRANSMISSION OF UL DATA | N+1 | N+1 |
| 3 | TRANSMISSION OF ACK/NACK | N+2 | N+3 |
| 4 | RETRANSMISSION OF UL DATA | N+3 | N+5 |
| | TOTAL DELAY UNACKNOWLEDGED DATA | 2 SUBFRAMES | 2 SUBFRAMES |
| | TOTAL DELAY INCLUDING k RETRANSMISSIONS | $2 + 2*k$ SUBFRAMES | $2 + 4*k$ SUBFRAMES |

FIG. 75

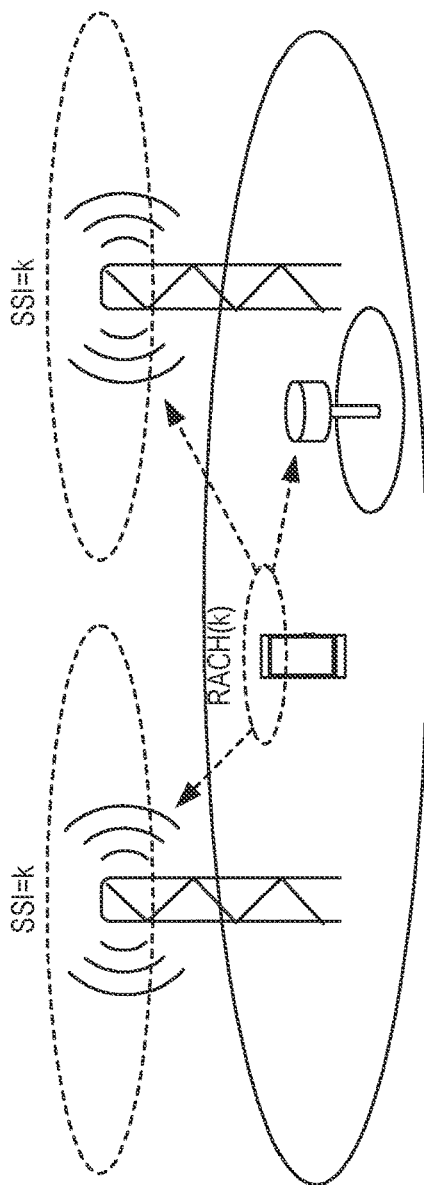
FIG. 87
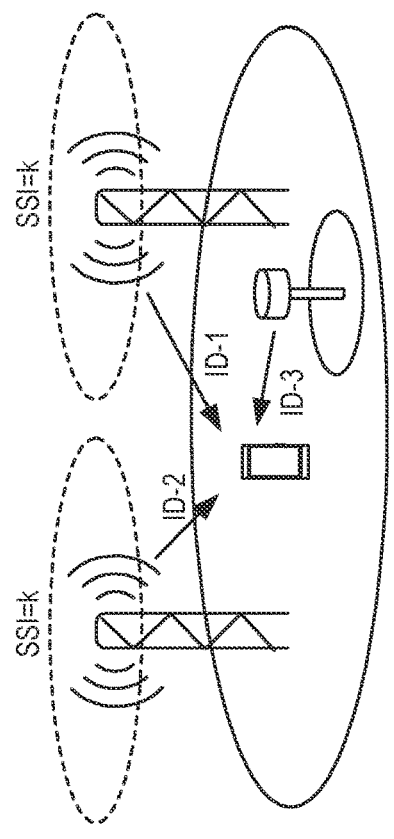
FIG. 88
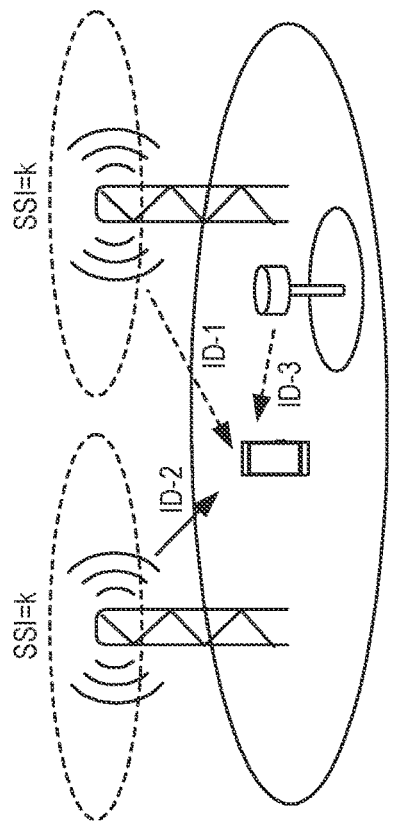

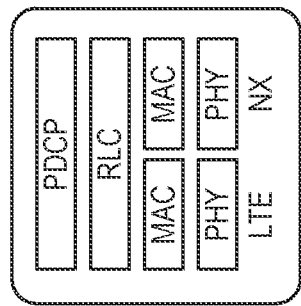
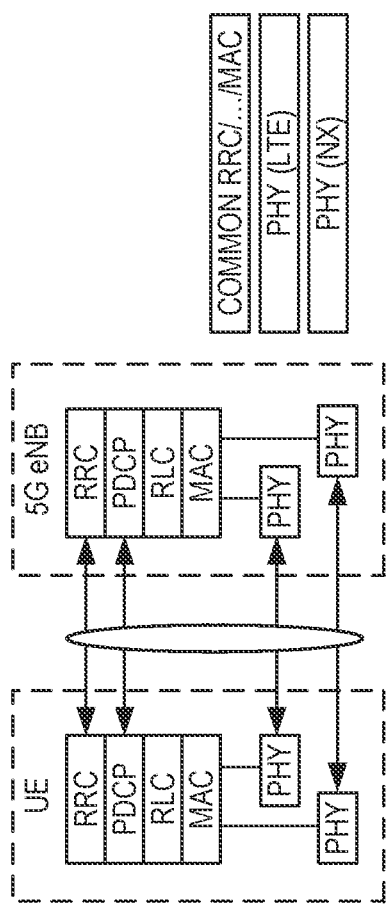
FIG. 122
FIG. 123
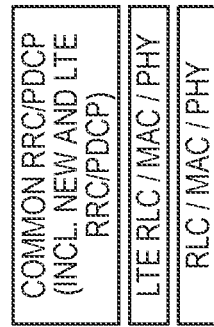
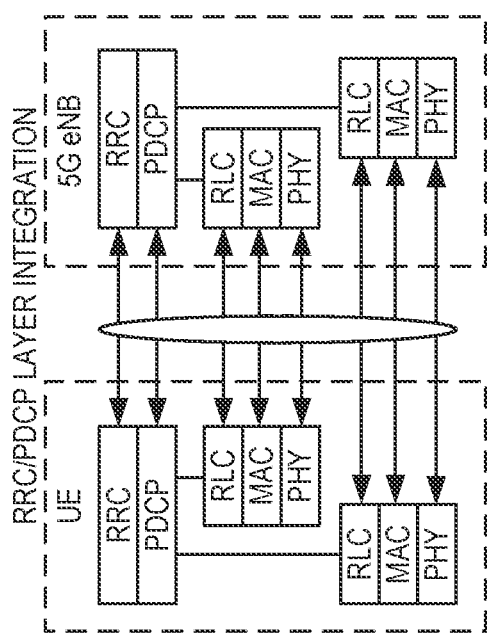
FIG. 124
FIG. 125

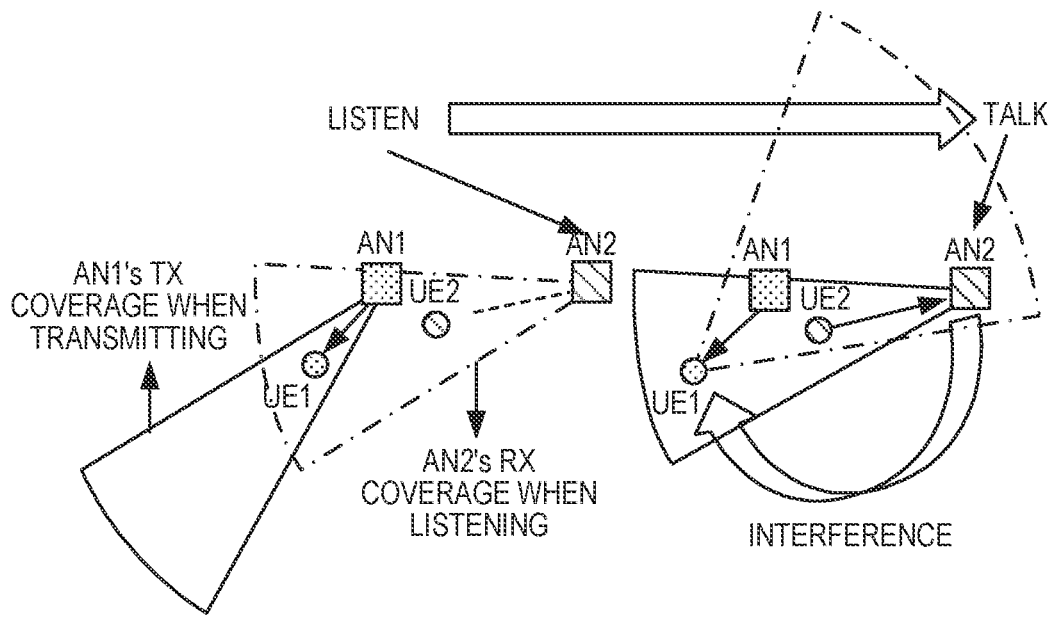
A) HIDDEN NODE PROBLEM
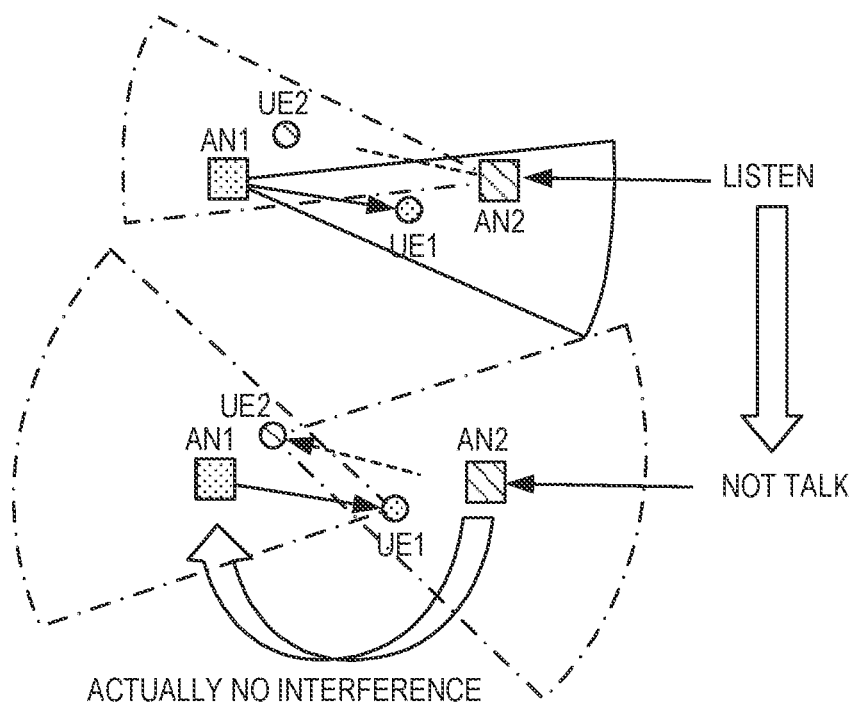
B) EXPOSED NODE PROBLEM
*FIG. 128*

| USE CASE | STATUS IN 3GPP | NX REQUIREMENT |
|---|---|---|
| UNICAST IN NX COVERAGE (IN NX LICENSED SPECTRUM) (USE CASE 1) | - NOTHING IN 3GPP<br>- FRA/LIGER CONCEPT AVAILABLE | UNICAST D2D IN CELLULAR SPECTRUM SHOULD BE SUPPORTED |
| GROUP-CAST/BROADCAST IN NX COVERAGE (IN NX LICENSED SPECTRUM) (USE CASE 1) | - AVAILABLE IN 3GPP<br>- LIGER CONCEPT AVAILABLE | (PROPRIETARY) PERFORMANCE ENHANCEMENTS (IN TERMS OF SE/EE/DELAY/RELIABILITY/...) |
| D2D (UE-TO-UE) BASED RELAYING (USE CASE 2) | - AVAILABLE IN 3GPP (R13 ON-GOING)<br>- LIGER CONCEPT AVAILABLE | (PROPRIETARY) PERFORMANCE ENHANCEMENTS (IN TERMS OF SE/EE/DELAY/RELIABILITY/...) |
| COOPERATIVE DEVICES IN NX COVERAGE (USE CASE 3) | - UNAVAILABLE IN 3GPP<br>- NO INTERNAL CONCEPT | RESEARCH ON SOME IDEAS IS ONGOING TO EVALUATE POTENTIAL GAINS. REQUIREMENTS ARE NOT SPECIFIED |
| D2D ADHOC NW OUTSIDE NX COVERAGE (USE CASE 4) | - AVAILABLE IN 3GPP (FOR GROUP BROAD-CAST, NO UE-UE RELAY)<br>- FRA/LIGER CONCEPT AVAILABLE (UE-UE RELAY ONLY IN FRA) | (PROPRIETARY) PERFORMANCE ENHANCEMENTS (IN TERMS OF SE/EE/DELAY/RELIABILITY/...) |

*FIG. 160*

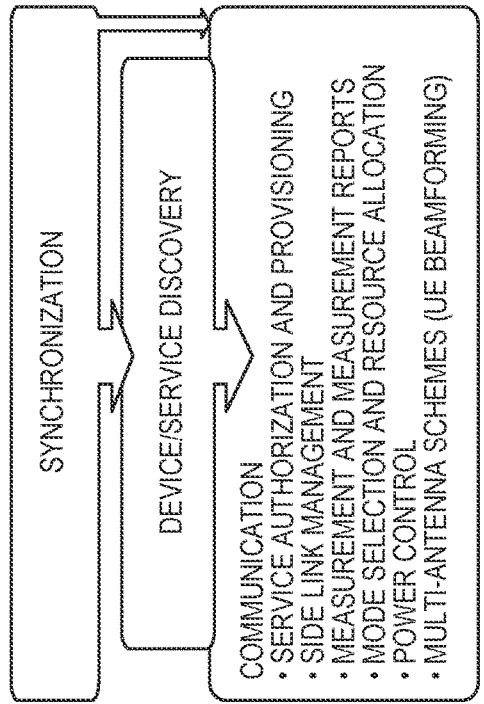

FIG. 168

| SIDELINK MANAGEMENT FUNCTION (EXAMPLE) | REQUIREMENT | COMMENT |
|---|---|---|
| TRIGGER BROADCAST DISCOVERY (ANNOUNCING/INQUIRY) BEACONS | IN-COVERAGE, OUT-OF-COVERAGE, PARTIAL COVERAGE (IN TERMS OF ANNOUNCING AND DISCOVERY UE) SHOULD BE SUPPORTED | THE TIME/FREQUENCY RESOURCES AND OTHER CONFIGURATION PARAMETERS CAN BE PROVISIONED (PRECONFIGURED) OR DYNAMICALLY ALLOCATED |
| ESTABLISH SIDELINK SHARED CHANNEL WITH A SPECIFIC PEER UEs (e.g., UE3-UE4) | IN-COVERAGE, OUT-OF-COVERAGE, PARTIAL COVERAGE (FOR EITHER OF THE UEs) SHOULD BE SUPPORTED SIDELINK "ADMISSION CONTROL" CAN BE EXERCISED BY THE NW | ADMISSION CONTROL FOR SIDELINK SHOULD BE POSSIBLE WHEN UNDER NW COVERAGE AND USING "CELLULAR RESOURCES" (OWNED BY eNB) |
| TRIGGER BROADCASTING/MULTICASTING TO A SET OF PEER UEs | IN-COVERAGE, OUT-OF-COVERAGE, PARTIAL COVERAGE (FOR ANY BROADCAST MEMBER) SHOULD BE SUPPORTED | MULTICAST GROUP CONTROL BY NW AND MULTICASTING UE SHOULD BE SUPPORTED |

FIG. 169

| MEASUREMENT PURPOSE | WHAT SIGNAL TO MEASURE ON | WHERE TO REPORT |
|---|---|---|
| SYNCHRONIZATION | SYNCH SIGNALS | |
| DISCOVER PEER DEVICES | DISCOVERY BEACONS | • eNB<br>• HIGHER LAYER<br>• PEER UE |
| MODE SELECTION AND RESOURCE (POOL) ALLOCATION | DISCOVERY BEACONS AND D2D/NX REFERENCE SIGNALS | • eNB<br>• HIGHER LAYER<br>• PEER UE |
| RESOURCE ALLOCATION WITHIN RESOURCE POOL | D2D/NX REFERENCE SIGNALS | • HIGHER LAYER<br>• PEER UE |
| POWER CONTROL | D2D/NX REFERENCE SIGNALS | |
| DEMODULATION (CSIR) | "DMRS" | |
| PRECODER SELECTION (CSIT) | "DMRS" | |

*FIG. 170*

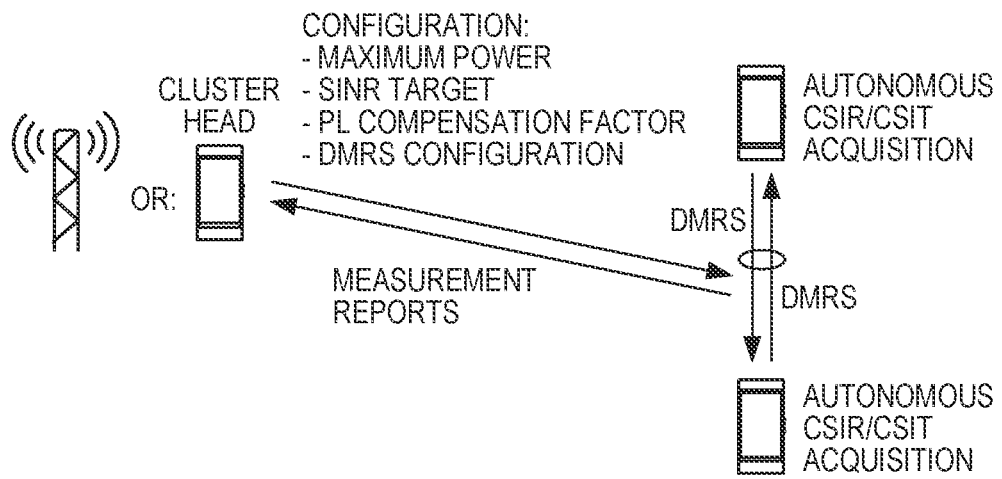

PL: PATH LOSS
CSIR: CHANNEL STATE INFORMATION AT THE RECEIVER
CSIT: CHANNEL STATE INFORMATION AT THE TRANSMITTER

*FIG. 171*

NETWORK ARCHITECTURE, METHODS, AND DEVICES FOR A WIRELESS COMMUNICATIONS NETWORK

TECHNICAL FIELD

The present disclosure is related to wireless communications networks and describes network architecture, wireless devices, and wireless network nodes suitable for, but not limited to, a fifth-generation (5G) wireless communications network.

BACKGROUND

There are three main challenges that need to be addressed by a so-called 5G wireless communication system to enable a truly "networked society," where information can be accessed and data shared anywhere and anytime, by anyone and anything. These are:

A massive growth in the number of connected devices.
A massive growth in traffic volume.
An increasingly wide range of applications with varying requirements and characteristics.

To handle massive growth in traffic volume, wider frequency bands, new spectrum, and in some scenarios denser deployment are needed. Most of the traffic growth is expected to be indoor and thus indoor coverage is important.

New spectrum for 5G is expected to be available after 2020. The actual frequency bands, and the amount of spectrum, have not yet been identified. The identification of frequency bands above 6 GHz for mobile telecommunications will be handled in the World Radiocommunications Conference in 2019 (WRC-19). New frequency bands below 6 GHz for mobile telecommunications are handled in WRC-15. Eventually, all mobile telecommunications bands, from below 1 GHz, up to as high as 100 GHz, could potentially become candidates for 5G. However, it is expected that the first commercial deployment of 5G will happen in frequency bands close to 4 GHz, and that 28 GHz deployments will come later.

The International Telecommunication Union (ITU) has outlined a vision for 5G, which it will refer to as "IMT-2020," providing a first glimpse of potential scenarios, use cases and related ITU requirements that eventually will define 5G.

The 3rd Generation Partnership Project (3GPP) has begun its journey towards 5G, with a 5G workshop held in September 2015. A study item on channel modelling for spectrum above 6 GHz has been approved. Development of specifications for 5G in 3GPP is likely to be split across multiple releases, with two phases of normative work. Phase 1 is expected to be completed in the second half of 2018. It will fulfil a subset of the complete set of requirements and target the need for early commercial deployments in 2020 expressed by some operators. Phase 2, targeted for completion by the end of 2019, will meet all identified requirements and use cases.

SUMMARY

Embodiments of the various techniques, devices, and systems disclosed herein include wireless devices and methods carried out by such devices. An example of such a method includes receiving a downlink signal comprising an uplink access configuration index, using the uplink access configuration index to identify an uplink access configuration from among a predetermined plurality of uplink access configurations, and transmitting to the wireless communications network according to the identified uplink access configuration. The method also includes receiving, in a first subframe, a first OFDM transmission formatted according to a first numerology and receiving, in a second subframe, a second OFDM transmission formatted according to a second numerology, the second numerology differing from the first numerology. The first OFDM transmission may have a numerology according to the 3GPP specifications for LTE, for example.

The first and second numerologies may comprise subframes of first and second subframe lengths, respectively, where the first subframe length differs from the second subframe length. The first numerology may also have a first subcarrier spacing and the second numerology may have a second subcarrier spacing, where the first subcarrier spacing differs from the second subcarrier spacing.

The method may further include receiving and processing first Layer 2 data on a first physical data channel and receiving and processing second Layer 2 data on a second physical data channel. The receiving and processing of the first Layer 2 data comprises the use of soft HARQ combining, and the receiving and processing of the second Layer 2 data comprises no soft HARQ combining. This may include using a common set of demodulation reference signals for receiving both the first and second Layer 2 data.

In some cases, a single RRC approach may be used. For example, the method in a wireless device may further include processing data from the first OFDM transmission using a first MAC protocol layer and processing data from the second OFDM transmission using a second MAC protocol layer, where the first MAC protocol layer differs from the second MAC protocol layer. The method may further include processing messages received from each of the first and second MAC protocol layers using a single, common RRC protocol layer.

In some cases, a dual RRC approach may be used. In this case, the method in the wireless device further includes processing data from the first OFDM transmission using a first MAC protocol layer and processing data from the second OFDM transmission using a second MAC protocol layer, where the first MAC protocol layer differs from the second MAC protocol layer. The method may further include processing messages received via the first MAC protocol layer using a first RRC protocol layer and processing messages received via the second MAC protocol layer using a second RRC protocol layer, where the first RRC protocol layer differs from the second RRC protocol layer. At least a first one of the first and second RRC protocol layers is configured to pass selected RRC messages to the other one of the first and second RRC protocol layers. The selected RRC messages are RRC messages received and processed by the first one of the first and second RRC protocol layers but targeted for the other one of the first and second RRC protocol layers.

The method in the wireless device may further include transmitting third Layer 2 data on a third physical data channel and transmitting fourth Layer 2 data on a fourth physical data channel. The transmitting of the third Layer 2 data comprises the use of a HARQ process supporting soft combining, and the transmitting of the fourth Layer 2 data comprises no HARQ process.

In some cases, the method includes operating in a connected mode for one or more first intervals and operating in a dormant mode for one or more second intervals, where the first and second OFDM transmissions are performed in the connected mode. Operating in the dormant mode comprises monitoring signals carrying tracking area identifiers, comparing tracking area identifiers received during the monitoring with a tracking area identifier list, and notifying the wireless communication network in response to determining that a received tracking area identifier is not on the list but otherwise refraining from notifying the wireless communication network in response to receiving changing tracking area identifiers.

The method in the wireless device may include transmitting, to the wireless communications network, a capability pointer, the capability pointer identifying a set of capabilities, for the wireless device, stored in the wireless communications network. The method may include transmitting to the wireless communications network using a contention-based access protocol. The contention-based access protocol may comprise a listen-before-talk (LBT) access mechanism.

The method in the wireless device may further include measuring a first mobility reference signal on a first received beam and measuring a second mobility reference signal on a second received beam, where the second mobility reference signal differs from the first mobility reference signal. The method may further include reporting results of measuring the first and second mobility reference signals to the wireless communications network. The method may also include receiving, in response to reporting the results, a command to switch from receiving data on a current downlink beam to receiving data on a different downlink beam. The method may include receiving a timing advance value for application to the different downlink beam.

Other embodiments of the various techniques, devices, and systems disclosed herein include radio network equipment and methods carried out by one or more instances of such radio network equipment. An example of such a method includes transmitting a first downlink signal comprising an uplink access configuration index, the uplink access configuration index identifying an uplink access configuration from among a plurality of predetermined uplink access configurations, and subsequently receiving a transmission from a first wireless device according to the identified uplink access configuration. The method also includes transmitting, in a first subframe, a first OFDM transmission formatted according to a first numerology and transmitting, in a second subframe, a second OFDM transmission formatted according to a second numerology, the second numerology differing from the first numerology.

In some cases, the transmitting of the first downlink signal is performed by a first instance of radio network equipment, while the transmitting of the first and second OFDM transmissions is performed by a second instance of radio network equipment. The first OFDM transmission may have a numerology according to the specifications for LTE, for example.

The first and second numerologies may comprise subframes of first and second subframe lengths, respectively, where the first subframe length differs from the second subframe length. The first numerology may have a first subcarrier spacing and the second numerology may have a second subcarrier spacing, where the first subcarrier spacing differs from the second subcarrier spacing.

The method carried out by radio network equipment may include transmitting a second downlink signal comprising an access information signal, the access information signal indicating a plurality of uplink access configurations, where the uplink access configuration index identifies one of the plurality of uplink access configurations. The transmitting of the second downlink signal may be performed by a third instance of radio network equipment.

In some cases, the method in the radio network equipment includes processing and transmitting first Layer 2 data on a first physical data channel and processing and transmitting second Layer 2 data on a second physical data channel. The processing and transmitting of the first Layer 2 data comprises the use of a HARQ process supporting soft combining, and the processing and transmitting of the second Layer 2 data comprises no HARQ process. The transmitting of the first and second Layer 2 data may be performed using a common antenna port, where the method further includes transmitting a common set of demodulation references, using the common antenna port, for use in receiving both the first and second Layer 2.

The method in the radio network equipment may include receiving and processing third Layer 2 data on a third physical data channel and receiving and processing fourth Layer 2 data on a fourth physical data channel, where the receiving and processing of the third Layer 2 data comprises the use of soft HARQ combining and the receiving and processing of the fourth Layer 2 data comprises no soft HARQ combining.

In some cases, the transmitting of the first and second OFDM transmissions may be performed by one instance of the radio network equipment, where the method further includes processing data for the first OFDM transmission using a first MAC protocol layer and processing data for the second OFDM transmission using a second MAC protocol layer, the first MAC protocol layer differing from the second MAC protocol layer. The method may further include, processing messages to be transported by each of the first and second MAC protocol layers, using a single, common RRC protocol layer.

In other cases, the transmitting of the first and second OFDM transmissions is performed by one instance of the radio network equipment, where the method further includes processing data for the first OFDM transmission using a first MAC protocol layer and processing data for the second OFDM transmission using a second MAC protocol layer, the first MAC protocol layer differing from the second MAC protocol layer. The method in some embodiments further includes processing messages to be transported by the first MAC protocol layer, using a first RRC protocol layer, and processing messages to be transported by the second MAC protocol layer, using a second RRC protocol layer, where the first RRC protocol layer differs from the second RRC protocol layer. At least a first one of the first and second RRC protocol layers is configured to pass selected RRC messages to the other one of the first and second RRC protocol layers, the selected RRC messages being RRC messages received and processed by the first one of the first and second RRC protocol layers but targeted for the other one of the first and second RRC protocol layers.

The method in the radio network equipment may further include receiving, from a second wireless device, a capability pointer, the capability pointer identifying a set of capabilities for the second wireless device, and retrieving the set of capabilities for the second wireless device, from a database of stored capabilities for a plurality of wireless devices, using the received capability pointer.

The method in the radio network equipment may include transmitting to a third wireless device, using a contention-based protocol. The contention-based access protocol may comprise an LBT access mechanism.

In some embodiments, the method in the radio network equipment includes receiving a random access request message from a fourth wireless device, via an uplink beam formed using multiple antennas at the radio network equipment, estimating an angle-of-arrival corresponding to the random access request message and transmitting a random access response message, using a downlink beam formed using multiple antennas at the radio network equipment. Forming the downlink beam is based on the estimated angle-of-arrival. The uplink beam may be a swept uplink beam. A width of the downlink beam may be based on an estimated quality of the estimated angle-of-arrival.

The method in the radio network equipment may include serving a fifth wireless device, where serving the fifth wireless device comprises sending data from the fifth wireless device to a first network node or first set of network nodes, according to a first network slice identifier associated with the fifth wireless device. The method may also include serving a sixth wireless device, where serving the sixth wireless device comprises sending data from the sixth wireless device to a second network node or second set of network nodes, according to a second network slice identifier associated with the sixth wireless device. The second network slice identifier differs from the first network slice identifier, and the second network node or second set of network nodes differs from the first network node or first set of network nodes.

Other embodiments detailed herein include wireless devices, radio network equipment, and systems configured to carry out one or more of the methods summarized above and/or one or more of the numerous other techniques, procedures, and methods described herein, as well as computer program products and computer-readable media embodying one or more of these methods, techniques, and procedures.

Certain embodiments of the present disclosure may provide one or more technical advantages. For example, some embodiments may provide support for higher frequency bands, compared to conventional wireless systems, with wider carrier bandwidth and higher peak rates, e.g., using new numerologies, as detailed below. Some embodiments may provide support for lower latencies, through the use of shorter and more flexible Transmission Time Intervals (TTIs), new channel structures, etc. Some embodiments may provide support for very dense deployments, energy efficient deployments and heavy use of beam forming, enabled by, for example, removing legacy limitations in relation to CRS, PDCCH, etc. Finally, some embodiments provide support for new use cases, services and customers such as MTC scenarios including V2X, etc., e.g., through more flexible spectrum usage, support for very low latency, higher peak rates etc. Various combinations of the techniques described herein may provide these and/or other advantages in a complementary and synergistic way to achieve all or some of the ITU-2020 requirements. Other advantages may be readily available to one having skill in the art. Certain embodiments may have none, some, or all of the recited advantages.

BRIEF DESCRIPTION OF THE FIGURES

FIG. 33 shows an example where fast HARQ feedback is transmitted at the end of the first available UL transmission occasion.

FIG. 34 shows the transmitting of polled HARQ feedback reports.

FIG. 53 illustrates example numerologies.

FIG. 54 shows AIT mapping to physical channels.

FIG. 74 shows uplink radio-access network latency for dynamic scheduling.

FIG. 75 illustrates achievable uplink latency with instant uplink access.

FIG. 87 illustrates random access preamble transmission.

FIG. 88 shows random access response transmission.

FIG. 120 illustrates several network scenarios.

FIG. 121 shows several UE types.

FIG. 122 illustrates MAC layer integration.

FIG. 123 shows RLC layer integration.

FIG. 124 shows PDCP layer integration.

FIG. 125 illustrates LTE-NX tight integration, built on RRC layer integration.

Figure 126:
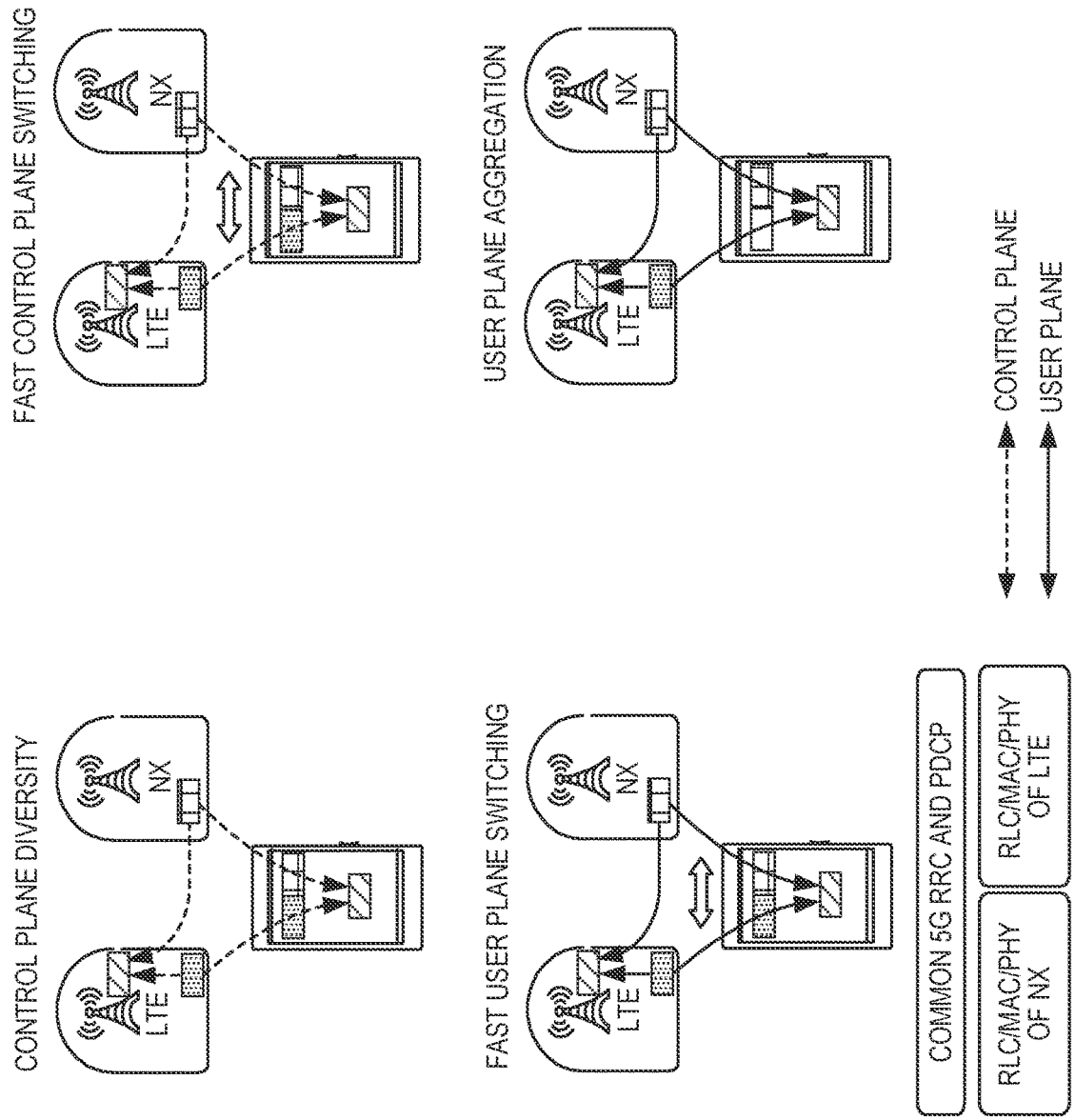

FIG. 126 provides a summary of tight integration features.

Figure 127:
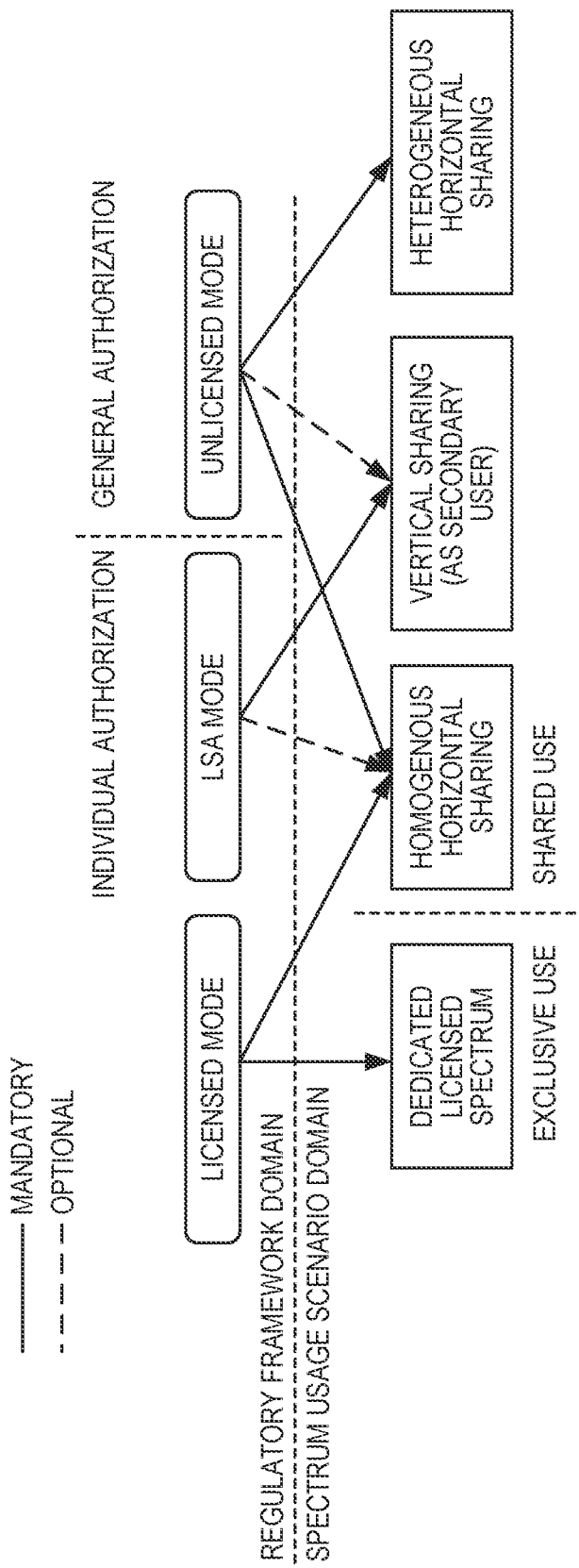

FIG. 127 shows spectrum types and related usage scenarios for NX.

FIG. 128 illustrates problems with directional listen-before-talk.

Figure 129:
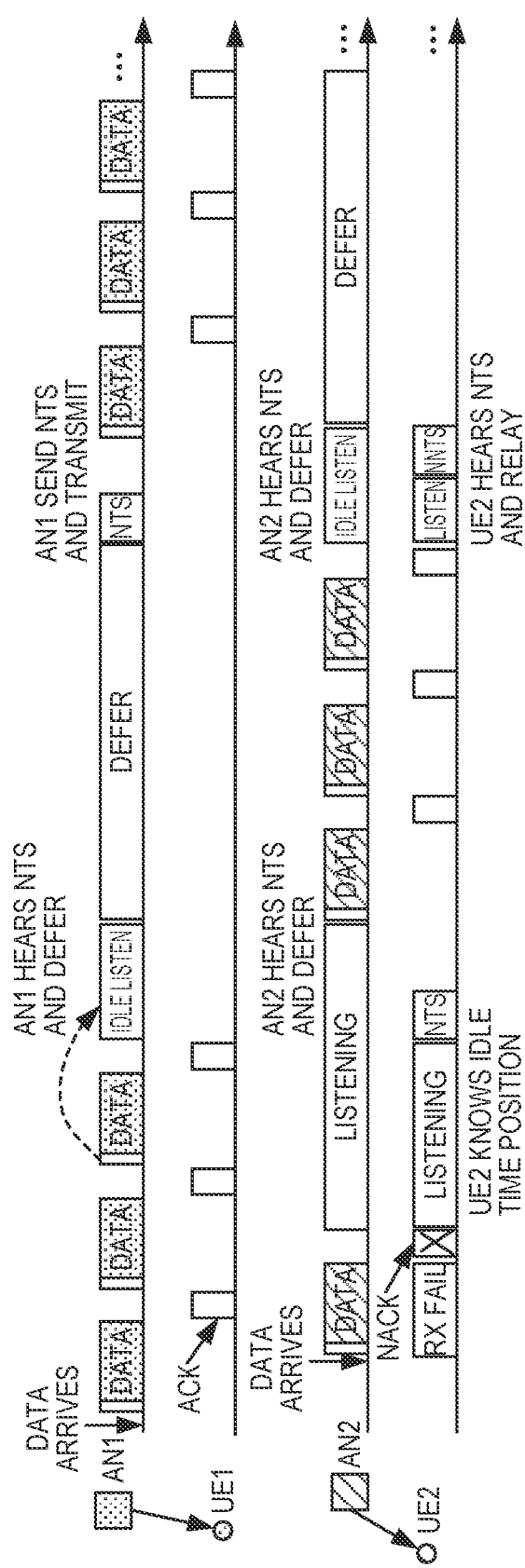

FIG. 129 illustrates an example of a listen-after-talk mechanism.

Figure 130:
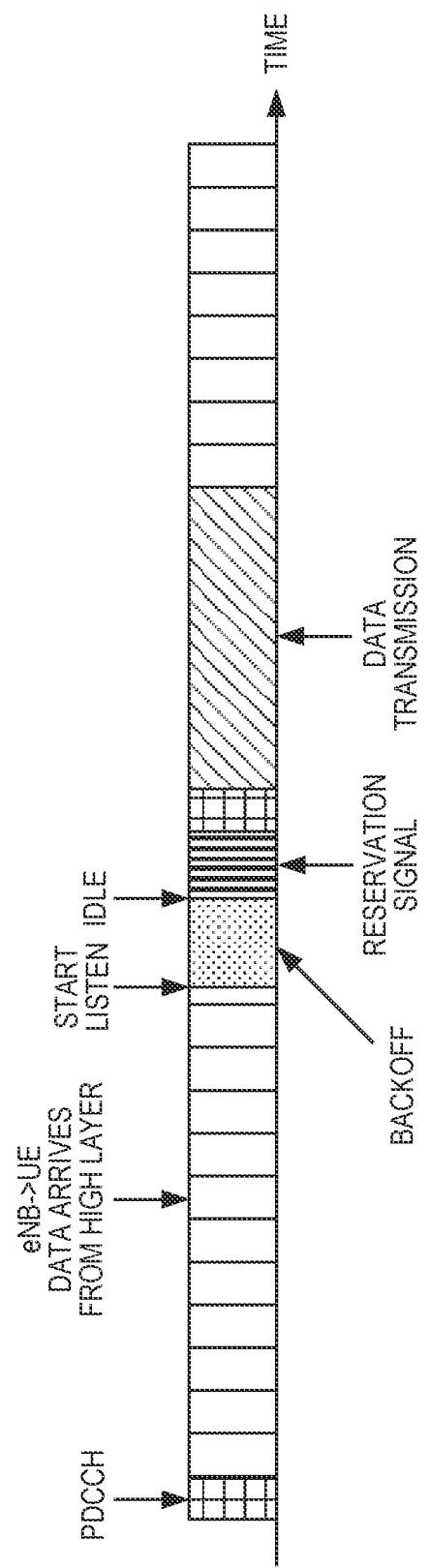

FIG. 130 shows a PDCH-carried downlink data transmission.

Figure 131:
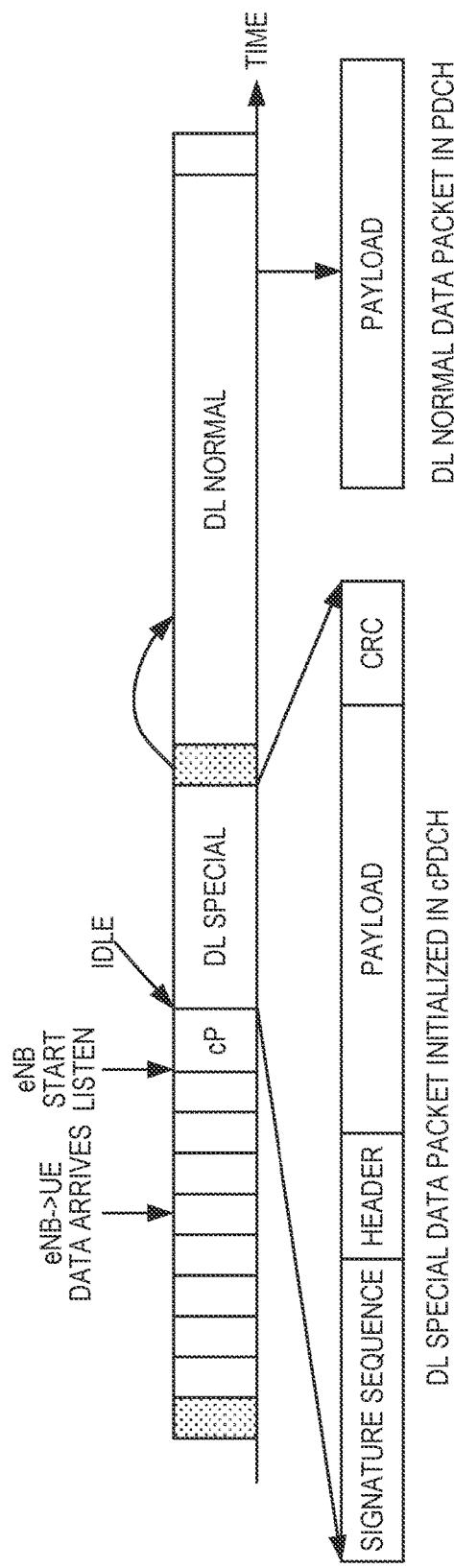

FIG. 131 illustrates an example downlink data transmission.

Figure 132:
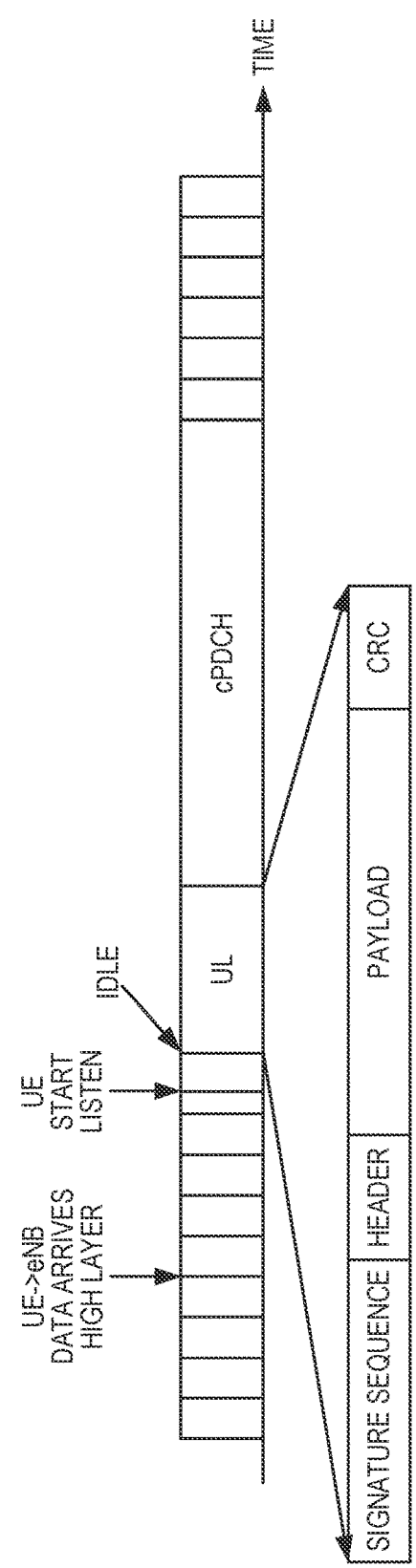

FIG. 132 depicts an example uplink data transmission in cPDCH.

Figure 133:
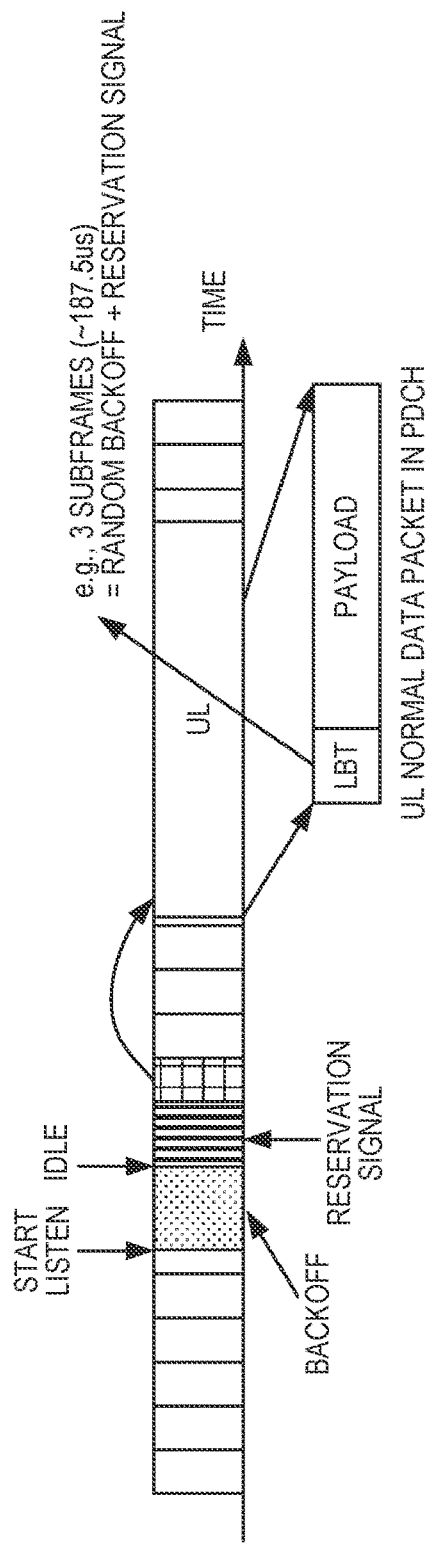

FIG. 133 illustrates an example uplink data transmission in PDCH.

Figure 134:
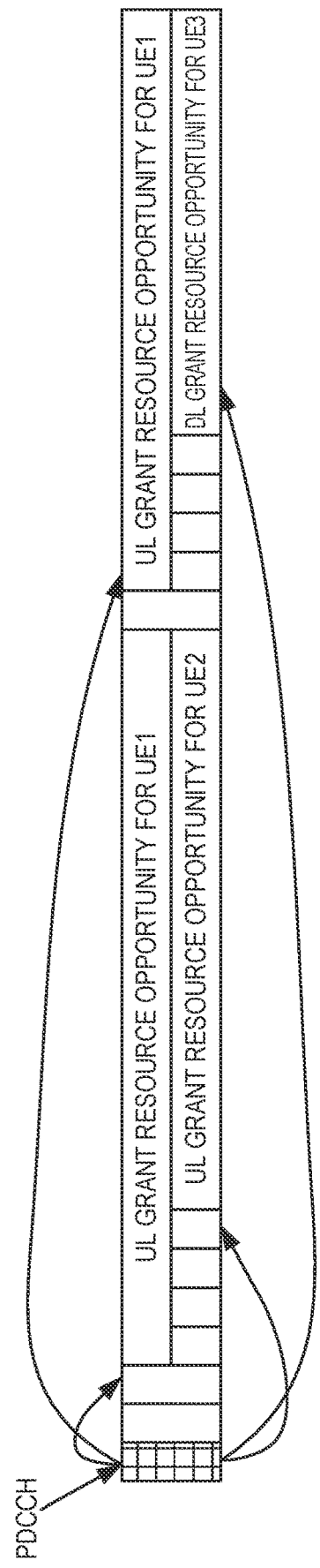

FIG. 134 shows coupling between downlink and uplink grants.

Figure 135:
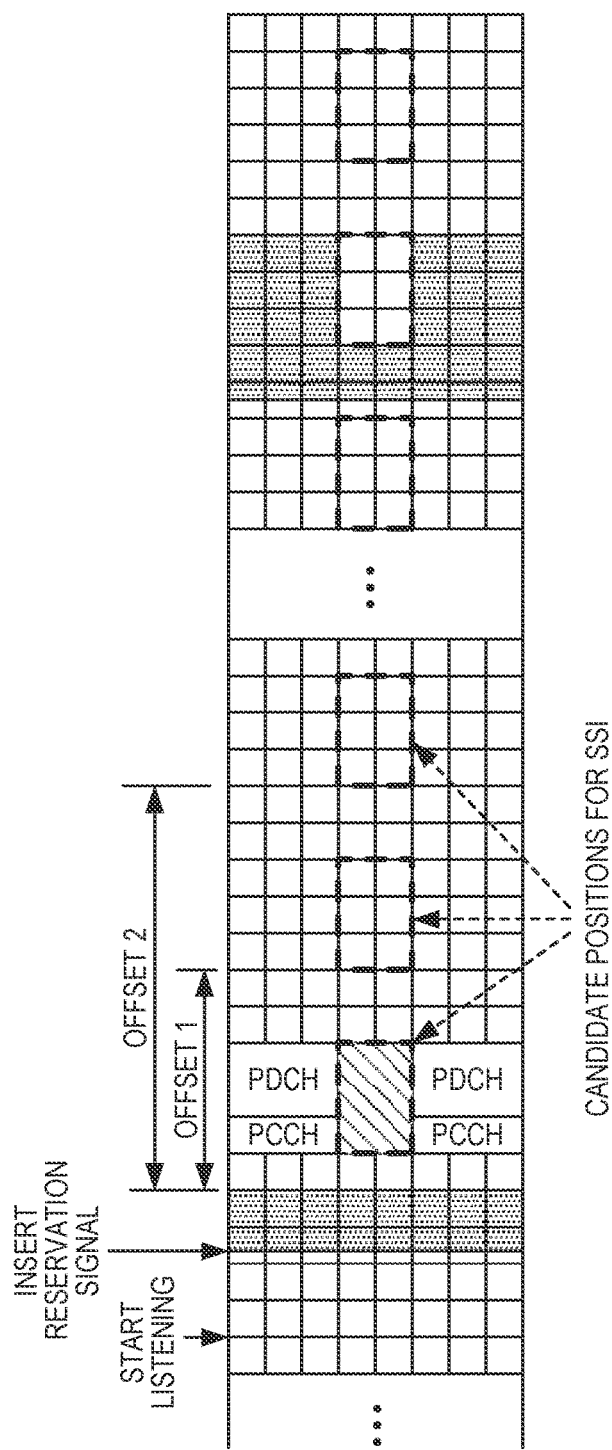

FIG. 135 illustrates an example of SSI transmission.

Figure 136:
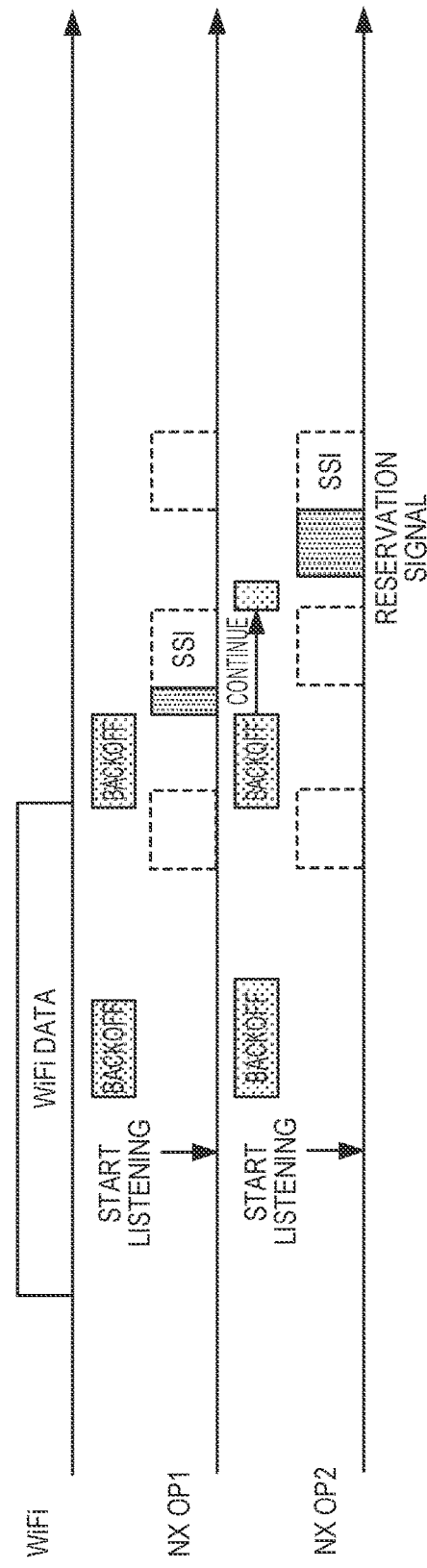

FIG. 136 illustrates an example of SSI transmission contention.

Figure 137:
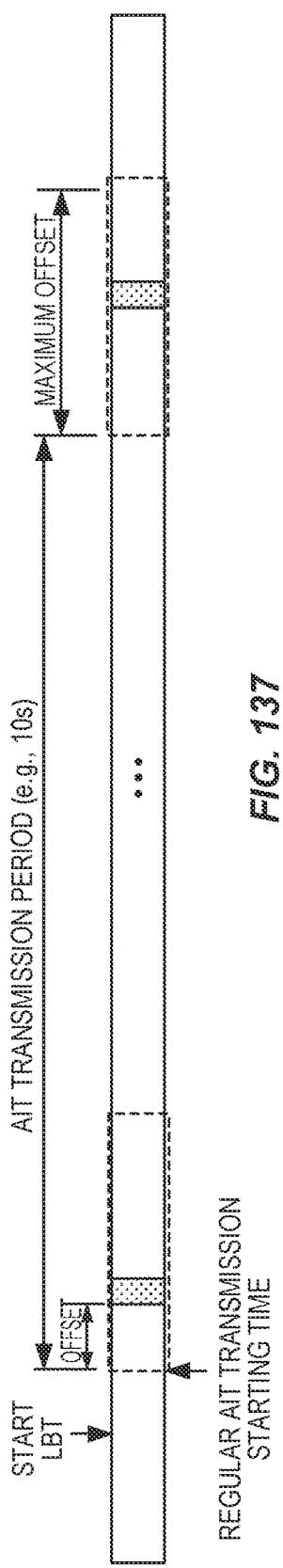

FIG. 137 shows an example of AIT transmission.

Figure 138:
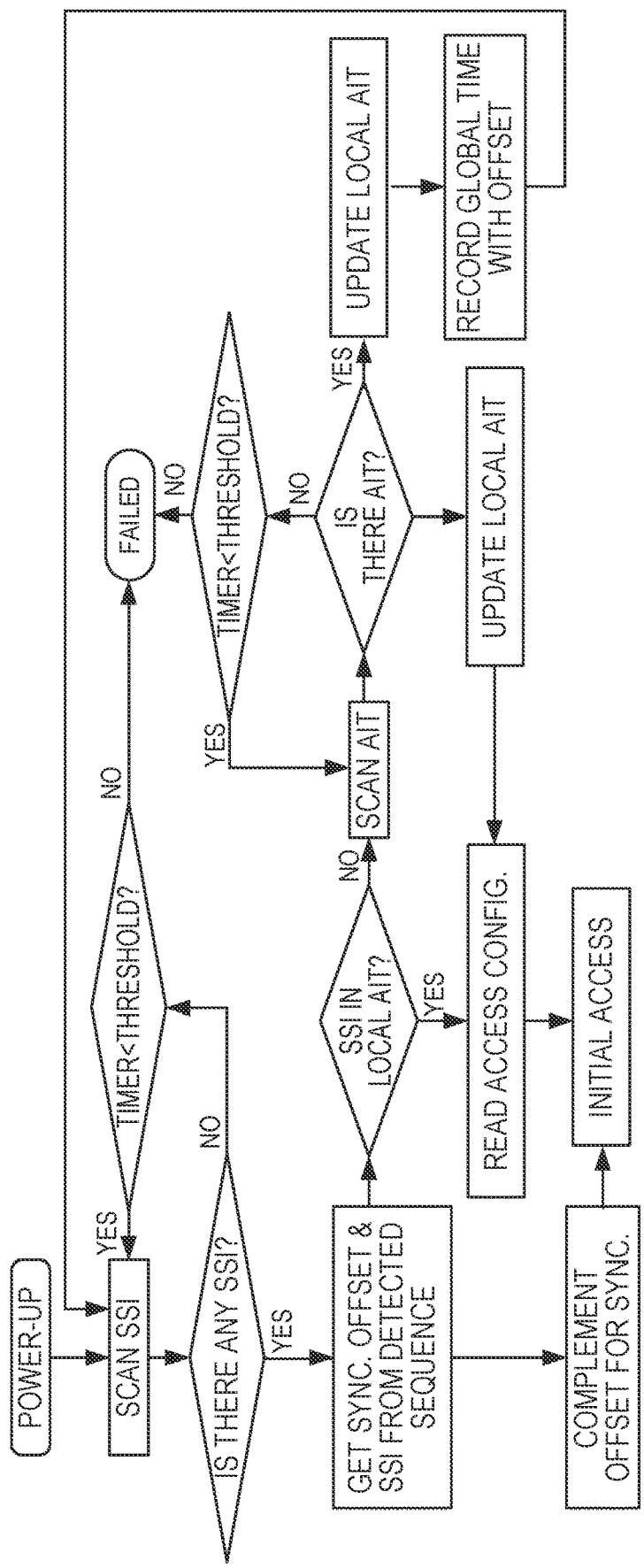

FIG. 138 is a process flow diagram illustrating a UE access procedure in shared spectrum.

Figure 139:
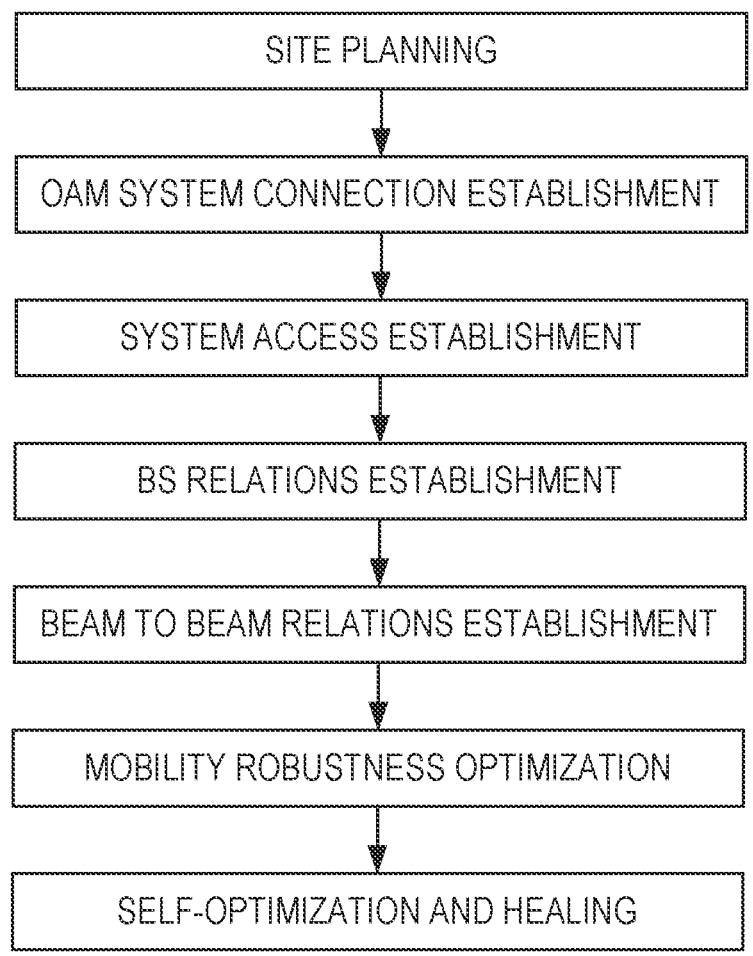

FIG. 139 is a process flow diagram illustrating management and automation tasks for base station introduction.

Figure 140:
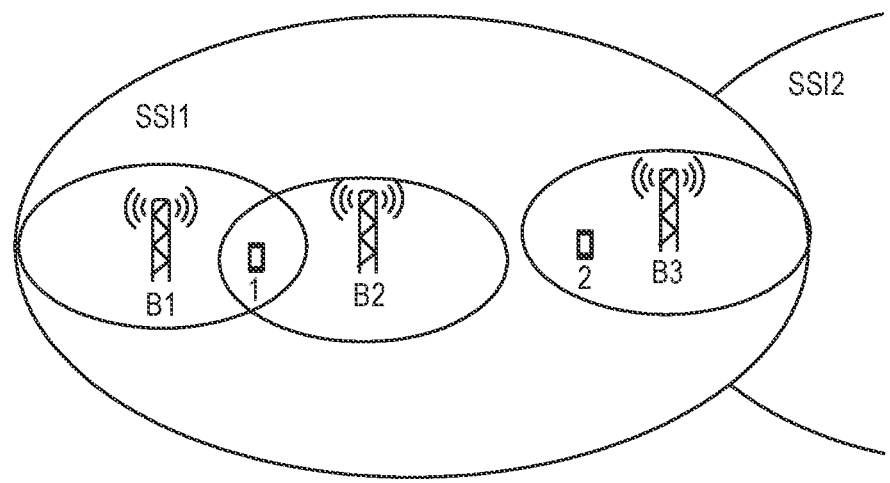

FIG. 140 shows two system access regions with overlap, and nodes within one system access region with and without overlap.

Figure 141:
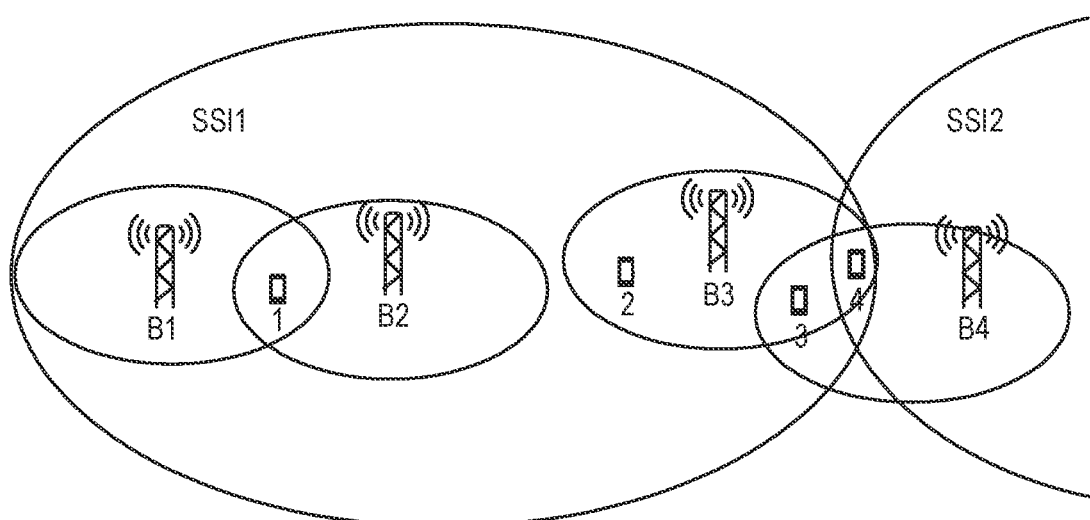

FIG. 141 illustrates UE BSID retrieval from a non-serving BS, to support automatic BS relations.

Figure 142:
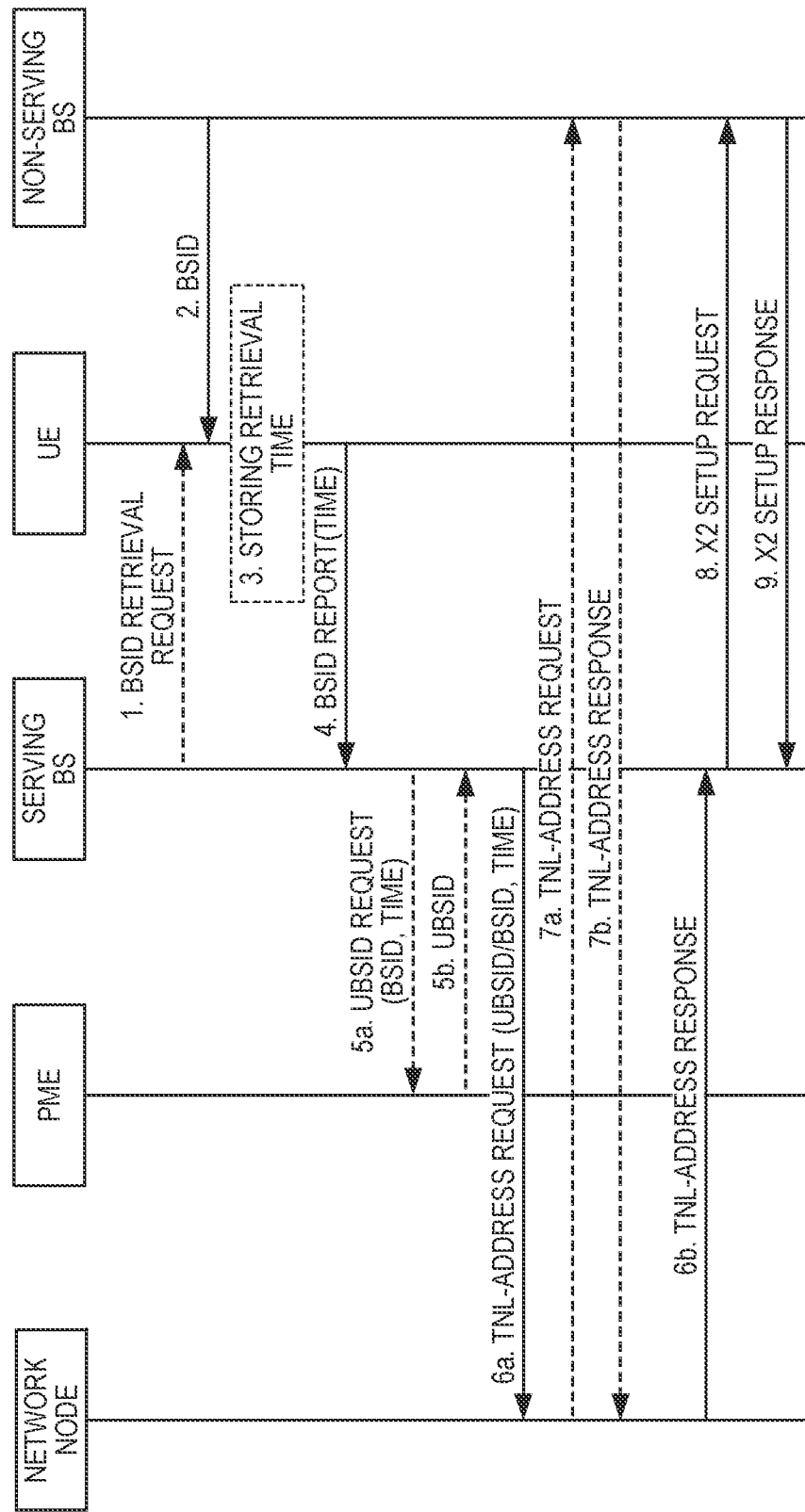

FIG. 142 is a signaling flow diagram showing BSID retrieval and TNL address recovery.

Figure 143:
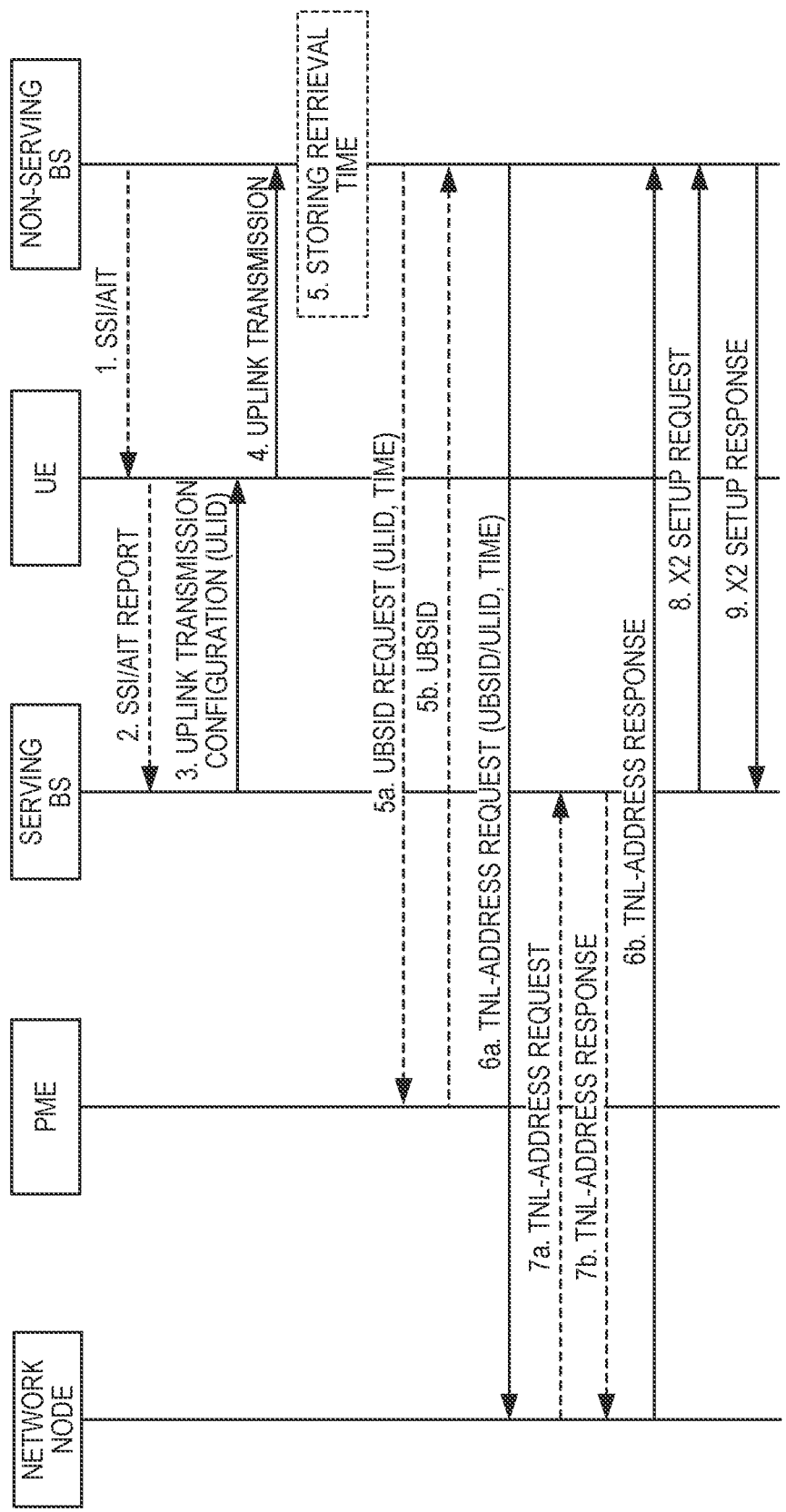

FIG. 143 is a signaling flow diagram showing uplink-based ABR.

Figure 144:
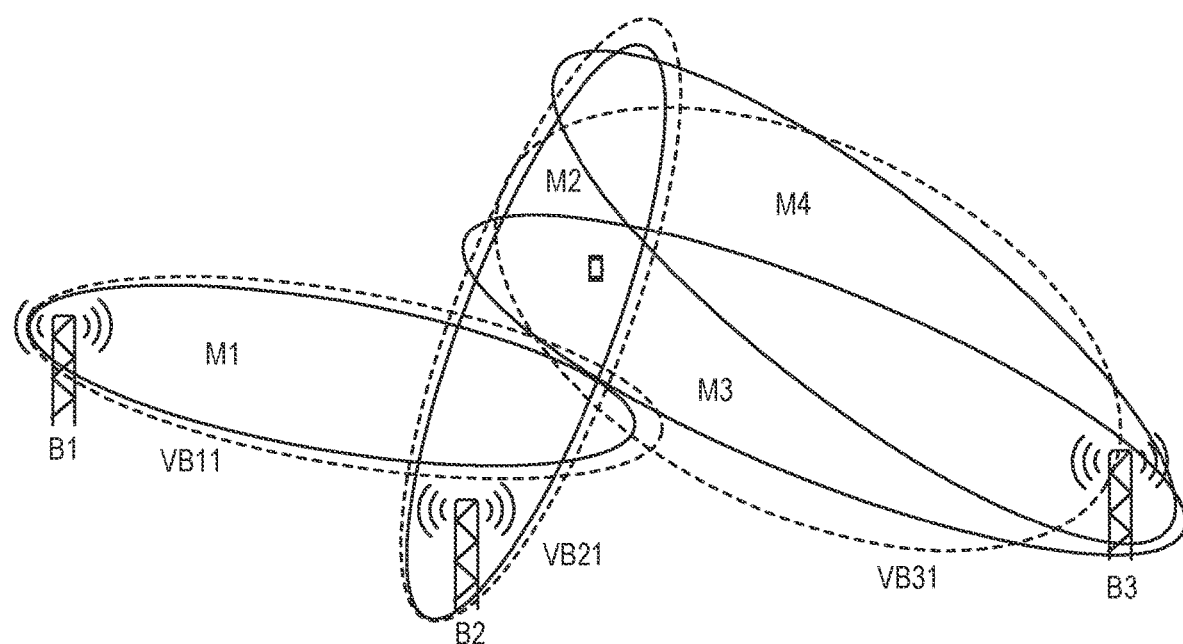

FIG. 144 shows mobility beams and virtual mobility beams.

Figure 145:
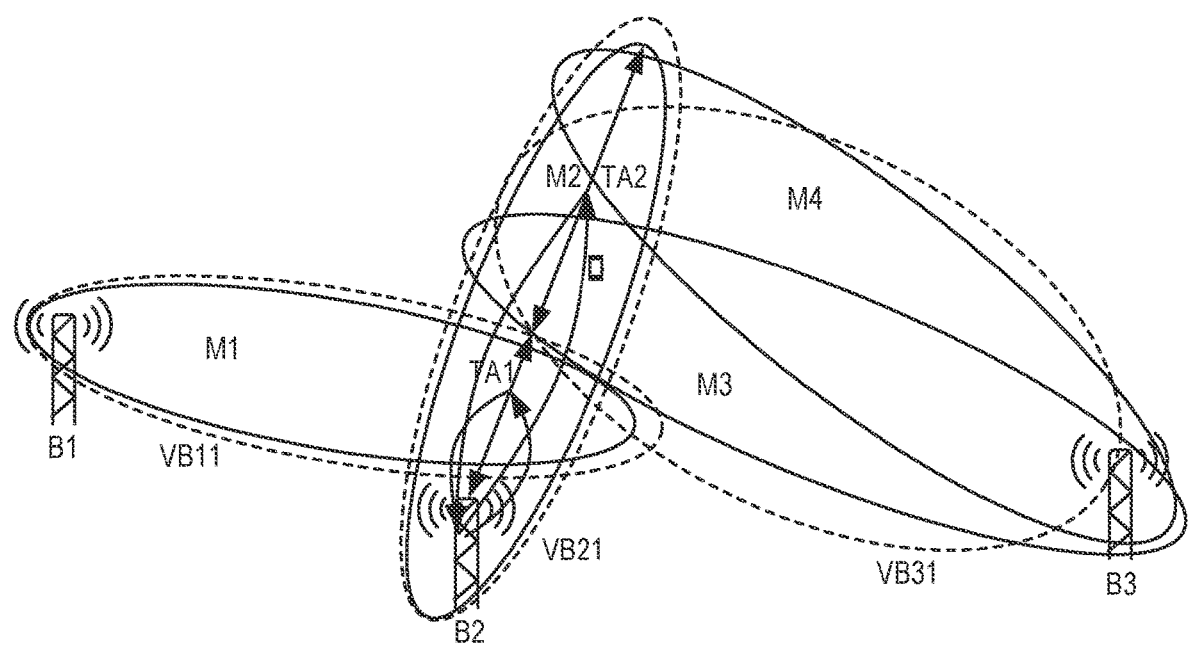

FIG. 145 illustrates virtual beam relations for the beams shown in FIG. 144.

Figure 146:
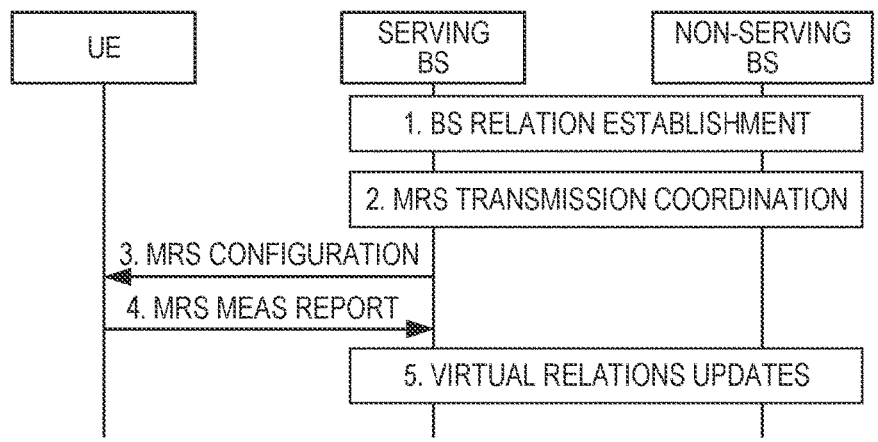

FIG. 146 illustrates virtual mobility beam relation establishment for greenfield deployments.

Figure 147:
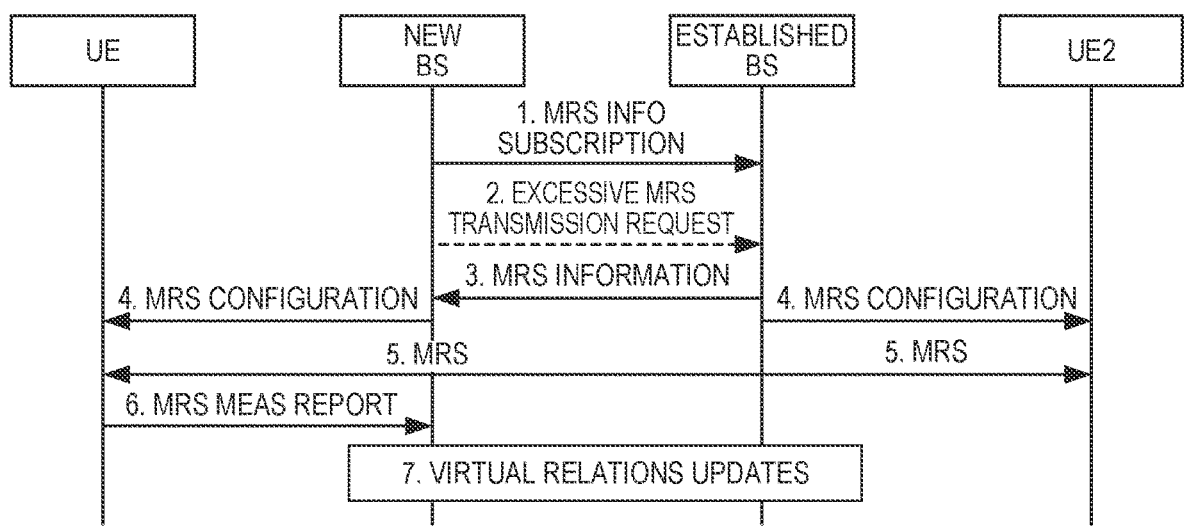

FIG. 147 illustrates virtual mobility beam relation establishment for mature deployments.

Figure 148:
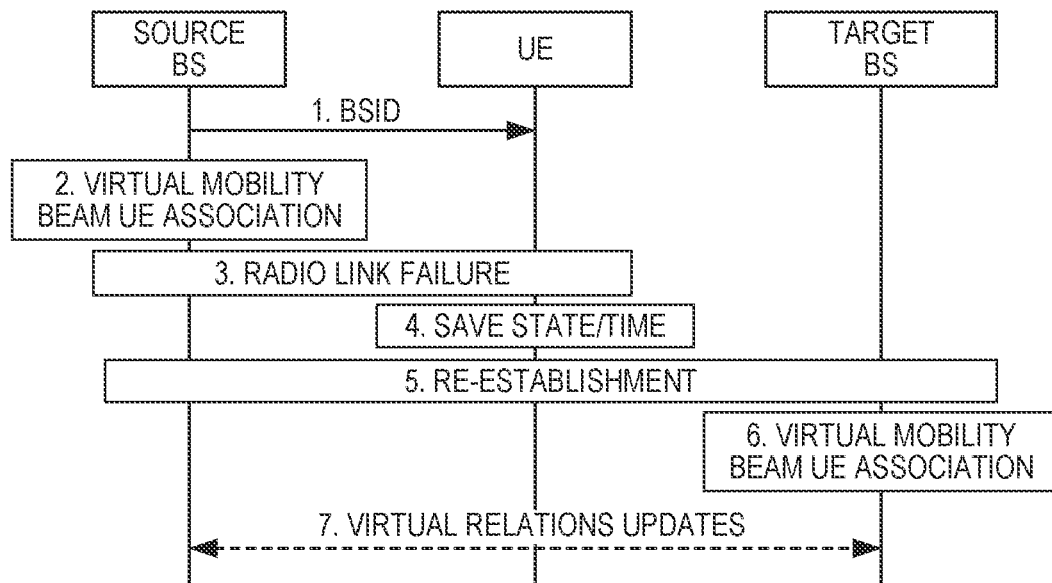

FIG. 148 shows virtual mobility beam relation establishment based on RLF reports.

Figure 149:
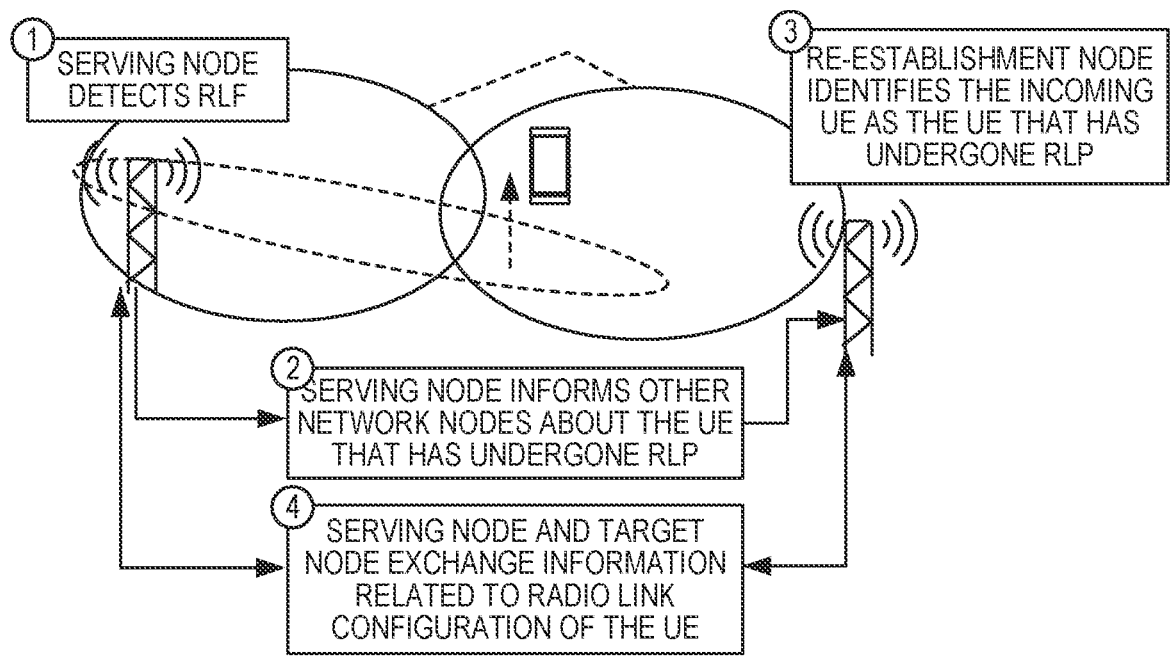

FIG. 149 shows a re-establishment procedure initiated by a source BS.

Figure 150:
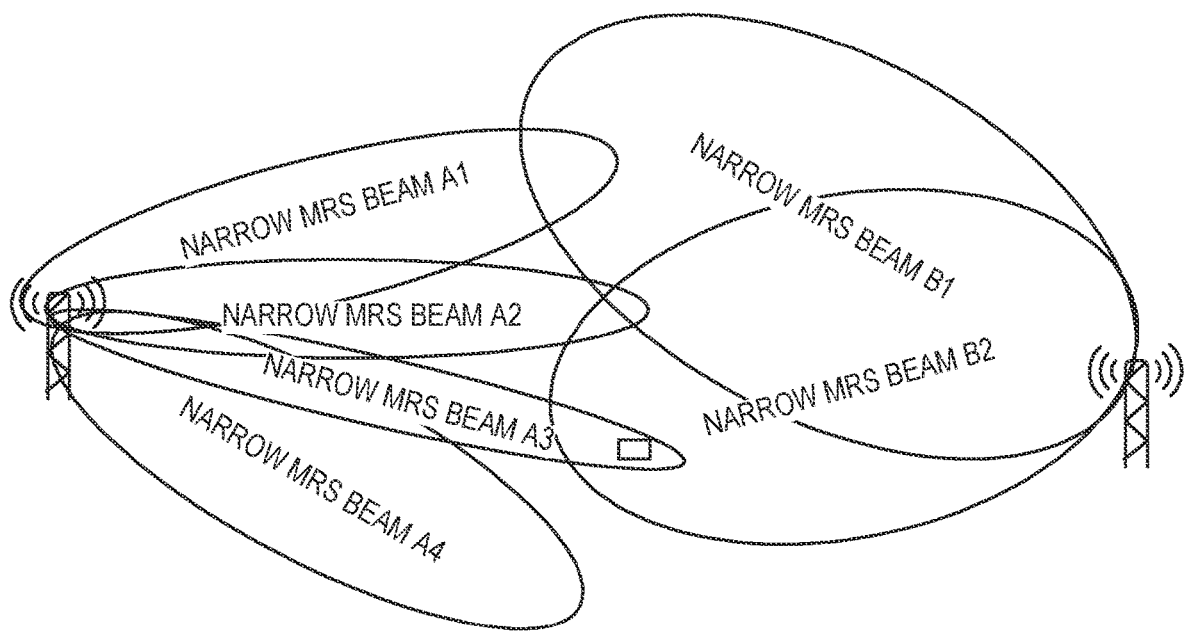

FIG. 150 depicts a handover border scenario to illustrate a fast handover procedure.

Figure 151:
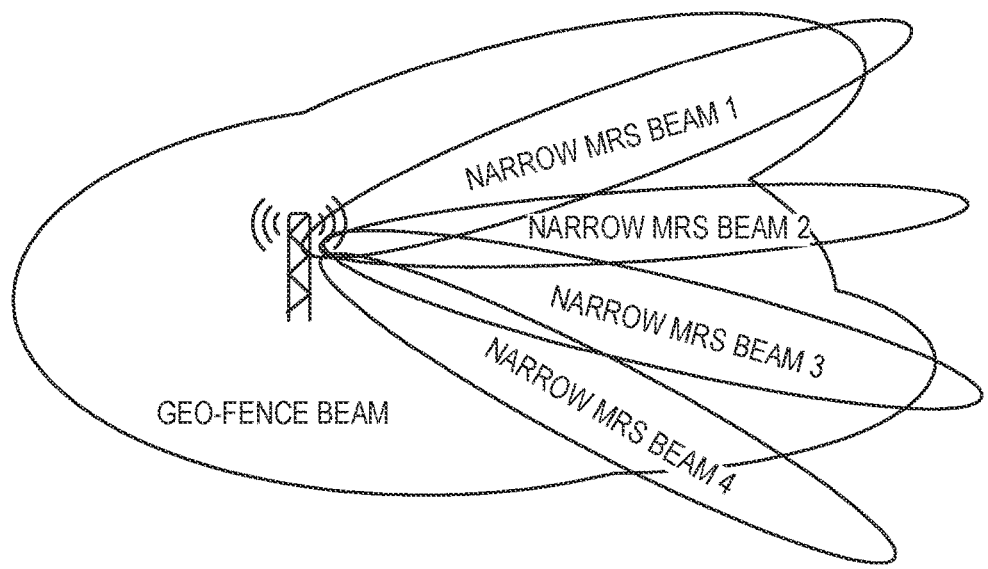

FIG. 151 illustrates geo-fence of a node.

Figure 152:
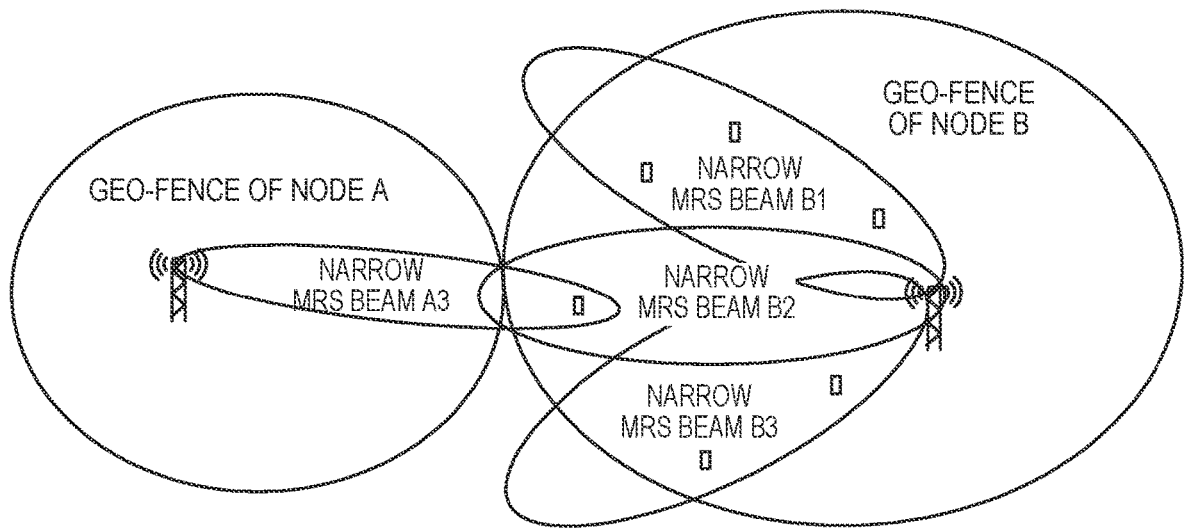

FIG. 152 shows mobility load balancing in NX.

Figure 153:
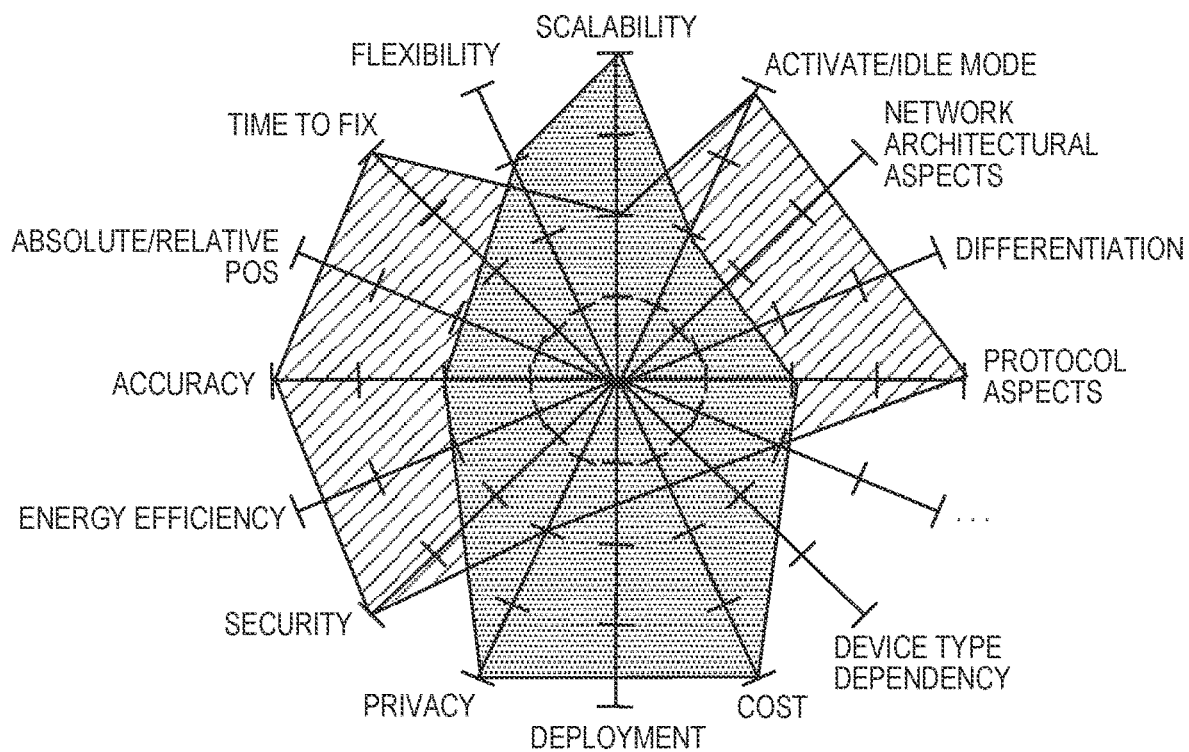

FIG. 153 illustrates tradeoffs for positioning requirements.

Figure 154:
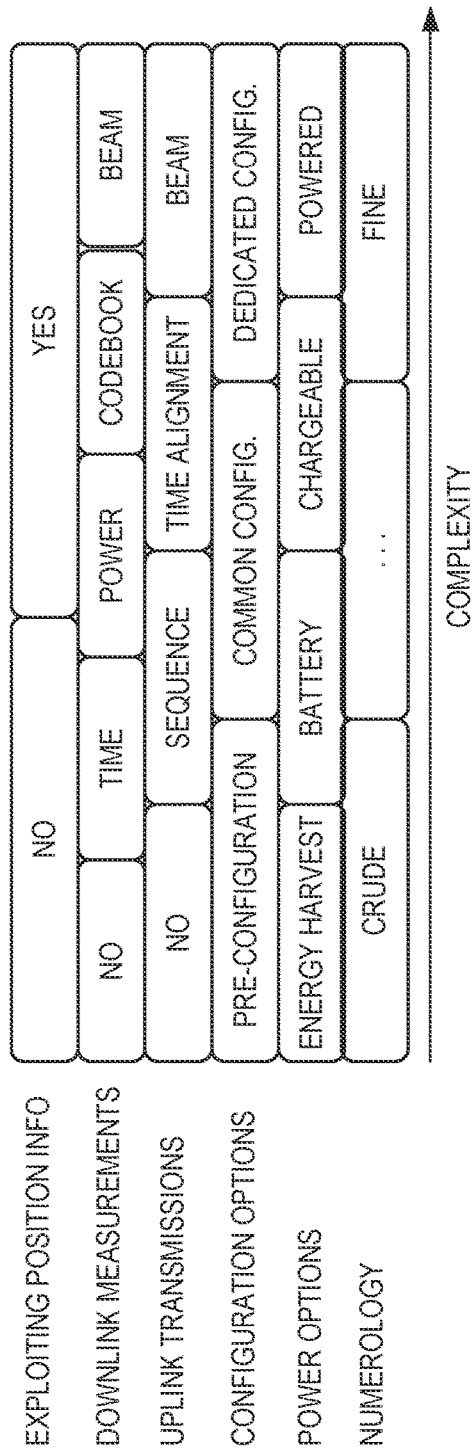

FIG. 154 illustrates central capabilities versus complexity.

Figure 155:
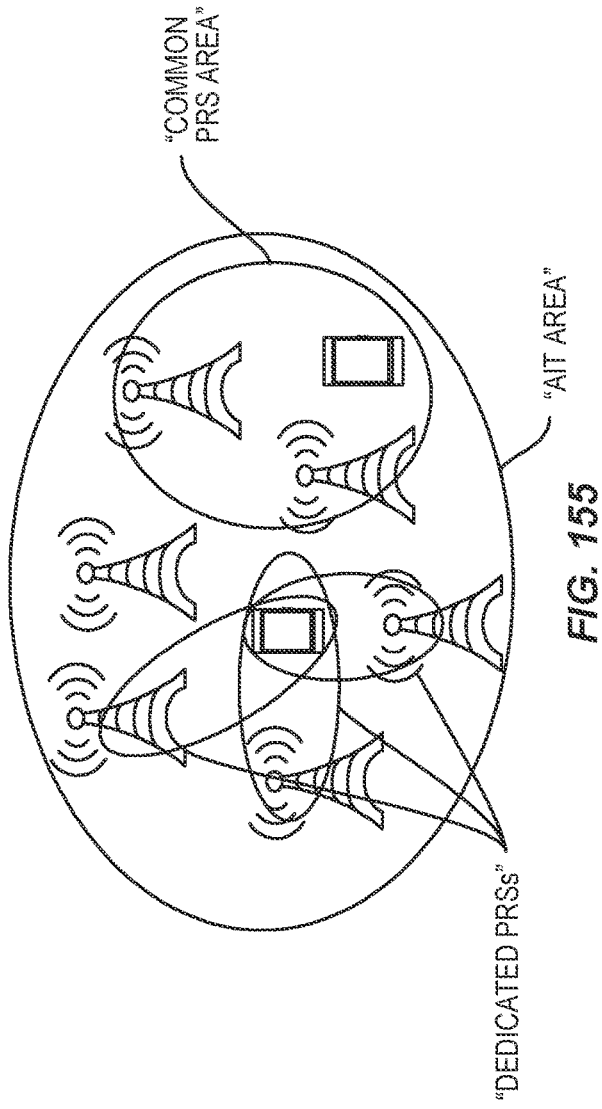

FIG. 155 shows positioning components.

Figure 156:
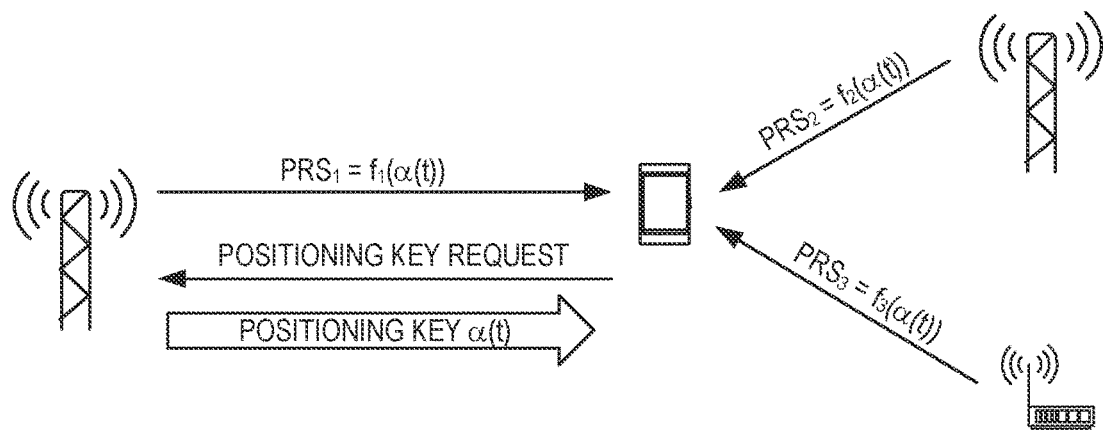

FIG. 156 illustrates an example of restricted PRS availability.

Figure 157:
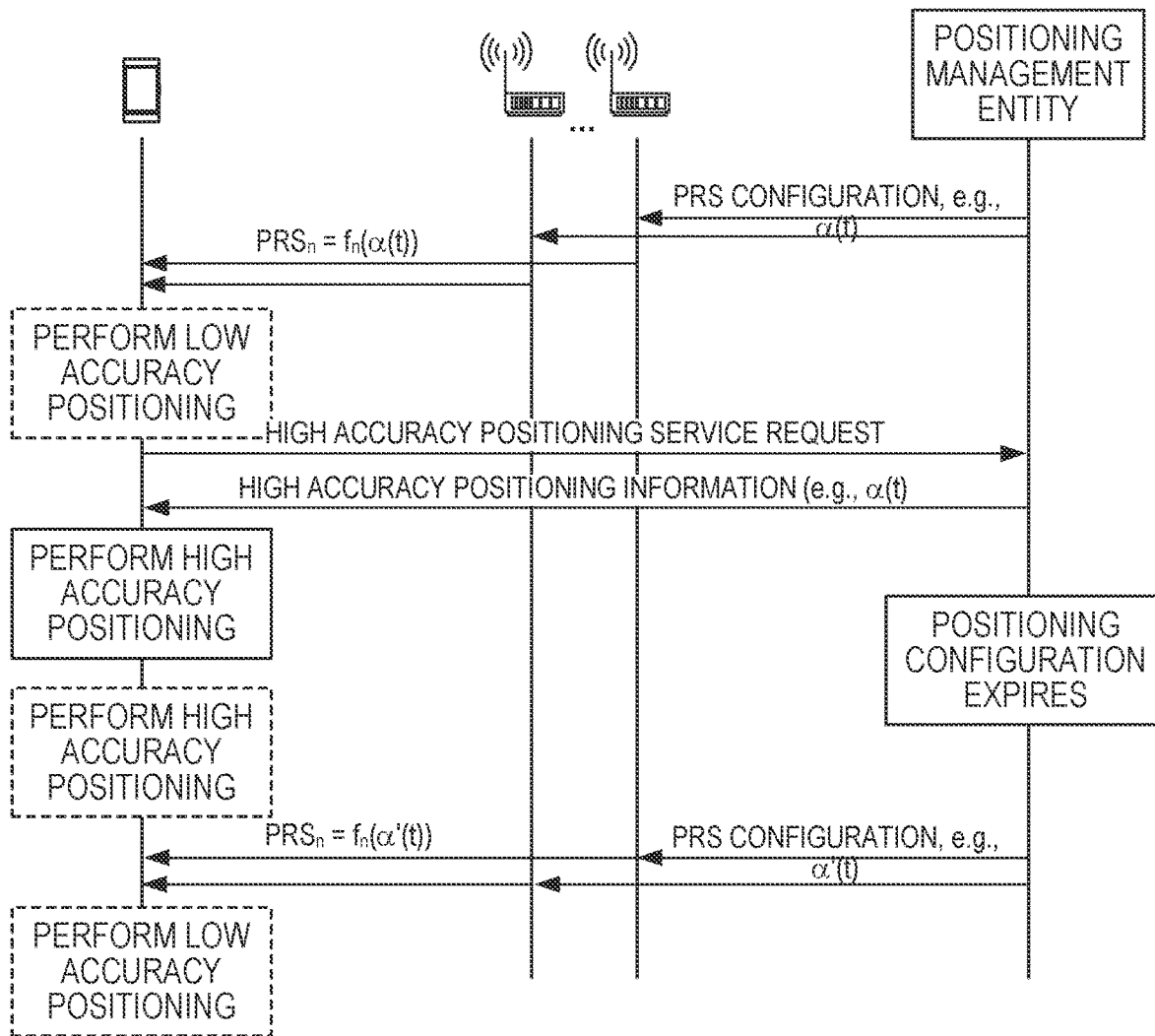

FIG. 157 is a signaling flow diagram illustrating support of restricted PRS availability.

Figure 158:
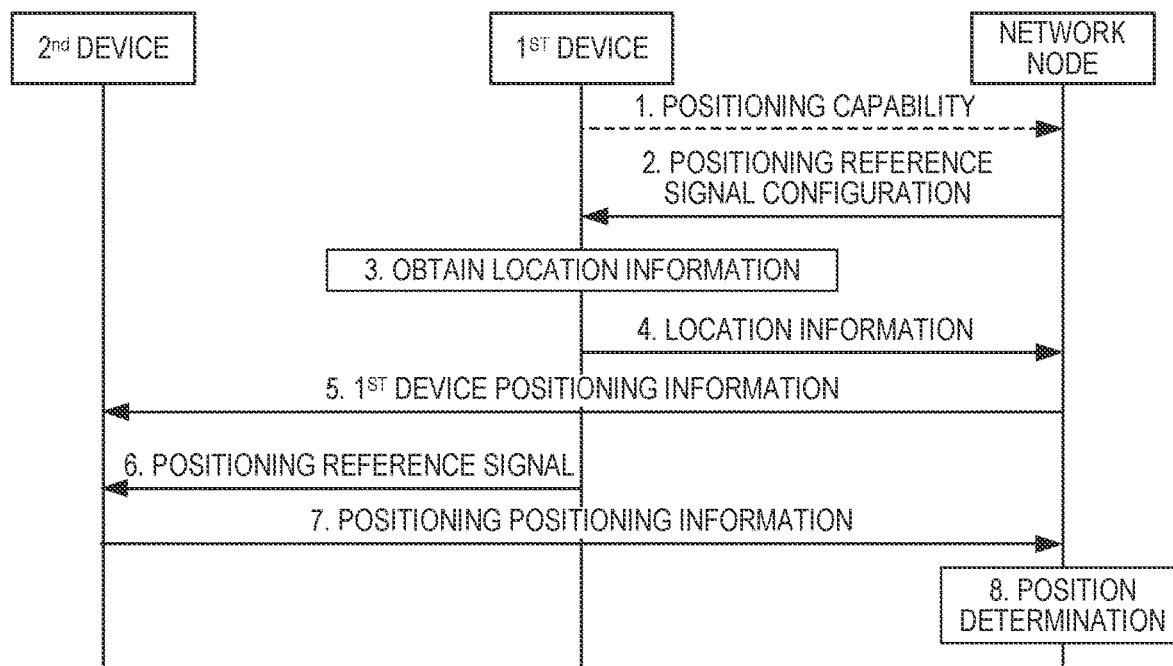

FIG. 158 shows positioning with a positioning support device.

Figure 159:
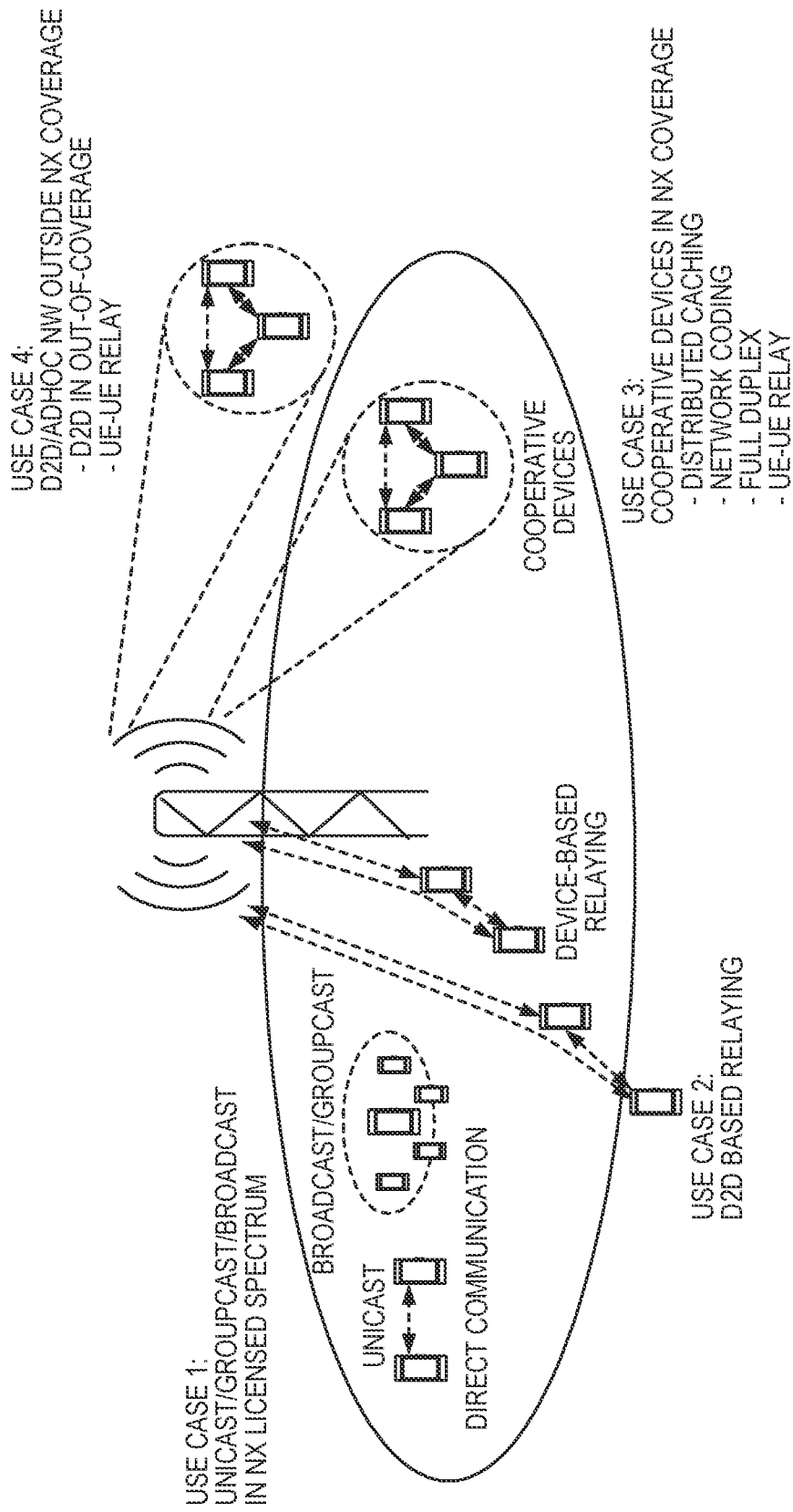

FIG. 159 illustrates a categorization of D2D use cases.

FIG. 160 shows some D2D-related requirements in several use cases.

Figure 161:
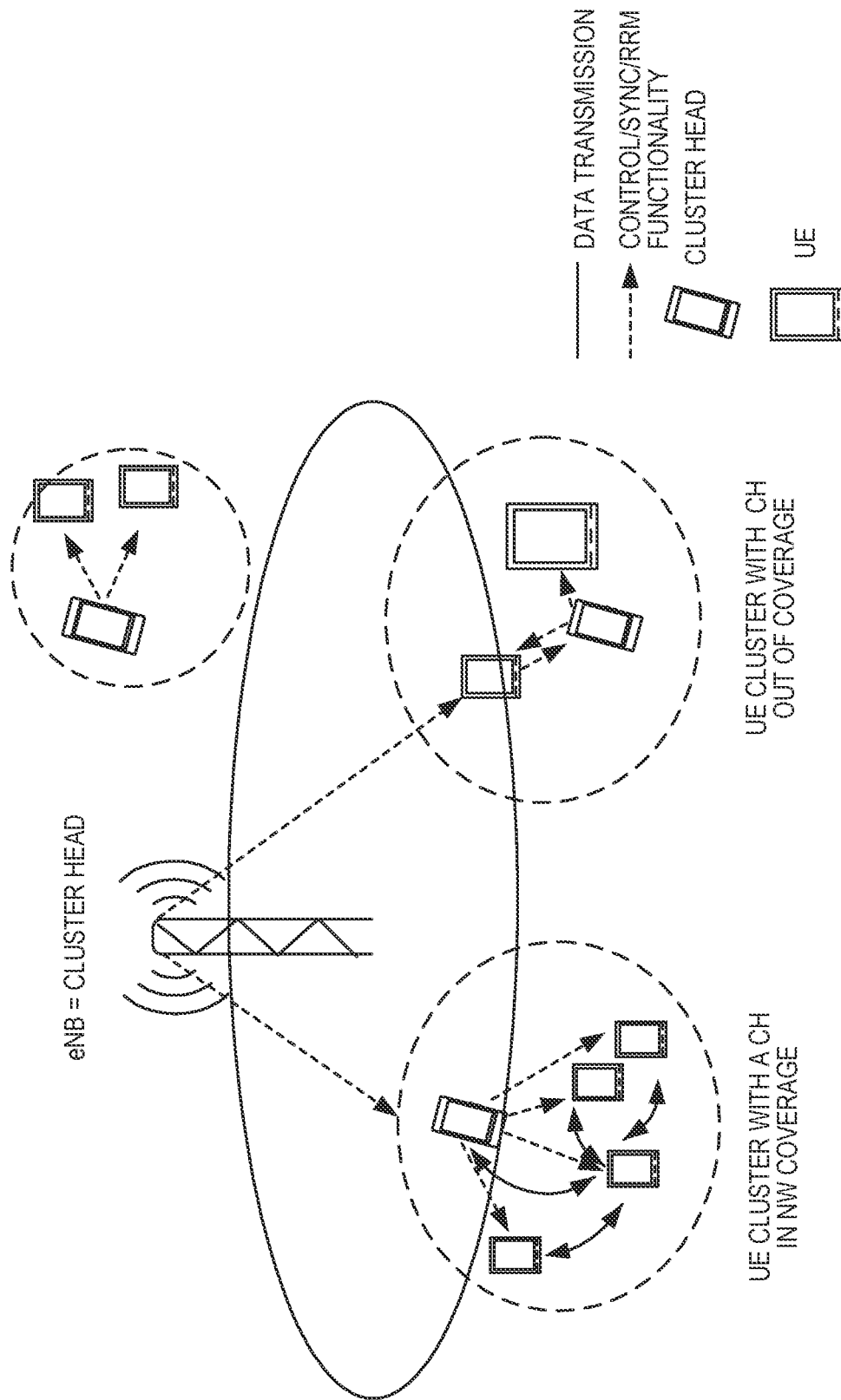

FIG. 161 illustrates D2D communications supported by the clustering concept.

Figure 162:
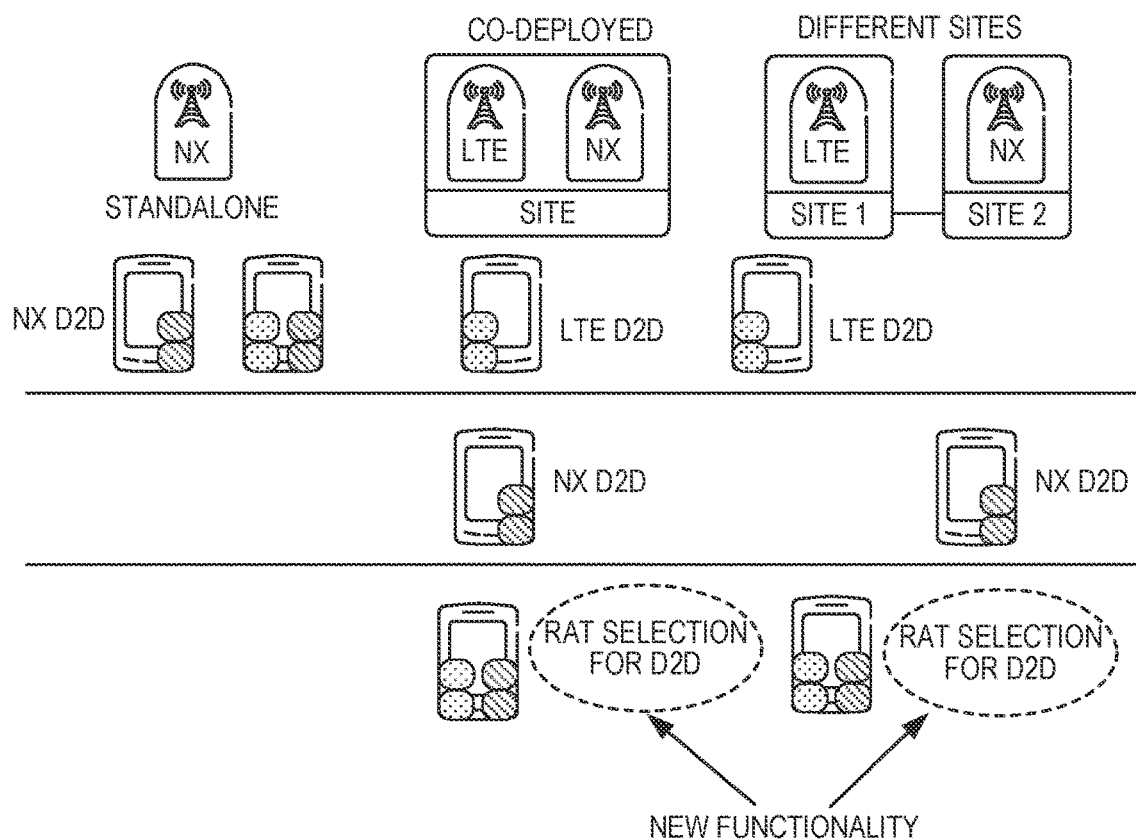

FIG. 162 illustrates combinations of NX deployment scenarios and UE capabilities.

Figure 163:
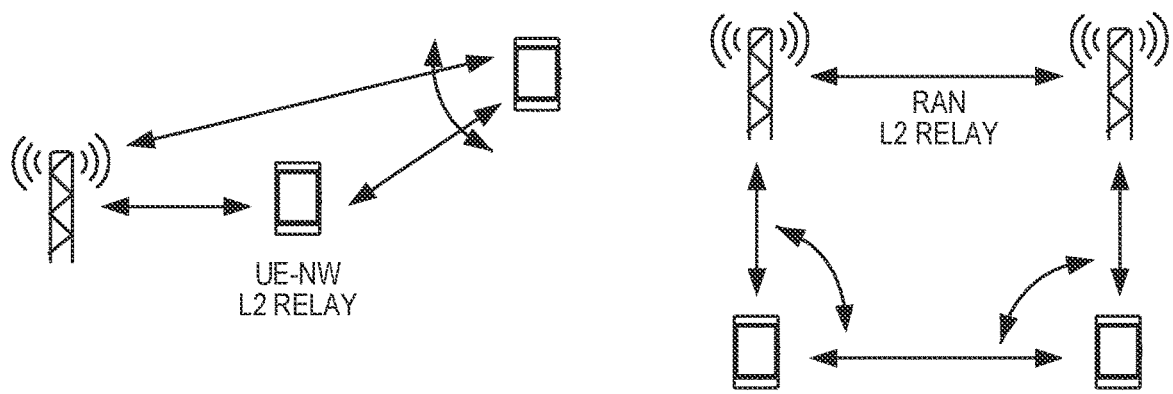

FIG. 163 shows layer 2 switching of user data paths.

Figure 164:
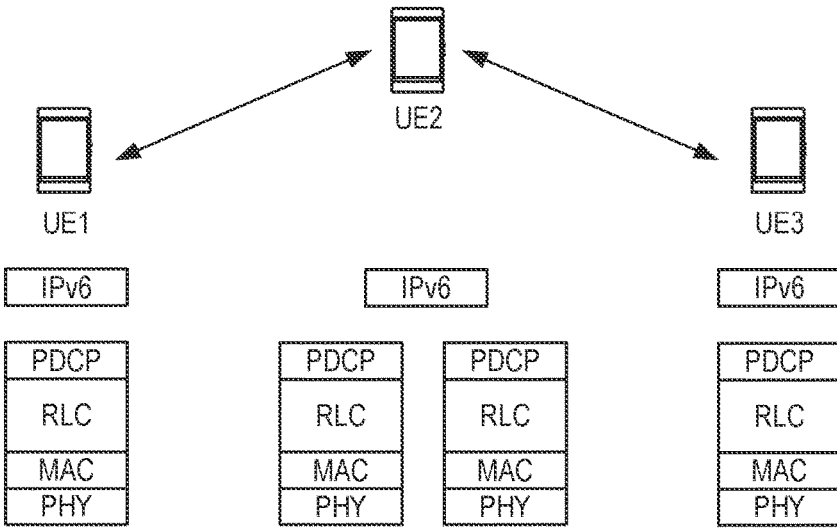

FIG. 164 illustrates a user plane protocol architecture for single hop.

Figure 165:
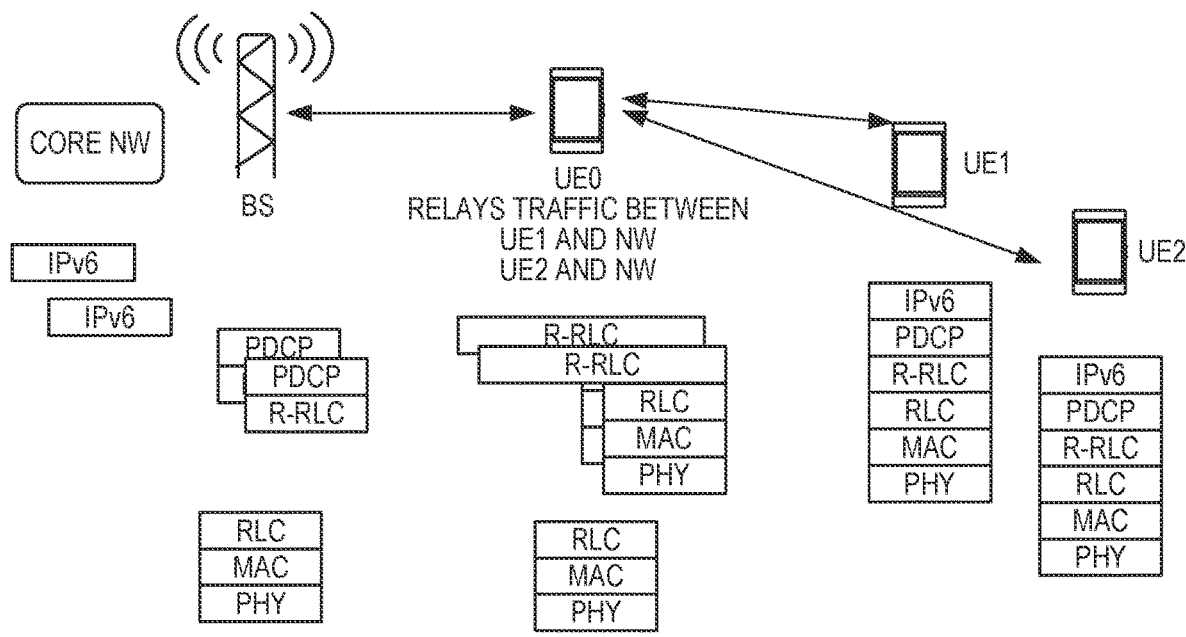

FIG. 165 illustrates a user plane protocol architecture for UE-to-network relay.

Figure 166:
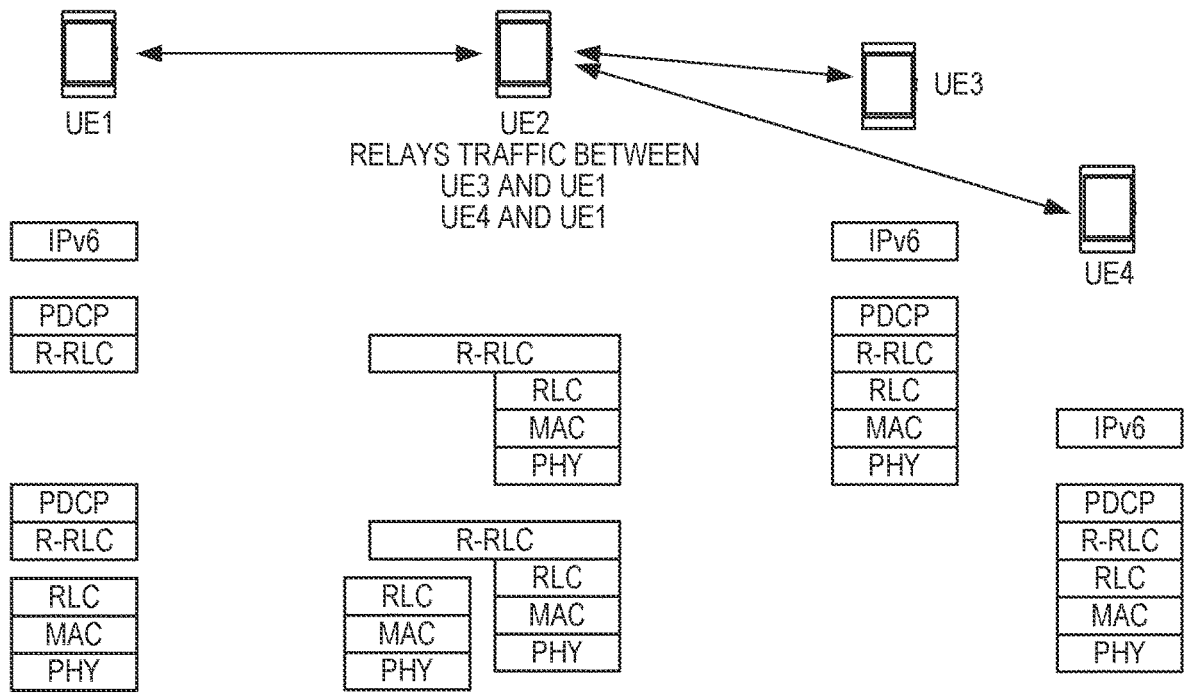

FIG. 166 illustrates a user plane protocol architecture for UE-to-UE relay.

Figure 167:
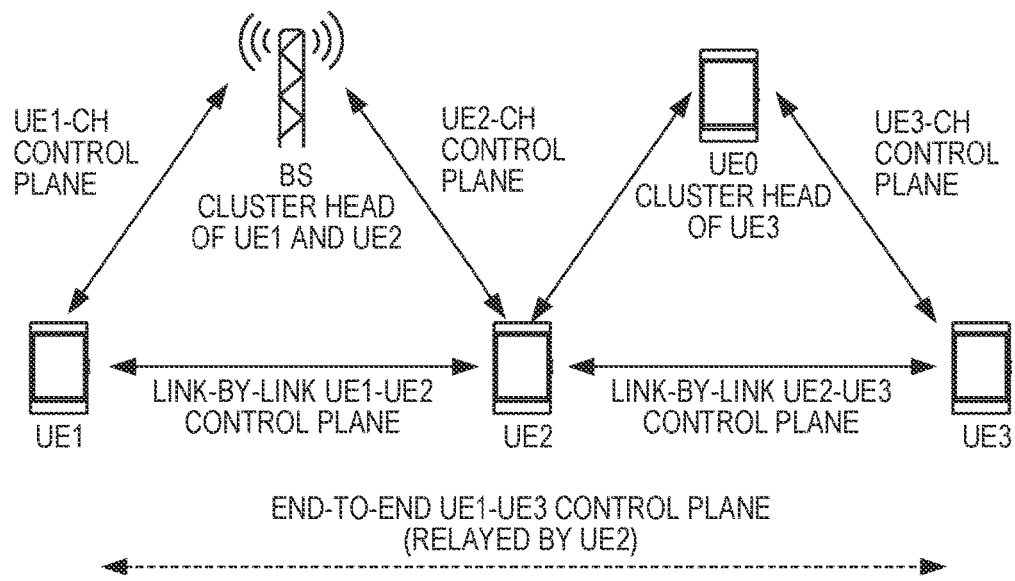

FIG. 167 shows control plane protocols used by D2D.

FIG. 168 shows some combinations of NX deployment scenarios and UE capabilities.

FIG. 169 shows examples of sidelink management functions.

FIG. 170 shows examples of measurement functions desirable for D2D communications.

FIG. 171 shows UE beamforming for D2D communications.

Figure 172:
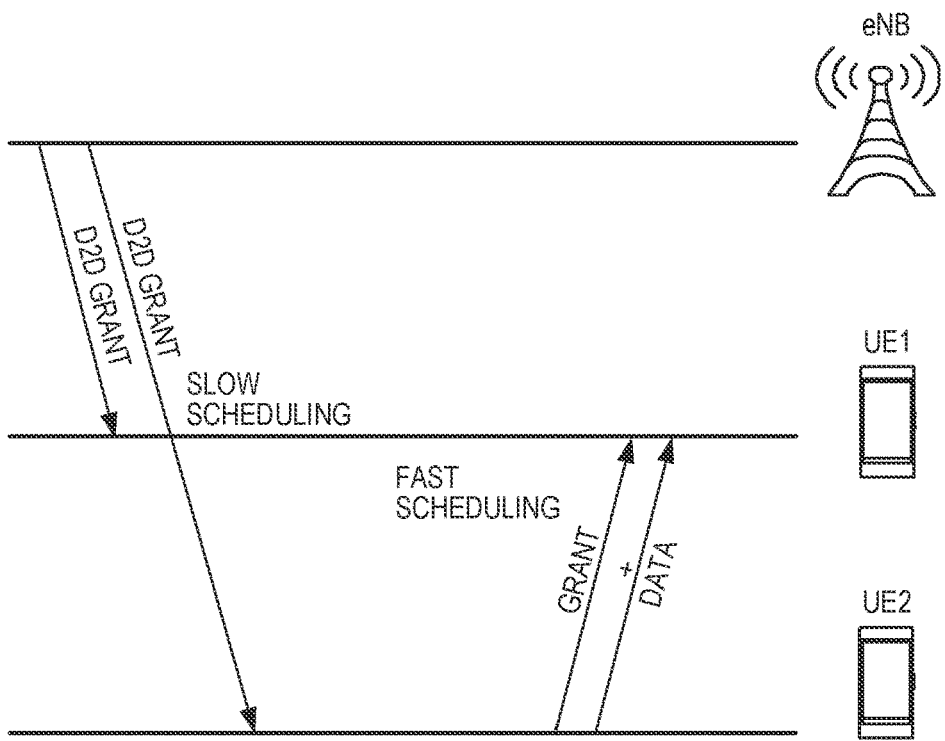

FIG. 172 shows an example sidelink scheduling operation.

Figure 173:
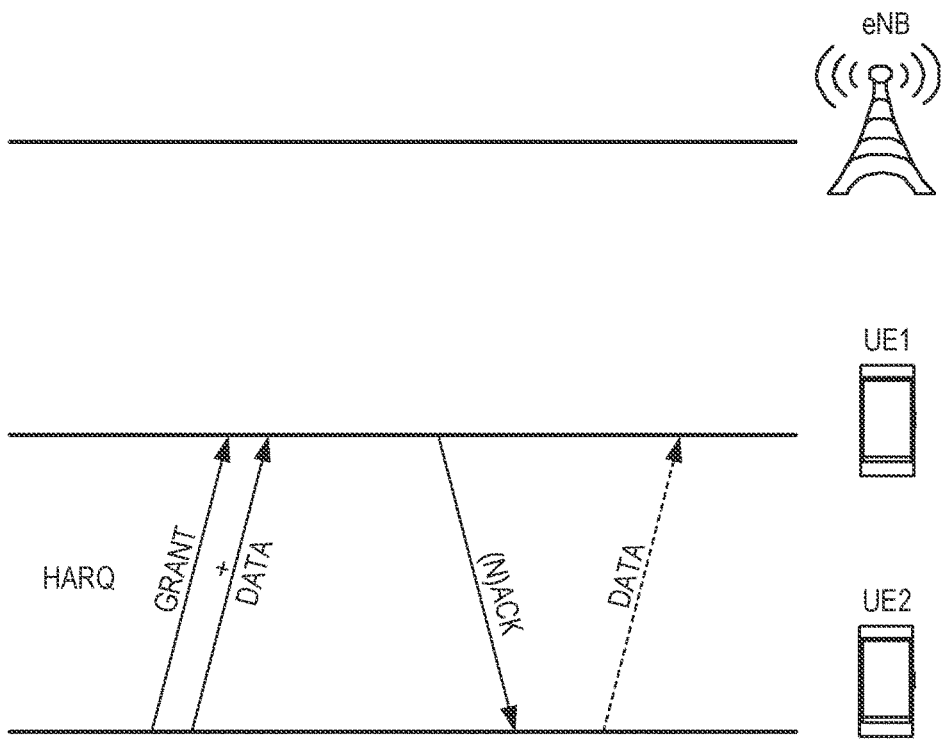

FIG. 173 illustrates sidelink HARQ operation.

Figure 174:
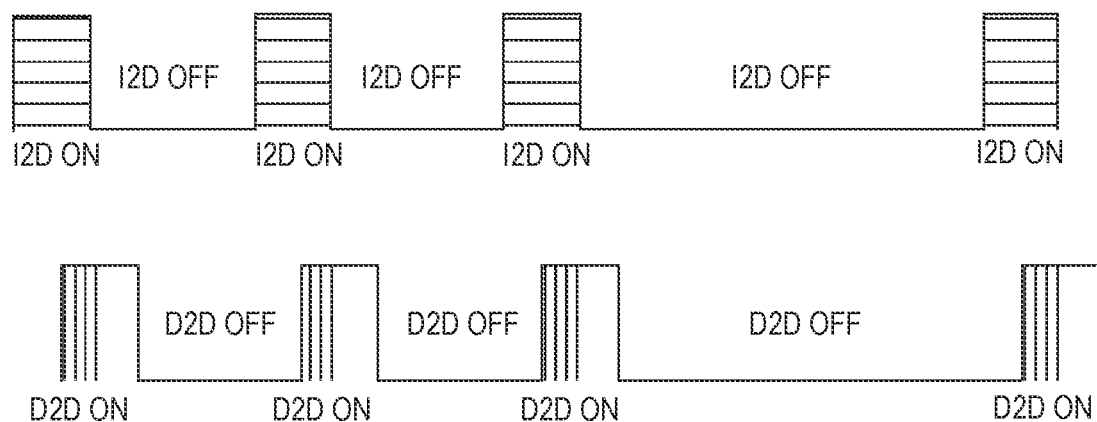

FIG. 174 depicts DRX alignment of infrastructure-to-device (I2D) and D2D communications for maximizing OFF-duration.

Figure 175:
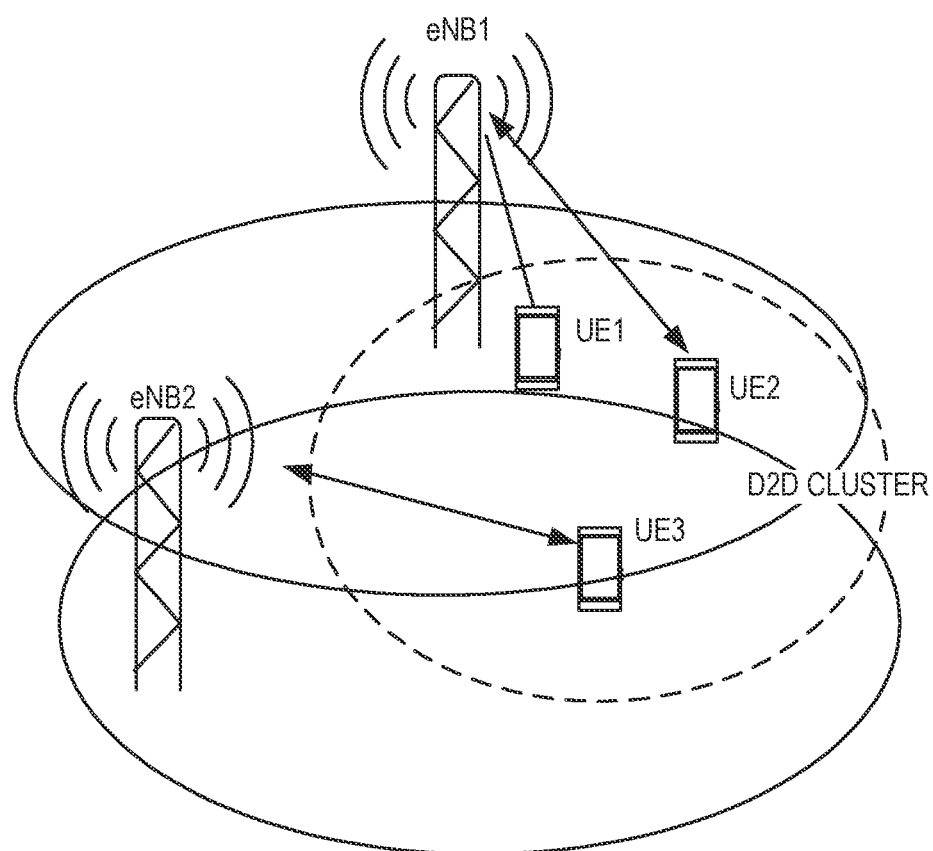

FIG. 175 shows a D2D cluster communicating over cell borders.

Figure 176:
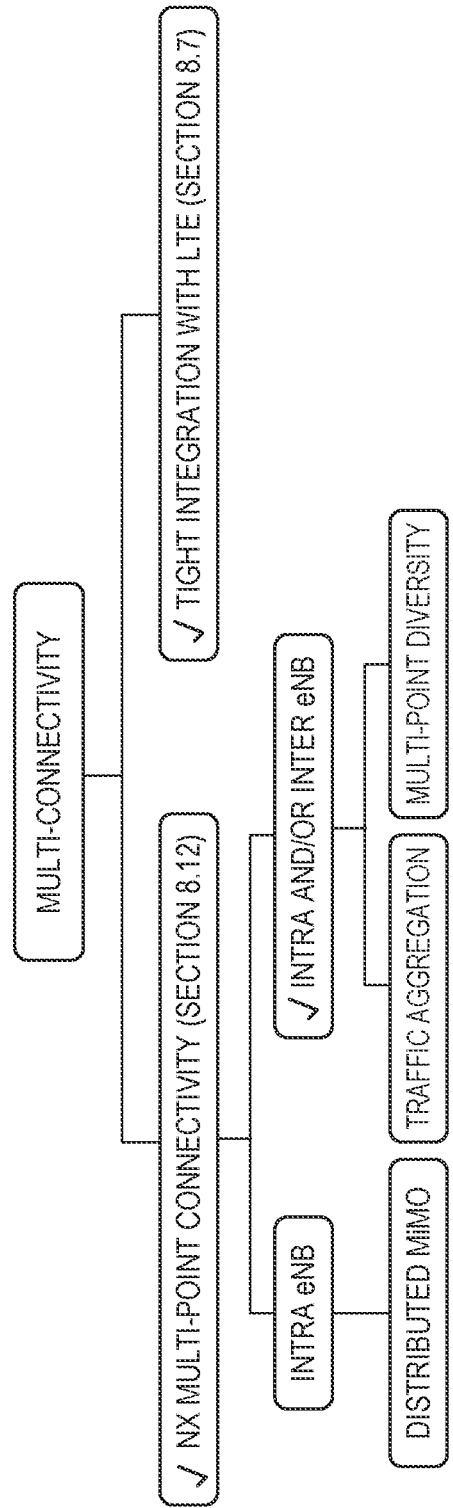

FIG. 176 illustrates relations between different modes of multi-connectivity.

Figure 177:
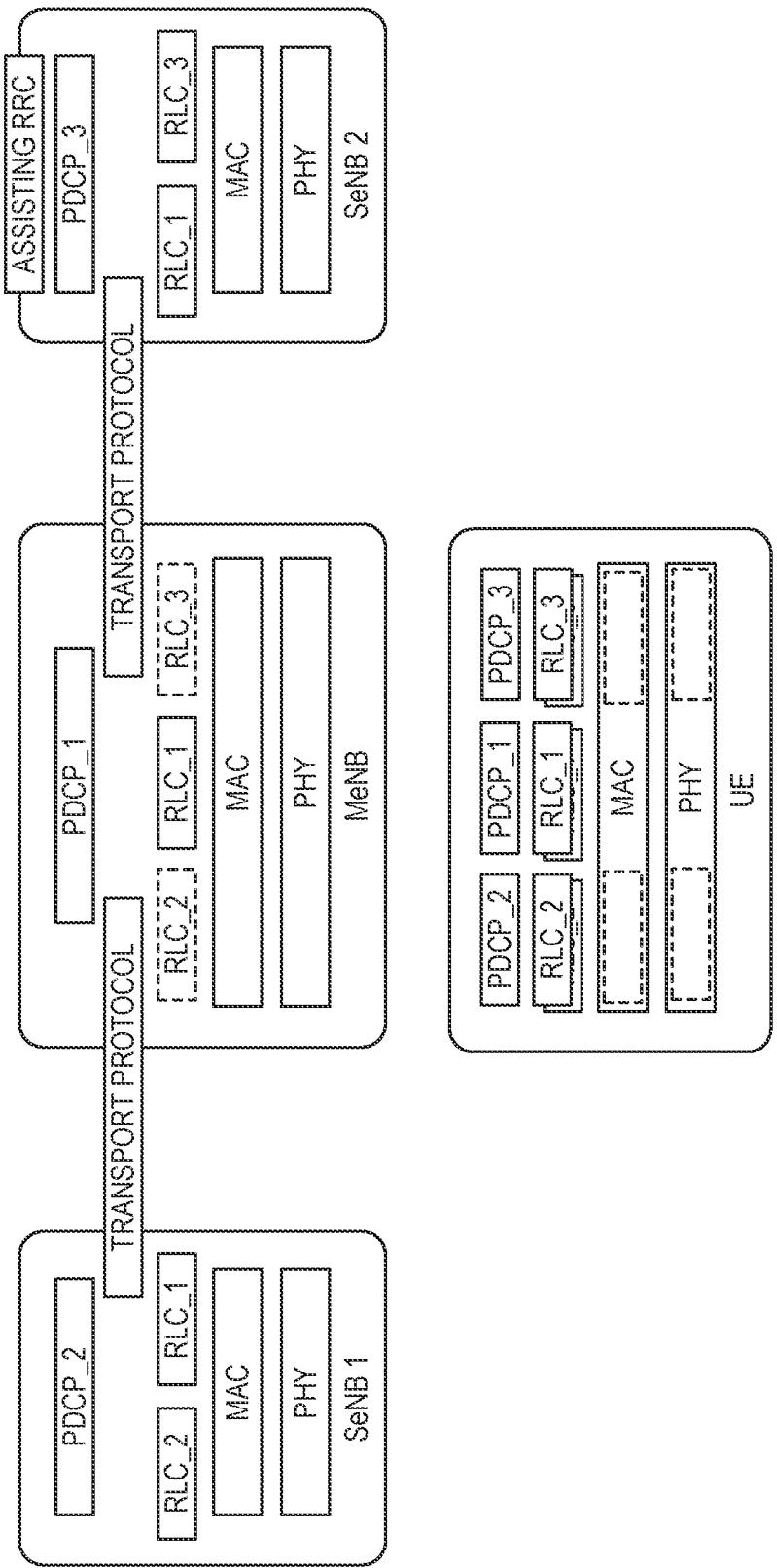

FIG. 177 shows a user-plane protocol stack for NX multi-connectivity.

Figure 178:
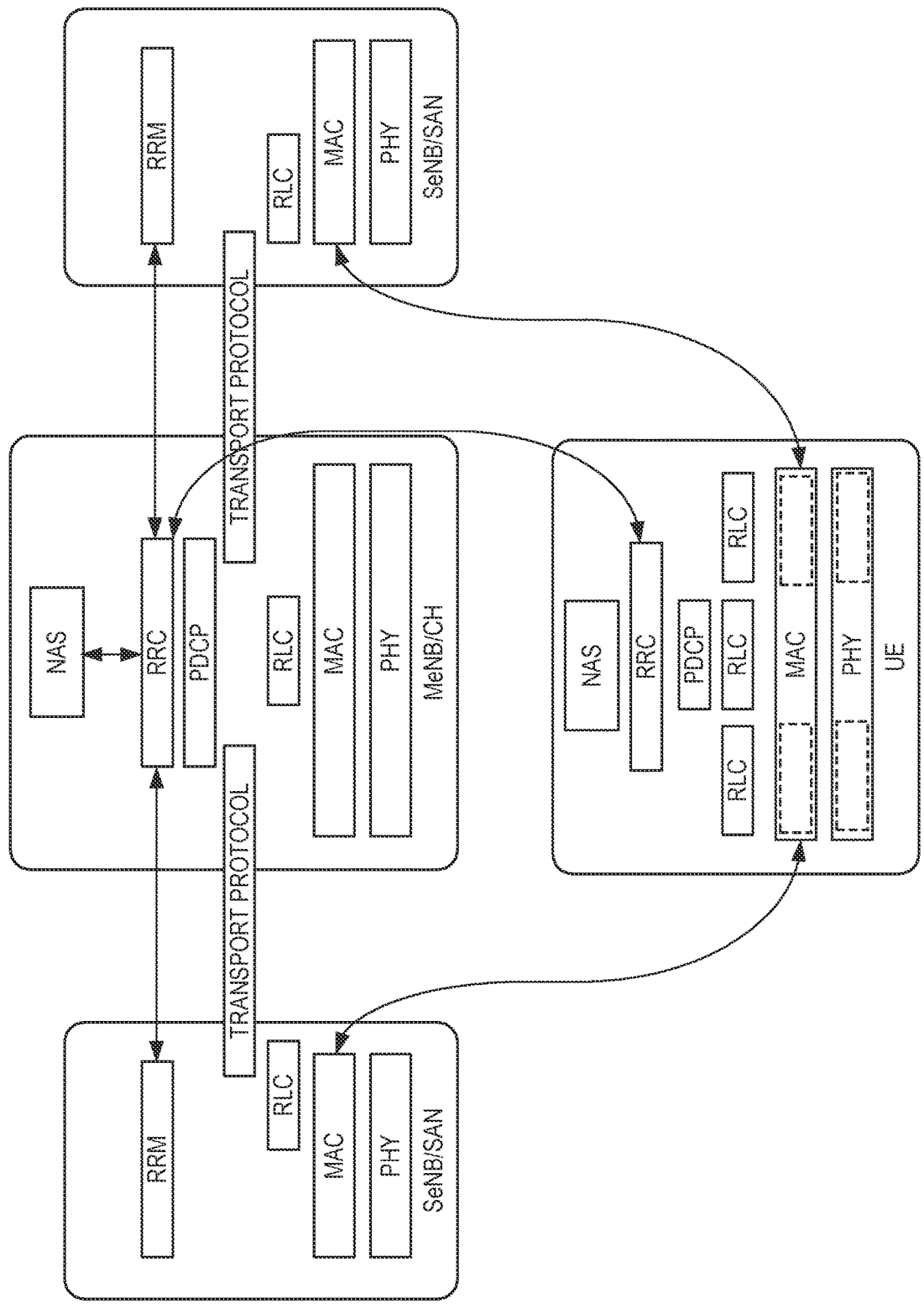

FIG. 178 illustrates an alternative including one RRC entity at a MeNB.

Figure 179:
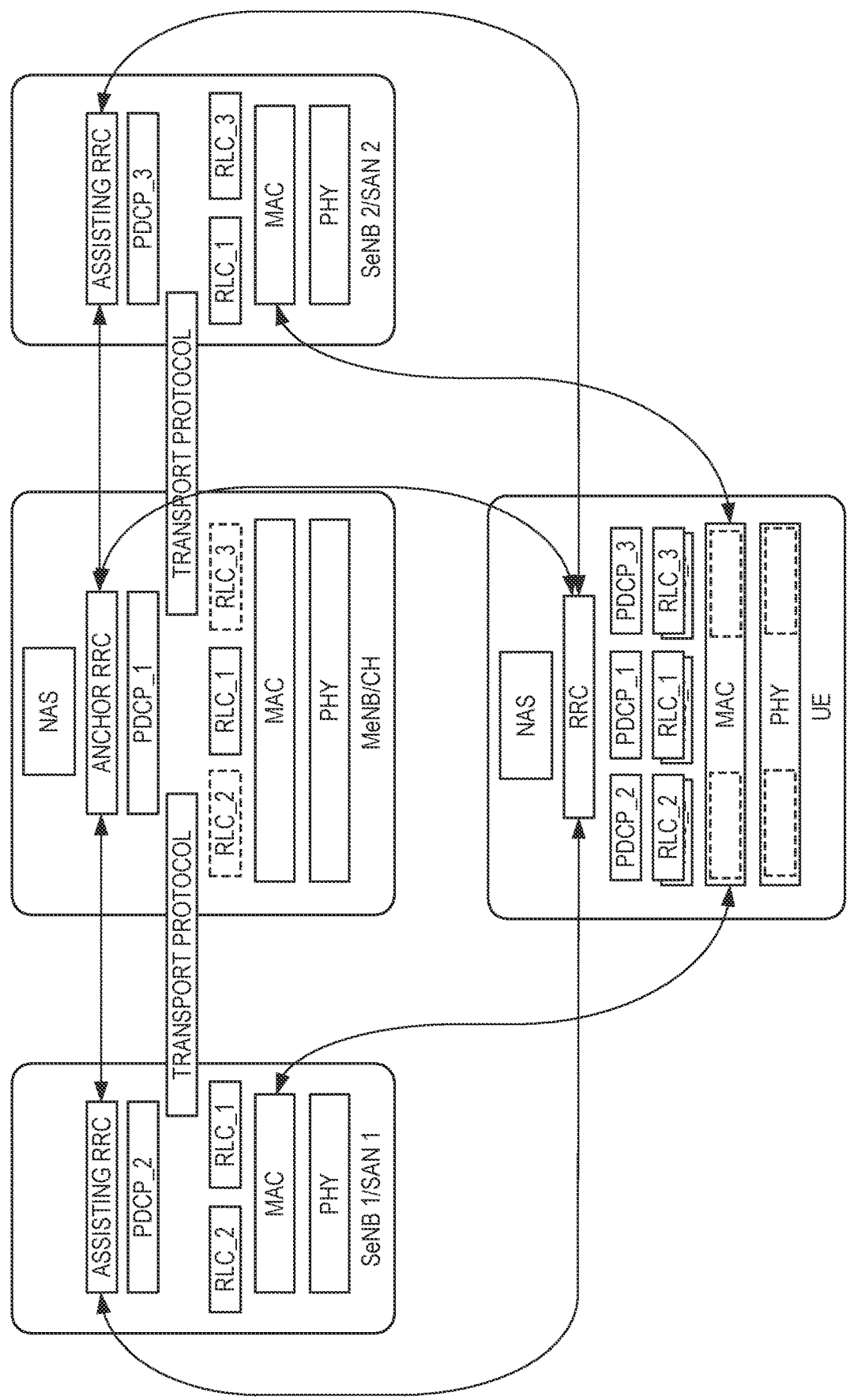

FIG. 179 shows an alternative including multiple RRC entities at both MeNB and SeNB.

Figure 180:
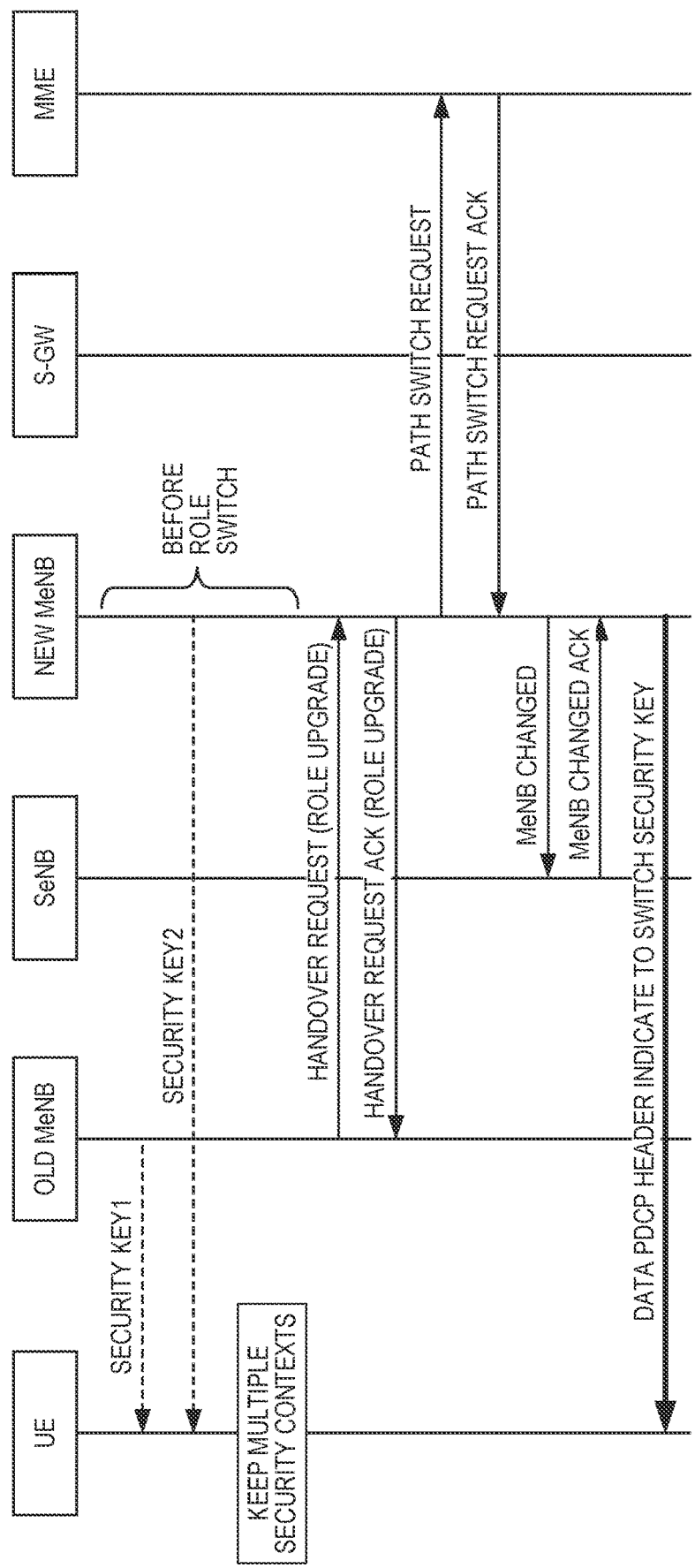

FIG. 180 shows a fast MeNB and SeNB role switch procedure.

Figure 181:
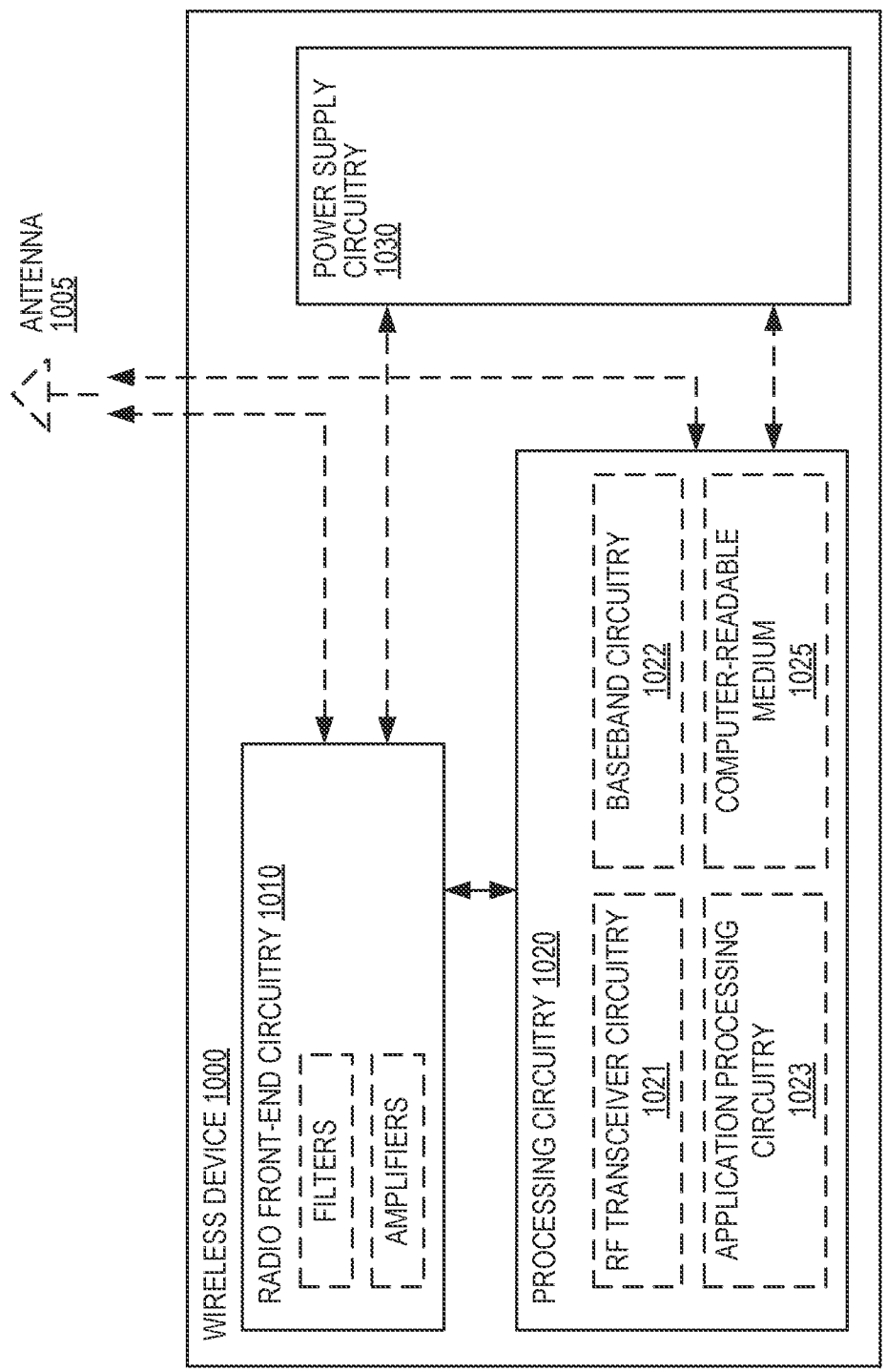

FIG. 181 is a block diagram illustrating an example wireless device.

Figure 182:
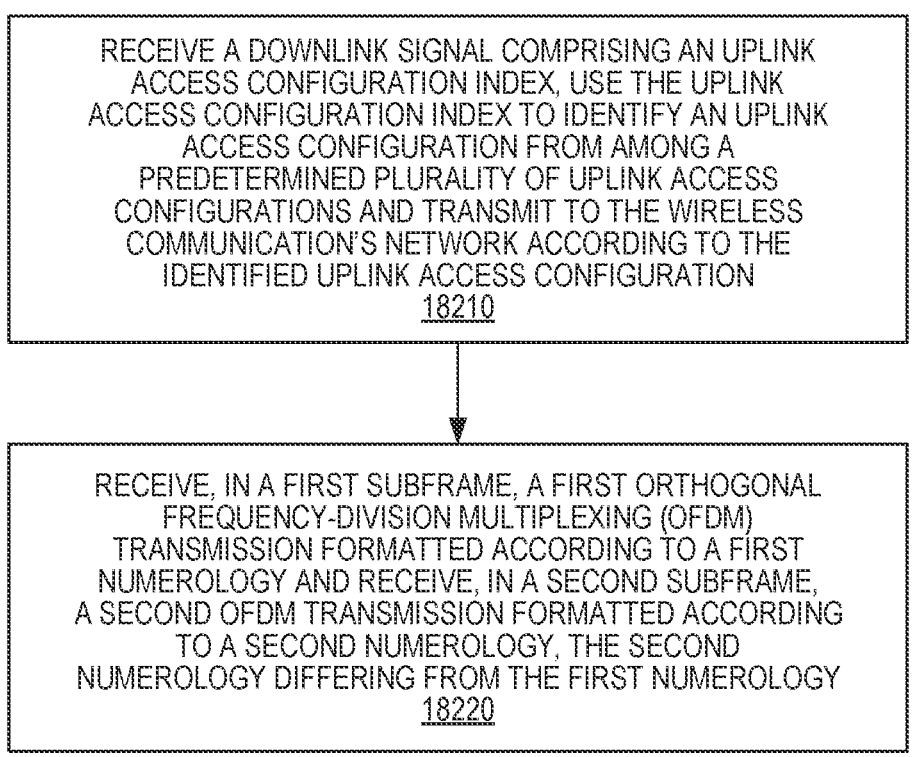

FIG. 182 is a process flow diagram illustrating an example method in a wireless device.

Figure 183:
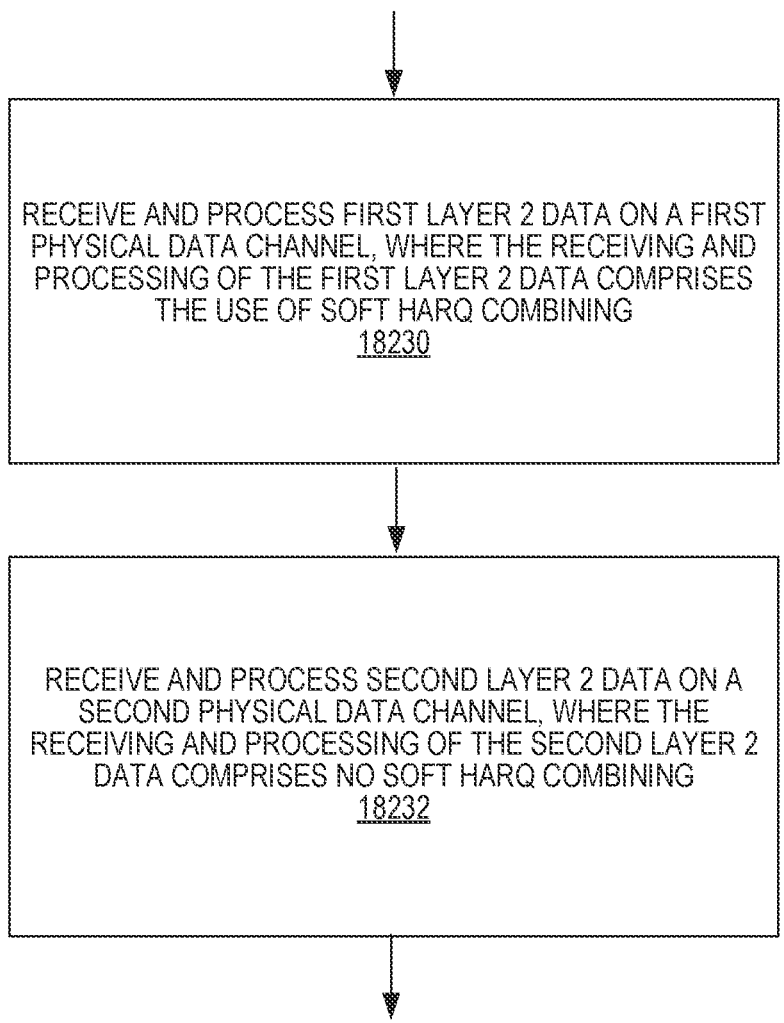

FIG. 183 is a process flow diagram illustrating an additional example method in a wireless device.

Figure 184:
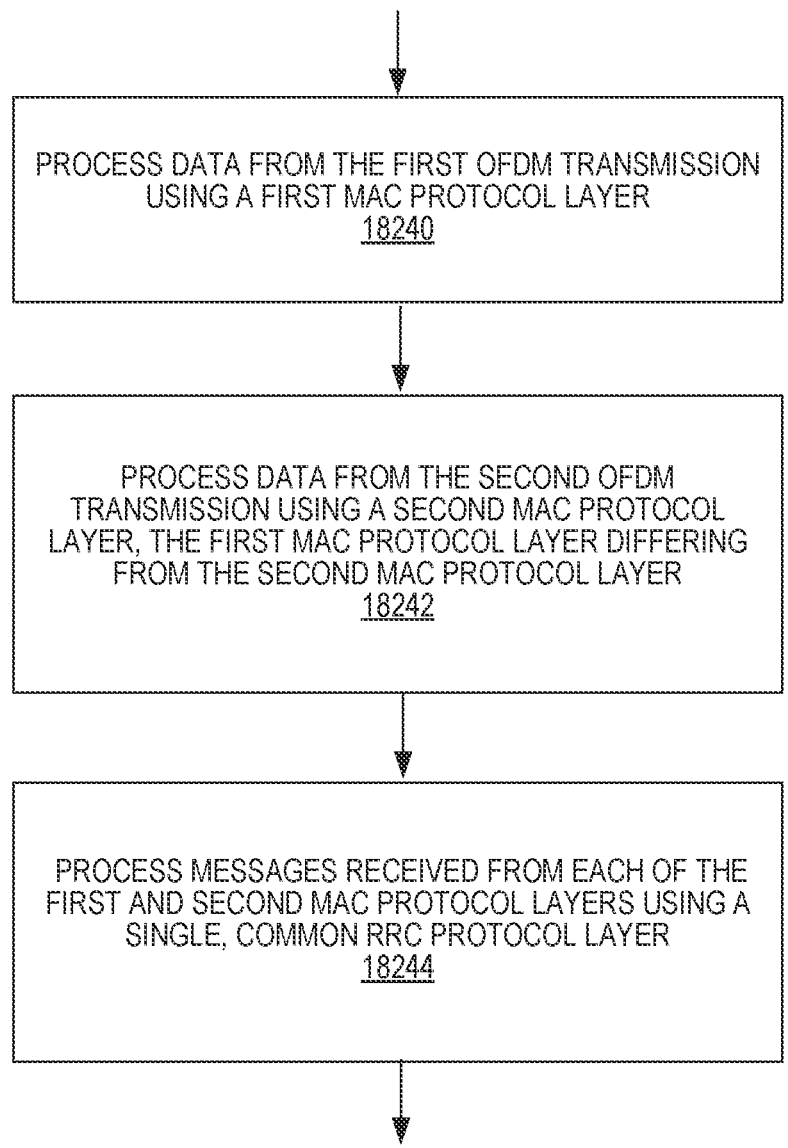

FIG. 184 is a process flow diagram illustrating an additional example method in a wireless device.

Figure 185:
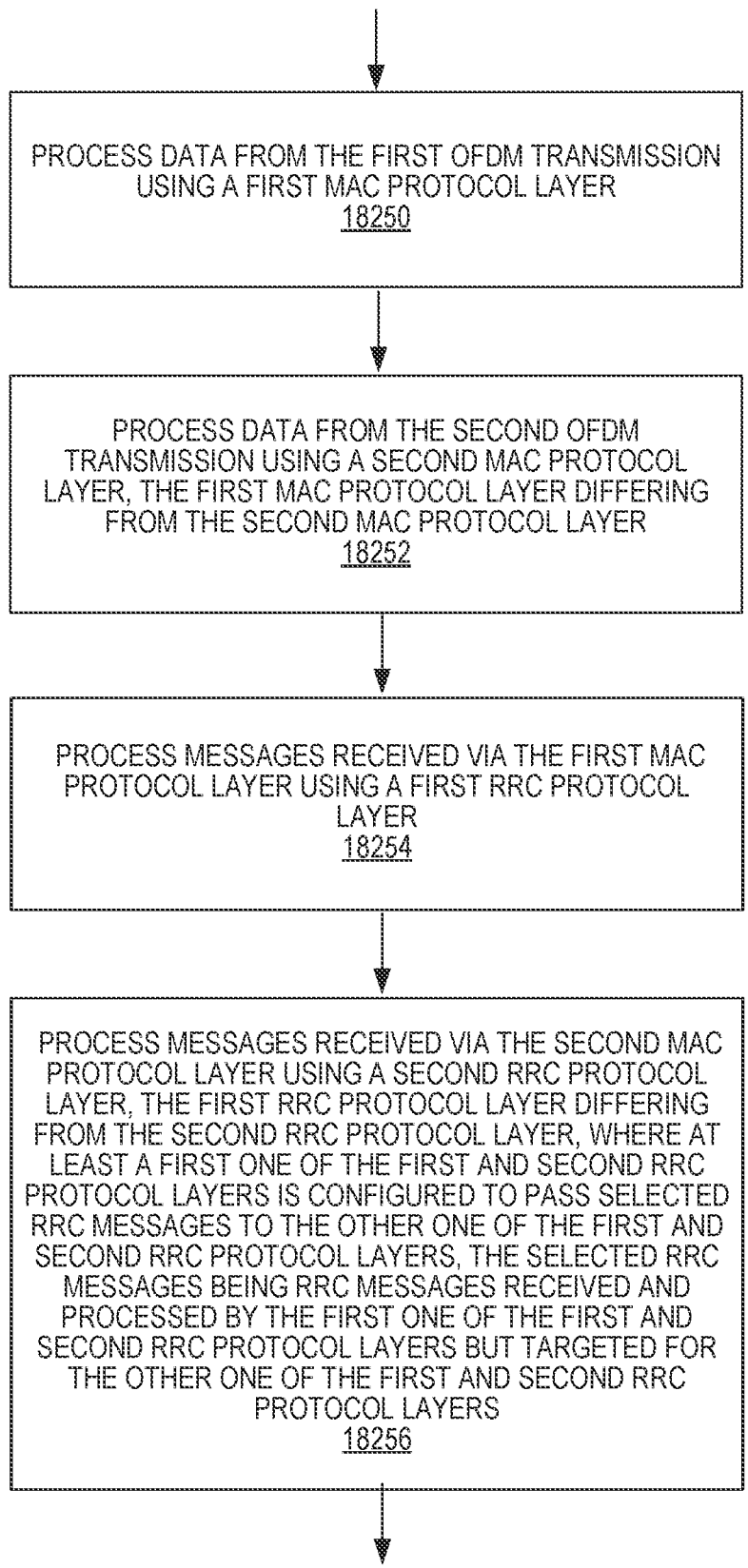

FIG. 185 is a process flow diagram illustrating an additional example method in a wireless device.

Figure 186:
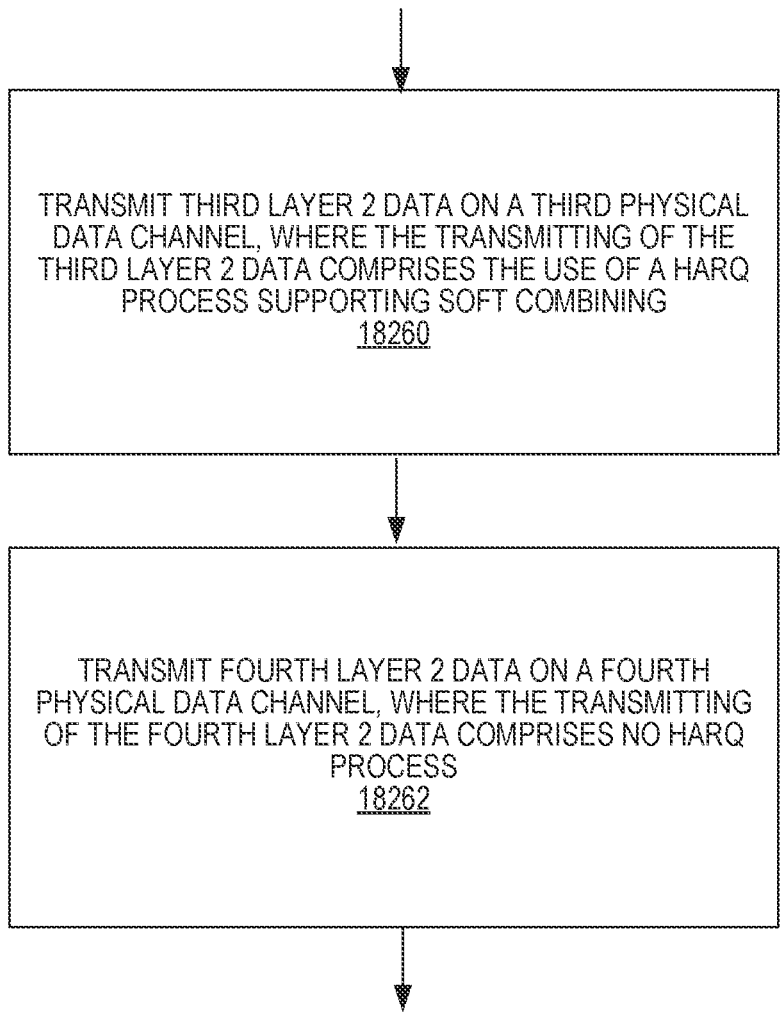

FIG. 186 is a process flow diagram illustrating an additional example method in a wireless device.

Figure 187:
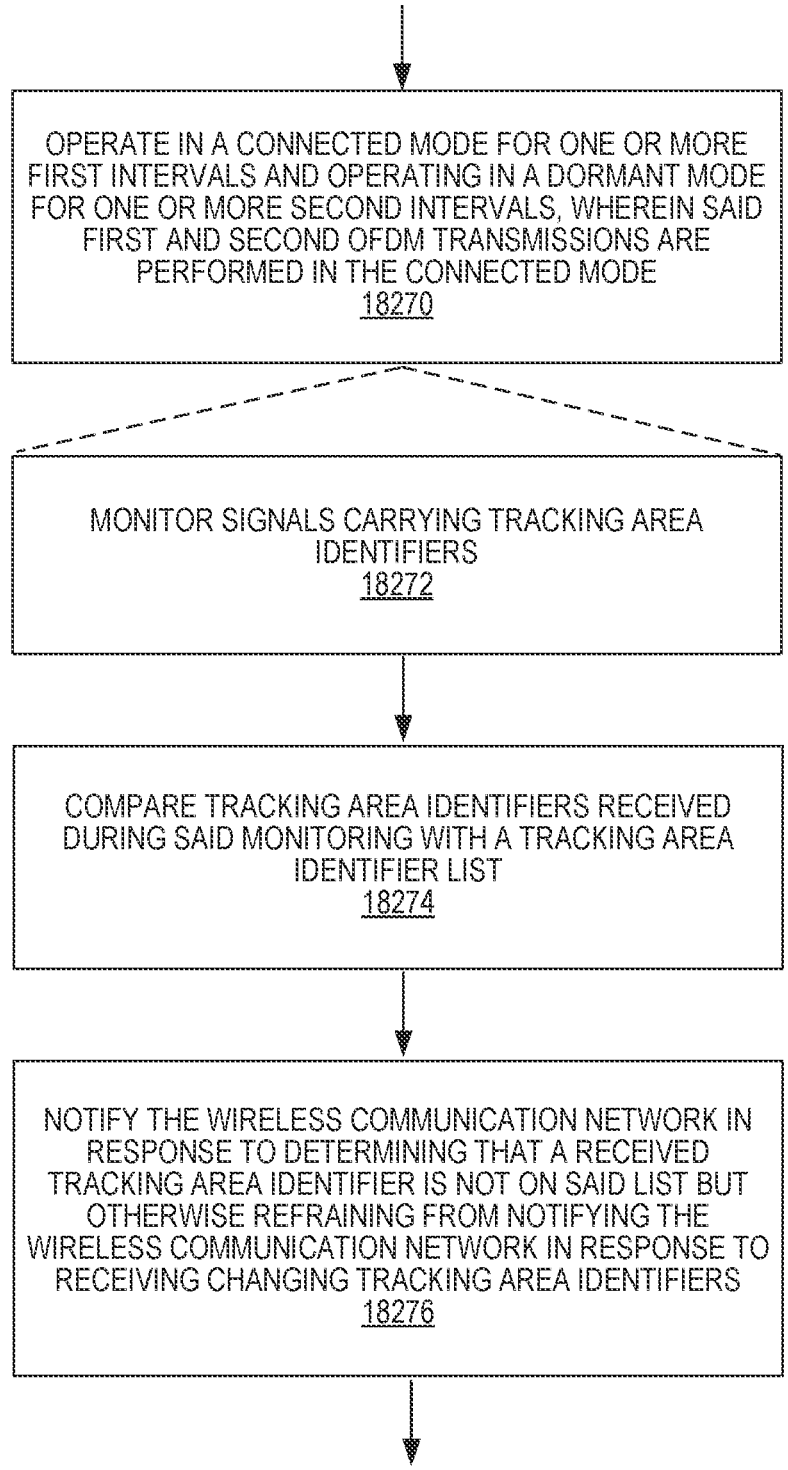

FIG. 187 is a process flow diagram illustrating an additional example method in a wireless device.

Figure 188:
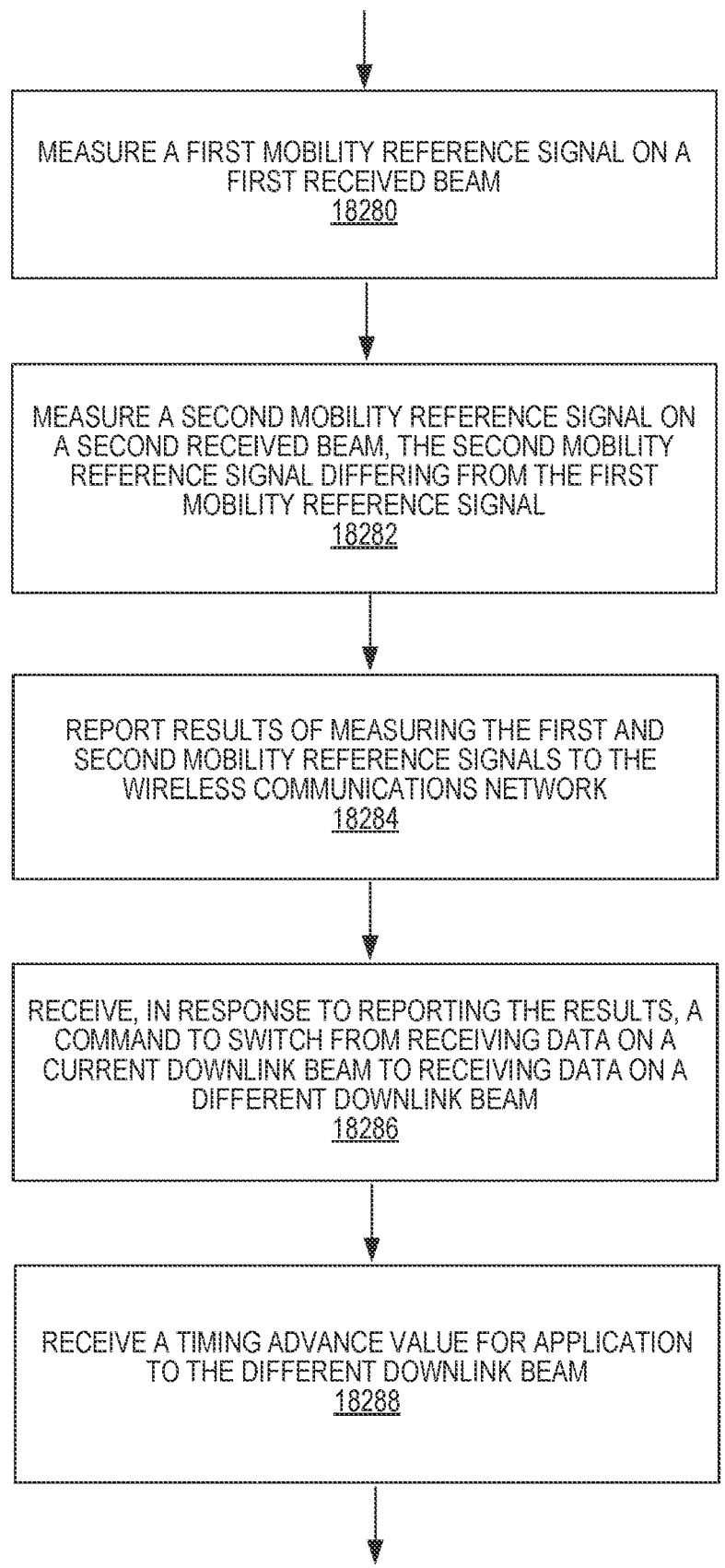

FIG. 188 is a process flow diagram illustrating an additional example method in a wireless device.

Figure 189:
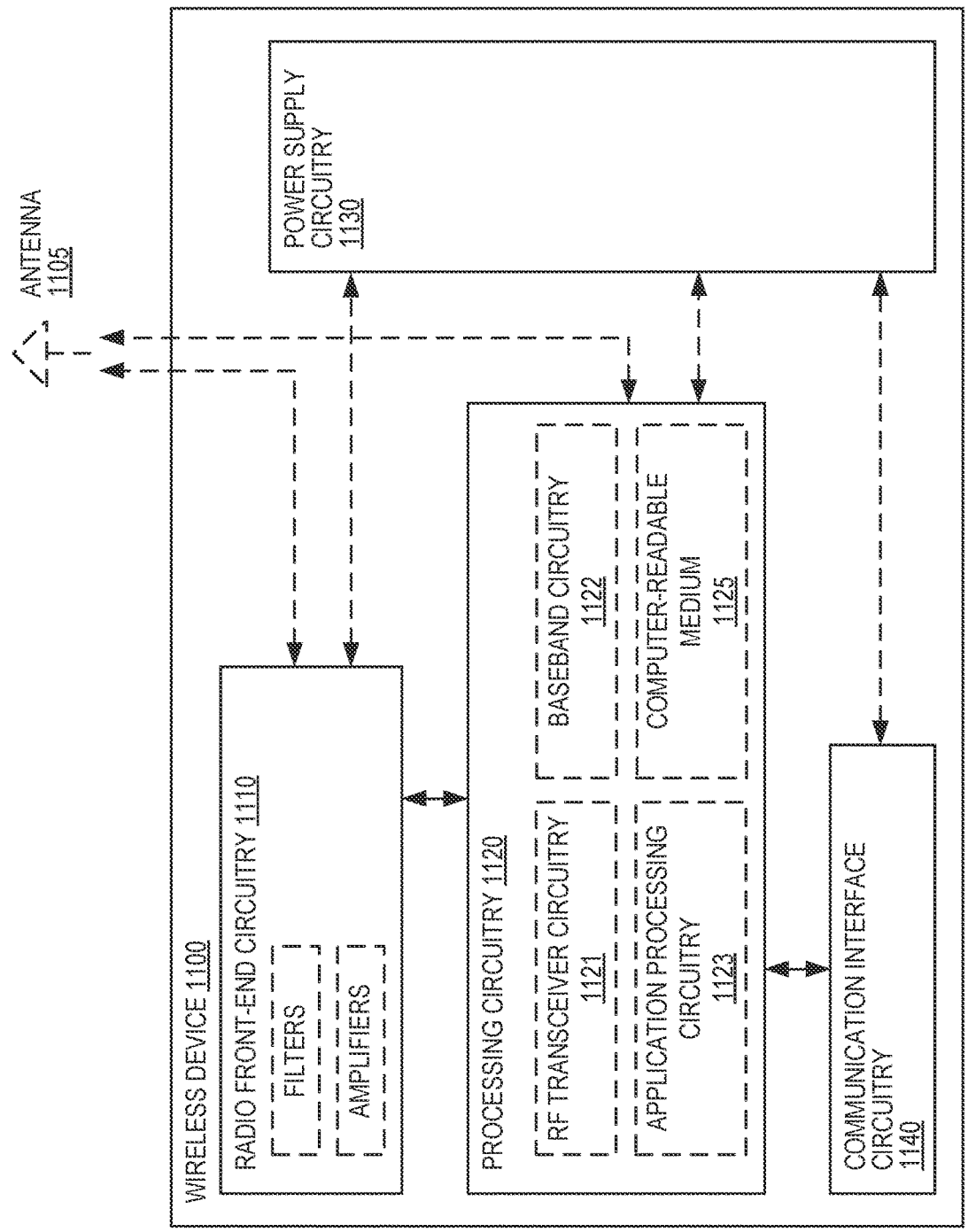

FIG. 189 is a block diagram illustrating example radio network equipment.

Figure 190:
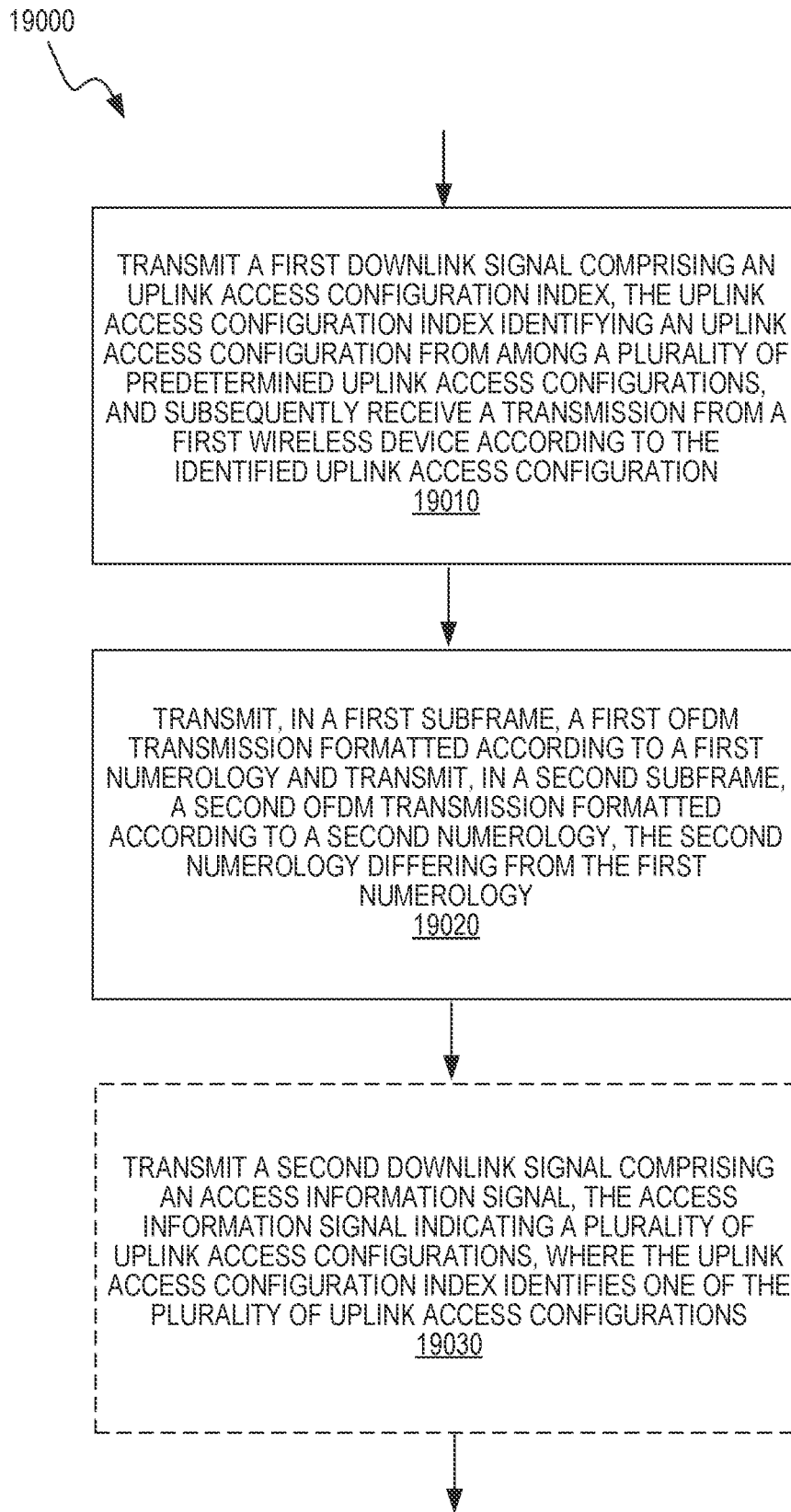

FIG. 190 is a process flow diagram illustrating an example method in radio network equipment.

Figure 191:
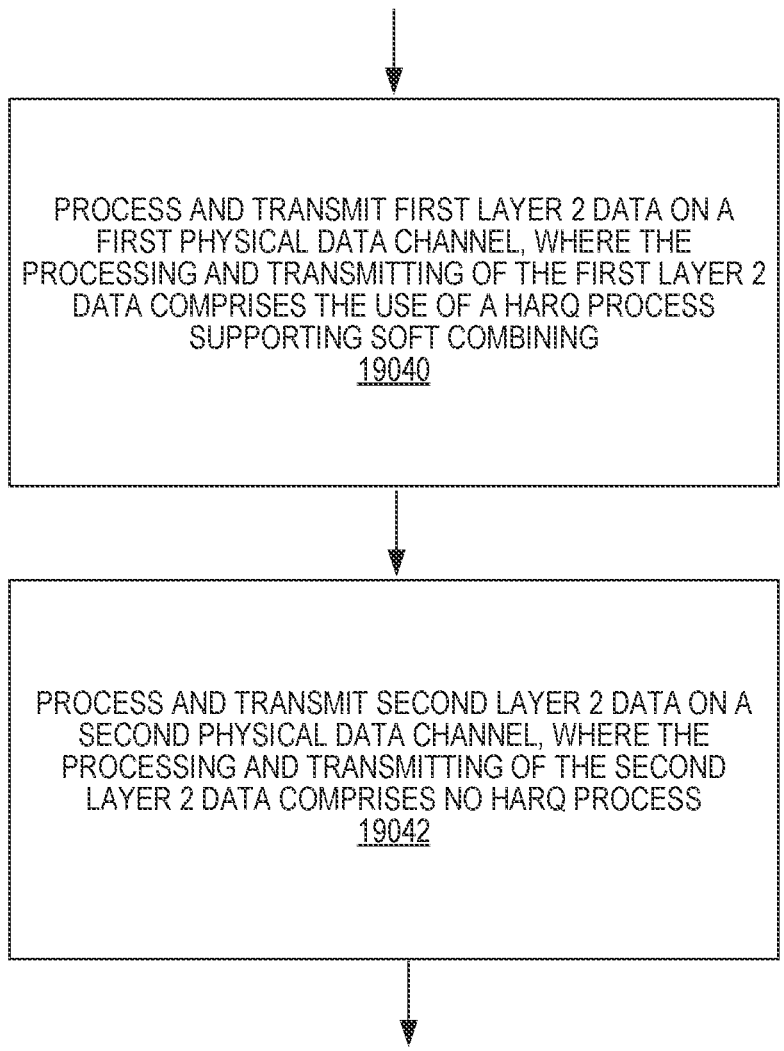

FIG. 191 is a process flow diagram illustrating an additional example method in radio network equipment.

Figure 192:
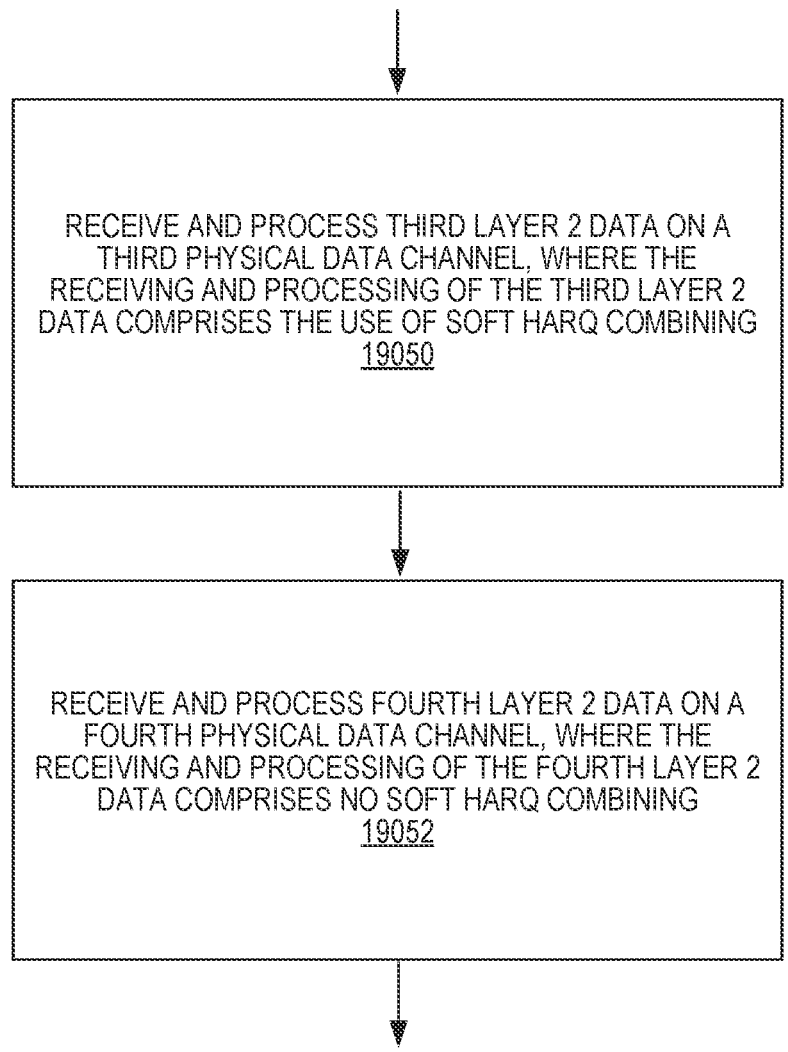

FIG. 192 is a process flow diagram illustrating an additional example method in radio network equipment.

Figure 193:
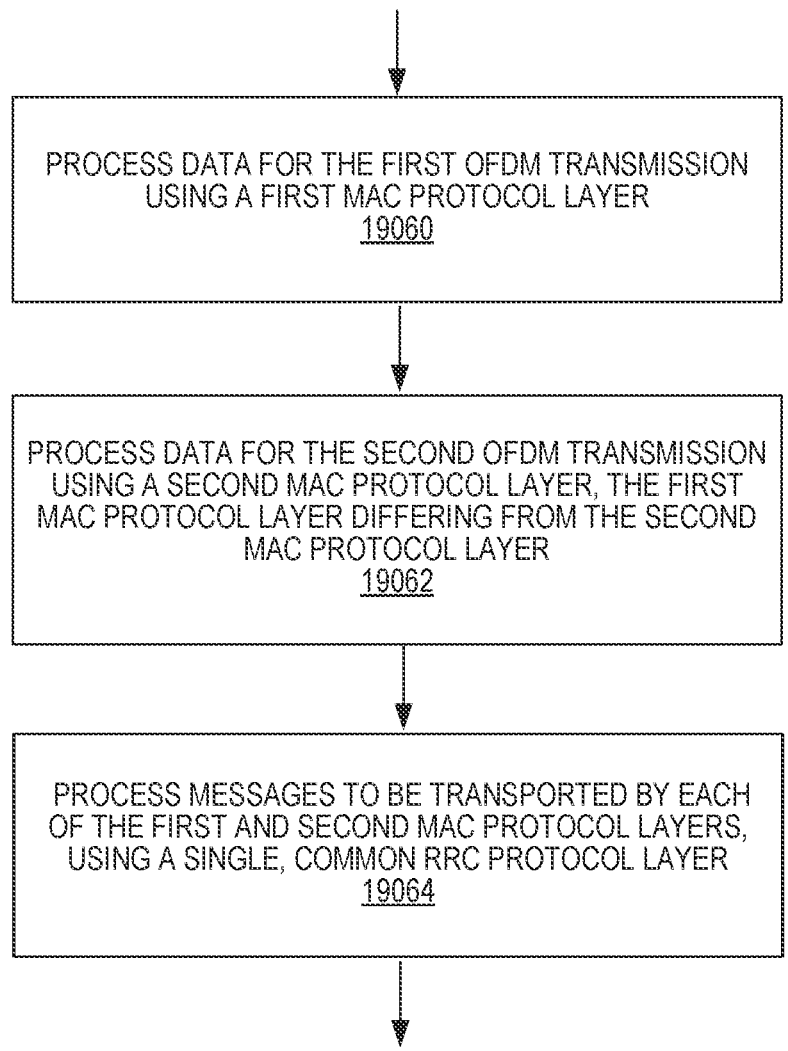

FIG. 193 is a process flow diagram illustrating an additional example method in radio network equipment.

Figure 194:
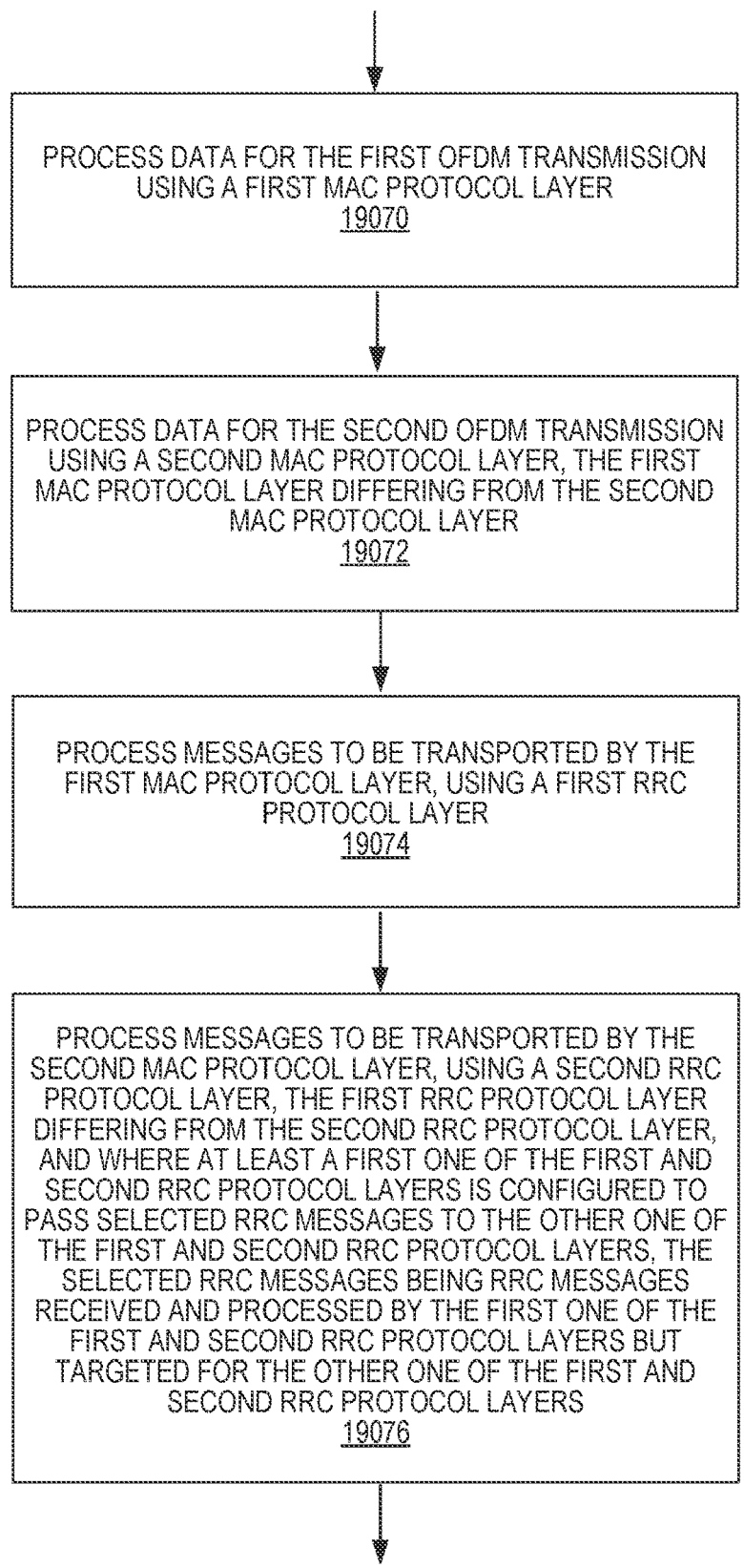

FIG. 194 is a process flow diagram illustrating an additional example method in radio network equipment.

Figure 195:
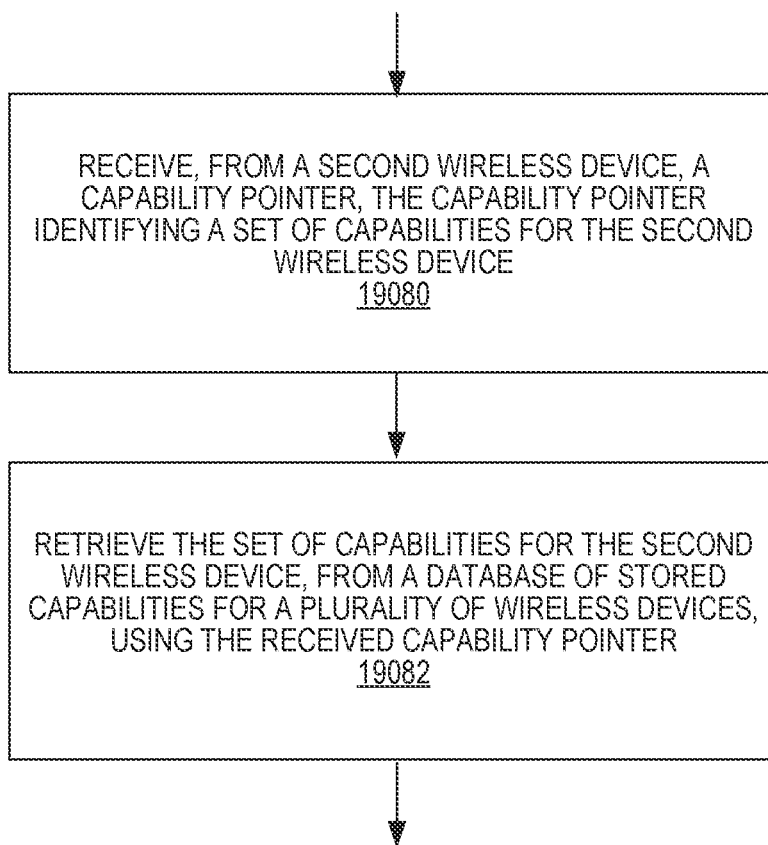

FIG. 195 is a process flow diagram illustrating an additional example method in radio network equipment.

Figure 196:
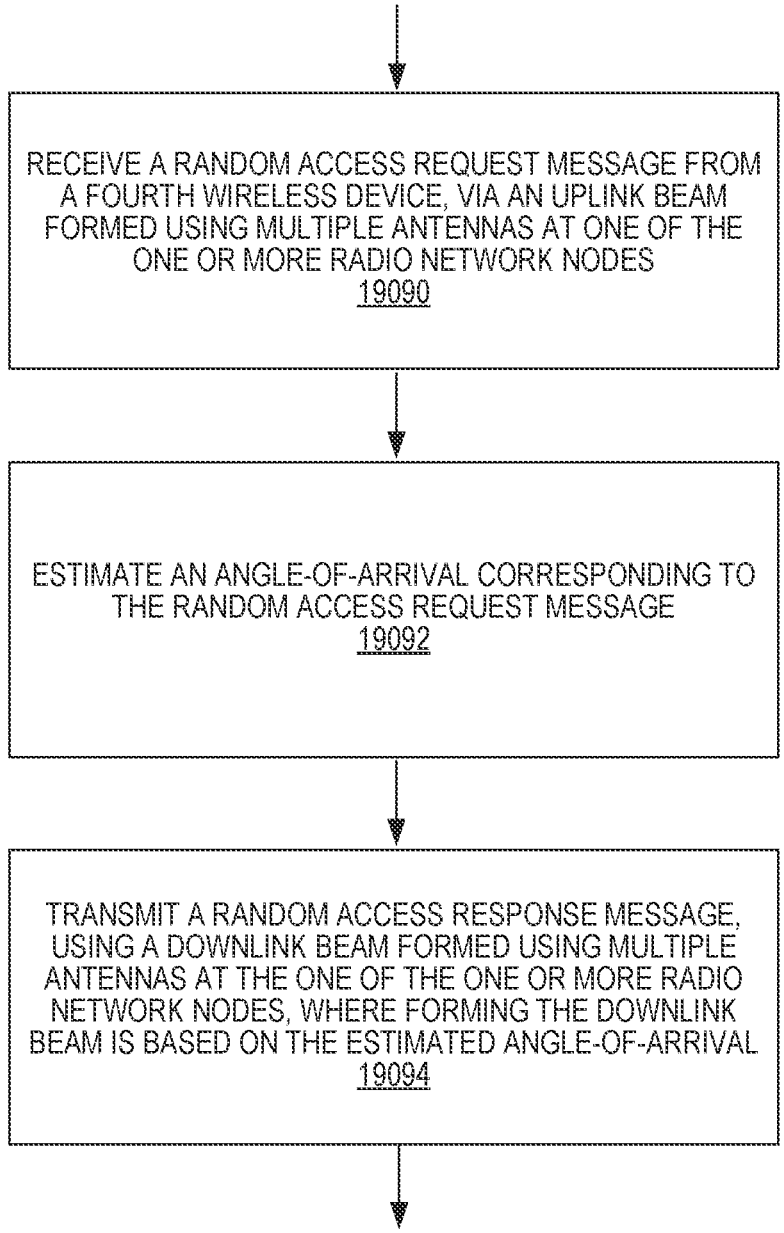

FIG. 196 is a process flow diagram illustrating an additional example method in radio network equipment.

Figure 197:
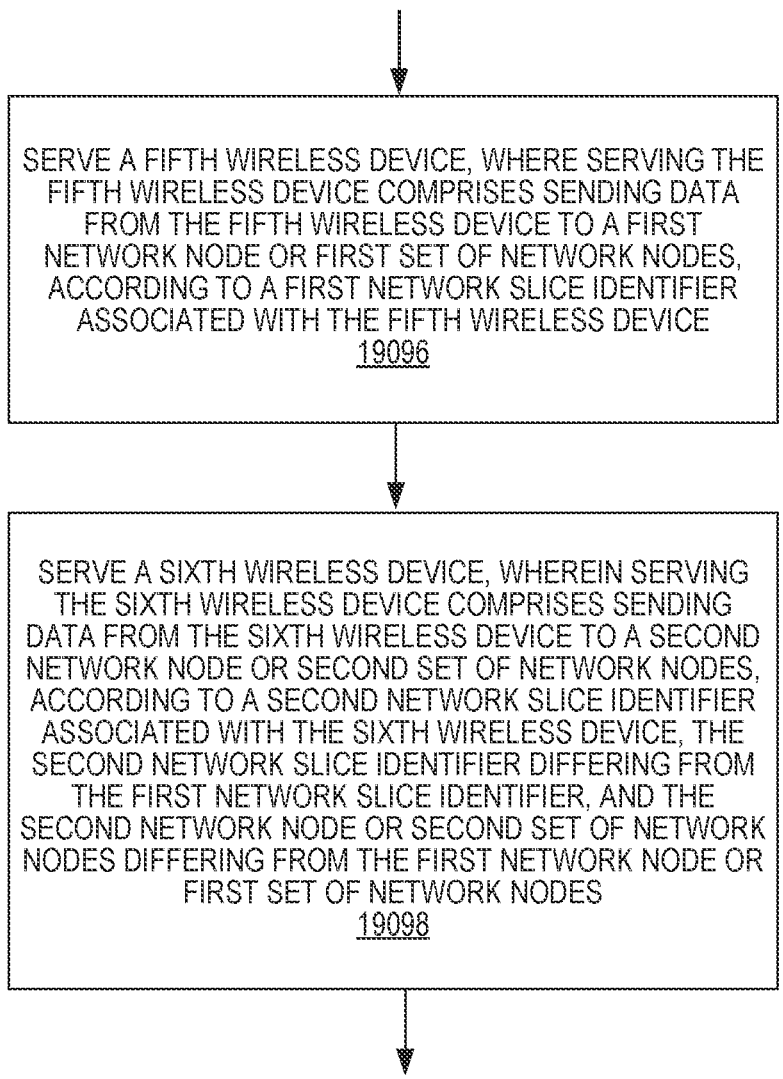

FIG. 197 is a process flow diagram illustrating an additional example method in radio network equipment.

Figure 198:
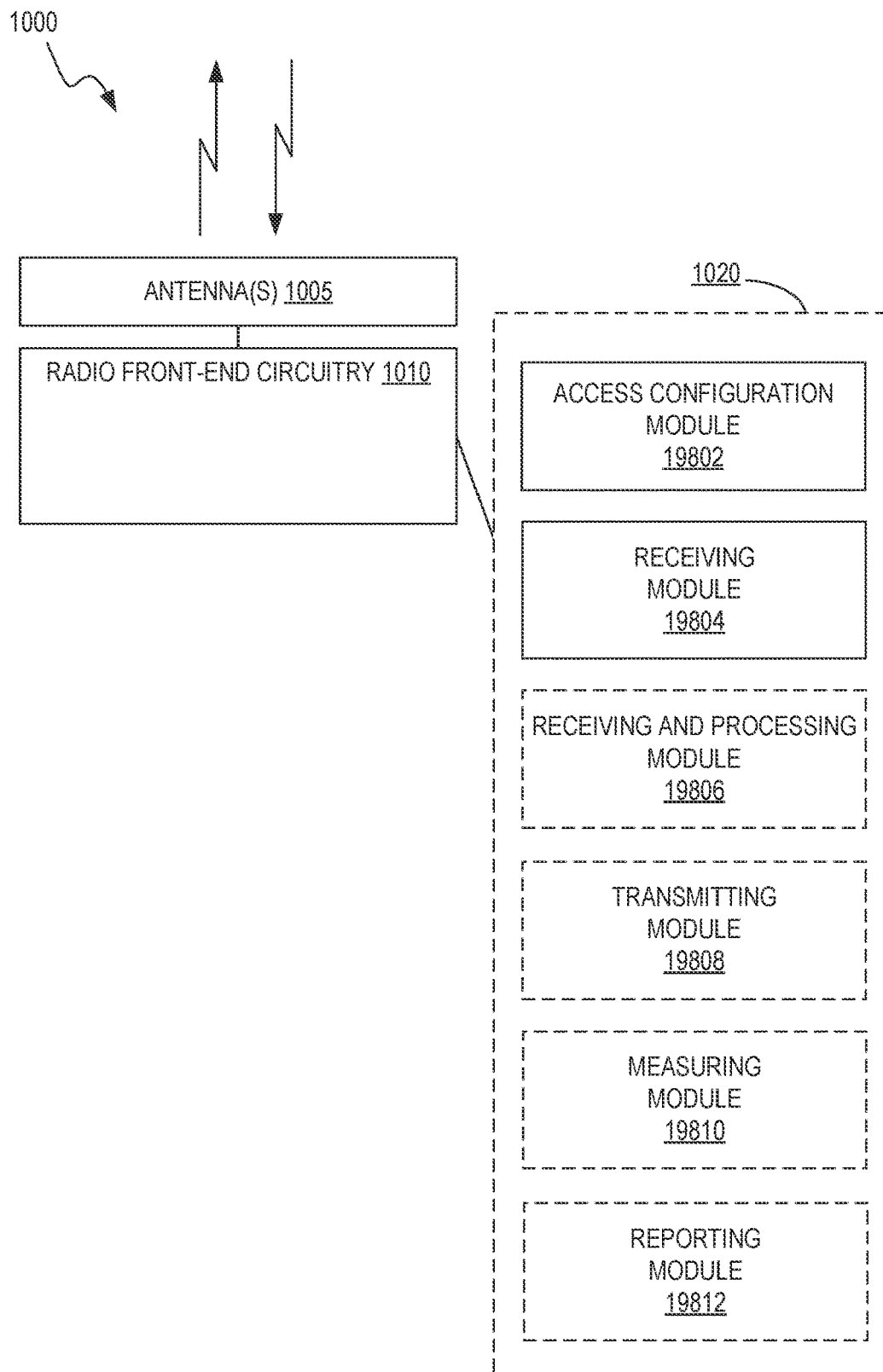

FIG. 198 is another representation of an example wireless device.

Figure 199:
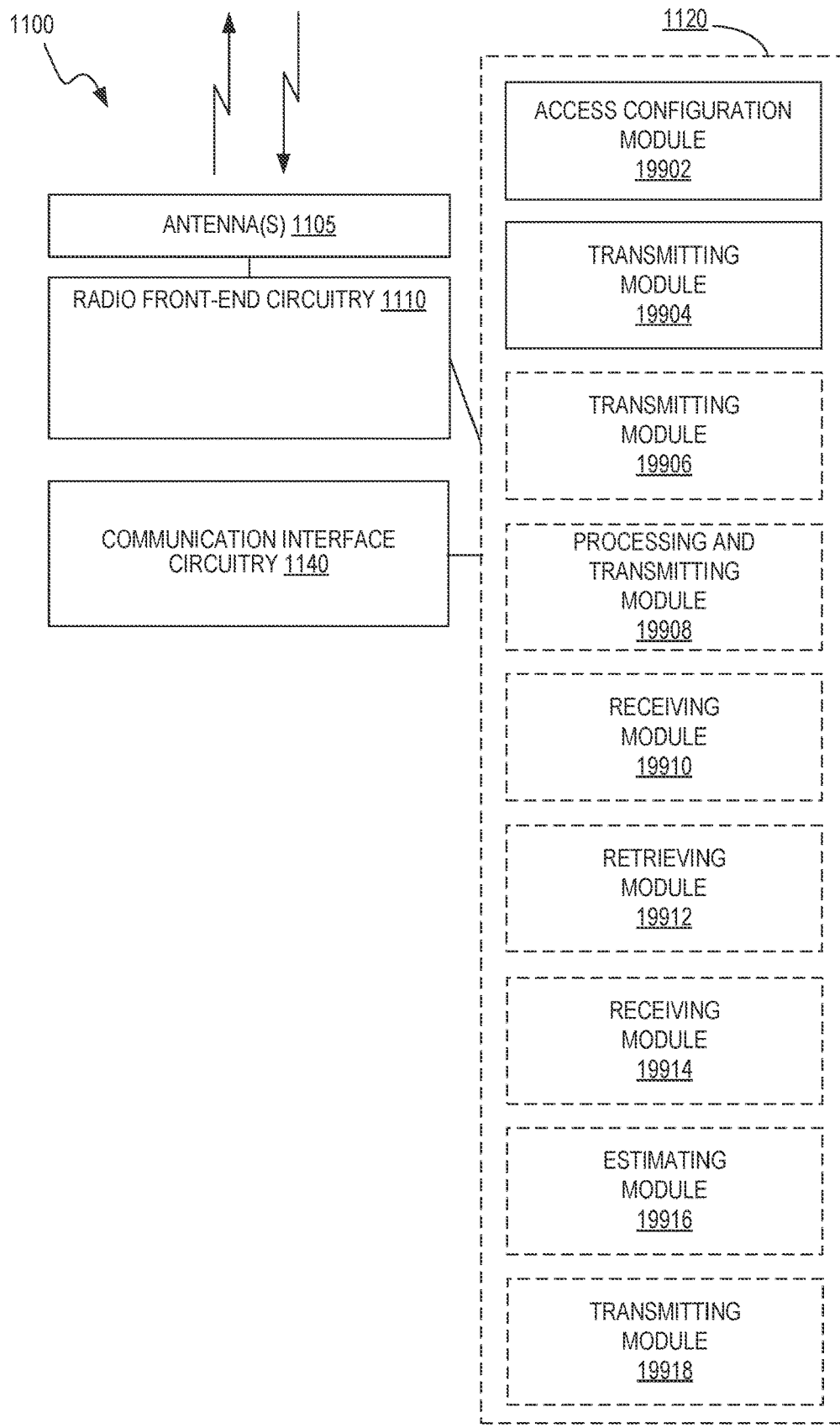

FIG. 199 is another representation of example radio network equipment.

DETAILED DESCRIPTION

Following are detailed descriptions of concepts, system/network architectures, and detailed designs for many aspects of a wireless communications network targeted to address the requirements and use cases for 5G. The terms "requirement," "need," or similar language are to be understood as describing a desirable feature or functionality of the system in the sense of an advantageous design of certain embodiments, and not as indicating a necessary or essential element of all embodiments. As such, in the following each requirement and each capability described as required, important, needed, or described with similar language, is to be understood as optional.

In the discussion that follows, this wireless communications network, which includes wireless devices, radio access networks, and core networks, is referred to as "NX." It should be understood that the term "NX" is used herein as simply a label, for convenience. Implementations of wireless devices, radio network equipment, network nodes, and networks that include some or all of the features detailed herein may, of course, be referred to by any of various names. In future development of specifications for 5G, for example, the terms "New Radio," or "NR," or "NR multi-mode" may be used—it will be understood that some or all of the features described here in the context of NX may be directly applicable to these specifications for NR. Likewise, while the various technologies and features described herein are targeted to a "5G" wireless communications network, specific implementations of wireless devices, radio network equipment, network nodes, and networks that include some or all of the features detailed herein may or may not be referred to by the term "5G." The present invention relates to all individual aspects of NX, but also to developments in other technologies, such as LTE, in the interaction and interworking with NX. Furthermore, each such individual aspect and each such individual development constitutes a separable embodiment of the invention.

NX, as described in detail below, targets new use cases, e.g. for factory automation, as well as (EMBB), and may be deployed in a wide range of spectrum bands, calling for high degree of flexibility. Licensed spectrum remains a cornerstone for NX wireless access but unlicensed spectrum (stand-alone as well as license-assisted) and various forms of shared spectrum (e.g. the 3.5 GHz band in the US) are natively supported. A wide range of frequency bands are supported, from below 1 GHz to almost 100 GHz. It is of principal interest to ensure that NX can be deployed in a variety of frequency bands, some targeting coverage at lower frequency regions below 6 GHz, some providing a balance of coverage, outdoor-to-indoor penetration and wide bandwidth up to 30 GHz, and finally some bands above 30 GHz that will handle wide bandwidth use cases, but possibly at a disadvantage to coverage and deployment complexity. Both FDD and dynamic TDD, where the scheduler assigns the transmission direction dynamically, are part of NX. However, it is understood that most practical deployments of NX will likely be in unpaired spectrum, which calls for the importance of TDD.

Ultra-lean design, where transmissions are self-contained with reference signals transmitted along with the data, minimizes broadcasting of signals. Terminals make no assumptions on the content of a subframe unless they are scheduled to do so. The consequence is significantly improved energy efficiency as signaling not directly related to user data is minimized.

Stand-alone deployments as well as tight interworking with LTE are supported. Such interworking is desirable for consistent user experience with NX when used at higher frequency ranges or at initial NX rollout with limited coverage. The radio-access network (RAN) architecture can handle a mix of NX-only, LTE-only, or dual-standard base stations. The eNBs are connected to each other via new interfaces that are expected to be standardized. It is envisioned that these new interfaces will be an evolution of the existing S1 and X2 interfaces to support features such as network slicing, on demand activation of signals, UP/CP splits in the CN, and support for a new connected dormant state, as described herein. As described below, LTE-NX base stations may share at least integrated higher radio interface protocol layers (PDCP and RRC) as well as a common connection to the evolved packet core (EPC).

NX separates dedicated data transmissions from system access functions. The latter include system information distribution, connection establishment functionality, and paging. Broadcast of system information is minimized and not necessarily transmitted from all nodes handling user-plane data. This separation benefits beamforming, energy efficiency, and support of new deployment solutions. In particular, this design principle allows densification to increase the user-plane capacity without increasing the signaling load.

A symmetric design with OFDM in both the downlink and the uplink directions is detailed below. To handle the wide range of carrier frequencies and deployments, a scalable numerology is described. For example, a local-area, high-frequency node uses a larger subcarrier spacing and a shorter cyclic prefix than a wide-area, low-frequency node. To support very low latency, a short subframe with fast ACK/NACK is proposed, with the possibility for subframe aggregation for less latency-critical services. Also, contention based access is part of NX to facilitate fast UE initiated access.

New coding schemes such as polar codes or various forms of LDPC codes may be used, instead of turbo codes, to facilitate rapid decoding of high data rates with a reasonable chip area. Long DRX cycles and a new UE state, RRC dormant, where the UE RAN context is maintained, allow fast transition to active mode with reduced control signaling.

Enabling full potential of multi-antenna technology is a cornerstone of the NX design. Hybrid beamforming is supported and advantages with digital beam forming are exploited. User-specific beamforming through self-contained transmission is advantageous for coverage, especially at high frequencies. For the same reason, UE TX beamforming is proposed as an advantageous component, at least for high frequency bands. The number of antenna elements may vary, from a relatively small number of antenna elements (e.g., 2 to 8) in LTE-like deployments to many hundreds, where a large number of active or individually steerable antenna elements are used for beamforming, single-user MIMO and/or multi-user MIMO to unleash the full potential of massive MIMO. Reference signals and MAC features are designed to allow exploiting reciprocity-based schemes. Multi-point connectivity, where a terminal is simultaneously connected to two or more transmission points, can be used to provide diversity/robustness, e.g. for critical MTC, by transmitting the same data from multiple points.

NX includes a beam-based mobility concept to efficiently support high-gain beam forming. This concept is transparent to both inter- and intra-eNB beam handover. When the link beams are relatively narrow, the mobility beams should be tracking UEs with high accuracy to maintain good user experience and avoid link failure. The mobility concept follows the ultra-lean design principle by defining a set of network configurable down-link mobility reference signals that are transmitted on demand, when mobility measurements from the UE are needed. Techniques are also described for up-link measurement based mobility, suitable base stations supporting reciprocity.

Access-backhaul convergence is achieved with access and backhaul links using the same air interface technology and dynamically sharing the same spectrum. This is particularly interesting at higher frequencies with large amounts of spectrum available, and where coverage is severely hampered by physical and practical constraints. Device-to-device communication where the network assigns resources for side-links is preferably an integral part of NX. For out-of-coverage scenarios, the terminals revert to preassigned side-link resources.

5G MBB services will require a range of different bandwidths. At the low end of the scale, support for massive machine connectivity with relatively low bandwidths will be driven by total energy consumption at the user equipment. In contrast, very wide bandwidths may be needed for high capacity scenarios, e.g., 4K video and future media. The NX air interface focuses on high bandwidth services, and is designed around availability of large and preferably contiguous spectrum allocations.

High-level requirements addressed by the NX system described herein include one or more of:
1) Support for higher frequency bands with wider carrier bandwidth and higher peak rates. Note that this requirement motivates a new numerology, as detailed below.
2) Support for lower latency, which requires shorter and more flexible Transmission Time Intervals (TTIs), new channel structures, etc.
3) Support for very dense deployments, energy efficient deployments and heavy use of beam forming, enabled by, for example removing legacy limitations in relation to CRS, PDCCH, etc.
4) Support of new use cases, services and customers such as MTC scenarios including V2X, etc. This can include more flexible spectrum usage, support for very low latency, higher peak rates etc.

Following is a description of the NX architecture, followed by a description of the radio interface for NX. Following that is a description of a variety of technologies and features that are supported by the NX architecture and radio interface. It should be understood that while the following detailed description provides a comprehensive discussion of many aspects of a wireless communications system, where numerous advantages are obtained by combinations of many of the described features and technologies, it is not necessary for all the technologies and features described herein to be included in a system for the system to benefit from the disclosed technologies and features. For example, while details of how NX may be tightly integrated with LTE are provided, a standalone version of NX is also eminently practical. More generally, except where a given feature is specifically described herein as depending on another feature, any combination of the many technologies and features described herein may be used to advantage.

1 NX Architecture 1.1 Overview of Logical Architecture

The NX architecture supports both stand-alone deployments and deployments that may be integrated with LTE or, potentially, any other communication technology. In the following discussion, there is a lot of focus on the LTE integrated case. However, it should be noted that similar architecture assumptions also apply to the NX stand-alone case or to integration with other technologies.

Figure 1:
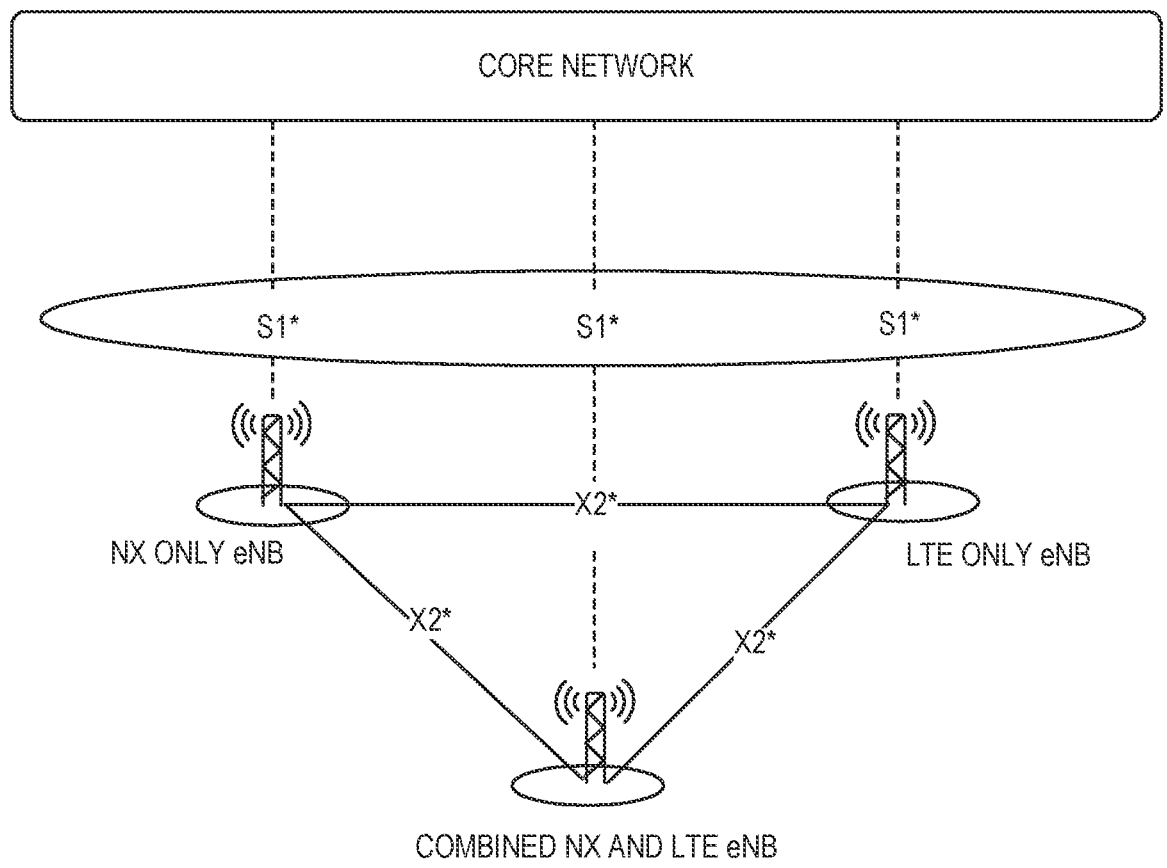
FIG. 1 illustrates a high-level logical architecture for NX and LTE.

FIG. 1 shows the high level logical architecture for an example system supporting both NX and LTE. The logical architecture includes both NX-only and LTE-only eNBs, as well as eNBs supporting both NX and LTE. In the illustrated system, the eNBs are connected to each other with a dedicated eNB-to-eNB interface referred to here as the X2* interface, and to the core network with a dedicated eNB-to-CN interface referred to here as the S1* interface. Of course, the names of these interfaces may vary. As seen in the figure, a core network/radio access network (CN/RAN) split is evident, as was the case with the Evolved Packet Subsystem (EPS).

The S1* and X2* interfaces may be an evolution of the existing S1 and X2 interfaces, to facilitate the integration of NX with LTE. These interfaces may be enhanced to support multi-RAT features for NX and LTE Dual Connectivity (DC), potentially new services (IoT or other 5G services), and features such as network slicing (where, for example, different slices and CN functions may require a different CN design), on demand activation of mobility reference signals, new multi-connectivity solutions, potentially new UP/CP splits in the CN, support for a new connected dormant state, etc.

Figure 2:
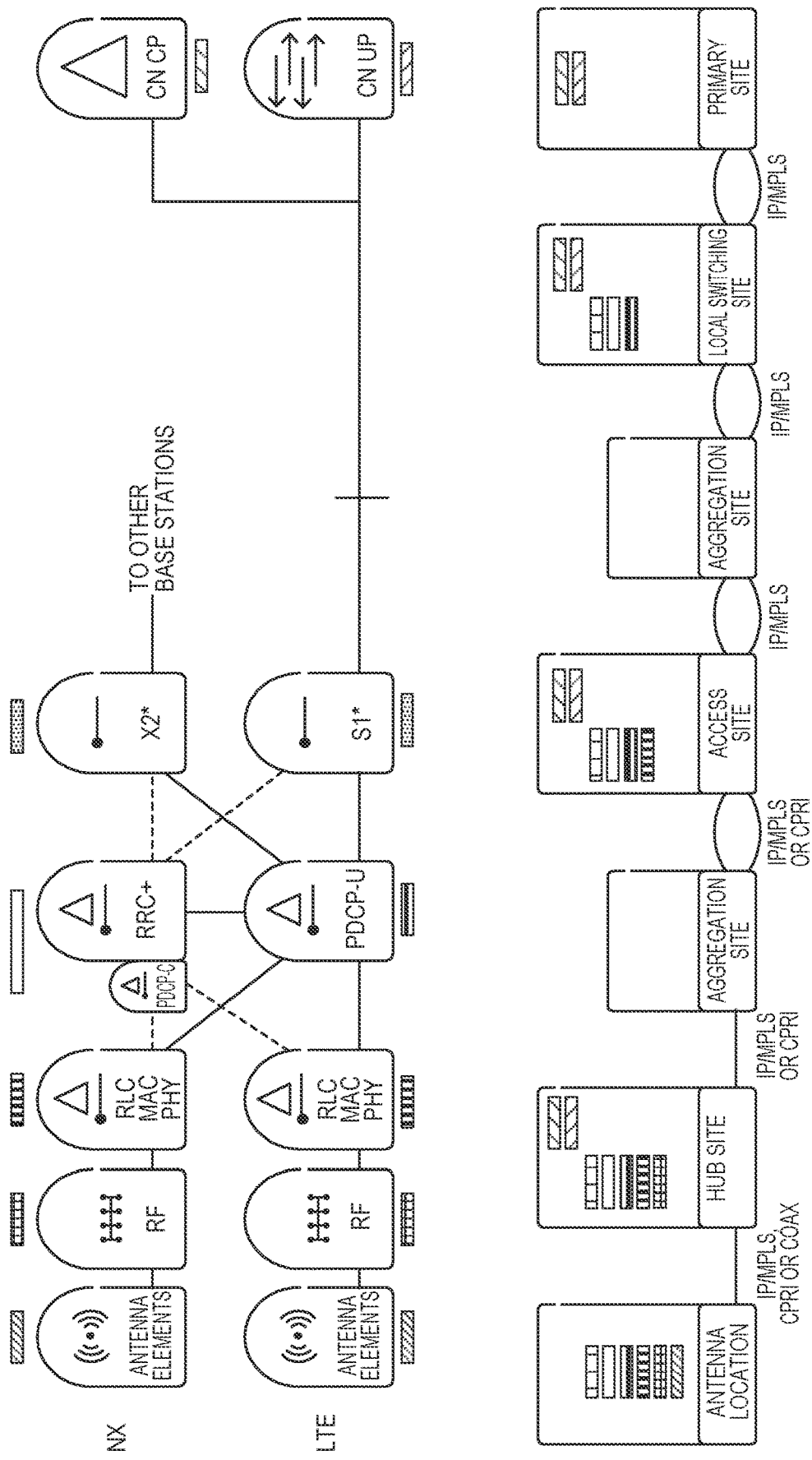
FIG. 2 shows an NX and LTE logical architecture.

FIG. 2 shows the same logical architecture as FIG. 1, but now also includes an example of an internal eNB architecture, including possible protocols splits and mapping to different sites.

Following are features of the architecture discussed herein:
  LTE and NX share at least integrated higher radio interface protocol layers (PDCP and RRC) as well as a common S1* connection to the evolved packet core (EPC).
  The RLC/MAC/PHY protocols in NX may differ from LTE, meaning Carrier Aggregation (CA) solutions may, in some cases be restricted to intra-RAT LTE/NX.
  Different options for how the RRC layer integration is realized are discussed in section 2.
  The usage of LTE or NX for 5G capable UEs can be transparent to the EPC (if desired).
  The RAN/CN functional split over S1* is based on the current split used over S1. Note, however that this does not exclude enhancements to the S1* compared to S1, e.g., to support new features such as network slicing.

The 5G network architecture supports flexible placement (deployment) of CN (EPC) functionality per user/flow/network slice.
  This includes placement of EPC UP functions closer to RAN (e.g., in a local GW) to allow for optimized routing and low latency.
  It may also include EPC CP functions closer to RAN to support stand-alone network operation (potentially all the way to the hub site, as illustrated in FIG. 2).
Centralization of PDCP/RRC is supported. The interface between PDCP/RRC and lower layer entities need not be standardized (although it can be), but can be proprietary (vendor-specific).
  The radio interface is designed to support architecture flexibility (allowing for multiple possible functional deployments, e.g., centralized/distributed).
  The architecture also supports fully distributed PDCP/RRC (as is the case with LTE, today).
To support NX/LTE dual connectivity with centralized PDCP and RRC, NX supports a split somewhere between the RRC/PDCP layers and the Physical layer, e.g., at the PDCP layer. Flow control may be implemented on X2*, supporting the split of PDCP and RLC in different nodes.
PDCP is split into a PDCP-C (used for SRBs) and PDCP-U (used for URBs) part, which can be implemented and deployed in different places.
The architecture supports CPRI-based splits between RU and BBU, but also other splits where some processing is moved to the RU/Antenna in order to lower the required fronthaul BW towards the BBU (e.g., when supporting very large BW, many antennas).

Note that despite the above discussion, alternative RAN/CN splits are possible, while still maintaining many of the features and advantages described herein.

1.2 UE States in NX and LTE 1.2.1 Introduction

This section discusses the different UE states in NX and LTE with focus on the UE sleep states. In LTE, two different sleep states are supported:
  ECM_IDLE/RRC_IDLE, where only the Core Network (CN) context is stored in the UE. In this state, the UE has no context in the RAN and is known on Tracking Area (or Tracking Area List) level. (The RAN context is created again during transition to RRC_CONNECTED.) Mobility is controlled by the UE, based on cell reselection parameters provided by the network.
  ECM_CONNECTED/RRC_CONNECTED with UE configured DRX. In this state the UE is known on cell level and the network controls the mobility (handovers).

Out of these two states, ECM_IDLE/RRC_IDLE is the primary UE sleep state in LTE for inactive terminals. RRC_CONNECTED with DRX is also used, however the UE is typically released to RRC_IDLE after X seconds of inactivity (where X is configured by the operator and typically ranges from 10 to 61 seconds). Reasons why it may be undesirable to keep the UE longer in RRC_CONNECTED with DRX include limitations in eNB HW capacity or SW licenses, or other aspects such as slightly higher UE battery consumption or a desire to keep down the number of Handover Failures (KPI).

Since operators configure the RRC connected timer to be quite short, data from live LTE networks shows that UEs typically on average perform ten times more ECM_IDLE to ECM_CONNECTED state transitions than X2 handovers, indicating that for many state transitions the UE returns in the same eNB or cell as it was before. Data from live networks also shows that the majority of the RRC connections transfer less than 1 Kbyte of data.

Given that initiating data transmission from ECM_IDLE in LTE involves significantly more signaling compared to data transmission from "RRC_CONNECTED with DRX", the "RRC_CONNECTED with DRX" state is enhanced in NX to become the primary sleep state. The enhancement includes adding support for UE controlled mobility within a local area, thus avoiding the need for the network to actively monitor the UE mobility. Note that this approach allows for the possibility that the LTE solution can be further evolved to create a common RRC Connected sleep state for NX and LTE.

The following are features of this NX UE sleep state, which is referred to herein as RRC_CONNECTED DORMANT (or RRC DORMANT for short):
  It supports DRX (from ms to hours).
  It supports UE-controlled mobility, e.g., the UE may move around in a Tracking RAN Area (TRA) or TRA list without notifying the network (TRA (lists) span across LTE and NX).
  Transition to and from this state is fast and lightweight (depending on the scenario, whether optimized for energy saving or fast access performance), enabled by storing and resuming the RAN context (RRC) in the UE and in the network (see Section 2.1.5.6).

When it comes to detailed solutions how this RRC DORMANT state is supported, there are different options based on different level of CN involvement. One option is as follows:
  The CN is unaware of whether the UE is in RRC_CONNECTED DORMANT or RRC_CONNECTED ACTIVE (described later), meaning the S1* connection is always active when UE is in RRC_CONNECTED, regardless of sub state.
  A UE in RRC DORMANT is allowed to move around within a TRA or TRA list without notifying the network.
    Paging is triggered by the eNB when a packet arrives over S1*. The MME may assist the eNB by forwarding page messages when there is no X2* connectivity to all the eNBs of the paging area.
    When the UE contacts the network from RRC DORMANT in a RAN node that does not have the UE context, the RAN node tries to fetch the UE context from the RAN node storing the context. If this is successful, the procedure looks like an LTE X2 handover in the CN. If the fetch fails, the UE context is re-built from the CN.
  The area that the UE is allowed to move around without notifying the network may comprise a set of Tracking RAN Areas, and covers both LTE and NX RAT, thus avoiding the need to signal when switching RAT in RRC DORMANT.

In addition to the RRC DORMANT state (optimized for power saving), there is an RRC_CONNECTED ACTIVE (RRC ACTIVE) state used for actual data transmission. This state is optimized for data transmissions, but allows the UE to micro-sleep, thanks to DRX configuration, for scenarios when no data is transmitted but a very quick access is desired. This may be referred to as monitoring configuration within the RRC ACTIVE state. In this state, the UE cell or beam level mobility is controlled and known by the network.

1.2.2 Consideration About UE States with Tight Integration of NX and LTE

Considering tight integration between NX and LTE, (see Section 2.7) the desire to have a RAN controlled sleep state in NX drives requirements to also support a RAN-controlled sleep state in LTE for NX/LTE capable UEs.

The reason for this is that to support tight NX and LTE integration, a common S1* connection is desirable for LTE and NX. If a RAN-controlled sleep state is introduced on the NX side, it would be very beneficial to have similar sleep state on the LTE side, also with an active S1* connection, so that the sleeping UE can move between NX and LTE without performing signaling to setup and tear down the S1* connection. This type of inter-RAT re-selection between LTE and NX may be quite common, especially during early deployments of NX. Accordingly, a common RAN based sleep state called RRC_CONNECTED DORMANT should be introduced in LTE. The UE behavior in this state is similar to what is defined for LTE RRC suspend/resume, however the paging is done by the RAN and not by the CN, since the S1* connection is not torn down when RRC is suspended.

Similarly, a common RRC_CONNECTED ACTIVE state between NX and LTE is desirable. This state is characterized in that the NX/LTE capable UE is active in either NX or LTE or both. Whether the UE is active in NX or LTE or both is a configuration aspect within the RRC ACTIVE state, and these conditions need not be regarded as different sub states, since the UE behavior is similar regardless which RAT is active. To give one example, in the case only one of the links is active, regardless of which link, the UE is configured to transmit data in one and to perform measurements in another one for dual-connectivity and mobility purposes. More details are given in section 2.

1.2.3 Description of the NX/LTE States

Figure 3:
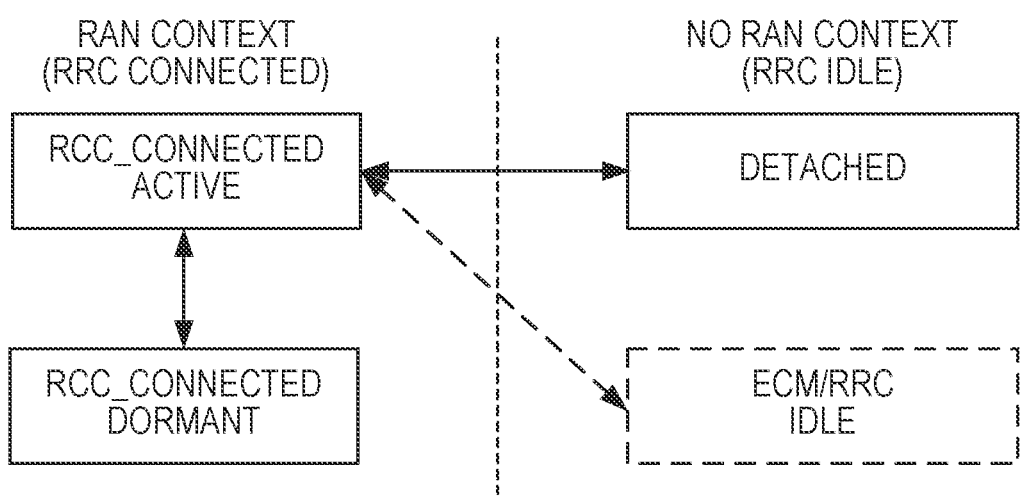
FIG. 3 illustrates LTE/NX UE states.

FIG. 3 shows the UE states in an LTE/NX where LTE supports the common RRC_CONNECTED ACTIVE and RRC_CONNECTED DORMANT states discussed above. These states are described further below.

Detached (Non RRC Configured)
  EMM_DETACHED (or EMM_NULL) state defined in Evolved Packet Subsystem (EPS) when the UE is turned off or has not yet attached to the system.
  In this state the UE does not have any IP address and is not reachable from the network.
  Same EPS state is valid for both NX and LTE accesses.

ECM/RRC_IDLE
  This is similar to the current ECM_IDLE state in LTE.
    This state may be optional.
    In the event this state is kept, it is desirable for the paging cycles and Tracking RAN Areas to be aligned between RAN-based paging in RRC DORMANT and CN-based paging in ECM_IDLE, since then the UE could listen to both CN- and RAN-based paging making it possible to recover the UE if the RAN based context is lost.

RRC_CONNECTED ACTIVE (RRC State)
  UE is RRC-configured, e.g., it has one RRC connection, one S1* connection and one RAN context (including a security context), where these may be valid for both LTE and NX in the case of dual-radio UEs.
  In this state it is possible, depending on UE capabilities, to transmit and receive data from/to NX or LTE or both (RRC configurable).
  In this state the UE is configured with at least an LTE Serving Cell or an NX serving beam and can quickly set up dual connectivity between both NX and LTE when needed. The UE monitors downlink scheduling channels of at least one RAT and can access the system via for instance scheduling requests sent in the UL.
  Network controlled beam/node mobility: UE performs neighboring beam/node measurements and measurement reports. In NX, the mobility is primarily based on NX signals such as TSS/MRSs and in LTE, PSS/SSS/CRS is used. NX/LTE knows the best beam (or best beam set) of the UE and its best LTE cell(s).
  The UE may acquire system information via SSI/AIT, for example, and/or via NX dedicated signaling or via LTE system information acquisition procedure.
  UE can be DRX configured in both LTE and NX to allow micro-sleeps (in NX sometimes referred as beam tracking or monitoring mode). Most likely the DRX is coordinated between RATs for UEs active in both RATs.
  The UE can be configured to perform measurements on a non-active RAT which can be used to setup dual connectivity, for mobility purposes or just use as a fallback if the coverage of the active RAT is lost.

RRC_CONNECTED DORMANT (RRC state)
  UE is RRC-configured, e.g., the UE has one RRC connection and one RAN context regardless of the access.
  UE can be monitoring NX, LTE, or both, depending on coverage or configuration. RRC connection re-activation (to enter RRC ACTIVE) can be either via NX or LTE.
  UE-controlled mobility is supported. This can be cell re-selection in the case of only LTE coverage or NX Tracking RAN Area selection in the case of NX-only coverage. Alternatively, this can be a jointly optimized cell/area reselection for overlapping NX/LTE coverage.
  UE-specific DRX may be configured by RAN. DRX is largely used in this state to allow different power saving cycles. The cycles can be independently configured per RAT, however some coordination might be required to ensure good battery life and high paging success rate. Since the NX signals have configurable periodicity there are methods that allow the UE to identify the changes and adapt its DRX cycles.
  UE may acquire system information via SSI/AIT in NX or via LTE. UE monitors NX common channels (e.g., NX paging channel) to detect incoming calls/data, AIT/SSI changes, ETWS notification and CMAS notification.
    UE can request system information via a previously configured RACH channel.

2 Radio Interface: Functions, Procedures, Channels, and Signals

In this section the radio interface functions and services provided by the different protocol layers, as well as preferred functional concepts of the different layers are documented. In Section 2.1 the Radio Resource Control (RRC) protocol is described, in section 2.2 the MAC layer is described, and, finally, in Section 2.3, the Physical layer is described. Some RAN functions formally stretch over multiple layers but may still be described in one section to simplify the presentation. In some cases, the corresponding protocol aspects may be documented in Section 3.

2.1 Radio Resource Control (RRC) Protocol 2.1.1 Description

RRC is a signaling protocol used to configure and control the UE. RRC relies on lower layers for security (encryption and integrity protection), segmentation and reliable in-order delivery of signaling messages. No detailed assumptions are made regarding when an RRC message is delivered that makes the RRC messages asynchronous to the radio timing.

RRC is suitable for messages of any size requiring reliable delivery such as UE configuration.

2.1.2 Functions Provided

Many of the same basic functions and procedures as defined in LTE RRC are also used in NX RRC, like security and connection control, measurement configuration, etc. However, new functionalities are described herein. One new functionality is that the RRC protocol handles both NX standalone operation as well as NX and LTE joint operation, while keeping the NX and LTE related configurations of lower layers self-contained. Further design principles to realize the tight integration from the RRC point of view are:

- Fast state transition from dormant (see Section 1) to active mode is provided. This is achieved by storing the UE context at RAN.
- Dormant state mobility is provided, where the UE is capable of moving between RATs and nodes (within routing area) without notifying the network.
- RAN paging while in dormant mode is supported, across NX and LTE.
- Coordinated state transition where state transitions occur jointly in both RATs is supported.
- RRC signalling is optimized so that radio links on both RATs can be established/moved/released at the same time.
- The S1* connection can be sustained without any additional connection setup when switching between LTE and NX.
- Flexible procedures where both combined and independent configuration (one layer) are supported. This can apply to setup, mobility, reconfiguration and release of radio links.
- The design is future-proof, so that new RRC functionalities (e.g., to cover new use cases and support for network slicing) can be added without major impact to the specifications.

Architectures that realize these design principles can be categorized into two options: Single RRC protocol and Dual RRC protocol, as discussed in Sections 2.1.4.1 and 2.1.4.2, respectively.

Other new functionalities of NX RRC include support for the new dormant state, as discussed in Section 1, and new ways to deliver system information, see chapter 3.2. Beam-based mobility management, as discussed in chapter 3.5, may drive additional changes. A new framework for UE capability signaling is described in section 2.1.5.3.

RRC is involved in the Non Access Stratum (NAS) message exchange between UE and CN, and provides various control-plane functions both on UE and eNB:

- Connection management:
  - RRC connection establishment, maintenance and release
  - RRC connection inactivation and re-activation
  - Radio bearer connection establishment, maintenance and release
  - Multi-connectivity configurations
  - UE paging
  - UE capability transfer
- Radio resource management:
  - Configuration of radio resources for RRC connection and configuration of lower layers
  - Radio configuration control including e.g., assignment/modification of ARQ configuration, HARQ configuration, DRX configuration
  - Measurement configuration and mobility control
  - UE measurement reporting and control of the reporting
  - Mobility functions (intra/inter-frequency handover, and inter-RAT handover)
  - Radio Access Control, e.g., access class barring
- Service management and security:
  - MBMS services
  - QoS management functions
  - Access Stratum (AS) security The split architecture with RRC terminated in a centralized node, as discussed in Section 1, also impacts functions supported by RRC. Some functions are less suitable for a centralized implementation far from the air interface, for example:

- Measurement reporting for beams. Measurement results supporting intra node beam switching may be handled on a lower layer, see section 2.1.5.8.
- Air interface resources configured dynamically during connections. In LTE, signaling of Physical uplink control channel (PUCCH) resources when coming in-sync and TTI bundling has been a problem.

2.1.3 Architecture

2.1.3.1 NX Identifiers Related to RAN L3 Procedures

There are several NX identifiers involved in RAN L3 procedures (in particular RRC procedures), which are relevant to describe. These identifiers may be critical for the procedure as such, or they may be identifiers used by other layers or functions and simply transported by a RAN L3 message. The latter are of course less relevant to bring up in this context, but in some cases they deserve to be mentioned.

Several circumstances motivate introducing new identifiers for NX instead of merely reusing identifiers from LTE. Some of these circumstances are:

- New functionality, which is non-existent in LTE, such as:
  - A new state, as in the dormant state.
  - RAN internal paging.
- The lean design principle, which minimizes the data that is frequently broadcast over the radio interface.
- The heavy use of beamforming, which in practice eliminates the traditional cell concept.
- The potentially distributed RAN architecture.

Note that it is generally desirable to harmonize the RRC protocols for LTE and NX, and hence some of the related identifiers may be applicable in both LTE and NX.

This section provides an overview of such NX identifiers, elaborating briefly on aspects such as usage and internal structure.

The identifiers discussed here are each placed into one of two categories:

- UE identifiers
- Network node, area or entity identifiers

2.1.3.1.1 UE Identifiers

UE RRC Context Identifier

Reuse of the Cell Radio Network Temporary Identifier (C-RNTI) for this purpose would not be suitable. One reason is that the cell concept is not used in NX. Another reason is that the C-RNTI is coupled with other functionality in a way that creates undesirable dependencies. A third reason is that the UE RRC context identifier has a partly different purpose in NX, such as to support context fetching.

The UE RRC context identifier identifies a UE's RRC context in the RAN and hence it is unique within the entire RAN. In the case of a common RRC entity the UE RRC context identifier is valid for both LTE and NX. The network can give the UE RRC context identifier to the UE at any time while the UE is in active state. The network may, for example, choose to do it in conjunction with the RRC connection setup (see section 2.1.5) when the context is created, in order to ensure that UE has it in case it would lose the connection (e.g., in case of radio link failure). Alternatively, or in addition, the network may choose to transfer the UE RRC context identifier to the UE when the UE is put in dormant state, to avoid the control overhead of having to reallocate a UE RRC context identifier in the UE every time the UE moves to a new RAN node.

The UE RRC context identifier is used for context fetching between RAN nodes in potential procedures such as dormant to active state transition (see Section 2.1.5.6), Tracking RAN Area Update in dormant state and radio link failure recovery. It should identify a UE's RAN context in an inter-RAN node scenario. That is, it should both identify the RAN node holding the context (e.g., the "anchor node", e.g., Access Node (AN), Radio Controller Function (RCF), or some other kind of controller such as a cluster head) and identify the context within this RAN node. Hence, it comprises an identifier of the anchor RAN node and a local context identifier allocated by the anchor RAN node. The identifier of the anchor RAN node is the RAN node identifier described further below. It can be used also in other contexts and deserves its own separate description.

The local context identifier only has RAN node internal significance. It could be the MAC-id, which is used for addressing the UE for downlink control signaling, but in an ambition to retain independence between identifiers that are used for different purposes, it is preferable that the local context identifier is an identifier separate from the MAC-id. In addition, the required range is different for the MAC-id and the local context identifier. Disregarding possible reuse schemes, the MAC-id range may provide a unique identifier to all UEs that are simultaneously in active state in the applicable area (assumedly an Access Node), whereas the local context identifier range may support all UEs that are in either active or dormant state in a node. The latter may include a substantially greater number of UEs and hence a larger range is desirable for the local context identifier.

UE Identifier for RAN Internal Paging

For this purpose, there is no corresponding identifier to reuse from LTE, since LTE does not support RAN internal paging.

The purpose of this identifier is to identify the UE when the UE is paged during a RAN internal paging procedure. For RAN internal paging the UE is tightly associated with the already existing UE RRC context. This makes the UE RRC context identifier a natural candidate to be used when paging the UE. Since this tight association makes it unlikely that the dependence to the UE RAN context identifier causes future problems, the UE RRC context identifier can be used for this purpose.

UE Identifier for the UE's Response to RAN Internal Paging

For this purpose, there is no corresponding identifier to reuse from LTE, since LTE does not support RAN internal paging.

When the UE responds to RAN internal paging, it has to provide an identifier that makes it possible to locate the UE RRC context. A reference to the page message, e.g., a page identifier, would suffice, but using a more "self-contained" identifier allows a more flexible page procedure, e.g., where the UE responds to a RAN node that has not been involved in the paging. The relation to the UE RRC context makes the UE RRC context identifier a natural candidate to be used for this purpose (especially since the page response may be regarded as dormant to active transition).

UE Identifier for Dormant to Active State Transition

This is a new state transition, which does not exist in LTE and hence there is no corresponding LTE identifier to reuse.

The UE's message to the network in conjunction with dormant to active state transition has to enable location of the UE RRC context. This makes the UE RRC context identifier a natural candidate.

Summary of UE Identifiers

All of the above described identifiers (the UE RRC context identifier, the UE identifier for RAN internal paging, the UE identifier for the UE's response to RAN internal paging and the UE identifier for dormant to active state transition) may be one and the same, since all of them have the ability to locate and identify a UE RRC context in an inter-RAN node scenario.

2.1.3.1.2 Network Node, Area or Entity Identifiers

RAN Node Identifier

There are new features on the RAN node identifier which prevent reuse of the eNB ID in LTE.

A RAN node identifier to be visible across the radio interface is useful for various SON activities, such as Automatic Neighbor Relations (ANR) and recording of mobility in dormant/idle mode to aid radio network planning (see also section 3.9). (It is also possible to use RAN-node-specific MRSs for the purpose of ANR.) It is also useful in the network for context fetching and establishment of inter-RAN node interfaces and connections (e.g., X2*). Although a RAN node identifier in some senses corresponds to the eNB ID in LTE, the RAN node identifier in NX serves similar purposes in NX as the E-UTRAN Cell Global Identifier (ECGI) does in LTE, due to the lack of cell concept in NX.

Two design goals that are relevant in this context are to minimize the always-on transmissions in the network and to refrain from providing signals that can be used for positioning purposes by over the top (OTT) applications.

To cater for the first of these two design goals, the RAN node identifier may be transmitted over the radio interface on as-needed basis. To this end, no RAN node identifier is transmitted over the radio interface by default, but a RAN node may request the core network to order activation (or the core network may initiate this itself) of RAN node identifier transmissions in a relevant area to support ANR or other SON features. Optionally, the RAN node may indicate in the request which area it wants the RAN node identifier transmissions to be activated in, e.g., defined as a geographical area.

To fulfill the second design goal a dynamically assigned, non-systematically selected RAN node identifier is used across the radio interface instead of a static RAN node identifier. To allow the dynamic RAN node identifier to still serve its purpose within the network, the network provides (network internal) translation of the dynamic RAN node identifier into an "actual" static RAN node identifier, which in turn may be translated into an IP address if needed (or the dynamic RAN node identifier may be used directly for IP address lookup). The approach with network internal translation of a dynamically changed identifier is similar to the approach described for the Positioning Reference Signal (PRS) (see section 3.10) and a common solution may be used for both cases.

Tracking RAN Area Code

There are no Tracking RAN Areas in LTE and consequently there is no identifier to reuse from LTE.

The Tracking RAN Area Code (TRAC) identifies a Tracking RAN Area (TRA) within a single network, to the extent that such areas are used. It may be used in conjunction with configuration of a UE in dormant state with a list of TRAs and would be regularly transmitted by the network for the UE to keep track of its current TRA, and report location update to the network if the UE moves to a TRA that is not in its configured list of TRAs. As with the Tracking Area Code, no real need for any internal structure is foreseen. See also section 3.2.

Phase Distributor for Paging DRX Cycles

In LTE, the IMSI modulo 1024 is used as an input parameter to the paging occasion procedure. Its purpose is to distribute the phase of the paging DRX cycle among UEs, so that the accumulative paging load of the UEs is more evenly distributed.

A parameter with a similar function may be desirable for the RAN internal paging in NX, depending on the procedure that is implemented for paging occasions. Note that this is not an identifier per se, but with the introduction of RAN internal paging it is a parameter that merits discussing.

Given that the same or a similar procedure as in LTE is used in NX, then one approach is for the anchor RAN node (the RAN node holding the S1* connection) to generate a 10-bit number (the same number of bits as in IMSI modulo 1024) and configure the UE with it as a part of the paging configuration for a UE in dormant state. This number would also be included in the RAN internal paging message distributed from the anchor RAN node to the other RAN nodes that are involved in paging the UE. With this choice of parameter, no IMSI related data is stored in the RAN.

An alternative is to derive this number from the UE RRC context identifier, e.g., UE RRC context identifier modulo 1024. This has an advantage compared to an arbitrary 10-bit number in that it would not have to be conveyed as a separate parameter to the UE and in the distributed RAN internal paging message, since it would be implicit in the UE RRC context identifier which is anyway included in these messages.

Yet another option is that the core network transfers the IMSI modulo 1024 parameter to the RAN node as a part of the UE S1* context when the S1* connection is established and that this number is used in the same manner as in LTE. If the same paging occasion procedure is used for RAN internal paging of a UE in dormant state and core network initiated paging of a UE in idle state, the paging occasions for RAN internal and core network initiated paging coincide with this alternative. This property can advantageously be leveraged to efficiently deal with error cases where the UE and the network have different perceptions of which state (dormant or idle) the UE is in.

Virtual Beam Identifier

This concept has no correspondence in LTE and consequently there is no LTE identifier to reuse.

A virtual beam identifier is an abstraction of a physical beam or a group of physical beams. As such, it is adapted for use by inter node signaling procedures on the network side. The virtual beam identifier is involved in activation of candidate target beams in inter-RAN node active mode mobility procedures and in SON procedures.

This identifier is used internally in the network (not passed to the UE).

Beam Identifier

This concept has no real correspondence in LTE, and consequently there is no suitable LTE identifier to reuse.

A beam is identified on L1 by a certain, dynamically assigned reference signal, e.g., a Mobility and Access Reference Signal (MRS). There may be no other identifier transmitted in the beam for beam identification purposes. However, higher protocol layers have to be able to refer to a beam, or a reference signal, e.g., when RRC is used to configure a UE with the MRSs to measure on during a measurement sequence. For such usage, the reference signal sequence itself is very impractical and a higher layer abstraction is desirable instead. Hence, some kind of reference or index is preferably used to refer to a reference signal, e.g., a MRS index or a C-RS index. Such an index may be passed between RAN nodes as well as between a RAN node and a UE.

PDCP Context Identifier

The PDCP context identifier is relevant in distributed RAN node architecture scenarios where RRC processing and PDCP processing are located in different physical entities, e.g., with PDCP in a Packet Processing Function (PPF) and RRC in a Radio Control Function (RCF) located in physically separate nodes. Such distributed RAN node architectures are not standardized in LTE and hence there are no LTE identifiers to reuse. (Note that a corresponding proprietary identifier in eNB products may be used, and in this case, if desired and unless such an identifier is specified in NX, a product-specific/internal identifier may be reused.)

To the extent that bearers are used in NX in a similar way as in LTE, with a PDCP context per bearer, then the bearer identifier in combination with a UE identifier (e.g., the UE RRC context identifier) may be used to identify a certain PDCP context.

Otherwise, if the bearer concept is replaced with something else, some other concept for the PDCP identifier is needed. In such a case the PDCP context identifier could be assigned according to similar principles as the S1 connection identifier, where each entity assigns its own identifier and informs the other part. The PDCP entity would thus assign its own PDCP context identifier and inform the RRC entity after being contacted by the RRC entity.

If there is a one-to-one mapping between the RRC entity and the PDCP entity, then the PDCP context identifier can be used as the reference in both directions, but if an RRC entity can have a relation to multiple PDCP entities, then the PDCP context identifier has to be combined with an RRC context identifier in order for it to uniquely identify the RRC-PDCP entity relation. The UE RRC context identifier can be reused for this purpose, and assuming that the distributed entities logically form a distinct RAN node (e.g., a "virtual RAN node"), the local context identifier part of the full UE RRC context identifier suffices. Note that the terms "entity" and "context" should not be confused. In this identifier description an "entity" refers to a physical processing entity, e.g., an implementation of PDCP in a physical node. A "context" on the other hand refers to the data associated with a specific instance of PDCP processing, e.g., for a certain bearer or traffic flow of a UE.

This identifier is used internally in the network (not passed to the UE). Note that the interface(s) that would motivate a PDCP context identifier are currently not standardized. Unless it becomes standardized for NX, this remains a product internal matter and each manufacturer may choose what fits its specific implementation best.

Context Identifier for Lower Layer Protocols

Context identifiers for lower layer protocols may be relevant in distributed RAN node architecture scenarios, e.g., with RLC and MAC in a Baseband Function (BBF) and RRC in a Radio Control Function (RCF) located in physically separate nodes. In such a case, the RRC entity may need references to the relevant entities to be able to configure them appropriately. Such distributed RAN node architectures are not standardized in LTE and hence there are no LTE identifiers to reuse. (There may, however, be a corresponding proprietary identifier in eNB products. In this case, if desired and unless such an identifier is specified in NX, a product-specific/internal identifier may be reused.)

Assuming an LTE-like protocol stack, there is an RLC context per bearer, and its identifier could be treated in the same manner as described above for the PDCP context identifier.

The MAC entity, on the other hand, is common for all bearers of a UE, for each connectivity leg in case of dual-/multi-connectivity, so the MAC context identifier in principle only has to identify the UE and, as above, the UE RRC context identifier, or the local part of it, could be reused for this purpose. These identifiers are used internally in the network (not passed to the UE).

Note that the interface(s) that requires such identifier(s) is currently not standardized. Unless it becomes standardized for NX, this remains a product internal matter and each manufacturer may choose what fits its specific implementation best.

S1* and X2* Connection Identifiers

In LTE, an S1 connection identifier identifies an S1 control plane connection associated with a UE and is valid as long as the UE is in RRC_CONNECTED and ECM CONNECTED state (eNB UE S1AP ID, MME UE S1AP ID). (With the introduction of the suspend/resume mechanism in LTE release 13, the S1 control plane connection may be kept also when the UE goes to RRC_IDLE state.) A corresponding X2 identifier identifies the short-lived UE associated relation between two eNBs during a handover procedure (Old eNB UE X2AP ID, New eNB UE X2AP ID).

The same principle as currently used for S1 and X2, with locally assigned and locally significant identifiers, may be used for the S1* and X2* connection identifiers. A similar reuse of the LTE principles may apply also for the S1* and X2* user plane identifiers. These identifiers are used internally in the network (not passed to the UE).

Network Slice Identifier

A network slice identifier identifies a set of network resources constituting a logical network. It may potentially be used to direct user plane and control plane traffic to the resources of the network slice it pertains to.

2.1.3.1.3 Summary of Identifiers

Table 1, below, provides a summary of the identifiers discussed above.

TABLE 1

| Identifier | Purpose | Relation to LTE |
| --- | --- | --- |
| UE RRC context identifier | Identifies a UE RRC context in the RAN. Used e.g., for context fetching. | It is slightly similar to the C-RNTI, but has a partly different purpose and lacks some of the dependencies associated with the C-RNTI. The UE RRC context identifier may identify the UE RRC context in both LTE and NX. |
| UE identifier for RAN internal paging | Identifies a UE during RAN internal paging. | No correspondence in LTE |
| UE identifier for the UE's response to RAN internal paging | Identifies a UE when responding to RAN internal paging. Enables context fetching. | No correspondence in LTE. |
| UE identifier for dormant to active state transition | Identifies a UE during dormant to active state transition. Enables context fetching. | No correspondence in LTE. |
| RAN node identifier | Supports various SON functions such as ANR. Enables context fetching when used as part of the UE RRC context identifier. | New features prevent reuse of the eNode B ID. |
| Tracking RAN Area Code | Identifies a Tracking RAN Area. | No correspondence in LTE. |
| Phase distributor for paging DRX cycles (for RAN internal paging) | Distributes the phase of the RAN internal paging DRX cycle among UEs, so that the accumulative paging load of the UEs is more evenly distributed. | RAN internal paging is not used in LTE, but one option is to reuse the IMSI modulo 1024 parameter which is used for core network initiated paging in LTE. |
| Virtual beam identifier | A virtual beam identifier is an abstraction of a physical beam or a group of physical beams. | No correspondence in LTE. |
| Beam identifier | A beam identifier is used to identify a physical layer beam on higher protocol layers. It may be realized as an index pointing at a reference signal sequence. | No suitable correspondence in LTE. |
| PDCP context identifier | Used to identify the PDCP context in a distributed RAN node architecture. | To the extent the bearer concept of LTE is reused in NX, the bearer identifier combined with the UE RRC context identifier may be used. Otherwise only product internal/specific corresponding identifiers may be used. |

TABLE 1-continued

| Identifier | Purpose | Relation to LTE |
|---|---|---|
| Context identifier for lower layer protocol | Used to identify the RLC context or the MAC context in a distributed RAN node architecture. | To the extent the bearer concept of LTE is reused in NX, the bearer identifier combined with the UE RRC context identifier may be used (or only the UE RRC context identifier in the case of the MAC context). Otherwise only product internal/specific corresponding identifiers may exist. |
| S1* and X2* connection identifiers | Identify control and user plane connections for S1* and X2*. | The same principle (and possibly the same identifiers) can be used as in LTE. |
| Bearer identifier | Identifies a (radio) bearer, (if needed, depending on the existence of bearers in NX.) | To the extent the LTE bearer concept is reused in NX, the LTE bearer identifier may possibly be reused. |
| Network slice identifier | Identifies a set of network resources constituting a logical network. | No correspondence in LTE. |

2.1.3.2 Signaling Radio Bearers

Signaling Radio Bearers (SRBs) are defined as Radio Bearers (RB) that are used only for the transmission of RRC and NAS messages. According to the architecture described herein, the same set of SRBs may be defined for NX as used for LTE. This also allows the tight integration scenario, where the same SRBs are used to carry either NX or LTE RRC messages over either NX or LTE lower layers (see Section 1).

More specifically, the following three SRBs may be defined:
- SRB0 is for RRC messages using a common logical channel;
- SRB1 is for RRC messages (which may include a piggybacked NAS message) as well as for NAS messages prior to the establishment of SRB2, all using dedicated logical channels;
- SRB2 is for RRC messages which include logged measurement information as well as for NAS messages, all using dedicated logical channels. SRB2 typically has a lower-priority than SRB1 and is configured by E-UTRAN after security activation.

Once security is activated, RRC messages on SRB1 and SRB2, including those containing NAS or non-3GPP messages, are integrity protected and ciphered by PDCP.

It is also important to note that RRC diversity can be supported by utilizing a common SRB1 and SRB2, which can be split over both RATs, similarly to the split dedicated radio bearers (DRBs) used in LTE Dual-Connectivity (DC), using a common PDCP entity with separate RLC/MAC entities per access. The UE or network does not apply RRC diversity for SRB0 as well as for the initial SRB message sequence during the initial connection setup or connection re-establishment/re-activation until both RATs are configured and security activated. Once SRB diversity is activated, implementation-based dynamic link selection in the downlink can be made by the network on a per PDCP PDU basis. In the uplink, mapping rules may be defined in the standard.

Using a common set of SRBs with a split bearer is an attractive option, since that guarantees in-order delivery of all RRC messages regardless of over which RAT they are transmitted (the UE behavior becomes predictable). When a common PDCP layer is used, supporting solutions for transmitting the same RRC message over both RATs becomes easy, since any duplication can be detected and removed by the PDCP layer.

An alternative solution is to use separate SRBs for different RATs, and then have rules in RRC level for when messages should be mapped to what SRB. One option is to define an NX specific SRB3, which is then used for NX RRC for procedures that do not need to be coordinated with LTE RRC. This entity is used in the non-co-located case located in the NX eNB to deliver NX RRC messages directly between the NX eNB and the UE, without having to be passed via the LTE eNB. Note that from a security point of view, this solution deviates from the DC architecture with a single trusted node terminating all SRBs. Here, the secondary eNB needs to be equally trusted and securely implemented as the master eNB. Otherwise an attacker breaking into the secondary eNB could control the UE via RRC from there.

2.1.3.3 Bearer Handling and QoS

As for the SRBs, the tight integration with LTE motivates keeping common radio bearers also for the user plane, allowing the UE to move between LTE and NX coverage without having to reconfigure the bearers.

However, new use cases for 5G may drive the introduction of new QoS definitions for NX, and new bearer types. Ideally, those should then be introduced to LTE as well, so that seamless LTE-NX mobility can be supported. In cases where LTE is not capable to provide the required QoS, bearers need to be reconfigured or released when moving from NX to LTE.

2.1.3.4 Handling of DRX in Dormant State

DRX is configured together with paging and the "listening period" is calculated based on the current System Frame Number (SFN). Each TRA may have a specific DRX configuration which is provided to the UE via dedicated signaling e.g., TRA Update Response or RRC reconfiguration. The range of DRX cycles which the network can configure goes up to several hours or even days. Of course, this needs to be taken into account when designing the number of bits to include in the SFN field.

In some cases, the RAN may not be able to find the UE. In this situation, the RAN may inform the CN, and the CN may then take over the paging functionality for that UE.

Figure 4:
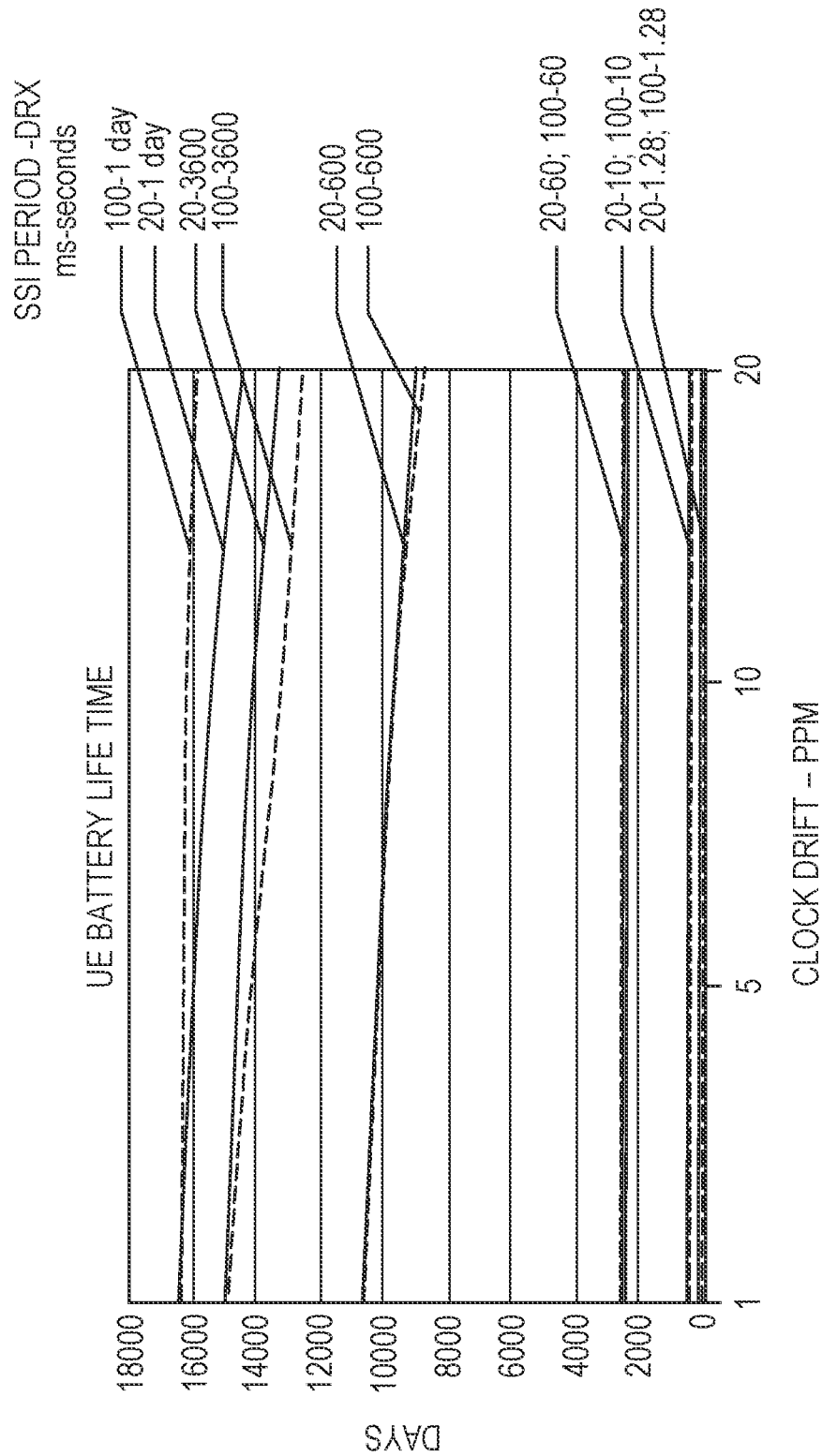
FIG. 4 is a plot showing an estimate of UE battery life for a UE in dormant state, when the network is synchronized, for each of several SSI periods and DRX cycles.
Figure 5:
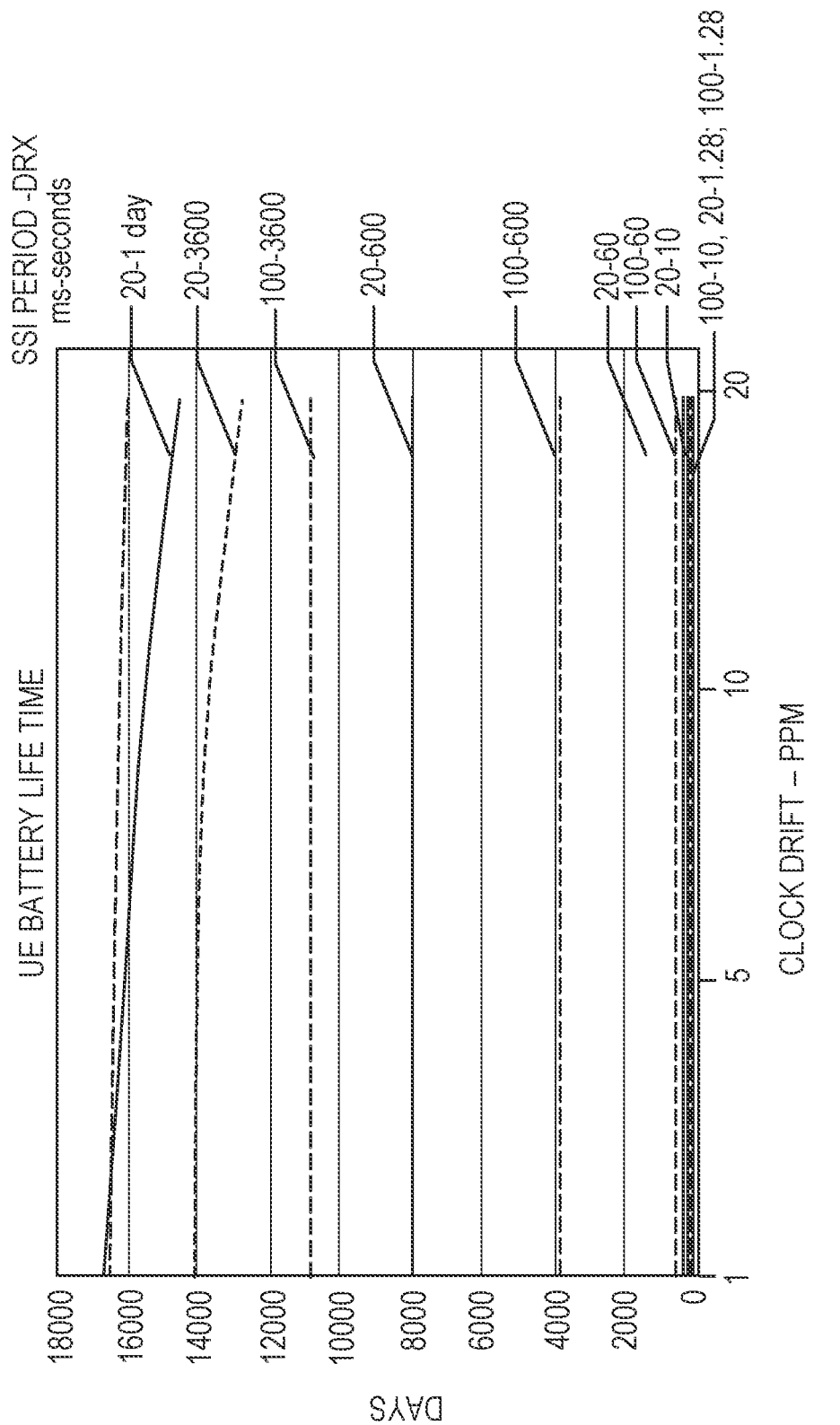
FIG. 5 is a plot showing an estimate of UE battery life for a UE in dormant state, when the network is not synchronized, for each of several SSI periods and DRX cycles.

One aspect to take into account is the relationship between SSI (see section 3.2.2.2) period and DRX configuration. Longer SSI periods cause higher UE energy consumption, due to the effect of the UE clock error in combination with DRX. The UE needs to wake up before to compensate for this error. As soon as the UE gets sync information, the UE can return to DRX. Thus, the longer the SSI period (time from one SSI transmission to the next), the longer the UE needs to listen and, hence, the higher the UE energy consumption. Shorter SSI periods, on the other hand, cause less UE power consumption. This is shown in FIG. 4, which illustrates estimated UE battery life for a UE in dormant state when the network is synchronized for different SSI period and DRX cycles. When the network cannot maintain a good level of synchronization, the UE energy consumption increases considerably, especially for large SSI periods. This is shown in FIG. 5, which illustrates estimated UE battery life for a UE in dormant state when the network is not synchronized for different SSI periods and DRX cycles.

2.1.4 NX RRC and Integration with LTE

A preferred aspect of the architecture described herein is its support for a tight integration of NX with LTE, e.g., as discussed in Section 3.7. One part of this tight integration is the RRC layer integration of LTE and NX radio access, to support both the LTE-NX dual connectivity and NX stand-alone operation. In this section, several different alternatives for realizing this RRC layer integration are described, starting from RRC functional concepts.

2.1.4.1 RRC Functional Concept 1: Single RRC Protocol

Single RRC protocol is defined as a protocol architecture option, which can integrate all or a subset of the control-plane functions of NX together with the existing LTE RRC protocol functions with a single RRC protocol machine, to provide the functions to enable the LTE-NX dual connectivity and possibly the stand-alone NX operation.

Note that this architecture option can be realized by extending the LTE RRC protocol. This can be achieved by standardization of:

a) a new release for the LTE RRC specification, TS 36.331, including the new procedures and information elements (IEs) for NX, or b) a new specification, e.g., an NX RRC specification that contains the LTE RRC legacy functions, new procedures and IEs for NX, or c) a pair of specifications comprised of a new release of the LTE RRC specification, including transparent containers for carrying NX IEs, which are defined in a new NX RRC specification.

The NX IEs, which can be defined within the LTE RRC specification or in a separate NX RRC specification, may include broadcasted/dedicated system information and security control information elements.

Where an RRC function (e.g., RRM) resides in the NX eNB, new inter-node messages (e.g., carrying radio resource control information elements) between NX and LTE have to be defined. These messages are carried within the RRC containers that need to be specified as well.

To ensure the reliable handling of the control-plane signaling, PDCP level split/combining can be used to provide extra reliability (RRC diversity).

Note that in the case of stand-alone NX operation, due to the backward-dependency of the protocol, single RRC protocol may have limited flexibility when adding new functions to NX RRC, especially if a single RRC evolution track for both LTE and NX is targeted.

Figure 6:
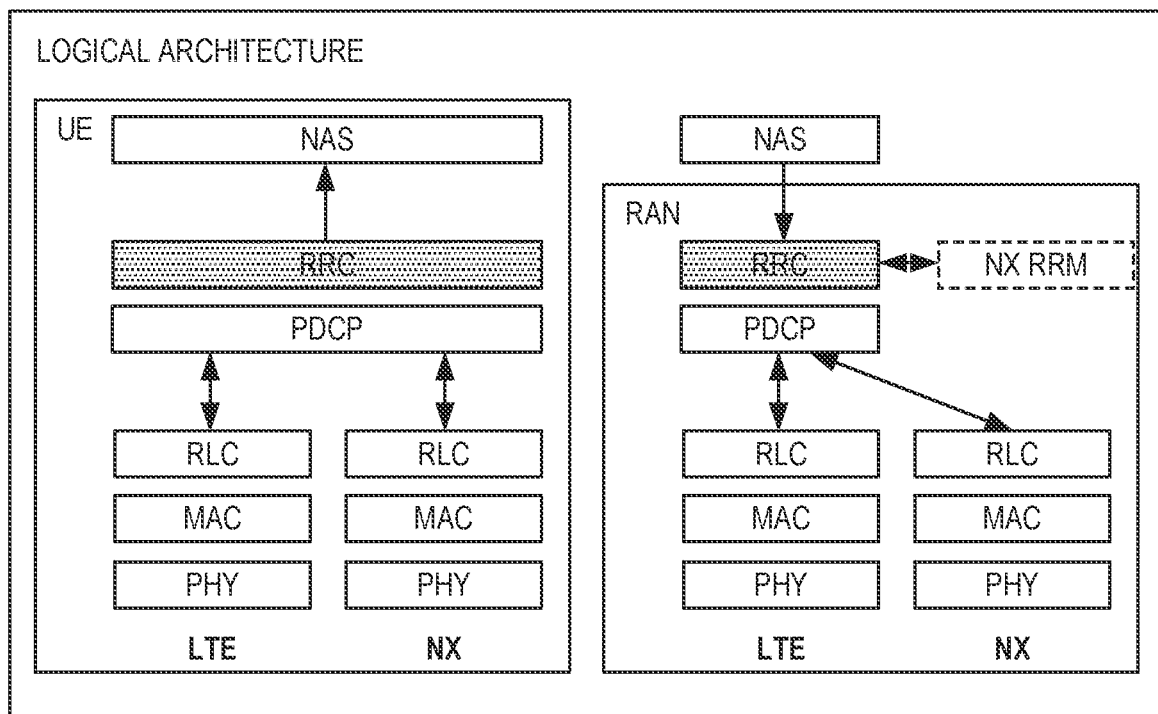
FIG. 6 shows a protocol architecture for a single-RRC protocol track, for LTE-NX dual connectivity.

An overall protocol stack that includes single RRC operation for LTE-NX DC operation is illustrated in FIG. 6, from the UE and eNB perspectives, respectively. The node where the RRC and PDCP entities reside may be either an LTE or NX node.

2.1.4.2 RRC Functional Concept 2: Dual RRC Protocol

Dual RRC protocol refers to a protocol architecture option comprising separate LTE and NX RRC entities, which follow independent control-plane specifications for LTE and NX respectively. Inter-RAT coordination is mandated in the RRC level, to fulfil the LTE-NX tight integration design principle.

With this architecture option, future-proof NX control-plane functions are provided for the stand-alone operation of NX and for the smooth introduction of new features and use cases, thanks to the functional flexibility introduced with less backward-dependency.

In the dual RRC protocol, NX RRC messages are tunneled to the UE via the LTE RRC entity and vice-versa for LTE-NX dual connectivity, which is the case whether LTE and NX RATs are co-located or not. Therefore, the RRC containers that carry the NX/LTE RRC messages need to be specified. Furthermore, in order to sustain a single S1 connection and coordinated state transitions between NX and LTE, additional mechanisms may be required as partly to be discussed within the RRC procedures.

Similarly as with the single RRC protocol option, PDCP level split/combining (for common SRBs), via a single PDCP entity on the control-plane, is assumed to enable RRC diversity and reliable handling of control-plane thereof. An additional PDCP entity (for new SRBs), associated to an NX SRB, e.g., SRB3, can also be configured in the NX node for the direct NX RRC message transfer when the common PDCP entity is situated in the LTE node.

Figure 7:
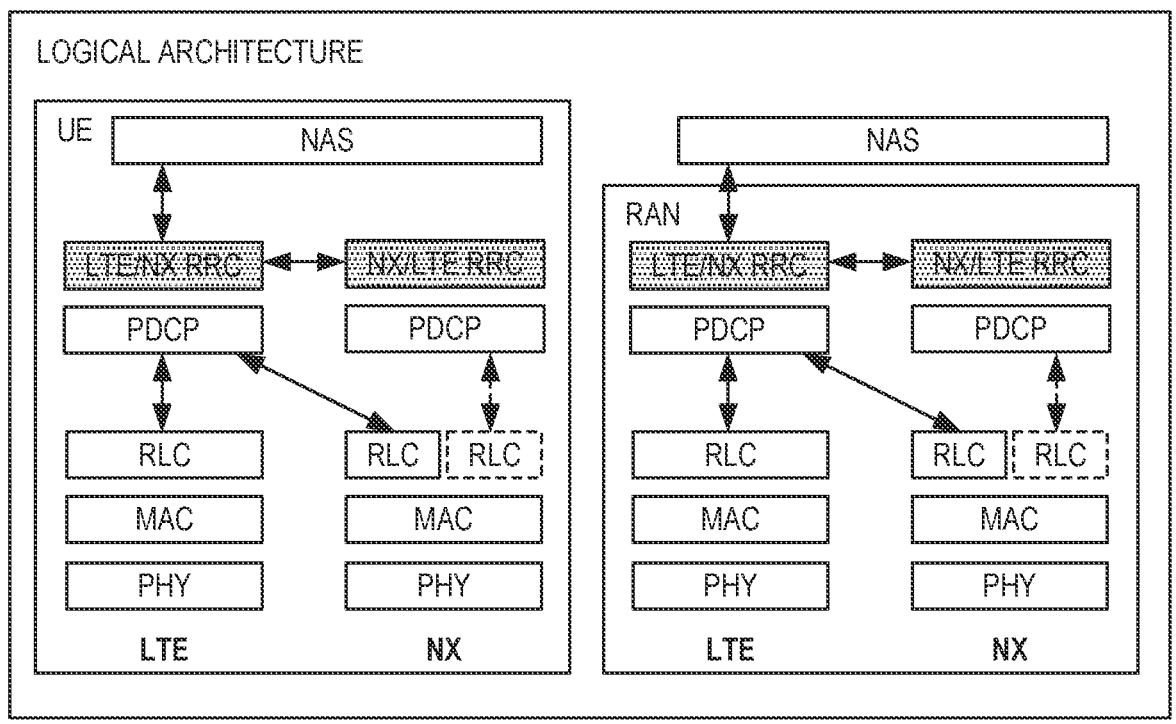
FIG. 7 shows a protocol architecture for a dual-RRC protocol track, for LTE-NX dual connectivity.

An overall protocol stack that includes the dual RRC operation is illustrated in FIG. 7, from the UE's and eNB's perspectives, respectively.

2.1.5 RRC Procedures

Figure 8:
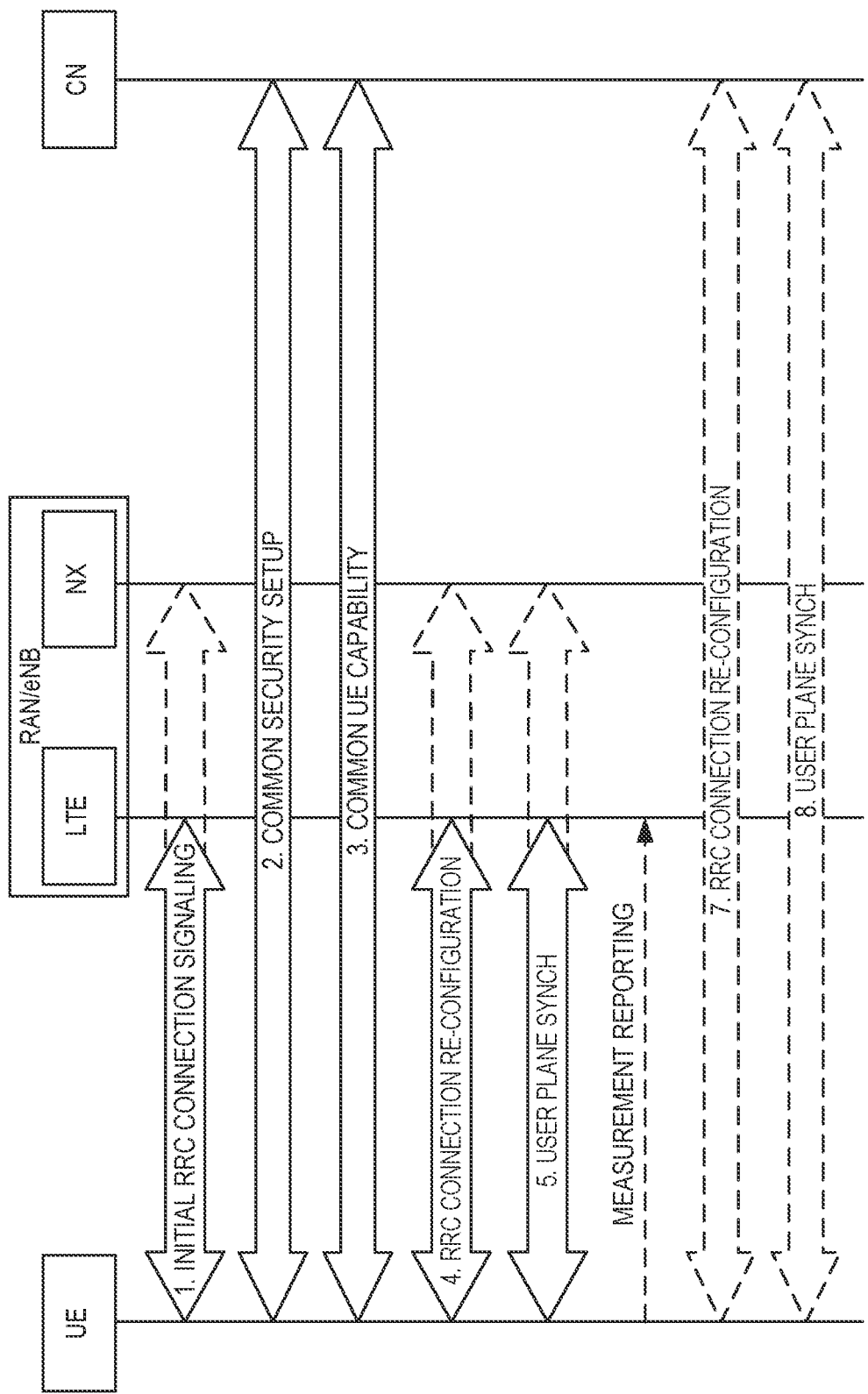
FIG. 8 is an overall RRC signaling diagram for LTE-NX dual connection setup.

FIG. 8 illustrates an overall RRC signaling diagram for LTE-NX dual connection setup, where the dashed lines indicate the involvement of RRC signaling associated with NX (independent from the RRC protocol architecture options).

2.1.5.1 Initial RRC Connection Signaling

Initial RRC signaling includes RRC Connection Request (SRB0) and RRC Connection Setup/Reject (SRB0), and RRC Connection Setup Complete/Attach Request (SRB1) message sequence.

As discussed in Signaling Radio Bearers (Section 2.1.3.1), the same set of SRBs may be defined for NX as used for LTE. This also allows the tight integration scenario, where the same SRBs are used to carry either NX or LTE RRC messages (or both messages if both are to be set up) over either NX or LTE lower layers. The initial connection signaling may also be reused between LTE and NX.

At the initial RRC connection setup procedure, the UE can select which RAT to perform access based on a pre-defined criterion. During the RRC connection setup procedure, the UE may be assigned an UE RRC Context ID (see section 2.1.3.1.1) that is kept when the UE goes to dormant state or updated via an RRC connection inactivation signaling as to be discussed.

To activate the tight integration features, a UE can be indicated as LTE+NX UE within the Attach request, when UE moves from RRC IDLE to RRC CONNECTED mode. Subsequently, the UE can be configured for dual RAT connectivity with a single RRC reconfiguration procedure, as discussed in section 2.1.5.4.

2.1.5.2 Security Signaling

Figure 9:
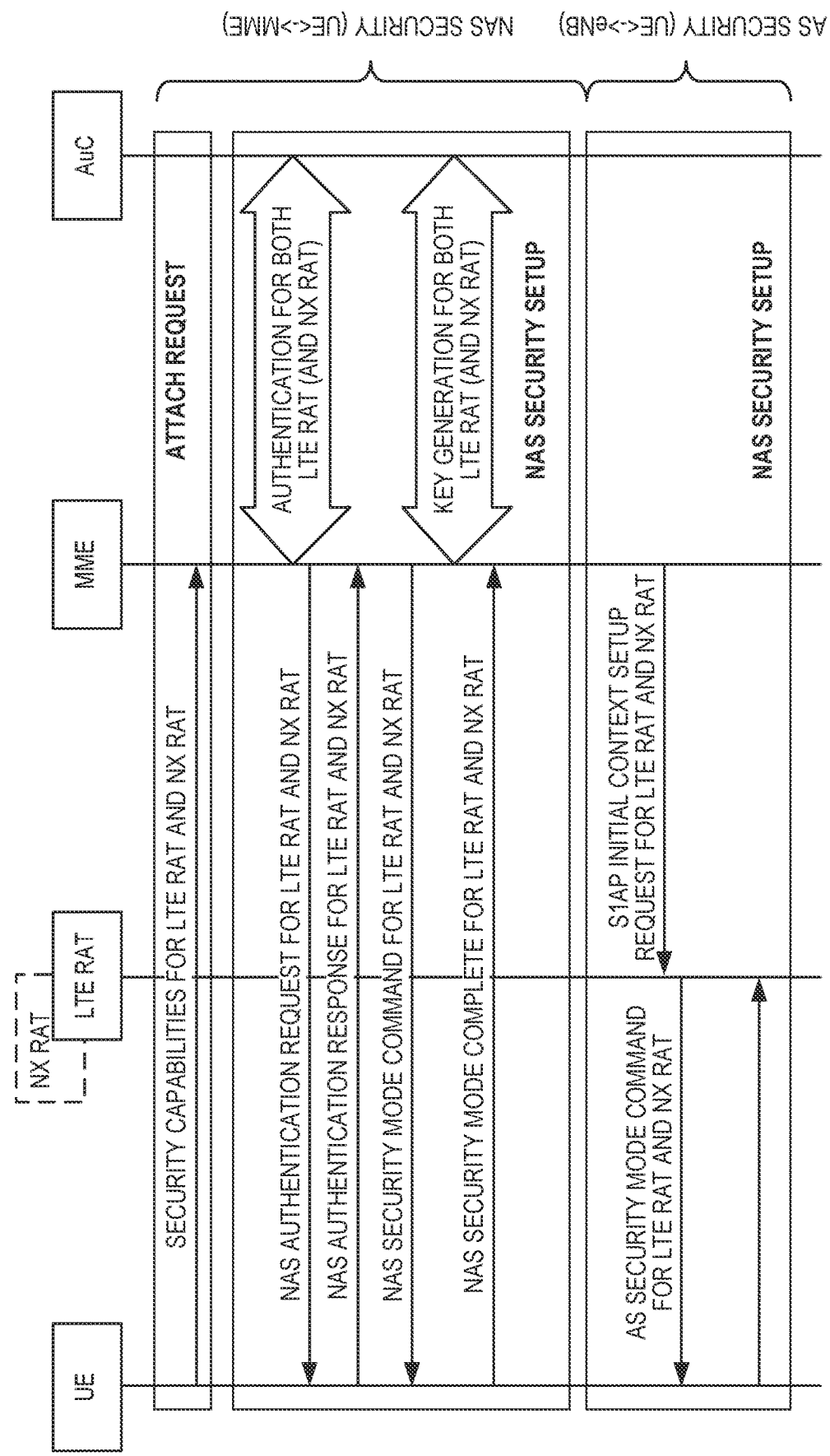
FIG. 9 illustrates a common (shared) security setup for LTE and NX.

FIG. 9 illustrates a security setup for LTE and NX, assuming a common MME connection.

Given the use of a common set of SRBs for LTE and NX with common PDCP entities, separate security configuration for LTE and NX control signaling is not required. If the SRB3 described in 2.1.3.2 is configured, however, a separate security configuration would be required for that.

Security setup can be optimized by using common capability signalling, single authentication, single key generation and common security mode command as shown, for example, in FIG. 9. The common security setup can either be handled by the single RRC or dual RRC protocol architecture option. In case of dual RRC, the LTE header indicates the transparent container for NX RRC messages. In either architecture, a single PDCP entity can provide a common encryption (as in LTE DC operation) as well as integrity protection for common SRBs. It is also possible to implement a separate PDCP entity, enabling new NX SRBs.

2.1.5.3 UE Capability and Related Signaling

For NX, a new UE capability signaling framework addresses limitations of the 2G/3G/LTE UE capability signaling. More particularly, the new UE capability signaling framework addresses one or more of the following issues:

Fixed set of capabilities: A UE typically indicates supported features. However, features may be a compound of several building blocks and may have different parameters. These may not have all been tested or be fully functional, though. Thus, it is desirable that the UE can report more capabilities/building blocks/allowed configurations once they are tested.

Network vendor inter-dependencies: By industry practice, features are tested in at least two network (NW) vendors, prior to activation of the features at the UE. To address specific markets/operators/devices or UE-network specific features, it is desirable to avoid such NW inter-dependences.

Faulty UEs: Once a UE is released into the market, it is difficult to fix implementation errors, as it is complicated to identify faulty UEs. Network work-arounds are usually introduced when a major issue is found, and these work-arounds typically apply to all the UEs within the release in which the fault was found.

Proprietary implementations: No framework exists today to introduce proprietary features/building blocks/configurations or other proprietary enhancements between a network and a UE.

Continuous increase of UE capabilities: As system specifications evolve, the UE capabilities increase, which has a direct impact in the radio interface as well as in the exchange of information within the network nodes.

A new UE capability framework that addresses these issues includes one or both of the following two elements:

UE capability pointer/index: This is a pointer/index that the UE sends to the network. This pointer identifies all possible UE capabilities and other relevant information for that particular UE, and even for the UE capabilities relevant to a specific network vendor.

UE capability database: A UE capability database contains all the information corresponding to each of the pointers. This database is maintained in another location, e.g., central node, $3^{rd}$ party, etc. Note that this database may contain more information than merely UE capability information. It could potentially be customized for each network vendor, e.g., tested features/configurations, fault reports, proprietary UE-NW information, etc. It is, therefore, important that network-specific information is not accessible by others and is protected/encrypted.

Figure 10:
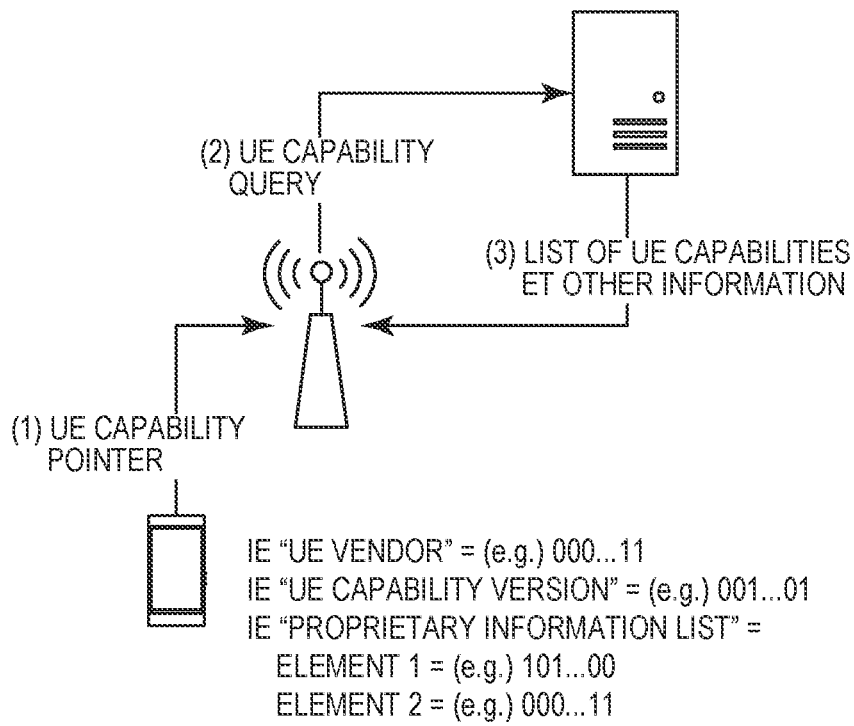
FIG. 10 illustrates an example of UE capability handling.

FIG. 10 illustrates features of the UE capability framework described above.

2.1.5.4 RRC Connection Reconfiguration Signaling

RRC Connection Reconfiguration message can establish/modify/release radio bearers, configure L1, L2 and L3 parameters and procedures (e.g., for mobility and/or to establishment of dual connectivity).

In case of stand-alone NX, RRC Connection Reconfiguration message can be used for single NX connection reconfiguration (similarly to the LTE-equivalent message) as well as for NX multi-connectivity setup as discussed in Section 3.13.

In case of LTE-NX dual connectivity setup, the RRC connection reconfiguration can either be network-triggered or UE-triggered.

In the case of network-triggered procedure two options are described.

Figure 11:
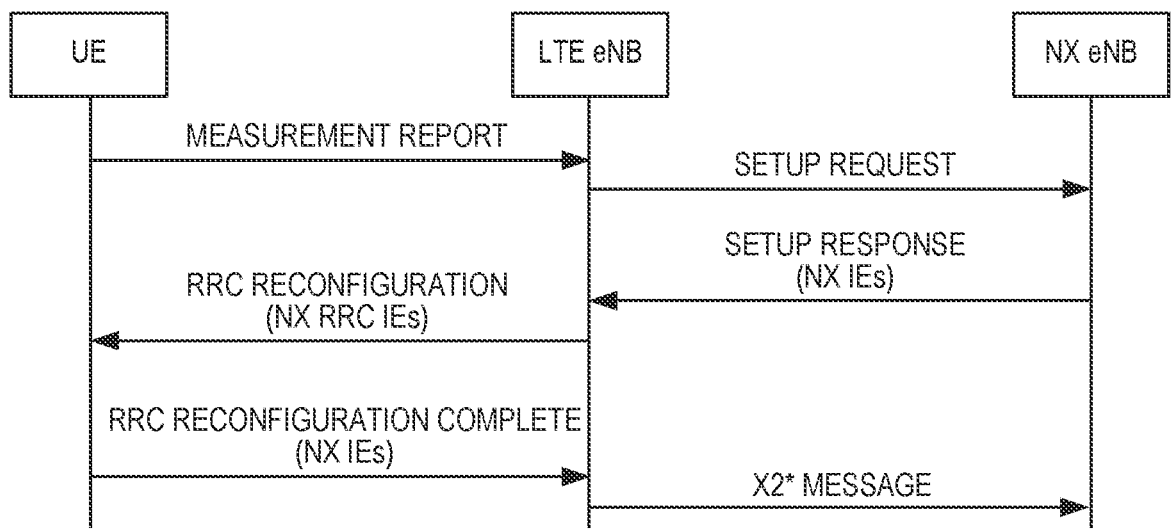
FIG. 11 is a signaling flow diagram illustrating LTE-NX dual connectivity setup for a single-RRC protocol architecture.

When the single RRC architecture option is assumed, a common RRC protocol (e.g., as specified in a future NX release of 3GPP TS 36.331) is responsible for the dual LTE-NX connectivity connection setup procedures. In this case, the RRC connection reconfiguration procedure for LTE and NX can be handled within a single-round of RRC message exchange as shown in FIG. 11. IEs containing the NX configuration are carried in the Setup Response.

FIG. 11 thus illustrates the LTE-NX dual connectivity setup used with the single RRC protocol architecture, where the illustrated signaling is based on the assumption that the first node is an LTE eNB. The signaling other way around, where the first node is an NX eNB, would follow the same message sequence.

In case of the dual RRC option, there is more than one way to realize LTE-NX dual connectivity setup.

Figure 12:
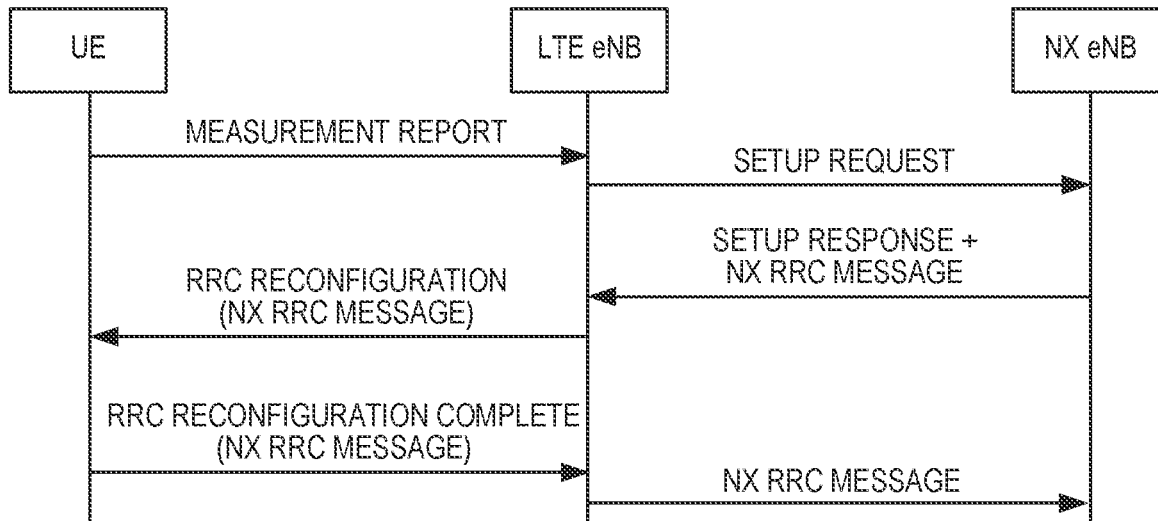
FIG. 12 is a signaling flow diagram illustrating LTE-NX dual connectivity setup for a dual-RRC protocol architecture.

In one alternative, one of the RRC protocols can handle the RRC connection reconfiguration procedure, allowing the NX/LTE dual connectivity configuration in a single round of reconfiguration. This is shown in FIG. 12. This can be done by using the existing PDCP entity and associated security in the node where the control-plane (either LTE or NX) is up and running. The RRC messages of the second RAT may be transferred to the UE via the first RAT within a transparent container or directly to the UE via new SRB, such as SRB3. FIG. 12 illustrates LTE-NX dual connectivity setup for use with the dual RRC protocol architecture with a common RRC reconfiguration procedure. The illustrated signaling is based on an assumption that the first node is an LTE eNB. The signaling the other way around, where the first node is an NX eNB, would follow the same message sequence.

2.1.5.5 RRC Connection Inactivation

This procedure handles the state transition from RRC CONNECTED ACTIVE to DORMANT, which effectively puts the UE to "sleep" in LTE and/or NX. The transition can be triggered due to a timer configured by the network or by an RRC Connection Inactivation message sent by the network, which may include the security re-activation information (e.g., nextHopChainingCount) for the next RRC CONNECTED ACTIVE state. Upon receiving this message, the UE enters the RRC DORMANT state. Given a dual RRC for LTE and NX, the message should be defined in both RRC specifications, e.g., using similar IEs.

Some of the UE RRC configuration in RRC CONNECTED DORMANT could be configurable by the network during the RRC connection setup, inactivation, and re-activation procedures, within which the UE RRC Context Identity can also be assigned. The network also ensures that the information for the UE dormant behavior is up to date. This information is especially important in the NX case where the system information is either not broadcasted (e.g., dormant mode mobility parameters) or seldom broadcasted (e.g., AIT, see section 3.2.2.2).

Updated configuration may also be given to the UE in the RRC Connection Inactivation message, since the UE may have moved to a location with a different dormant state configuration. Other changes to the information in the RRC Connection Inactivation message may be made. For instance, the UE could be configured to camp on MRSs (see Section 3.4.4 for further details) and re-active the connection accordingly. The network could also mandate the UE to keep the MAC identities and associate some timers when moving to dormant.

Upon entering the RRC DORMANT state (without any additional configuration for optimized state transition), the UE should:
  Release all radio resources including the release of the RLC entity and the MAC configuration, e.g., including a release of the MAC-Id.
  Keep all PDCP entities (common for both LTE and NX) of SRBs and RBs and the RRC UE Context Identity (see Section 2.1.3.1.1) that is received in the RRC Connection Setup (either over NX or LTE RRC in the case of dual RRC). This identity encodes both the context identifier and the mobility anchor point in the RAN which can be e.g., an LTE cell ID or NX node Id.
  Camp in the same RAT (NX or LTE) it was active (default) unless some specific configuration is provided. For increased robustness, dual-camping is also an option, as discussed in Section 3.2.

2.1.5.6 RRC Connection Re-Activation

In LTE, latency requirements for the transition from RRC IDLE to RRC CONNECTED have been defined. In Release 8 of the LTE specifications, transition latencies <100 milliseconds (ms) were targeted from a camped state. In the case of a transition from sleeping state (Connected DRX) to active, the target was 50 ms. In Release 10 of the LTE specifications, requirements were further reduced to <50 ms and <10 ms (excluding DRX delay). These values are to be further reduced for 5G, especially considering some critical service that may have high requirements in terms of latency.

Figure 13:
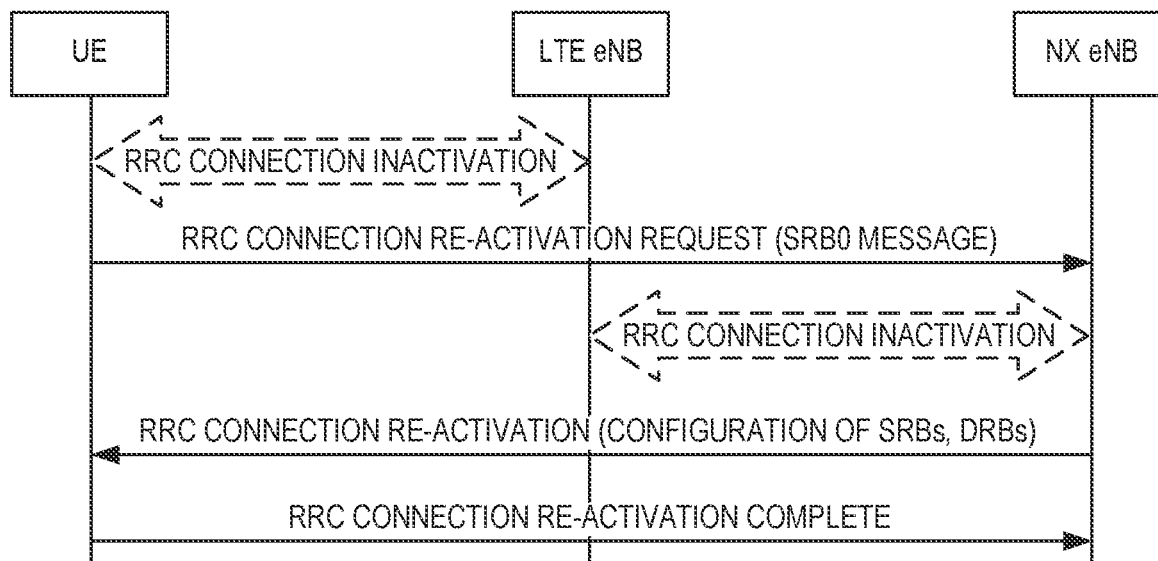
FIG. 13 is a signaling flow diagram illustrating a RRC connection re-activation procedure.

From an RRC perspective, to minimize the overhead and achieve a lower latency, a lightweight transition is provided, as shown in FIG. 13. If the UE has received the security re-activation information such as nextHopChainingCount in RRC Connection Inactivation, a subsequent RRC reconfiguration procedure is not needed, since the RRC connection re-activation procedure would be able to reconfigure SRBs and DRBs activating the user plane thereof.

FIG. 13 illustrates a signaling flow for RRC connection re-activation procedure, assuming that the first node is an LTE eNB. The signaling other way around, the first node is NX eNB, follows the same message sequence.

The purpose of RRC connection re-activation procedure is to re-activate the RRC connection, which involves the resumption of SRBs and DRBs. The connection re-activation succeeds only if the accessed target node (NX or LTE) can find the UE RRC context and the mobility anchor for S1*. For this reason, the UE RRC Context ID is included within the RRC Connection Re-activation Request that is an SRB0 message. This message can be integrity protected to protect the network from the false requests.

The procedure for instance, may be triggered by the UE either in response to a paging, when the UE has UL data in buffer, or when it needs to send TRA updates. The UE triggers an RRC connection re-activation procedure, which should be defined in both NX and LTE's RRC specifications when a dual RRC solution is implemented.

Upon receiving RRC Connection Re-activation Request, the network retrieves the UE RRC Context (including the security re-activation information) based on the UE RRC Context ID, performs the necessary mobility actions and responds with RRC Connection Re-activation to reconfigure SRBs and DRBs. Upon reception of this message, the UE performs the following actions:
  Re-establishes PDCP and RLC for SRBs and DRBs,
  Performs radio resource configuration,
  Performs measurement related actions according to the measurement configuration,
  Resumes SRBs and DRBs.

2.1.5.7 Measurement Configuration

Several different types of measurements and/or signals are measured in NX (e.g., MRS, SSIs, TRAS, etc.). Mobility events and procedures thus need to be addressed for NX.

The RRC Connection Reconfiguration message should be able to configure both the NX measurements and the existing LTE measurements for the single RRC option. The measurement configuration should include the possibility to configure the UE to measure for NX/LTE coverage e.g., to initiate DC setup or inter-RAT HO (as in the legacy).

2.1.5.8 Measurement Reporting

There are two different measurement reporting mechanisms for NX, non-RRC based reporting (see Section 2.3.7.2), where the UE indicates the best of a set of candidate DL beams through a preconfigured USS sequence; and RRC-based reporting, which is similar in some respects to the event-triggered LTE measurement reporting. These two measurement reporting mechanisms are preferably deployed in parallel and used selectively, e.g., depending on the UE's mobility state.

2.1.6 System Information

System information as known from previous releases of the LTE standards consists of very different types of information, access information, node-specific information, system-wide information, public warning system (PWS) information, etc. Delivery of this wide range of information does not use the same realization in NX. In a system with high-gain beamforming, the cost of providing large amount of data in broadcast manner may be costly compared to point to point distribution in a dedicated beam with high link gain.

2.16.1 Desirable Features & Principles

Desirable features and design principles for NX include one or more of the following. Thus, it should be appreciated that not necessarily all of these may be met by a given implementation.
  NX should support a "flexible" mechanism to convey System Information
    Restrictions on System Information length should be avoided
    System Information parameter values may be modified at any time
    System Information may take advantage of parameters which do not change or are common across a large area
    System Information may carry different information for different types/groups of UE and/or services
    Dedicated signaling should be considered when more efficient Efficient signaling to thousands (e.g., 512k) of UEs per "service area" should be supported.
NX should minimize broadcasted information and "always-on-air"
    Network DTX should be supported
Acquisition/updates should minimize:
    the impact to UEs to which information is not addressed
    the negative side effects in the network e.g., synchronized UL accesses
    the contribution in the UE battery consumption
Acquisition/updates should not:
    Increase access (until "relevant info" is retrieved) latency by more than xx* ms (e.g.: at initial power on, roaming (PLMN search), after RLF (recovery), redirected to a new layer/cell, handover, inter-RAT, "long" DRX cycles), System Information Update (*exact latency feature may depend on service/type/group of UE)
"Relevant" information should be unambiguous and "up-to-date" prior usage
    It may be acceptable that "outdated" info is used if the probability is very low/system impact negligible
System information coverage range should not be dependent of the user plane coverage range
    e.g., a node may not transmit system information while it may transmit user plane data
System Information should be conveyed efficiently for all type of deployments
    NX as standalone with minimum and/no coverage overlap
    NX should be able to be deployed stand-alone on unlicensed bands
    NX deployed with a LTE/UTRAN/GERAN with full or partial coverage
    Dual NX layer deployment, NX macro and NX small cells, two scenarios:
        Where the UE is in coverage of both the macro cell and the small cell simultaneously
        Where the UE is not in coverage of both the macro cell and the small cell simultaneously
Secondary carriers may not need to provide SI (e.g., LAA, dedicated frequency)
Each node may dynamically change/update some of its System Information
    System Information changes/updates may not be coordinated and may not be populated among other nodes/layers in all cases
System Information should handle/consider handling of:
    Shared networks
    Mobility
    (PWS) Public Warning Systems
    A mechanism (e.g., paging) to request the UE to:
        a) to contact the NX or, b) acquire System Information
        Should be possible to address to groups/types of UEs/services
    MBMS function
    Load sharing and policy management between NX and other RATs
    Access control (updated feature)
        NX should comply with SA features (e.g., as in 3GPP TS 22.011)
        Access control information may be available on a node by node basis
        Access control in "connected" should be possible to configure for types/groups of UE and/or different services.

2.1.6.2 System Information Acquisition

System information acquisition for NX standalone operation is detailed in Section 3.2.

In tight integration operation with LTE, system information acquisition resembles, in some respects, that of dual connectivity for LTE. Assuming the UE accesses LTE first and then activates NX, the UE receives the NX system information in dedicated transmission, via the LTE RRC, when setting up the NX connection. In LTE DC, this applies to all system information, except SFN acquired from MIB of the Primary Serving Cell (PSCell) of the SCG. For NX, the SFN may be included in the TRAS (see section 3.2.4.1.3). The same principle applies to the other way around: a UE accessing NX first and then activating LTE obtains the LTE system information in dedicated transmission via the NX RRC.

2.1.7 Paging

The paging solution for NX utilizes one or both of two channels: a Paging Indication Channel, and a Paging Message Channel.

Paging Indication Channel (PICH)

The paging indication may contain one or more of the following: a paging flag, warning/alert flag, ID list, and resource allocation.

Paging Message Channel (PMCH)

PMCH may optionally be transmitted after the PICH. When the PMCH message is sent, it may contain one or more of the following contents: ID list, and warning/alert message. Warning and broadcast messages are preferably to be transmitted over the PMCH (and not in the AIT).

To allow tight integration with LTE, paging configuration (and so DRX configuration) is SFN-based.

To support paging functionality, tracking RAN areas are configured at the UE. A tracking RAN area (TRA) is defined by a set of nodes transmitting the same tracking RAN area signal (TRAS). This signal contains the Tracking RAN Area Code as well as the SFN.

Each TRA may have a specific paging and TRAS configuration which is provided to the UE via dedicated signaling, e.g., via a TRA Update Response or RRC Reconfiguration message. The TRA Update Response may, furthermore, contain paging messages. More information on paging can be found in Section 3.2.

2.1.8 Establishment of LTE-NX Dual Connectivity

In section 2.1.5.4, network-triggered establishment of LTE-NX dual connectivity is described using the RRC reconfiguration procedure. In the example given, the UE has an RRC connection towards the network and RRC messages are exchanged using the LTE eNB. As in the other RRC procedures described in section 2.1.5.4, the higher layers (the asynchronous functions, e.g., RRC/PDCP) can be common to LTE and NX. Upon the reception of measurement reports over the LTE link (e.g., containing NX measurements) the network decides upon the establishment of dual connectivity with NX by sending a RRC connection reconfiguration message, containing the necessary information for the UE to establish a link towards NX. This message can be seen as a command to the UE to establish a connection towards the secondary eNB (SeNB).

Figure 14:
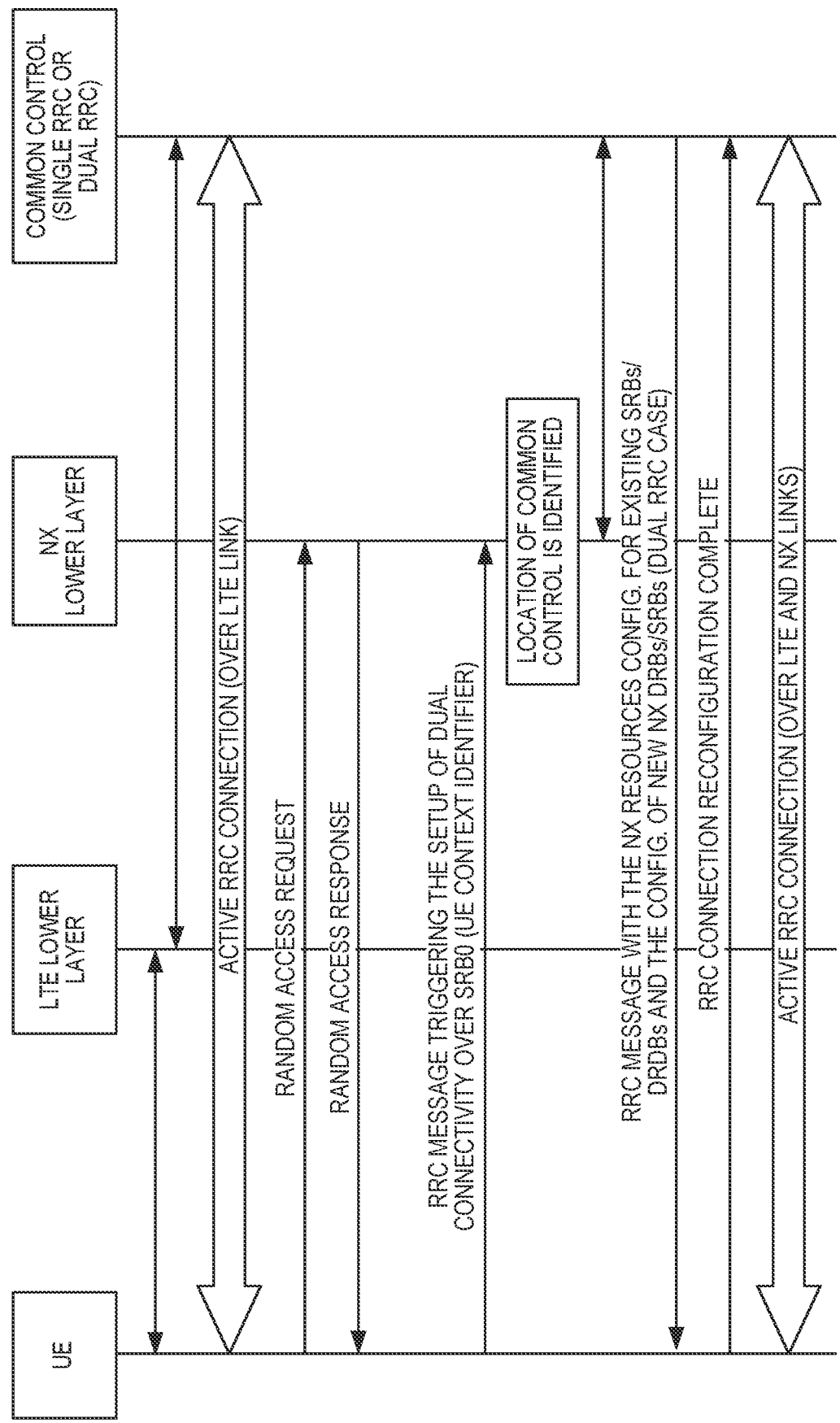
FIG. 14 is a signaling flow diagram illustrating UE-initiated LTE-NX dual connectivity establishment.

Another scenario is a UE-initiated procedure, where the UE directly contacts NX to establish LTE-NX dual connectivity. An example of this approach is shown in FIG. 14. Benefits of accessing NX directly include a lower latency procedure and some additional level of diversity (e.g., when the first link is unstable). Assume the UE has an RRC connection with the network and uses the link from one of the RATs, e.g., LTE, to exchange RRC messages. The UE then initiates the access towards a secondary RAT (e.g., performing synchronization and random access over NX) and sends via the secondary RAT link (e.g., NX) an RRC message containing a UE context identifier (e.g., the UE RRC context identifier described in section 2.1.3.1) indicating the request to establish dual connectivity. This context identifier contains the location of the anchor point, so that upon the reception of that message the secondary RAT can locate the single control point at the network from where the UE is controlled. After the network figures that out (e.g., via X2* in a non-collocated scenario) it sends an RRC message to the UE to configure the NX resources for the existing SRBs/DRBs (previously established over LTE) and/or the configuration of novel NX SRBs/DRBs associated to NX. The same applies for the measurement configurations. The UE-initiated procedure can be applied either for the single or dual RRC case, however, it may be more useful in the dual RRC case where one could possibly have a different RRC reconfiguration procedure over the secondary RAT (NX, in the present example). Note that the fact that this alternative is called UE-initiated does not mean that it is UE-controlled. What triggers the UE to send the request towards the secondary node (NX in the example given) may be an event configured via RRC by the network.

2.2 Layer 2 Design for NX

The NX architecture and details disclosed herein address one or more of a number of problems with LTE, such as the following: LTE uses a fixed HARQ feedback timing which is a problem in some implementation scenarios (e.g., with centralized baseband deployment or non-ideal backhaul) and when operating in unlicensed spectrum (e.g., where listen-before-talk sometimes prevents UEs from sending HARQ feedback); the LTE UL and DL L1 control channels can be improved for better support of high-gain beamforming, as the switches between transmission modes and configurations is unnecessarily hard and slow; there can be a rather long latency coming from the UL scheduling; the DRX behavior is not always optimal; and the design of the scheduling request channel is not as flexible or efficient as desired, for all applications.

In addition, support for reciprocal massive MIMO transmission and massive MIMO beamforming can be made to work better in NX than in LTE. Other improvement areas are one or more of dynamic TDD; unlicensed band operation; contention-based access; multi-connectivity; multi-hop; D2D etc. NX can provide native and optimized support for increasingly important use-cases such as multi-X (multi-connectivity, multi-RAT, multi-hop, multi-carrier, multi-node, multi-beam), UL/DL decoupling, etc.

To handle expected and unexpected migrations in the service mix, all radio links in NX are capable of operating within a bounded set of radio resources (resource slice), thus avoiding that terminals make assumptions on or rely on signals outside these resources. The traffic scenarios supported by NX range from a single 100-bit packet every hour all the way up to multiple Gbps continuous data transfers. The frequency range to be supported is much wider, ranging from below 1 GHz up to 100 GHz. There are wide assumptions on device and node capabilities (e.g., from 1 to 400 antennas, from hours to 20-year battery life, etc.).

2.2.1 Design Principles—Impact on L2 Design

Design principles for the Layer 2 (L2) design of NX are detailed below.

Service agnostic design allowing flexible service centric configurations: Different use-cases have vastly diverse requirements. For example, some C-MTC use-cases need extreme reliability with BLER in the order of $10^{-9}$; tactile internet services need very low end-to-end latency of 1 ms; extreme MBB benefit from multiple Gbps of user throughput, etc. The NX standard provides a large set of service agnostic features which the network may configure and enable to fulfill the service specific requirements. This enables co-existence of multiple services while maintaining low complexity and high efficiency for each service.

Stay in the box: An important feature of LTE is that all traffic is mapped dynamically to a single pair of shared channels (PDSCH/PUSCH). This maximizes statistical multiplexing and allows a single UE to get instantaneous access to all radio resources of a carrier or even multiple carriers. Appropriate RLC configurations and scheduling policies ensure that QoS requirements are met. While NX maintains this fundamental principle, some services just cannot be multiplexed. For example, it is not acceptable if a braking command in a traffic junction is interfered by a packet from the entertainment system in a nearby car. Hence for some critical use cases (e.g., intelligent transport system, public safety, industrial automation, etc.) it may not be acceptable to coexist on the same radio resources with any other service. For this purpose, certain services may be operated on dedicated time and frequency resource slices of the radio spectrum. Separating the radio resource in this manner also enables lower complexity implementation and testing in some situations. If a service becomes deprecated in one particular area (e.g., a factory is closed down) then that spectrum can be quickly reassigned to another service, by managing the resource slices assigned to different services. The default assumption is that all services shall be able to coexist on the same carrier but using dedicated resource slices is a solution for support of so-called vertical services. Thus, in NX, any service can be contained within a defined set of radio resources.

Flexibility: NX has a lean and scalable design that is able to cope with various latencies on the transport and radio interface as well as with different processing capabilities on UE and network side. To ensure this, fixed timing relations are avoided between control messages such as HARQ (MAC), ARQ (RLC) and RRC signaling.

Design for flows: For NX, control signaling may be optimized by utilizing correlations in traffic. This avoids hard and slow reconfigurations. Whenever a future behavior can be predicted (e.g., something sent in the downlink there will be uplink traffic a short while later) the L2 design may take advantage of that: e.g., start with open-loop transmission and do a seamless switch to a closed-loop transmission format once the channel state information becomes available at the transmitter end.

Layers of coordination: When the cost of observation and control becomes too high, e.g., in terms of delay or overhead, scheduling decisions are delegated to nodes and UEs for the time it takes to collect sufficient information and enforce a suitable coordination. The centralized resource scheduler still owns and controls the right to use radio resources but in situations where observation and control is easier and more efficient to maintain in another node (e.g., in multi-hop relaying or D2D), the momentary decisions on how to assign resources can be distributed.

Lean and thereby future-proof: The mandatory transmissions to be done by an NX eNB at specific times are sparse in time and frequency. For example, the NX terminal should not expect control messages at specific time/frequency resources (as is the case today for HARQ feedback in LTE). The configurability enables forward compatibility as the network can assign resources freely to other (newer) terminals without having to send a massive amount of legacy signals for legacy terminals. In particular, when operating in unlicensed spectrum, the NX radio interface may send control information at dynamic time instances. In addition to containing all signals in a bounded resourced slice, a user equipment should be capable of ignoring any "un-defined resources" within the resource slice unless explicitly instructed otherwise. "Un-defined resources" may be dynamically configured as a set of periodic patterns in time, and/or in frequency.

2.2.2 L2 Channel Structure

For NX, the defining of separate control channels for different purposes is avoided except where absolutely necessary. The main reason for this is to optimize the design for massive MIMO and high-gain beamforming. Separate channels have a tendency to rely on frequency diversity as well as separate demodulation reference signals and the resource space can quickly become cluttered. Once a good channel is established towards a specific UE, e.g., by means of a very large number of antennas, it is much more efficient to use this also for transmitting control information.

This is in line with the stay in the box design principle described above. Furthermore, this is based on an observation that when transmitting user data in one link there are often transmissions in the reverse link as well.

Furthermore, any service should be able to be delivered within a bounded set of radio resources (a resource slice), thus avoiding a design where L1 control channels and reference signals are spread out over the entire system bandwidth. To enable this, the L2 channel structure supports in-band control information, with different channel encoding, modulation, HARQ configuration, etc.

2.2.2.1 Direct and Re-Transmittable Physical Data Channel (PDCH)

NX achieves flexibility and scalability by being a system that supports more than one physical channel. Rather than having different kinds of channels for control and data, channels may be regarded as being either direct or re-transmittable. In this document, a direct channel is denoted dPDCH and the re-transmittable channel is denoted rPDCH. The structure of having a direct and a re-transmittable channel is equally applicable to both uplink and downlink transmissions. The difference between such channels is that they may be optimized for different operational points. The direct channel may, e.g., be designed for a BLER of $10^{-3}$ without soft HARQ combining, while a re-transmittable channel may target 10% BLER and support several HARQ retransmissions with soft combining in the receiver. Note that here we are referring to channels for processing Layer 2 (L2) data.

Some information, like downlink control information (DCI) or channel quality information (CQI) feedback may only be relevant if the eNB can decode it upon the first transmission attempt while other type of data, such as user-plane data or RRC control messages, benefit from successful delivery even if that requires multiple HARQ re-transmissions. One single channel structure, optimized slightly differently, caters for both of these very different needs. Note that in some cases the user-plane data may require much lower error probability than L1/L2 control signaling (e.g., up to $10^{-9}$ for C-MTC and $10^{-3}$ for L1/L2 MBB related control signaling) and in such scenarios we may either make use of two direct channels or one that is configured for the highest requirements. Compared to LTE, a difference with this structure is that we assume there is no need for designing tailored channels for special kinds of L1/L2 control information. In-band control multiplexed with data transmissions is the default assumption.

One may think of this as having a direct and a re-transmittable channel where time-critical information is mapped to the former while other data is mapped to the latter. In general, whether a channel is re-transmittable or not is just a parameter setting and not a fundamental difference in design. Therefore, the channels can be referred to with just a number, such as 1 and 2, for example, indicating that they just happen to have different configurations. In the examples provided, the differently configured channels may be used for different purposes. To support different services, different numbers of physical channels may be used. Since the network decides how to fill a downlink transport block, what MCS to use, and whether or not to perform retransmissions, such a scheme could alternatively be realized with a single channel.

Figure 15:
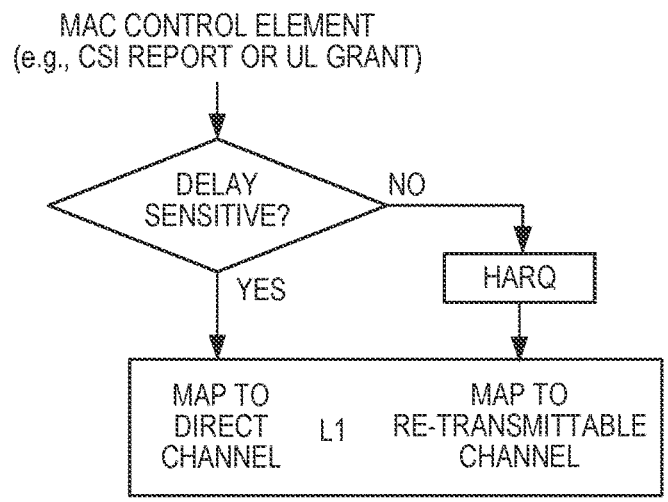
FIG. 15 illustrates an example scheduler decision for scheduling an information element on a low-delay "direct" channel or an efficiency-optimized "re-transmittable" channel.

FIG. 15 illustrates how a MAC control element, such as a CSI report or an UL grant, can be mapped to a direct or re-transmittable channel. It should be appreciated that whether to transmit any given information element on a low-delay optimized (and more expensive, generally) direct channel or on a high-spectral-efficiency re-transmittable channel is a scheduler decision in NX.

Figure 16:
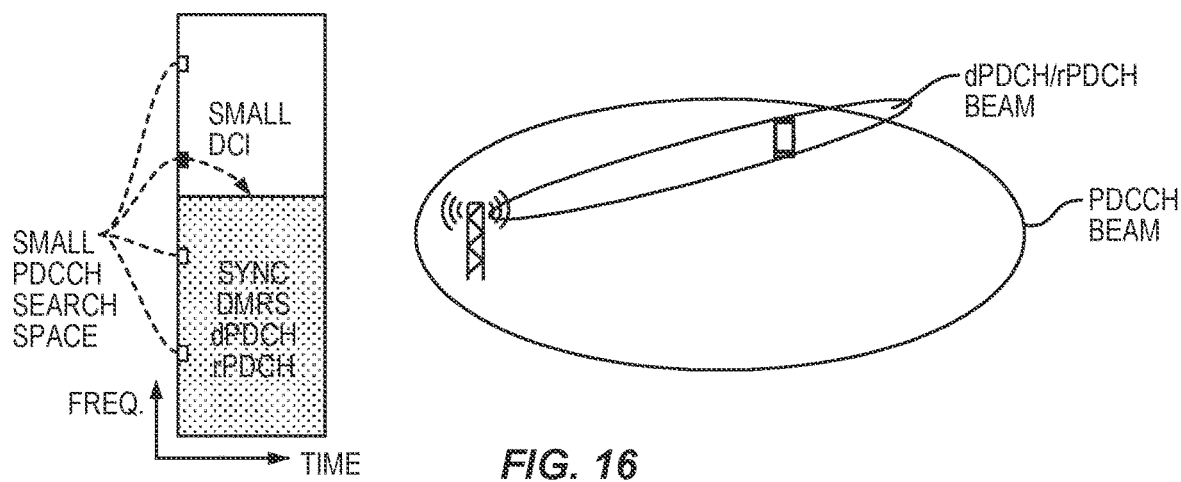
FIG. 16 shows use of the PDCCH to enable high-gain beam-forming and in-beam transmission of control information.

Note that even if the majority of the control information is in-beam, some kind of physical layer control channel is still desirable. In addition to the data channel, a bootstrapping resource that, e.g., can be used to schedule an initial channel use, is desirable. For this purpose, a physical downlink control channel (PDCCH) is defined, where the UE receiver blindly searches for the PDCCH in a pre-defined or semi-statically configured search space. The usage of this PDCCH is depicted in FIG. 16. Note that it is possible to use this physical control channel more or less as in the current LTE system, e.g., it can be used every TTI to schedule DL and UL transmissions. However, an important use of the PDCCH in the NX context is to support a shift towards having a larger part of the dedicated user data and the associated L1/L2 control information transmitted with aggressive beamforming.

As illustrated in FIG. 16, the PDCCH is used in NX to enable high gain beam-forming and in-beam transmission of control information. The PDCCH is designed to be robust and simple and has a separate set of demodulation reference signals in order to support a different (typically wider) beamforming than the PDCH.

Because relying on very high-gain beamforming for the data channel also increases the risk of radio-link failures, a more robust fallback channel is desirable. For that reason, the PDCCH for NX is designed to be lean and simple. In order to quickly resume transmission in this fallback scenario, the PDCCH is very robust and optimized for a wider coverage area. This implies lower antenna gain and higher cost per bit. But, this enables the majority of the control information to be sent "in-beam".

The PDCCH also enables transmission of control information before CSI is available, e.g., as an initial bootstrap channel. Since the transmission of control information on the PDCCH is typically more expensive (due to the lower beam-forming gain), only a limited set of simple DCI formats are supported, containing only a small number of bits. This is not a restriction in practice, since without CSI and during the very beginning of a transmission burst (e.g., during the TCP slow start), advanced procedures that requires a lot of control information are not performed anyway.

UE multiplexing on a shared control channel requires a number of blind decoding attempts. But, by not using the PDCCH as much, the overall number of blind decoding attempts that the UE needs to perform is reduced. Most UEs receive their control information in-beam on the "directly decodable" data channel, most of the time, which gives better control of how to multiplex control information to different UEs.

Note that new DCI formats may be added only to the in-beam "directly decodable" channel and not on the PDCCH, in some cases. This makes it possible to extend the control channel functionality in NX without changing the shared PDCCH. More specifically, NX can be extended in a manner where new DCI formats are added only to the dPDCH and not the PDCCH.

2.2.2.2 Relation Between PDCCH and dPDCH

Above, two different control channels for the downlink are described, PDCCH and dPDCH. The main difference between these two channels is that the dPDCH uses the same demodulation reference signal as the data channel (rPDCH) while the PDCCH uses a different DMRS. Both the PDCCH and the dPDCH/rPDCH can be beam-formed towards the UE. Both the PDCCH and the dPDCH/rPDCH can also be transmitted in a wide beam or with a diversity based beam-former.

The PDCCH is primarily designed to be used when very accurate CSI information is not available in the base station, such that the base station cannot perform reciprocity-based beamforming. The PDCCH uses a DMRS that is typically shared by multiple UEs. It is designed to rely more on frequency diversity than on antenna diversity and can therefore be used in NX deployments with a small (e.g., 2 or 4) number of antennas.

The dPDCH/rPDCH channels are primarily designed for supporting reciprocity-based beamforming and dynamic TDD (UL RRS based). In this scenario, DL DMRS are not needed in theory, but in practice downlink demodulation reference signals may also be used in this case, since perfect and absolute UL/DL calibration is not practical.

The PDCCH, on the other hand, does not rely on UL reciprocity reference signal (RRS). It is time-multiplexed with dPDCH/rPDCH in order to support hybrid beam-forming. One reason why the messages on the PDCCH should be small is that otherwise experience coverage problems of this channel may be a bottleneck in higher frequency bands. If coverage of the PDCCH on high frequency bands is a concern, then PDCCH can be provided only on a lower frequency band, with the dPDCH/rPDCH being used on a higher frequency band. The transmission of UL RRS on the high frequency band that enables reciprocity based beam-forming of dPDCH/rPDCH can then be controlled by the PDCCH on the low frequency band.

As described further in the next section below, there is a difference in how the search space is used on the PDCCH and dPDCH as well. The search space on PDCCH supports user-multiplexing, link-adaptation, and rate-adaptation. The search space of the dPDCH, on the other hand, does not need to support user-multiplexing.

2.2.2.3 Dynamic Search Space

Figure 17:
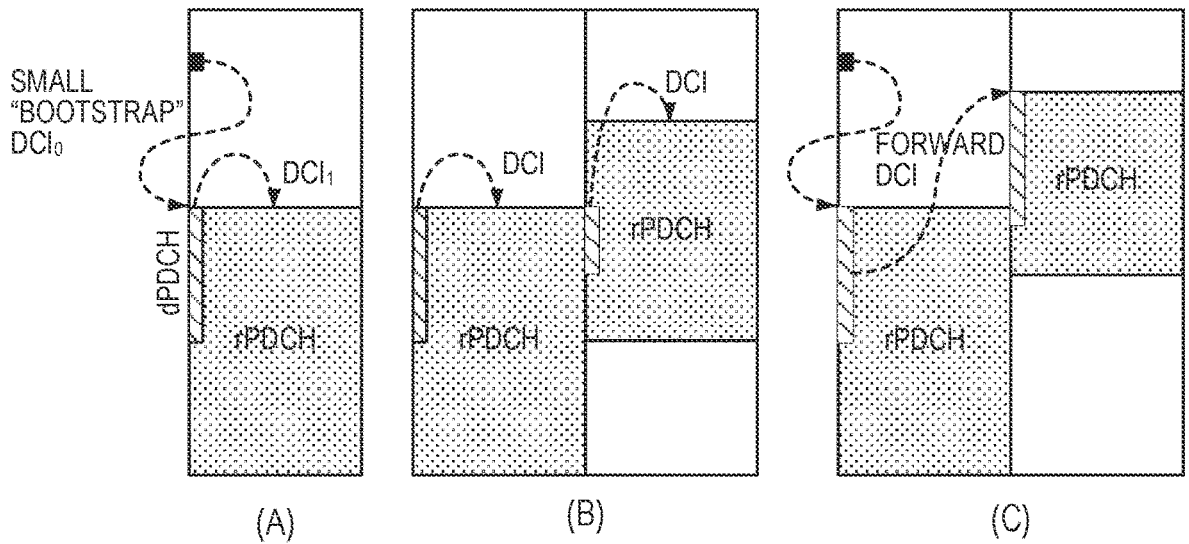
FIG. 17 shows various uses of the PDCCH.

FIG. 17 illustrates, on the left-hand side, how the PDCCH may be used to dynamically update the DCI search space in the UE. The middle portion of FIG. 17 shows that there is no need to send a search update to the UE when not changing the start location of the DCI search space. On the right-hand side, FIG. 17 shows that when changing starting location of the dPDCH (the UE DCI search space), a forward DCI is used. This may cause error propagation.

It can be seen that the bottom portion of FIG. 17 depicts the case where a DCI is received in-beam, on a scheduled resource. This can be enabled by extending the UE search space for downlink control information to also include resources that need to be dynamically scheduled. In the left part of FIG. 17, the UE receives a $DCI_0$ on the PDCCH, which points out where to start searching for additional control information. In the directly decodable part of the assigned resource (dPDCH), the UE may find the control information relevant for this TTI ($DCI_1$). In this example the PDCCH schedules only the search space extension and not the actual DCI.

The middle part of FIG. 17 indicates that the UE may continue to search in the same location, for multiple His. The actual physical data channel assignment may move without enforcing the dynamic search space of the UE to be changed. The UE may still perform a number of blind decoding attempts in order to enable rate and link adaptation of the dPDCH.

A new DCI need only be sent when changing the location of the dPDCH. This is depicted in the rightmost part of FIG. 17. Since this DCI impacts what happens in the next TTI, there is a risk of error propagation in the event that the UE cannot receive the "forward DCI" containing the search space extension information.

Figure 18:
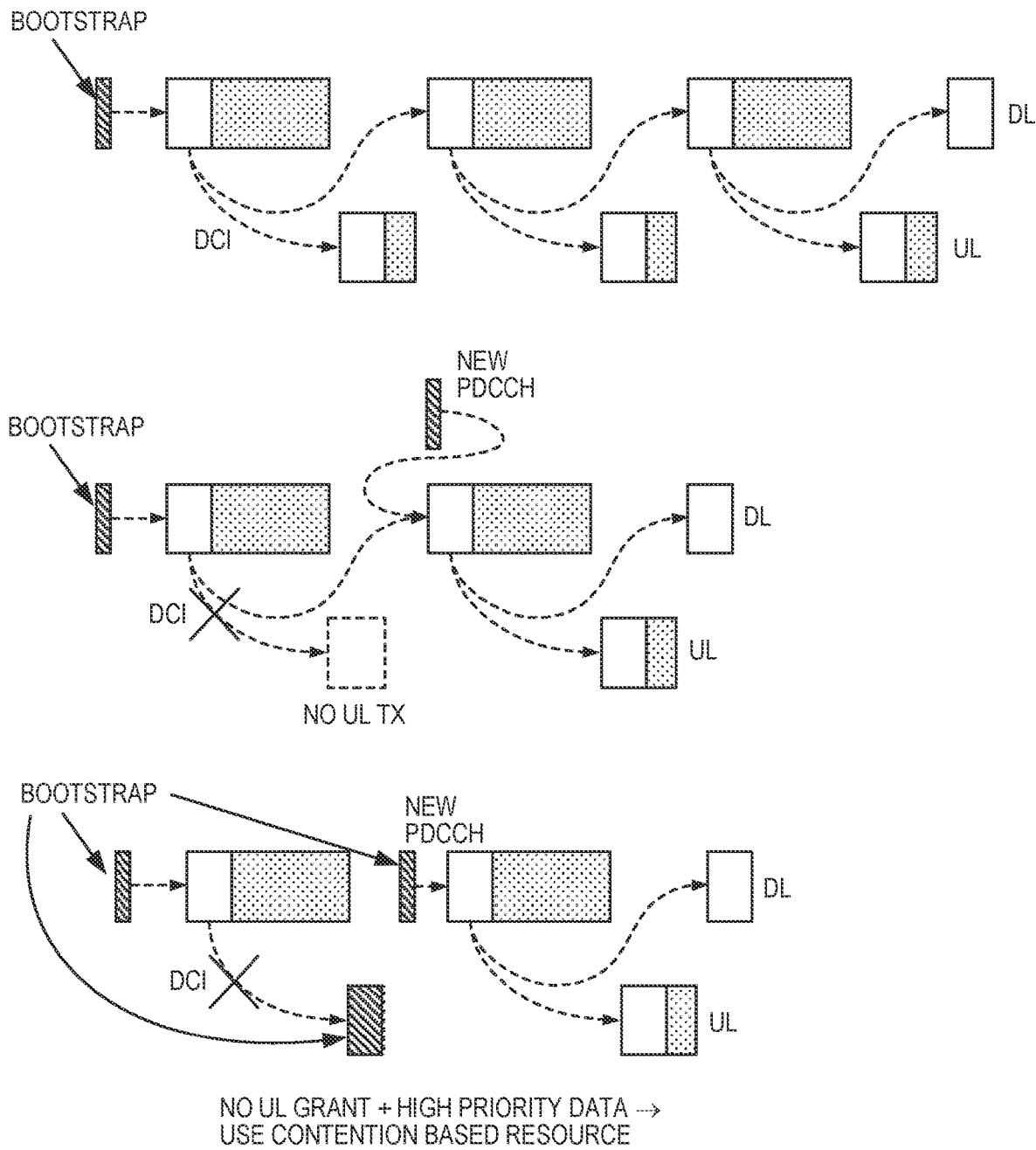
FIG. 18 illustrates an example of possible error propagation scenarios when using in-band DCI to update a UE search space.

When DCI information conveying information on where to search for UL grants and future DL assignments is embedded into the PDCH, then the error propagation cases that might occur need to be considered. The error propagation cases are in many situations easily detected by the network, and they occur only when the UE DCI search space is updated. Some of them are depicted in FIG. 18. In the top part of the figure is shown the error-free operation of this "DCI-daisy chain" operation. More generally, FIG. 18 shows examples of possible error propagation scenarios when using in-band DCI to update the UE search space. So-labeled boxes indicate the usage of a bootstrap channel (e.g., PDCCH or a contention-based physical data channel), lightly-shaded boxes indicate a directly decodable PDCH, while more darkly-shaded boxes indicate a re-transmittable PDCH.

In the event that the UE does not receive the dPDCH, it does not receive the embedded UL grant. When the NW detects that the scheduled UL transmission from the UE is missing, it can be assumed that also the next DL assignment was missed. These failed assignments can be distinguished from failed UL transmission by energy detection, e.g., SINR estimate on DMRS, UL transmission contain data but not HARQ feedback. Error propagation can be further mitigated by introducing "control information received acknowledgment" when search space is changed. As a response, the NW may re-transmit the DCI for the second DL TTI using the PDCCH. This is depicted in the middle part of FIG. 18.

In the event that the UE expects to receive an UL grant but does not receive any, then it might use a pre-scheduled contention-based resource instead. The use of a contention-based uplink channel instead of a scheduled dedicated channel is an indication that the first dPDCH decoding has failed (see bottom part of FIG. 18).

Figure 19:
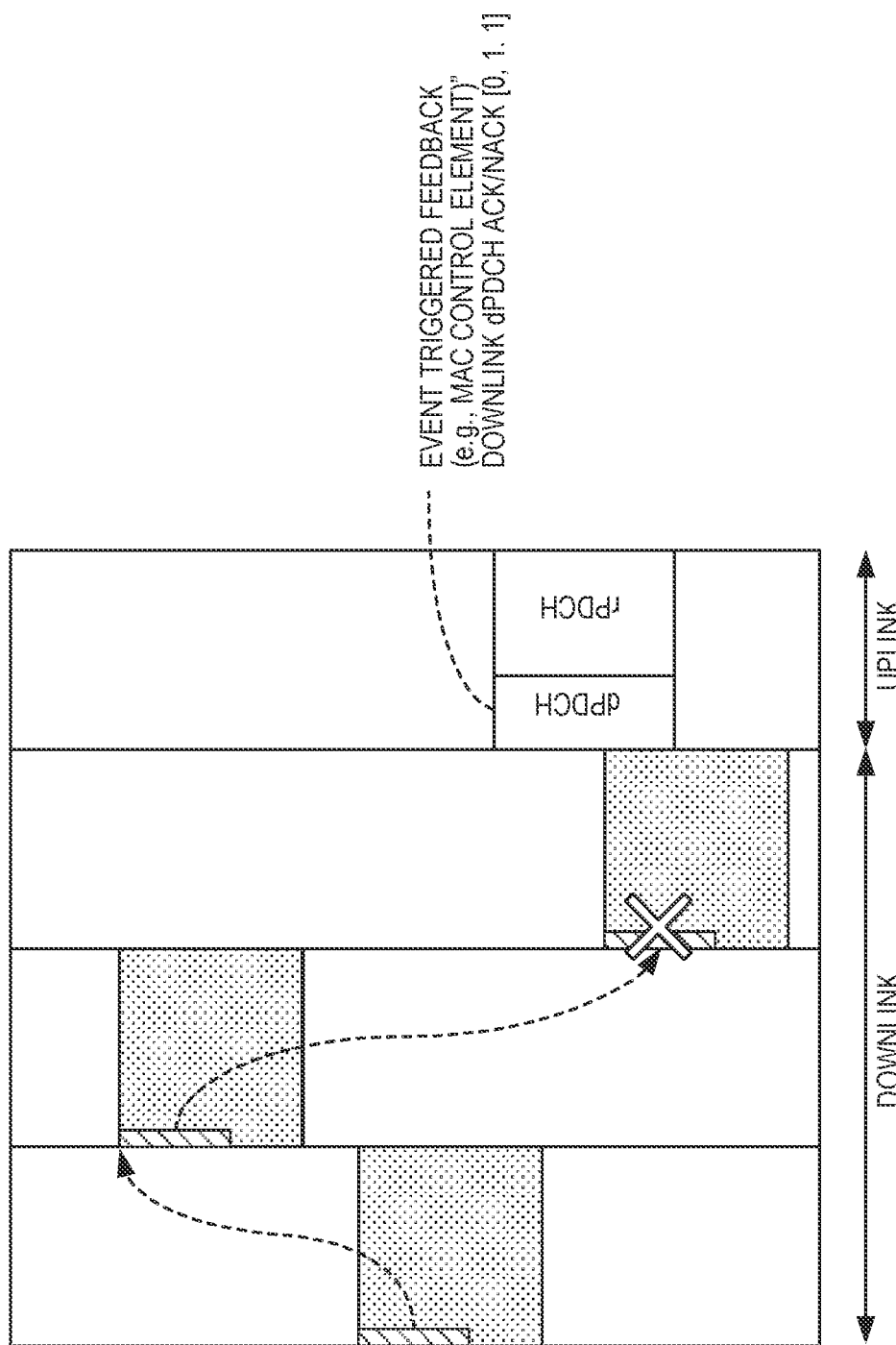
FIG. 19 shows the reporting back of reception success of the dPDCH, by a UE.

In addition to the implicit error propagation detection mechanisms depicted in FIG. 18, the network may also request the UE to send explicit and event triggered reports on the detection success of dPDCH transmissions. An example of this is shown in FIG. 19, which shows that when scheduled in the UL, the UE can report back the reception success of the dPDCH in previous TTIs. Depending on the performance of in-beam DCI, this extra level of error-propagation termination might not be necessary, in a given implementation.

The search space for downlink control information (DCI) is thus dynamically updated by means of DCI signaling. The DCI may be transmitted directly on a physical downlink control channel (PDCCH) or embedded in a MAC control element inside a scheduled downlink data channel (typically the dPDCH).

UE search space modifications such as add/delete/move may be signaled explicitly, e.g., in a previously received DCI or MAC control element. The search space modifications may also be implicit, e.g., by automatically extending the UE search space to include locations used for DCIs in the previous N TTIs or by automatically delete the oldest UE search space location when a new search space location is added.

2.2.2.4 Shared Reference Signals

The use of in-beam control channels relies on having the same dedicated demodulation reference signal (DMRS) for both the dPDCH and the rPDCH. This is shown in FIG. 20, which illustrates an example of using a single set of terminal specific demodulation reference signals (four shaded regions having 8 resource elements each) for demodulation of two physical channels, the dPDCH and the rPDCH.

Figure 20:
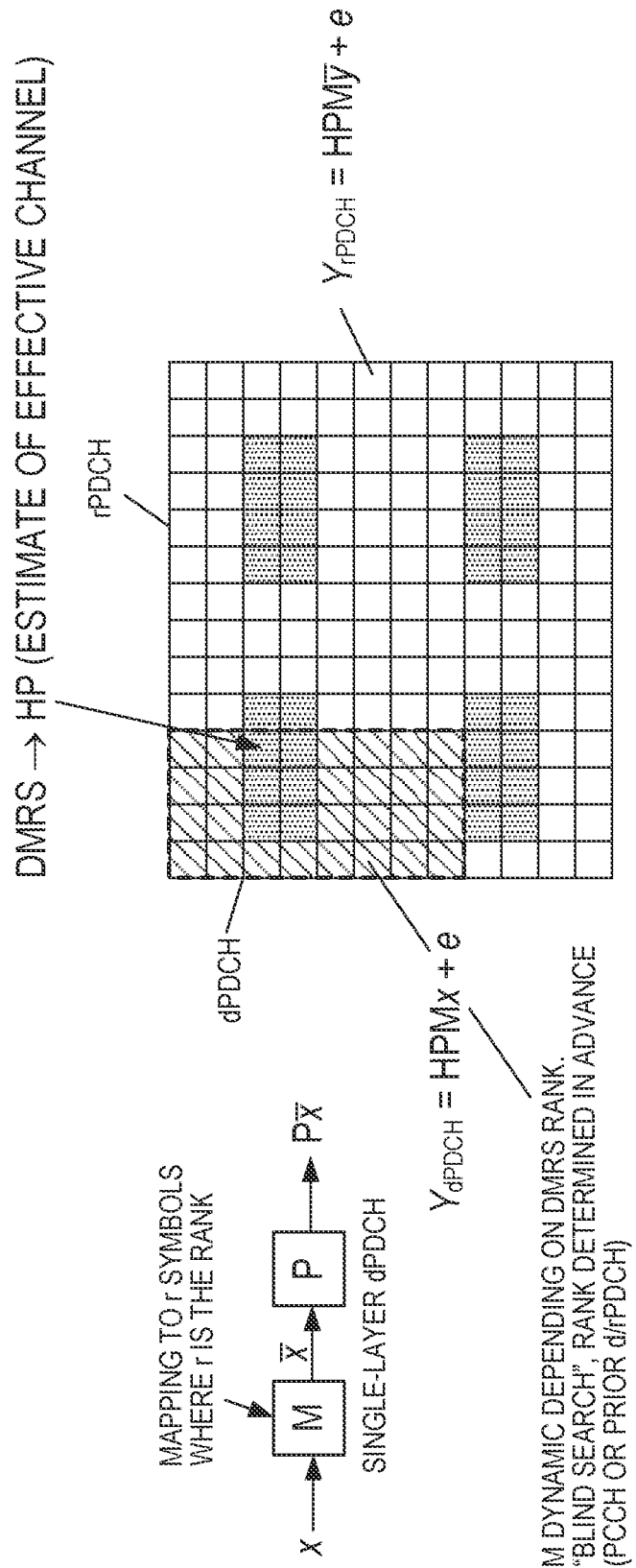
FIG. 20 illustrates the use of a single set of terminal-specific demodulation reference signals for demodulation of two physical channels.

At a first glance, the illustration in FIG. 20 looks similar in some respects to how in LTE the CRSs are used as common reference signals for demodulation of PDCCH and PDSCH. However, there are differences. Although the CRSs in LTE may be beamformed, e.g., by down-tilting of the antenna, the beamforming cannot be changed dynamically with respect to a particular UE, since there are other UEs measuring on the CRSs. Thus, when using ePDCCH+DMRS on PDSCH in LTE, two sets of reference signals are used, leading to higher pilot overhead. When CRS-based transmission in LTE (PDCCH+PDSCH TM4) is used, then there is no option of dynamically beam-forming the reference signals towards the receiving user.

2.2.2.5 Resource Partitioning

In LTE, the total system bandwidth is signaled on the PBCH. For NX, it is not assumed that a user is aware of the system bandwidth. A notion of a user-specific bandwidth is still desirable, e.g., for channel filtering and signaling purposes. The BW that a UE is operating within is here defined by a "resource partition". A resource partition is a time-and-frequency subset of radio resources in which we can define radio links and transmission modes. One property of a resource slice is that it can be semi-statically re-configured (which is not the case for the "system bandwidth" in e.g., LTE).

This implies that all modes of transmission that are defined for NX are able to operate on a subset of the time/frequency resources. Such subsets, or resource partitions, span dimensions from full utilization down to a minimum utilization. Note that this also includes all TM-specific reference signals. These restrictions in time and frequency are semi-static—they are configured by RRC.

2.2.3 Transport Channels

Figure 21:
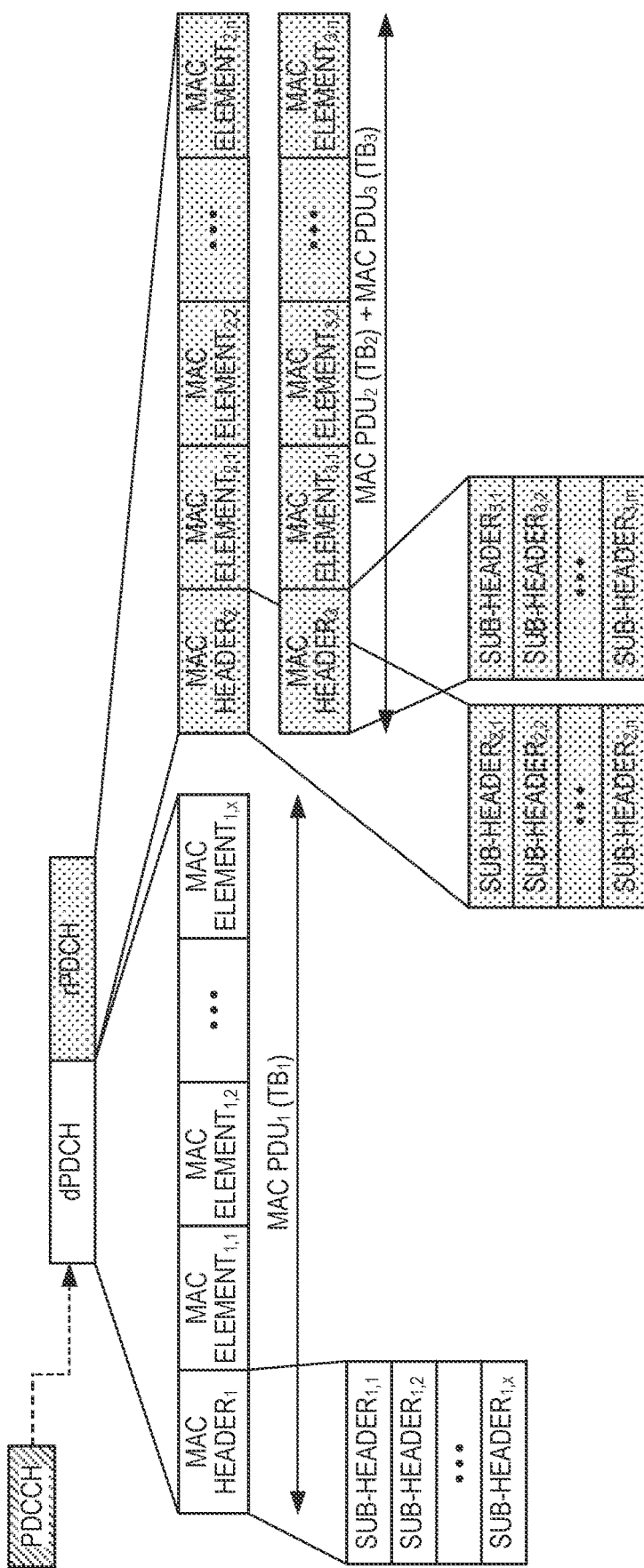
FIG. 21 illustrates a basic MAC channel structure for NX.

An NX radio link can thus have one or more physical data channels (e.g., dPDCH and rPDCH) in each direction (UL and DL) and the scheduling entity also has access to a physical downlink control channel (PDCCH) used for transmitting control information only. The MAC structure of each physical channel is the same for UL and DL. An example with two PDCHs, the first one having 1 transport block (TB) and the second one having two transport blocks is depicted in FIG. 21. Each channel has a MAC Header and a payload part containing MAC Elements. The MAC elements are either Control Elements or MAC SDUs (service data units).

FIG. 21 shows the basic MAC channel structure of NX. A lean and simple boot-strap channel denoted physical downlink control channel (PDCCH) is used to initiate a packet exchange flow. A first or "directly decodable" physical channel (denoted dPDCH) carries primarily in-band control information. A second or "re-transmittable" physical data channel (denoted rPDCH) carries primarily user-plane and control-plane data. Both physical data channels are assumed to re-use the transport channel structure of LTE.

Figures 22, 23:
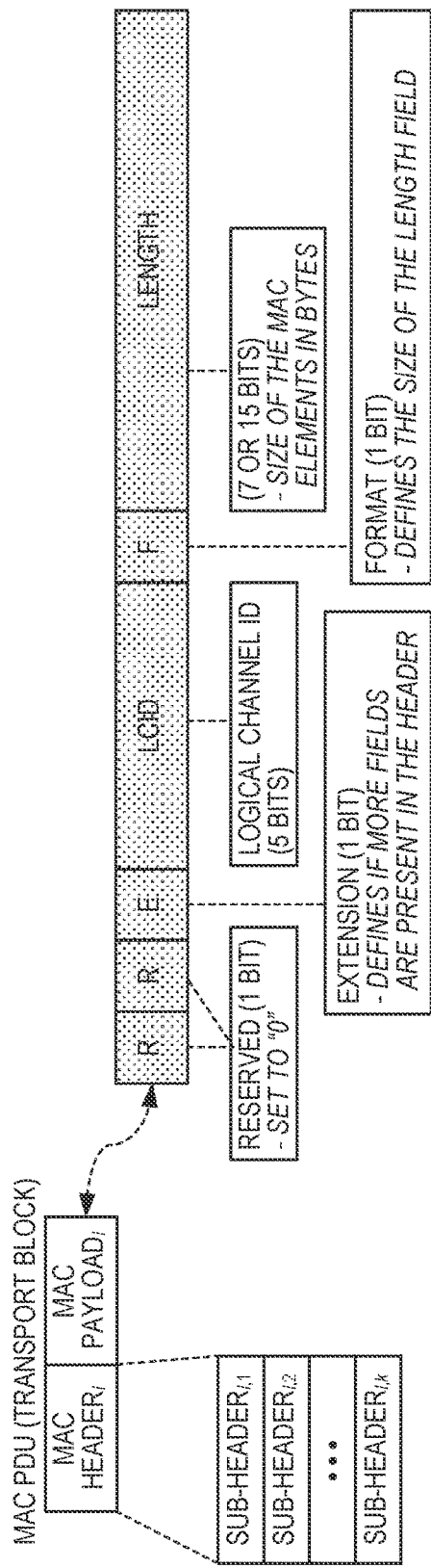
FIG. 22 shows a transport channel structure and MAC-header format.
FIG. 23 shows an example of how LCID tables may be extended.

The content of the MAC sub-headers are, in principle, the same as for LTE today. The sub-header can consist of 1, 2, or 3 bytes of information. The structure [R/R/E/LCID] is used for fixed length MAC SDUs and fixed length MAC Control Elements, and the structure [R/R/E/LCID/F/Length] is used for variable length MAC SDUs and Control Elements. This is shown in FIG. 22, which shows how the transport channel structure and MAC-header format from LTE is re-used also for NX.

In LTE, the logical channel ID (LCID) is defined in separate tables for UL and DL. NX follows the same general approach. FIG. 23 shows examples of how the LCID tables can be updated for UL and DL, where some additional LCIDs in NX are shown. For the DL, one addition is to support the transmission of a DCI (downlink control information) as a MAC control element. The DCI can, just as in LTE today, be used to assign an UL grant, schedule a DL transmission, or to send a power-control command. In addition, the DCI is extended to also support a command for transmission of reference signals, such as UL reciprocity reference signals (RRS), denoted RS transmission command in FIG. 23. Also information about reference signal transmissions, e.g., to support active mode mobility with dynamically activated and beam-formed reference signals, can be communicated in a DCI. This can be included in a RS transmission information element in FIG. 23. Note that the different kinds of DCI may also be encoded as separate LCID fields. For the UL there is no similar UCI field defined, and instead the different kinds of UL control information each have their own LCID field.

In addition to DCI and UCI, transmission of HARQ feedback in a MAC control element is enabled. This in turn enables introduction of new feedback schemes such as selective repeat or schemes where more than one feedback bit per process is used. Also, a LCID for CSI feedback is introduced as well as an entry for reference signal measurement feedback. Note that not all LCIDs are relevant in all cases. Some are mostly relevant in the DL while some are mostly relevant for the UL.

Figure 24:
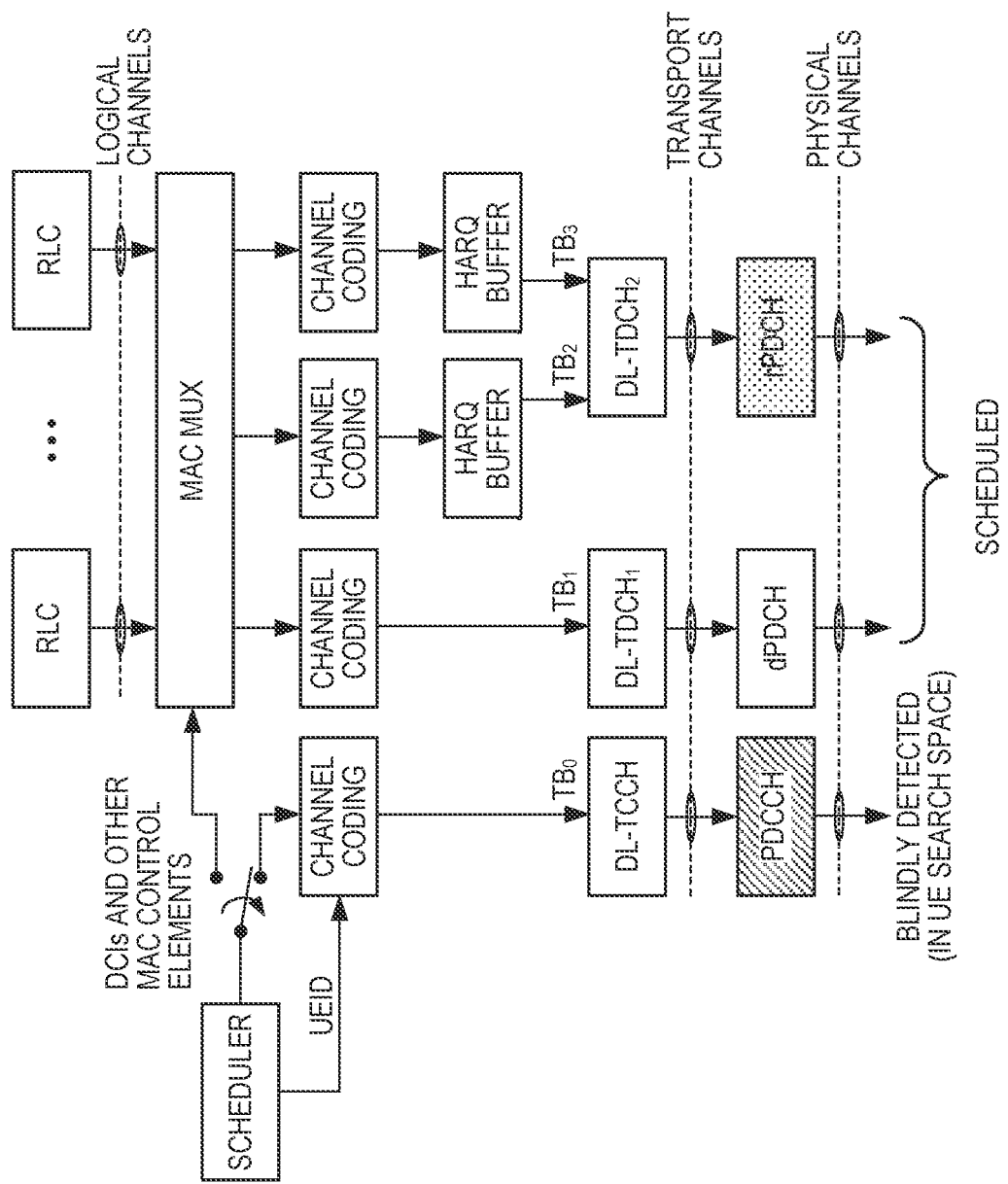
FIG. 24 illustrates an example downlink channel structure.

In FIG. 24 is shown a downlink example in which two PDCHs are configured. The figure shows a downlink channel structure example comprising a physical downlink control channel (PDCCH), a first "directly decodable" physical data channel (dPDCH) and a second "re-transmittable" physical data channel (rPDCH). The dPDCH does not use soft combining of HARQ re-transmissions and it can only carry a single transport block ($TB_1$) while rPDCH does support HARQ and supports transmission of up to two transport blocks ($TB_2$ and $TB_3$). In addition, the downlink PDCCH can transmit DCI and possibly also some other MAC-control elements embedded into one transport block $TB_0$. The UE identity is implicitly (or explicitly) encoded in the CRC of the downlink PDCCH. Note that a difference between the downlink PDCCH and any of the PDCH channels is that the downlink PDCCH cannot carry any MAC SDUs. Furthermore, the downlink PDCCH is blindly decoded by the UE while the PDCH channels are scheduled (implicitly, semi-persistent or dynamically).

Figure 25:
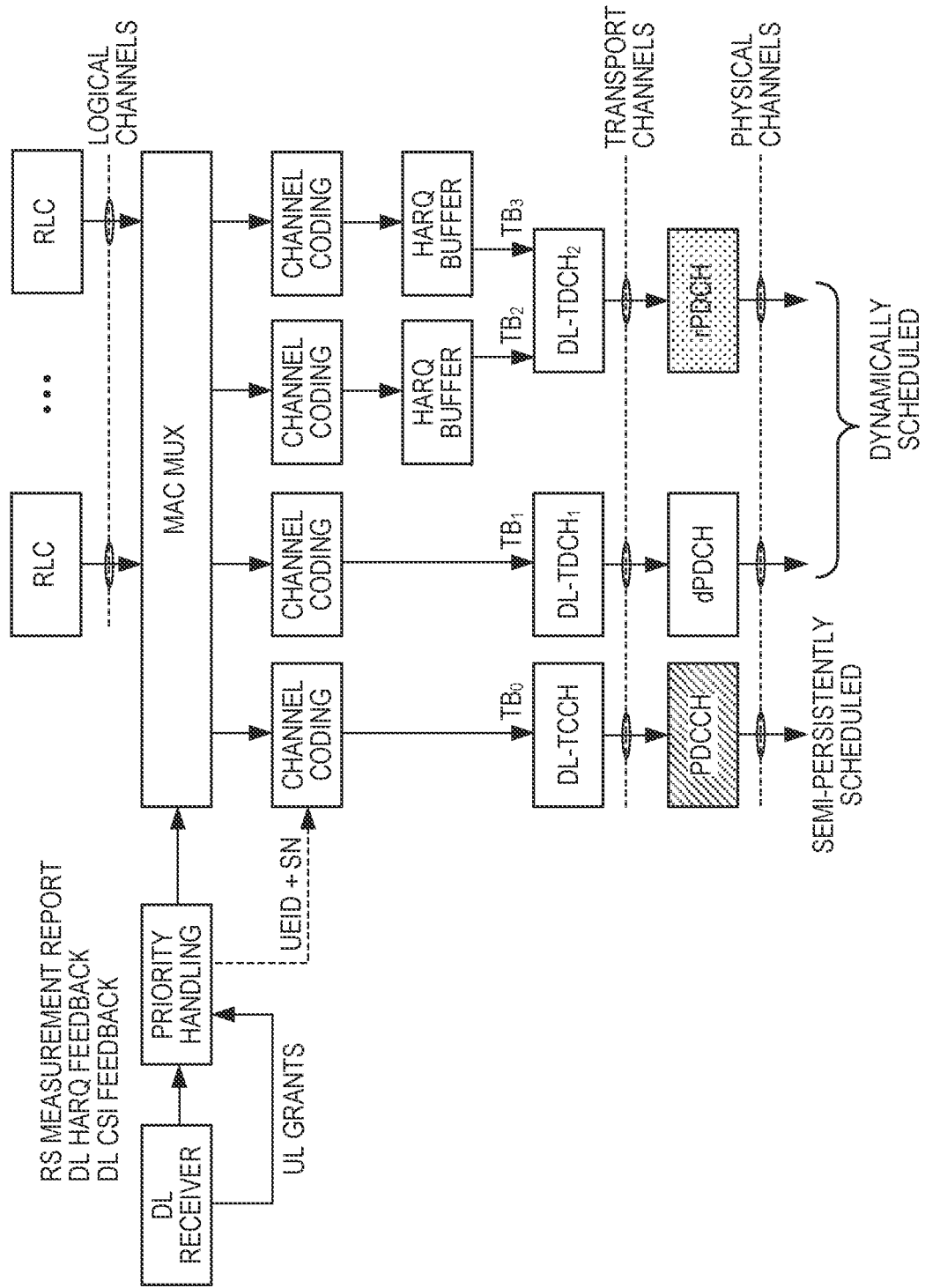
FIG. 25 illustrates an example uplink channel structure.

A corresponding example for the uplink is depicted in FIG. 25, which illustrates an uplink channel structure example comprising a physical control channel configured for contention-based access (cPDCH), a first dynamically scheduled "directly decodable" physical data channel (dPDCH) and a second dynamically scheduled "re-transmittable" physical data channel (rPDCH). Note that the uplink does not have any scheduler but instead a priority handler entity that selects data from the logical channels and controls the MAC Multiplexing within the grants provided. Since there is no scheduler, there is no need for any PDCCH channel either. Instead, the UL transmitter has a channel cPDCH that is primarily intended for contention-based use. A difference between cPDCH and the other two uplink physical data channels (dPDCH and rPDCH) is that they are granted differently.

The contention-based channel (cPDCH) uses a semi-persistent grant that may be assigned also to other UEs. Therefore, the UE identity is encoded onto the channel (implicitly in the CRC or explicitly using a MAC Control Element with LCID 11000; see FIG. 23) whenever cPDCH is used. In the event that the UE does not have a sufficiently sized grant, it may send a scheduling request (e.g., a buffer status report) on cPDCH. Depending on the size of the grant on the "contention-based channel" cPDCH, the UE may also include user-plane data when transmitting on that channel. Note that channels carrying system access information and signals such as the PRACH are not included in the illustrated structure in FIG. 25. Should the UE not have a valid grant for any channel, then transmitting a PRACH preamble is an alternative (see section 3.2 for further details).

The "direct channel" (dPDCH) and the "re-transmittable channel" (rPDCH) may be scheduled in a dynamic fashion. When using granted resources on these channels, it is assumed that the receiver knows who is transmitting, and hence no UE identity needs to be embedded.

Note that these are just examples used to illustrate that the basic PDCH structure in FIG. 21 works for both UL and DL, for a typical mobile broadband use case. For other use cases, the UL and DL radio links may be configured slightly differently, e.g., without any second "re-transmittable" data channel. By granting resources in different manner and by embedding user identities on some channels and not on other channels, many different use cases can be supported.

For the uplink, note that all non-system access related channels are scheduled in some manner (semi-persistent; dynamic; or implicit). So-called contention-based channels are not special in any particular way. Whether a resource is "dedicated" or not becomes irrelevant in some scenarios, e.g., when massive MIMO or high-gain beamforming is used to enable spatial multiplexing. When resources can be spatially separated, time/frequency resources need to be "dedicated," and consequently the receiver in the base station should be able to derive who the transmitter is. On contention-based channels a UE identity is embedded in the channel, while on dedicated channels this is not needed. The idea here is that different physical channels have different properties. Different channels may use different sub-sets of a large common transmission format table (e.g., different channel encoders). Continuing with the example in FIG. 25, for instance, three PDCHs may be configured as follows:

cPDCH: Optimized for "contention use". For example, a small grant may be available every 2 ms for transmissions of a buffer status report when needed. The UE is allowed to not use this grant. Normally, if a UE is scheduled on the UL and has no data to transmit, it needs to fill the granted resource with padding but for this channel the UE may simply refrain from transmitting anything at all in that case. The grant may also have a restriction (e.g., can mostly be used 10 consecutive times) and possibly a cool-down timer (e.g., not allowed to use during 100 ms after the grant is exhausted). The channel encoder may be configured to be a small block code. A "UE identity" and a packet sequence number needs to be signaled when this channel is used.

dPDCH: Does not support soft-combining of re-transmissions; uses robust transport formats; optimized for embedded control information such as "HARQ feedback", "CSI feedback", and "RS measurement feedback".

rPDCH: Carries 1 or 2 transport blocks of uplink data; uses soft-combining of re-transmissions based on HARQ-feedback; optimized for efficient transport of MAC-SDUs (user data).

2.2.4 Scheduling

Resource allocation can be simplified in NX, especially when the nodes are equipped with many antennas. This is due to so-called channel hardening, which essentially means that after the application of an appropriately chosen precoder to the transmitted signal, the effective wireless channel between the transmitter and the receiver looks frequency-flat (see section 3.4.4.3), and therefore advanced frequency-selective scheduling might not be needed in NX. However, in order to enable coordination gains and excellent network performance also at high load, there is still a desire for a network-controlled scheduling design. It is assumed that the network can control the usage of radio resources by means of explicit assignment signaling. Scheduling assignments can be sent on a dedicated control channel or in-band, as a MAC control element, for future sub-frames. Maintaining a flow of scheduling assignments may be particularly efficient for reciprocity-based Massive MIMO, where control signaling using valid CSI is significantly more efficient than sending control signaling without CSI. Both dynamic and semi-persistent allocation of resources is possible. At least for semi-persistently allocated resources, it is possible to configure the option of not using the allocated resource if there is no data or control signaling to send in the given time-slot.

However, for some situations the latency and/or cost to enable observability and control from the network do motivate a distributed means of control, as well. This is achieved by means of resource control delegation, the network delegating a part of the radio resources, associated with a set of rules and limitations. Limitations can include, for example, priorities between resources, indication on whether the resources are dedicated or shared, listen-before-talk rules, power or sum-resource usage limitations, beamforming limitations, etc. This design principle covers D2D (section 3.1.1), contention-based access (section 2.2.6), multi-point connectivity (section 3.12), and other features where strict network control is infeasible and/or inefficient.

2.2.4.1 Reference Signals

A number of different reference signals are provided in NX, for channel estimation and mobility. Both the presence of the reference signals as well as the measurement reports are controlled by the scheduler. The presence of signals can be dynamically or semi-persistently signaled to one or a group of users.

Also, reference signals for active mode mobility (MRS) can be dynamically scheduled. A UE is then assigned with a search space for mobility transmissions. Observe that this search space is potentially monitored by one or more UEs and/or transmitted from one or more transmission points.

Scheduled reference signal transmissions (such as MRS) contain a locally unique (at least within the search space) measurement identity in the data message, and reuse some or multiple of the pilots in the transmission both for demodulation and measurement purposes, implying that it is a self-contained message. Further details on reference signals are given in section 2.3.

2.2.4.2 Link Adaptation

Rate-selection is also performed by the network, to benefit from coordination features enabling better prediction of the channel state. Different NX use-cases and scenarios have very different link adaptation input and requirements. To support uplink link-adaptation, power (or path-loss) estimates and sounding signals are desirable. For downlink link-adaptation, both uplink (reciprocity) and downlink pilot-based estimation are desirable. For downlink pilot based link-adaptation, the CSI concept from LTE with CSI-processes and CSI-RS and CSI-IM (for interference measurements) may be maintained (see section 3.4). The CSI-RS transmission and measurements are controlled from the scheduler, in both time and frequency. For most use-cases, the CSI-RS can be kept in-band together with data transmissions, but in some scenarios explicit signaling of CSI-RS is desirable, e.g., for sharing of CSI-RS resources between users. CSI-IM and interference reporting is also used, for reciprocity-based beam forming.

2.2.4.3 Buffer Estimation and Reporting

Buffer estimation is used to support uplink scheduling. Data notification can be done using a data transmission on a pre-assigned resource or using a single (or few) bit indication on an uplink channel. Both of the options can be either contention-based or contention free, e.g., a semi-statically configured contention-based UL channel or a dynamically scheduled directly decodable UL channel may be used for this purpose. An existing data resource can provide a lower latency, while the scheduling request bit enables better control of the radio resources and potentially better spectral efficiency. A scheduling request channel may not be needed in NX if the regular uplink channels, potentially using code-division, are sufficient. Scheduling request transmissions when the UE is not dynamically scheduled rely on having a pre-configured grant; in other words, scheduling requests do not have any special physical channel. Normally, scheduling requests are transmitted implicitly, by means of transmitting pre-defined UL reference signals (such as an RRS), or explicitly, by means of using a pre-granted cPDCH channel.

2.2.4.4 Multi-Connection Scheduling

Scenarios like multi-hop and multi-connectivity may lead to multiple controlling nodes for one served node. Coordination of the controlling nodes is important, where the controlled node can be used for some of the decision making, for example for selecting between conflicting assignments or to distribute state information to controlling nodes. For observability, the outcome of any distributed decision making may be fed back to the controlling nodes.

The structure described herein, with in-band and in-beam control, significantly simplifies the multi-connectivity use-cases. In scenarios where, for example, the downlink data channel is scheduled from one node and the uplink data channel is scheduled by another node, additional uplink and downlink control channels to both nodes are typically desirable as well. By ensuring that these control channels are in-band, the maintenance and usage of control channels associated with multiple nodes is simplified.

2.2.4.5 Interference Coordination and CoMP

With a higher usage of directional beamforming, interference is expected to be bursty to a higher degree. This property provides a larger potential for coordination gains through coordinating the spatial usage and utilizing the extra degree of freedom for interference control in the few cases where it is needed.

In NX, interference can come from a large number of different sources, e.g., normal neighbor node signals, pilot pollution in reciprocity based MIMO, UE2UE and BS2BS interference in dynamic TDD and side-link communication, and other systems in shared spectrum bands.

To support these kinds of features, a set of measurements is desirable. For some features, UE-triggered reports on experienced interference or high received power of a given sequence are suitable. In some well-coordinated scenarios, the use of CSI-reports measured on CSI-RS/-IM is preferable.

2.2.4.6 Group and Dedicated Scheduling

UEs may monitor one or more group-scheduled messages in addition to the dedicated messages. This is done by configuring the UE to not only monitor DCIs for a UE-specific CRC (typically the UE temporary identity is used to mask the CRC), but also for one or more group CRCs.

Figure 26:
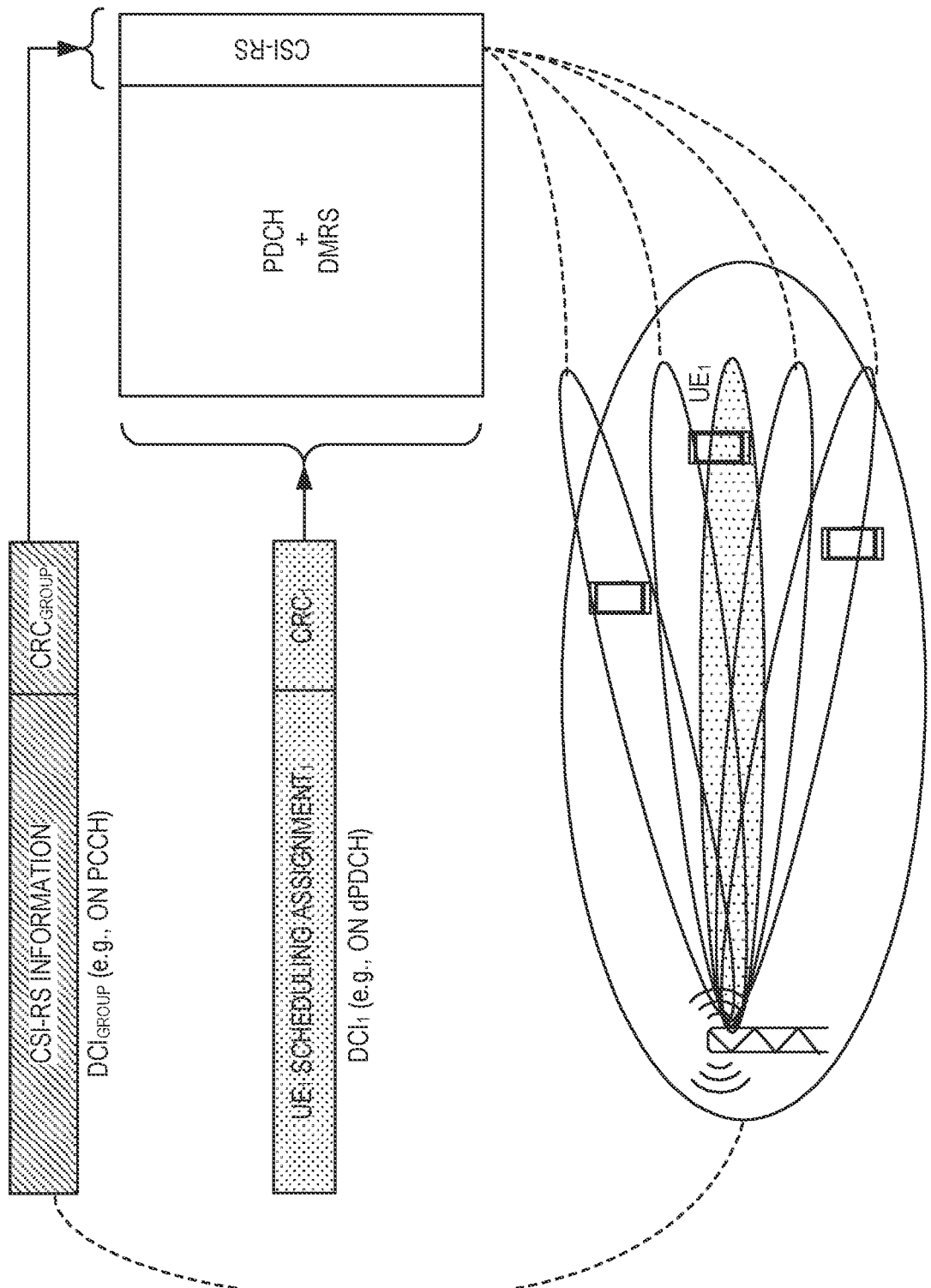
FIG. 26 shows an example of group scheduling.

One typical use case for this is to enable UEs to measure on dynamically scheduled reference signals such as CSI-RS, mobility RS, and beam-RS. FIG. 26 shows an example where UE, is assigned resources containing additional CSI reference signals, and more generally illustrates an example of using group scheduling to distribute information about dynamically available reference signals (CSI-RS in this example). These reference signals may be useful also for other UEs and for that purpose a group scheduled message may be transmitted on e.g., the PDCCH to enable non-scheduled UEs to receive and measure on the CSI-RS signals.

2.2.5 Management of Directional Interference 2.2.5.1 Methods for Directional Interference Management When there is high-gain beamforming, one or more of three aspects may be considered in interference control. The first is that the interfered area from a narrow TX beam is much smaller than from a wide beam. The second is that high-gain receiver beamforming is strong for rejecting interference. The third is that the interfered area by a narrow TX beam may have high interference power density. Considering these aspects, there may be two effects: the first is that the number of considerable interferers for one victim receiver may be very few, most probably only a single considerable interferer at any given time; the second is that the experienced interference of a victim receiver may vary largely and quickly, depending on whether the transmitter of the aggressor link is transmitting or not. The interference control in NX considers the above characteristics:

The utilization of high-cost interference control method should be careful. An interference control method at the cost of considerably reducing radio resource utilization (e.g., transmission power, spatial-time-frequency resources) of the interfering link can be categorized to high-cost interference control method, for instance, the uniform transmission power control, reduced power sub-frame or almost blank sub-frame. Since there is a risk that the benefit by the victim link from the reduced interference may not be able to compensate the loss of the interfering link due to the reduction of the radio resource utilization, such methods shall be cautiously applied, from the system perspective. However, when there is a risk that the victim link starves from a long-time strong interference from the interfering link, some of such methods may be applied, to ensure the minimum acceptable experience of the victim link.

One or more cost-free or light-cost (with no or low radio resource utilization reduction) interference control methods may be prioritized:

Coordinated link adaptation to protect the TX opportunities with low interference from the TX opportunities with high interference according to the interference knowledge based on DLIM.

Coordinated scheduling to avoid the simultaneous scheduling of the interfering and victim links when there are multiple candidate links.

Coordinated AP selection to change the TX beam direction of the interfering link or the RX direction of the victim link to pursue both the load sharing gain and interference control gain.

2.2.5.2 Aligned Directional Sounding and Sensing (ADSS)

As seen in Section 2.2.5.1, interference awareness is important for interference control with high-gain beamforming. An Aligned Directional Sounding and Sensing (ADSS) scheme is developed to derive a Directional Link Interference Map (DLIM), where the DLIM is used for interference control. ADSS is designed to align the interference sounding and measurement in the network via a time-frequency pattern defined by Directional Sounding and Sensing Interval (DSSI) and Directional Sounding and Sensing Period (DSSP). During the DSSI, each transmitter transmits one link-specific beam-formed sounding signal over the configured Sounding Resource Unit (SRU) in its link direction, and each receiver keeps a sensing state in its link direction for all possible sounding signals over all SRUs. Each link receiver reports the measured results (periodical or event-triggered), including the interfering link identity and the corresponding interference level. Based on the collected measurement results, the network can derive the DLIM.

Figure 27:
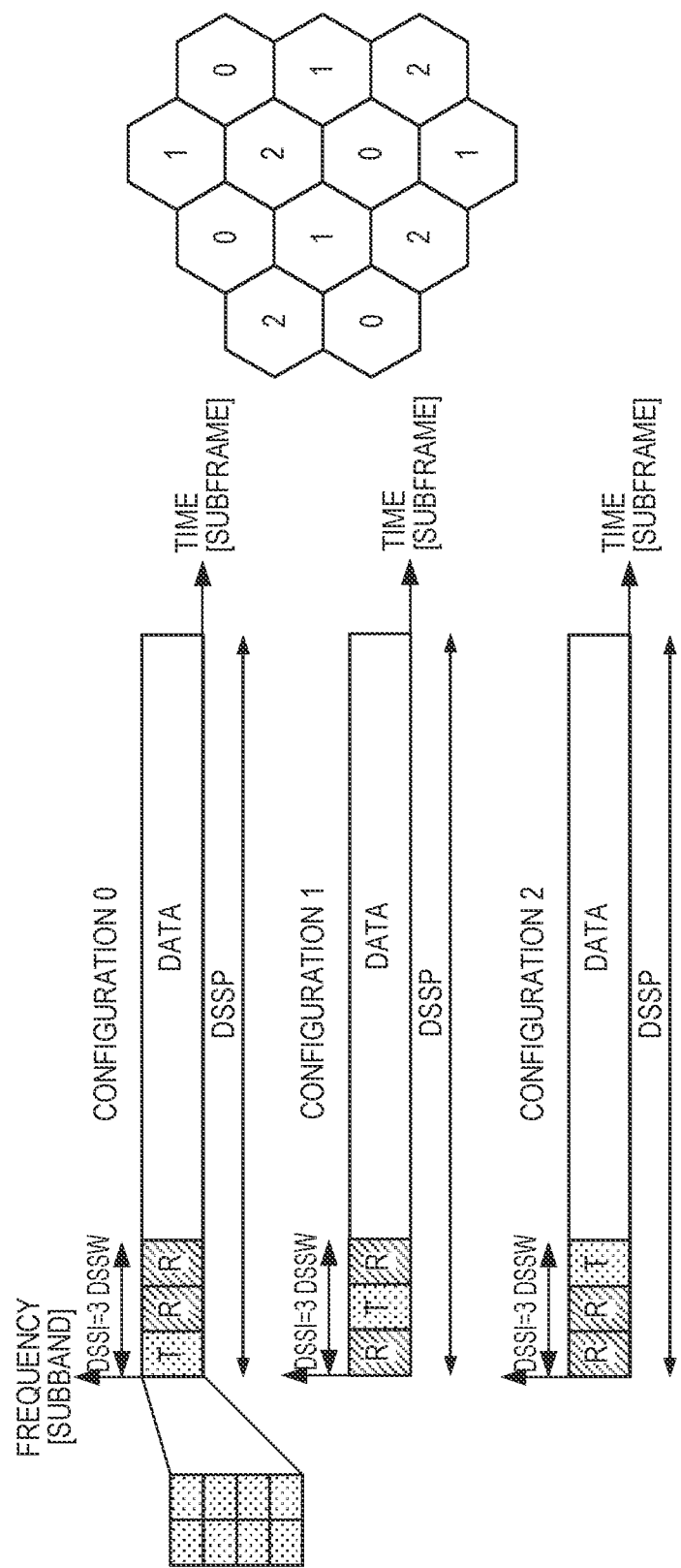
FIG. 27 illustrates an ADSS pattern and dimension of DSSI for ADSS.

FIG. 27 shows a time-frequency pattern for ADSS, showing the ADSS pattern and the dimension of DSSI for ADSS (T for Tx DSSW and R for Rx DSSW). The DSSP (the effective time of the DLIM) depends on the various factors: the UE moving speed, the beam width of the TX beam, the deployment and dimension of access nodes. The DSSP may be 203 ms (outdoor) and 389 ms (indoor) and the overall overhead is much less than 1%, for example. The ADSS can be either a separate process or a jointed process with other channel measurements. The following solution assumes that the ADSS is a separate process.

Assuming a TDD system, there may be AP-to-AP and UE-to-UE interference, in addition to the AP-to-UE and UE-to-AP interference. One DSSI is divided into N Directional Sounding and Sensing Windows (DSSW): each AP owns one TX DSSW (TDSSW) for sounding signal transmission for the links plus N−1 RX DSSWs (RDSSW) for sensing of the sounding signal from neighboring links. Deafness of ADSS is conquered via such dimensioning and the missed interference is avoided.

ADSS may be further developed to reduce overhead so that frequent ADSS can be applied for burst-like traffic, for instance, sharing the same process between ADSS and channel measurement is one way to share the overhead. The reporting overhead may be reduced as well by well-defined trigger condition. Decentralized and reactive directional interference sounding and sensing is also possible. In the event that there is no central controller or the interference occurrence is rare, this method may be useful.

2.2.5.3 Use Cases

The ADSS is attractive in multiple aspects. A first one is that the access link and the self-backhaul link are measured via the same process. The sounding results can be used for the backhaul route (capacity and path) management. A second is that all types of interference (AP-to-AP, UE-to-UE, AP-to-UE and UE-to-AP) are measured via the same process. There is no need for multiple types of sounding signals, which is attractive for both TDD and FDD systems, especially for dynamic-TDD system. A third aspect is that via certain alignment between co-existing networks in shared spectrum bands, inter-network interference awareness may be achieved via ADSS.

2.2.6 Contention-Based Access

Figure 28:
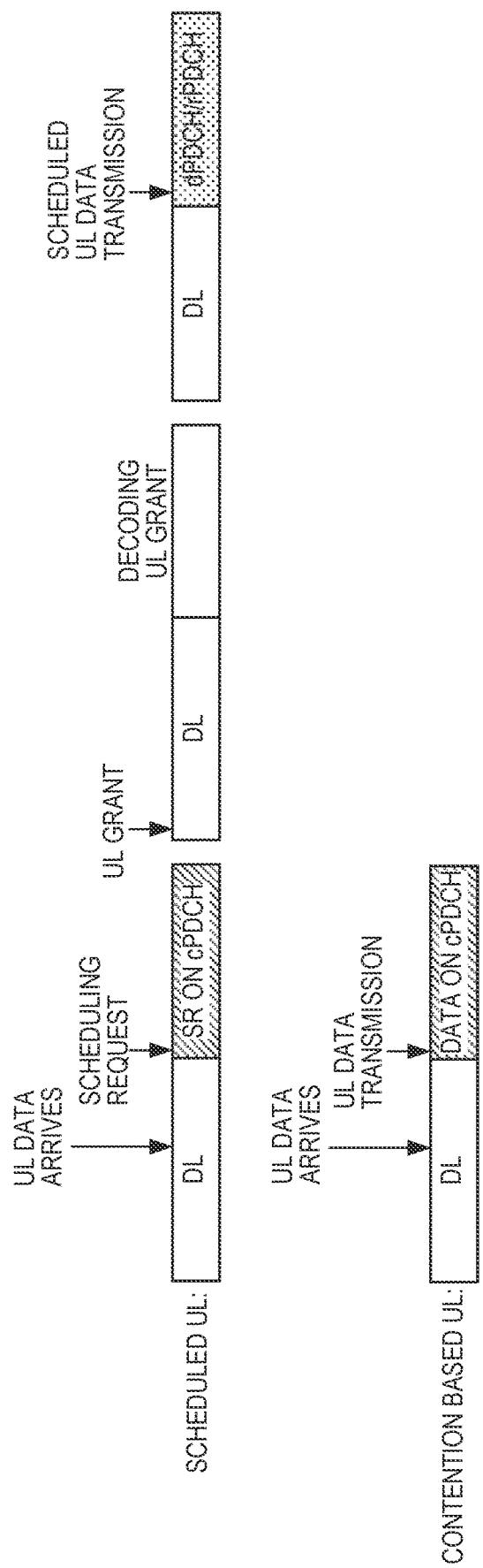
FIG. 28 illustrates scheduled-based access versus contention-based access.

In high-load scenarios, the default transmission modes are based on maintaining coordination by means of a resource scheduler. However, contention-based access can provide lower delay for initial uplink transmissions and in relay nodes. This is shown in FIG. 28. As shown at the top of FIG. 28, scheduled-based access is contention free, and the performance is superior in high load scenarios. As shown at the bottom of FIG. 28, contention-based access can provide lower delays for initial uplink transmissions and in relay-nodes with a large delay to a central scheduling unit.

The contention-based uplink channel cPDCH is very different from the normal contention-free uplink channels dPDCH and rPDCH. A UE needs a grant to transmit on the cPDCH, but it is not forced to use the grant in case it does not have any uplink data to transmit (in the event that the UE has a grant for a dPDCH/rPDCH and it has no data, it should fill the grant with padding).

When utilizing a cPDCH the UE should include a temporary UE identity (this may be 24 bits long in NX, for example), so that the receiving base station knows from who the transmission originates. The UE should also add a sequence number to indicate the HARQ buffer that the data comes from. This is because the grants for the dPDCH/rPDCH transmissions include a HARQ process ID and a new data indicator, which the grant for the cPDCH does not. An additional difference is that the contention-based channel cPDCH does not support soft-combining of HARQ re-transmissions, something that is supported on the dynamically scheduled and contention free rPDCH (see sub-section 2.2.8 for further details).

Transmissions on the cPDCH may interfere with other channels, primarily since the UL synchronization in the UE may not be as accurate when this channel is used. Solutions to this may be implementation-specific. The scheduler may, for example consider the need for guard bands towards contention-free channels and ensure that the performance is good enough. Furthermore, since some poorly synchronous UEs will have a random timing offset, the actual transmission time may have to be significantly smaller than the uplink resource allocation in some cases. Note that when using massive MIMO beam-forming, there are spatial ways to handle the interference.

Figure 29:
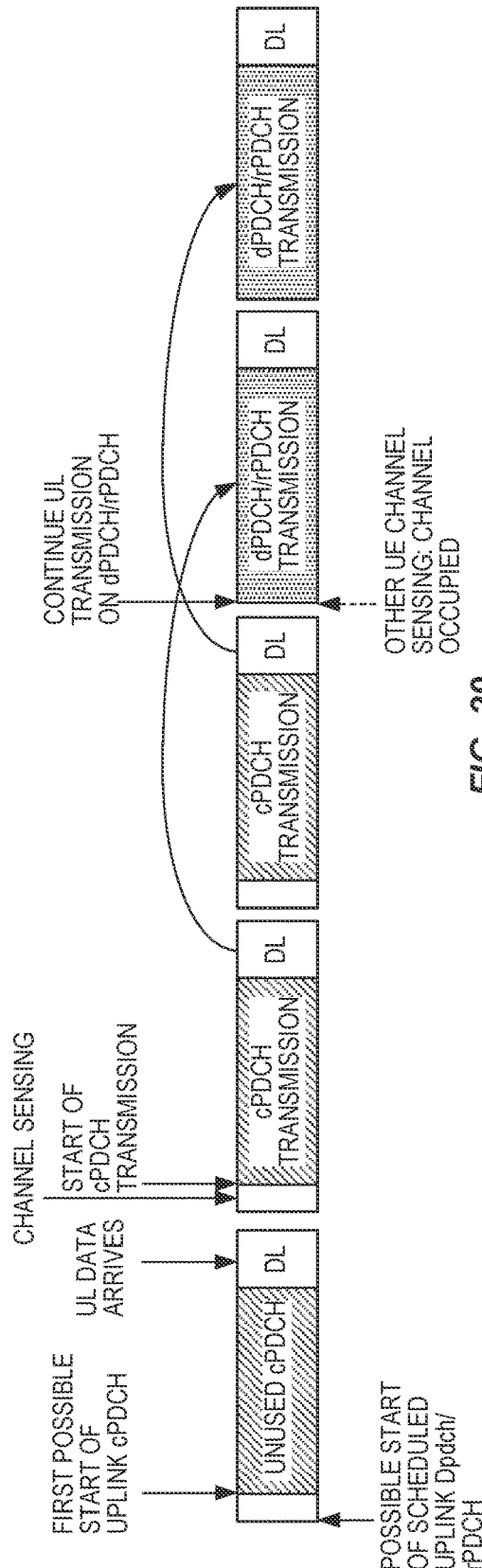
FIG. 29 shows prioritization between scheduled data and contention-based data access.

Transmissions on cPDCH may also be restricted by additional access rules such as listen-before-talk, and this could apply to both shared and dedicated spectrum scenarios. In a dedicated spectrum, for example, dynamically scheduled transmissions (dPDCH/rPDCH) may be to be prioritized. To efficiently enable both transmission principles (scheduled and contention-based access) NX is designed to prioritize scheduled access over contention-based access in a slotted manner by adding a listen-beforetalk (LBT) period in the beginning of each sub-frame. If a specific reference signal, or energy above a threshold, is detected in this period, then the sub-frame is assumed to be occupied and the contention-based transmission is deferred. The data transmission for contention-based access is hence shorter in time, since it initially reserves a set of symbols for LBT. For subsequent UL transmission, scheduled access is generally better (since it is collision free), and hence NX utilizes contention-based access primarily when the time required to maintain coordination increases delay. This is shown in FIG. 29, which shows that prioritization between scheduled data and contention-based data access is enabled by having the scheduled data starting earlier than contention-based data. This enables the contention-based access to detect the scheduled data transmission using carrier sense. Additional prioritization between different contention-based accesses is also possible, by having different length of the carrier sense period starting from the beginning of the sub-frame.

Figure 30:
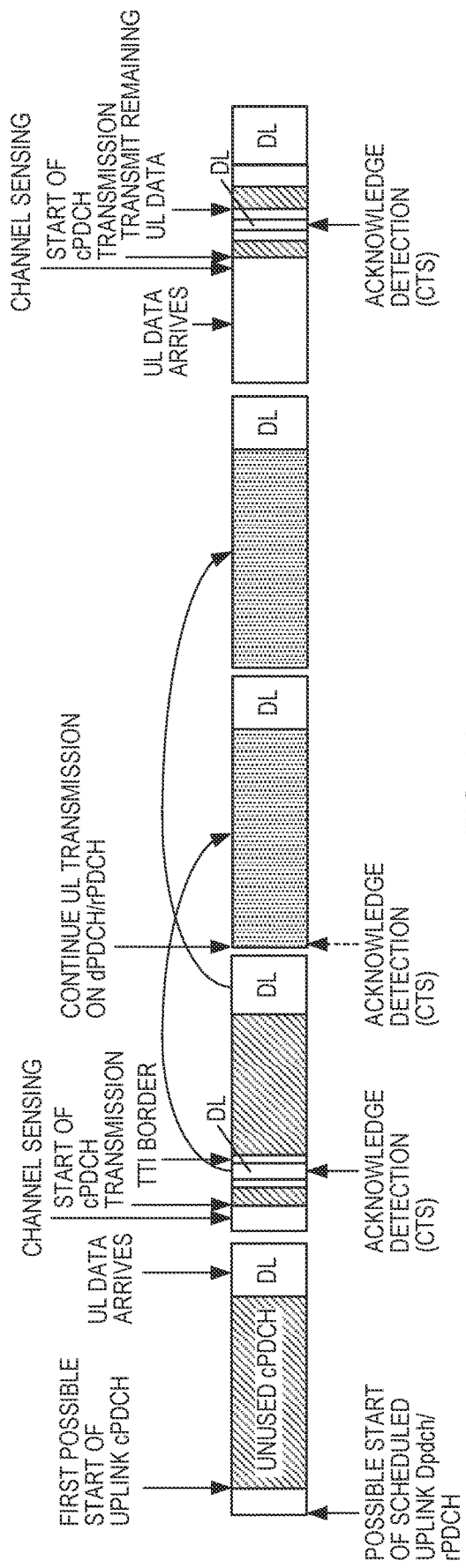
FIG. 30 illustrates contention-based access with collision avoidance utilizing LBT and CTS.

To handle "hidden node" situations, e.g., when a mobile terminal with a contention-based grant is unable to detect that there is an ongoing uplink transmission (that the channel is occupied), a clear-to-send (CTS) signal may be added. This is shown in FIG. 30, which illustrates contention-based access with collision avoidance utilizing both listen-before-talk (LBT), to prioritize scheduled transmissions, and clear-to-send (CTS), to resolve hidden node problems. The contention-based transmission is then divided into two time intervals, where an indication if the second part is allowed to be transmitted is derived by the reception of a CTS signal from the network in the time between the two time intervals. The time between the two (transmission) time intervals is referred to as the interruption time.

With contention-based access in dynamic TDD there is thus both a Listen-before-talk interval for avoiding collisions with scheduled frames and a CTS-like contention resolution mechanism. NX channels with contention-based access thus use the following protocol for collision avoidance:

Listen for N (one or few) symbols;
Transmit one symbol;
Listen for contention resolution one/few symbols (<N);
Transmit until end of TTI if needed.

Figure 31:
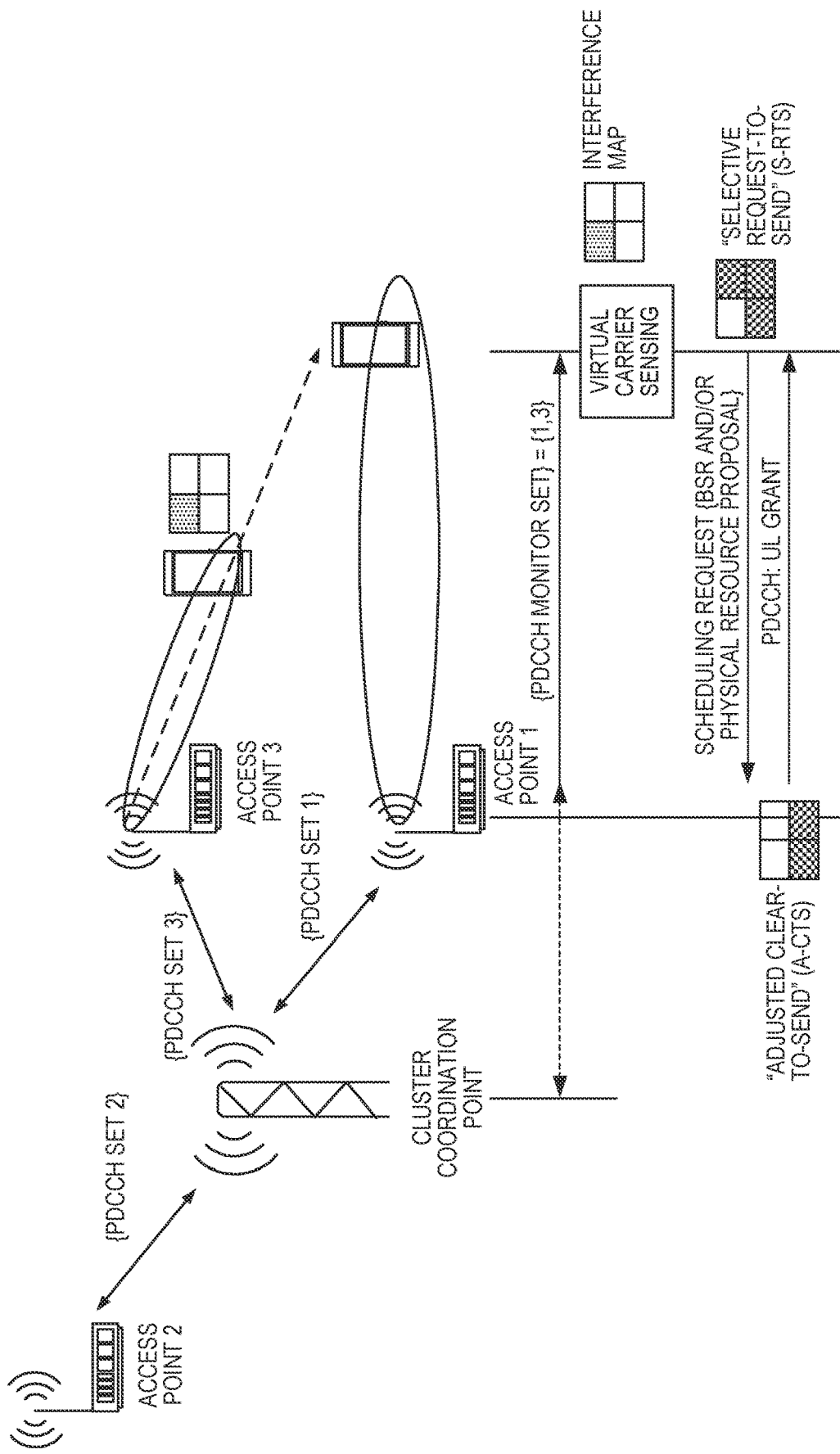
FIG. 31 shows an example of a proactive RTS/CTS scheme with selective RTS.

The first contention-based transmission may be seen as a scheduling request (SR) or a request-to-send (RTS) transmission. Since the mobile terminal may have additional information about the current channel use (e.g., by detecting interference and/or PDCCH transmissions from other nodes) one option in NX is to indicate in the RTS signaling which resources that the mobile terminal would like to utilize. This is denoted selective-RTS (S-RTS) and can be further extended with an adjusting-CTS (A-CTS) message from the network. This is shown in FIG. 31, which illustrates an example of a proactive RTS/CTS scheme with selective-RTS (a scheduling request containing a physical resource proposal) and adjusting-CTS (an uplink transmission grant). User terminals base the S-RTS resource selection on a capability to monitor multiple physical downlink control channels (PDCCHs) (configured in the "PDCCH monitor Set" message from the serving node).

Note that the S-RTS may be based on the terminal being reactive or proactive when selecting resources that it wants to use. The selection can be based on, e.g., interference measurements (re-active); or control channel decoding (proactive).

The use of an adjusting-CTS message from the network is useful also in e.g., multi-connectivity scenarios, e.g., the network mode may already be using some of the resources selected by the mobile terminal in some other connection.

2.2.7 L2 Multi-Connectivity Mechanism

Multi connectivity is a use-case that puts particular requirements on the protocol design. It is clear that multiple streams can be maintained on different layers of the protocol-stack dependent on the ability to coordinate the buffer handling.

In the simplest case, one base station controls one carrier, but is using multiple code-words. In this scenario it is natural to do multiplexing between MAC and RLC, e.g., to operate on the same segmentation/concatenation entity. This may also be the case for fast coordination between nodes or carriers.

In a slower coordination case it is not possible to fully coordinate the building of the transport blocks. In this case multiplexing needs to be done before the segmentation entity. In this case flow control is desirable.

ARQ, where utilized, may be placed before or after the splitting.

Since splitting/merging can be done on different levels, in-order delivery, where utilized, operates above the highest split.

2.2.8 Re-Transmission Mechanisms

The current HARQ feedback protocol of LTE relies on fast but error-prone single bit feedback with a fixed timing. Since it is far from 100% reliable, the higher layer RLC AM is required to ensure reliability, something which adds delay. Also, the current HARQ protocol is based on many strict timing relations (such as e.g., as per-HARQ buffer synchronous timing), something which is very inflexible and causes several problems when e.g., operating using Dynamic TDD.

For NX, the HARQ protocol should be fast, have low overhead, be reliable, and not require fixed timing. The RLC retransmission protocol is still desirable, to efficiently support multi-hop and mobility scenarios.

Different L2 protocol architectures result in different design options for L2 functionalities regarding multi-hop communications, such as the ARQ or routing.

2.2.8.1 Downlink HARQ/ARQ Design

For NX, a two-layered ARQ structure is kept, as is done with RLC/HARQ in LTE. Differences from LTE are in the HARQ re-transmission layer, which is fast and low-overhead, but also reliable and not requiring fixed timing.

For NX, the improved HARQ protocol has one or both of two components:

A "Super-Fast HARQ" feedback (A), which provides as fast-as-possible HARQ feedback, albeit not fully reliable.

A "Scheduled HARQ" feedback (B), which provides an efficient, near-100% robust, HARQ feedback suitable for use in e.g., Dynamic TDD scenarios.

On top of this, an additional RLC ARQ (C), which is similar to the current LTE RLC AM ARQ, may also be applied.

Figure 32:
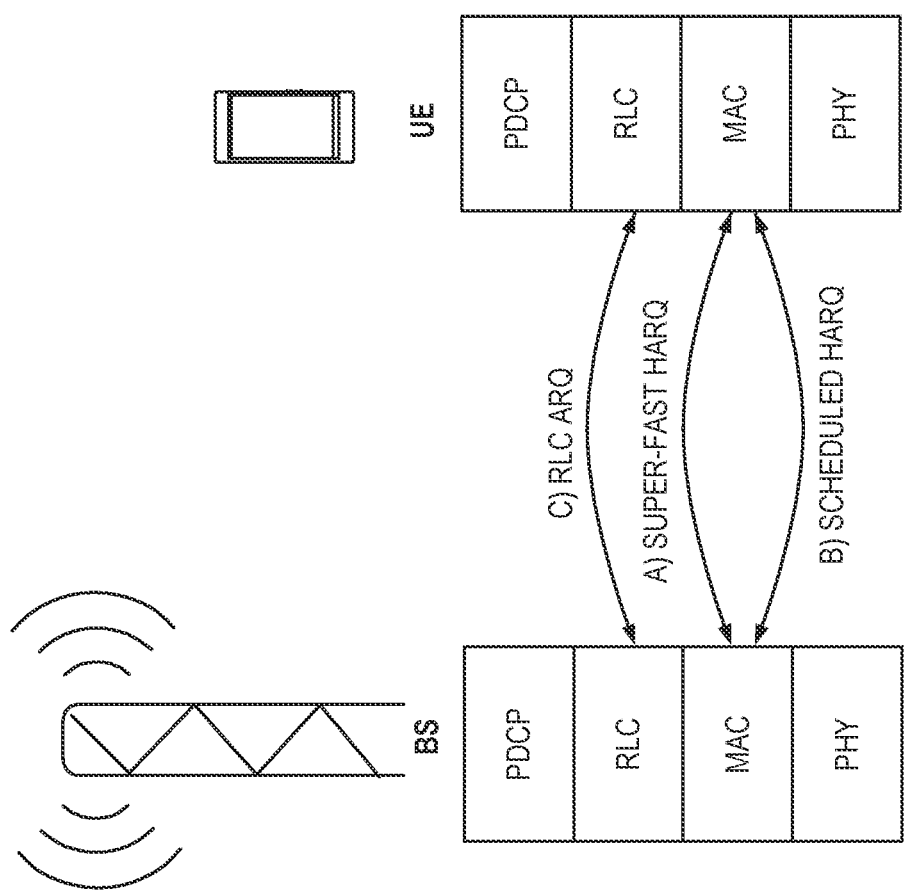
FIG. 32 illustrates an improved ARQ for single-hop NX, including "super-fast" feedback and "scheduled" feedback.

The detailed ARQ operation depends on the scenario, e.g., either all or a subset of these ARQ components (A, B, C) could be used. An illustration of the ARQ structure is shown in FIG. 32. Shown in the figure is an improved ARQ process for single-hop NX. As discussed above, the HARQ protocol illustrated in FIG. 32 utilizes two different feedback mechanisms: one "Super-Fast" (A) and one "Scheduled" (B). On top of this, an RLC layer (C) handles residual errors (e.g., due to mobility) and re-segmentation.

The "Super-Fast HARQ" feedback (A) is designed to be lean and it is transmitted as soon as possible. It provides feedback for one or a few downlink transmissions. The feedback contents could be a single bit (ACK/NACK) like in LTE and sent after decoding (or failure to decode) based on received downlink assignment, or the feedback could even be sent before complete decoding, e.g., "likelihood of decoding is low/high". It is further not restricted that the contents should be just one single bit, but it can also be soft quality measure. An example of usage of "Super-Fast HARQ" feedback is depicted in FIG. 33. In the illustrated examples, the fast HARQ feedback is transmitted at the end of the first available UL transmission occasion. The left side of the figure shows an FDD or small-cell TDD example where HARQ feedback is included in a single OFDM symbol. The right side illustrates an example with half-duplex FDD or large cell TDD, where the fast HARQ feedback is included in the last OFDM signal of the scheduled uplink transmission.

Upon receiving this "Super-Fast HARQ" feedback (A), the network acts on the received information by, e.g., either—in case of a (probably) unsuccessful decoding—retransmitting the same data on the same HARQ process or—in case of a (probably) successful decoding—transmitting new data on another HARQ process (or possibly the same HARQ process, in case no new HARQ process is available). The "super-fast HARQ" feedback is assumed to be transmitted on a scheduled dPDCH resource that is typically granted together with the associated DL assignment.

The "Scheduled HARQ" feedback (B), also in this document denoted the "Polled HARQ" feedback, is a multi-bit HARQ feedback scheduled on the uplink data channel, typically the dPDCH. It provides a good, simple design preferable for dynamic TDD scenarios, for example, where it is required that the protocols can handle dynamic and possibly varying timing relations. Being able to convey many bits of information, this feedback can be rather extensive, and hence it is good to ensure that the base-station beam-former is pointing towards the UE when transmitting, to ensure as favorable link-budget as possible. It further provides robustness, e.g., by means of being CRC protected and also by including built-in error mitigation techniques as described below.

Being a scheduled feedback, the network sends an UCI grant to the UE indicating which, or at least the number of, HARQ processes that should be reported in the feedback. This UCI grant also indicates the explicit resources on which this transmission is to take place—unless of course this has already been assigned via RRC, in which case the UCI grant need not contain such detailed information.

With respect to the report contents, it can be full size, covering all the allocated HARQ processes for this UE in the downlink direction. Also, a smaller report can be sent, which covers only parts of the allocated HARQ process. Moreover, a differential report can be sent wherein e.g., the status is reported for HARQ processes not having been reported in the last sent reports. Which of these reporting types are used can be either configured via RRC or explicitly indicated in the received UCI grant.

For NX, the "Scheduled/Polled HARQ" feedback (B) may consist of 2 bits per HARQ process. This HARQ feedback is only transmitted when the UE is scheduled for a normal UL transmission, as shown in FIG. 34, which shows that Polled HARQ feedback reports are transmitted in the directly decodable part of normal scheduled uplink transmissions. Note that the dPDCH transport block is protected by a CRC, and hence the likelihood of receiving an erroneous polled HARQ feedback report is low. The two feedback bits per HARQ process are:

- NDI-toggle-bit: Indicates if the feedback relates to an odd or even packet in the process. This bit toggles each time the UE receives a new-data-indicator (NDI) in the downlink grant associated with this HARQ process.
- ACK/NACK bit for the HARQ process.

The maximum number of HARQ processes is configurable between N={1, 2, 4, 8, 16, 32, 64}, and hence a full polled HARQ feedback report consists of 2N bits. The use of smaller polled HARQ feedback reports, e.g., using differential, compression, or partial reporting schemes, is possible. The polled HARQ feedback report age is configurable (e.g., 1, 2, 3, or 4 TTIs old).

2.2.8.2 Uplink HARQ/ARQ Design

For scheduled uplink data transmissions, HARQ feedback is not explicitly communicated but is dynamically handled by allocating uplink grants with the same process ID and a new data indicator (NDI) which is used to request retransmissions.

In order to support re-segmentation, an additional bit in the DCI can be added, e.g., a reception status indicator (RSI), to indicate that the given data in a HARQ process is not correctly delivered but a new transport block is requested.

One major error event that can occur for uplink HARQ is false detection of uplink grants, leading to a UE discarding undelivered data. However, the probability of multiple consecutive false detection events while having data in the uplink buffer is very small, with a reasonable CRC size and search space.

In case of TTI bundling or persistent uplink scheduling, the UE also includes the process ID in the uplink transmission in an UCI inside of the uplink dPDCH. A special HARQ feedback report (similar to the polled feedback message used for downlink HARQ) is sent as a MAC control element on the downlink dPDCH.

On uplink contention-based channels, soft combining of re-transmission attempts does not need to be supported, the reason being that contention-based channels are easily colliding and then the soft-buffers are likely to be very noisy and it is better to discard the data. In the event that this assumption is not valid, e.g., when there is a very large number of antenna elements, soft combining might be used.

When transmitting on a contention-based resource, the UE should include an additional sequence number, which is encoded as an uplink control information (UCI) element in the uplink dPDCH. ARQ without soft-combining is supported and the ARQ feedback can in that case be provided in a separate feedback message in a MAC control element. However, typically an uplink contention-based transmission is followed by a DCI containing a grant for a scheduled uplink transmission, which then implicitly also contains the ARQ feedback for the contention-based transmission.

2.2.8.3 Dynamic Soft HARQ Buffers

Figure 35:
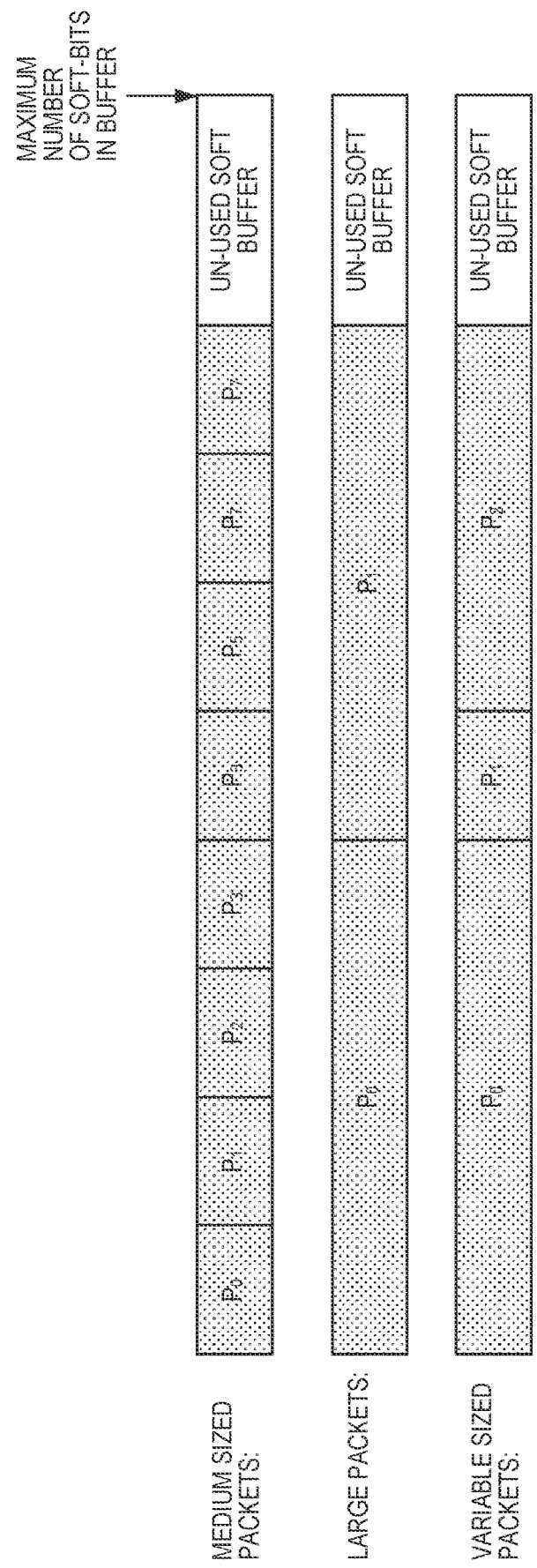
FIG. 35 illustrates that the number of HARQ processes for which the UE performs soft packet combining may depend on the packet size.

The size of the soft buffer is a UE capability for NX. A UE supporting a certain maximum number of HARQ processes is not required to also support soft-packet combining when operating at very high data rate. See FIG. 35, which shows that the number of HARQ process for which the UE perform soft packet combining may depend on the packet size.

Soft buffers for many 10ths of Gbps can be very large and can therefore be very expensive. Soft buffers for lower rates are small and cheap in comparison, and thus it can be required of the UEs that they support soft combining in those situation. The use of a very large soft buffer in the device should be optional, e.g., as a cost-benefit tradeoff. The benefit of improving performance with soft packet combining in difficult scenarios (e.g., low rate cell edge) is significant, while the cost is still reasonable.

2.2.8.4 Multi-Hop ARQ Protocol Architectures

Sections 2.2.8.1 and 2.2.8.2 described how the desired ARQ protocol architecture for NX looks in a single-hop scenario. Now, in a multi-hop/self-backhauled scenario, some additional considerations are required.

First of all, the different hops in a multi-hop/self-backhaul chain may have very distinct characteristics. They may differ in terms of one or more of, e.g.:

- Radio Link Conditions/Quality (e.g., SINR, channel properties etc.)
- Rx/Tx Capabilities (e.g., number of antennas, max Tx power, beamforming, receiver procedures, interference suppression capabilities etc.)
- Traffic and Routing (e.g., number of multiplexed users, number of multiplexed routes, amount buffering etc.)
- (Dynamic) TDD Configuration
- etc.

Hence, per-hop RRM mechanisms (e.g., link adaptation, segmentation, etc.) are desirable. In particular, a per-hop ARQ mechanism—such as described in the Sections 2.2.8.1 and 2.2.8.2 is still desirable, as further discussed in this section.

Secondly, as the number of hops grow, the cumulative probability of failure in the per-hop ARQ mechanism somewhere along the multi-hop/self-backhauled chain increases. Also, cases of classical mobility (e.g., the UE attaches to another AP/RN—possibly also belonging to another anchor BS/CH) or when the path to the UE is re-routed (e.g., RNs in the multi-hop/self-backhauled chain is removed/added) needs to be accounted for. Essentially, in a scenario with mobility and/or not fully reliable per-hop (H)ARQ, a separate mechanism is used to ensure end-to-end reliability. Put simply, yet another end-to-end ARQ layer is desirable in these situations, as discussed below.

There are three possible ARQ protocol architectures for the multi-hop/self-backhauled scenarios:

- Alt. 1 "Per hop HARQ/RLC ARQ": The single-hop ARQ architecture as described in sections 2.2.8.1 and 2.2.8.2 is utilized over each hop—inclusive of both HARQ and RLC ARQ.
- Alt. 2 "End to End RLC ARQ": Again, the same single-hop ARQ architecture is utilized over each hop as in Alt. 1 above—but now with only HARQ and no RLC over each hop. A higher layer RLC (inclusive of ARQ, segmentation etc.) is instead placed only at the end-point nodes, e.g., in the BS and the UE.
- Alt. 3 "Two Layered RLC ARQ": This is essentially a combination of the two other ARQ architectures, with a full-blown single-hop ARQ including HARQ and RLC ARQ for each hop and—in addition—an extra higher layer RLC is placed on top of this in the end-point nodes.

Figure 36:
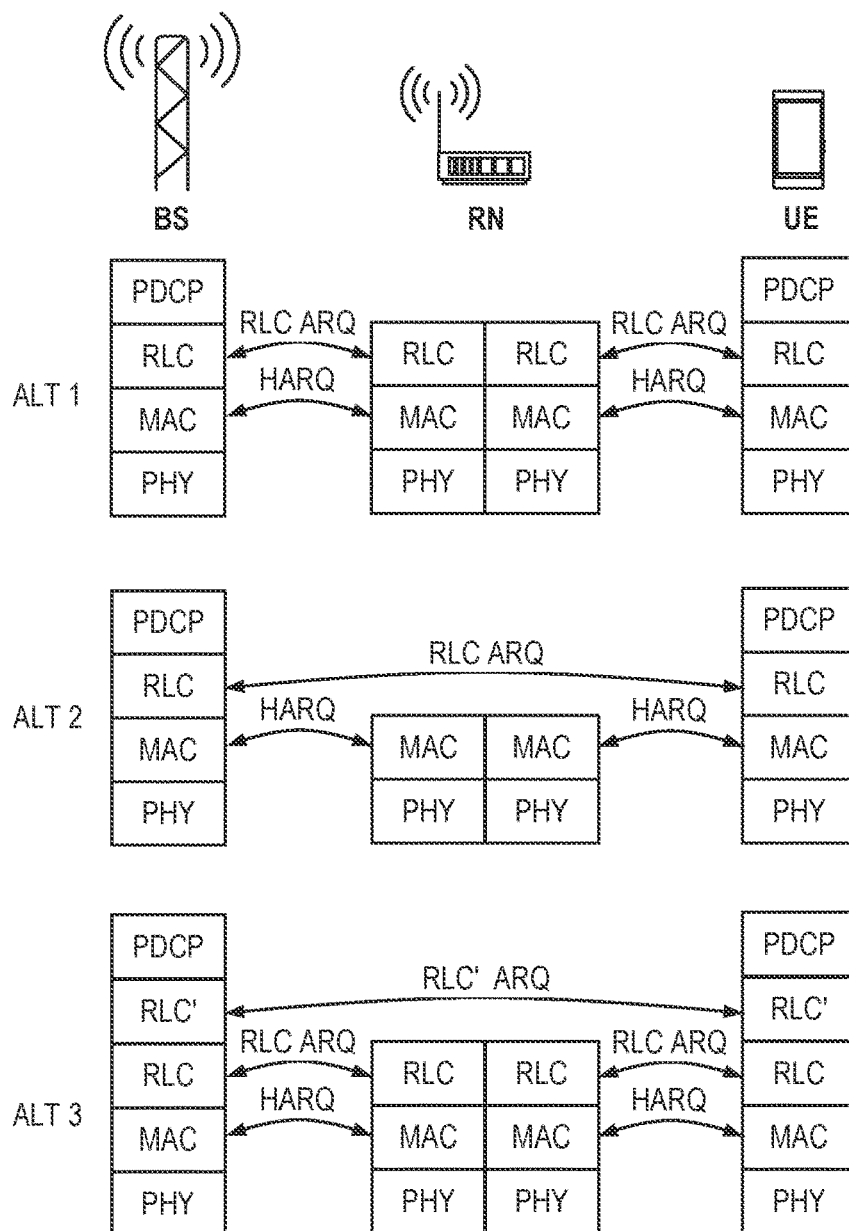
FIG. 36 illustrates three possible multi-hop/self-backhauled ARQ architectures.

The above listed alternatives are depicted in FIG. 36.

Pros and cons of the above listed three possible ARQ protocol architectures for multi-hop/self-backhauled communications are summarized in Table 2 below.

TABLE 2

|  | Alt. 1: Per hop ARQ | Alt. 2: End to End ARQ | Alt. 3: Two Layered ARQ |
| --- | --- | --- | --- |
| Pros | Low delay, fast. Less feedback signaling. | Solve the Cons of Alt. 1 | Pros Alt. 1 + Pros Alt. 2 |
| Cons | Does not handle failure, re-routing and mobility for relay nodes well. All UE mobility requires PDCP retransmissions from endpoint Need to introduce in-order-delivery in PDCP. | Lost the Pros of Alt. 1 If HARQ not 100% reliable, costly retransmissions from endpoint. Need to introduce segmentation functionality in MAC. | Extra overhead due to two protocol layers. |

The transmitting RLC entity in one endpoint (e.g., in the BS or UE) of the end-to-end RLC layer of Alt. 2 and Alt. 3 above buffers each transmitted packet until this is positively acknowledged by the receiving RLC entity (e.g., in the UE or BS) where after it is removed from the buffer. The transmitting RLC entity needs to have its ARQ retransmission timer set accordingly depending on the total end-to-end delay, to the peer RLC entity in the other endpoint, in order not to cause premature retransmissions. An appropriate timer value therefore may be estimated in various ways, but this procedure may obviously be cumbersome in dynamically changing environment and/or complex routing scenarios. In such cases it is better if this timer is disabled and end-point retransmissions are triggered only by explicit negative acknowledgements from the receiving endpoint RLC entity.

It should be noted, that this end-to-end RLC layer of Alt. 2 and Alt. 3 above need not necessarily be a new protocol layer on its own, but could be part of the PDCP. In fact, the existing retransmission mechanisms of PDCP could be used for the purpose of providing this desired end-to-end reliability. This is however a bit problematic with respect to routing, as discussed in Section 2.2.8.5, below.

Summarizing the above, it is clear that it is beneficial to be able to perform retransmissions and segmentation over each hop, which may rule out Alt.1 as a suitable candidate—at least in scenarios with mobility, possibly re-routing or with a not fully reliable per-hop (H)ARQ mechanism. Further, only relying on end-point retransmissions as in Alt. 2 may be inefficient and may require MAC level segmentation (if wanting to support per-hop re-segmentation). Hence also Alt. 2 may be ruled out as a suitable candidate. Hence the Two Layered ARQ of Alt. 3 may be the only feasible and generic enough architecture to suit the foreseen scenarios.

Figure 37:
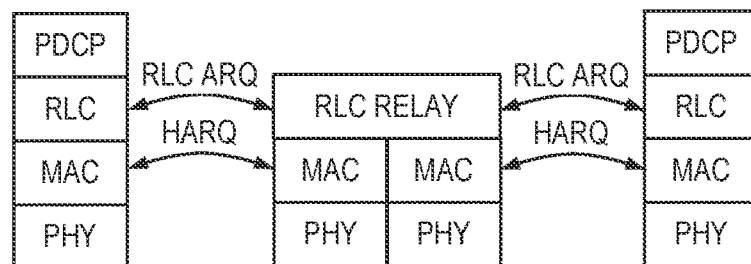
FIG. 37 shows a multi-hop relay ARQ protocol architecture.

A Relay ARQ is an improved version of the Two Layered ARQ architecture of Alt.3 above, which integrates the ARQ of the extra RLC' layer into the per-hop relay RLC layer, as shown in FIG. 37.

An aspect of relay ARQ is that the temporary retransmission responsibility is delegated from the sender node (the source node or the relay node) step-wise from node to node until finally the data unit is received at the receiver. The ultimate retransmission responsibility, however, remains with the source node (BS or UE). This is all the same as what happens in Alt. 3.

The original assumption for relay ARQ is, however, that each node uses the same sequence numbering, PDU size and protocol state etc., something which may not be feasible for dynamically changing channel quality for each hop. However, some solutions could be adopted to handle this problem. By adding a sequence number relation mapping table in the relay node, the segmentation functionality could still be supported. Alternatively, the existing re-segmentation mechanism of LTE could be used, together with some possible optimizations in order to e.g., alleviate the overhead caused by multiple step re-segmentations. For example, in certain embodiments, only fully assembled RLC SDUs, and not individual segments thereof, are forwarded on the following link.

Regardless of whether the Two Layered ARQ approach of Alt. 3 or the Relay ARQ architecture is used, it is only in the end-points (e.g., BS and UE) where in-order delivery of RLC SDUs shall be employed, whereas the intermediate relay nodes (RN) shall deliver the RLC SDUs out-of-sequence. The reason for this is that it is only the higher protocol layers in the end-points which may require in-order delivery of data, whereas requiring in-order delivery in the intermediate nodes may risk under-utilizing the links. Also, by not requiring in-order delivery in each intermediate node, the data packet may be freely mapped over multiple-paths, hence achieving a load balancing over intermediate links and nodes.

2.2.8.5 Routing Consideration in Multi-Hop L2

The design choice for the relaying architecture to support multi-hop routing in a multi-hop network does impact the ARQ design. As discussed in Section 3.6.6, relaying may be done in L3/IP or in L2 wherein for LTE relays, for example, the routing is done above PDCP layer. For NX, however, the PDCP layer has its entities only in the anchor nodes, e.g., BS and UE, but not in the intermediate relay nodes, since otherwise the ciphering/security mechanisms of PDCP would require complex handling of each such relay node. Hence, the problem is how to perform routing in NX without having a PDCP layer in each node.

One option is that each user is handled separately over all hops, e.g., separate protocol-entities are set up in all nodes along the route and no multiplexing is done between users. This is simple from a protocol layer perspective, but scales poorly with many users and many hops. Also, the L1 procedures are complex, since each relay node needs to monitor and process data separately for any user routed through the node.

Another option is that the routing is included in or between one of the L2 protocol layers. The layer where the routing identity is included depends on the layer of the multi-hop scheme. This could for example, be done in the additional RLC' layer introduced in Section 2.2.8.4 or the Two Layered ARQ approach (Alt. 3). This layer then contains, apart from the regular RLC functionality, also the routing functionality of PDCP but not the other parts of PDCP, e.g., the ciphering/security. Hence a small UE context could be desirable in each relay node, in addition to what was shown in FIG. 36. In the case when Relay ARQ is used, the RLC' could then simply be regarded as the "routing" RLC layer.

Figure 38:
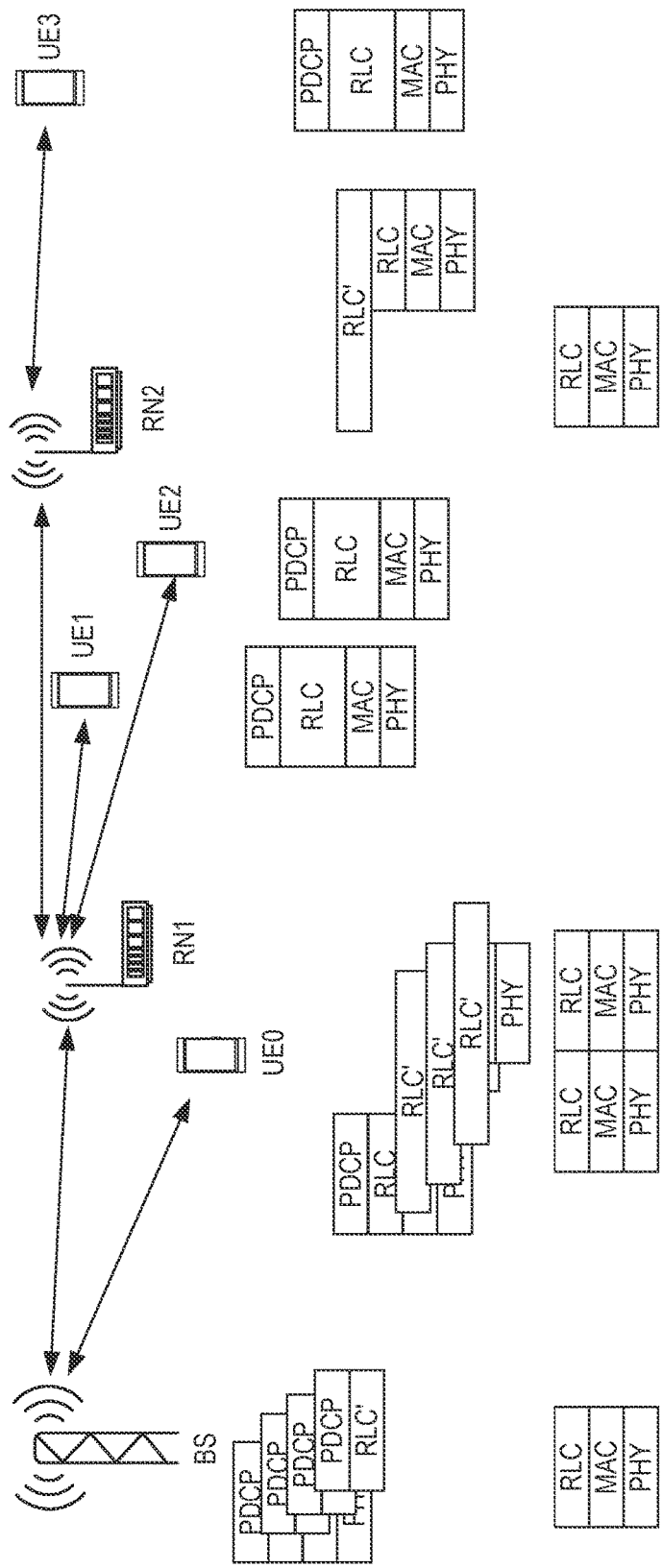
FIG. 38 shows an overview of a multi-hop architecture to support relay routing.

FIG. 38 illustrates an overview of a multi-hop architecture overview to support relay routing. As shown in the figure, in each relay node, the routing information is based on the PDCP identifier and handled in the RLC' layer. This is possible because there is a Layer 3 routing mechanism in place, which ensures that there are up-to-date routing tables in each (relay) node.

2.2.9 MAC Design for C-MTC

Low latency and high reliability services are further described in Section 3.1. Here, some additional MAC considerations related to C-MTC are discussed.

2.2.9.1 Dynamic Scheduling for C-MTC

Figure 39:
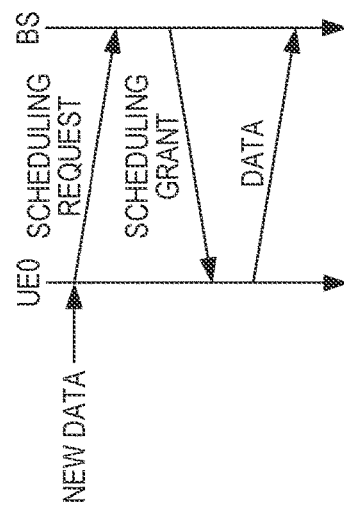
FIG. 39 illustrates an example of dynamic scheduling.

Dynamic scheduling, as in LTE today, is considered as a baseline MAC technique for C-MTC as well. According to this scheme, the base station (BS) assigns resource blocks to different users in a dynamic fashion (e.g., on a need basis). This requires control signaling in the form of scheduling requests (SR) and scheduling grants (SG) which also increases the overall latency. To meet the latency and reliability requirements for the C-MTC applications, the dynamic scheduling implies some changes compared to the LTE standard on the physical layer level, e.g., by TTI shortening, high antenna diversity, etc. FIG. 39 shows a signaling diagram for dynamic scheduling. In dynamic scheduling, resources are assigned on a need basis and the minimum achievable latency is equal to three His, assuming zero processing delays.

2.2.9.2 Instant Uplink Access for C-MTC

Figure 40:
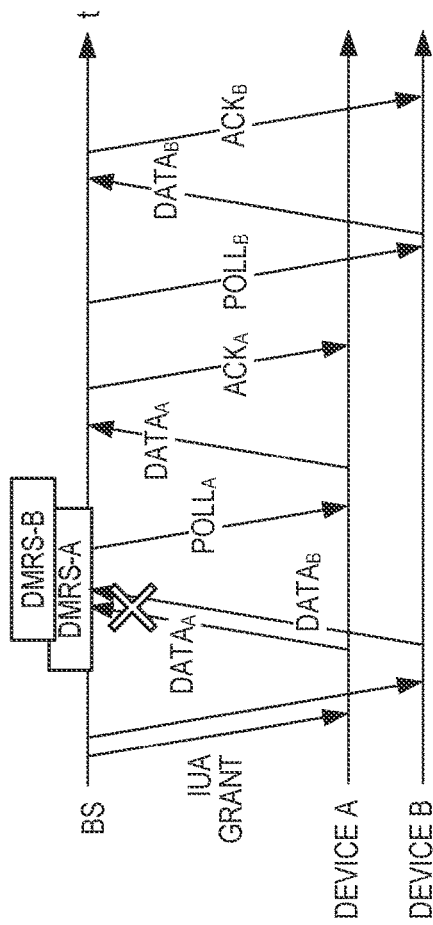
FIG. 40 shows contention resolution for contention-based instant uplink access.

Instant Uplink Access (IUA) is a form of pre-scheduling to allow the transmission of data packets without scheduling requests. The resources are pre-reserved based on latency requirements, the amount and type of traffic. The IUA is optimal for periodic traffic where the traffic pattern is pre-known and thus the IUA transmissions can be pre-configured accordingly at MAC level. However, to guarantee the deterministic latency for sporadic traffic, each device requires dedicated pre-assigned resources to ensure that emergency messages, whenever they occur, are always transmitted within the required deadlines. This means that the resources cannot be used by other devices although their actual utilization by the sporadic data (rare events) is very low. In order to increase the resource utilization, a contention-based IUA (CB-IUA) can be used. CB-IUA allows the sharing of the same resources among two or more devices. Since the use of the same resources by the two devices may lead to packet collisions, contention resolution mechanisms become mandatory to achieve the required reliability levels within the latency bounds. Collision detection can be done using the demodulation reference signals (DMRS) to differentiate the users. After a collision has been detected and the devices/users involved in collision have been identified, the base station can individually poll the devices to achieve higher reliability. Furthermore, the order in which the base station polls the users can be adjusted according to the application requirements, including traffic needs and prioritization. The process of contention resolution after a collision is shown in FIG. 40.

Moreover, collision risk in CB-IUA can be minimized by some enhanced functionalities such as smart grouping of C-MTC devices. The grouping can be based on the geographical location, functional behavior, or the transmission pattern aspect. On-the-fly reconfiguration of groups can also be performed, once a specified collision threshold is passed.

2.2.9.3 Contention-Based Access Using Listen-Before-Talk for C-MTC

This scheme is based on the well-known listen-before-talk (LBT) principle. To avoid over provisioning of resources for not-so-frequent traffic in C-MTC use-cases, a contention-based access channel (cPDCH) is made available. However, the bandwidth of the contention-based resource is allocated according to the scenario (e.g., number of devices in the network and the generated traffic, etc.), so that the latency requirements for C-MTC applications are fulfilled.

Furthermore, a contention-based channel can be exploited by the scheduling request (SR) for the best effort traffic or any other sporadic traffic with large payload size. In case of real-time sporadic traffic with small payload size (e.g., alarms), the sporadic data can be transmitted directly on the contention-based uplink channel, using the LBT principle. Thus for C-MTC applications, the decision whether or not to send real-time data over a contention-based uplink channel is made based on the size of the data. The amount of bandwidth needed can be fixed over time or adaptively adjusted according to the traffic loads, number of nodes and the collision probability.

One advanced alternative is to share the contention-based channel resources with other channels. According to this alternative, all resources are considered as available for contention unless reserved. The base station, as a central controller, manages all the resources and always makes sure of the availability of resources for contention. The advantage of this improvement is to reduce the probability of collisions among packets by increasing the number of contention channels available. However, it requires additional resource management overhead to coordinate the resource utilization among the devices based on the priority levels. Moreover, each device maintains the resource allocation table that reflects the resources available for contention.

2.2.9.4 Polling Mechanisms for C-MTC

The resource allocation for C-MTC can be enhanced by using the well-known polling mechanism. According to this scheme, a base station polls the devices and adjusts the frequency of the polling based on the application requirements, the number of devices, priority levels and the data generation rate. Polling increases the required control overhead as compared to IUA where the resources are pre-configured once for several transmissions.

Figure 41:
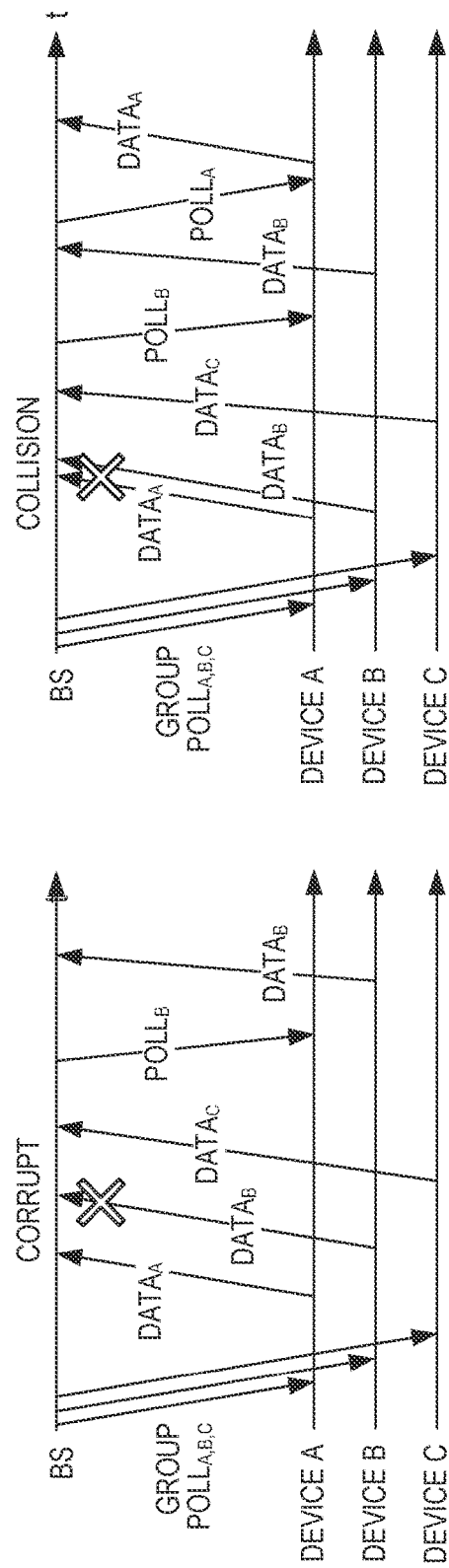
FIG. 41 illustrates group polling using contention-free and contention-based access.

One further enhancement of this scheme is the group polling where the base station polls simultaneously a group of devices. The number of devices in one particular group depends upon the availability of resources, the number of total devices, the latency and the traffic requirements. There exist two alternatives for resource allocation in group polling, as shown in FIG. 41, which shows group polling using contention-free (left) and contention-based access (right) techniques. According to these alternatives, the devices polled as a group could either contend for the shared resource or use the dedicated resources. The main advantage of using polling mechanisms lie in their deterministic nature. It also avoids over-provisioning of resources as in case of IUA. On the other hand, polling mechanisms require additional control signaling in the form of 'polls'.

2.2.10 Example Use-Cases

For the purpose of explaining how different aspects for the NX L2 solution described in this sub-section work together, additional examples are provided here.

2.2.10.1 Multi-User MIMO Examples

Figure 42:
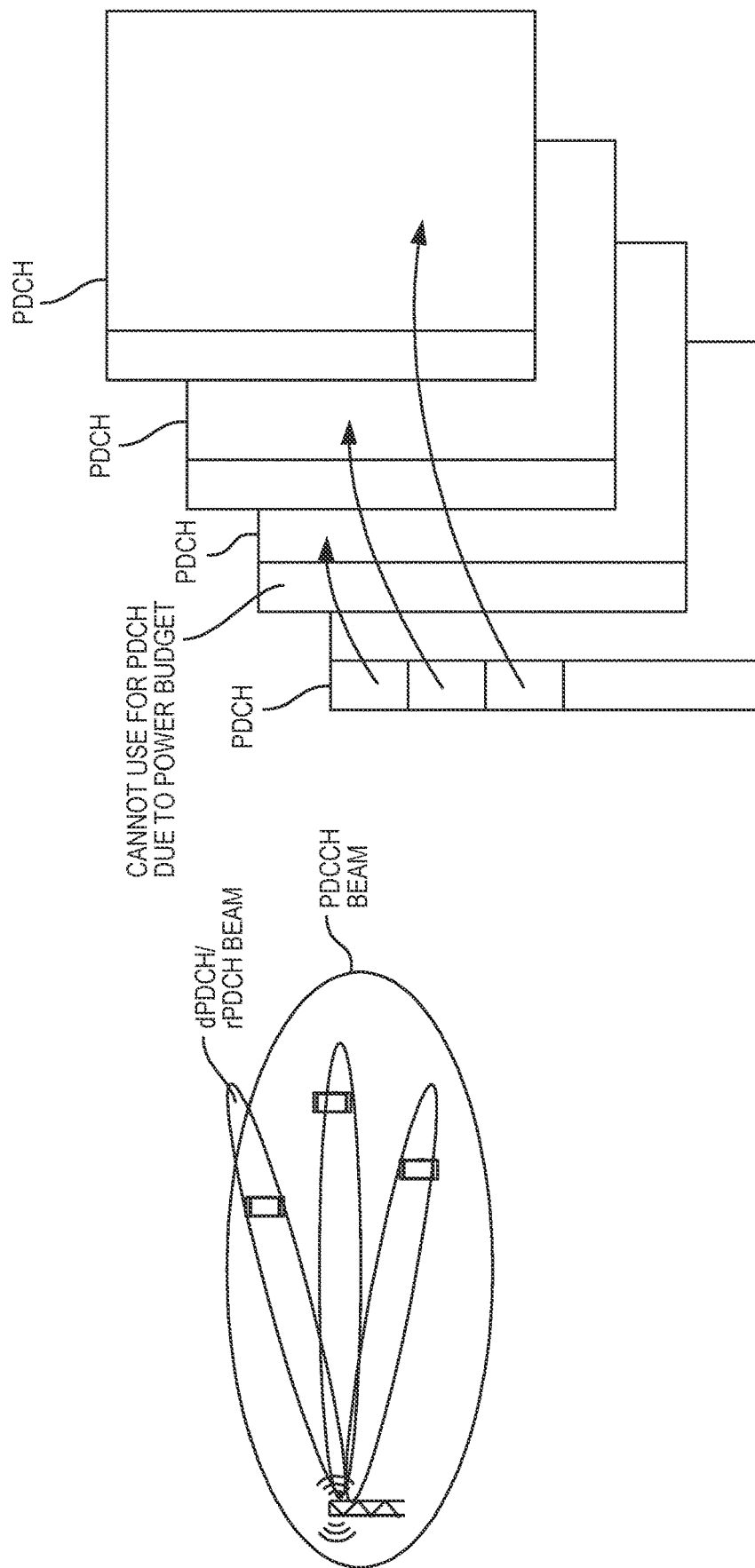
FIG. 42 shows an example of MU-MIMO scheduling.
Figure 43:
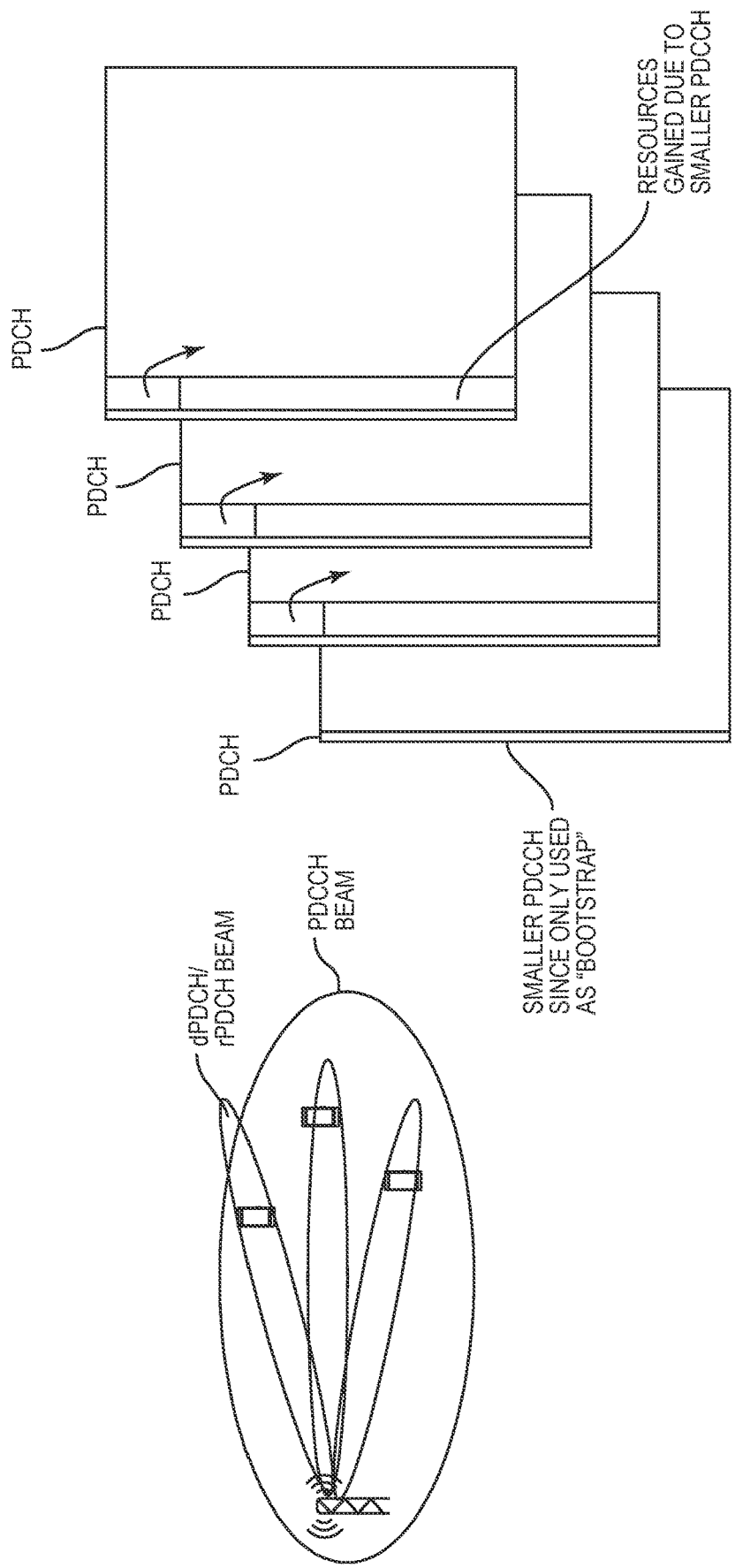
FIG. 43 shows another example of MU-MIMO scheduling.

FIGS. 42 and 43 depict two different examples of MU-MIMO scheduling using out-band and in-band DCI, respectively. In the out-band (and out-of-band) example of FIG. 42, all DCIs are transmitted on the PDCCH. Since the PDCCH needs to carry a relatively large number of bits it needs more resources. The UEs need to perform more blind decoding attempts since more UEs are multiplexed on the PDCCH. Since the PDCCH typically needs to use full power, the PDCH resources overlapping with the PDCCH resources cannot be used. The delivery of the DCIs is expensive compared to the data, since no UE optimized beam-forming is used in this example.

FIG. 43 shows an example of MU-MIMO scheduling using in-band and in-beam DCI on directly decodable physical data channel (dPDCH). When DCIs are instead transmitted in-beam and in-band, as in FIG. 43, on the scheduled resources, the PDCCH resource can be made much smaller. This also leaves more resources available for the PDCH. The DCI is transmitted on a dynamically extended search space inside of the scheduled data channel. Both the directly decodable and the re-transmittable physical data channels (dPDCH and rPDCH) use the same demodulation reference signals that are beam-formed towards each individual UE. The control information delivery is cheaper since it benefits from the antenna array gain. Also the UE search space can be made smaller since there is no need to support user multiplexing on the dedicated dPDCH control channel.

2.2.10.2 Reciprocity Use Case Example

Support for reciprocal massive MIMO and dynamic TDD operation is an important aspect of NX. This use case is the basis for the examples provided below.

Figure 44:
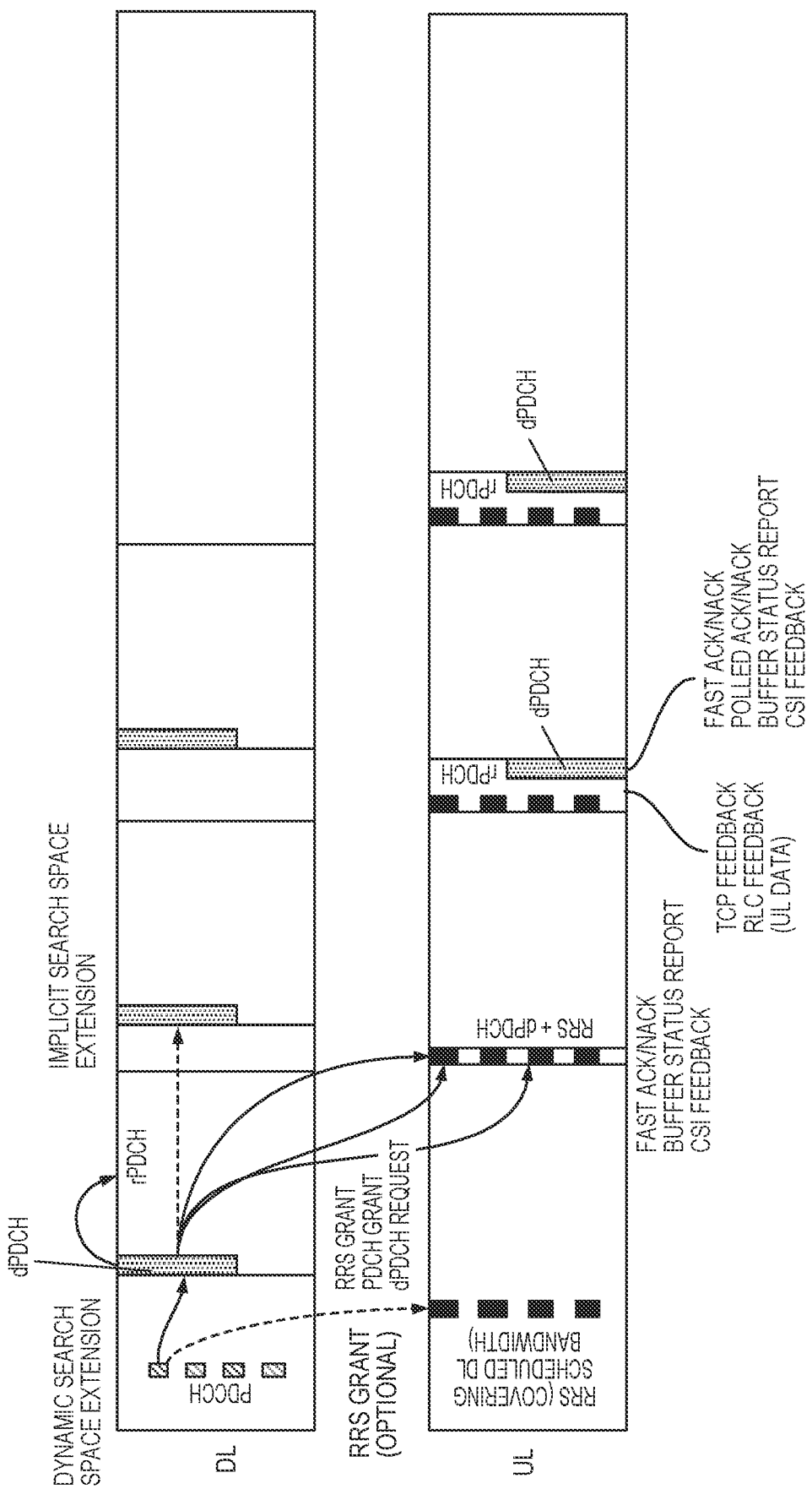
FIG. 44 shows an example of downlink data transmission using reciprocal massive MIMO beamforming.

Starting with an example with downlink data transfer supporting reciprocal massive MIMO beamforming, as shown in FIG. 44, the serving node uses the PDCCH to schedule a transmission of reciprocity reference signals (RRS) from the mobile terminal. Furthermore, the PDCCH contains a DCI with a dynamic search space extension. The RRS transmission needs to cover the bandwidth of the downlink PDCH transmission, to enable beamforming based on channel reciprocity.

In response to the RRS transmission, the base station transmits the PDCH, comprising a direct (dPDCH) and a re-transmittable part (rPDCH). The mobile terminal finds a DCI in the dPDCH that indicates the format of the transmission and that also contains a grant for transmitting a response.

The first response for the uplink comprises a new RRS and a fast ACK/NACK feedback. Since the RRS needs to cover the bandwidth of the downlink channel, the cost of including additional information in a dPDCH is in many cases negligible. The first response typically therefore comprises additional feedback such as CSI-feedback, MRS-measurements, and/or rich HARQ feedback information.

For the second DL transmission, the UE is already configured to search for the DCI in the dPDCH and no explicit message is required to enable the UE to search there. The second feedback transmission in this example also comprises higher layer feedback (TCP feedback and/or RLC feedback). This is transmitted as uplink data in an rPDCH field. In addition to the fast ACK/NACK, the dPDCH may also contain a larger HARQ feedback report (denoted polled ACK/NACK in the example) as well as additional feedback (CSI, BSR, etc).

Note that in the downlink the dPDCH is placed in the beginning of the transmission while in the uplink the dPDCH is placed at the end of the transmission. This is to enable the UE to process and generate the feedback that it puts in the uplink dPDCH.

Figure 45:
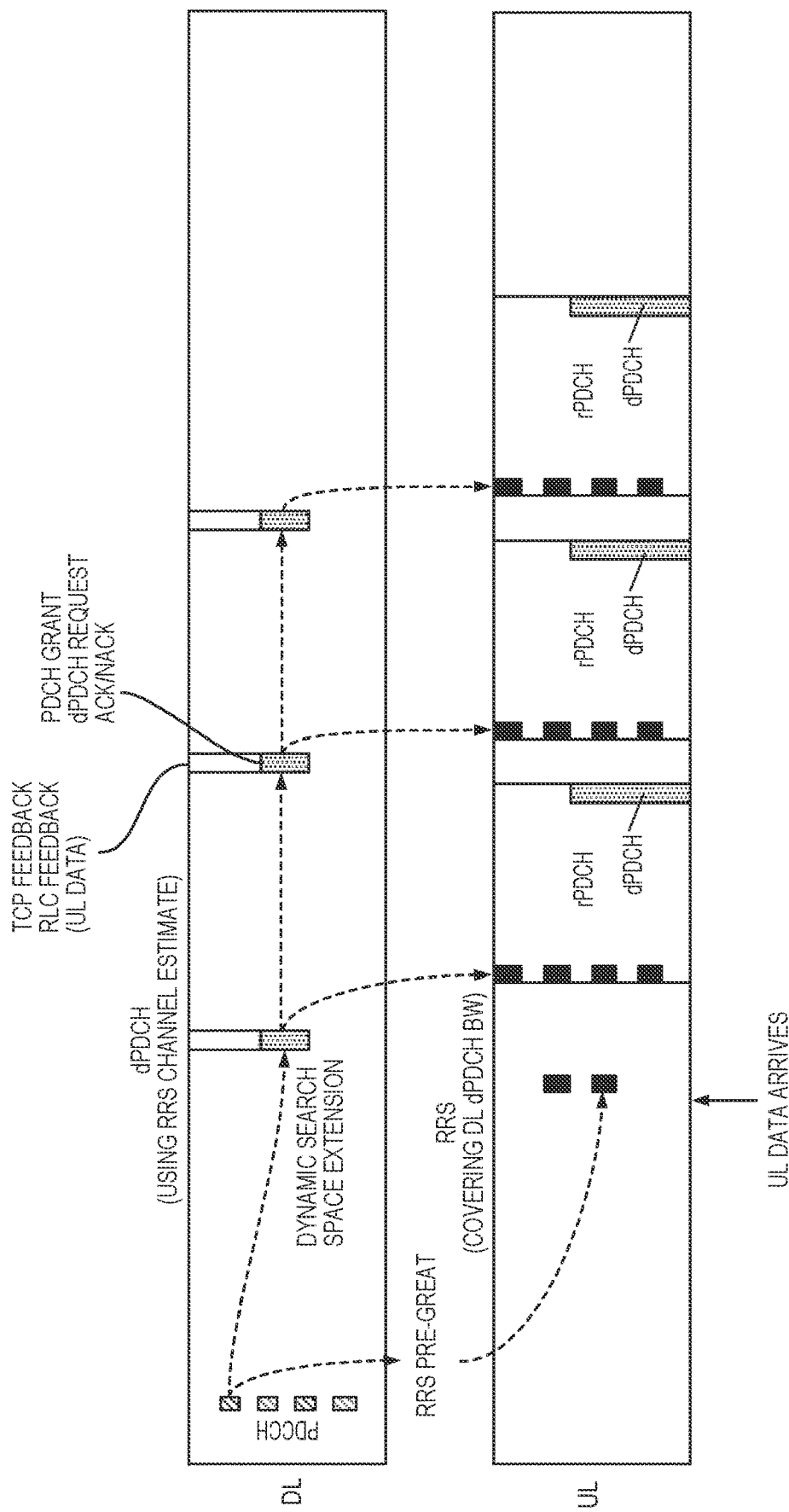
FIG. 45 shows an example of uplink data transmission using reciprocal massive MIMO beamforming.

FIG. 45 shows a corresponding uplink data transmission example, for reciprocal massive MIMO beamforming. In this example, the UE is first configured with a small RRS and an associated dynamic search space for a downlink dPDCH. When the UE has data to transmit it sends an RRS on the pre-granted resource. This RRS implicitly serves as a scheduling request and it also enables the base station to send the first downlink dPDCH using reciprocal based beamforming. The granted uplink transmissions comprises an RRS (used also for uplink channel demodulation), a re-transmittable PDCH, and a direct PDCH at the end. The downlink transmissions comprises a direct PDCH containing UL grants (with implicit HARQ feedback) and additional request for feedback to be transmitted by the UE. The downlink transmissions also comprise a re-transmittable PDCH containing primarily higher layer feedback.

2.3 Radio Interface Physical Layer 2.3.1 Modulation Scheme

Section summary: NX uses OFDM as modulation scheme in UL and DL, possibly also including a low-PAPR mode (e.g., DFTS-OFDM) for energy-efficient low-PAPR operation and Filtered/Windowed OFDM for frequency-domain mixing of numerologies. Note that a "numerology," as that term is used herein, refers to a particular combination of OFDM subcarrier bandwidth, cyclic prefix length, and subframe length. The term subcarrier bandwidth, which refers to the bandwidth occupied by a single subcarrier, is directly related to, and is sometimes used interchangeably, with subcarrier spacing.

The modulation scheme of NX is cyclic-prefix OFDM, both for UL and DL, which enables a more symmetric link design. Given the large operating range of NX, sub-1 GHz to 100 GHz, multiple numerologies may be supported for the different frequency regions, see Section 2.3.2.3. OFDM is a good choice for NX, since it combines very favorably with multi-antenna schemes, another significant component in NX. In OFDM, each symbol block is very well localized in time, which makes OFDM also very attractive for short transmission bursts, important for various MTC applications. OFDM does not provide as good isolation between subcarriers as some filter-bank based schemes do; however, windowing or sub band filtering provide sufficient isolation between sub bands (e.g., not individual subcarriers but collections of subcarriers), where needed.

Section 2.3.3 outlines that for some use-cases, mixing of different OFDM numerologies is beneficial. Mixing of OFDM numerologies can either be done in time-domain or frequency domain. Section 2.3.3 shows that for mixing of MBB data and extremely latency-critical MTC data on the same carrier, frequency-domain mixing of OFDM numerologies is beneficial. Frequency-domain mixing can be implemented using Filtered/Windowed OFDM. FIG. 46*a* shows a block diagram of Filtered/Windowed OFDM. In this example, the upper branch uses narrow (16.875 kHz) subcarriers 400-1100. The lower branch uses wide (67.5 kHz) subcarriers 280-410 which correspond to narrow subcarriers 1120-1640. FIG. 46*b* shows the mapping of upper and lower branches to the time-frequency plane. During the time duration of the large IFFT (2048 samples), four small IFFTs (512 samples) are performed.

Figure 47:
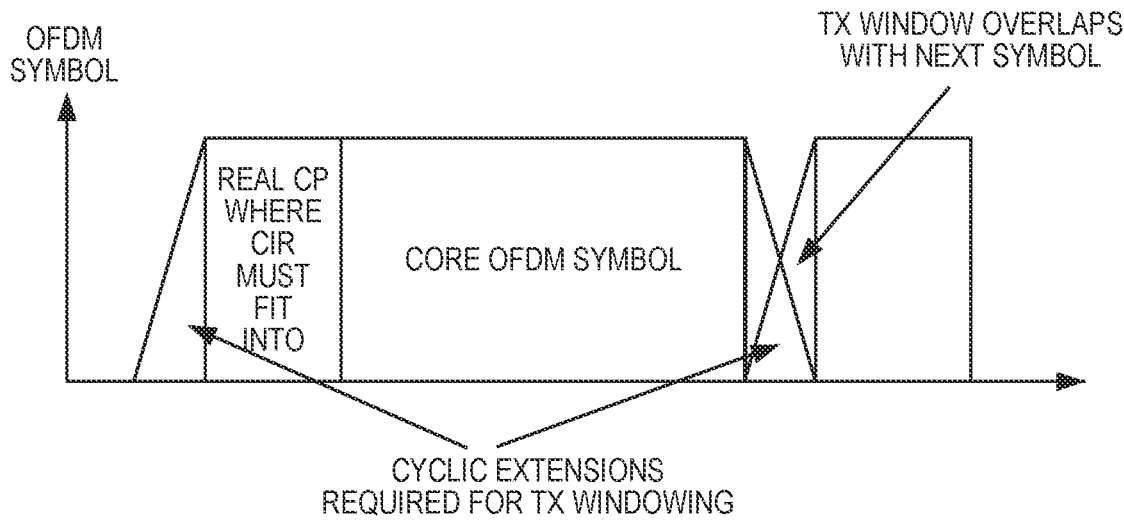
FIG. 47 shows windowing of an OFDM symbol.

In Filtered OFDM, sub bands are filtered to reduce interference towards other sub bands. In Windowed OFDM beginning and end of OFDM symbols are multiplied with a smooth time-domain window (regular OFDM uses a rectangular window spanning the length of an OFDM symbol including cyclic prefix) reducing discontinuities at symbol transitions and thus improve spectrum roll off. This is shown in FIG. 47, which illustrates how the beginning and end of an OFDM symbol are multiplied by a smooth time-domain window.

Figure 46:
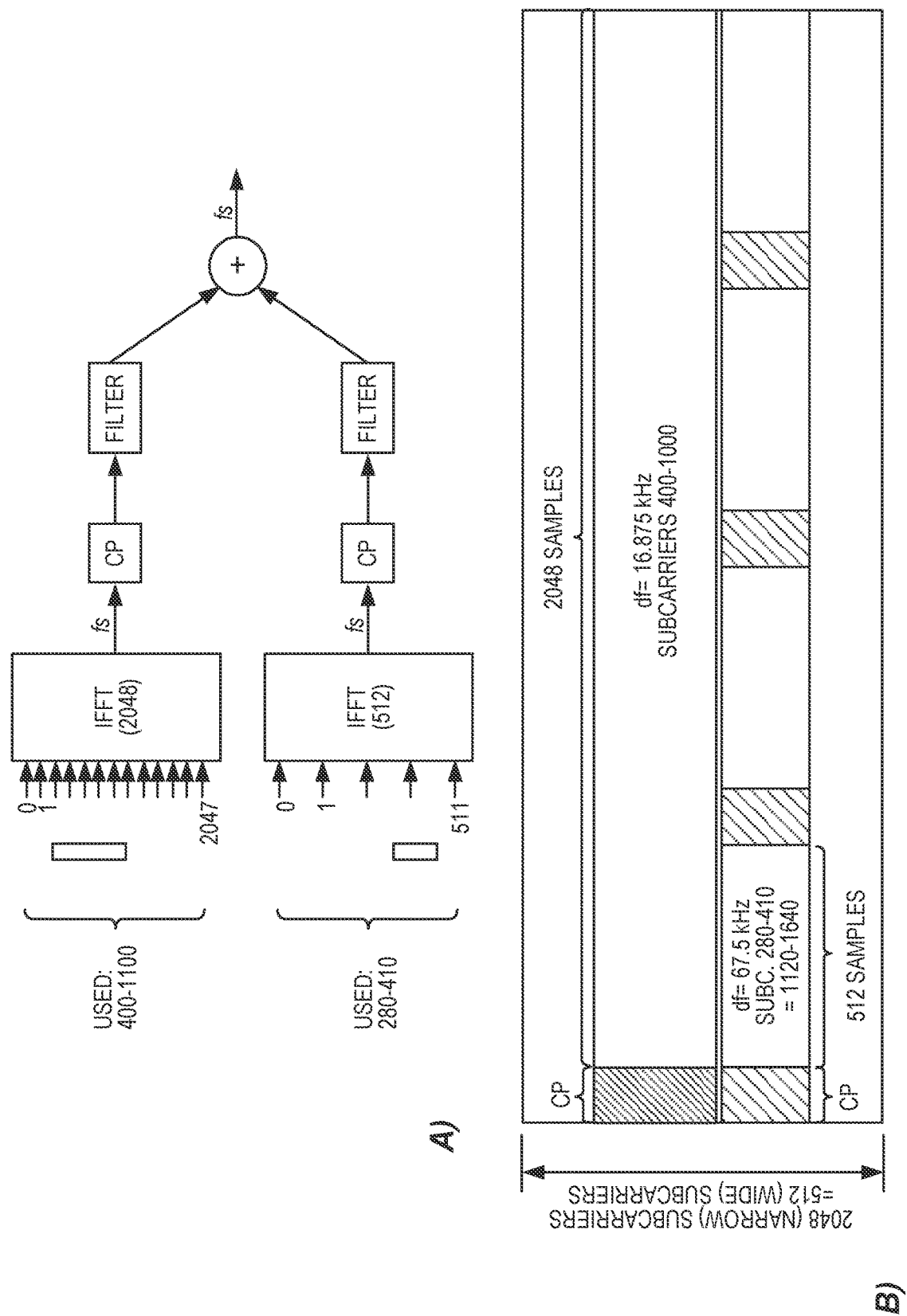
FIG. 46 includes a block diagram of filtered/windowed OFDM processing and shows mapping of subcarriers to time-frequency plane.

In the example frequency-domain mixing of OFDM numerologies shown in FIG. 46, the lower branch uses numerology with four times as wide subcarriers as the upper branch, e.g., 16.875 kHz and 67.5 kHz for the upper and lower branch, respectively (see Section 2.3.2.3 for the supported numerologies). In this example, both branches use the same clock rate after IFFT processing and can directly be added. However, in a practical realization this may not be the case; especially if one of the numerologies spans a much narrower bandwidth than the other processing at a lower sampling rate is preferable.

While filtered OFDM is possible, windowed OFDM is preferred due to its greater flexibility.

Sub band filtering or windowing (both at the transmitter and the receiver) and guard bands are desirable to suppress inter-subcarrier interference, since subcarriers of different numerologies are not orthogonal to each other. In addition to sub band filtering or windowing, filtering across the transmission bandwidth is also desirable, to fulfill the desired out-of-band emission requirements. A guard band of 12 narrowband subcarriers enables an SNR of 20+ dB on all subcarriers, while a guard band of 72 narrowband subcarriers allows an SNR of 35+ dB on all subcarriers. To avoid unnecessary guard band losses, Filtered/Windowed OFDM may be limited to two contiguous blocks of different numerologies. To the extent that Filtered/Windowed OFDM is supported by the NX standard, every NX device—even a device only supporting a single numerology—should support transmit and receive filtering/windowing since it could operate on an NX carrier operating with mixed numerologies (given the low complexity of windowing it is reasonable to assume that every UE can implement windowing). A network node on the other hand, needs only to support Filtered/Windowed OFDM if it supports use case mixes requiring frequency-domain mixing of numerologies. Note that detailed specifications of the windowing or sub band filtering are not needed, but rather performance requirements to test the chosen implementation. Sub band filtering and windowing can also be mixed on transmitter and receiver.

OFDM may also include a low-PAPR mode such as DFTS-OFDM. OFDM is used to maximize performance while the low-PAPR mode might be used in node realizations (both eNB and UE) where low peak to average power ratio (PAPR) of the waveform is important from a hardware perspective, e.g., at very high frequencies.

2.3.2 Frame Structure and Numerology

Section summary: At the physical layer, the minimum transmission unit is a subframe. Longer transmissions can be realized by subframe aggregation. This concept enables a variable III, for a given transmission the III corresponds to the length of the subframe or to the length of the subframe aggregate in case of subframe aggregation.

Three subcarrier bandwidths are defined to cover the operating range from below 1 GHz to 100 GHz and the large use case space.

NX supports both FDD and dynamic TDD. Even though not relevant for the first releases of NX, the concept is extendable to full duplex, especially at the base station, as full duplex technology becomes more mature.

2.3.2.1 Frame Structure

Figure 48:
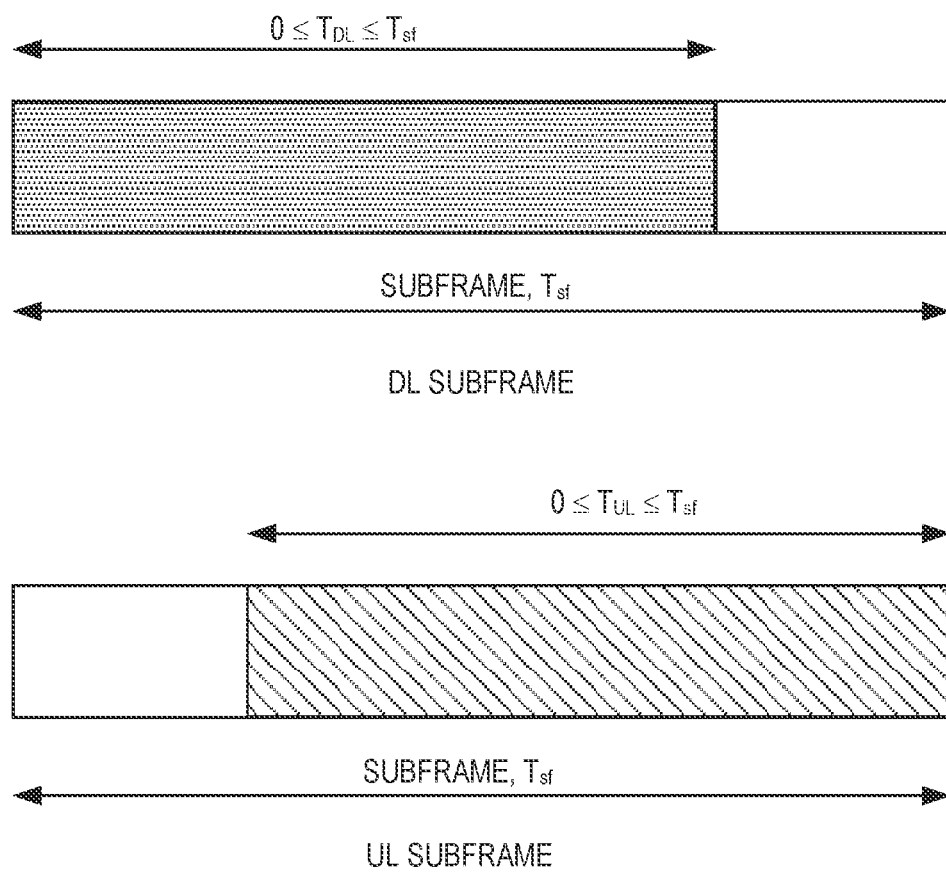
FIG. 48 illustrates basic subframe types.

The NX physical layer as described herein has no frames but only subframes. It is possible that the concept of frames can be introduced later. Two basic subframe types, one for UL and one for DL, are defined. These subframe types are identical for both FDD and TDD. FIG. 48 depicts the basic subframe types, where $T_{sf}$ is the subframe duration. $T_{DL}$ and $T_{UL}$ are the active transmission durations in DL and UL, respectively. A subframe consists of $N_{symb}$ OFDM symbols (see Table 3), but not all symbols in a subframe are always used for active transmission. Transmission in a DL subframe starts at the beginning of the subframe and can extend from 0 up to at most $N_{symb}$ OFDM symbols (later start of a transmission in a DL subframe for listen-before-talk operation is also possible). Transmission in an UL subframe stops at the end of the subframe and can extend from 0 up to at most $N_{symb}$ OFDM symbols. The gaps—if present—are used in TDD for transmission in the reverse direction within a subframe, as explained below.

Figure 49:
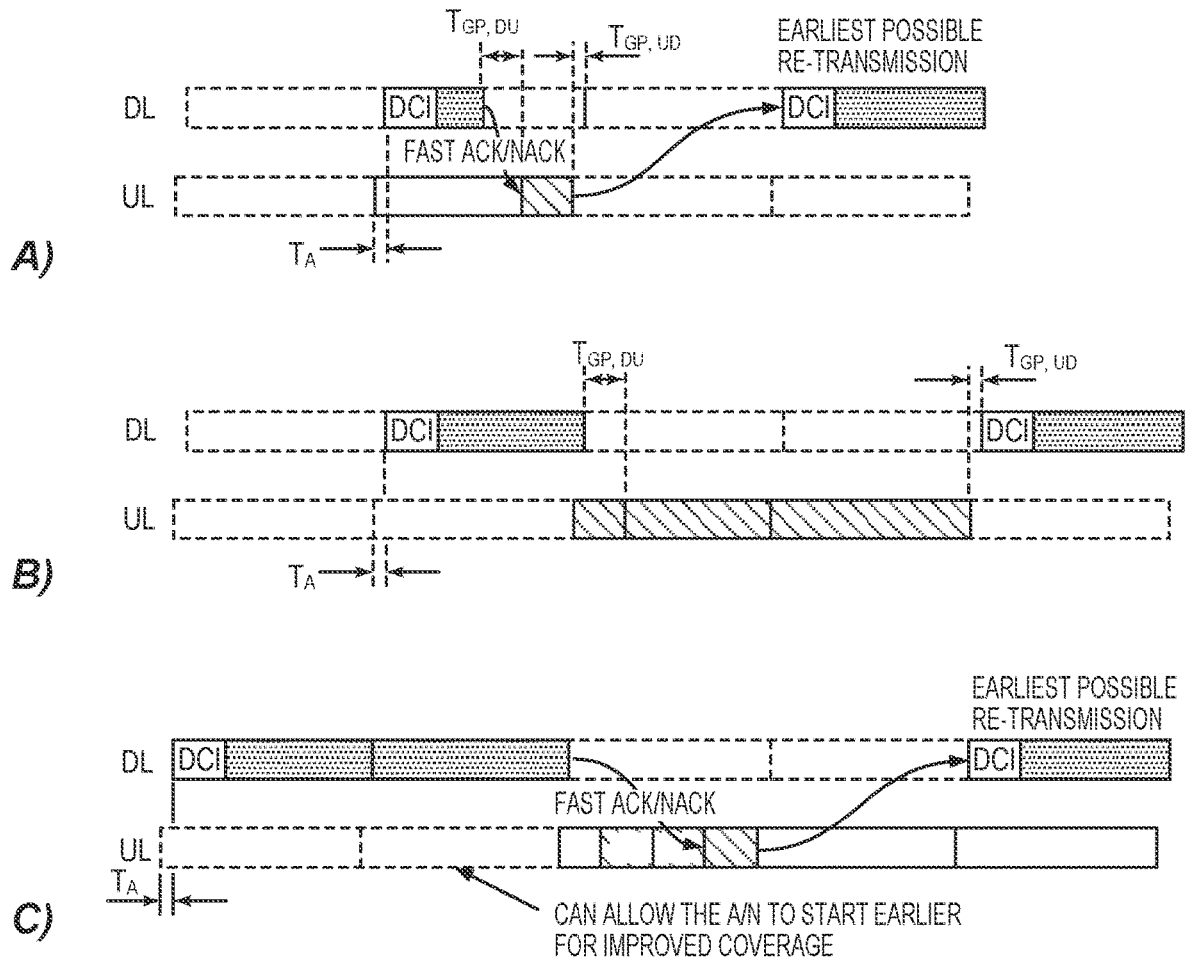
FIG. 49 illustrates frame structures for TDD.

FIG. 49 shows how these two subframe types together build up the frame structure for FDD and TDD. FIG. 49*a* shows the frame structure for TDD. In subframes with UL transmission in the end the DL transmission stops early. FIG. 49*b* shows the frame structure for TDD, UL transmission, while FIG. 49c shows the frame structure for FDD. $T_A$ is the timing advance value by which amount the UL transmission precedes the DL transmission. $T_{GP,DU}$ and $T_{GP,UD}$ are guard periods required for DL→UL and UL→DL switching in TDD, respectively. It is important to note that both DL and UL subframes exist simultaneously—during every subframe duration $T_{sf}$ both a DL and an UL subframe exist, even though no transmission may occur in a duplex direction (to avoid simultaneous transmission and reception in TDD and half-duplex transceivers). With this definition, UL transmissions only occur in UL subframes and DL transmissions only in DL subframes. This simplifies specification, since one subframe is then only transmitted from one node As shown in FIG. 49a, the frame structure also allows for an UL transmission at the end of a DL-heavy subframe duration by stopping the DL transmission early, as explained previously. As a minimum, the DL transmission must stop two OFDM symbols before the subframe ends to accommodate required guard periods for the duplex switch and the UL transmission itself. This UL transmission can be used for Fast ACK/NACK feedback but also for other UL information, such as CQI, RRS, and small amount of user data. In FDD, e.g., as shown in FIG. 49c, the Fast ACK/NACK is sent at the end of the next UL subframe to allow full usage of the DL subframe and to maintain a common structure with TDD. Even for TDD the processing time to decode and prepare an ACK/NACK is very short, so even here transmission of the Fast ACK/NACK in the next UL subframe is supported. If ACK/NACK decisions can be based on received reference signals which are transmitted early in the DL subframe, Fast ACK/NACK feedback at the end of the current UL subframe is even possible for FDD. Note that NX in addition to Fast ACK/NACK also provides a scheduled ACK/NACK mechanism to acknowledge multiple transmissions; see Section 2.2.8.1.

FIG. 49b shows (for TDD) a subframe duration only containing UL. The required guard period is generated by leaving the beginning of the UL subframe empty.

FIG. 49 also shows the earliest possible re-transmission timing. For TDD, in principle, it might be possible to schedule a re-transmission already in the next DL subframe. However, given realistic decoding delays at an eNB this is infeasible; the earliest practical re-transmission possibility is therefore in the next-next DL subframe. It is important to point out that, for NX in both DL and UL direction, an asynchronous hybrid-ARQ protocol is used, where re-transmissions are scheduled at an arbitrary time, with the next-next DL subframe being the earliest possible re-transmission time. For FDD, the earliest re-transmission possibility is one subframe later than in TDD, due to the delayed ACK/NACK. To match the re-transmission delay of TDD, an extra-large timing advance can be used, which would give the eNB enough time to schedule a re-transmission in the next-next DL subframe.

Figure 50:
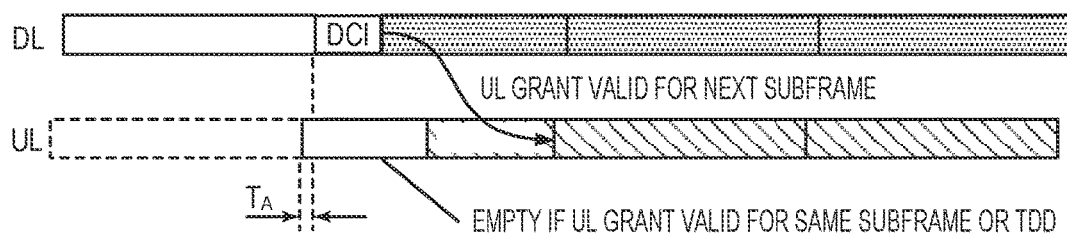
FIG. 50 shows an example transmission of an uplink grant.

The example in FIG. 49a shows a DL transmission followed by an UL transmission for, e.g., Fast ACK/NACK. However, the same principal structure even applies if the beginning of a subframe duration is used for DL control and the remaining part for guard and UL. The DL control in the beginning could for example contain an UL grant; however, in most cases the UL grant would be valid for the next UL subframe. If the grant would be valid for the current UL subframe this would imply extremely short preparation time at the UE, and in case of FDD also a resource waste, since the beginning of the UL subframe would be empty. See FIG. 50 for an example. As shown in FIG. 50, an UL grant transmitted at the beginning of a DL subframe is typically valid for the next UL subframe. If the grant would be valid for the current UL subframe, the beginning of the UL subframe is empty. For extremely delay critical applications such as certain C-MTC use cases, grant validity for the same UL subframe can be considered.

The duration of a single subframe is very short. Depending on the numerology, the duration may be a few hundred μs or even less than 100 μs, in the extreme case even less than 10 μs; see Section 2.3.2.2 for more details. Very short subframes are important for C-MTC devices requiring short latency, and such devices typically check for control signaling transmitted at the beginning of every DL subframe. Given the latency critical nature, the transmission itself can also be very short, e.g., a single subframe.

For MBB devices, extremely short subframes are typically not needed. It is therefore possible to aggregate multiple subframes and schedule the subframe aggregate using a single control channel. See FIGS. 49b and 49c and FIG. 50 for examples. Subframe aggregation is supported in the DL and in the UL; due to full duplex limitations UL and DL subframe (aggregates) cannot overlap. A single transport block (ignoring MIMO and the possibility of having two transport blocks mapped to dPDCH and rPDCH; see Section 2.2.2.1) is mapped to a subframe aggregate and acknowledgement of correct reception is done for the subframe aggregate and not individual subframes. This also reduces overhead if Fast ACK/NACK is used especially for TDD since now a Fast ACK/NACK transmission (plus guard period) only occurs once per subframe aggregate and not once per subframe.

Multiplexing of individual subframes and subframe aggregation is supported. In DL, when individual subframes overlap with subframe aggregates and the UEs receiving individual subframes should acknowledge them using Fast ACK/NACK, the aggregated subframe should contain transmission holes to enable UL reception at the eNB.

2.3.2.2 Multiplexing of Data and Control

When present, the Physical Downlink Control Channel (PDCCH) starts in the beginning of a DL subframe (later start of a transmission in a DL subframe for listen-before-talk operation is possible; for more details on listen-before-talk see Section 3.8.4). PDCCH spans preferably 1 OFDM symbol in time but can extend up to $N_{symb}$ symbols (i.e., up to one subframe). PDCCH can schedule Physical data channel (PDCH) in the same and next subframe for DL and PDCH in next subframe for UL. PDCCH may or may not be able to schedule the UL of the same subframe.

PDCH can span multiple DL subframes. It may start late in a DL subframe if time multiplexed with PDCCH, otherwise it starts in the beginning of a DL subframe. For TDD, it may end before the end of a DL subframe, to enable UL transmissions at the end of the subframe.

Figure 51:
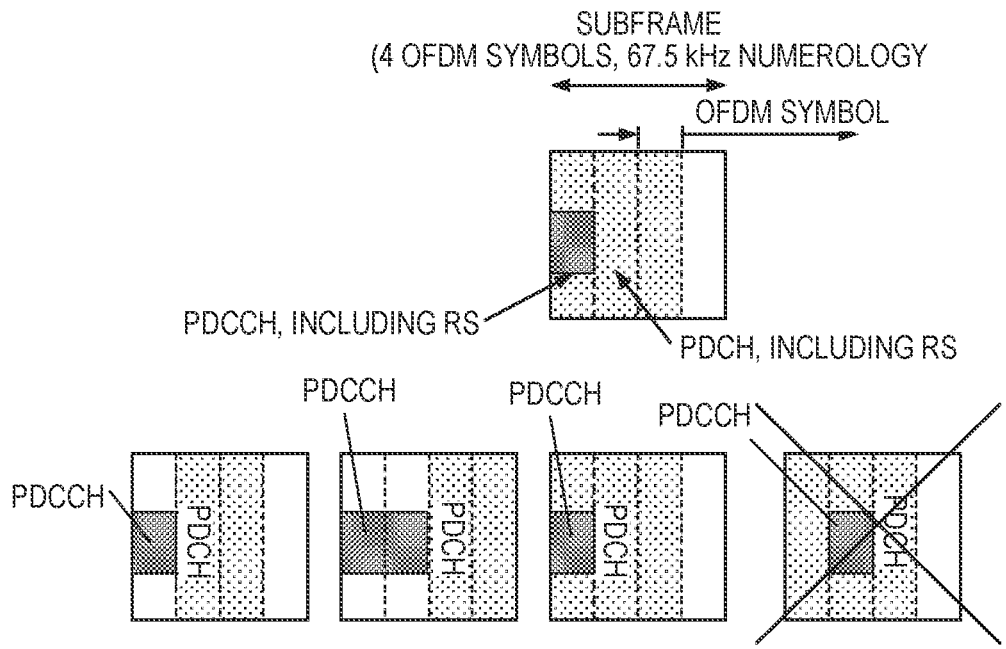
FIG. 51 shows an example of data and control multiplexing for downlink, in 67.5 kHz numerology.

FIG. 51 illustrates examples of data and control multiplexing for downlink in 67.5 kHz numerology. The configuration on the bottom right is not supported.

Figure 52:
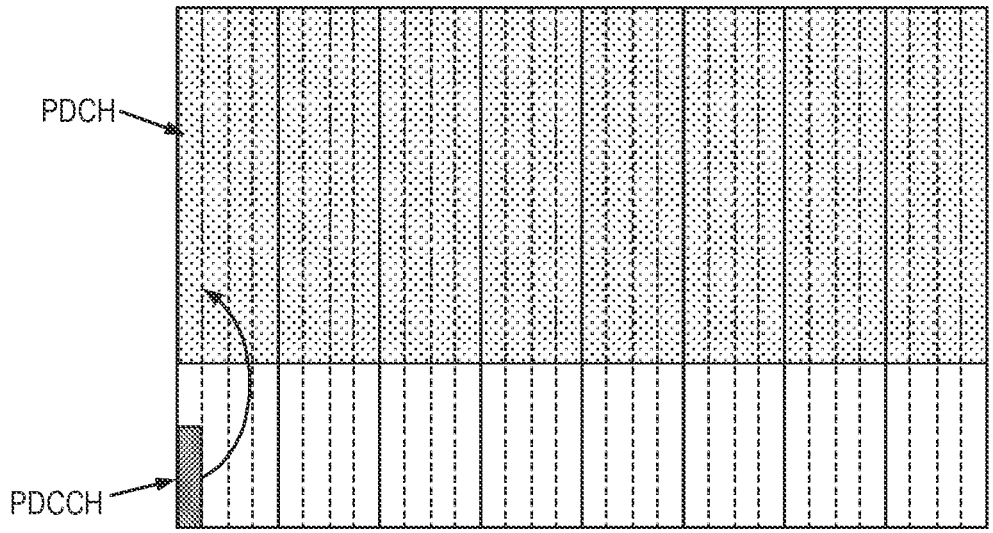
FIG. 52 shows an example of mapping control and data to physical resources.

PDCH and PDCCH may occupy different parts of the band and thus need to be self—with respect to reference signals. See FIG. 52, which shows an example of mapping control and data to the physical resource. A mechanism for how to handle control channel resources for a given user overlapping with data resources for another user is desirable. Even if PDCCH and scheduled PDCH in DL would always overlap in frequency-domain, PDCCH overlapping other users DL PDCH may occur for UL grants.

For uplink and TDD, a PDCH transmission may start late in an UL subframe to create a guard period for DL-UL switch; in FDD a PDCH transmissions starts at the beginning of an UL subframe. A transmission ends at the end of an UL subframe. Uplink control information is transmitted in the last OFDM symbol(s) of an UL subframe, either on dPDCH (see Section 2.2.2.1) and/or PUCCH. Frequency multiplexing of control and data is possible.

2.3.2.3 Numerology

It is well known that robustness of an OFDM system towards phase noise and Doppler shift increases with subcarrier bandwidth. However, wider subcarriers imply shorter symbol durations which—together with a constant cyclic prefix length per symbol—result in higher overhead. The cyclic prefix should match the delay spread and is thus given by the deployment. The required cyclic prefix (in µs) is independent of the subcarrier bandwidth. The "ideal" subcarrier bandwidth keeps the cyclic prefix overhead as low as possible but is wide enough to provide sufficient robustness towards Doppler and phase noise. Since the effect of both Doppler and phase noise increase with carrier frequency the required subcarrier bandwidth in an OFDM system increases with higher carrier frequency.

Considering the wide operating range of below 1 GHz to 100 GHz it is impossible to use the same subcarrier bandwidth for the complete frequency range and keep a reasonable overhead. Instead, three subcarrier bandwidths span the carrier frequency range from below 1 to 100 GHz.

To enable subframe durations of a few 100 µs using LTE numerology (for LTE frequencies), one subframe would have to be defined as a few OFDM symbols. However, in LTE, OFDM symbol durations including cyclic prefix vary (the first OFDM symbol in a slot has a slightly larger cyclic prefix) which would lead to varying subframe durations. (Varying subframe durations are in practice likely not a significant problem and could be handled. In LTE, the varying cyclic prefix length leads to somewhat more complicated frequency error estimators.) Alternatively, a subframe could be defined as an LTE slot, leading to subframe durations of 500 µs. This, however is considered too long.

Therefore, even for LTE frequencies a new numerology is described herein. The numerology is close to the LTE numerology, to enable the same deployments as LTE, but provides subframes of 250 µs. The subcarrier bandwidth is 16.875 kHz. Based on this subcarrier bandwidth several other numerologies are derived: 67.5 kHz for around 6 to 30/40 GHz or dense deployments (even at lower frequencies) and 540 kHz for the very high frequencies. Table 3 lists the most important parameters of these numerologies, e.g., $f_s$: Clock frequency, $N_{symb}$: OFDM symbols per subframe, $N_{sf}$: samples per subframe, $N_{ofdm}$: FFT size, $N_{cp}$: cyclic prefix length in samples, $T_{sf}$: subframe duration, $T_{ofdm}$: OFDM symbol duration (excluding cyclic prefix), and 74: cyclic prefix duration. Table 3 is based on an FFT size of 4096 and a clock frequency of 34.56 MHz to allow the covering of large carrier bandwidths. The proposed numerologies are not based on the LTE clock frequency (30.72 MHz) but on 16.875/15·30.72 MHz=9/8·30.72 MHz=9·3.84 MHz=34.56 MHz. This new clock relates via a (fractional) integer relation to both LTE and WCDMA clocks and can thus be derived from them.

TABLE 3

| Subcarrier bandwidth | 16.875 kHz, normal CP | 16.875 kHz, long CP | 67.5 kHz, normal CP | 67.5 kHz, long CP b | 540 kHz, normal CP |
|---|---|---|---|---|---|
| Main scenario | <~6 GHz | <~6 GHz SFN transm. | ~6 to 30-40 GHz or dense depl. | Low delay in wide-area deployments | >30-40 GHz |
| $f_s$ in MHz | 69.12 = 2 × 34.56 | | 276.48 = 2 × 138.24 | | 2212 = 2 × 1105.92 |
| $N_{symb}$ | 4 | 3 | 4 | 7 | 4 (larger number is possible) |
| $N_{sf}$ | 17280 | 17280 | 17280 | 34560 | 17280 |
| $N_{ofdm}$ | 4096 | 4096 | 4096 | 4096 | 4096 |
| $N_{cp}$ | 224 | 1664 | 224 | 4 × 848, 3 × 832 | 224 |
| CP overhead in % | 5.5 | 40.6 | 5.5 | 20.5 | 5.5 |
| $T_{sf}$ in µs | 250 | 250 | 62.5 | 125 | 7.81 |
| $T_{ofdm}$ in µs | 59.26 | 59.26 | 14.82 | 14.82 | 1.85 |
| $T_{cp}$ in µs | 3.24 | 24.07 | 0.81 | 3.01 | 0.10 |
| $T_{ofdm} + T_{cp}$ in µs | 62.5 | 83.33 | 15.625 | 17.86 | 1.95 |
| Max carrier bandwidth in MHz | 60 | 60 | 250 | 250 | 2000 |

Note that numerologies for implementations may vary from those listed in Table 3. In particular, numerologies with long cyclic prefixes may be adjusted.

FIG. 53 illustrates several example numerologies.

Table 3 shows that OFDM symbol duration and subframe duration decrease with subcarrier bandwidth, making numerologies with wider subcarriers suitable for low-latency application. The cyclic prefix length also decreases with subcarrier bandwidth, limiting the wider subcarrier configurations to dense deployments. This can be compensated by long cyclic prefix configuration, at the price of increased overhead. In other words, shorter subframes and thus latencies are more efficiently available in small cells than in large cells. In practice, however, it is expected that many latency critical applications deployed in the wide area (and thus require a cyclic prefix larger than 1 µs) don't require subframe durations smaller than 250 µs. In the rare cases where wide area deployments require smaller subframe durations, 67.5 kHz subcarrier bandwidth—with long cyclic prefix if needed—can be used. The 540 kHz numerology provides even shorter subframes.

The maximum channel bandwidths of the different numerologies are, approximately, 60 MHz, 240 MHz, and 2 GHz for 16.875 kHz, 67.5 kHz, and 540 kHz numerology, respectively (assuming an FFT size of 4096). Wider bandwidths can be achieved with carrier aggregation.

Section 2.3.1 describes mixing of different numerologies on the same carrier, using Filtered/Windowed OFDM. One of the motivations is to achieve lower latency on a part of the carrier. Mixing of numerologies on a TDD carrier should obey the half-duplex nature of TDD—simultaneous transmission and reception capability of a transceiver cannot be assumed. The most frequent duplex switching in TDD is thus limited by the "slowest" numerology among the simultaneously used ones. One possibility is to enable duplex switching on the "fastest" numerology subframe basis when needed and accept losing currently ongoing transmission in the reverse link.

2.3.3 Physical Channels, Downlink

Section summary: The physical anchor channel (PACH) is used for AIT distribution. The PACH design supports blind detection of used numerologies. PACH supports beamforming and/or repetition to improve link budget.

The physical downlink control channel (PDCCH) schedules physical data channel (PDCH). PDCCH spans only a fraction of the system bandwidth and has its own demodulation reference signals enabling user-specific beamforming.

TABLE 4

Physical channels in NX

| Channel | Purpose |
|---|---|
| Physical anchor channel (PACH) | Distributes AIT |
| Physical downlink control channel (PDCCH) | Schedules PDCH and can trigger reference signal transmissions and CQI reports |

2.3.3.1 Physical Anchor Channel (PACH)

Figure 55:
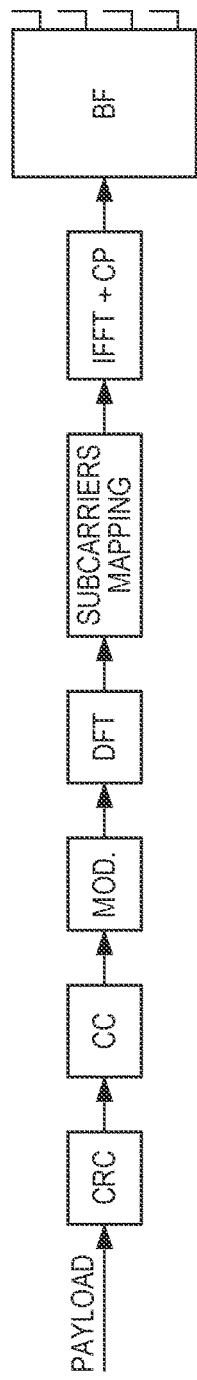
FIG. 55 provides an overview of PACH transmit processing.

AIT can be distributed via PDCH or via PACH, depending on the UE state. See FIG. 54, which shows AIT mapping to physical channels. The Common AIT (C-AIT) is periodically broadcasted in PACH as introduced in Section 2.2.2.2. In this section, the transmission signal processing, transmission format, and possible blind detection of PACH are described. In Section 3.2, different deployments of how to distribute C-AIT are discussed. Since UEs are not aware of the deployment, the PACH design should work in all possible configurations. An overview of the PACH transmit processing procedure is shown in FIG. 55. Flexible payload sizes are supported; padding is used to match the payload size including CRC to one out of {200, 300, 400} bits. If required, this set can be extended. Simulations with these payload sizes show that Turbo coding is better than convolutional coding as the channel coding. However, the specific coding design for PACH may be considered in conjunction with the coding used for MBB, to harmonize coding schemes.

The encoded data are mapped to QPSK symbols and DFT-precoded to achieve a low-PAPR waveform. The precoded signal is mapped to a predefined group of subcarriers. Broadcast/wide beams are preferred for transmission. However, in some scenarios omni-directional transmission does not provide the required coverage and beam-sweeping in time domain should be supported, which would be transparent for the terminals.

Different transmission formats (different number of subframes) are defined to accommodate the different payload sizes. The basic PACH transmission block for a given payload consists of $N_{sf}^{PACH}$ contiguous subframes and $N_{sc}^{PACH}$ contiguous subcarriers. To be similar to the LTE PBCH bandwidth (1.08 MHz), if the numerology of 16.875 kHz subcarrier spacing is deployed, $N_{sc}^{PACH}=72$, 1.215 MHz, is selected here. If this bandwidth is too large and cannot be transmitted within a 1.4 MHz channel bandwidth, a smaller $N_{sc}^{PACH}$ can be selected.

Figure 56:
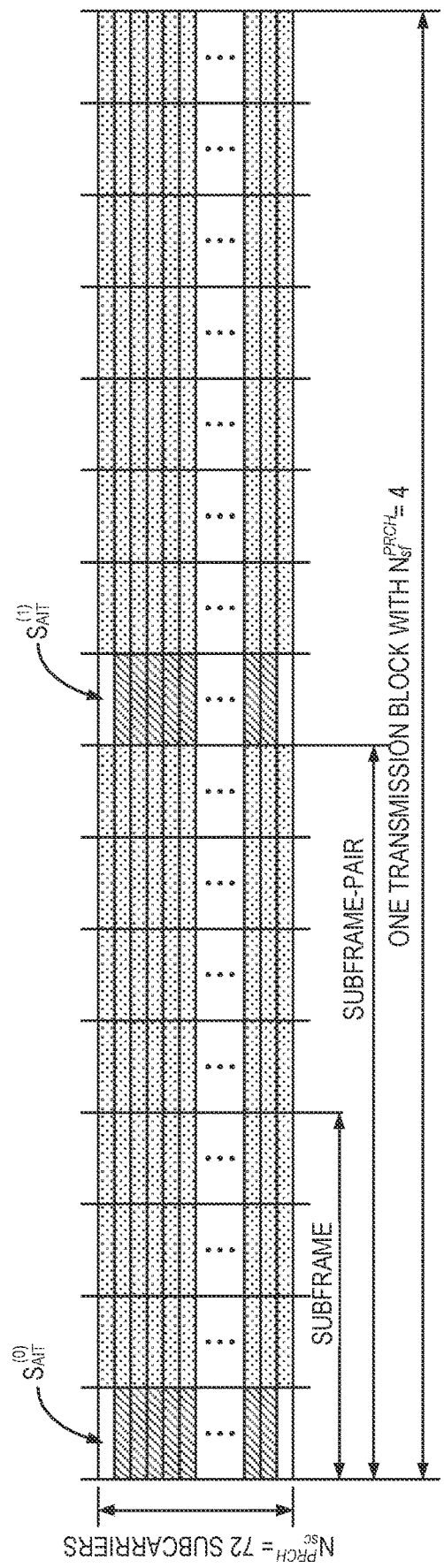
FIG. 56 shows an example of PACH resource mapping.

To support flexible payload sizes without additional signaling, $N_{sf}^{PACH}$ is implicitly configured according to a pre-defined mapping table. The UE blindly detects the transmission format (number of subframes $N_{sf}^{PACH}$) and derives the payload size from the detected number of subframes. Three different formats—one for each payload size illustrated above—are defined, consisting of 4, 6, and 8 subframes. Reference signals, each as a pre-defined sequence, are inserted into the 1$^{st}$ OFDM symbol in each subframe-pair, e.g., $\{1^{st}, 3^{rd}\}$, $\{1^{st}, 3^{rd}, 5^{th}\}$ and $\{1^{st}, 3^{rd}, 5^{th}, 7^{th}\}$ subframes for the formats containing 4, 6, and 8 subframes, respectively. A PACH resource mapping scheme with four subframes is illustrated in FIG. 56. UEs can blindly detect the reference signal pattern and derive the transmission format and payload size.

To support multiple analog beams, a fixed absolute time duration, e.g., 10 ms, is reserved to sweep beams. Note that for TDD, the transmitting node cannot receive any UL transmissions during this time duration. Thus, a more flexible scheme may be used for TDD. The maximum number of supported beams depends on the used transmission format and numerology, since both parameters determine the duration of the basic PACH transmission block. The basic PACH transmit block can also be repeated within a beam in the duration to obtain the repetition gain, besides of the beam-forming gain of each block.

The resource mapping schemes are designed to fit with the numerologies in Section 2.3.2.3. The current design is to guarantee the coding rate of each numerology is about 0.1, similar to the value of LTE PBCH without block repetition.

Since the UE may not have a-priori information about which numerology is used for PACH transmission, it needs to detect the numerology blindly. To minimize the complexity, the number of possible numerologies should be small, e.g., coupled to the frequency band. For the lower part of the 1-100 GHz range both 16.875 kHz and 67.5 kHz numerologies are relevant and can be used for AIT distribution. For the mid-range and high-range of 1-100 GHz, 67.5 kHz and 540 kHz are the preferred numerologies, respectively. Several numerologies support normal and extended cyclic prefix. The PACH design enables blind detection of cyclic prefix length, though the long cyclic prefix could be preferred in some cases, e.g., if single-frequency network (SFN) is used for AIT distribution.

Coupling the AIT numerology for each frequency band to only one candidate—such that for a given frequency always the same numerology is used for AIT transmission—provides benefits with respect to blind decoding, but on the other hand forces support of carriers with mixed numerologies (one numerology for AIT and one numerology used for the other transmissions on the carrier) with large design impacts, and is therefore possible but not preferable.

2.3.3.2 Physical Downlink Control Channel (PDCCH)

The physical downlink control channel (PDCCH) carries downlink control information, DCI. DCI includes, but is not limited to, scheduling information for PDCH, both uplink and downlink. A PDCCH also contains reference signals for demodulation, the user identity (either explicitly or implicitly, e.g., CRC mask) and CRC for validation.

Figure 57:
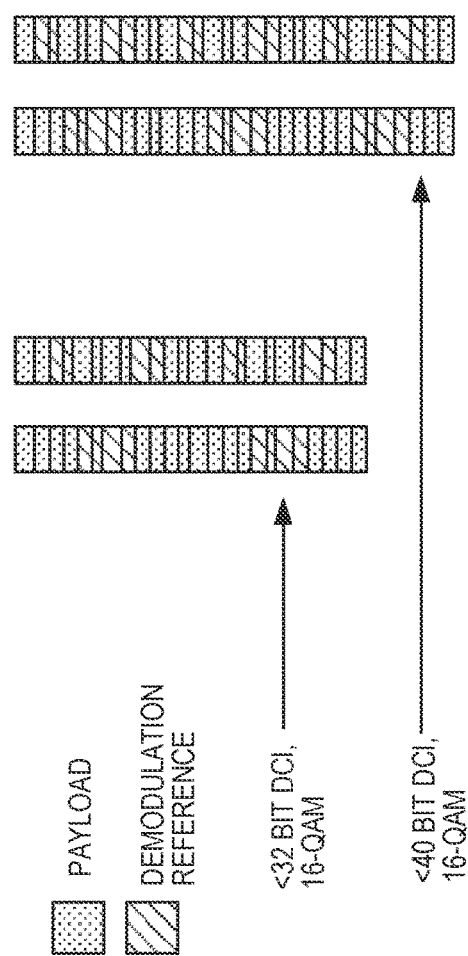
FIG. 57 illustrates examples of minimum PDCCH allocation units.

FIG. 57 shows Examples of minimum PDCCH allocation unit (CCE) and their maximum DCI payload sizes (excluding a 16-bit CRC) when 16-QAM is used. RS are put in frequency-clusters to facilitate antenna port de-spreading.

PDCCH is transmitted preferably in the first OFDM symbol in an NX DL subframe, a multi-symbol PDCCH can be envisioned if desirable from a capacity and/or coverage viewpoint. A PDCCH is transmitted in a part of the spectrum. The size of this part depends on the channel conditions and payload size. Multiple PDCCHs may be transmitted, frequency multiplexed or/and space-multiplexed in the same OFDM symbol. Space/frequency resources unused for PDCCH transmission may be used for PDCH transmission.

Payload Sizes

PDCCH is preferably defined for a small number of message sizes to limit the blind decoding complexity. If a larger set of payload sizes would be desirable, it is possible that additional message sizes are defined or that padding to the next larger PDCCH message size is used.

QPSK and even 16-QAM modulation are foreseen as the modulation formats for PDCCH. Time/frequency resources are allocated in Control channel element (CCE) units. The CCE size is connected to the message sizes. The CCE size should be such that the maximum code rate is 4/5 for the highest modulation index. In case of 16-QAM, 40 bits, this translates to ceil(5*40/4/4)=13 RE. Alternatively, a fixed CCE size may be set to, e.g., 18 RE, which translates to a message size=floor(18*4*4/5)=56 bits, including CRC.

Resources belonging to a single CCE are kept as a contiguous, localized, set of subcarriers, including demodulation reference signals. Aggregates of CCEs are used to improve coverage, and/or carry large payloads. The term "aggregation level" refers to the number of CCEs allocated to one PDCCH. The aggregation level is expected to be powers of two, from one up to 32. CCE aggregates are contiguous in frequency, i.e., localized.

PDCCH is channel coded using the LTE convolutional code. After channel coding, the data is scrambled, using a similar scrambling sequence as for ePDCCH in LTE.

PDCCH contain the CRC of the message body, scrambled by a UE-specific identity. The UE detects a PDCCH if the descrambled CRC of a decoded message matches.

The DCI in LTE has a CRC-16 attached (CCITT-16). The CRC missed detection probability of not detecting an error in, e.g., an 48-bit DCI can be upper bounded at 4.3e-4. With respect to C-MTC requirements on the missed detection probability, it can be observed that given that the BLER operating point is so low and that C-MTC is assumed to make hardly any use of retransmissions, where the missed detection would lead to a residual block error, a missed detection probability of 4.3e-4 appears acceptable.

The false alarm probability for detecting a matching CRC on one search space position where no DCI has been transmitted, but the UE is just receiving noise, can be well approximated by $P_{false}=2^{-16}=1.5E-5$ for a CRC-16. For N search space positions, the probability increases on first order by factor N, for small $P_{false}$. The possible effects of false alarms are different for DL-grants and UL-grants. In the worst case, where the UE stops searching after the first CRC match, the false alarm probability from random noise can lead to equally large BLEP, which for CRC-16 is with 1.5E-5 far higher than the extreme C-MTC target of 1 E-9. For CRC-24, the false alarm probability is with 6E-8 still too high. In order to reach BLEP<1E-9, CRC-30 is required. CRC-32 would allow for 4 search space positions at BLEP<1E-9.

Furthermore, the false alarm probability for detecting a matching CRC on a DCI with a CRC XORed with another RNTI needs to be considered. This $P_{false}$ depends on the number of used RNTIs and transmitted DCIs in a subframe.

In each subframe, the BS can address a certain UE through a pre-defined set of possible PDCCHs. Each possible PDCCH is called a candidate, and the set (with size) is called a search space. The UE evaluates all candidates in a subframe, delivering validated candidates to higher protocol layers. The search space is limited by limiting the number of possible payload sizes, aggregation levels, and frequency allocations.

All PDCCH candidates in a search space hop in frequency between sub-frames. The hopping is controlled by a pseudo-random sequence.

The default PDCCH search space is transmitted in the carrier's fundamental numerology. It may be transmitted with beamforming, but is typically expected not to. The default search space is primarily used when the BS has limited or no knowledge of the channel conditions and/or for common messages. For this reason, the default search space candidates typically carry small payloads at high aggregation levels.

UE-specific search spaces can be used when the channel conditions are known. In the case of mixed numerologies, the PDCCH numerology would be part of the search space definition. A considerable amount of flexibility may be desirable, to support the various use cases. Configurability includes, but is not limited to, modulation order, CRC size, numerology, DRX configuration, message sizes, etc. Aggregation levels of UE-specific candidates are configurable according to the channel conditions. For latency critical applications, a terminal can be configured with PDCCH resources every subframe while terminals operating less latency critical applications do not have PDCCH resources configured every subframe.

2.3.4 Physical Channels, Uplink

Section summary: Physical uplink control channel (PUCCH) is used for transmission of Fast ACK/NACK information and is transmitted in the last OFDM symbol(s) of a UL subframe.

TABLE 5

Physical channels in NX

| Channel | Purpose |
| --- | --- |
| Physical uplink control channel (PUCCH) | Used for Fast ACK/NACK feedback and potentially other UL control information. |

2.3.4.1 Physical Uplink Control Channel (PUCCH)

This channel contains Fast ACK/NACK feedback and potentially other UL control information. Note that it may be possible to eliminate the need for this physical channel, by instead conveying its payload using dPDCH. The main purpose of dPDCH is to convey scheduling information and CQI feedback and its payload is modeled as transport blocks. dPDCH includes CRC protection to enable error detection. This format may be suitable for Fast ACK/NACK feedback (typically consisting only of few bits), such that a generalization of dPDCH is sufficient, rather than using a new physical channel, PUCCH.

PUCCH Design

Regarding the PUCCH payload, up to around 10 bits are assumed. This payload size is derived from HARQ ACK/NACK. It is assumed that a single or a few bits (soft values) are used to provide HARQ ACK/NACK for a single transport block. Assuming one PUCCH can be used for a few transport blocks leads to the assumption of around 10 ACK/NACK bits.

Moreover, transmit diversity of order two is assumed for PUCCH both for MBB and C-MTC UEs. If a UE has more than two transmit antennas, they may be used for extended transmit diversity and/or beamforming (desirable at least at higher frequencies). However, some M-MTC UEs can only support one transmit antenna. Therefore, even 1-antenna PUCCH formats should be supported.

Fast ACK/NACK procedure is beneficial for high data rates, since it enables fast link adaptation and short round trip times. To enable Fast ACK/NACK feedback in the same subframe, PUCCH is placed at the end of the subframe; see Section 2.3.2.1. At minimum, the PUCCH control region consists of 1 OFDM symbol, however a few OFDM symbols can be allocated to PUCCH for extended coverage. Hence, considering the frame structure of NX, 1 to 3 or even 4 OFDM symbols are allocated for PUCCH (due to timing advance, the first symbol in an UL subframe overlaps with last symbol of a DL subframe and should be empty, at least if PUCCH is sent immediately after DL data). Multi-subframe PUCCH can also be considered.

The frequency position of PUCCH could implicitly be given by the DL assignment and potential other information available to the UE; additional signaling could be minimized by that. Candidates to derive the PUCCH frequency domain location are, e.g., how the scheduling PDCCH is transmitted, frequency location of PDCH, or UE identity. On the other hand, this introduces coupling between DL and UL which might be undesirable with respect to future-proofness.

Multi-symbol PUCCH for improved coverage can be based on block-spreading the one-symbol PUCCH over multiple symbols. To improve capacity, multiple UEs with the same PUCCH duration can share the same frequency resources by using different block-spreading codes (orthogonal cover codes). This implies that UEs using PUCCH with equal length should be grouped together.

PUCCH is transmitted with the same numerology as UL PDCH.

TDD Specifics

As shown in FIG. 49a, Fast ACK/NAK requires aligned PUCCH transmission at the end of an UL subframe, leading to DL capacity loss in case of TDD. Guard periods before and after the UL transmissions are also required to accommodate the switching times, at least one OFDM symbol duration is split as guard time before and after the UL transmission. The UE needs a minimum time to decode the data and prepare a Fast ACK/NACK; if the processing time given by the guard time is too short for providing Fast ACK/NACK at the end of the current subframe, feedback can be transmitted at the end of a later subframe.

2.3.5 Physical Channels, Common

Section summary: Physical data channel (PDCH) exists in both UL and DL. It can be configured differently to support various payload types and transmission modes. Channel coding for MBB may be based on polar codes; however, spatially coupled LDPC codes may also be used, and show similar performance. For C-MTC, tail-biting convolutional codes are preferred due to their simple decoding and good performance for small block length.

TABLE 6

Physical channels in NX

| Channel | Purpose |
| --- | --- |
| Physical data channel (PDCH) | A UE can be configured with multiple PDCH. PDCH can be configured differently to support transmission of data and control information. |

2.3.5.1 Physical Data Channel (PDCH)

PDCH is scheduled via DCI contained in a PDCCH, PDCH, or via a semi-persistent grant and exists on DL, UL, and sidelink (link between devices or between eNBs). PDCH can contain user data, DCI, CSI, hybrid-ARQ feedback, and higher-layer control messages. Different channel coding schemes exist for PDCH. For example, convolutional codes are used for small payloads with high reliability requirements (e.g., critical MTC) while higher-performing channel codes are used for code-words with typically larger payload sizes and lower reliability requirements (e.g., MBB). For more details, see Section 2.3.5.

Data on PDCH can be protected by a retransmission scheme, which can be disabled for certain PDCH configuration. PDCH with retransmission option (it still can be disabled) is the (retransmittable) rPDCH, while PDCH without retransmission option is the (direct) dPDCH. See Section 2.2.2.1 for more details on dPDCH and rPDCH. A PDCH can contain zero or one dPDCH and zero or one rPDCH.

PDCH time-frequency resources and transmission format are specified in the scheduling information. PDCH spans one or multiple subframes and its frequency location and bandwidth are variable (as specified in the scheduling information). In the uplink, in a PDCH containing both a dPDCH and an rPDCH, dPDCH is mapped to the last OFDM symbol(s) of an UL subframe since UL control information is transmitted at the end of an UL subframe. In the downlink, in a PDCH containing both a dPDCH and an rPDCH, dPDCH is mapped to the first OFDM symbol(s) of a DL subframe since DL control information is transmitted at the beginning of a DL subframe. In general, modulation symbols are mapped frequency first within the scheduled time-frequency resources to resource elements not used for any other purpose. Interleaving in time is not supported since this prevents early start of decoding.

PDCH uses the same numerology as used by the scheduling grant.

TABLE 7

Configurations of PDCH

| Type | Comment |
| --- | --- |
| L1/L2 control information and CSI | Mapped on dPDCH. Configured with channel coding for small payloads, no hybrid-ARQ |
| Paging and random access response | Mapped on dPDCH. No hybrid-ARQ, self-contained sync signal |
| MBB | Mapped on rPDCH. Configured with high performing channel codes and hybrid-ARQ |
| C-MTC | Mapped on dPDCH or rPDCH. Configured with convolutional codes and often without hybrid-ARQ |
| Contention-based | Configured to enable contention-based access |

Paging and Random Access Response

In this configuration, fine-synchronization cannot rely on the Signature Sequence (SS) signal but requires a self-contained sync and reference signal (to support non-co-located transmission points of SS and random access response or paging and/or different antenna weights). Paging and random access response may use the same PDCH configuration. Paging and random access response are transmitted on dPDCH.

MBB

Different configurations for different MIMO modes, e.g., reciprocity-based MIMO vs. feedback-based MIMO exist. Channel coding can be based on polar codes or spatially-coupled LDPC codes. MBB data are mapped to rPDCH.

C-MTC

Channel coding in this configuration is convolutional coding. Due to strict latency requirements, hybrid-ARQ can be disabled. C-MTC data are mapped to rPDCH or dPDCH. For achieving low block error rate without exhausting the available link budget, diversity over fading is important. Diversity may be achieved via spatial diversity, using multiple transmit and receive antennas, or frequency diversity using multiple resource blocks of independent fading coefficients. Due to low latency requirement, it is however, impossible to exploit time diversity. Furthermore, for the case of transmit and frequency diversity, channel codes need to have sufficient minimum Hamming or free distance to take full advantage of the diversity.

2.3.5.2 Channel Coding for PDCH

Section summary: For MBB Spatially-coupled (SC) LDPC codes and polar codes are attractive candidates. Both provide higher throughput for moderate-to-large block lengths, have lower complexity per transmitted information bit, and provide substantially higher decoding throughput than Turbo codes.

For C-MTC short—and thus low complexity—decoding is important. LTE convolutional codes fulfill the C-MTC requirements w.r.t. reliability and latency.

MBB

The LTE standard deploys Turbo codes due to their remarkable performance—they approach capacity within 1 dB gap over general channels. However, recent advances in channel coding theory have brought two classes of channel codes that—unlike Turbo codes—provably achieve the capacity for very large block lengths: 1) Spatially-coupled (SC) LDPC codes and 2) polar codes. These two classes of codes outperform Turbo codes from several aspects, and are thus the two most attractive candidates for 5G MBB systems.

Listed below are some advantages of polar codes and SC-LDPC codes over Turbo codes:
1. Both polar and SC-LDPC codes have higher throughput for moderate-to-large block lengths n (n>~2000 for polar codes). Performance gap compared to Turbo codes increases as n gets larger.
2. For short block lengths (n~256), polar codes outperform all other known classes of codes including Turbo codes and SC-LDPC codes.
3. Polar codes have lower encoding and decoding complexity per transmitted information bit (and consequently higher energy efficiency) compared to both LDPC and Turbo codes.
4. SC-LDPC codes have low error floor. Polar codes don't have an error floor.
5. Both polar and SC-LDPC codes have substantially higher decoding throughput in bits/s obtained at the decoder output [Hon15b].

A brief overview of these two classes of codes is provided below.

2.3.5.2.1 LDPC and Spatial-Coupled (SC) LDPC Codes

Figure 58:
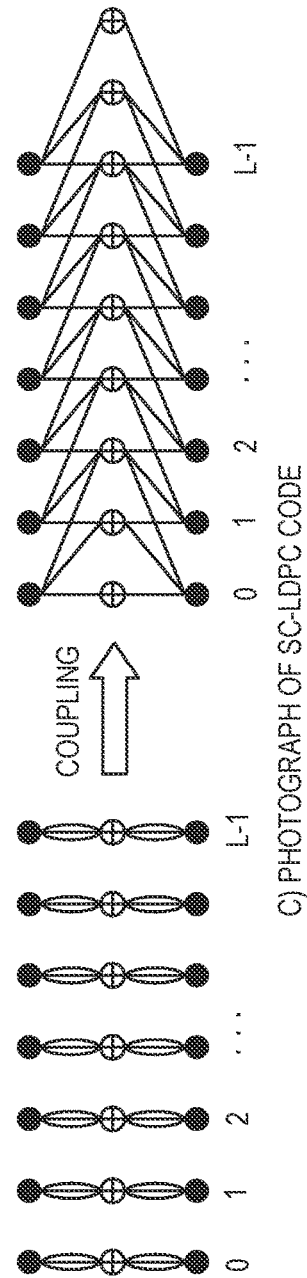
FIG. 58 is a graphical representation of LDPC and SC-LDPC codes.

Regular LDPC codes with constant variable node degree and check node degree were first proposed by Gallager in 1962. They are asymptotically good in the sense that their minimum distance grows linearly with block length when the variable node degree is chosen to be larger than 2. For instance, FIG. 58a shows a graphical representation of the parity check matrix of a (3,6)-regular LDPC code of block length 6 with variable node degree of 3 and check node degree 6, where black circles represent variable nodes and white circles represent check nodes. Due to the use of suboptimal iterative decoding, however, their performances are worse than Turbo codes in the so-called waterfall region, making them unsuitable for power-constrained applications as typically encountered in cellular networks.

There are two design improvements that enable LDPC codes to be adopted in several communication standards. First, optimized irregular LDPC codes, with a variety of different node degrees, show capacity-approaching performance in the waterfall region and can achieve better performance than Turbo codes in this region. The second is protograph-based construction of irregular LDPC codes. It has been observed that protograph-based irregular LDPC codes often have better performances than unstructured irregular ones with the same degree distributions. In spite of their success, irregular LDPC codes, unlike regular LDPC codes, are normally subject to an error floor, i.e., a flattening of the bit error rate (BER) curve that yields poor performance at high SNRs, making them undesirable in applications as data storage, critical MTC, and so on.

Spatially-coupled LDPC (SC-LDPC) codes, proposed by Felstrom and Zigangirov, are the first class of codes that achieve the capacity universally for a large class of channels with low-complexity encoding and decoding. They are simply constructed by starting from a sequence of L independent (regular) LDPC codes, which are then interconnected by spreading the edges over blocks of different time instants (see FIG. 58c). SC-LDPC codes combine the best features of well-optimized irregular and regular LDPC codes in a single design: capacity achieving and linear minimum distance growth. Further, these codes are very suitable to sliding-window decoding, thereby improving the decoding latency. However, their performances are worse than the well-optimized irregular LDPC codes at short and intermediate block lengths (n<1000) and at target block error rate 0.01 or less, where error floor can become a significant problem.

2.3.5.2.2 Polar Codes

Figure 59:
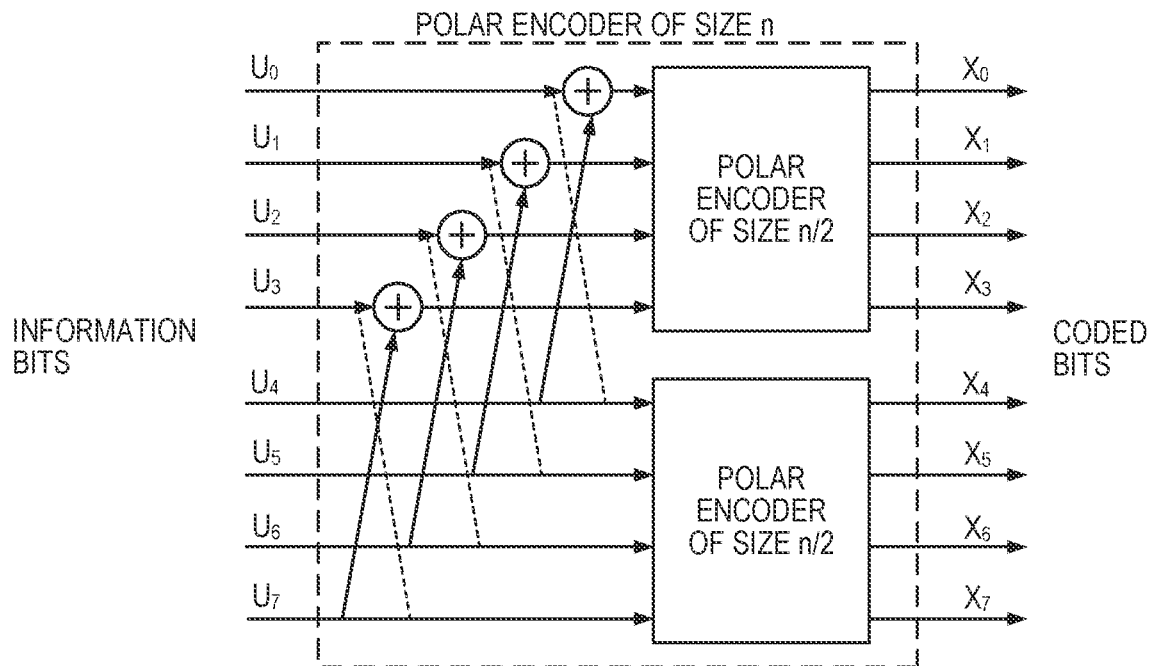
FIG. 59 shows the recursive encoding structure of polar codes.

Polar Codes, proposed by Arikan, are the first class of constructive codes that achieve symmetric (Shannon) capacity (capacity for binary input symbols with symmetric distribution) of binary-input discrete memoryless channel using a low-complexity encoder and low-complexity successive cancellation decoder. At the heart of polar codes is the phenomenon of channel polarization, whereby n identical and independent instances of a given channel are transformed into another set of channels that are either noiseless channels (with capacity close to 1) or pure-noise channels (with capacity close to 0) for asymptotically large block lengths. Furthermore, the fraction of "good" channels approaches the symmetric capacity of the original channel. A polar code then comprises sending information bits over the good channels, while freezing the input to the bad channels with fixed values (typically zeros) known to the receiver. The transformation on a block of n channel instances is obtained by recursively coupling two blocks of transformed channels of size n/2. This is illustrated in FIG. 59, which shows the recursive encoding structure of polar codes. (The tilted dash lines are shown only for illustration of underlying butterfly operations). As a result, the encoding process of polar codes comprises recursive applications of a simple butterfly operation commonly used in FFT and thus can be implemented efficiently with computational complexity growing only in the order of n log n.

In theory, polar codes can achieve the best possible performance (Shannon capacity) with just a simple successive cancellation decoder. However, in practice, polar codes require a modified successive decoder (list decoder) to achieve performance comparable or even better than state-of-the-art LDPC codes. In a list decoder, memory requirements scale linearly with both the list size L (typically in the order of 30) and the block size n (as for SC-LDPC and Turbo), while computational requirements grow as Ln log n.

2.3.5.2.3 Comparison of Channel Codes

Table 8 shows a brief comparison of Turbo codes, SC-LDPC codes, and polar codes in terms of complexity and decoding throughput. The first row specifies the relationship between the number of required encoding/decoding operations where $\delta$ represents the difference between the channel capacity and the code rate. Polar codes have the lowest complexity that increases logarithmically with $1/\delta$, whereas for both SC-LDPC codes and Turbo codes this dependence is of the linear order. In terms of the decoding throughput, the hardware implementation of SC-LDPC codes achieves significantly higher decoding throughput compared to Turbo codes. Note that while decoding throughput of polar codes appears to be the highest, the results shown in Table 8 are obtained with a FPGA implementation. The decoding throughput of polar codes with a hardware implementation remains to be evaluated.

TABLE 8

Comparison of complexity and decoding throughput for different codes

| | SC-LDPC | Polar | Turbo |
|---|---|---|---|
| Complexity (# operations to be at $\delta$-gap to the capacity) | $\Theta(1/\delta)$ | $\Theta(\log(1/\delta))$ | $\Theta(1/\delta)$ (cannot achieve capacity) |
| Decoding throughput | 130.6 Gbps, 11ad LDPC | 254.1 Gbps (FPGA) (1024, 512) code | 2.3 Gbps, 3GPP TC |

Beyond performance and complexity, other important requirements on good codes are their rate-compatibility and ability to be used for hybrid automatic repeat request with incremental redundancy (HARQ-IR). Communication systems that operate over wireless channels with varying quality require channel codes with different rates, in order to adapt to channel variations. To reduce the storage requirement for a potentially large set of codes, these codes should be derived from a single parent code of a fixed rate, also known as rate-compatible codes. Modern wireless communication systems often use a HARQ-IR protocol. Incremental redundancy systems require the use of rate-compatible codes where the set of parity bits of a higher rate code is a subset of the set of parity bits of a lower rate code. This allows the receiver that fails to decode at a rate chosen at the transmitter, to request only additional parity bits from the transmitter, greatly reducing the encoder/decoder complexity. One possible approach to rate-compatibility is puncturing, whereby some of the bits in the code of the lowest rate (parent code) are punctured in order to obtain higher rate codes. However, puncturing of polar codes incurs a performance loss.

Figure 60:
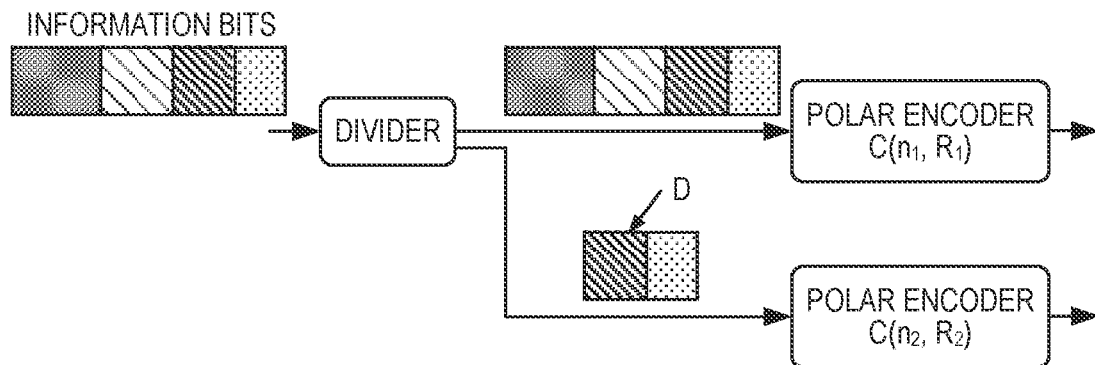
FIG. 60 shows parallel-concatenated polar encoding for K=2 transmissions.
Figure 61:
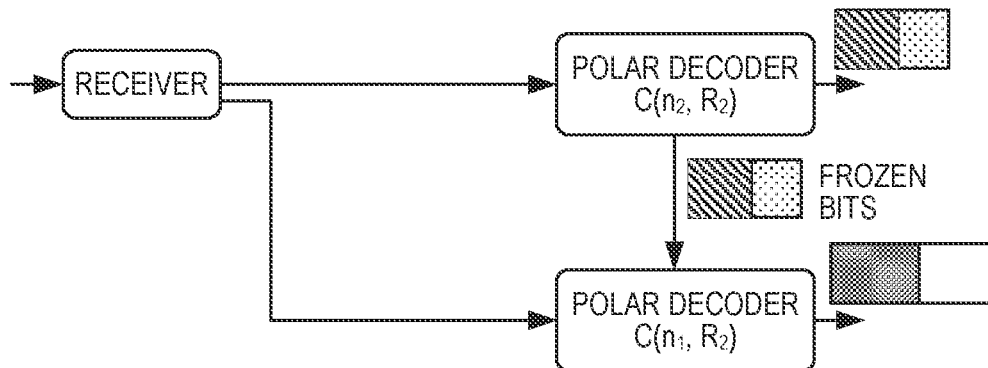
FIG. 61 shows a parallel-concatenated polar decoder, for K=2 transmissions.

The method described herein uses parallel-concatenated polar codes where, in order to sequentially transmit at rates $R_1 > R_2 > \ldots > R_K$, in each transmission block i, a new polar encoder of rate $R_i$ and block length $n_i$ is used. The concatenated polar code is decoded by a sequence of K polar decoders. The parallel-concatenated encoder and decoder structures are shown respectively in FIG. 60 and FIG. 61, for K=2 transmissions. Note that the polar decoder rate is used first to decode the information bits in the two boxes at the right of each set of illustrated bits. These bits are then used in the polar decoder of rate $R_1$ to turn it into a polar decoder of rate $R_2$ that is supported by the channel, thereby enabling the decoding of the rest of the information bits.

Having K transmissions implies that the channel can only support rate $R_K$, and that rates $R_1, R_2, \ldots, R_{K-1}$ are not supported by the channel. Therefore, the difficulty lies in decoding the polar codes sent in first K−1 transmissions at rates $R_1, R_2, \ldots, R_{K-1}$. To make their decoding possible, the nested property of polar codes is exploited.

This approach achieves the capacity as the block length grows large, for any number of retransmissions K.

Critical-MTC

LTE tail-biting convolutional codes—even if used together with a decoder that is optimized for decoding speed rather than performance—achieve very low block error rates, making them an attractive choice for C-MTC. Furthermore, convolutional codes don't have an error floor, an important characteristic for very low target error rates.

Lately it has also been observed that polar codes perform very well even for short code blocks. Accordingly, polar codes are another choice that can be applied to C-MTC.

Diversity is important to achieve high reliability at reasonable SNR levels. The channel code should provide sufficient free distance or minimum Hamming distance to ensure that full diversity can be harvested.

2.3.6 Reference and Synchronization Signals, Downlink

Section summary: Signature sequences (SS) are used to indicate an entry in AIT and to establish some level of subframe synchronization for at least random access preamble transmission. SS are constructed in a similar way as the synchronization signal in LTE by concatenation of a primary signature sequence and a secondary signature sequence.

The combination of time and frequency synchronization signal (TSS) and beam reference signal (BRS) is used to obtain time/frequency/beam synchronization after initial synchronization and access by SS and PRACH. This combined signal is also referred to as MRS (mobility reference signal) and is used for handover (between nodes and beams), transitions from dormant to active states, mobility, beam tracking and refinement, etc. The MRS is constructed by concatenating TSS and BRS such that MRS is transmitted within a single DFT-precoded OFDM symbol.

Channel state information reference signals (CSI-RS) are transmitted in DL and are primarily intended to be used by UEs to acquire CSI. CSI-RS are grouped into sub-groups according to the possible reporting rank of the UE measurement. Each sub-group of CSI-RS represents a set of orthogonal reference signals.

Positioning reference signals (PRS) aid positioning. Already existing reference signals should be reused for PRS purposes. On top of that—if required—modifications and additions can be done to improve positioning performance.

TABLE 9

DL reference and synchronization signals in NX

| Signal | Purpose |
|---|---|
| Signature sequence (SS) | Used to synchronize time and frequency for random access. Provides index to AIT table. |
| Mobility and access reference Signal (MRS) | Concatenation of one TSS and one BRS |
| Time and frequency synchronization signal (TSS) | Used to synchronize time (OFDM symbol timing) and coarse frequency offset estimation in a beam. |

TABLE 9-continued

DL reference and synchronization signals in NX

| Signal | Purpose |
| --- | --- |
| Beam reference signal (BRS) | Used for measurements on beam candidates to enable active mode mobility. Also used for frame and subframe timing. |
| Demodulation reference signal (DMRS) for PDCCH | Demodulation reference signals for PDCCH |
| Channel state information reference signal (CSI-RS) | Used for channel state measurements to aid rank and MCS selection. |
| Positioning reference signal (PRS) | To aid positioning. |

2.3.6.1 Signature Sequence (SS)

Basic functions of SS are one or more of:
- to obtain the SSI, which is used to identify the relevant entry in AIT;
- to provide coarse frequency and time synchronizations for the following initial random access and relative AIT allocation;
- to provide a reference signal for initial layer selection (to select which SS transmission point for a UE to connect, based on the path-loss experienced by SS's);
- to provide a reference signal for open-loop power control of the initial PRACH transmission; and
- to provide a coarse timing reference used for assisting the UE in inter-frequency measurements and also possible beam finding procedure. The current assumption is that SS transmissions are synchronized within a ±5 ms uncertainty window unless explicitly indicated otherwise. The period of SS is supposed to be in the order of 100 ms, which however may be varied, depending on the scenarios.

It is noted that the number of the candidate sequences needs to be large enough to indicate any entry in AIT. Taking the terminal detection complexity into account, the number of SS sequences is $2^{12}$, corresponding to 12 bits for reuse 1 of the sequences, or less if less aggressive sequence reuse is required. Note that the number of bits to be carried depends on requirements. If the number of bits increases beyond what can be carried by sequence modulation, a variation of the SS format is desirable. In this case, one code-word containing the extra bits beyond what the sequences can carry can be appended. This block, following an SS transmission, is named SS block (SSB). The content in this block is flexible and contains the other relevant information bits, which need a periodicity in the order of 100 ms. For example, they can be the "AIT pointer", which indicates the time and band where the terminals can find the AIT and even the transmission format of AIT to avoid full blind detection.

The sequence design for SS can follow the TSS/BRS sequence design, described in Section 2.3.6.3 and Section 2.3.6.4, since they would provide the coarse synchronization function before the initial random access, as introduced in Section 3.2.5.2.

To support the massive analog beamforming, a fixed absolute time duration, e.g., 1 ms, is reserved to sweep multiple analog beams.

For SS numerology the same discussion as in Section 2.3.3.1 for PACH applies. However, the current design does not enable CP length detection.

2.3.6.2 Mobility and Access Reference Signal (MRS)

In the process of acquiring system access information (acquiring system information and detecting a suitable SSI), the UE gets time and frequency synchronized towards one or several nodes by using SS. The latter is achieved in the case of system access information transmitted simultaneously from several nodes in an SFN (single frequency network) manner.

When the UE enters active mode, it targets to receive or transmit with a high data rate connection, in which it might need more accurate synchronization and perhaps beamforming. Here, the mobility and access reference signal (MRS) is used. A UE might also need to change which node it is connected to e.g., from a node used to transmit system access information to another node capable of beamforming. Furthermore, the UE might also change carrier frequency or numerology to higher sub-carrier spacing and shorter cyclic prefix when moving to certain operational modes in active mode.

The MRS is constructed in order to do time and frequency offset estimations as well as estimation of best downlink transmitter and receiver beams towards an "active mode access point". Frequency accuracy and timing provided by MRS is probably not sufficient for high-order modulation reception and finer estimation may be based on DMRS embedded in PDCH and/or CSI-RS.

Figure 62:
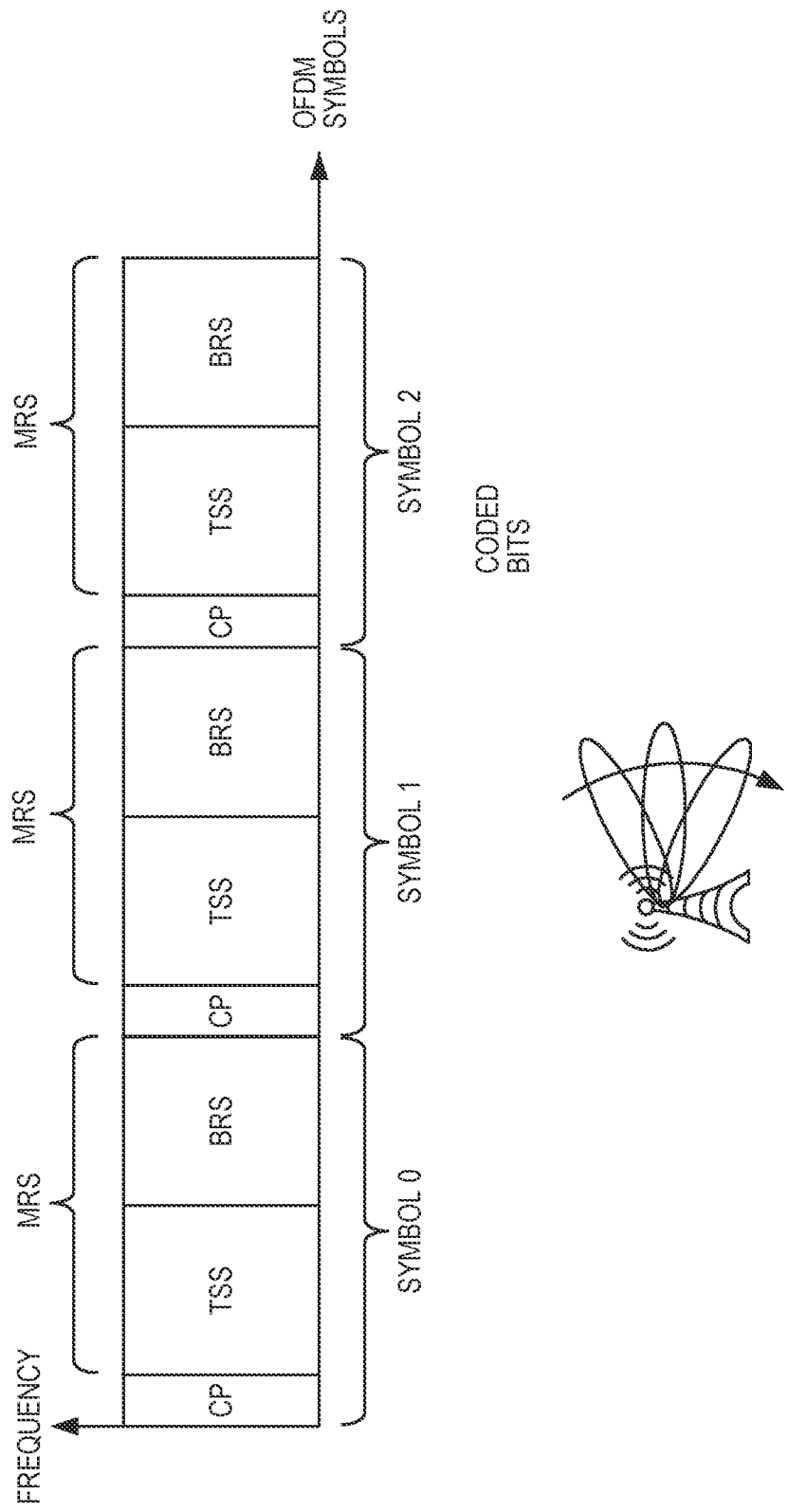
FIG. 62 illustrates construction of a mobility and access reference signal (MRS).

The MRS is constructed by concatenating a time and frequency synchronization signal (TSS) and a beam reference signal (BRS) in time into one OFDM symbol, as illustrated in FIG. 62. This construction can be done as a DFT-precoded OFDM symbol with cyclic prefix. With both TSS and BRS in the same OFDM symbol, the transmitter can change its beamforming between each OFDM symbol. Compared to having separate OFDM symbols for TSS and BRS, the time required for scanning a set of beam directions is now halved. Both TSS and BRS thus have shorter time durations as compared to separate OFDM symbols for each of them. The cost for these shorter TSS and BRS is reduced energy per signal and thus reduced coverage, which can be compensated by increasing the bandwidth allocation, repeating the signal, or increasing the beamforming gain by more narrow beams. Where mixed numerology is supported, the numerology used for MRS is the same as that one used by the UE for which MRS are scheduled. In the event that multiple UEs within the same beam use different numerologies, MRS cannot be shared and MRS should be transmitted separately for each numerology.

Different beamforming configurations can be used to transmit the MRS in different OFDM symbol, e.g., in each of the three symbols shown in FIG. 62. The same MRS might also be repeated several times in the same beam in order to support analog receiver beamforming. There are only one or few TSS sequences, similar to PSS in LTE. The UE performs matched filtering with the TSS sequence to obtain OFDM symbol timing estimation; TSS should therefore possess good a-periodic auto-correlation properties. This sequence might be signaled by system information such that different AP (Access Points) can use different TSS sequences.

The MRS (as constructed by TSS+BRS) signal package is usable for all active mode mobility-related operations: first-time beam finding, triggered beam mobility update in data transmission and monitoring modes, and continuous mobility beam tracking. It may also be used for the SS design, see section 2.3.6.1.

2.3.6.3 Time and Frequency Synchronization Signal (TSS)

The TSS sequence is identical in all OFDM symbols and beam directions transmitted from a base station, while BRS uses different sequences in different OFDM symbols and beam directions. The reason for having identical TSS in all symbols is to reduce the number of TSS which a UE must search in the quite computational complex OFDM symbol synchronization. When the timing is found from TSS, the UE can continue to search within a set of BRS candidates in order to identify the OFDM symbol within a subframe as well as best downlink beam. Best downlink beam can then be reported by USS as described in section 2.3.7.2.

One choice for such sequences is the Zadoff-Chu sequences as used for PSS in LTE release 8. However, these sequences are known to have large false correlation peaks for combined timing and frequency offsets. Another choice is differential coded Golay sequences, which are very robust against frequency errors and have small false correlation peaks.

2.3.6.4 Beam Reference Signal (BRS)

The BRS is characterized by different sequences transmitted in different transmitted beams and OFDM symbols. In this way, a beam identity can be estimated in the UE for reporting to the access node.

An identification of OFDM symbol within the subframe is desirable if the timing difference between SS and active mode transmissions is large. This might occur for numerologies with short OFDM symbols, large distance between the node transmitting system access information and the node in which the UE is supposed to transmit user data (in case these nodes are different), or for unsynchronized networks. This identification can be done if different BRS sequences are used for different OFDM symbols. However, in order to reduce computational complexity, the number of BRS sequences to search for should be low. Depending on the OFDM symbol index uncertainty, a different number of BRS sequences may be considered in the blind detection of the UE.

The BRS can be a dedicated transmission to one UE or the same BRS might be configured for a group of UEs. A channel estimate from TSS can be used in a coherent detection of BRS.

2.3.6.5 Channel State Information RS (CSI-RS)

CSI-RS are transmitted in DL and are primarily intended to be used by UEs to acquire channel state information (CSI) but can also serve other purposes. The CSI-RS may be used for one or more of (at least) the following purposes:
1. Effective channel estimation at the UE: Frequency selective CSI acquisition at the UE within a DL beam, e.g., used for PMI and rank reporting.
2. Discovery signal: RSRP type measurement on a set of CSI-RS reference signals. Transmitted with a time density according to large scale coherence time of the relevant (DL) channels.
3. Beam refinement and tracking: Get statistics about the DL channel and PMI reporting to support beam refinement and tracking. PMI does not need to be frequency selective. Transmitted with a time density according to large scale coherence time of the relevant (DL) channels.
4. For UE transmit beam-forming in UL assuming reciprocity.
5. UE beam-scanning for analog receive beam-forming in DL (similar requirements to 1) or 3) depending on use-case).
6. To assist fine frequency/time-synchronization for demodulation.

Figure 63A:
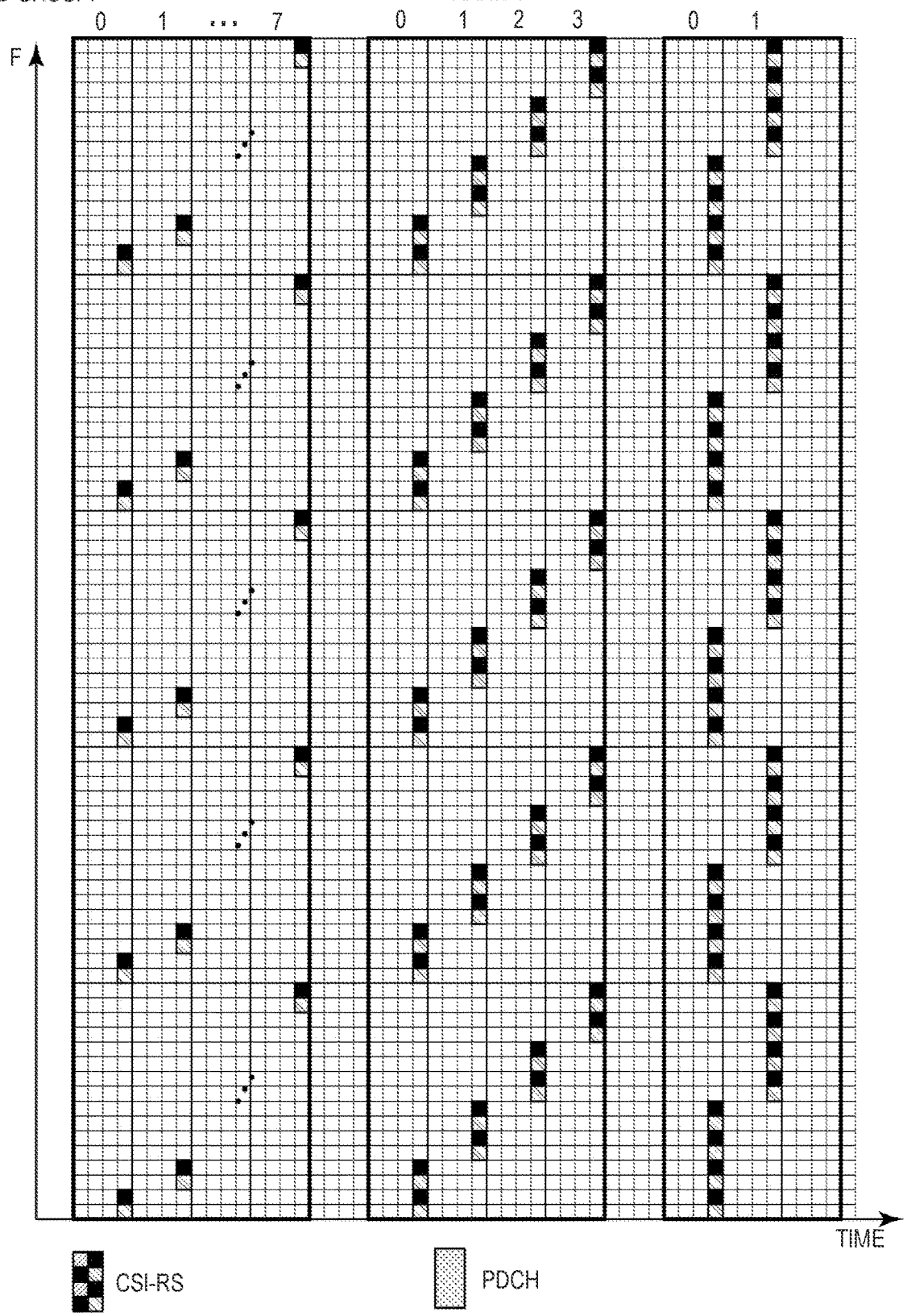
FIGS. 63A and 63B show CSI-RS groups, sub-groups, and example configurations.
Figure 63B:
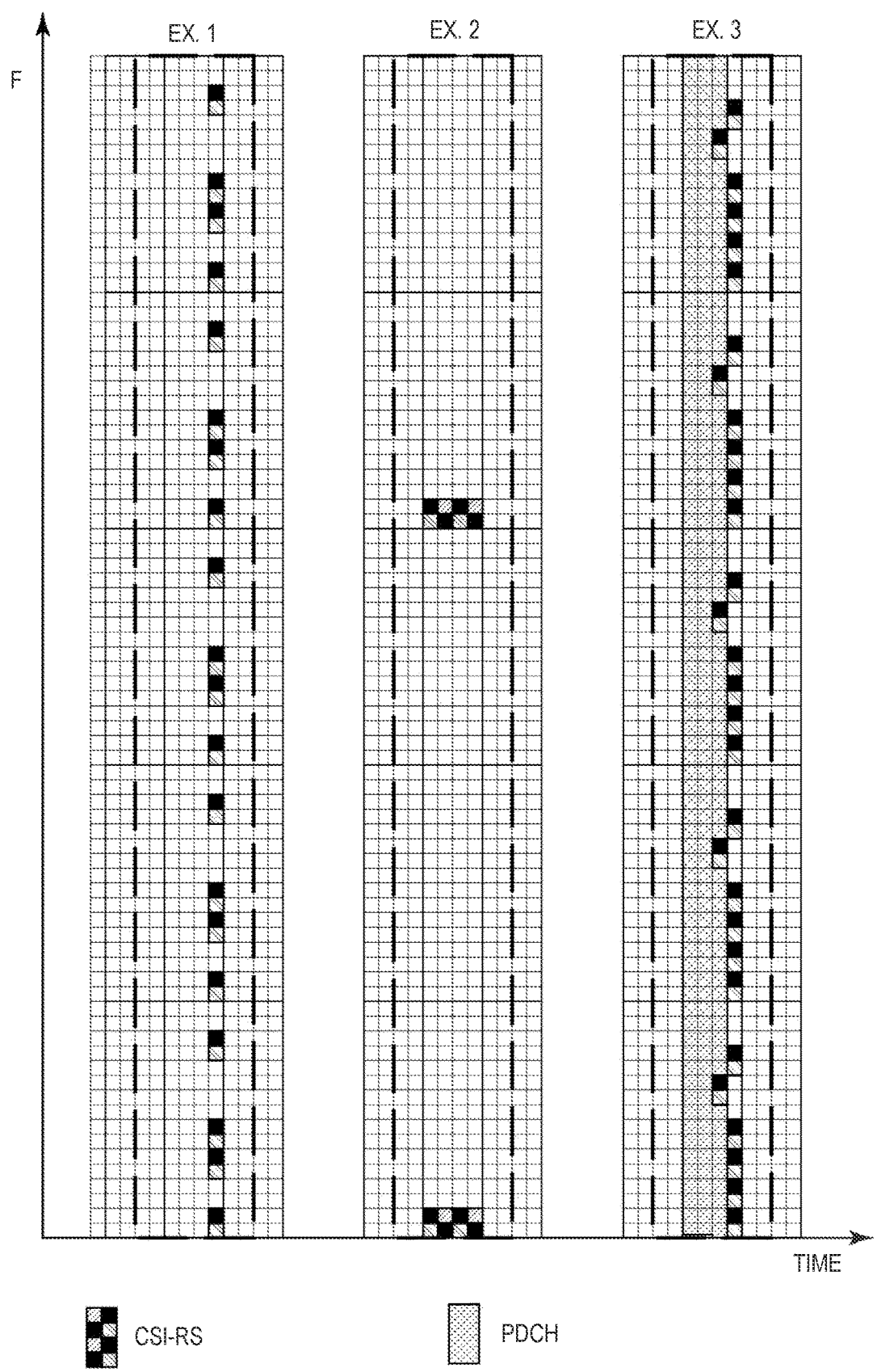

In some cases, not all of the above estimation purposes needs to be handled by CSI-RS. For example, frequency offset estimation can sometimes be handled by DL-DMRS, beam-discovery is sometimes handled by BRS. Each CSI-RS transmission is scheduled and can be in the same frequency resources as a PDCH DL-transmission or in frequency resources unrelated to the PDCH DL-data transmissions. In general, no interdependence between CSI-RS in different transmissions can be assumed, and hence the UE should not do filtering in time. However, a UE can be explicitly or implicitly configured to assume interdependence between CSI-RS, for example, to support time-filtering of CSI-RS measurements (e.g., in 2 above) and also interdependence to other transmissions including PDCCH and PDCH. In general, all UE filtering shall be controlled by the network, including filtering of CSI in time, frequency and over diversity branches. In some transmission formats, CSI-RS is situated in a separate OFDM symbol to better support analog beam-forming both for base station TX and UE RX. For example, to support UE analog beam-scanning (item 5 above) the UE needs multiple CSI-RS transmissions to measure on in order to scan multiple analog-beam candidates (4 in Example 2 in FIGS. 63A and 63B).

CSI-RS are grouped into sub-groups related to the possible reporting rank of the UE measurement. Each sub-group of CSI-RS represents a set of orthogonal reference signals that can use code multiplexing; only a limited set of highest ranks is supported in this fashion e.g., 2, 4 and 8. Multiple sub-groups within a group are created by assigning orthogonal sets of resource elements to the sub-groups. Measurements within a sub-group is for good correspondence with D-DMRS and separate resource elements is used to better support measurements on non-serving beams. The main enabler for allowing CSI-RS to fulfill requirements 1 to 6 above is to support flexible configuration of CSI-RS. For example, frequency offset estimation is enabled by configuring time repetition. The usage of CSI-RS or DMRS for frequency offset estimation is also possible. The CSI-RS groups and sub-groups design should allow efficient multiplexing of UEs with different configurations. Consider in FIG. 63B the three examples:
  In Example 1, the UE is measuring on 3 CSI-RS sub-groups; 1 of rank 4; and 2 of ran k 2;
  In Example 2, the UE is configured with 4 consecutive identical resources, e.g., to support requirement 5 but sub-sampled in frequency domain;
  In Example 3, the UE is rate matching around the CSI-RS sub-group on the first OFDM symbol containing CSI-RS but not around the 2 sub-groups on the second OFDM symbol containing CSI-RS.

2.3.6.6 Positioning Reference Signal (PRS)

In order to support a flexible framework for positioning, the PRS can be seen as a potentially UE specific configuration of a reference signal. The PRS convey an identifier associated to a node or a set of nodes, or a beam, while also enabling time of arrival estimation. This means that other signals, such as SS, TSS, BRS, etc., can fulfil some requirements of the PRS. Furthermore, the PRS can also be seen as extensions of such signals.

For example, based on FIG. 62, a PRS can be configured as the TSS/BRS of symbol 0 for one UE, while another PRS can be configured as TSS/BRS of symbols 0, 1, 2 (same BRS in all three symbols in time) for another UE. At the same time, the TSS/BRS of symbol 0 is used for time synchronization and beam finding by other UEs.

2.3.7 Reference and Synchronization Signals, Uplink

Section summary: Physical random access channel (PRACH) preamble is constructed by concatenating several short sequences, each sequence being of the same length as an OFDM symbol for other NX UL signals. These short sequences can be processed using the same FFT sizes as other UL signals thus avoiding the need for dedicated PRACH hardware. This format also enables handling of large frequency offsets, phase noise, fast time varying channels, and several receiver analog beamforming candidates within one PRACH preamble reception.

Uplink synchronization signal (USS) is used to obtain UL synchronization. The design is similar to PRACH but it is not contention-based, and is used for timing estimation and beam reporting in uplink after initial access by SS and PRACH, e.g., at handover between nodes and carriers. This timing estimation is desirable due to UE specific round trip time depending on distance between UE and base station, such that a timing advance command can be sent to the UE.

Reciprocity reference signals (RRS) are uplink reference signals and used to obtain CSI-R (receiver-side CSI) and CSI-T (reciprocity based transmitter-side CSI) at the base station but also for UL demodulation; thus, they can be viewed as a combination of SRS and DMRS. To avoid pilot contamination, a large number of orthogonal reference signals are required. If RRS are also used for UL channel estimation in non-reciprocal setups a renaming of RRS is likely.

TABLE 10

UL reference and synchronization signals in NX

| Signal | Purpose |
| --- | --- |
| PRACH preamble | Initial transmission of UE. Contention-based such that the PRACH preamble should be detected with high reliability. Timing and receiver beam estimation. |
| Uplink synchronization signal (USS) | Used for uplink time and frequency synchronization and indicating of best downlink beam. |
| Reciprocity reference signal (RRS) | Used to estimate the UL channel and to set the DL pre-coding in the transmitter in reciprocity-based MIMO. |
| Demodulation reference signal (DMRS) for PUCCH | Demodulation reference signals for PUCCH |

2.3.7.1 Physical Random Access Channel (PRACH) Preamble

Random access is used for initial access for a UE including timing-offset estimation at the base station. The random-access preamble should thus be detected with high probability and low false-alarm rate by the base station while at the same time providing accurate timing estimates.

The numerology used for the PRACH preamble is specified in AIT.

The computational complexity of FFT (Fast Fourier Transform) processing in an OFDM based receiver is large with a large amount of receiver antennas. In LTE release 8, FFTs of different sizes are used for user data and random-access preambles, requiring dedicated FFTs to be implemented for random-access reception. (Even LTE PRACH preamble which is defined with a dedicated (very large) IFFT can be received at the base station with signal processing procedures only requiring standard physical channel FFTs, at the cost of a small performance penalty.)

Figure 64:
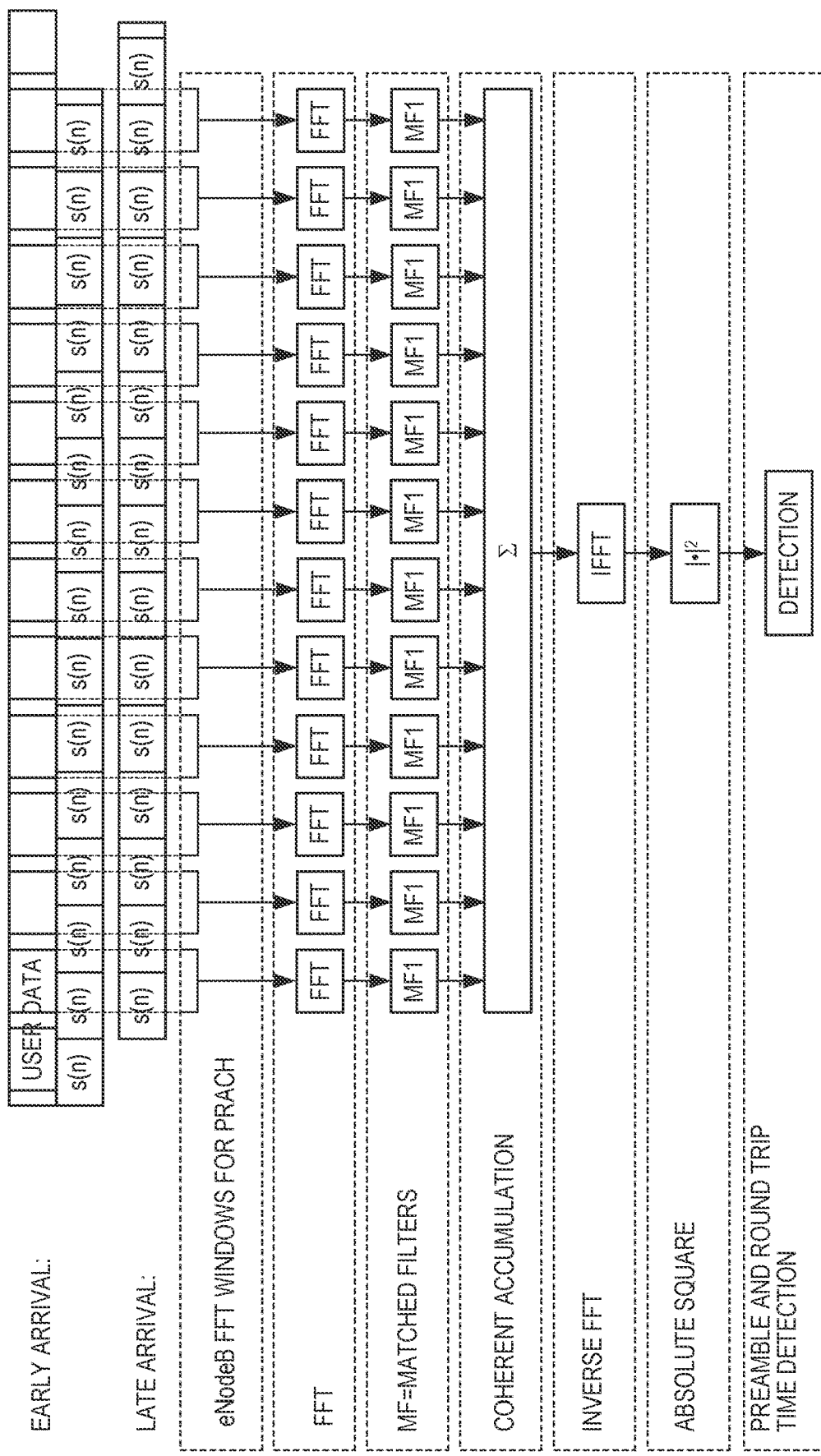
FIG. 64 illustrates a preamble format and detector with long coherent accumulation.

Within NX, a 5G random-access preamble format is used, based on a short sequence of the same length as the length of the OFDM symbols that are used for other uplink physical channels, such as user data, control signaling, and reference signals. The preamble sequence is constructed by repeating this short sequence multiple times. FIG. 64 illustrates the preamble format and a detector with long coherent accumulation.

A preamble detector with FFTs of the same size as for other uplink channels and signals can be used. In this way, the amount of special random-access related processing and hardware support is significantly reduced.

As example, twelve repetitions of the short sequence are coherently added within the receiver structure of FIG. 64. However, a receiver can also be designed in which only a few repetitions are coherently added before the absolute square operation followed by a non-coherent accumulation. In this way a receiver can be constructed which is robust against phase noise and time varying channels.

For analog beamforming, the beamforming weights can be changed during preamble reception such that the number of spatial directions is increased for which preamble detection is done. This is done by analog beamforming before FFT, and only including those FFTs in the coherent accumulation for which the same beamforming is used. Here, the coherent accumulation is traded against beamforming gain. Also, with shorter coherence accumulation, the detection is more robust against frequency errors and time varying channels. The number of available preamble sequences is reduced when reducing the length of the sequence, as compared to the very long sequence used for PRACH preambles in LTE release 8. On the other hand, the use of narrow beamforming in a 5G system reduces the impact of interference from other UEs. Other possibilities for avoiding congestions on the PRACH preambles include use of frequency shifted PRACH preambles, and the use of several PRACH frequency bands and several PRACH time intervals.

The receiver structure illustrated in FIG. 64 can be used for detection of delays up to the length of one short sequence. A somewhat modified receiver structure is desirable where some additional processing is added for detections of large delays due to large distances between UE and base station. Typically, more FFT windows are used after and before those illustrated in FIG. 64, with simple detectors of the presence of short sequences in those additional FFT windows.

2.3.7.2 Uplink Synchronization Signal (USS)

The UE needs uplink time synchronization when changing access node or carrier frequency resulting in changed numerology. Assuming that the UE is already time synchronized in downlink (by MRS), the timing error in uplink is mainly due to propagation delay between the access point and the UE. Here, a USS (uplink synchronization signal) is proposed with a similar design as PRACH preamble, see section 2.3.7.1. However, USS is not contention-based as in contrast to the PRACH preamble. The transmission of USS is thus only done after a configuration from the base station that the UE should search for MRS and respond with USS.

Figure 65:
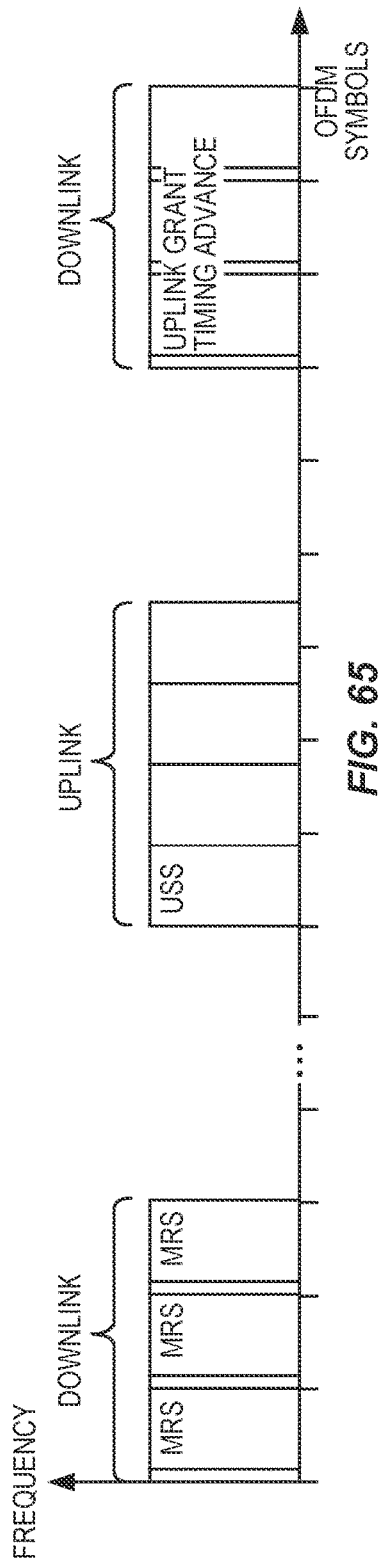
FIG. 65 illustrates USS in relation to MRS and uplink grant including timing advance.

FIG. 65 illustrates USS in relation to MRS and uplink grant including timing advance USS is intended for uplink timing advance calculation, uplink frequency offset estimation, and UL beam identification. The UE might also select USS sequence depending on OFDM symbol for best MRS. In this way the access point gets information of best downlink beam.

The time and frequency allocation of USS can be done by higher layer signaling from the node transmitting system access information. Alternatively, a mapping is defined between BRS sequences to a "count-down" number until USS resource. In this case, different BRS sequences are used in different OFDM symbols. The UE then gets the position of the USS windows by detecting BRS sequence. If mixing of numerologies is supported the numerology used for USS is specified in the configuration/grant of USS.

2.3.7.3 Reciprocity Reference Signal (RRS)

Reciprocity reference signals are transmitted in uplink and are primarily targeting massive-MIMO deployments that can benefit from radio channel reciprocity; see Section 3.4.3.3. The most common use case is TDD operation, but for extensive MU-MIMO in UL, RRS is useful even if full reciprocity cannot be assumed. In the uplink, RRS is intended to be used both for coherent demodulation of physical channels and for channel sounding as part of CSI-R acquisition at the base station. It can be noticed that CSI-R acquisition does not rely on reciprocity and is thus representative for both TDD and FDD. In the downlink, CSI-T is extracted from coherent (uplink) RRS, thereby mitigating the need for explicit CSI feedback based on downlink reference signals when channel reciprocity can be assumed. The RRS used for coherent demodulation is precoded in the same way as data/control. RRS used for sounding can be transmitted in subframes carrying uplink physical channels (as in LTE) as well as in subframes specifically designed for sounding only.

Pilot contamination is seen as a major performance degradation source in massive-MIMO and occurs when a large number of overlaid received reference signals are non-orthogonal. Non-orthogonality in uplink can stem from reuse of reference signal sequences among UEs or received reference signals arrive outside the cyclic prefix due to uplink transmissions synchronized to other base stations. The RRS design provides a large number of orthogonal sequences or at least with very low mutual cross-correlation. It might be beneficial to use cyclic prefix that also accounts for pilot transmissions originating from neighbor cells (trade-off between additional cyclic prefix overhead vs. pilot contamination). Orthogonality between RRS sequences is obtained via: (i) equally spaced cyclic time shifts, (ii) use of orthogonal cover codes (OCC), and (iii) of "transmissions comb" (a.k.a. interleaved FDMA).

The transmission bandwidths of RRSs in the system vary with UL/DL scheduling demands among users as well as being dependent on uplink transmit power limitations. Hence, the RRS design needs to handle a vast number of RRS multiplexing scenarios in which orthogonality should be preserved among users/layers to avoid pilot contamination. In LTE, the sequence length of e.g., an UL DMRS directly relates to the uplink scheduling bandwidth which requires either equally long sequences (and thus equal scheduling bandwidth) or relying on OCC for orthogonality among reference signals. Imposing same scheduling bandwidth is thus not attractive, and relying only on OCC is not sufficient for obtaining a large number of orthogonal reference signals. Instead of letting the base sequence lengths be associated with the scheduling bandwidth, one could concatenate narrowband RRS sequences such that the overall RRS bandwidth is a multiple, or a sum, of narrowband RRSs. This implies piecewise orthogonality over the whole RRS bandwidth. One may in addition to concatenating narrowband RRSs also use transmission combs as a mechanism to preserve orthogonality when, e.g., RRS sequences originates from base sequences of different lengths.

Note that when the UE has more RX antennas and also is capable of applying UL beamforming, RRS beamforming may be applied to boost the received energy and help the base station to achieve a better channel estimation. This, on the other hand, would result in that the base station estimates the "effective" channel including the UE beamforming.

Figure 66:
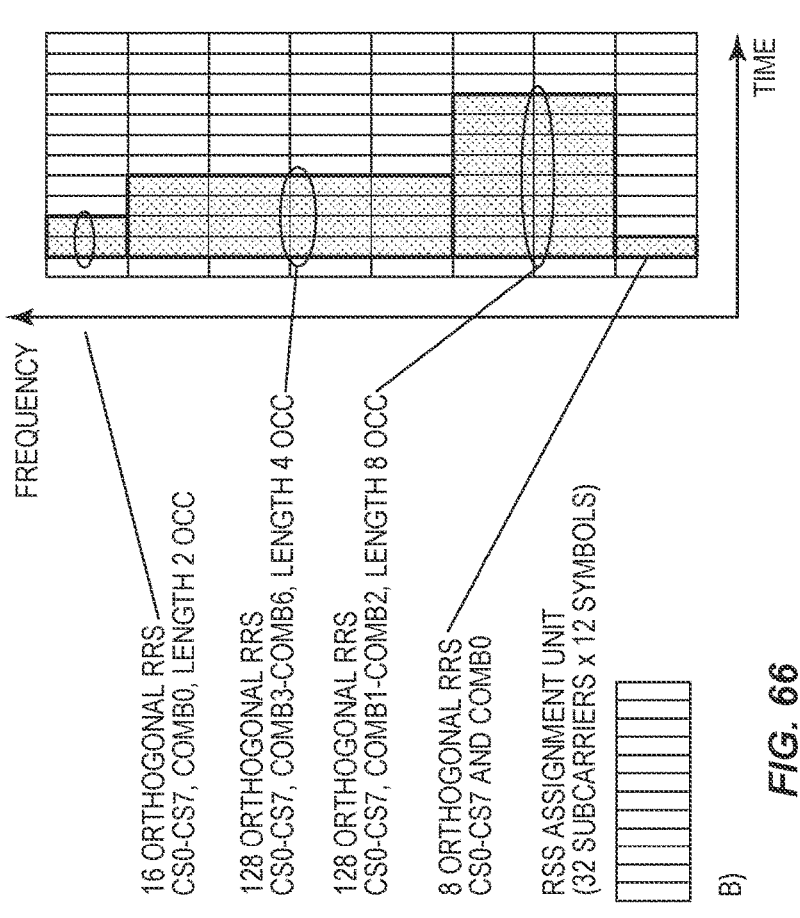
FIG. 66 illustrates comb schemes and a RRS design example.

FIG. 66 shows an example of how to implement multiple orthogonal RRS across different portions of the system bandwidth using a combination of cyclic shifting, transmission combs, and OCC. FIG. 66a shows different transmission combs. The right-hand side of FIG. 66b shows different OCC used in different bandwidth locations; in the upper part an OCC of length 2 is used, in the second part of length 4, etc.

Numerology of RRS is specified in the configuration/ grant of RRS.

2.3.7.4 Demodulation Reference Signals (DMRS) for PUCCH

With the use of an OFDM structure for uplink transmissions, the RS can be frequency multiplexed with data. To enable early decoding reference signals should at least be sent in the first OFDM symbol of PUCCH, for multi-symbol PUCCH formats additional reference signals in later symbols might be needed as well. Since PUCCH is always transmitted in the last OFDM symbol(s) of a subframe, PUCCH transmissions from different terminals interfere if they use the same frequency, e.g., inter-cell interference or multi-user MIMO interference.

2.3.8 Reference and Synchronization Signals, Common

Section summary: PDCH has its own set of demodulation reference signals (DMRS). Orthogonal DMRS are realized via a combination of orthogonal cover codes (OCC) and mapping DMRS sequences to transmission combs.

TABLE 11

| Reference and synchronization signals in NX common for DL and UL | |
|---|---|
| Signal | Purpose |
| Demodulation reference signal (DMRS) for PDCH | Demodulation reference signals for PDCH DL and UL |

2.3.8.1 Demodulation Reference Signal (DMRS) for PDCH

DMRS is transmitted both in DL and UL multiplexed with a physical channel and serves the purpose of demodulation of PDCH transmissions.

Figure 67:
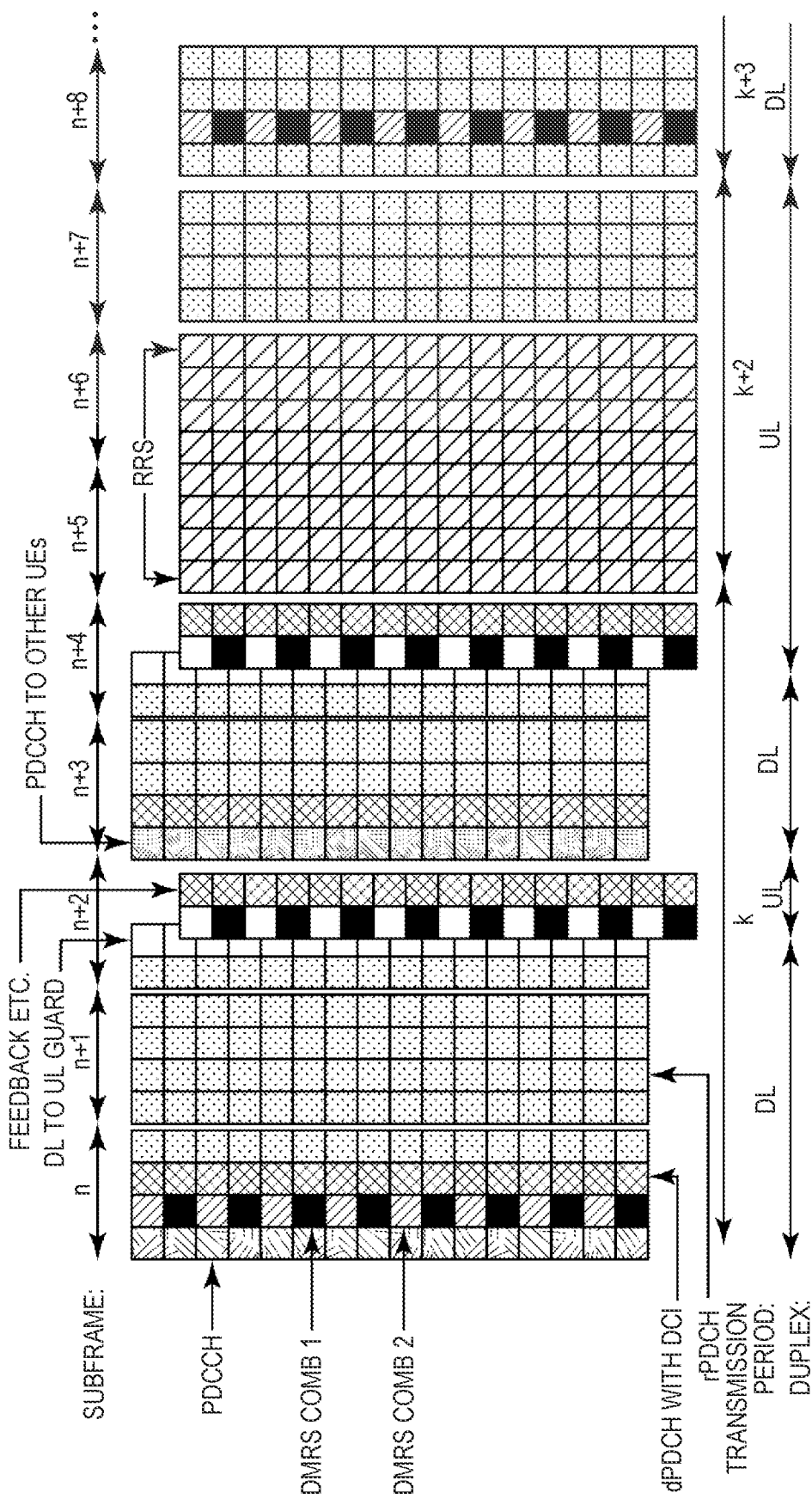
FIG. 67 provides a schematic view of DMRS on a small-scale perspective.
Figure 68A:
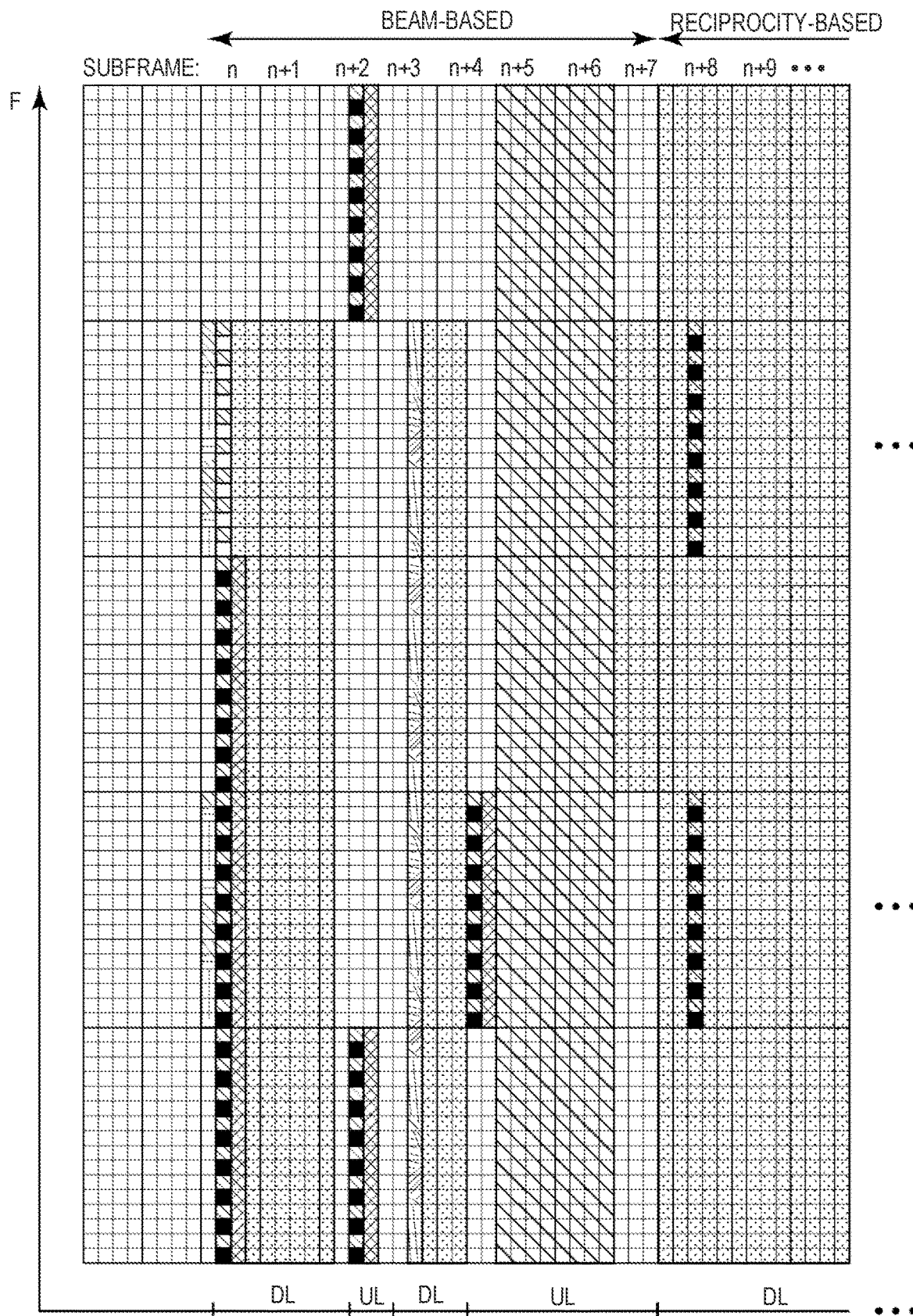
FIGS. 68A and 68B provide a schematic view of DMRS on a large-scale perspective.
Figure 68B:
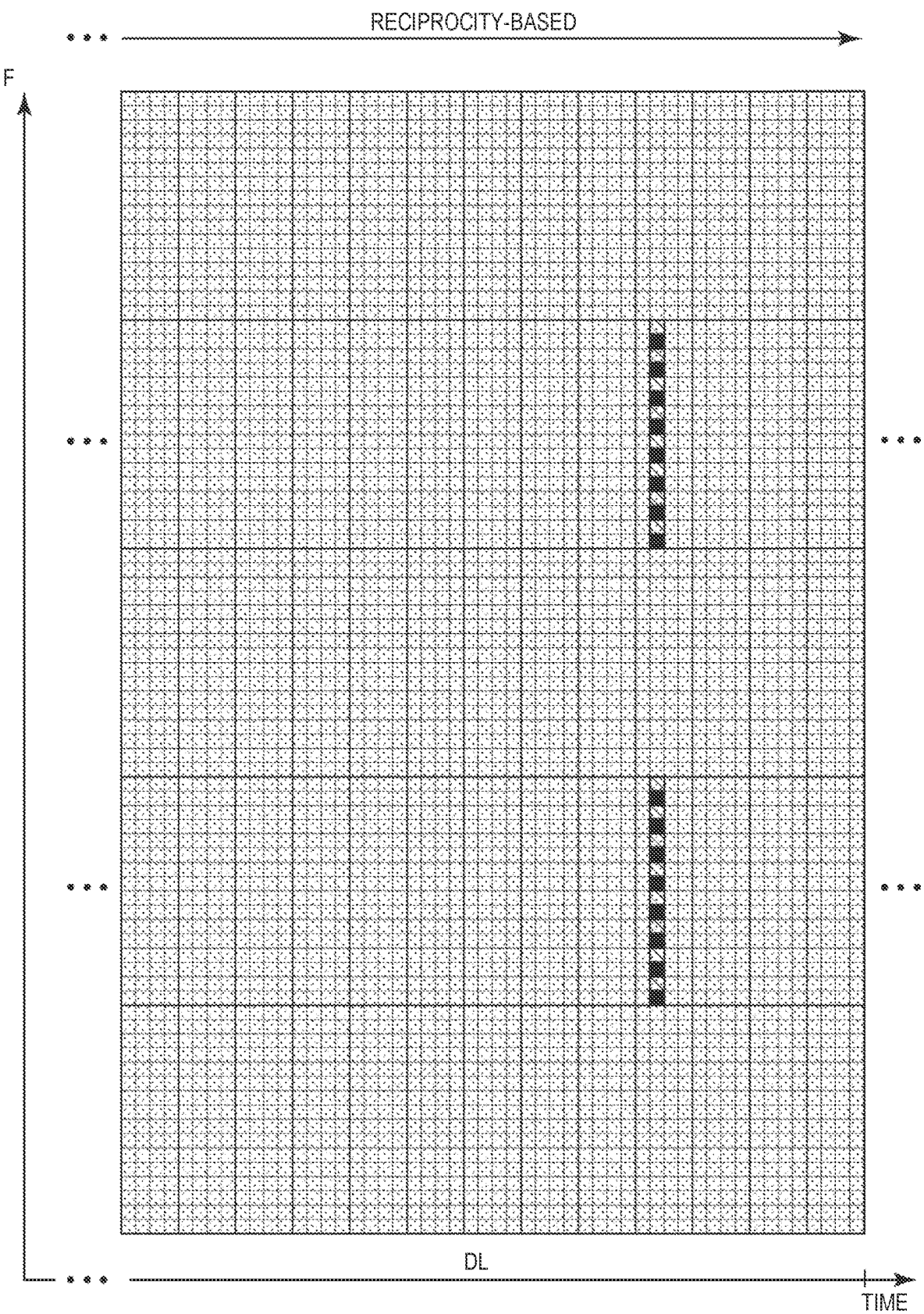

In UL, DMRS is sometimes not needed when RRS is present—e.g., see UL data transmission in subframe n+7 after purple RRS in subframes n+5 and n+6 in FIG. 67—but it is anticipated that for very small messages and in beam-based transmissions (see Section 3.4.3.2), DMRS is still preferable. FIG. 67 shows a schematic view of DMRS on a small scale perspective with the first 9 subframes for a single UE. FIGS. 68A and 68B show a large scale view of the same subframes. In the first beam-based period shown in FIGS. 68A and 68B, limited CSI is used to precode DMRS and data but in the reciprocity-period rich channel knowledge is used for advanced precoding of DMRS and data. Additional details are provided in Section 3.4.3.3. Physical mapping to resource elements depends on the transmission format.

Any initial subframe PDCH will contain DMRS, but later subframes in a subframe aggregate may not contain DMRS if DMRS based channel estimates from a previous subframe are still valid for demodulation. For example, see subframes n and n+3 in FIG. 67. DMRS are configured UE-specific, but a set of users can share the same configuration to enable e.g., broadcast. In aggregated subframes the UE may assume that precoding is not changed and interpolation may be done within a subframe. Orthogonal DMRS are created using orthogonal cover codes in frequency and in some case cover codes are also used in time. Two examples when time cover codes are desirable is for fine frequency offset estimation and for extended coverage. It is assumed that the cover codes are optimized for the use-case that a transmission is from a single transmission point. The cover codes can also be mapped to comb-structures, on different combs different sets of cover-codes are used with low-cross correlation properties. Different combs are anticipated when large scale channel properties can vary (including frequency offset). The available orthogonal DMRS can be used both for SU-MIMO and MU-MIMO. DMRS in different beams are not necessarily orthogonal but rather rely on spatial separation and low cross-correlation properties between the DMRS sequences in different sets of orthogonal DMRS.

If PDCH has multiple transport blocks the DMRS are shared, for example, dPDCH and rPDCH use the same DMRS but are associated with different transmission formats, for example, diversity for dPDCH and spatial multiplexing for rPDCH. For PDCH, the DMRS are transmitted with sufficient density early in a subframe aggregate or in UL early in relation to a duplex switch (in some cases in a previous transmission period) to support early demodulation and decoding. In time, DMRS are transmitted in different subframes according to the coherence time, e.g., repeated for longer transmissions and/or high mobility users. Repetition can also be needed to track time/frequency drift in hardware. In frequency, the DMRS are repeated in resource blocks according to the effective coherence bandwidth and the targeted DMRS energy density. Observe that effective coherence bandwidth increases due to channel hardening when using reciprocity—see last DL transmission in FIGS. 68A and 68B, as well as the discussion in section 3.4.3.3. In such cases, it is expected that DMRS in DL can be sparser than in cases where RRS are not present. The repetition is typically explicitly signaled in relation to the number of subframes in the TTI, or in some cases implicitly for shared pre-allocated channels.

3 Technologies and Features

The prime purpose of this section is to describe how to use the functions, procedures, channels, and signals described in Section 2 to realize NX features. However, new functions, procedures, channels, and signals that have not been generally agreed may still be documented in this section. In some cases, new functions, procedures, channels, and signals are introduced as new technologies, and solutions are discussed here. Note that not all of these are necessarily implemented in a NX protocol stack.

3.1 Low Latency and High Reliability

The purpose of this section is to describe how NX enables use cases requiring reliable real-time communication, with a special focus on challenging critical MTC (C-MTC) use cases.

3.1.1 Background and Motivation for Reliable Low Latency

A range of 5G machine-type communication (WC) use cases, such as smart grid power distribution automation, industrial manufacturing and control, intelligent transportation systems, remote control of machines, and remote surgery, are characterized by the need for communication with high requirements on latency, reliability, and availability. We normally refer to such use cases as mission-critical MTC use cases (C-MTC), which is in line with the vision of the International Telecommunications Union, which refers to C-MTC as "ultra reliable and low latency communication."

Low latency is also desirable to support high end user throughput for TCP based applications which has, e.g., been the main argument for latency reduction in LTE. This is, however, expected to be handled well with the baseline NX design as described in Chapter 2, and is not discussed further in this section.

3.1.2 Requirements and KPIs

Latency

For the latency discussion over the NX radio interface, this section refers to the RAN User plane latency (or short RAN latency), as defined in section 4.2, unless otherwise mentioned. The RAN latency is the one-way transit time between an SDU packet being available at the IP layer in the user terminal/base station and the availability of this packet (protocol data unit, PDU) at IP layer in the base station/user terminal. User plane packet delay includes delay introduced by associated protocols and control signaling assuming the user terminal is in the active state.

Most delay sensitive use-cases can be supported with a RAN latency of 1 ms, but there are a few examples of one-way latency requirements of 100 us, e.g., in factory automation. NX is designed to support a one way RAN latency of 200 us.

The application end-to-end delay (defined in 4.2) is most relevant, since this includes the delay caused by core network nodes. Aspects affecting the application end-to-end delay are discussed in section 3.1.11.

Reliability

The reliability of the connectivity (defined in section 4.3) is the probability that a message is successfully transmitted to a receiver within a specified delay bound. The reliability requirements for C-MTC applications vary greatly. Requirements on the order of are typical for process automation; requirements of 1-1e-6 are typically mentioned for automotive applications and automated guided vehicles. For industrial automation use cases several sources mention requirements of 1-1 e-9 but it should be understood that this value comes from specifications derived from wired systems and it is unclear if such strict requirements apply to systems designed for wireless connectivity.

It is assumed here that most C-MTC applications can be supported with a reliability of but NX is designed to provide reliability in the order of 1-1e-9 for extreme applications. The strictest requirement is only foreseen in localized environments (e.g., a factory) with controlled interference levels.

Service Availability

Many services requiring reliable low latency communication also require high service availability (defined in section 4.3). For a certain reliable-low-latency service—e.g., a pair of reliability and latency bound—a service-availability can be defined as to what level the reliability-latency is provided in space and time. This can be enabled by corresponding deployment and redundancy of the network. Architectural aspects related to service availability are discussed in section 3.1.11.

3.1.3 Numerology and Frame Structure

NX contains several different OFDM subcarrier bandwidths (see Section 2.3) spanning the frequency range from sub-1 GHz to 100 GHz, with increasing subcarrier bandwidth towards higher carrier frequencies. Numerologies with wider subcarrier bandwidths provide, in addition to increased robustness to Doppler and phase noise, also shorter OFDM symbol and subframe durations, which provide shorter latencies. As long as the cyclic prefix of the more wideband numerologies is sufficient, these numerologies can also be used at lower frequencies.

In wide-area deployments, numerology "16.875 kHz, normal CP" is preferably used with a subframe duration of 250 μs. This subframe duration is sufficient for many low-latency applications. For extreme demands on latency, even the numerologies "67.5 kHz, normal CP" or "67.5 kHz, long CP b" can be used. If a cyclic prefix of around 0.8 μs is sufficient "67.5 kHz, normal CP" should be used due to its lower CP overhead of 5.5%; for environments with larger delay spreads "67.5 kHz, long CP b" should be used.

In dense macro deployments "67.5 kHz, normal CP" can probably still be used (assuming low delay spread) enabling subframe durations of 62.5 us. If 250 μs is sufficient both "16.875 kHz, normal CP" and "67.5 kHz, normal CP" can be used, provided the frequency range allows for 16.875 kHz subcarrier bandwidth.

Even lower subframe durations (7.8 μs) are enabled by numerology "540 kHz, normal CP". Presently, there are no known use cases where such low subframe durations are required; furthermore, the small cyclic prefix of this numerology (0.1 μs) limits the deployment to very dense ones. Short subframe durations would open up the possibility of HARQ re-transmissions to increase reliability. However, it is expected that the typical operating point for C-MTC is such that code rates above 0.5 are used and thus the benefits of re-transmissions are limited.

TABLE 12

Summary of which numerology to choose in which deployment and the provided subframe duration

| | sub-1 to 6 GHz (low frequencies) | 6 to 30 GHz (medium freq.) | 30 to 100 GHz (high frequencies) |
|---|---|---|---|
| Wide-area | 16.875 kHz: 250 μs<br>67.5 kHz: 62.5 μs or 125 μs | 67.5 kHz: 62.5 μs | NA |
| Small cell | 16.875 kHz: 250 μs<br>67.5 kHz: 62.5 μs<br>540 kHz: 7.8 μs (very small cells) | 67.5 kHz: 62.5 μs<br>540 kHz: 7.8 μs (very small cells) | 540 kHz: 7.8 μs (very small cells) |

Choosing the right numerology has less impact on the reliability requirements (except that an application should use the correct numerology with respect to phase noise and maximum expected Doppler shift).

3.1.4 Synchronization in C-MTC

Synchronization plays a critical role when it comes to fulfil the desire in C-MTC for ultra-high reliability.

NX is based on a lean design where the transmission of broadcast signals like MIB/SIB or similar and synchronization signals are only transmitted when necessary. For NX, periodicity of synchronization channels is on the order of 100 ms. The sparse nature of synchronization signals may become critical to achieve the highest detection rates of up to 1-1e-9 in some C-MTC scenarios. This is due to the unavoidable time and frequency drift that occurs due to sparse synchronization signal pattern.

However, it can be shown that with a crystal oscillator (XO) having a time drift of 2 ppm (i.e., 2 μs-per-s) and the maximum frequency drift of 125 Hz/s @2 GHz band, synchronization accuracy is good enough for C-MTC by reusing SS. This applies to both the 16.875 kHz numerology and the 67.5 kHz numerology.

3.1.5 C-MTC Duplex Mode Implications

Focusing on the strictest reliability cases, with error rates down to 1e-9, the most challenging scenario to fulfill the latency requirements is for sporadic data where we assume that the UE does not have any UL grant, and therefore needs to transmit a scheduling request (SR), and receive a scheduling grant (SG) before commencing uplink transmission. Depending on the duplexing mode used, FDD or TDD, the C-MTC worst case latency will to some extent vary, as discussed below.

3.1.5.1 FDD

For use cases with the most challenging latency requirements Reference Symbols (RS) are transmitted in the first OFDM symbol to enable early decoding. In the case that strict processing requirements can be put on UE and eNB (see later section), the respective node's decoding of the scheduling request and grant messages can be made during some few micro seconds. Hence, the SR, SG and data can then be transmitted in three consecutive sub frames. Then, the worst case scenario is when the data to transmit arrives right after a sub frame have started, and hence the total RAN latency will be between 3 subframes (best case) and 4 sub frames (worst case). See the illustration of UL latency with SR-SG-Data cycle for FDD shown in FIG. 69. As seen in the figure, the Reference Symbol (RS) is transmitted in the first OFDM symbol in each sub frame (assuming 1 subframe=4 OFDM symbols, as in section 2.3.2.1) for enabling early decoding. Given the use of the 67.5 kHz numerology with a subframe length of 62.5 μs, this implies a RAN latency of around 187-250 μs. It is assumed here that the data is coded at sufficiently low rate so that no retransmission is needed.

So, from a latency perspective, using FDD is a good solution in frequency bands where FDD is available (e.g., sub 4 GHz).

Figure 69:
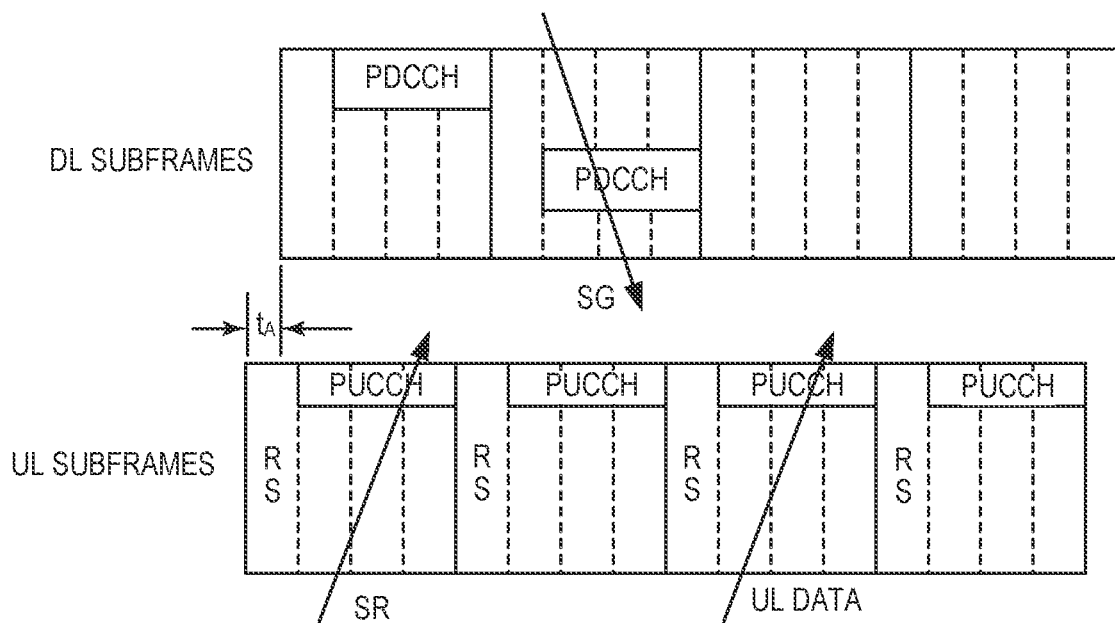
FIG. 69 illustrates uplink latency with SR-SG-data cycle, for FDD mode.

Note that FIG. 69 shows the UL latencies assuming that the PDCCH is spread over the whole subframe consisting of 4 OFDM symbols (see section 2.3.3). Note that where PDCCH is limited to the first symbol of a subframe, to allow early decoding, the total UL delay can further be reduced to 2 subframes (in best case), since the PDCCH is limited to the first OFDM symbol of the subframe allowing the transmission of data in the same subframe. This RAN latency should be seen as a technically challenging feature of NX as it requires that strict processing requirements can be put on UE and eNB. In other words, the SG needs to be processed in around 8 μs (less than OFDM symbol duration of 67.5 kHz numerology) as described in further sections below, requires premium devices and may not be achievable in MBB devices. Resulting delay for more relaxed processing times are presented in section 3.1.12.

3.1.5.2 TDD

Figure 70:
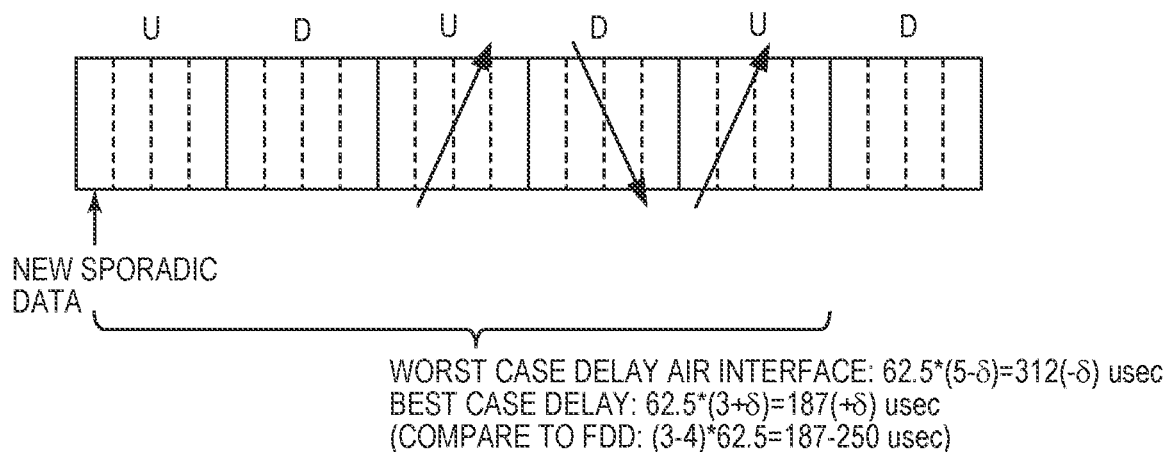
FIG. 70 illustrates latency for TDD.

Below is described the latency for a TDD configuration. The analysis takes into account the high reliability requirements of challenging C-MTC use cases. Hence, the analysis should be seen as a worst case analysis and in many scenarios (but probably not all) one probably can relax requirements like synchronized cells, etc. In TDD, the delay requirements may imply significant restriction on the TDD UL/DL structure. Again focusing on the worst case scenario with no UL grant for a UE and 67.5 kHz numerology, one can easily conclude that the UL/DL subframes need to alternate on single sub frame basis, and hence under these circumstances dynamic TDD could not be used. Then, the worst case delay is when data arrives at beginning of an UL sub frame. Again it is important to note that in cellular TDD, one can typically not start an UL transmission in a subframe where nearby C-MTC UE has DL reception. Therefore, the UE has to wait for next available UL subframe for the SR transmission. Then the total delay is 5 sub frames, 312 μs. The best case delay is when data packet arrives prior to next UL sub frame similar to the best case FDD, 187 μs. This is shown in FIG. 70, which illustrates latency for TDD. In this worst case example, a data packet arrives at the UE in beginning of a UL sub frame and therefore SR (first arrow) could be transmitted first in next available UL sub frame. Then SG and Data can be transmitted in forthcoming sub frames.

Figure 71:
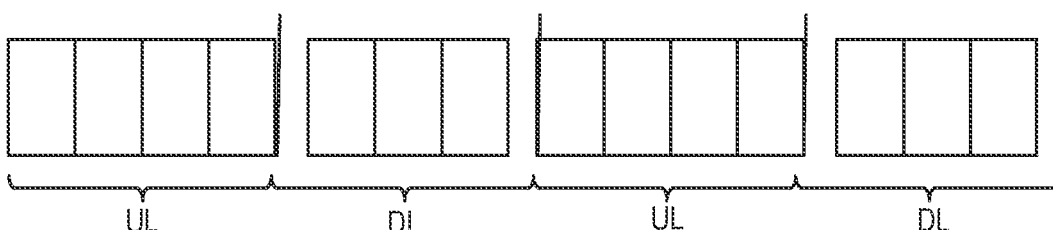
FIG. 71 shows switching overhead.

In TDD, time needs to be allocated for the UE to change transceiver settings between UL and DL. The need for alternating UL/DL on single sub frame basis may then imply a significant overhead in switching. However, by using the timing advance the overhead can be restricted to 1 UL OFDM symbol. This is shown in FIG. 71, which illustrates switching overhead and demonstrates that using TA, the switching time can be reduced to one UL OFDM symbol. Using that approach, around 8 μs for switching can be allowed, which is sufficient looking at current implementations requiring some 5-6 μs.

3.1.5.2.1 Implication of Worst Case C-MTC Requirements on TDD

The need for alternating between UL and DL for every sub frame implies a 25% capacity loss on the UL channel. Taking into account the "TDD 100 dB dynamic near-far problem" in a cellular deployment scenario together with the high reliability requirement for C-MTC, both intra and inter-frequency adjacent cells need to be synced and have the same UL/DL configuration. This might not be optimal from a Mobile Broadband capacity perspective point of view. Another approach is to only deploy the C-MTC applications with the toughest requirements (requiring down to 1e-9 error rate) in isolated cells or areas.

3.1.5.3 A Note on Processing Time

In order to be able to fulfill the short processing times needed for responses in adjacent subframes, different pre-processing principles can be used using the fact that the data packet transmitted in C-MTC is likely to be small as well as only a small finite set of packet sizes are allowed (only a finite set of messages to be transmitted with such strict latency requirements). Assume that the eNB as well as the UE has control of the current link quality and hence know what MCS to use, and only a small number (single) of MCS formats for a given data packet size is possible to choose for the NW node. Then, once the UE transmits a SR, it includes the data packet size in the message. Furthermore, the UE can prepare a finite set of possible MCS formats and once the SG is decoded (indicating which f/t resources to use), the UE can transmit the correct version in these resources without further coding delay. The same can be done in eNB. Once the SR is received it allocates the resources needed based on data packet size information and already determined MCS and transmits the corresponding SG. Using this kind of preparing/pre-coding approaches we expect that one can fulfill the coding and decoding time requirements needed for the C-MTC timing constraints.

3.1.6 Coding and Modulation

C-MTC applications need robust modulation and coding as well as fast decoding to fulfill the latency requirements. In order to achieve the latency for the most demanding use cases, C-MTC applications may have to disable HARQ and use very robust MCSs. Hence modulation order should preferably be low (e.g., QPSK). Furthermore, coding strategies allowing early decoding are desirable, hence convolution codes without interleaving might be a good choice not only from the early decoding possibilities but also as C-MTC packets are expected to be small, and hence the gain of using advanced coding principles, are limited (polar codes, which are currently the preferred approach to MBB in NX, may also be applicable for C-MTC). Another important enabler for fast and early decoding is to put reference symbols in the beginning of the subframe in order to be able to do channel estimation without buffering.

For less extreme reliability and delay requirements, it is likely that higher order modulation is beneficial.

3.1.7 Diversity

Diversity is considered to be an important enabler of ultra-reliable communications. Large diversity orders (e.g., 8 or 16 for the strictest reliability requirements up to 1-1e-9) are desirable to allow acceptable fading margins in case of fading channels, such as Rayleigh channel. Theoretically, this diversity could be achieved in the time, frequency, and/or space domain. In order to achieve ultra-reliable communication within the strict low latency budget, exploiting the time diversity is very challenging. On the other hand, to exploit the gains from frequency diversity, it is important to map the coded bits on the frequency resources having uncorrelated channel coefficients. Therefore, the required bandwidth would increase with the coherence bandwidth of the channel and thus make the exploitation of frequency diversity more bandwidth consuming. Therefore, antenna diversity is assumed to be the main option to achieve the required diversity order where feasible. It is also to be noted that in order to have a spatial diversity order of 16, 8 and 2 antennas could be considered at eNB and UE side, respectively. In device-to-device (D2D) transmission, it may not be feasible to achieve sufficient diversity gains with only spatial diversity due to limitations in the antenna design for the UE, frequency diversity could be used on top of it. In addition, D2D communication also benefit from increased link budget due to proximity of devices. Moreover, to harvest the full transmit diversity gains, more advanced space-time codes need to be used rather than the Alamouti-code. Alamouti-codes achieve full transmit diversity only up to 2 transmit antennas.

An extension of antenna diversity is macro-diversity, where antennas are not co-located but distributed in space. This requires fast connectivity between different reception points if delay is critical. In a more general case, one can consider serving applications with high demands on reliability over multiple carriers or even RATs.

Diversity for data and control channels is further discussed in sections 2.3.3.2, 2.3.4.1, and 2.3.5.1.

3.1.8 HARQ

For the most latency sensitive C-MTC services, it is expected that the latency requirements prohibit the use of HARQ, and that successful decoding is required in a single transmission attempt. Accordingly, the HARQ functionality may be disabled for such applications. For services where HARQ feedback would be possible from a latency perspective, the gains from HARQ are still limited. Since many C-MTC services have no interest in "average latency," but only the latency at a given percentile, link adaptation needs to ensure reliability is met after the maximum number of retransmissions allowed by the latency budget. This may often end up being a format that is hard to decode earlier; for good SINR there is little motivation to use code rates below ½, meaning that decoding is possible first after half the transmission.

The potential gains with HARQ depend also on whether SINR can be adapted by changing transmission bandwidth. For uplink, only limited gains are expected if the bandwidth can be reduced, and with that the SINR improved. However, for downlink or uplink cases where there are limitations on the power spectral density, where the code rate needed to meet the error-target is very low, significant resource efficiency gains can be expected from HARQ operation. To benefit from the reduced average resource utilization, scheduling needs to be sufficiently fast to utilize the "freed up" resources for other services.

It is recognized that the HARQ feedback also need to be robust for NACK-to-ACK errors down to the given reliability target, and even lower for multiple transmissions and it also needs to meet this reliability at a significantly lower latency bound than for the application itself. This can challenge the coverage of HARQ feedback and make it costly, especially considering relatively small expected data sizes for C-MTC. The HARQ mechanism and considerations of the control channels are discussed in section 2.2.8.

Figure 72:
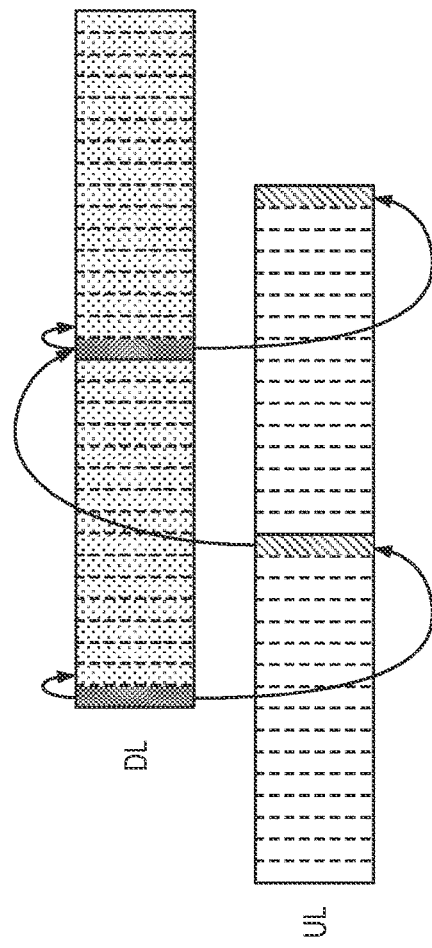
FIG. 72 shows an example where fast HARQ feedback is transmitted at the end of a first available uplink transmission occasion.

FIG. 72 illustrates an example where the fast HARQ feedback is transmitted at the end of the first available UL transmission occasion. In this example HARQ feedback is included in a single OFDM symbol.

It is expected that only the "very fast HARQ feedback" option in NX would be applicable for C-MTC, with significant energy allocation to the feedback to meet error requirements without having to set detection thresholds so that all HARQ gains are lost to ACK-to-NACK errors. With "very fast" feedback, where the feedback channel only spans a fraction of a subframe the round-trip time is expected to be 2 subframes, where a transmission can occur in every other subframe with stop-and-wait. For "early termination," continued transmission until ACK, one subframe will often be "lost". If predictive feedback is supported based on quality estimation on early pilots the feedback could even be sent before complete decoding. This scheme may not be suitable in case of very strict reliability requirements.

3.1.9 MAC Access Schemes for C-MTC

NX C-MTC MAC design is based on the L2 design principles as described in Section 2.2.1, and exploits the NX PHY framework. Several C-MTC MAC options, which could be selected flexibly depending upon the scenario, are described here. The design modularity provides the possibility to plug-in different MAC components and functionalities in order to more address specific use-case requirements. In order to meet the desired QoS demands such as the latency bounds and reliability requirements, each of the C-MTC MAC options has its characteristics and tradeoffs in terms of resource requirements and resource utilization.

In particular, the C-MTC MAC design includes (i) dynamic scheduling, (ii) instant uplink access and (iii) flexible contention-based access (hybrid access) schemes. MAC schemes for C-MTC in D2D have so far not been studied explicitly. Dynamic scheduling is considered as a baseline case, where the benefits of NX PHY (e.g., shorter and variable TTIs) can be exploited for fulfilling low latency and high reliability demands. The dynamic scheduling option suits to sporadic data traffic, where grant to resources is given by a base-station upon scheduling request from a node for a single transmission. For each required data transmission, the resource grant needs to be obtained from the base-station. Depending on the scenario-specific QoS expectations and availability of resources, a base-station has the possibility to prioritize sporadic real-time data over other traffic types.

The Instant Uplink Access (IUA) scheme uses over-provisioning of resources for uplink data transmission. This MAC option sacrifices resource utilization in favor of latency reduction, which is desirable for C-MTC applications. Since a node does not need to explicitly obtain a grant from the base-station for an upcoming sporadic data transmission, IUA eliminates the delay involved in the cycle of requesting for a resource and the base-station assigning the resource. The hybrid access scheme uses both scheduled and contention-based access principles, and is designed to exploit the flexibility in selecting the resources and frame structures offered by NX PHY. In the hybrid access scheme, the base-station reserves prior resources for periodic real-time and non-real-time traffic. Moreover, depending upon the availability of resources and expected sporadic traffic at a given time, the base-station can flexibly assign both contention-based and scheduled resources to nodes. The base-station can even re-configure the assigned resources when required, e.g., take away assigned resources to non-real-time traffic and reserve them for real-time traffic. If the traffic load is low, contention-based access can be fairly efficient in terms of resource utilization efficiency, and thus can efficiently handle sporadic traffic. However, contention-based access has the downside of its non-deterministic behavior. Therefore, in this MAC option, the base-station needs to manage radio resources for contention-based and scheduled access in a way that real-time traffic requirements of very low latency and high reliability can be satisfied. The above mentioned C-MTC MAC schemes are described in Section 2.2.9.

3.1.10 D2D Aspects

Device-to-Device (D2D) communication protocols for NX (see section 3.11 for further details) are designed to support proximal communications in in-coverage, partial coverage and out-of-coverage scenarios for a large variety of use-cases, including mobile broadband, as well as mission-critical use-cases such as V2X and factory automation.

For the mission-critical use cases, the application requirements associated with reliability, availability and latency may be more easily met by taking advantage of direct D2D communication than without D2D capability. This is because in case of infrastructure-based communication, every data packet between devices, even if the devices are in each other's proximity, is involved in one UL and one DL transmission. This may not always be the optimal path in terms of latency compared to a single radio transmission along the direct path between the nearby devices. Furthermore, network coverage or capacity may not always be guaranteed for the mission-critical communications. Therefore, sidelink integration may help network provide higher availability by avoiding potential dimensioning bottlenecks where the infrastructure may become a single point of performance degradation or a potential failure. Note that the reliability gain with D2D due to fewer communication links may be partly offset by lower diversity order for the sidelink.

Some C-MTC applications need to be operated in out-of-coverage scenarios, e.g., some automotive scenarios. Then, D2D communication may be the only path seamlessly available in both in-coverage and out-of-coverage situations.

In case of in-coverage scenarios (e.g., factory automation), network-assistance for D2D plays an important role to reduce interference between devices and infrastructure; as well as to improve the spectral efficiency by enabling the reuse of resources. Furthermore, the network can further assist the devices for device discovery and mobility.

To realize the potential latency gains by means of direct D2D communications, RRM functions (see section 3.11.7.8 for further details), are provided in a hybrid centralized-distributed fashion between the network and the devices depending on the scenario and service. These RRM functions may include mode selection, resource allocation and power control, and jointly ensure that radio resources are made available for coverage extension as well as mission critical services.

To have robust transmissions against unexpected interference in case of distributed RRM, reliable channel codes with low-error floor (e.g., convolutional codes) may be used. Smart retransmission mechanisms (e.g., HARQ), may be used if it is possible to do retransmissions within the latency bound.

To further protect the sidelink transmissions from interference, both the network-assisted (slow) and non-assisted (fast) RRM procedures need to be implemented with robust interference management and co-ordination mechanisms for the unicast, multicast and broadcast D2D communication channels.

To cope with the dynamic radio network environment due to mobility, diversity could be an important aspect for mission-critical communications, which can be provided in different forms such as antenna-diversity, frequency-diversity, time-diversity (see section 3.1.7), and, in case of D2D, also in mode-diversity (involving cellular mode and D2D mode for proximal communications). On the other hand, these diversity methods may not always be available:

The latency requirement may be a limiting factor to utilize time-diversity.

The frequency diversity could be limited due to frequency allocation and radio capabilities.

D2D links may be restricted to lower diversity order due to the fact that typically a smaller number of antennas are available at a device compared to a network node.

Depending on the network coverage, the mode diversity, where both infrastructure-based (Uu interfaces) and D2D (PC5 interface) connectivity can be used, may be limited to the control plane or not available at all.

All in all, NX D2D is seen as a complementary enabler for low latency when the right tools are used, thanks to shorter communication distance, fewer transmission links (hops), as well as high reliability by means of enhanced Layer 1 and Layer 2 functionalities e.g., for redundancy, interference management and coverage extension.

3.1.11 RAN Architecture Aspects

This section describes architectural aspects related to achieving low latency, high reliability and high availability on a system level.

Need to Support Distributed Functionality:

In order to support e2e latencies down to 1 ms or below, it is required to support deployment of application servers close to the radio access, sometimes referred to as mobile edge computing. Light in an optical fiber travels around 200 km in 1 ms so in order to achieve guaranteed one-way latency between say a controller in the network and a wireless actuator/sensor, the controller application needs to be located much closer to the radio than 200 km (also taking into account additional delays coming from switching, HW-i/f, fiber not deployed in a straight line, etc.). Deploying the application servers close to the radio also means deploying the core network user plane functions such as mobility anchoring close to the radio.

For the low latency and high reliability use cases, it is interesting to be able to deploy both user plane and control plane functions close to the radio network. The distributed user plane functions are motivated by the need for low latency, while the distributed control plane functions could be motivated by the need for stand-alone operation even if the connection to external networks is broken.

Using Distributed Cloud and Network Feature Virtualization (NFV) to Distribute Functionality:

In the 2020 time-frame, it is expected that future core network functions as well as most application level functions will be supported on general purpose processing HW and be deployed as virtualized network functions. Virtualization makes it easy to distribute these functions out in the network using a distributed cloud platform based on general purpose HW. NX supports such distribution of both core network and service layer (e.g., application services) functionality, which enables low latency connections between sensors, actuators and controllers.

It is also possible to support critical and low latency services in a separate logical e2e network slice, (see section 1.1 for a description of network slicing), which is optimized for reliable and low latency service (e.g., support distributed functions). This network slice shares the same physical network as say a MBB slice, but can still be better than the MBB to handle critical traffic. In this case, mechanisms need to be in place that handle the sharing of resources between slices and provide isolation. In many cases, network slicing is envisioned to use dynamically shared resource, but for critical slices it would also be required to assign some guaranteed (dedicated) transport network and radio resources to the slice to make sure that the performance requirement can be met.

Architecture Enablers for Achieving High Level of Reliability/Availability:

In addition to requirements on high reliability, some services require a high service availability even at times of node or equipment failure. Today typical critical MTC applications utilize two independent duplicated paths to ensure that the overall connection can cope with a HW or SW failure in one path. It is expected that similar concepts can be applied for critical MTC using NX.

Figure 73:
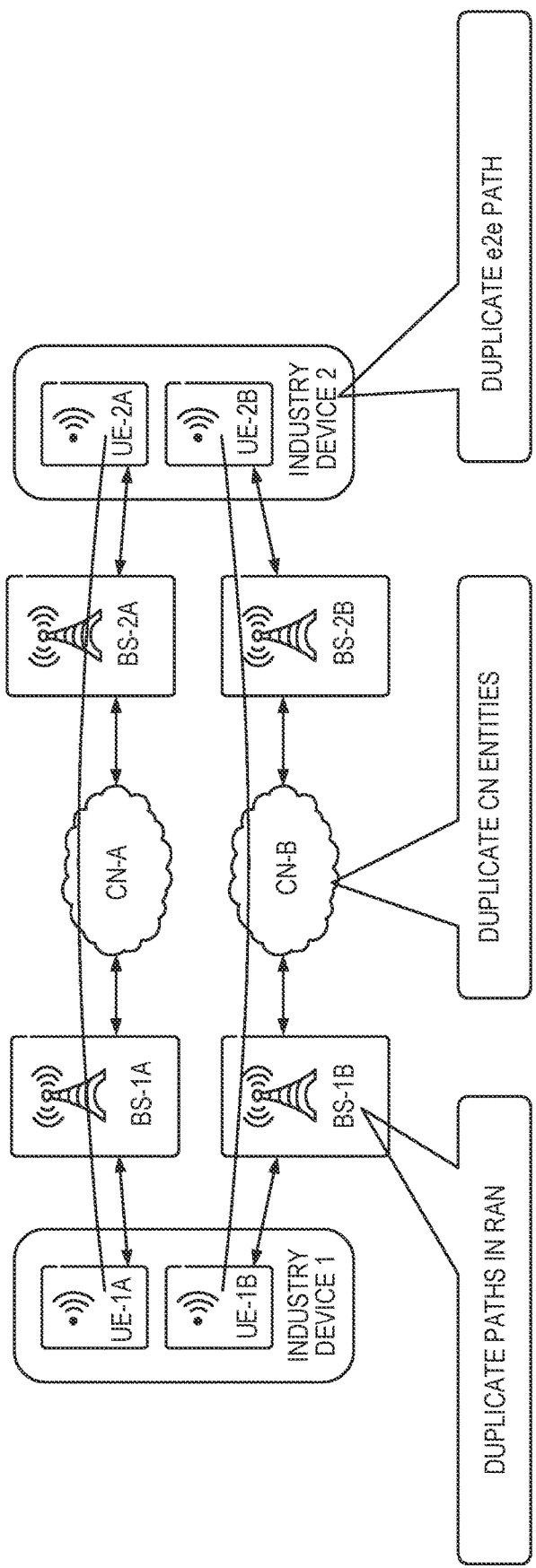
FIG. 73 shows duplicated end-to-end paths.

FIG. 73 illustrates the use of duplicate paths.

In addition to independent duplicated paths it is possible to achieve high node availability by replicating the UE context in multiple nodes to cope with HW boards failing or VM failures. Such methods are already in use today in our products.

3.1.12 Achievable Latency

The achievable RAN latency is summarized in this section. This section focuses on FDD which gives the lowest latency as discussed in previous sections. It should be noted that the end-to-end or application latency is longer and includes buffering, transport delay and processing delay in core network nodes.

3.1.12.1 Uplink Latency

The achievable uplink user plane latency for NX is shown for scheduled transmission in this section. With an aggressive assumption on processing time (8 μs) it is possible to transmit scheduling request (SR), scheduling grant (SG) and data in consecutive time slots. This can be seen as the technology potential for premium devices with strict latency requirements and is in line with the numbers described in section 2.1.5.1. With a more relaxed assumption on the processing requirement (several tens of μs) there is a one-subframe delay until the following message in the sequence is transmitted. The exact processing time is then not important as long as it does not exceed one subframe. This is assumed to be possible also for mainstream MBB devices.

The steps involved and the latency required for each step can be seen in FIG. 74, which shows uplink RAN latency for dynamic scheduling. When no retransmissions are used, the resulting latency is 4 subframes for strict processing requirements and 6 subframes for relaxed processing requirements.

When HARQ retransmissions are used, each retransmission adds an additional 2 subframes (strict processing requirements) or 4 subframes (relaxed processing requirements).

The schemes Semi Persistent Scheduling, Instant Uplink Access and Predictive Prescheduling result in very similar latency. In all these schemes, the scheduling request-grant cycle is omitted and a scheduling grant is available when data arrives. Details of these schemes are given in section 2.2.9. The steps involved and the latency required for each step can be seen in FIG. 75, which shows achievable uplink latency with Instant Uplink Access. When no retransmissions are used, the resulting latency is 2 sub frames both for strict and relaxed processing requirements. When HARQ retransmissions are used, each retransmission adds an additional 2 subframes (strict processing requirements) or 4 subframes (relaxed processing requirements).

The resulting uplink air interface latency for different numerologies and scheduling schemes is summarized in Table 13.

TABLE 13

Summary of achievable uplink RAN latency for different numerologies

| Sub frame duration | Scheduling Option | Optimal Processing | Relaxed Processing |
|---|---|---|---|
| 250 µs | Dynamic | 1 ms | 1.5 ms |
| 250 µs | Instant Uplink Access | 0.5 ms | 0.5 ms |
| 62.5 µs | Dynamic | 0.25 ms | 0.375 ms |
| 62.5 µs | Instant Uplink Access | 0.125 ms | 0.125 ms |

As can be seen, the one-way air interface latency target of 200 µs can be reached in uplink with the appropriate configuration.

3.1.12.2 Downlink Latency

For low latency communication it is possible to send a scheduling assignment for downlink data and the data transmission in the same subframe. The scheduling assignment is transmitted on the Physical Downlink Control Channel (PDCCH) in the beginning of a subframe and the data transmission can be done in the same subframe; see section 2.3.2.2.

When data is available for downlink transmission, the data can be transmitted in the next available subframe. This means that the worst case for the RAN latency in downlink is limited 2 subframes (500 µs for 250 µs subframe duration and 125 µs for 62.5 µs duration). The latency requirement of 200 µs can thus be met.

In a product implementation it is possible that 1-2 subframes need to be added for scheduling, link adaptation and processing, meaning that the strictest latency requirements may not be reached unless an optimized implementation is used.

3.2 System Access

This section describes functionality provided for users to access and properly operate in the system. The functionality provided to users may include one or more of:
  Providing devices with "system information"—In LTE networks, typically done by means of per-cell broadcast
  Paging—In LTE networks, typically done by means of per-cell broadcast over a multi-cell paging area
  Connection establishment—In LTE networks, typically targeting a certain cell
  Tracking—In LTE networks, typically handled by cell selection and reselection The term system access in this section refers to all signals and procedures enabling the UEs to access the system and to receive paging. In this section, the properties and solutions that are relevant for system access in NX are described.

In 3G and 4G systems, the transmission of these system access related signals are the main contributor to network energy consumption. There are two parameters that impact the network energy consumption more than any other: the amount of discontinuous transmission (DTX) (the maximum DTX ratio) that can be enabled and; the length of the discontinuous transmission intervals (the maximum sleep duration) that is supported. For NX, the system access functionalities are designed such that the DTX-ratio and the sleep duration of the network nodes are sufficiently large. In general, this could be interpreted as "the more DTX the better". But in practice, each node has some user-plane traffic also. In a typical node in LTE networks, active mode transmissions occur less than 10% of the time and if the mandatory transmissions are sufficiently below that, say 1% of the time, not much is gained by increasing the DTX ratio further.

In legacy systems, the interference caused by system access related signals significantly reduces the peak user data rates. In particular, at low system load the interference is dominated by the mandatory system transmissions (CRS-based signals in LTE) and thus limits the SINR.

System access related signals need to be omnipresent and static. It is not acceptable that a certain location has system coverage only sporadically, depending on how the system is currently configured. In legacy systems, this has often proved to be an obstacle to the use of dynamic optimization involving re-configurable antennas.

Since NX is based on supporting dynamic massive beamforming, NX is designed such that there is no coupling between the normal user- and control plane related signals and procedures and the system access related signals and procedures. Such a de-coupling is an important enabler for full dynamic optimization of the user-plane and control-plane signals related to a single UE.

In order to comply with the ultra-lean design principle of NX it is important that the NX system access functionality is as lightweight as possible, while ensuring reliable and fast access. Note that the fact that the system design is lean and supports long network DTX durations does not directly imply any additional access delay. If, for example, a downlink signal is transmitted every 100 ms or every 5 ms, the system can still be configured with a random access opportunity, e.g., every 10 ms, in which case the initial access delay would be the same.

3.2.1 Design Targets

The following subsections list some of the design targets considered for the system access.

3.2.1.1 Scalability

NX is designed to ensure that different parts of the system scale independently. For example, there should be no need to add more common-signals when densifying networks. In other words, it is possible to densify only the data plane and not the system access related overhead. The reason for densifying the network is most often a lack of capacity and not because random access or paging performance is not satisfactory, for example.

Furthermore, different sectors or beams associated with the same network node shall be able to share system access related functionalities such as system information. Also, CoMP clusters or C-RAN implementations involving several network nodes or antenna locations shall be able to use one single system access configuration that enables system access and paging functionality to the entire cluster. For example, if a group of nodes share the same system access configuration then a separate layer can be used for system access (possibly on a lower frequency).

It shall also be possible to have only one system access configuration for an entire network layer such that idle mode UEs only know how to access that layer without necessarily being aware of which node in the layer will respond to the network access.

Nodes that are added where system access functionality is already adequately provided can operate without transmitting any system access related signals. When adding additional frequency bands to an existing node, transmission of system access related signals on those frequency bands shall be optional.

The system access design shall support that system information broadcast may be transmitted using broadcasting transmission formats such as single-frequency network (SFN) modulation. It shall also be supported to transmit system information to the mobile terminals in a dedicated transmission format when that is more efficient. The amount of system information that is constantly broadcasted over the whole coverage area shall be minimized and primarily related to enabling initial system access.

3.2.1.2 Deployment Flexibility

The system should allow for massive deployment of low-power access nodes without excessive overhead cost. In very dense deployments supporting very high data rates (e.g., by means of large bandwidth and/or a large number of antenna elements), the individual nodes have no data to transmit or receive most of the time. Therefore, when calculating the overhead cost of the system access functionality it is important to not only use a fully loaded system as a reference, but also to calculate the overhead cost in a completely empty network.

3.2.1.3 Flexible to Allow for Future Radio-Access Evolution (Future-Proofness)

The initial discussions in 3GPP about 5G standardization currently assumed a standardization process in phases where the first release may not address all envisioned features and services. In other words, the new 5G air interface to be standardized in the initial release would need to be prepared for the introduction of new features and network functions that is difficult to predict what they are going to be since there could also be new requirements that are not yet being considered.

Some level of future-proofness has been already achieved in the LTE design, which can be acknowledged by the large amount of new features that were introduced, e.g., eICIC, CoMP, UE specific DMRS, relaying, MTC enhancements (incl. Cat 1/0), LAA, Wi-Fi integration, carrier aggregation, and dual connectivity, while still supporting multiplexing with legacy Rel-8 UEs. In addition to these features, 3GPP has managed to introduce new services to the LTE air interface, such as mMTC and V2X communication. During this process of introducing new features and services some lessons have been learnt and these have driven design principles to make the new 5G air interface even more future proof than LTE. Some of these principles, such as ultra-lean design and self-contained transmissions, have an important impact on the way system access (and mobility) procedures are designed since some of the common signals/channels used are broadcasted.

3.2.1.4 Enabling Superior Network Energy Performance.

Figure 76:
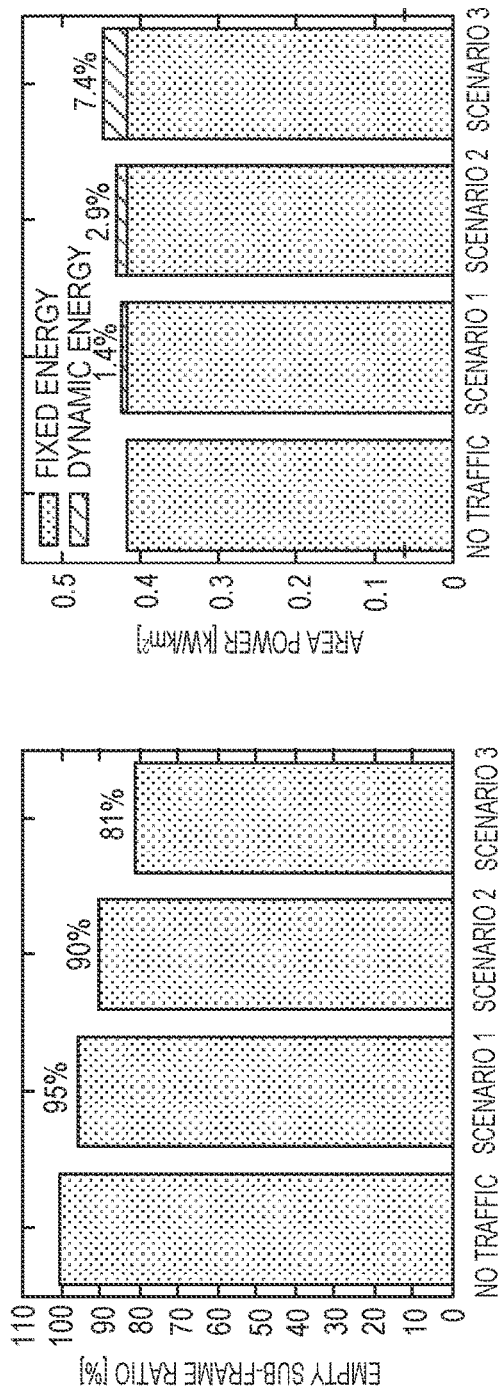
FIG. 76 shows LTE empty sub-frames for several scenarios and LTE energy consumption for the scenarios.

Using the EARTH energy efficiency evaluation framework ($E^3F$) we obtain the results in FIG. 76, which shows the empty sub-frame ratio and network area power usage in a typical European nationwide network, according to several scenarios detailed below:

Scenario 1: "the most relevant traffic scenario for 2015"
Scenario 2: "an upper bound on the anticipated traffic for 2015"
Scenario 3: "an extremity for very high data usage in future networks"

For a nation-wide network, the energy usage when averaged over 24 hours is almost independent of the traffic. Note that these results do not assume any densification of the network, so it is very unlikely that the relatively high dynamic energy part of 7.4% for Scenario 3 will be observed in a future network. Even though traffic is expected to increase significantly in the future the energy usage in legacy systems will still depend very little on the actual traffic in the network. There is a large potential to reduce the 5G energy consumption by designing a solution with lower static power consumption.

3.2.1.5 Enhanced Support for Massive Beamforming

Another topic considered when designing the NX system access functions was the recent developments in the area of advanced antenna systems and massive MIMO. As a comparison, the LTE-standard defines mandatory transmissions of cell-specific reference signals (CRS), primary and secondary synchronization signals (PSS and SSS) and physical broadcast channel (PBCH), and system information blocks (SIBs) via the downlink control and shared data channels (PDCCH and PDSCH). Looking at an "empty" LTE radio frame with no data it is evident that a large number of resource elements are used for these system level functions.

In previous cellular systems, there was an underlying assumption that cells are static and that they do not change their shape. This is a problem for the introduction of advanced and re-configurable antenna systems in these networks, since even such simple things as adjusting the tilt of an antenna cannot be done without affecting the coverage area of the network. The tight interconnect between system-access functions (such as random access and paging) and user- and control-plane functions is very often an obstacle for introducing any kind of fast antenna configurability in the network. Therefore, the usage of re-configurable antenna systems (RAS) in conventional networks is very limited.

Requiring mobile terminals to receive system access related signals and normal data- and control-plane related signals at the same time, on the same carrier, puts very high requirements on dynamic range in the UE receivers. System access related signals need to cover the whole area, while UE-specific signals may have a significant link-budget gain from beamforming. Thus, a power difference of 20 dB or more between these two kinds of signals is likely in some scenarios. Therefore, in NX the mobile terminals shall not be required to listen to system-access related signals at the same time as they receive data- and control-plane related transmissions from the network.

These targets should be balanced with the fact that it is beneficial to have harmonized solutions for both high frequency and low frequency bands so that the different bands are not like different systems from a lower layer perspective.

3.2.2 System Information Acquisition

A set of requirements on system information distribution is given in section 2.1.6.1. One way to address these and the design target to enhance the support of massive beamforming is to reduce broadcasted information in the system to a bare minimum. One approach is to broadcast only enough information that UEs need to send the initial random access to access the system, in the following referred to as access information. All other system information can be delivered to the UE using dedicated transmission with high-gain beamforming, or it can be broadcasted upon request by at least one UE. An extreme is to hard code a default configuration of the access information in the specification, in which case no broadcast of access information may be needed. The request could be sent using a default set of access parameters.

3.2.2.1 Contents of Access Information

Figure 77:
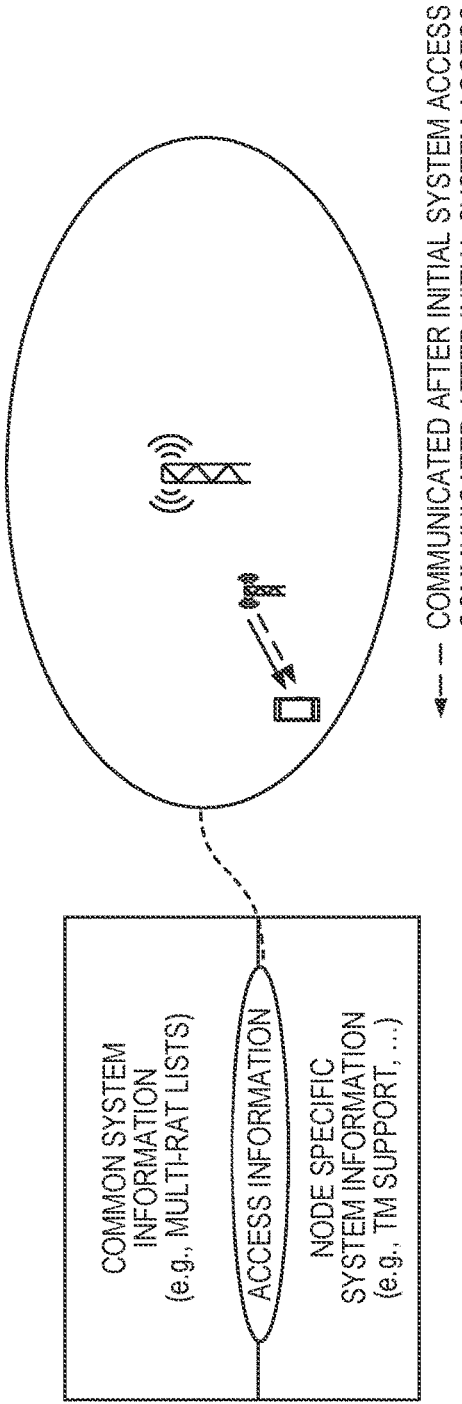
FIG. 77 shows access information distribution.

The design builds on the possibility to provide the main part of the NX system information on a per-need basis, allowing the reduction of the amount of always-broadcasted system information, and only including information needed to access the system, with node-specific and common system information delivered by dedicated transmission to the UE. This is shown in FIG. 77, which illustrates access information distribution.

The access information includes the random access parameters. These parameters include selected parts of the MIB, SIB1 and SIB2 information elements defined in LTE (e.g., PLMN Id, CSG, Q-RxLevelMin, Frequencybandindicator and Prach-configCommon). The exact content of the access information may depend on the effects of network slicing.

3.2.2.2 Index Based Access Information Distribution

Figure 78:
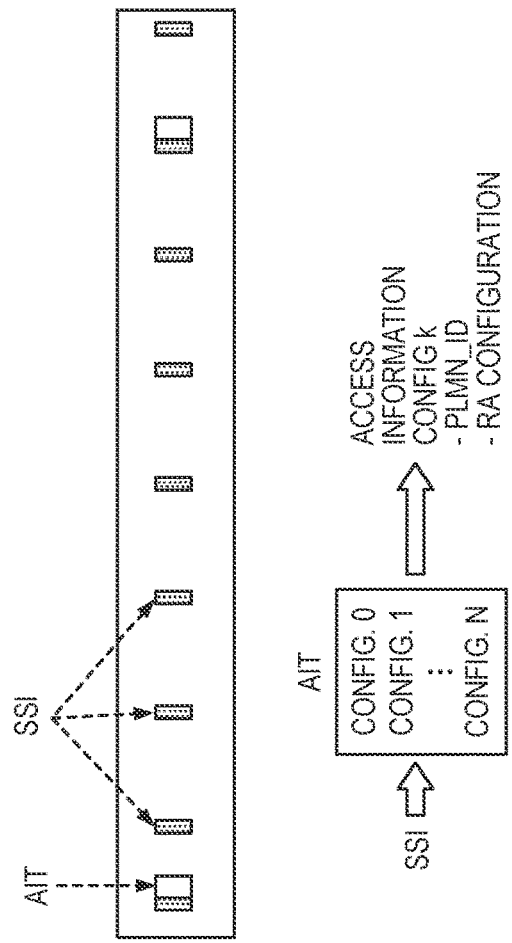
FIG. 78 shows access information table (AIT) and system signature index (SSI) transmissions.

A technique for minimizing broadcasted information provides a two-step mechanism for transmitting the access information, comprising an Access Information Table (AIT), containing a list of access information configurations and a short System Signature Index (SSI) which provides an index pointing to a certain configuration in the AIT, defining the access information. This is shown in FIG. 78, which illustrate Access Information Table (AIT) and system signature index (SSI) transmissions.

The content of the AIT is assumed to be known by the UE when performing a random access attempt. The AIT in the UE can be updated in one or both of two ways:
- A Common AIT (C-AIT) is broadcasted by the network, typically with a longer periodicity than the SSI e.g., every 500 ms or so. In some deployments the C-AIT periodicity may be the same as the SSI periodicity (e.g., in small indoor networks) and the maximum C-AIT periodicity may be very large e.g., 10 seconds in order to support extremely power limited scenarios (e.g., off-grid solar powered base stations).
- A Dedicated AIT (D-AIT) is transmitted to the UE using dedicated signaling in a dedicated beam after initial system access. The UE specific D-AIT may use the same SSIs to point to different configurations for different UEs. For instance, in the case of system congestion, this would allow to have different access persistency values for different UEs.

The SSI period is typically shorter than that of the C-AIT. The value is a tradeoff between system energy performance, UE energy performance (see section 2.1), and access latency in the event that SSI needs to be read before access.

3.2.2.2.1 Contents of the AIT

One benefit with the SSI&AIT concept is that the frequently transmitted SSI of limited size can be used to indicate the access information, signaled by C-AIT less frequently. C-AIT can also be transmitted on another carrier or received via LTE. This separation of the signals allows broadcasting the C-AIT on a longer time periodicity. However, the length of the SSI depends on the different Information Elements (IE) of the AIT and the number of needed SSI values to point out the different configurations. The gain is expected to be high if the AIT contains only a few IEs that are dynamically changing, with most values being static. On the other hand, if a majority of the IEs are changing dynamically, the size of the SSI grows, and the expected gain is less. This should be considered when selecting which IEs to include in the C-AIT.

An example of possible content of the AIT is illustrated in Table 14, where various combinations of such as basic system information and the random access related information elements are identified by the Signature Sequence Indices (SSTs). In this example, there is a header section of the AIT including also the Global time and PLMN Id. However, depending on the coverage of the AIT (see section 2.2.2.2.2) and the level of synchronization in the network, it may also be desirable to give additional SFN/timing information from each node to be accessed.

Depending on the number of SSI entries in the AIT, there is potentially a large degree of repetition in the content, and therefore compression of the AIT may be used to reduce the size of the signaled information. Current expectations are that a signaled size of 100-200 bits is sufficient for the AIT. The physical format of AIT is presented in section 2.3.

TABLE 14

Example of AIT content.
Global time
PLMN identity list

| | |
|---|---|
| SSI k | CSG = 0, Q-RxLevelMin = 12, Frequencybandindicator = 3, Barring info = 120, Prach-configCommon = 34 |
| SSI n | CSG = 0, Q-RxLevelMin = 14, Frequencybandindicator = 4, Barring info = 48, Prach-configCommon = 20 |
| . . . | . . . |

3.2.2.2.2 Delivery Options of C-AIT

Figure 79:
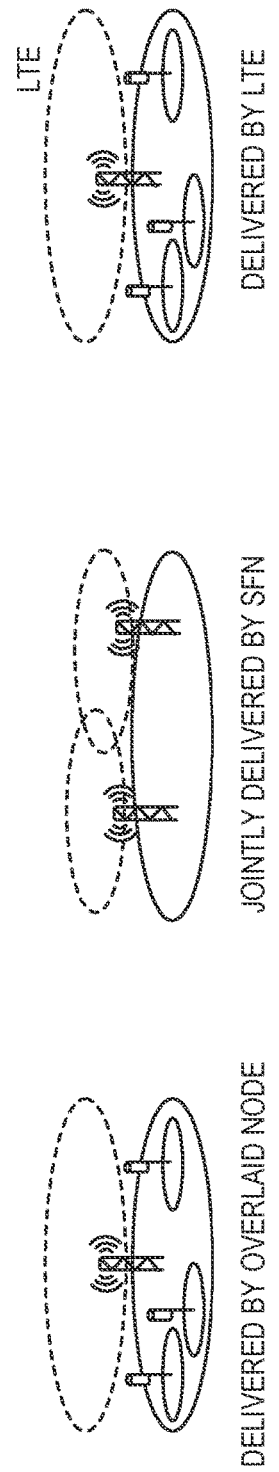
FIG. 79 shows AIT transmission methods.

The default delivery option for C-AIT is self-contained transmission in which all nodes transmit both C-AIT and SSI, with C-AIT entries referring only to themselves. However, there could be heavy interference for C-AIT reception within a synchronized network on the same frequency. To avoid C-AIT interference, C-AIT can be time-shifted in different networks. In addition to self-contained transmission, in order to support the design target on deployment flexibility, further delivery options for the C-AIT are possible. Some examples of AIT transmission methods are listed below, and illustrated in FIG. 79.

One overlaid node can be selected to distribute C-AIT, including the entries of all covered network nodes. Note that the same SSI entry may be included in neighboring C-AITs, containing the access information of nodes on the C-AIT border. SSI reuse planning is required to avoid confusion. The UE derives the timing, demodulation reference signal, and the scrambling required for receiving the AIT based on the SSI reception.

The payload size of C-AIT can be larger in the self-contained case since information of all nodes in the coverage area is included in the C-AIT. The coverage is limited by the selected node. It could be applicable for a scenario where C-AIT is transmitted at low frequencies with good coverage, to limit the need for broadcast transmissions from high frequency nodes within this coverage, which would only need to send the shorter SSI (and possibly a small AIT containing only a pointer to the AIT on the lower frequency band).

In the SFN transmission, the nodes in an area, which could be defined as 'C-AIT region', transmit the same C-AIT, including the number of entries of this area. Interference is reduced enabling higher spectral efficiency and coverage. In dense areas this SFN can be very large, and even in very large deployments this gives at least 4 dB additional SINR compared to sending separate AITs from each node.

In the case of LTE-NX tight integration, the C-AIT could also be delivered by LTE. It is also possible to hard code a few sets of default access parameters with corresponding SSIs in the 3GPP specification which are then universally applicable for UEs detecting such SSI. In this case C-AIT acquisition is not needed, and after initial system access, the UE can be provided with a D-AIT over dedicated signaling.

3.2.2.2.3 SSI Structure

The SSI contains a bit sequence, containing a pointer into the AIT and also a version indicator of the AIT. This pointer may be understood as an uplink access configuration index, as it is used as an index to the AIT, to obtain the appropriate uplink access configuration. The version indicator enables the UEs to verify that the AIT has not changed and that the related access information is still valid. The SSI may also provide information related to the demodulation and descrambling of the C-AIT.

3.2.2.2.4 SSI Block (SSB)

To support delivery of a payload of necessary information bits, an SSI Block (SSB) could be introduced and transmitted from nodes not transmitting the C-AIT and always follows a normal SSI transmission. The content in this block could be flexible to take the system information, which needs the same periodicity as SSI, such as "an AIT pointer" and "SSI payload". The AIT pointer is denoted as to indicate the time and band where the terminals can find the C-AIT and even the transmission format to avoid full blind detection. The SSI payload can be denoted as to deliver more bits than the sequences can, the SSI can be transmitted as a codeword in the block. Note that the other system information that is not feasible or sensible to include in the AIT could be also involved in the block, e.g., additional timing information for UEs waking up after long DRX (see section 2.2.4.3).

3.2.2.2.5 AIT Information Update

Different mechanisms can be used to ensure UEs always have an up to date AIT. Some alternatives are listed below on how AIT validity can be checked by the UE:

UE detects an SSI which is not included in its AIT
UE detects a change in the SSI version indicator
There can be a validity timer associated with the AIT
The network can signal AIT update through paging indication There may also be a need for the network to check that the UE has an up to date AIT. This could in turn be enabled by The UE calculating a checksum of its AIT and sending it to the network. The network checking the checksum to determine whether AIT update is needed.

The network may also store and maintain a mapping between different AIT check-sums and AIT content such that it is possible to retrieve an AIT that a UE is configured with based on receiving only the check-sum from the UE.

3.2.2.2.6 UE Procedure

Figure 80:
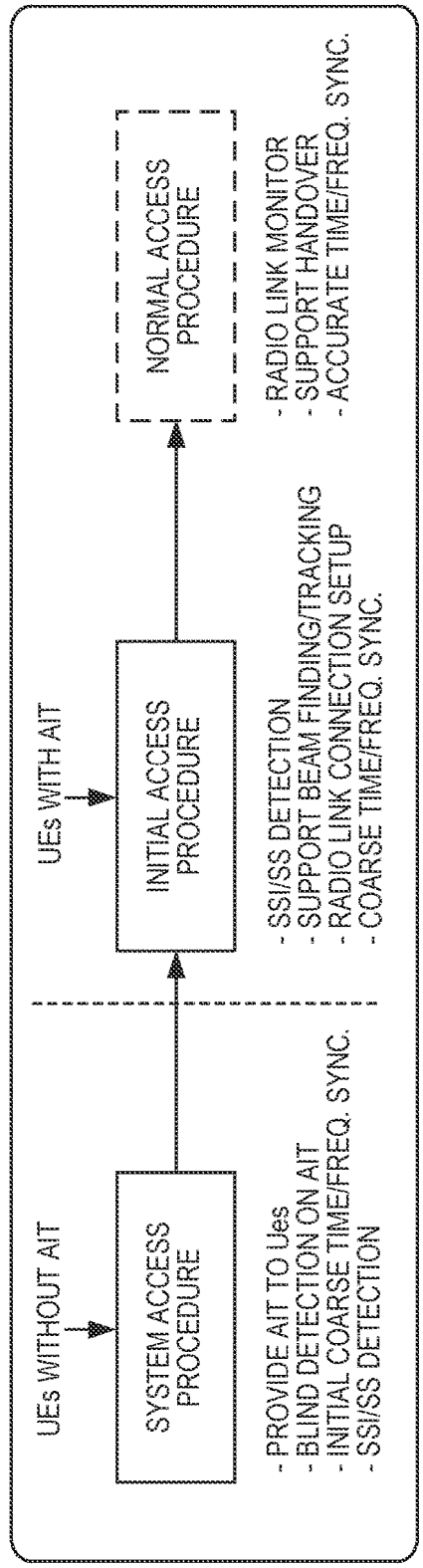
FIG. 80 shows initial random access procedures for UEs with or without AIT.

There are different L1 procedures for different UEs with different knowledge level on AIT, as illustrated in FIG. 80. The UEs without AIT would start the access procedure to obtain the periodical AIT to detect the PACH, as described in section 2.3, using the self-contained reference signals. Once having the AIT, the UEs can do initial access procedure after detecting the Signature Sequence (SS), which is mapped from the higher layer SSI as also described in Section 2.3.4.1. The relevant information for the initial random access is obtained from the AIT according to the SSI.

Figure 81:
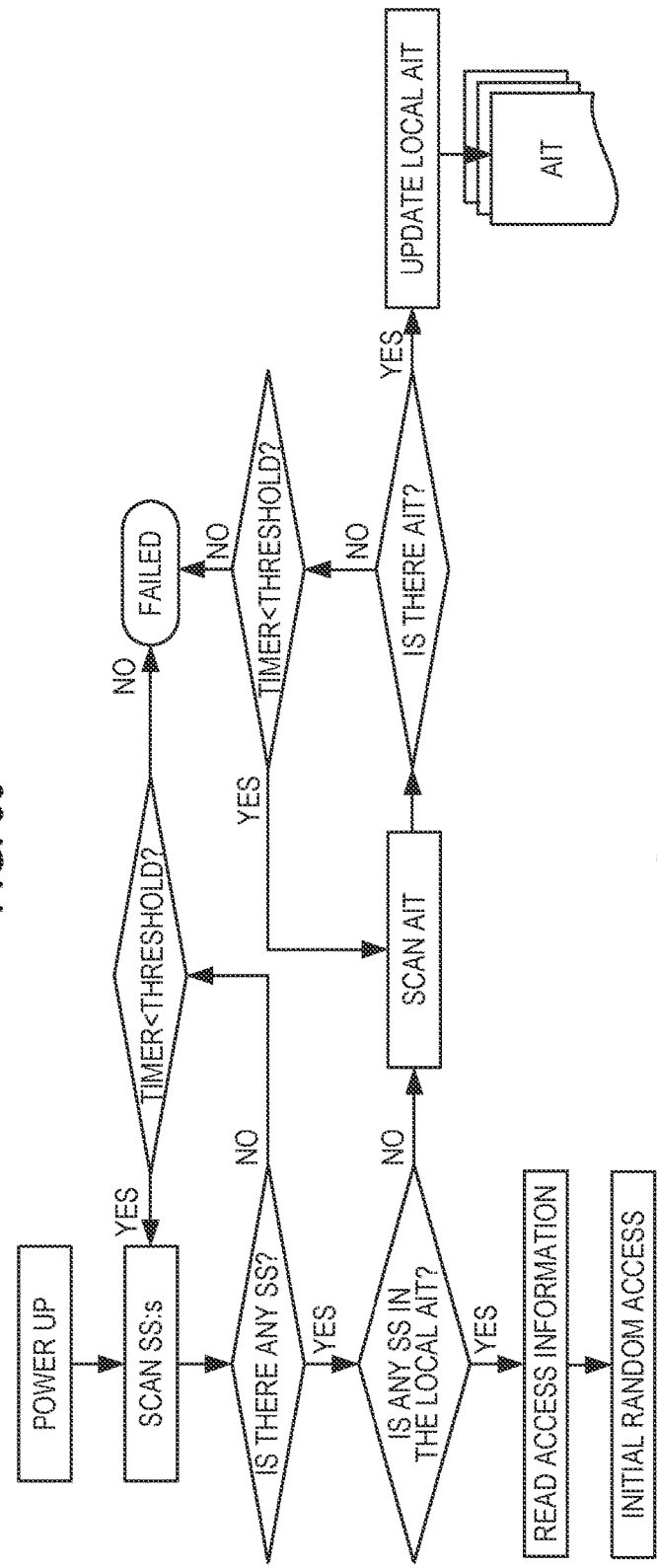
FIG. 81 is a process flow diagram illustrating UE behaviors before initial random access.

The initial random access procedure for a UE, with or without AIT, from the L1 aspect is shown in FIG. 81. The UE always scans SSIs to know about the serving coverage after power-up. Once detecting SSIs, the UE checks local AIT, e.g., determining whether or not any of them is in the table. In this step, the receiving power and synchronization can be obtained from the SSI detection. If there is no AIT, the AIT physical anchor channel (PACH) is monitored and detected. If there is an available AIT, the access configuration is read, for use with the following random access, according to the selected SSI.

3.2.2.2.7 Managing SSI Reuse and Uniqueness

Other considerations include ensuring uniqueness of the SSI, e.g., by managing reuse of SSIs in a network. A UE using the access information configuration of one SSI in one area, could access the same SSI in a different area where the SSI may have a different meaning e.g., point to a different access information configuration. Another consideration is how to manage PLMN borders, where a UE may read a SSI of another PLMN and try to access using wrong access information.

3.2.2.2.8 Coverage Evaluations

Figure 82:
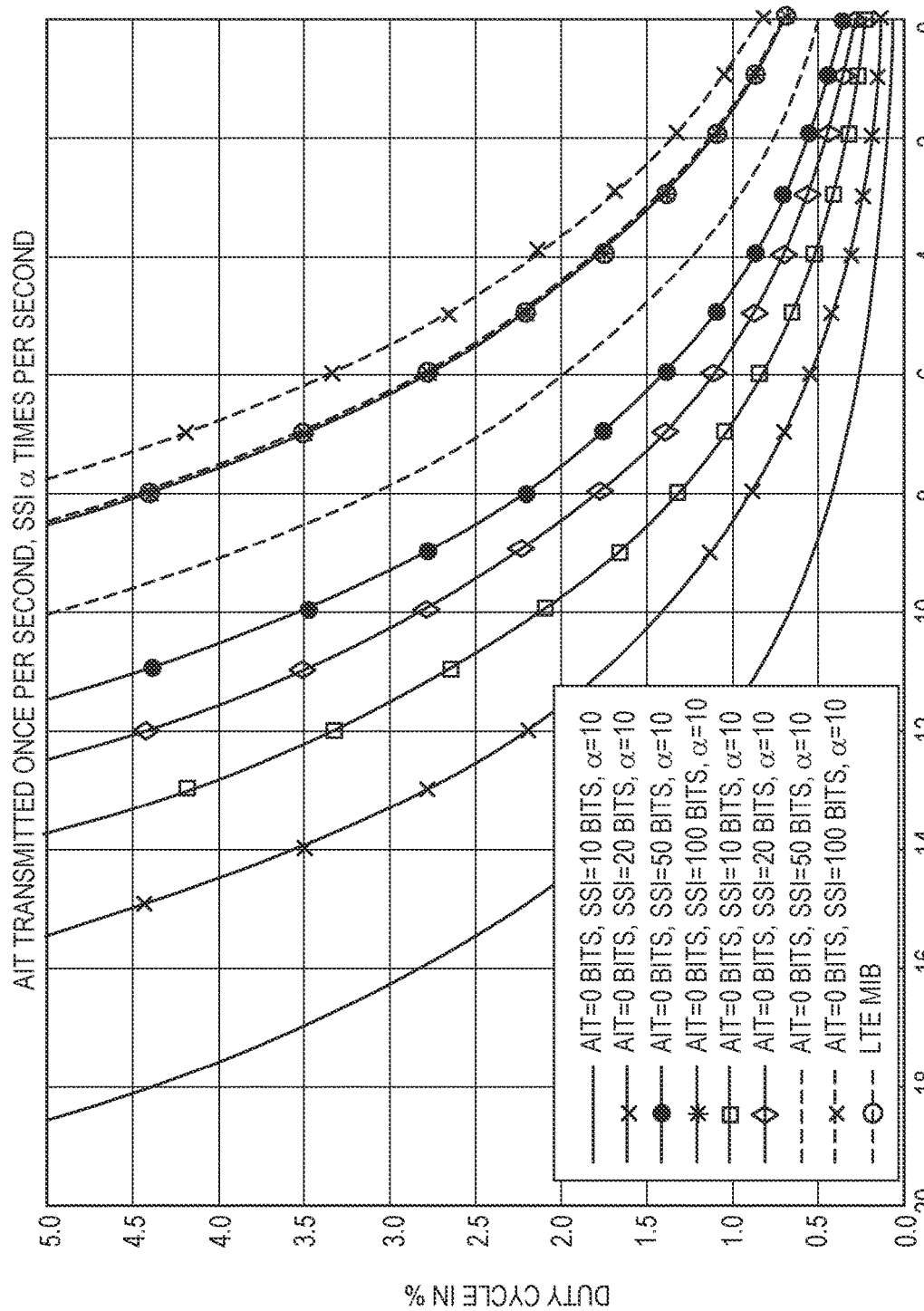
FIG. 82 shows duty cycle of AIT/SSI of varying sizes, using 1.4 MHz bandwidth.

Initial coverage results indicate that broadcast of system information is costly at 15 GHz carrier frequency. FIG. 82 shows the required duty cycle for distributing AIT/SSI in a dense urban deployment, where AIT/SSI is using 1.4 MHz of the system bandwidth (100 MHz). In the figure, AIT is transmitted once per second; SSI α times. The corresponding LTE MIB performance requirements are used to determine the desirable AIT/SSI duty cycle; AIT and SSI should work at the cell edge, which corresponds to $5^{th}$ percentile SNR of −16 dB and $5^{th}$ percentile SINR of −20 dB for dense urban deployments. For energy efficiency and capacity reasons the duty cycle of AIT and SSI should be as low as possible. In the energy efficiency evaluations, a duty cycle of a 1-2% has been assumed. The results in FIG. 82 show coverage can be maintained with a duty cycle of a few percent for AIT/SSI transmission. However, to make this possible it is desirable to reduce the load on both AIT and SSI and to reduce the periodicities of the same.

The results highlight the importance of minimizing the information to be broadcasted in NX. The AIT/SSI solution allows separating the transmission point of AIT and SSI, so that only SSI needs to be transmitted in the high frequency carrier, while AIT could be distributed on a lower frequency carrier, via LTE or there could be a set of default SSIs defined in the standard for the initial access.

3.2.2.3 Alternatives

As an alternative to the index based (AIT+SSI) distribution of access information, other distribution methods of system information can also be considered. The main benefits of the AIT+SSI based broadcast of access information are that it can be very resource efficient, it can minimize the amount of broadcasted information in high frequency carriers, it provides a framework for separating system functionality and signals for system access and tracking and it can provide very good network energy efficiency.

Alternative solutions might be used, however. In one option, the system information could still be encoded using the MIB/SIB based structure of LTE. Note that this still allows for sending the SIBs that are not needed for initial access using a dedicated high gain beam in high frequency where beam forming is desirable for coverage. Network energy efficiency could be addressed by only distributing the access information upon request from UE in areas with low traffic demands for energy savings purposes. The solution could also be used jointly with the index based approach. For this, the access node needs to send a pre-defined synchronization sequence, so the UE can send a random access preamble. Beamforming and beam sweeping can be used to improve the link budget for the MIB/SIB transmission to the UE.

3.2.3 UE Camping

In LTE, the UE camps in a "cell". Prior to camping, the UE performs a cell selection which is based on measurements. Camping means that the UE tunes to the cell control channels and all the services are provided from a concrete cell and the UE monitors the control channels of a specific cell.

In NX, different nodes may transmit different information. Some nodes may transmit the SSI/AIT table, while others may not transmit SSI and/or AIT, for instance. Similarly, some nodes could transmit the tracking information while others may transmit paging messages. The notion of cell becomes blurry in this context and, therefore, the concept of cell camping is no longer suitable in NX.

The relevant signals the UE may monitor while in dormant state are one or more of:
  SSI
  Tracking RAN Area Signal—TRAS (see section 2.2.4.1.1)
  Paging Indication Channel/Paging Message Channel (see section 2.2.4.2.1)

NX camping is, therefore, related to the reception of a set of signals. The UE should camp on the "best" SSI, TRAS, and PICH/PMCH. NX camping (re-)selection rules for these signals are used, just as cell (re-)selection rules exist in LTE. However, since the degree of flexibility is higher, these rules may also be slightly more complicated.

3.2.4 DRX, Tracking and Paging

UE Tracking is used to assist the paging functionality. When the network needs to locate the UE, the network may limit the transmission of the paging messages within the tracking areas which the network configured for the UE. There are at least three major reasons why the tracking/paging functionality was re-designed for NX:
1. NX design aims to be modular to avoid dependencies which could limit future enhancements, and it should be future compatible.
2. In Dormant state, it is assumed that a S1 connection is established. This means that the paging responsibility is partly moved from the CN to the NX-eNB.
3. System Access is based on a node transmitting a System Signature Index (SSI) which points to an entry in the Access Information Table (AIT). The AIT is a collection of the different system information configurations related to the network access which the network could have. This means that any node may use any SSI depending on the network access configuration which is to be used by the UE. In other words, the SSI does not carry location information.

Figure 83:
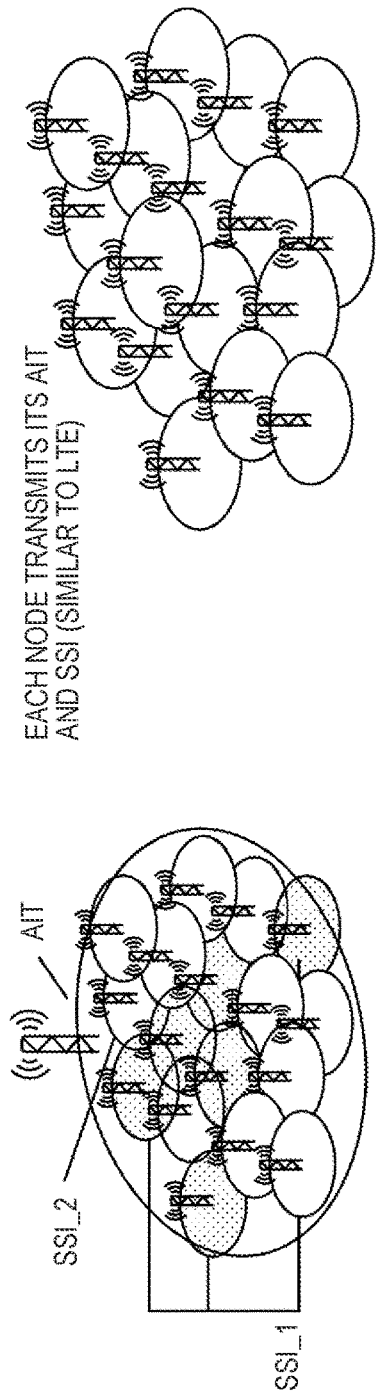
FIG. 83 shows AIT and SSI deployment options.
Figure 84:
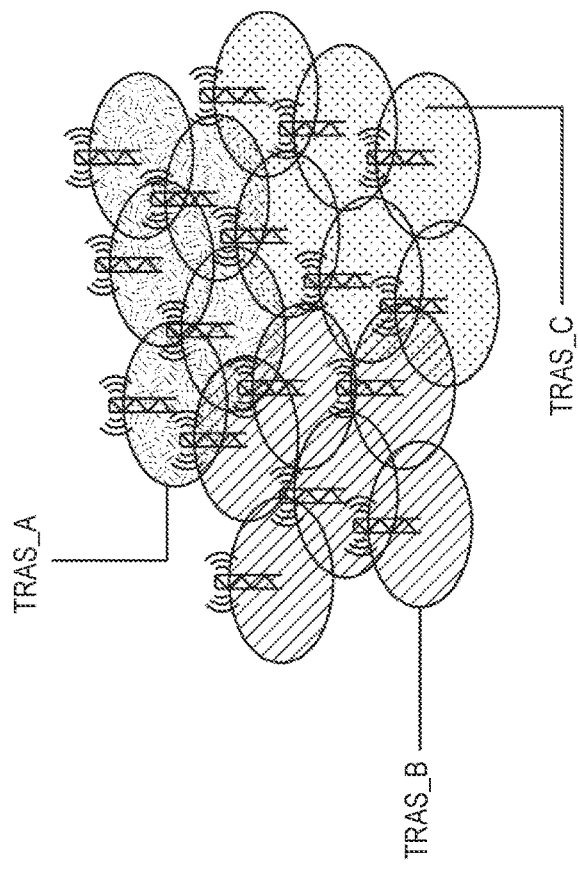
FIG. 84 shows tracking area configuration.

FIG. 83 illustrates possible SSI/AIT deployments that could both use the same Tracking Areas configuration, e.g., the Tracking Areas configuration depicted in FIG. 84.

3.2.4.1 Tracking

Location information is desirable to assist the network to locate the UE. Solutions to provide location information using the SSI/AIT are possible; however, at the cost of introducing certain constraints. Another solution is to use the SSI block. The SSI block could carry the content or part of the content described in the TRASI (see below). The SSI block is independent of the SSI. Therefore, it could qualify as an option to provide location information. Yet, another solution which provides a higher degree of flexibility is to introduce a new signal to carry such information. This signal is in this context called Tracking RAN Area Signal, TRAS. The area in which this signal is transmitted is called Tracking RAN Area, TRA. A TRA may contain one or more RAN nodes as depicted in FIG. 84. The TRAS may be transmitted by all or a limited set of nodes within the TRA. This also means that this signal and its configuration should preferably be common for all the nodes transmitting the TRAS within the given TRA, e.g., in terms of (at least) roughly synchronized transmissions, to facilitate the procedures for the UE and aid it to reduce its energy consumption.

3.2.4.1.1 Tracking RAN Area Signal—TRAS

The Tracking RAN Area Signal (TRAS) comprises two components, a Tracking RAN Area Signal Synchronization (TRASS) and a Tracking RAN Area Signal Index (TRASI).

3.2.4.1.2 Tracking RAN Area Signal Synchronization (TRASS)

In the Dormant State, prior to each instance of reading the TRA info, the UEs are typically in a low-power DRX state and exhibit a considerable timing and frequency uncertainty. The TRA signal should therefore also be associated with a sync field that allows the UE to obtain timing and frequency synchronization for subsequent payload reception. To avoid duplicating synchronization support overhead in yet another signal, TRASI reception can use SSI for the purposes of synchronization in deployments where SSI and TRAS are transmitted from same nodes and are configured with a suitable period. In other deployments where the SSI is not available for sync prior to reading TRASI, a separate sync signal (TRASS) is introduced for that purpose.

The SSI design has been optimized to provide UE synchronization. Since the synch requirements for TRA detection, not least the link quality operating point for the UE and the required ability to read the DL payload information, are similar, we reuse the SS physical channel design and reserve one, or a small number, of the PSS+SSS sequence combinations to be used as the TRA sync signal. The SS detection procedure at the UE may be reused for TRA synchronization. Since TRASS constitutes a single predetermined sequence, or a small number of them, the UE search complexity is reduced.

Information about whether TRASS is configured by the network may be signaled to the UE, or the UE may detect it blindly.

3.2.4.1.3 Tracking RAN Area Signal Index (TRASI)

The tracking area index is broadcasted. At least two components have been identified to be included in the TRASI payload:
1. Tracking RAN Area code. In LTE, a TA code has 16 bits. The same space range may be used for NX.
2. Timing information (see section 2.2.4.3). As an example, a System Frame Number (SFN) length of 16 bits may be used, which would allow a 10 minutes DRX given a radio frame length of 10 ms.

The payload is thus estimated as 20-40 bits. Since this number of bits is impractical to encode into individual signature sequences, the TRA information is transmitted as coded information payload (TRASI) with associated reference symbols (TRASS) to be used as phase reference.

The TRASI payload is transmitted using the DL physical channel structure:
  Alternative 1 [preferred]: Use PDCCH (persistent scheduling). The UE is configured with a set of 1 or more PDCCH resources to monitor
  Alternative 2: Use PDCH (persistent scheduling). The UE is configured with a set of 1 or more PDCH resources to monitor
  Alternative 3: Use PDCCH+PDCH (standard shared channel access). The UE is configured with a set of 1 or more PCCH resources to monitor, which in turn contain a pointer to PDCH with the TRA info The choice between PDCCH and PDCH should be based on whether reserving resources in one or the other channel imposes fewer scheduling limitations for other signals. For nomenclature purposes, the used PDCCH/PDCH resources may be renamed as TRASI physical or logical channel.

TRASI encoding includes a CRC to reliably detect the correct decoding at the UE.

3.2.4.1.4 UE Procedures

The UE uses its standard SSI search/sync procedure to obtain sync for TRASI reception. The following sequence may be used to minimize the UE energy consumption:
1. First look for TRASS
2. If TRASS not found, look for most recent SSI
3. If same SSI not found, continue to full SSI search In some UE implementations, the RF wake up time is the dominant energy consumption factor, in which case full search may always be performed.

If no TRASS is present but several SSIs are audible, the UE attempts TRASI reception at all found SSI and/or TRASS timings, one of which succeeds. All SSIs are detected and corresponding TRASI detection is attempted during the same awake period, so no RF overhead is introduced.

If "loose" sync with a known tolerance within a TRA is provided, a UE searches for TRAS-related time sync in the relevant vicinity of the current timing, plus the worst-case timing drift during the DRX. The UE RX waking time is "proportional" to the timing tolerance.

3.2.4.1.5 Low SNR Operation

For TRASS, a low-SNR situation should be addressed similarly to SSI (see section 2.3.4), since the signaling requisites for successfully obtaining sync are the same.

For TRASI, one or both of two approaches are practical to cover such low-SNR scenarios:
1. Lower the rate of the TRASI signal to allow energy collection over an extended time (e.g., repetition).
2. Apply beam sweep, repeating the TRASI information in a set of relevant directions, where beam gain is applied in each direction. (In this case, it is preferable to transmit TRASI on PDCH which has been designed with beam sweeping support.)

Whether repetition is applied in the form of "omni-directional" low-rate transmission or spatial repetition of higher-rate transmissions during beam sweeping, the worst-case reception time is the same. However, using a beam sweep cuts the mean reception time in half.

3.2.4.1.6 TRA Configuration

TRA configuration should be identical within the TRA. This means that all the nodes which transmit the TRASS should use the same configuration. The reason behind this is due to the DRX configuration. A UE in dormant mode wakes up for a certain period of time. In that period of time, the UE is expected to monitor and perform measurements as configured by the network (or as mandated by the standard).

Figure 85:
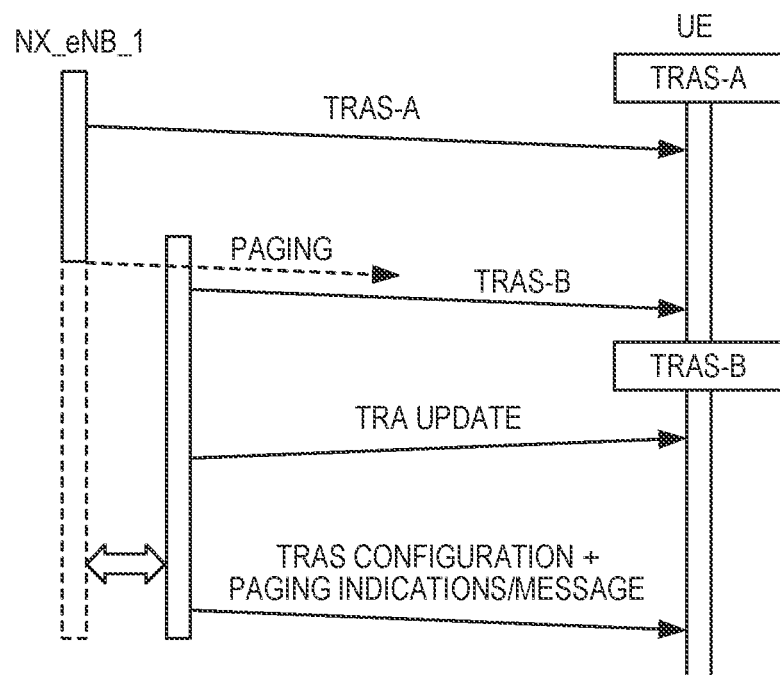
FIG. 85 is a signal flow diagram illustrating a TRA update procedure.

TRA configuration is conveyed via dedicated signaling. AIT is not the most suitable option to convey this information. The TRA configuration could be transmitted to the UE, for example, when the network commands the UE to move from Active Mode to Dormant Mode or when the network transmits a TRA Update Response to the UE. TRA Update Response—could also carry paging information (see FIG. 85). This could be especially useful to minimize paging delays in situations when the network is trying to locate a UE in TRA which the UE has already exited. To be able to support this type of functionality, the UE may need to add in the TRA Update some type of ID or other information to assist the new TRA or node to identify previous TRAs or nodes which could contain the UE context, paging messages or user data. In FIG. 85, which illustrates a TRA update procedure, a UE moves from a TRA_A to a TRA_B which is not configured in its TRA list. When the UE has exited the TRA_A, but not registered yet in TRA_B, the network starts sending paging indications over a certain node or set of nodes in TRA_A. The UE does not respond since it has exited the TRA_A and may not monitor the TRAS_A any longer. When the UE performs a TRA Update, the network provides the new TRA list and configuration, and may further include any paging indications which the UE could have been missed.

3.2.4.1.7 Timing Synchronization Between TRA

The less synchronized the network is, the higher the UE battery impact is. Keeping a tight synchronization across TRAs is therefore important but also challenging, especially in deployments with poor backhaul.

A few options are listed below.
All TRAs are loosely synchronized.
No synchronization across TRASs.
Sliding synchronization across neighbor nodes.
Loosely synchronized within the TRA & not synchronization among TRASs.

3.2.4.2 Paging

Paging functionality has one or both of two roles:
To request one or more UEs to access the network
To send notifications/messages to one or more UEs AIT may not always be a suitable solution to deliver broadcast/warning messages. There are a few reasons why:
One single node distributes the AIT in a large area. An update on the AIT would mean that all the UEs within the AIT coverage would acquire the AIT to collect the message. However, it would be more challenging, for example, to distribute this notification within a smaller area.

The NX concept allows long periods for AIT distribution. When AIT is seldom distributed, the delay requirements for warning messages may not be fulfilled.

AIT is expected to only carry the minimum possible information, and current thinking is that the AIT size (at the air interface) is, at most, a couple of hundreds of bits. This assumption is not compatible with the fact that broadcast and warning systems may require to transmit messages of several hundreds of bits.

The paging solution reuses the NX physical channel PCCH/PDCH but introduces the following logical channels:
Paging Indication CHannel (PICH)
Paging Message CHannel (PMCH)

3.2.4.2.1 Paging Signals: PICH and PMCH

The general intention for paging signaling design is to enable reception with minimal UE energy consumption, preferably reading a single signal, while being resource-efficient for the network. In LTE, the UE first needs to read PDCCH information with a pointer to PDSCH resources containing the paged UE list.

No new physical channels should be introduced for distributing paging information; the PDCCH and PDCH should be used for that purpose. PDCCH is expected to support message sizes up to 40-50 bits, which can provide a resource allocation pointer to a PDCH, while PDCH can carry large messages.

Due to the need to support a wide range of network configurations and link conditions, a number of paging configurations are introduced, comprising two fields, PICH and PMCH, that assume different functions for the different configurations:

PICH: In a typical expected configuration, PICH is mapped onto PDCCH. The paging indication may contain, depending on the scenario/deployment and the amount of data to transmit, one or more of the following: a paging flag, warning/alert flag, ID list, and resource allocation.

PMCH: The PMCH is mapped onto PDCH. PMCH may optionally be transmitted after the PICH. When the PMCH message is sent, it may contain one or more of the following contents: ID list, and warning/alert message.

3.2.4.2.2 Synchronization

PICH/PMCH synchronization may be achieved by different means depending on the deployment scenario:

TRASS/SSI assisted: when paging signals are transmitted shortly after the TRASS or SSI from the same node.

Self-contained paging: A separate sync signal (like TRASS) preceding the paging should be introduced if nodes transmitting paging do not transmit TRAS or SSI, or the period of those signals is different than the paging period.

3.2.4.2.3 UE Procedures

The UE obtains sync using SSI or TRASS (-like) signal shortly before reading paging. The UE is configured to monitor PICH according to the format used by the network. Depending on the contents of PICH, the UE may perform required actions and/or read PMCH. Reading PDCCH and PDCH is performed in a standard manner, using the DMRS of the relevant RBs as a phase reference.

Based on the received paging channel contents, the UE may then access the network, read system information, perform other actions according to the emergency messages, or do nothing. System access and system info acquisition follow the usual SSI-based procedures.

3.2.4.2.4 Low SNR Operation

The options for handling TRASI in similar conditions apply here as well. Low-rate PICH transmission may mean sending a single-bit paging indicator on PDCCH. PDCH may be the preferred medium if beamforming needs to be applied to the PICH.

3.2.4.2.5 Paging Configuration

Paging configuration, like in LTE, also configures the UE DRX cycles. Paging configuration for UEs in Dormant state is provided to the UE via dedicated messages e.g., in the TRA Update Response or other RRC messages.

The paging configuration should be valid within a certain area(s) e.g., a TRA. This information is also to be conveyed to the UE in the paging configuration.

3.2.4.3 DRX and Paging in NX

One of the underlying and important assumptions is that NX and LTE are tightly integrated. Therefore, the scheme to configure DRX and Paging cycles in NX is very similar as the one in LTE. In other words, paging cycles and DRX cycles in NX are bound together and depend on the SFN.

The solutions proposed for tracking and paging allow all signals to be transmitted by any node independently from each other. In other words, a node transmitting one of them does not impose the transmission of another of the signals by the same node. This type of design imposes certain challenges and requirements:

The UE has to receive all the necessary signals during the DRX "listening period", DRX cycle and paging cycle should apply within a certain region, e.g., a TRA Paging configuration should apply within that region TRAS configuration should apply within that region All nodes within that region have synchronized SFNs.

If SSI/TRAS/Paging signals are transmitted from different nodes or by combinations of nodes, the network should ensure that all these nodes are coordinated and know the UE configuration.

For long DRX cycles, clock drifts are significant, and could be larger than the period of the downlink signals. This introduces a possible error in the SFN calculation. If there is no SFN correction, the UE may miss paging indications. This means that the SFN (or other timing information) should be included in the downlink signals, so when the UE wakes up, it can correct its drift and calculate the correct paging frame.

Since the SFN information is used to calculate the paging/DRX cycles, it could be reasonable to conclude that the SFN is to be introduced in at least one of the signals which support paging/DRX. The SFN cannot be included in the paging signal since paging is not always sent by the network. Therefore, the other potential signal to carry this information is the TRAS. Depending on the deployment, e.g., the SSI and TRAS and paging from the same node, the SFN could be contained in either the TRAS or the SSI Block. See Section 2.2.2.2.4. Moving paging/DRX functionality in dormant state to RAN has certain implications for the network. For example, RAN may need to buffer user plane data which could be considerable for long DRX cycles. In cases of long DRX in Dormant state, there may be also some impacts in the design of the core network protocols CP/NAS, and might be required the RAN to provide to CN nodes information about UE reachability (ref. High Latency Communication procedures in 23.682).

3.2.5 Connection Establishment

The procedure for connection establishment may vary depending on the UE state and the deployment, both in terms of node transmit power and carrier frequencies deployed. In this section, initial connection establishment is described for a UE in DETACHED state.

3.2.5.1 PLMN Selection

From a higher layer perspective, before the UE powers on, the UE is in DETACHED state; see state transition diagram in FIG. 3. When the UE powers on it could either have LTE or NX carriers as highest priority to perform PLMN selection, according to what is configured in its USIM.

In the case of LTE, the PLMN selection is a well-known procedure where the PLMN associated to a carrier frequency is broadcasted in SIB1. In order to do PLMN selection the UE needs to perform L1 synchronization using PSS/SSS, then PCI detection to decode CRSs and perform channel estimation and decode System Information, more specifically the MIB and then SIB1 broadcasted each 80 ms. This needs to be done for each carrier frequency until the UE finds an appropriate PLMN that it is allowed to select.

In the case of NX, different solutions are possible. These have taken into account the different ways to distribute system information in NX; see 3.2.2.

Assuming an AIT/SSI based solution for system information acquisition, for each scanned frequency carrier the UE detects the AIT that contains the PLMN. In order to allow the UE to quickly start scanning another carrier (if the previous one is not associated to an allowed PLMN) the PLMN can be encoded at the beginning of the AIT. A potential disadvantage is that to keep the same delay performance as LTE's PLMN selection, the AIT would need to be transmitted each 80 ms (e.g., instead of a periodicity on the order of one or more seconds). Alternatively, the transmission of AIT can be aligned between different PLMNs to minimize the PLMN selection time. To note here is that the initial attach will be a rare event in NX, as the target is to keep UEs in dormant state; thus the delay performance of the attach procedure becomes of less importance. Also, the design includes the possibility for UEs to store the AIT and use the SSI to check validity of stored AIT when accessing the system, so that reading the AIT is not always needed when accessing from idle. In areas where PLMN search is more likely to occur, e.g., at airports, the AIT period can be shorter.

An alternative is possible where for each scanned frequency carrier the UE detects PLMN-related information, preferably limited in number of bits, transmitted more frequently than the remaining system information. When system information is distributed according to the AIT/SSI approach, this limited information could be an SSI and the remaining information can be the AIT so the UE can check whether a given carrier frequency belongs or not to its allowed PLMNs (stored in the USIM). This information can be used both to speed up the initial PLMN/RAT/Frequency search, as well as to avoid problems with re-use of system signatures (SSI) or other synch signals between operators (that can be reused). This PLMN-related information is preferably a compressed version of the PLMN list (which includes the Home PLMN). The compression can be made very space efficient since false positives could be allowed (but not false negatives). Alternatively, the information can be the PLMN list, e.g., when space is not an issue or when only one or a few PLMNs are broadcasted. This alternative solution in systems where plain system information is distributed per-node like in LTE. In that case, the few bits encoding the PLMN-indication can be transmitted more often, which could optionally be in areas where PLMN search are more likely to occur such as areas close to airports.

3.2.5.2 Single Attach for LTE and NX

Once the UE has selected an allowed PLMN, the UE initiates an attach procedure to access and register to the CN. Regardless of the accessed RAT, the attach is associated to both NX and LTE. In this process, a common S1* is established, which is kept during the lifetime of the RRC connection. The single attach allows a fast subsequent establishment of dual connectivity between LTE and NX, when required.

Figure 86:
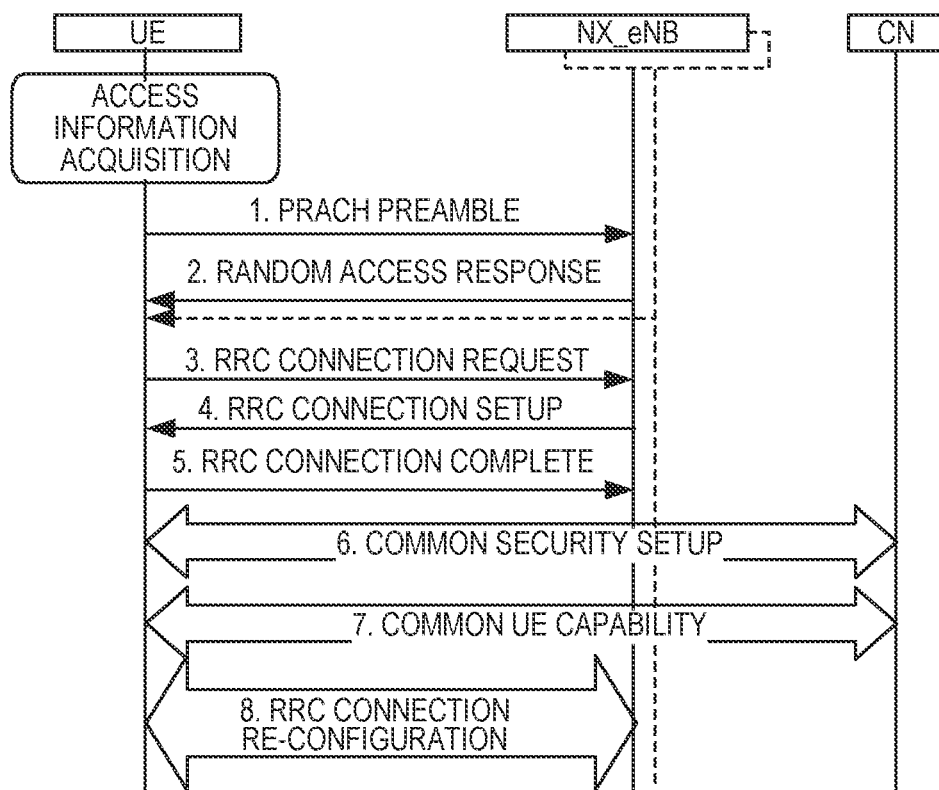
FIG. 86 is a signal flow diagram illustrating an initial attach over NX.

Because of the tight integration with LTE, the RRC connection establishment procedure resembles that of LTE, except for the information carried in the messages. The procedure for the initial attach over the NX interface is shown in FIG. 86. On the other hand, some of the procedures (mainly from the perspective of lower-layer procedures) are access-specific, such as coverage detection, PLMN search, system information acquisition, synchronization and random access.

Access Information Acquisition

The UE starts by acquiring the needed access information to access the NX system, according to section 3.2.2. The SSI can be broadcasted or transmitted in a wide beam (see section 3.4.4.2), or beamforming may be used in some specific scenarios.

The SSI implicitly provides the UE with information on how to demodulate, decode and descramble the AIT. One example alternative is that the SSIs are grouped into sets of N (e.g., N=16), which all point out the same AIT. In the AIT the UE finds configurations required to transmit the physical random access preamble and how to receive the random access response (steps 1 and 2 in FIG. 86, respectively).

1. Physical Random Access Preamble Transmission

FIG. 87 illustrates random access preamble transmission. The physical random access preamble is transmitted based on a time reference from a SSI or specific PRACH indication signal. If beam forming is used and if the eNB only supports analog or Hybrid BF, the preamble transmission may be repeated to allow for beam sweeping. If beam sweeping is also used for SSI transmission, the timing offset from the SSI to preamble can also be utilized. This downlink reference signal is also used as a power control reference and layer selection for the transmission. A preamble is selected based on the SSI and the Access Information Table entry. The preamble format is described in 2.3.4.2. As shown in FIG. 87, the transmitted preamble may be received by multiple network nodes.

2. Random Access Response Transmission

FIG. 88 illustrates random access response transmission. The random access preamble transmission is followed by a search window in time and frequency where one or multiple Random Access Response (RAR) messages can be received. The RAR transmission can be beam formed based on PRACH channel estimation assuming UL/DL reciprocity. The RAR is self-contained, in that it carries its own sync and demodulation pilots, and the UE blindly searches for a set of such pilots associated with the SSI and the selected preamble index. If more than one network node received the random access preamble, network coordination can be applied to limit the number of RAR transmissions—see ID2 in the left part of FIG. 88. If more than one RAR is received—see the right part of FIG. 88—the UE performs a selection step to find the RAR to comply with. The RAR also contains a timing advance command to adjust the uplink timing and a scheduling grant for next uplink message. The RAR message includes a downlink PDCCH/PDCH configuration and an uplink PDCH configuration; subsequent messages use configurations provided in the RAR. These configurations can be derived from a single index e.g., a "radio link configuration index" (that is similar to the PCI in LTE).

3. RRC Connection Request

Upon receiving the random access response, the UE transmits the RRC Connection Request message, including a CN level UE identity (e.g., S-TMSI) requesting the setup of the RRC connection.

4. RRC Connection Setup

The network responds with RRC connection setup to establish SRB1. This step is also the contention resolution step, which is used to differentiate between two UEs having transmitted the same preamble and also selected the same RAR. This is done by resending the CN level UE identity included in the RRC Connection Request message and the RRC connection ID; see section 2.1.3.1.1.

5. RRC Connection Complete

The UE completes the procedure by sending the RRC Connection Complete message.

6. Common Security Setup

Security signaling is discussed in section 2.1.5.2.

7. Common UE Capability

UE capability signaling is discussed in section 2.1.5.3.

8. RRC Connection Reconfiguration

An RRC connection reconfiguration procedure is performed to configure SRB2 and the default RB. User plane transmission is possible after this procedure. Note that all CN signaling was not detailed in this brief description. In general, due to the tight integration, we expect the CN signaling to be backward compatible with LTE CN signaling.

3.2.5.3 Accessing NX Carrier

This section discusses NX carrier access, which is a component of several connection establishment procedures:

Case A: UE performs the single attach over NX, e.g., DETACHED→RRC_CONNECTED ACTIVE transition, and needs to access an NX carrier that could be in low or high frequency layer.

Case B: UE performs the RRC CONNECTED DORMANT→RRC CONNECTED ACTIVE transition and establishes a link with an NX carrier.

Case C: UE in RRC_CONNECTED ACTIVE having a primary carrier establishes a secondary carrier (that can be in higher frequencies). This could be seen as similar to the setup of a secondary carrier as in LTE CA.

The common aspect of the abovementioned scenarios is that the UE needs to access an NX carrier which could be in a wide range of frequencies. A first step before the UE can access the NX carrier is to detect the coverage, typically done via the monitoring of some transmitted signals. These can be either i) common, ii) dedicated or iii) defined per group by the network. In the NX case these are either SSIs or MRSs.

These signals may also differ in the way they are transmitted by the network. In higher frequency, for example, these signals can be transmitted using narrow beamforming (which would require a beam sweeping procedure for coverage detection, see section 3.4.4), or broadcasted (where some repetition could be desirable for worst case users). At lower frequencies, these signals could be broadcasted and less repetition may be used for worst case users, since propagation is less challenging. It can be beneficial to have a harmonized solution for the different carriers where the UE procedure for coverage detection is exactly the same, regardless the way the network provides the coverage.

Despite the commonalities of cases A, B and C there may still be some case specific issues, especially in deployments where the signals used for coverage detection need to be beam-formed (coverage only provided by an NX carrier in a high frequency in some specific ISD).

Case C is the least challenging since the UE already has an active RRC connection and can be configured to search for specific NX signals, e.g., beam-formed MRSs. In that case, system information about how to access that beam (e.g., some sort of PRACH configuration towards that beam) can also be informed via dedicated signaling. In the case the secondary NX carrier is deployed in another node, some network signaling (e.g., over X2*) may be used. The establishment of the secondary NX carrier may occur with an RRC re-configuration, similarly as the establishment of inter-frequency DC. In another alternative, the UE can instead directly access the beam and rely on some context fetching.

Case B is challenging since the UE needs to establish a link with NX without the support of an active RRC connection. From a higher layer perspective, this is described in section 2.1.5.6 (RRC Re-Activation procedure). From a lower layer perspective there could be different ways to access the NX link. If the UE is configured to camp on a low frequency NX carrier (or in a high frequency carrier where the deployment allows the broadcast of SSIs) state transition occurs via SSI synchronization and random access procedure, as described in section 3.2.5.2.

If the UE is configured to camp on a high frequency carrier, where even low rate channels need to be beam-formed to reach proper coverage, the state transition needs to rely on beam sweeping/finding; see section 3.4.4. Therefore, two alternatives are possible: an SSI-based access (preferred choice) but with a specific configuration where different SSIs are associated to different beams with different RACH configurations, or an MRS-based access where the UE is configured to directly perform a random access towards a pre-configured set of MRSs (e.g., within a TRA). The SSI-based access is the preferred choice, but the MRS-based alternative provides additional flexibility e.g., tight the access to location and on demand activation.

Case A is the most challenging, where the UE may need to access an NX carrier in the higher frequency without any prior knowledge about the deployment.

3.3 Protocol and Resource Partitioning for Different Services

This section discusses methods for resource participation and optimizations for different services. The section is separated into three subsections, where 3.3.1 discusses higher layer aspects such as network slicing and multi-service support, while 3.3.2 and 3.3.3 look at possible resource partitioning solutions on MAC and physical layers, which can be used to support different network slices and services.

3.3.1 Network Slicing and Multi-Service Support

NX supports a wide range of services and associated service requirements in a wide range of scenarios. A single NX system could, for instance, at the same time support M-MTC, C-MTC, MBB and various media use cases.

One way to address these different use cases is through the use of network slicing. Network slicing is an End-2-End approach where the user or operator of a network slice (e.g., a MTC sensor network) sees the network slice as a separate logical network having similar properties of a dedicated network (e.g., separate management/optimization), but where the network slice is in fact realized using a shared infrastructure (processing, transport, radio) that is shared with other network slices. From a functional domain, the network slice can be realized with dedicated or shared functional components (such as eNB, EPC). Typically, a network slice may have its own CN (EPC) instance, but share the physical transport network and the RAN. However, other solutions are possible. In the event that a functional component is shared, it is possible via parameterization to configure the expected slice specific behavior for that shared component.

Figure 89:
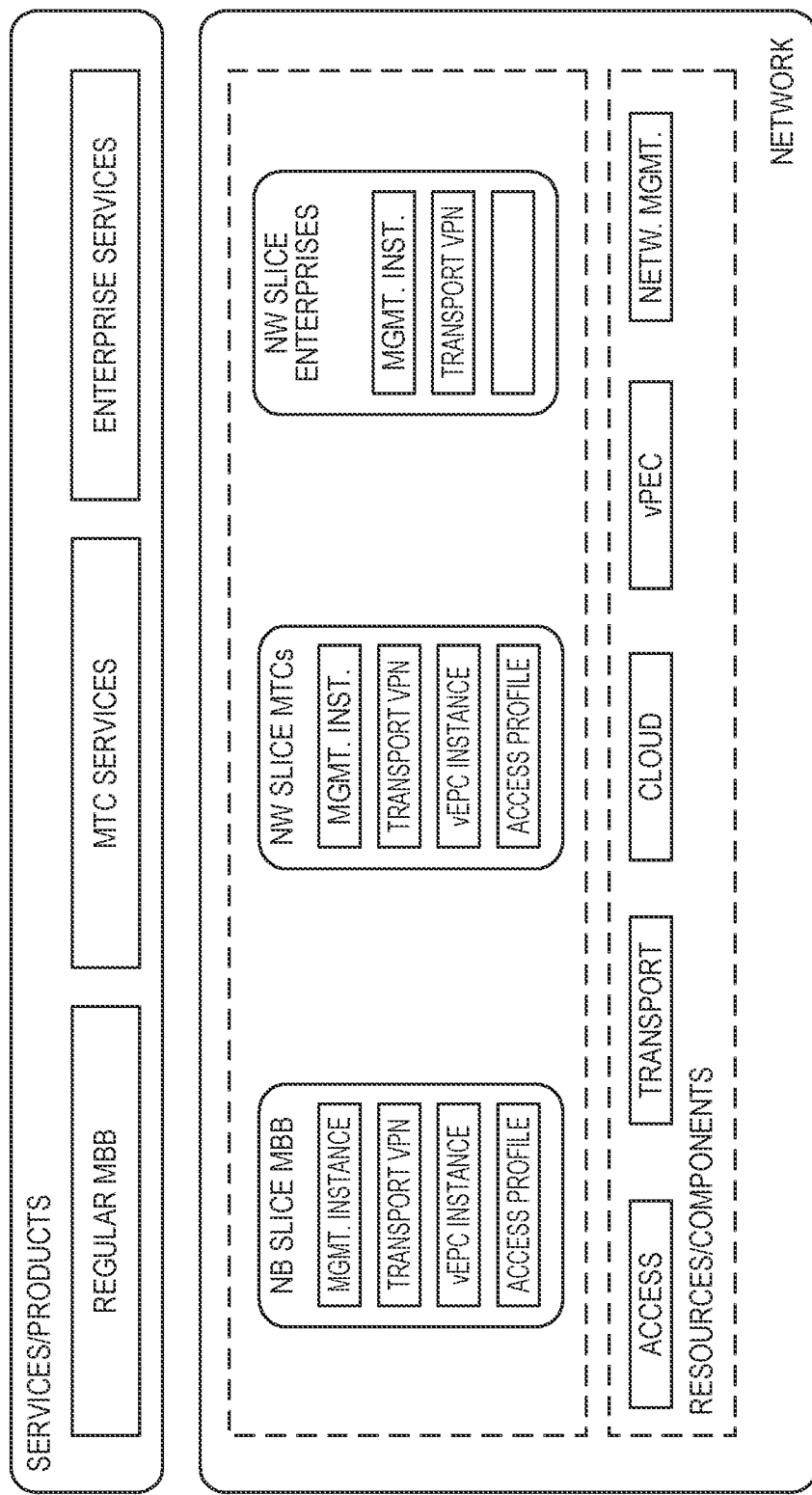
FIG. 89 illustrates the realization of different services in different logical network slices.
Figure 90:
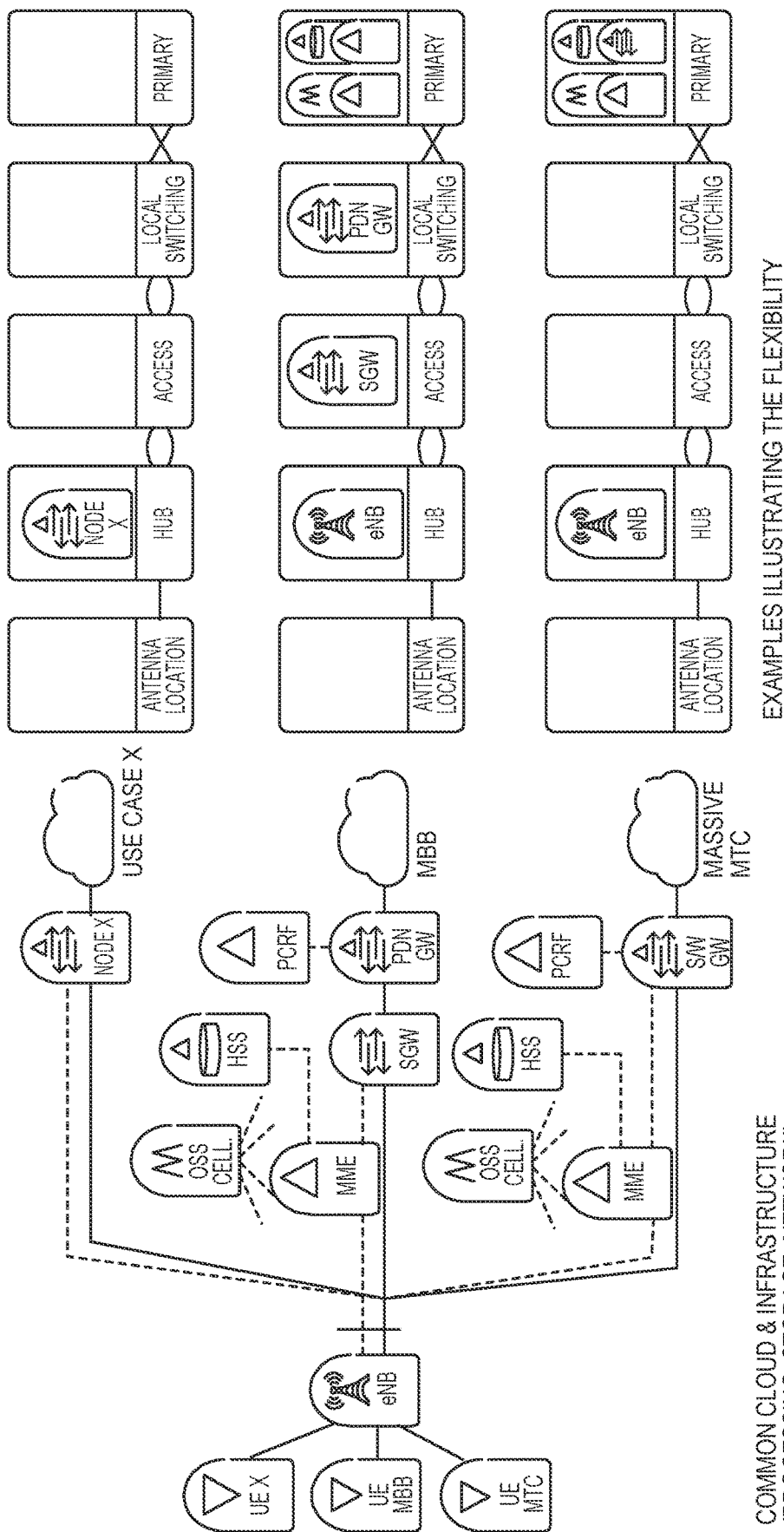
FIG. 90 illustrates examples of network slicing.

FIG. 89 illustrates examples of different services realized in different logical network slices, using common infrastructure resources and components.

Where different slices use different CN instances, it is possible to apply slice specific optimizations with regards to the functional scope and the deployment of the different CN instances. This is illustrated in FIG. 90. In this example, for instance, use case X can have a different internal CN architecture and functions, which are also deployed much closer to the radio compared to the MBB slice. To enable support for different CN instances, in the RAN there is a slice selection mechanism to steer different users to different CNs. (Note that this drives a requirement for new functionality in the S1* interface, compared to the current S1 interface.) In addition to a mechanism for slice selection, the RAN also supports a mechanism to manage resources usage between slices. These mechanisms are controlled by operator policies.

It is preferred that all slices support the same CN/RAN interface (e.g., S1*). FIG. 90 illustrates an example of network slicing using different EPC instances optimized for different use cases.

In scenarios where the RAN supports multiple slices it is important that the shared resources, such as spectrum, are used efficiently between the slices, and that static or slowly changing allocations of resources to different slices are avoided. Only in exceptional cases should resources be reserved to one slice, such that they cannot dynamically be used by other slices. Example of such cases can include when the users in one slice require a special numerology or use a different MAC mode. When dynamically shared resources are used, it is possible to define a minimum share of resources to a slice during times of congestion. In order to be able to apply these types of slice related policies, the RAN needs to be aware of a slice ID.

In addition to different shares of resources for different slices, the RAN can also provide different slices with different MAC and physical layers. This is discussed in sections 3.3.2 and 3.3.3.

In addition to network slicing, NX also supports QoS differentiation within the same network slice.

3.3.2 Multiple MAC Modes and Radio Resource Partitioning 3.3.2.1 Motivations and Scope NX is designed to allow flexible sharing of the radio resources between services with diverse requirements on, for example, delay and reliability. However, despite being supported by NX, in some practical deployments, for some critical use cases (e.g., intelligent transport system, public safety, factory automation, smart grid) it may not be acceptable to coexist on the same frequency or even carrier with any other service. For this purpose, it may be desirable to operate certain services on dedicated frequency (sub-) bands or even on a dedicated carrier. Separating the radio resource in this manner may also enable lower complexity implementation and testing in some situations. However, it should be stressed, the default assumption still is the dynamic sharing of resources between services and limiting services to sub-bands or even separating them on different carriers is the exception and only applicable in extreme cases.

The multiplexing of services, either to support the network slicing (see 3.3.1) and/or multi-service support or for the support of different UE configurations, can take the advantage of the following approach to radio resource partitioning. This is in line with the stay in the box principle for Layer 2 (see 2.2), and the basic idea is to divide the available radio resources into different partitions, each being used for a given MAC behavior.

As introduced in 2.2.1, a service-centric approach is desired to cope with all the possible aspects of scheduling a global network may face.

Figure 91:
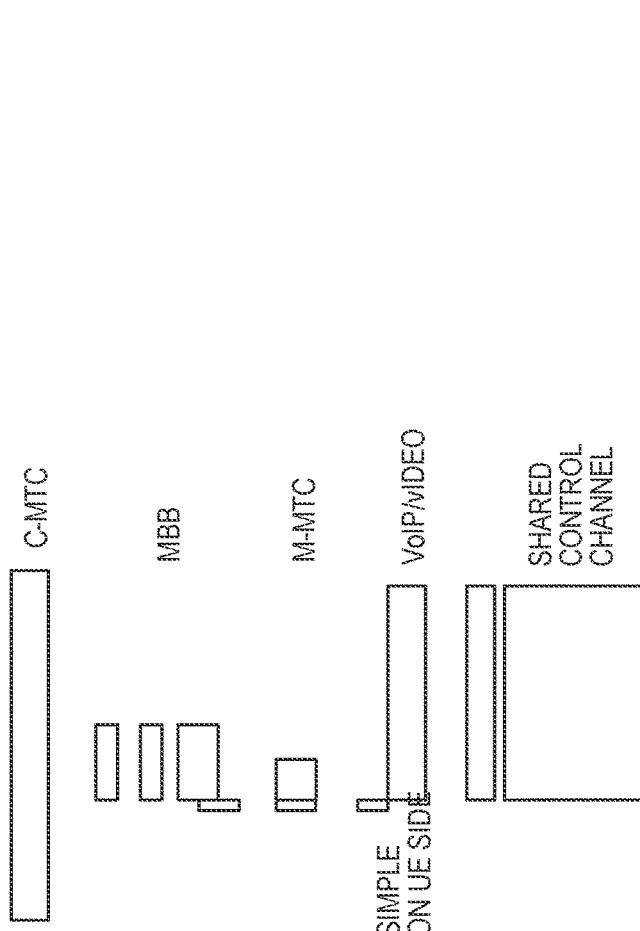
FIG. 91 shows a diversity of services with typical resource usage.

Numerous types of services can exist within the same network, and combinations of these may have to be served at the same time. All these services (e.g., MBB, C-MTC, Voice . . . ) have different performance requirements (e.g., latency, reliability, throughput . . . ), which translate into various radio resources usage requirements (TTI, Resource block size, Prioritization . . . ). This is illustrated in FIG. 91, which illustrates a diversity of services with their typical resource usage.

Figure 92:
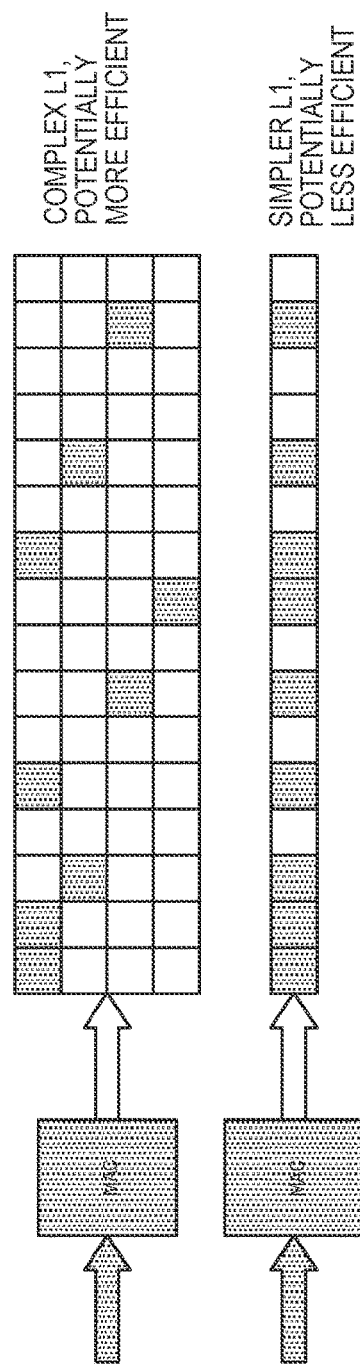
FIG. 92 illustrates a simplification of resource allocation for a given service or UE.

Creating predefined resource partitions for different services is, in general, a sub-optimal solution. It can be used to simplify the resource allocation in the scheduler if the overall complexity becomes unbearable. However, the use case described here is to support the creation of partitions of resources when the service requirements impose it. Such cases can include, for example:
When the physical resources have different properties, such as different numerologies;
When the service has very strong availability requirements (e.g., access delay so short that it needs a constant resource grant), such as C-MTC;
When the scheduling/signaling is handled in multiple nodes (D2D, distributed MAC, etc.).
When a service or UE is served by a dedicated resource partition, its view of the resource can be simplified, as shown in FIG. 92. Note that the resource partition doesn't have to be done in time or frequency domain.

This approach also ensures that next generation of mobile network is prepared, not only for a gradual introduction of new services, but also for a gradual deprecation of features, as more efficient solutions are developed. This can be achieved by assigning the MAC responsible for the new solution to a gradually increasing set of physical radio resources at the expense of the physical radio resources assigned for the MAC responsible for the old deprecated solution.

3.3.2.2 Multiple MAC Modes and Resource Partitions

For a given UE or service, a MAC behavior can be configured following specific requirements. Different MAC behaviors can be related to:
different MAC schemes, e.g., contention-based versus scheduled based,
different procedures for a scheme, e.g., RTS/CTS versus Listen-before-talk,
different parameters used, e.g., timing, prioritization, resource location.

By assigning a separate set of physical radio resources to a given MAC behavior, the MAC solution can be optimized only for requirements that are relevant in that particular special case. The physical radio resources are "allocated" or "delegated" to each particular MAC. From a network perspective, the scheduling entity has to implement and process all the active MAC behaviors, but for each of these, behaviors can be processed independently.

Although having predefined partitions for resources is sub-optimal, this may be useful in some scenarios since it enables a significant simplification of the scheduling, as well as a diversity of possible scheduling implementation. For instance, considering the case where a scheduled MAC and a contention-based MAC coexists, the contention-based MAC scheduling is actually a distributed process, and not all the nodes have direct access to the scheduled MAC information.

To limit the burden of predefined resource partitioning, the partition between different MAC behaviors needs to be dynamically handled in the system. The resource partition and MAC mode selection can be done on different level of scopes and updated with different frequencies. For instance, it can be done within a single cell or among a cluster of cooperating cells; and with short or long term resource partitions (to adapt to specific local traffic requirements or to global traffic expectations. For partitions made across cells, coordination between eNB is required. From the UE side, a communication/handshaking should be done between the UE and AP (or UE to the serving node in case of relay or UE to UE . . . ) to agree on the service and related MAC behavior.

Following the stay in the box concept, each MAC partition needs to be self-contained, with all the control mechanisms, pilots, and signaling this implies—since different MAC behavior may require different type of control or information, it is easier that all are independent to each other. Preferably, the MAC schemes are not allowed to transmit anything on the other MAC's resource, so that each process enjoys clean resources.

Figure 93:
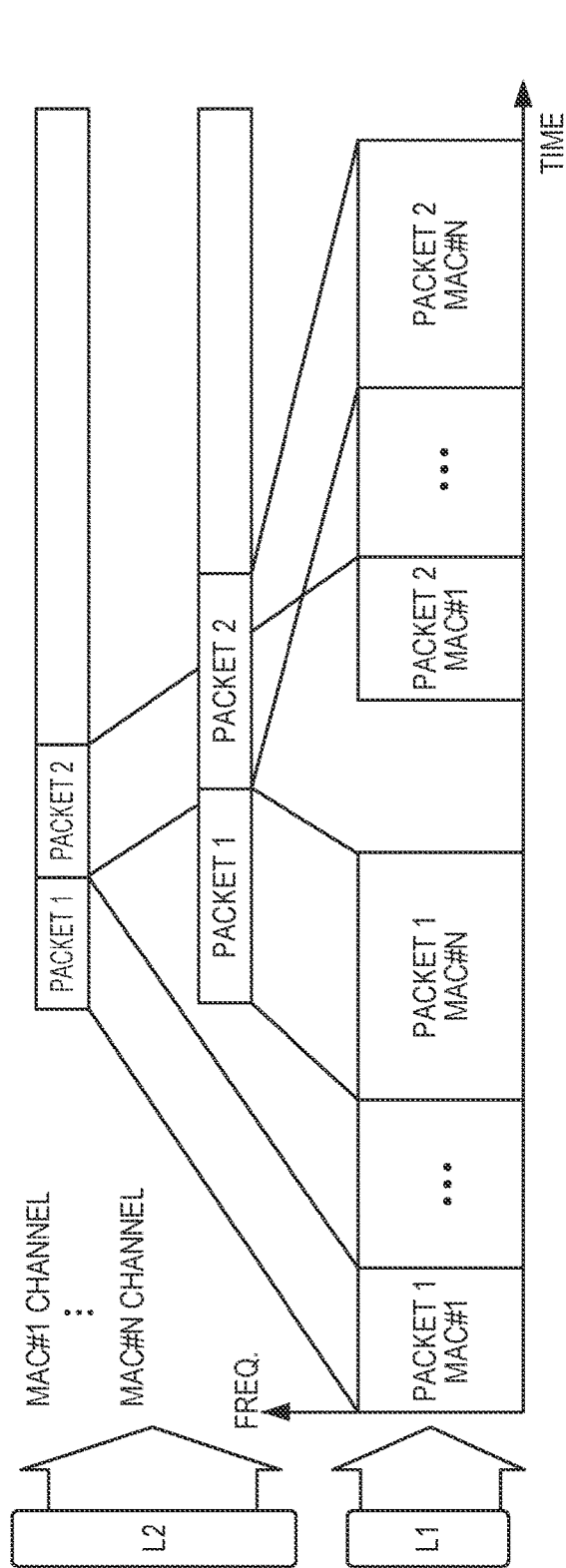
FIG. 93 shows an example of MAC resource partitioning.

An example of MAC resource partitioning can look like FIG. 93, where the radio resources are partitioned in the time domain. The partitioning can be done in any domain (frequency, time, space, code . . . ), not necessarily in the time domain, although time may be easier to handle for duplexing issues.

3.3.2.3 MAC Mode Selection

Which MAC mode or behavior is chosen for each node or service can depend on one or more of multiple factors:

The service or node requirements. As mentioned, the service requirements of the user's traffic are an important criterion for the design of the MAC behavior.

The supporting cell state. The load and link topology of the serving cell (or associated with the serving node) can have an impact on the performance of various MAC schemes. In the scheduled vs. distributed MAC opposition, it is known that distributed MAC is efficient and simple when the load is low or when the hierarchy between the links is not straightforward (presence of wireless backhauling, relay, D2D, etc.), while the scheduled MAC is more efficient in cases of heavy load and when uplink/downlink multiplexing doesn't need large cooperation. As another example, if the node is located near several other nodes or is subject to interferences (typically in the cell-edges), modes that are robust or avoiding interference are preferred, such as contention-based MAC or Scheduled MAC with coordination.

Figure 94:
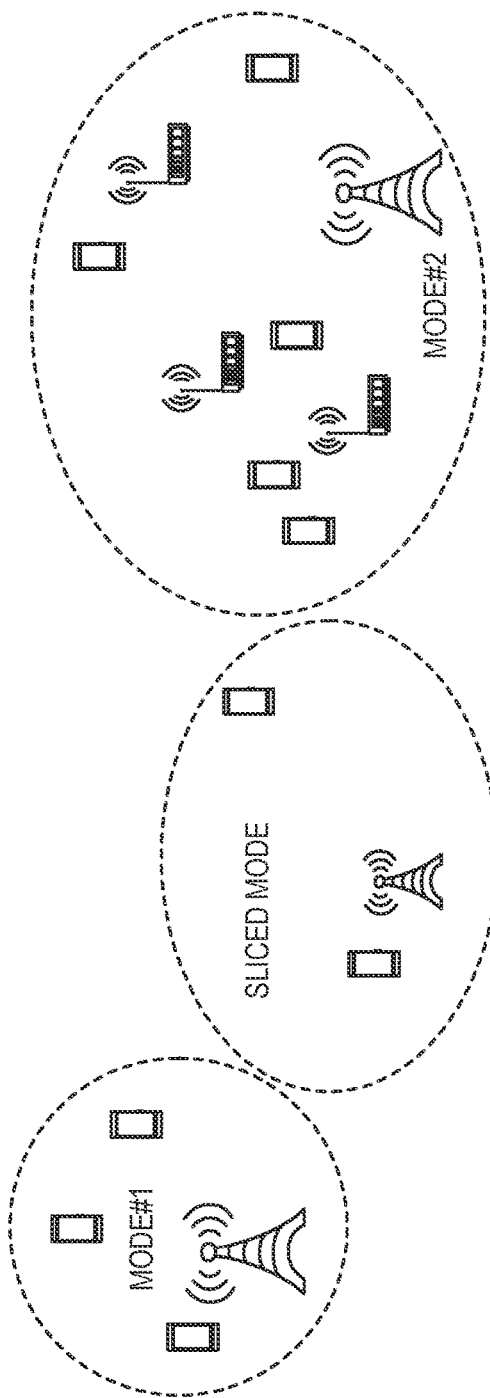
FIG. 94 shows the spatial coexistence of multiple MACs.

The network state (spatial coexistence). As another complementary use case, using multiple MAC modes can allow the coexistence between different parts of the networks. For instance, considering an eNB close to two cells with distinct MAC modes, it can choose to use a mixed MAC mode (partition of multiple MAC), to accommodate both neighbors. This is a case of spatial coexistence use. This spatial coexistence can apply within the same network, but also for coexistence across networks (typical of unlicensed bands). FIG. 94 illustrates multiple MAC mode spatial coexistence.

3.3.2.4 Information Exchange and Signaling

The information exchanges can contain local information, local requirements or local view of the system specific to a node or a group of node in the cluster. A cluster coordinating point (CCP)/functionality can be established to facilitate the coordination of the radio resource partitioning and the MAC mode selection.

As described previously, the selection of the MAC mode or behavior depends on the service or user, but may also depend on the serving cell or network state. This information has to be propagated among the coordinated nodes.

In addition, how the resources are actually partitioned, in some cases, has to be known by all the concerned nodes in the system, and the nodes performing resource partitioning should be aware of nodes and link conditions to perform efficient decisions. This is particularly the case when the scheduling decisions are not made at a single place. For instance, if one MAC behavior is distributed (e.g., contention-based) all the nodes following this behavior have to be aware of when and where they are allowed to transmit/receive signals.

Two signaling methods are possible for communicating the resource partition to the UEs.

The first would rely on Layer 2 management, and let the eNB scheduling messages include the radio resource partition information. In this case, the resource partition between the different MACs can be directly ordered from classical scheduling messages, such as the dPDCH that can contain the scheduling of the partitions. This leads to having a main Scheduled MAC, like the classical cellular MAC scheme running as "default" and being responsible to delegate parts of the radio resources to other MAC schemes—or at least being responsible for the delegation. These dPDCH can indicate which resources used for a given MAC. The advantage of L2 management is to have a per-TTI dynamicity of the MAC allocation if needed, as well as a larger flexibility in the message information provided in the dPDCH.

The second would rely on Layer 3 management and signaling, and let system configuration typically provided in dedicated messages includes the radio resource configuration. In this case, system information concept is responsible to inform all users of the structure. The advantage of this method is the stability of the scheduling allocation, which can help all the nodes and MAC processes to have a better forecast of the resource availability. This also keeps all MAC totally independent by preventing from having a "default" MAC responsible to delegate resource to others. This however leads to a slower flexibility and increase the number of possible broadcast messages that require strong standardization.

3.3.3 Mixing of Different Numerologies
3.3.3.1 Introduction

Because of differences of latency, reliability, and throughput requirements the 5G use cases require different symbol and frame structures (numerologies). Simultaneous support of 5G use cases and services is a requirement and so NX is designed to support simultaneously multiple numerologies. As far as possible, resources should be dynamically allocated between services to match demand.

3.3.3.2 Numerology and Transmission Format

Critical machine-type communication is expected to happen below 10 GHz. For wide area deployments at the lower end of this range, 16.875 kHz is the default starting point; see also Section 2.3.2, where the different numerologies and their anticipated usage are detailed. Here the subframe duration is 250 µs, which allows for a sufficiently low latency for most use cases. Even shorter subframes can be realized with the 67.5 kHz numerology, which provides subframes of 62.5 µs ("67.5 kHz, normal CP" or "67.5 kHz, long CP") or 125 µs ("67.5 kHz, long CP b"). One drawback of the 67.5 kHz numerology over the 16.875 kHz numerology is the increased overhead: It increases from 5.5% in "16.875 kHz, normal CP" to 40.6% and 20.5% in "67.5 kHz, long CP" and "67.5 kHz, long CP b", respectively. This assumes a deployment where a cyclic prefix in the order of 3 µs is required where "67.5 kHz, normal CP" with 0.8 µs cyclic prefix cannot be used. If a cyclic prefix of less than 0.8 µs is sufficient then "67.5 kHz, normal CP" can be used which has the same overhead as "16.875 kHz, normal CP".

Figure 95:
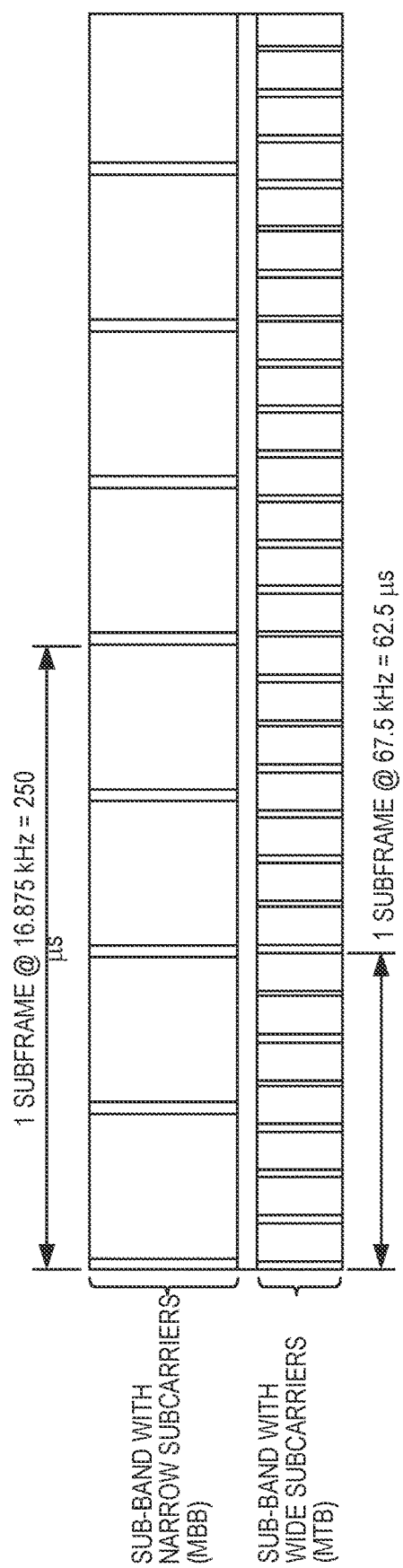
FIG. 95 shows the mixing of two OFDM numerologies on the same carrier.
Figure 96:
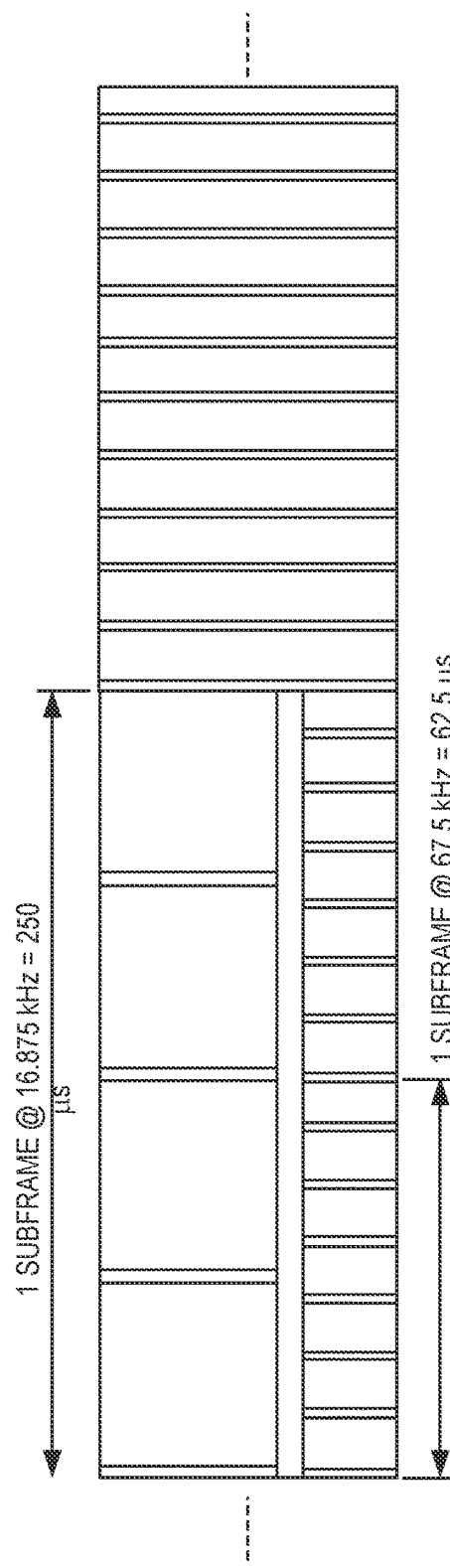
FIG. 96 shows a dynamic changing of portioning between two numerologies.

Often, a latency-critical machine-type communication (requiring 67.5 kHz numerology) requires only a fraction of the complete carrier. The remaining part of the resources are used for less delay-sensitive services such as mobile broadband or other—less delay-sensitive—machine-type communication. It is therefore beneficial to use the 67.5 kHz numerology only for that part of the carrier that serves extremely delay-critical services and "16.875 kHz, normal CP" numerology for the remaining part; see section 2.3.2.3. This enables extremely short latency for the latency-critical machine type communication, but keeps the cyclic prefix overhead low for other—less delay-critical—services. Frequency-domain mixing of numerologies is implemented with Filtered/Windowed OFDM; see section 2.3.1. Since the subcarriers of the two numerologies are not orthogonal, a guard band should be inserted (~10 subcarriers is desirable). As shown in FIG. 95, the partitioning appears static, however, as shown in FIG. 96 the partitioning can change on a longer subframe basis (250 µs for mixing of 16.875 kHz and 67.5 kHz). This is possible since both numerologies are aligned at the longer subframe boundaries.

In the example shown in FIG. 95, two OFDM numerologies are mixed on the same carrier. In this example "16.875 kHz, normal CP" and "67.5 kHz, long CP b" are mixed. A guard band (grey) is inserted between the numerologies. In the example shown in FIG. 96, the partitioning between the two numerologies changes dynamically at longer subframe boundaries (250 μs). In this example "16.875 kHz, normal CP" and "67.5 kHz, long CP b" are mixed. A guard band (grey) is inserted between the numerologies.

The case where each subframe contains only one numerology, but numerologies (may) switch at subframe boundaries is referred to as time-domain mixing of numerologies. Hardware limitations (e.g., linear pre-distortion) may restrict how often numerologies can be changed.

The above description is valid for the use case of mixing mobile broadband and delay-critical machine-type communication in a wide-area deployment requiring a cyclic prefix in the order of 3 μs. For small cell deployments with less delay spread where "67.5 kHz, normal CP" provides sufficiently long cyclic prefix (0.8 μs) the complete carrier can operate with "67.5 kHz, normal CP" eliminating the need for frequency-domain mixing of numerologies.

In general, it is expected that frequency-domain mixing of numerologies is only needed to address the most extreme requirements and single numerology or time-domain switching can address most use cases.

3.3.3.3 TDD Specifics

Figure 97:
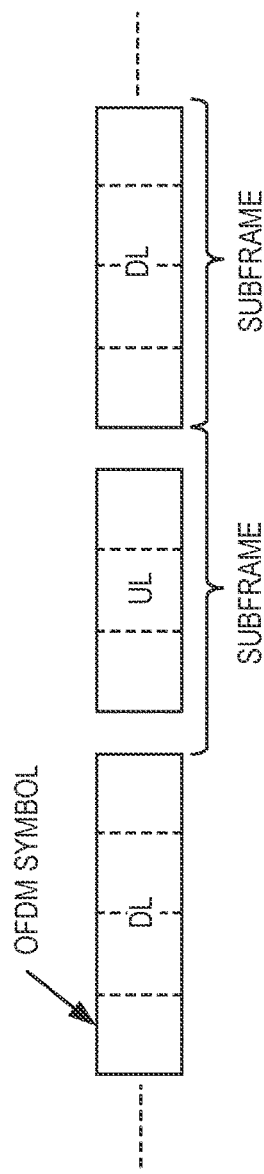
FIG. 97 shows a switching of link direction in TDD.

In a TDD system, resource availability for the two link directions alternates in time. Support of very low latency in TDD requires frequent availability of resources in the direction serving latency-critical data. Support of low latency in both link directions requires very short time durations per link direction and frequent switching between them; see FIG. 97, which shows that to support low latencies in TDD the link direction is switched every subframe. Every switch in a TDD system requires a guard period; hence increased switching frequency leads to increased overhead. The fastest switching periodicity is achieved by alternating link direction every subframe. Per UL subframe, one OFDM symbol duration is distributed as guard period among DL/UL and UL/DL switches and the remaining OFDM symbols are used for UL traffic. Most of the numerologies have 4 OFDM symbols per subframe (except those with extended cyclic prefix, which have 3 or 7 OFDM symbols per subframe); the switching overhead thus becomes 12.5%, not only for the considered link but for all links served by the base station.

Furthermore, in non-isolated TDD deployments even adjacent channel TDD systems need to adopt this very frequent switching ratio. Depending on the reliability requirements, even TDD systems operating on further away frequency channels need to be synchronized. Services requiring extremely low latencies are therefore preferably served via an FDD network.

The switching periodicity imposes also restrictions on the subframe duration. For example, if the switching is done every subframe of the "67.5 kHz, normal CP" numerology (62.5 μs) only numerologies with subframe durations of equal to or less than 62.5 μs can be used.

3.4 Multi-Antenna Technologies

In section 3.4.1, an overview of the multi-antenna technologies in NX is provided. In section 3.4.2, the central point of reciprocity is discussed. In section 3.4.3, three conceptual modes for acquiring CSI at the eNB and designing beamforming for dedicated data transmission are elaborated. In section 3.4.4, three corresponding conceptual modes for UE transmit beamforming are described. In section 3.4.5, the multi-antenna perspectives of other procedures than data transmission are given. In section 3.4.6, some multi-antenna hardware and architecture aspects are discussed.

3.4.1 Overview

Multi-antenna technologies have an instrumental role in the design of modern RATs due to their well-recognized benefits. Specifically, they enable array gain, spatial multiplexing, and spatial diversity, which lead to improved coverage, capacity, and robustness. The multi-antenna features have significantly contributed to the success of LTE and continue driving its evolution to Rel13 and beyond. Multi-antenna technologies have an even larger relevance in the design and performance of NX due to a multitude of factors that are highlighted in the remainder of this section. These factors pose several design challenges, but also provide solution opportunities in the multi-antenna domain.

Driven by the 5G MBB requirement for Gbps peak rates, NX will be first deployed at new spectrum >3 GHz, mainly due to the availability of larger bandwidth. However, extending the operation to >3 GHz also poses challenges due to worse radio wave propagation conditions, e.g., the diffraction and propagation loss increase considerably. One way to overcome the link budget loss is to use UE-specific beamforming at the eNBs for both transmission and reception. While this is already included in LTE, NX provides higher beamforming gains due to the large number of antenna elements that arrays need to have to maintain the effective antenna area at a reasonable cost at high frequencies. The physical size of the antenna array though is expected to have similar size, or even smaller at very high frequencies, since this is important for deployment aspects such as ease of installation, wind load, and visual footprint.

The spatially focused transmission and reception, achieved by UE-specific beamforming from large arrays, is not only required to use larger bandwidths that are only available at higher frequencies, but also enables spatial multiplexing. Increasing the spectral efficiency, in particular by means of MU-MIMO, is an important design goal for NX to meet the 5G MBB capacity requirements. There are at least two major factors that contribute to making this goal viable.

The first factor is the technology evolution towards large-scale active antenna systems, also referred to as massive MIMO, in which several tens or even hundreds of antenna elements or small subarrays, can be individually accessed, even directly from the baseband for digital implementations. This gives massive degrees of freedom to signal processing procedures which greatly enhance the interference reduction capabilities. Moreover, the use of a very large number of antenna elements raises opportunities for reducing complexity and power consumption, and at least partially overcoming the HW impairments; thus enabling use of components with relaxed requirements. The second factor that enables the goal of meeting the NX MBB capacity is that since most of the new spectrum is expected to be unpaired, NX uses TDD. High quality CSI is desirable to further improve the performance potential of massive MIMO signal processing capabilities. TDD facilitates the acquisition of explicit CSI, by making it possible to achieve the strongest (so-called coherent) form of reciprocity, especially for large arrays for which feedback-based schemes may have significant signaling overhead. Explicit CSI makes it possible to design flexible precoders that exploit angular spread and suppress interference. In order to rely on reciprocity for CSI acquisition, special requirements need to be imposed to NX uplink signaling and HW design.

NX multi-antenna technologies are relevant, not only for eMBB, but also for C-MTC. Receive beamforming is well known to enhance robustness by means of spatial diversity, and transmit diversity can be used to improve reliability of downlink transmissions. Exploiting reciprocity could allow efficient and robust design, while feedback-based schemes are hampered by the stringent requirements that C-MTC puts on the feedback reporting.

Also, NX multi-antenna technologies are not confined only to high-gain beamforming and high-order spatial multiplexing. For procedures such as random access and broadcasting of control information or when CSI is less reliable, a wide (low-gain) beam pattern may be preferred, e.g., over sequential beam scanning. By proper selection of precoder one can generate beams with variable-width. Furthermore, NX should not be tied only to fully-digital implementations; for several use cases, e.g., indoor deployments operating at mmW frequencies, hybrid analog/digital architectures offer attractive cost-performance trade-offs. Last but not least, NX is expected to be able to capitalize on deployed sites, operate at existing FDD spectrum, and possibly reuse LTE HW platform. In these cases, NX multi-antenna technologies stem directly from the state-of-the-art LTE ones, but are being adapted to NX design principles such as lean and self-contained transmissions, since NX does not have the backwards compatibility requirement.

It is important also to note that NX multi-antenna technologies do not only refer to the eNB. Small wavelengths make viable even for handheld UEs to be equipped with one or more arrays with many active elements, possibly with distributed power amplifiers. Then, UL transmit beamforming becomes a highly relevant feature, e.g., to improve uplink coverage of power-limited UEs. Moreover, in several 5G use cases (e.g., self-backhauling, D2D, V2X, fixed wireless) the classical downlink/uplink notion of cellular access is not as relevant, as the two sides of the link may have similar multi-antenna capabilities.

In conclusion, due to the diverse requirements, the NX multi-antenna technologies are a tool set of solutions with several flavors, rather than "one solution fits all". The common denominator is though that it is possible, when relevant, to use antenna arrays to beamform all channels that benefit from doing so in a given deployment.

3.4.2 Reciprocity

A broad definition of reciprocity is when an estimate of the UL channel can be used when designing the DL transmission. We can think of different "levels" of reciprocity which are summarized as follows:

"Coherent" reciprocity: RX and TX channels are the same as seen from baseband (within coherence time/bandwidth);

"Stationary" reciprocity: Channel covariance matrix is the same for RX and TX;

"Directional" reciprocity: Angles of arrivals/departures (AoAs/AoDs) are reciprocal for RX and TX.

Coherent reciprocity is the strongest form of reciprocity and it is only possible to achieve in TDD. It is very interesting to NX as it provides another means, rather than closed-loop feedback, to obtain explicit CSI; thus enabling the full potential of the digital massive MIMO data mode described in section 3.4.3.3. The signaling overhead of the two techniques scales in different ways; namely, with the number of eNB antennas for feedback and with the sum of number of UE antennas for reciprocity. The techniques are complementary and one can be preferred over the other depending on the use case.

Coherent reciprocity is not only the strongest but also the most challenging form of reciprocity to achieve. The propagation channel, including the antennas, is indeed reciprocal. However, hardware is typically not reciprocal. Reciprocity involves the complete RX and TX chains. There will be impairments that affect performance in that reciprocity will not be ideal, putting requirements on calibration at the eNB and UE sides. Some of the issues that could come into play here are:

Power switching in the UE (normally the phase jumps depending on the power);

RX AGC switching;

Phase ripple in filters (when UL and TX have different filters).

One or more of these should be addressed.

Directional reciprocity can be assumed quite safely in TDD, also outside the coherence time and bandwidth, and in FDD. This is because AoDs and AoAs appear to be reasonably similar even when changing the carrier frequency over a large range, e.g., 6-100 GHz. This is a fact that could (and probably should) be exploited to a much larger degree than considered so far in the concept work. One example is when a low-frequency (LTE) system is used in parallel with a high frequency NX system. DoAs or beam identities could be shared between the systems. Another example relates to CSI acquisition; AoD/AoA can be estimated from RSs in one (narrowband) part of the bandwidth and used over the full bandwidth. This could ease the overhead significantly. Accuracy of resulting CSI depends on the circumstances, e.g., frequency difference between UL & DL and angular spread, as it is not realistic to assume that we can estimate all AoAs accurately.

Stationary reciprocity can also be considered if the gap between the DL and UL bands is not too large and/or there is low angle spreading. This gives, additionally to the directional reciprocity, information on the amplitudes of the AoAs and AoDs.

Reciprocity-Based Reliability and Robustness for C-MTC

It is known that for a system based on fixed antennas, high diversity is desirable to achieve very low error rates; for C-MTC see sections 2.3.3.2, 2.3.4.1, 2.3.5.1, and 3.1.7. The diversity track is judged to be quite safe, but resource inefficient. The problem for C-MTC, or low error probabilities in general, is that every delay and step in a CSI acquisition process gives potential error cases. If we consider traditional CSI feedback information these messages are quite comparable in the number of bits as a C-MTC message and also need robust encoding. An alternative is to use reciprocity that effectively "short-cuts" one step in the CSI acquisition process. Reciprocity-based schemes can thus be used to find and utilize the channel characteristics more selectively and may be hence lower the cost for C-MTC dramatically.

Another question is how hardware related issues like dynamic range and hardware reliability impact the design and how they are handled. Again, there is a large potential in reciprocity-based schemes as they can (at a hardware overhead cost) be used to get channel knowledge to many base-stations without any additional radio resource cost.

3.4.3 Dedicated Data Transmission

In this section, three modes for dedicated data transmission are described, with particular focus on the CSI acquisition. Together, these three complementary modes cover the foreseen multi-antenna solutions for deployment scenarios and antenna architectures. Each of the schemes has its advantages and drawbacks. The element-based feedback, beam-based feedback, and coherent reciprocity-based massive MIMO are described in sections 3.4.3.1, 3.4.3.2, 3.4.3.3, respectively.

3.4.3.1 Element-Based Feedback

Figure 98:
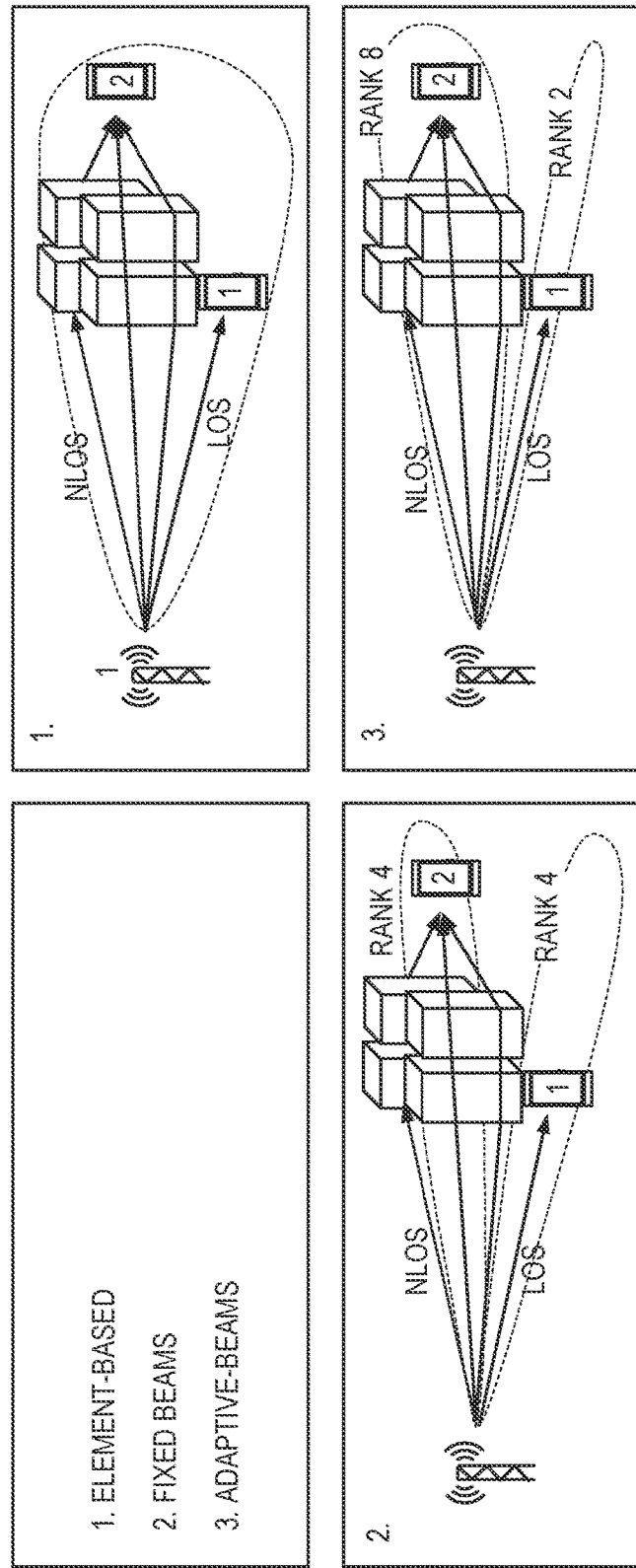
FIG. 98 shows options for beam shapes.

Assume that the hardware architecture is similar to that of a traditional LTE platform. In this case, the assumption is that the best LTE feedback MIMO solutions are carried over without the legacy overhead of LTE, and used with an element-based feedback scheme. Here, an antenna element can mean a single radiating element, or a sub-array of radiating elements. The antenna patterns are fixed or very slowly varying and all of the limited number of TX/RX chains are possible to exploit in baseband. See FIG. 98, option 1, for an example with 8 TX chains. Herein, it is assumed that the number of TX chains is limited to a maximum of 8. Foreseen examples where an element-based feedback scheme would be more appropriate are:

- Nodes operating in FDD with a small number (~10) of antenna elements;
- Nodes operating in TDD with a small number of antenna elements, where coherency cannot be maintained; in practice, this means that hardware calibration is not used;
- Nodes with a small number of antenna elements, where UL/DL decoupling is applied, since reciprocity cannot be used then;
- Nodes where we try to maximize similarity with LTE, perhaps to the extent to reuse the LTE hardware;
- Scenarios when the node or UE cannot sound all RX/TX chains due to limited TX capabilities.

In summary, an element-based feedback scheme is used when coherent reciprocity cannot be used, or when the number of antenna elements is small. For larger number of antenna elements beams are formed using other feedback mechanisms, e.g., beam discovery or explicit feedback mechanisms, as described more in section 3.4.3.2.

It may be surprising to aim to support element-based feedback for only some 10 antenna elements, as LTE already supports 16, and soon even more. The reason for not advocating element-based feedback for larger number of antennas is the lack of flexibility that arises from defining the codebook in the standard: the defined codebook is only defined for a certain antenna size, and is only optimum for a certain antenna layout. Here, the beam-based feedback scheme offers more flexibility, both regarding antenna size and antenna layout.

The main differentiating aspect in handling precoder feedback in NX compared to LTE is in scenarios with more UE antennas and multiple spatially separated eNB transmission points (possibly non-coherent), each with a number of antenna elements. In such case, multiple independent precoders could be signaled due to the fact that the channels in-between transmission points have uncorrelated fast-fading components and a higher number of UE antennas enable the UE to separate the different independent transmissions. In comparison to LTE this enable better support for simultaneous transmission from different transmission points that might differ in terms of large scale channel characteristics.

CSI Acquisition

The CSI acquisition process involves the UE being assigned a CSI-RS from the serving node, which is used by the UE to calculate a rank, a precoder, and the resulting CQI.

CSI-RSs are transmitted according to CSI acquisition demands and only on the part of the bandwidth where there are current or expected future data transmissions; see section 2.3.6.5. The eNB makes the decision when to transmit CSI-RS and when the UE should report. Information on what CSI-RS resources to measure on are conveyed to the UE over dPDCH. In case of element based feedback, it is possible to share, to a larger extent, CSI-RSs between UEs, and enable more filtering in comparison to more dynamic beam-based schemes. An additional potential benefit of sharing CSI-RS configurations is that the UEs can be more easily configured to rate-match around the common CSI-RS and hence utilized more resource elements for data.

Figure 102:
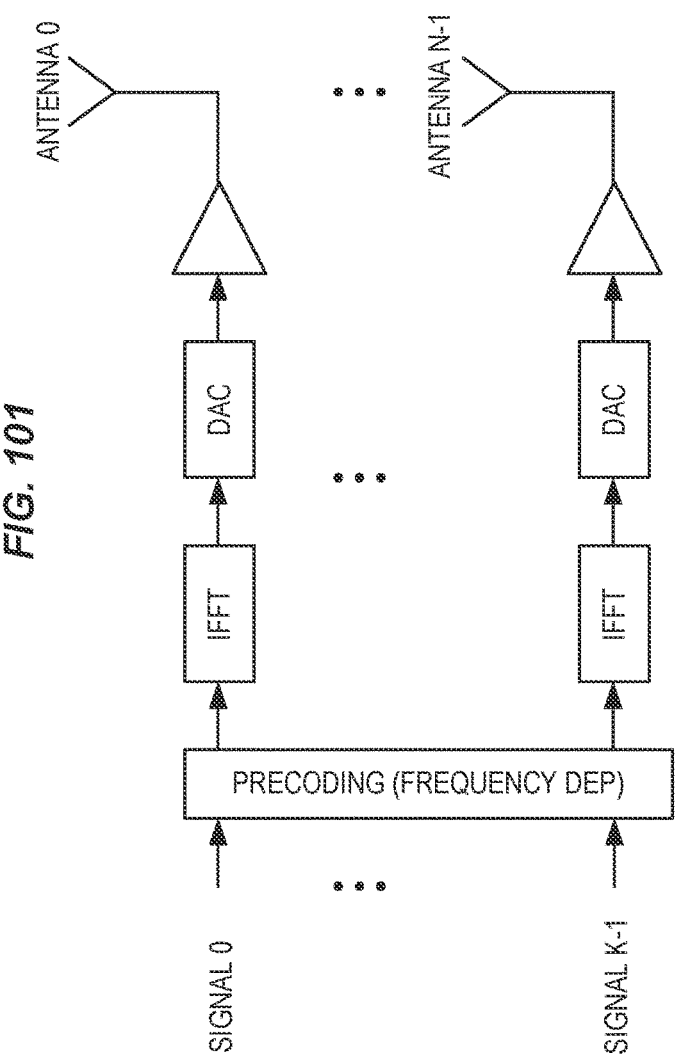
FIG. 102 is a simplified block diagram of a digital precoding-capable antenna architecture.
Figure 103:
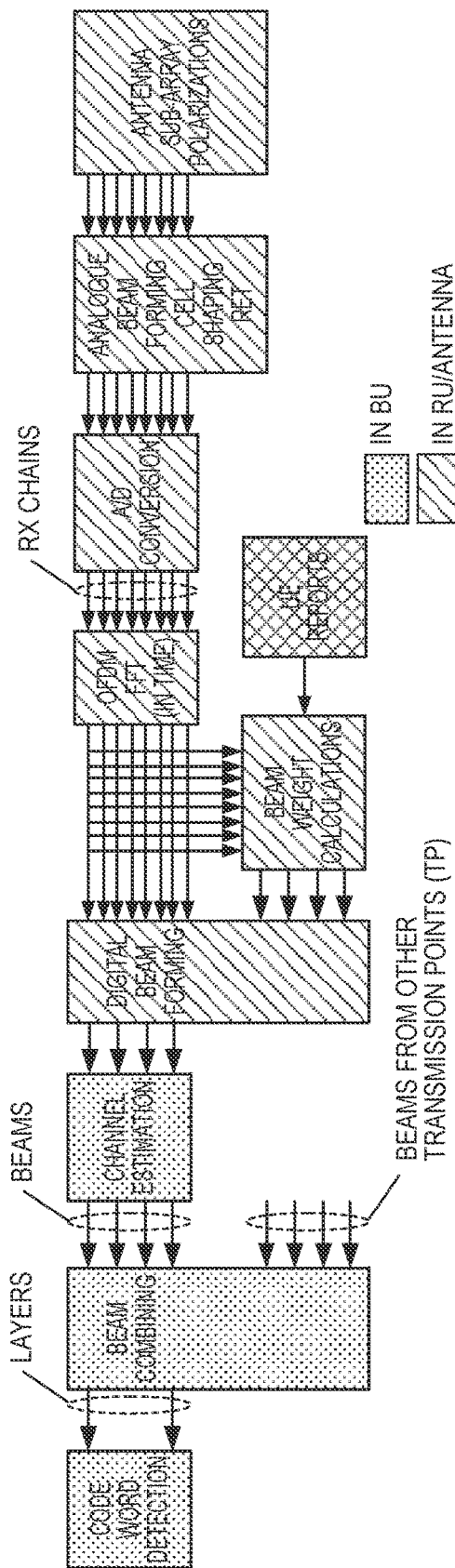
FIG. 103 illustrates an example of receiver processing.

FIG. 102 illustrates options of beam shapes for feedback-based solutions in NX.

3.4.3.2 Beam-Based Feedback

Transmitting in a beam implies that there is a directional, possibly narrow, propagating stream of energy. The notion of a beam is thus closely related to the spatial characteristics of the transmission. To ease the discussion, the beam concept is first explained. In particular, the notion of a high-rank beam is described.

Here, a beam is defined as a set of beam weight vectors, where each beam weight vector has a separate antenna port, and all the antenna ports have similar average spatial characteristics. All antenna ports of a beam thus cover the same geographical area. Note, however, that the fast fading characteristics of different antenna ports may be different. One antenna port is then mapped to one or several antenna elements, using a possibly dynamic mapping. The number of antenna ports of a beam is the rank of the beam.

To illustrate the beam definition, take the most common example of a rank-2 beam. Such a beam is realized using an antenna with cross-polarized elements, where all antenna elements with one polarization are combined using one beam weight vector, and all antenna elements with the other polarization are combined using the same beam weight vector. Each beam weight vector has one antenna port, and since the same beam weight vector is used for the two antenna ports, the two beam weight vectors together constitute one rank-2 beam. This can then be extended to beams of higher rank.

Note that high-rank beams may not work for the UE. Due to the irregular antenna element layout, the rich scattering at the UE and the fact that the UE antenna elements may have different characteristics, it is very challenging to construct several beam weight vectors with similar spatial characteristics. Note that this does not preclude spatial multiplexing in the uplink: this can be achieved using several rank-1 beams.

It is very important to note that the beam shapes can be quite flexible. Hence, "beam-based transmission" is not the same as "fixed-beam transmission", although using a fixed grid of beams may be a suitable implementation in many cases. The working assumption is that each beam has between 1 and 8 ports, and each beam is associated with a CSI-RS with a rank ranging from 1 to 8.

From UE's point of view, no major difference to element-based feedback is foreseen other than the CSI-RS configuration; namely, that for beam-based transmission, the CSI-RS allocations need to be more flexible. Even though the configuration is flexible this does not preclude that the UE may do filtering and interpolation, but this is under strict network control.

Beam-Based Transmission

In beam-based transmission, communication occurs through beams, where the number of beams may be much smaller than the number of antenna elements. Since the beams are still adjustable, the antenna system as a whole retains all its degrees of freedom. However, a single UE is not capable of supporting all these of freedom using instantaneous feedback. Note that this is in contrast to element-based transmission described in section 3.4.3.1, where the UE sees all the degrees of freedom of the antenna, and is capable of reporting based on this knowledge.

From the network's point of view, multiple simultaneous beams can be generated, either using analog beamforming or digital domain processing; see section 3.4.6.1 for a description of various options for beamforming architectures. It is assumed that as long as the formed beams are of similar width as the angular spread of the channel, the overhead to maintain the UE beam associations are reasonable: the best beam for any single UE does not then vary with the fast fading. When the beam is narrower than the angular spread of the channel, the best beam for any single UE varies over time, leading to that the best beam association needs to be frequently updated. In some cases, the antenna patterns are fixed; see FIG. 98, option 2. In some cases, the beams are adapted to the UEs channel characteristics; see FIG. 98, option 3, where user 2 with a rich channel receives data through a wide high-rank beam and the LOS user 1 a narrow rank-2 beam.

Beam-based transmission is applicable in both FDD and TDD, for any frequency band, and antenna size.

Beam-based uplink reception implies that the baseband does not have individual access to all antenna elements. In this case, some sort of spatial preprocessing or preliminary beamforming may be applied. This preprocessing can be performed in the analog domain, in the digital domain, or in a hybrid of the two; see section 3.4.6.1. In general, the spatial preprocessing can be quite flexible. It needs to be time-varying to adapt the coverage area of the antenna to where the users are. Both phase and amplitude tapering can be considered.

In the downlink, the individual antenna elements are never exposed to the UE. The UE only sees a number of linear combinations of the signals transmitted from different antenna elements. The number of linear combinations that is exposed is determined by the rank of the transmission. Data is received at the UE through such a linear combination (the beam) and downlink quality is measured and reported per beam.

Pre-/Decoding Options and CQI Acquisition

With beam-based transmission, the eNB in principle still has full flexibility in forming the desired beams, or equivalently using any precoding. The way to adjust the precoding is different for FDD and TDD, and it is different for different beamforming architectures. In what follows, downlink and uplink procedures are described independently. In many cases, reciprocity can and should be used to improve performance of the procedures. In the final part of this subsection, reciprocity is explicitly discussed.

Figure 99:
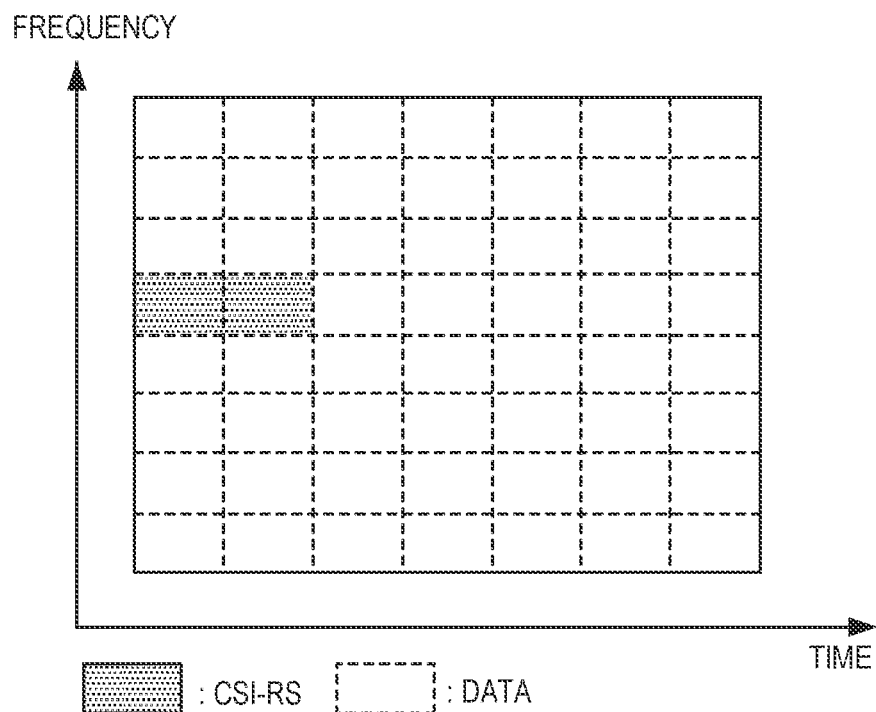
FIG. 99 illustrates an example CSI-RS allocation.

Precoder selection is based on beam-formed CSI-RS (see section 2.3.6.5) that is inserted at specific locations in the time-frequency grid in line with the data. These CSI-RSs are activated on demand, and the eNB decides through which beam the CSI-RS is transmitted. It is assumed that when scheduled, one CSI-RS uses one resource element. Each CSI-RS may be transmitted in different beam, transparent to the UE. One example of a CSI-RS allocation, where two CSI-RSs are transmitted, is shown in FIG. 99.

Both time- and frequency-multiplexing of CSI-RS should be supported, but it should be noted that for beamforming architectures that are not fully digital, transmitting different CSI-RSs at different points in time uses less baseband hardware than transmitting different CSI-RSs at the same time in different subcarriers. On the other hand, transmitting several CSI-RSs in different subcarriers at the same time means that more beams can be measured at the same time.

To enable link adaptation, one of the CSI-RSs can be transmitted over the same beam as the currently scheduled data. Other CSI-RSs may be transmitted through other candidate beams, and the selection of these candidate precoders is the responsibility of the eNB. Still, this is transparent to the UE; only the eNB knows which CSI-RS is transmitted through which beam. For some CSI-RS allocations, observe that if a CSI-RS has high rank and/or multiple associated UEs a precoder assumption can be desirable to improve link adaptation accuracy in the MU-MIMO case, both for interference estimation and signal quality estimation.

The number of CSI-RSs that are required depends on how many candidate beams need to be probed and also how frequent updates are required. Note that in many cases, the number of beams that need to be probed may not be very large. For instance, only two CSI-RSs may be assigned in each subframe, and transmitting through different candidate beams in subsequent subframes. To cater for this flexibility, the CSI-RSs allocation can be signaled in the DCI field. Since the CSI-RS is transmitted in line with the data, the amount of payload data needs to be reduced to make room for the CSI-RS. The amount of overhead varies depending on how many UEs are active, and the flexibility that is desired in the CSI-RS mapping.

Closed-loop codebook based precoding over all the antenna ports of a beam is used, very similar to how it is done in LTE today. The UE measures the CSI-RS transmitted on the antenna ports, derives the most suitable precoding matrix from the codebook using the CSI-RS measurements, and sends an indication of the most suitable precoding matrix to the eNB. Thus, the antenna port precoder is determined by the UE, based on one high-rank CSI-RS, whereas the beam is selected by comparing the CQIs reported by the UEs for different candidate beams. If a beam has higher rank than 2, the precoders would be of larger size and hence operate also over the spatial domain. As in LTE, the codebook for the precoder needs to be standardized.

MRS can also be used to select beams, using the procedures described in section 2.5. As CSI-RS uses significantly less resources than MRS, CSI-RS is generally used whenever possible. As a rule of thumb, CSI-RS would be used within one node. To be more precise, MRS would have to be used when the serving and candidate beams are non-synchronized. Another situation where MRS would have to be used is when the user data in the network needs to be rerouted, e.g., when an S1 path data switch is required.

When a UE is allocated multiple beams, the UE has been assigned several CSI-RSs and each CSI-RS has a certain rank. The UE measures on all allocated CSI-RS, and selects the most suitable antenna port precoder from the codebook. For each of the CSI-RSs, the UE transmits a precoder index, a CQI value and a rank indicator.

Upon reception of the CSI report, the eNB maps each CSI report to the beam it was transmitted in. The eNB chooses the beam for the subsequent transmissions based on the reported CQI values, and also selects the precoder based on the suggestion from the UE. The CQI value is also used to select modulation and coding for the next transmission.

Figure 100:
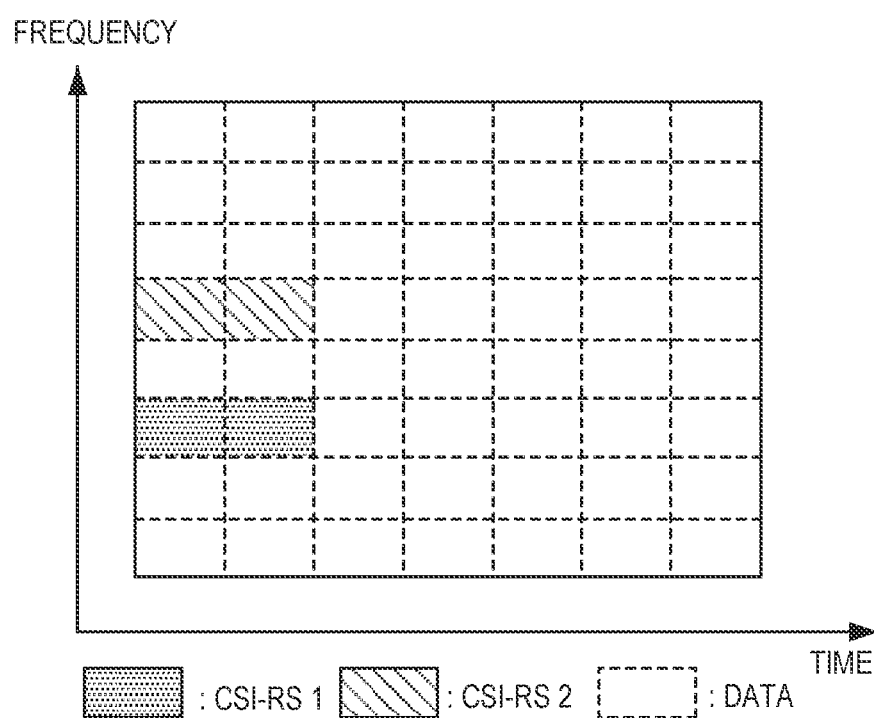
FIG. 100 illustrates a CSI-RS allocation for MU-MIMO operation.

Note that the CSI-RS measurement scheme works also for MU-MIMO. Different UEs are assigned different CSI-RS allocations, as shown in the proposed CSI-RS allocation for MU-MIMO operation shown in FIG. 100. In the resource elements where the CSI-RS is transmitted to one user, interference from the data transmissions to the other user is measured, and vice versa. Hence, both measurements reflect the current interference properties of the co-scheduled user.

The starting point for the design is that the CSI-RSs are UE-specific, where each UE is assigned a distinct set of CSI-RSs to measure on. To reap the full benefits of the antenna system, the network also needs to transmit individual CSI-RSs through UE-specific candidate beams. This means that when there are many active UEs in a cell, quite many CSI-RS transmissions are needed. In that case, there may be an option to let several users measure on the same CSI-RSs, for example, by mapping the CSI-RS to a grid of beams.

For beamformed uplink reception, there is generally no access to the output from all antenna elements. Instead, there is access to a linear combination of these element signals, and that linear combination can only be updated based on previously received data.

Also in uplink, the notion of serving and candidate beams is relevant. We assume that the UE is able to successfully maintain communication with the network over a certain UL beam. In parallel, the network also receives the UE transmission in one or several candidate beams, and uses e.g., the transmitted RRS to estimate the quality in the candidate beams. These quality measures are then used to update the serving beam for subsequent transmissions, and also to form new candidate beams in the future.

The more challenging use case for a beams-based solution is MU-MIMO for two users who have strongly correlated channels in spatial domain. Where this scenario is handled with feedback mechanisms instead of coherent reciprocity (see section 3.4.3.3) the UEs need to emulate inter-beam interference. One possible method to achieve MU-MIMO precoder selection is by configuring the UE with multiple (at least 2) CSI-RS and signaling the UE with some precoder information for the interfering CSI-RS. Further CSI-IM might still be needed to estimate non-coordinated interference.

Much of the complexity in the above procedure lies in how to form relevant candidate beams. In a possible first implementation, a subset of a grid-of-beams is used as candidates. Even in this case, the question on how to choose this subset intelligently is non-trivial. In the absence of any a priori information, the full grid-of-beams may need to be probed, measured and reported. The information about beam quality should then be stored at the eNB, and used for subsequent candidate beam selection.

Candidate beam selection may also include beam narrowing. Here, communication may be initially maintained using a rather wide beam, with that beam then being refined by making it narrower.

It is worth noting that the process described above is based on the assumption that the UE is able to reliably receive a CSI-RS allocation, and to subsequently transmit the resulting measurement. Under this condition, it is possible to maintain, update, and refine the beam used for communication.

Using Reciprocity with Beam-Based Transmission

As reciprocity is a very powerful property to be used with multi-antenna arrays, it is vital to highlight its usage when combined with beam-based transmission.

For TDD deployments, when digital beamforming architecture with adequate calibration is available at the eNB, it makes sense to use coherent reciprocity to select the precoder used for transmission, at least closer to the cell center where coverage of UL signals is good. It then becomes possible to use quite powerful precoders, similar to the description in section 3.4.3.3. However, we may still transmit beamformed CSI-RS together with the data, and use that for link adaptation.

In some cases, coherent reciprocity cannot be used, and weaker reciprocity relied on instead; see section 3.4.2. This includes cases with digital beamforming in FDD deployments. Using coherent reciprocity with hybrid beamforming can be tricky, since there is only access to the uplink channel over the receive beams.

For calibrated analog and hybrid beamforming, measurements on DL candidate beams can be used to choose UL candidate beams, and vice versa. In fact, measurements on DL candidate beams may be used to directly select UL serving beam and vice versa. This is possible both in TDD and FDD.

3.4.3.3 Coherent Reciprocity-Based Massive MIMO

This is the most forward-looking multi-antenna technique in NX, having the highest performance potential for dedicated data transmission and reception. It constitutes a special case in the general class of large-scale individually-steerable antenna systems, also known as massive MIMO. A first distinguishing factor is that it relies on the strictest, so-called "coherent", form of reciprocity, achievable only in TDD, in which the RX and TX channels are the same within the coherence time/bandwidth interval. Explicit instantaneous CSI is obtained by uplink measurements and it is used both for uplink and downlink beamforming design, enabling full exploitation of the angular spread.

A second distinguishing factor is that, in order to realize the performance potential, a fully-digital implementation is assumed (see section 3.4.6.1) that allows element-based, flexible, array processing. Due to the many degrees of freedom that can be used for interference suppression, flexible beamforming can in principle enable high-order MU-MIMO operation. Hence, this mode is particularly suited for increasing the capacity in crowded scenarios with low mobility and good coverage, without need of strong LoS component. For many relevant scenarios, with low angular spread or limited chances for MU-MIMO, massive MIMO processing can be performed in the angular domain, assuming some sort of preprocessing (e.g., by a grid-of-beams), taking into account the tradeoffs among (HW, computational, CSI acquisition) complexity and performance.

Element-Based Precoding Options

Candidate flexible precoding schemes, relying on explicit knowledge of the instantaneous channel matrix, that are being considered in NX are maximum ratio transmission (MRT), zero-forcing (ZF), and signal-to-leakage-and-noise ratio (SLNR) precoding. MRT is the simplest and robust method but cannot null interference. This can be achieved by ZF, but this is more computationally complex and sensitive to channel estimation errors. SLNR is a mixture of MRT and ZF, where the mix ratio can be controlled by a regularization parameter; SLNR is equivalent to MMSE for equal power allocation. For an increasing number of antenna elements, the performance of MRT approaches that of ZF since the channel vectors of different UEs gradually become close to mutually orthogonal.

Conventional flexible precoding solutions are derived assuming a constraint on the sum power of all PAs. This typically results in precoding weights having different amplitudes for different antennas which in turn imply that not all PAs are fully utilized. Even though the power per PA in a massive MIMO system is expected to be in the order of milliwatts, this may still be an issue in the situation where the coverage of the beam should be maximized without over-dimensioning (on the average) the PAs. Taking this power loss into account may translate to a significant performance loss. An ad hoc solution to the problem is to simply use only the phase of the conventional precoder solution. This can in some cases be good enough. A more rigorous approach is to take the per-antenna power constraint into account in the derivation of the optimal precoder, but this problem is difficult to solve analytically.

A feature of coherent reciprocity-based massive MIMO is that, due to channel hardening, the benefits of channel-dependent scheduling diminish with the number of eNB elements. Channel hardening has been validated in single cell setup, but the diminishing returns have been only partly validated for single-user scheduling. It is expected that channel hardening simplifies scheduling and/or link adaptation, but most likely gains even out due to the complicated user grouping for MU-MIMO. Note that frequency multiplexing of users is still a relevant feature.

There are a number of issues that need to be developed before any given implementation of coherent reciprocity-based massive MIMO is put into use, for example:

Computational complexity, data buffering and shuffling;
Multi-user scheduling and link adaptation;
Effect of angular-domain preprocessing;
Performance in different deployments, use cases, traffic patterns, frequencies, etc.

CSI Acquisition

CSI acquisition at the eNB serves the purpose of enabling coherent demodulation of uplink data as well as, assuming that adequate coherency exists, precoder selection for DL data transmission. CSI acquisition is also used to support frequency-selective scheduling and link adaptation.

As interference is not reciprocal, the procedure is complemented by a feedback mechanism that enables a UE to report local interference estimation/measurement to its serving eNB. This interference measurement by the UE can be supported by DL RSs that are similar to CSI-RS and interference measurement resource (IMR) that are similar to CSI-IM in LTE.

Figure 101:
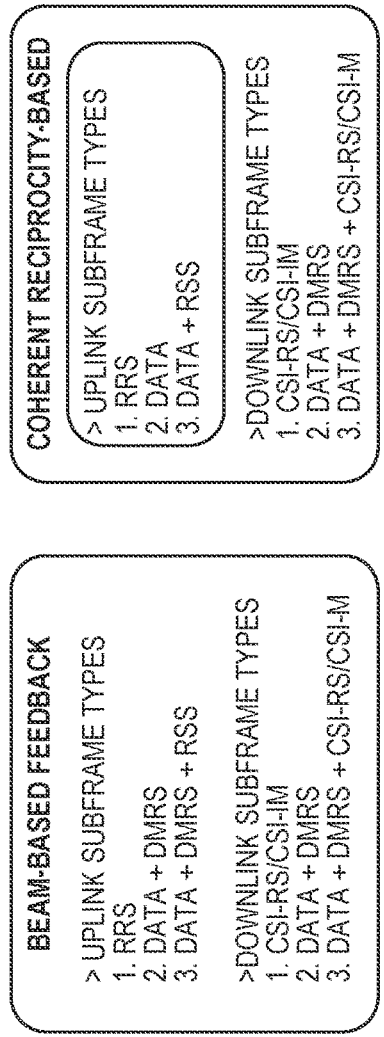
FIG. 101 is a comparison between beam-based and coherent reciprocity-based modes, with respect to CSI acquisition signaling.

CSI acquisition is based on the UL transmission of a new RS, tentatively called reciprocity RS (RRS), whose functionality and properties are described in section 2.3.7.3. RRS provides similar functionality as the SRS and DMRS in LTE. A difference is that RRS is flexibly allocated both in frequency and time, depending on the functionality they provide and the size of the coherence interval. Also, even though RRS are used for demodulation, its transmissions are decoupled from UL data transmissions. In fact, this decoupling is in line with the lean design principle of transmitting RSs only when needed. With RRS, the RS transmission is based on the channel coherence time and bandwidth and the actual need to update its current CSI information rather than connecting RS transmissions to data transmissions as with legacy UL DMRS. The subframe types for beam-based feedback and coherent reciprocity-based modes are compared in FIG. 101.

The RRS design allows a UE to be configured with a set of RRSs that can be flexibly configured by MAC; see section 2.2. To support CSI acquisition for UEs with different coherence bandwidth, coherence time, UL/DL traffic pattern, bandwidth and antenna capability, the RRS is configured by a number of parameters that are similar to the SRS parameters in LTE. Both periodic and aperiodic RRS transmissions are possible. To keep the RRS overhead at a low level but to ensure reliable CSI acquisition, the eNB can trigger RRS dynamically and turn on/off periodic RRS transmission.

Reciprocity-based CSI acquisition imposes constraints on, for example, using different antennas for RX and TX, different numbers of antennas for RX and TX, UE beamforming, channel aging, interference, etc. The system thus needs to be carefully designed to achieve coherent reciprocity.

For multiple antenna UEs, RRS precoding is also supported; see section 3.4.4.2. If precoding is used for data, then RRS also needs to be precoded for demodulation. But RRS used only for DL precoder selection should not be precoded, or, at least, the rank of the RRS transmission should have the same rank expected for the DL. The rank is controlled by the network by explicit signaling and assigning multiple RRS sequences to the UE. When both the UE and the eNB rely on reciprocity (see section 3.4.4.3) there is a risk for a "dead-lock" situation, sticking to a local max instead of a global, in the beamforming process. RS with wide angular coverage transmitted from both UE and eNB may solve this.

To manage pilot contamination as well as to configure the IMRs, massive MIMO operation benefits from some level of multicell coordination. At the minimum, within the sectors/cells comprising a cluster orthogonal RRS can be assigned to avoid pilot contamination.

3.4.4 Multi-Antenna UE Transmission

In this section, multi-antenna UE aspects, mainly related to transmission, are given. In general, UEs in NX can be very different devices. For instance, when NX is used for wireless backhaul, the multi-antenna properties of the UE in the backhaul link are very similar to those of an eNB. Also, UE devices for V2X applications may be quite different compared to smartphones and tablets. Herein, the focus is still on a handheld device, such as a smartphone or a tablet, as this is believed to be the most challenging case.

Three possible modes are described for UE precoding, in analogy with section 3.4.3.

The angular coverage of individual antenna elements decreases at higher frequencies, as compared to currently used frequencies, due to the fact that the elements become smaller in comparison to the size of a device, which leads to an increased interaction between the element and the rest of the device. From measurements, it has also been observed that body losses seem to decrease at higher frequencies. As a consequence, it is expected that the element gain increases.

The orientation of a device is many times unknown in relation to the direction of the eNB (or rather the signal paths). For this reason, it is desired to have an antenna system with more or less "omnidirectional" coverage. Taking the limited coverage per element in consideration, this imposes the need for multiple elements arranged to cover different spatial directions and polarizations. Obviously it cannot be generally assumed that the multiple antennas on a UE are arranged in a uniform linear array (ULA) or uniform rectangular array (URA), as is often the case at the eNB. It cannot even be assumed that the elements are closely spaced or that they are identical.

For a UE with multiple elements, beamforming gains are expected. How large the gains are depends on several factors, such as the number of antennas, channel knowledge, and precoder design. For example, gains in the order of 6-7 dB over an "ideal" isotropic antenna have been found for an array of 8 elements in uplink using a precoder with phase-only tapering. To be noted is that this value only includes beamforming gains; any gains due to reduced body losses are not included. Simpler precoders such as antenna selection, which are feasible since each element is directive and thus offers a few dB antenna gain, suffer significantly in UL given there is one power amplifier per antenna and thus the total output power is reduced significantly.

3.4.4.1 Element-Based Feedback

With element-based feedback, reciprocity is not used. Instead, the channel between each UE antenna element and the eNB is observed via RSs transmitted from each UE antenna. RRS is one possible RS, but potentially an uplink CSI-RS can be considered as well. The eNB receives the RSs, applies all possible precoders, derives a suitable receiver, and estimates the resulting quality for the different precoder options at the receiver output. The result is fed back to the UE, most probably in terms of a PMI, RI, and resulting CQI over dPDCH, in combination with a scheduling grant.

For an element-based feedback solution, a fully digital implementation is practical, where each element is reached by the baseband on both receive and transmit. The radiation properties for each element are fixed.

In contrast to codebooks used at the eNB, precoder alternatives, due to UE antenna topologies, may also include cases where only one or a few antennas are used; the patterns of the individual antenna elements are probably different, especially at high frequencies. The UE strictly follows the instructions from the eNB, and applies the selected precoder; this is similar to the LTE uplink.

As the uplink transmission is based on feedback from the eNB, it is thus agnostic to TDD or FDD. Furthermore, there is fundamentally no need for coherency in between TX or RX chains, nor between RX and TX paths connected to the same element.

3.4.4.2 Beam-Based Feedback

The scenario here is that the UE is equipped with multiple arrays, each array consisting of a (small) number of elements. The different arrays cover different spatial directions. The array can be configured to have different angular coverage (pointing direction and beam width).

The UE transmits RSs through a number of beams, either sequentially or simultaneously. Sequential transmission can be used also with analog TX beamforming, and the detection at the eNB is easier. On the other hand, if RSs are transmitted over several beams in parallel, more beams can be probed in a shorter time. The RS is probably RRS, as different RSs should be transmitted through different beams, so that the eNB can identify each transmission. The shape of each beam is decided by the UE, but the number of beams is between the UE and the eNB. The eNB measures the quality of each received RS, and determines the most suitable UE transmit beam. The decision is then sent to the UE over dPDCH, together with a CQI value and a scheduling grant.

As mentioned in section 3.4.3.2, it may not be possible to form a high-rank beam at the UE. To enable uplink MIMO, several rank-1 beams may be used.

At the eNB, beam-based transmission typically means that the number of elements seen by the baseband is much lower than the number of elements used to form the beams. This implies that the (angular) coverage of simultaneous individual beams is less than by the elements.

At the UE, beam-based transmission for feedback purposes may be used to improve link budget for RSs but perhaps not to reduce the angular coverage, such that the number of beams may still be equal to the number of elements.

For an ongoing transmission there is a possibility to reduce the angular coverage, as is done on the eNB side, but this may imply that, after some time, the channel is not fully utilized. To prevent this, sounding, with wide or possibly full angular coverage, is required.

3.4.4.3 Reciprocity-Based

The scenario here is that each antenna at the UE is equipped with a pair of RX/TX chains and that any differences in amplitude and phase responses are known to an adequate level, either by calibration or design. Hence, coherent reciprocity is assumed. The weaker types of reciprocity (see section 3.4.2) that typically are suitable for FDD at the eNB side, may not work so well at the UE side, in case the transmission involves multiple elements with fairly large, possibly uncertain relative positions and different element types. The reason is that the transformation of precoders from receive to transmit carrier frequency, which may be needed depending on relative carrier separation, may introduce significant errors.

Channel matrix is estimated on downlink RSs, which can be DMRS or, in case of no data transmission in downlink, CSI-RS. How many CSI-RS need to be allocated depends on what transmission scheme is used in downlink. When beam-based or reciprocity-based transmission is applied in the downlink, a small number of CSI-RS is enough. For element-based downlink transmission, one CSI-RS per antenna element may be required, leading to a large overhead.

On the eNB, there are several well-known precoder design principles, e.g., MRT and ZF (see section 3.4.3.3). Similar approaches can be envisioned also at the UE side. However, one or more of the following additional aspects may also be considered:

Power utilization becomes more important, as the UE is typically power limited. Using precoders that result in that no or very little power is transmitted from some of the PAs may not be a good idea. This situation may be quite common at the UE, since the directive antenna elements are pointing in different directions, and may be of different types.

The CSI estimated from DL transmission may be outdated more quickly than at the eNB, due to the rich scattering environment. Hence, a more robust precoder design may be applicable.

EMF requirements are stricter at the UE side. Additional considerations should be taken to ensure that all regulations are fulfilled.

3.4.5 Multi-Antenna Aspects of Other Procedures

In this section, multi-antenna aspects of other procedures than dedicated data transmission are raised.

Note that the case where NX is operating stand-alone is considered here. When NX is tightly integrated with LTE, some of the procedures can be executed over LTE. This is true in particular for the provisioning of system information, described in section 3.4.5.1, for the standalone case. If the RRC connection establishment is done in LTE, the UE would end up in NX CONNECTED ACTIVE state. Note that the working assumption is to use the random access procedure described in section 3.2.2 to get from NX CONNECTED DORMANT to NX CONNECTED ACTIVE.

3.4.5.1 System Information Provisioning

The signature sequence (SS) defined in section 2.3.6.1 is used to convey the signature sequence index (SSI) and provide coarse time sync and for UL power control of random access transmission. It is advantageous for the SS transmission not to rely on beamforming, since it needs to be transmitted over a large coverage area, and in many cases, this is possible since the amount of information that needs to be transmitted is envisioned to be quite small. However, in challenging coverage scenarios, the SS coverage may be insufficient. In this case, the SS can be transmitted in a narrow beam, whose pointing direction can be swept, so that the whole area is covered.

SSIs can be transmitted using beamforming in different ways. For example, different SSIs can be allocated to different beams or SSI reuse for multiple beams can also be considered. This affects the way the RACH preamble detection is performed.

The SSI is used as an index into the AIT. When the AIT is delivered to the UE over NX, it is anticipated that beamforming is not required. Instead, coding and repetition is applied to achieve the desired level of reliability.

3.4.5.2 Random Access Procedure

The random access procedure is defined and described in detail in section 3.2.5.2, whereas the focus in this section is the related multi-antenna aspects. What is important in this context is that the UE initiates a procedure to setup a connection with the network, and the network has no knowledge of the UE location or the beam most suitable for transmission and/or reception.

As the network (or the UE) has no knowledge about the UE location or best beam, it is usually not possible to utilize the maximum antenna gain when transmitting and receiving the messages during random access. This is true in particular for analog beamforming at the eNB and the UE. However, the amount of data that needs to be transmitted is quite small for all the messages in the random access procedure, when compared to the data rates that NX is expected to deliver. Hence, the SINR required to receive the initial setup messages is deemed to be significantly lower, compared to the SINR required for data transmission.

The UE initiates the process by sending a PRACH preamble, described in section 2.3.7.1. The most common case is that no UE TX BF is required, due to the low SINR requirements of the PRACH. If UE TX BF is required, it may be possible to utilize reciprocity to transmit the PRACH from where the SS was received. Note that in this case, it is very likely that only nodes that transmit SS receive PRACH. Also note that reciprocity is difficult to use when SFN transmission is utilized for SS transmission. When reciprocity cannot be utilized, the UE can repeat the PRACH preamble transmission at subsequent transmission opportunities using different TX beams. Hence, the procedure is not optimized for that case, but the increased access delay is simply accepted where coverage is bad. Note that the UE does not have to use the narrowest beam when initiating the transmission, but may rely on a wider beam. The eNB listens for PRACH preambles in the allocated time slots. The network detects which PRACH was transmitted and at the same time estimates the spatial properties of the received signal. These spatial properties are then used to transmit the random access response.

When the SS is transmitted in a narrow beam, which is swept over the coverage area, spatial signature estimation may be unnecessary. Instead, it may be advantageous to indicate different SSIs in different beams, and let different SSIs point to different PRACH preambles. With this setup, the network can deduct which was the best downlink beam by checking the received preamble, and use that info for subsequent downlink transmissions.

For a digital eNB beamforming solution using element-based uplink reception, the spatial properties of the received signal are estimated in baseband. In this case, it becomes feasible to use the full array gain, and no uplink coverage loss occurs. In a TDD system, coherent reciprocity could be used, whereas in an FDD system, the spatial signature needs to be mapped to an angle-of-arrival (AoA) and then mapped back to a suitable beam for transmission. Such a remapping works only for closely spaced antenna elements. Note that we may consider antenna architectures where the digital beamforming is only done over a narrow frequency range, corresponding to the PRACH bandwidth.

For hybrid beamforming architectures (see section 3.4.6.1), the situation is different. Two solutions can be envisioned:

1 Some coverage loss relative to the full antenna gain occurs. This coverage loss is related to the relation between the number of antenna elements and the number of digital receiver chains. Basically, each receiver chain is attached to different, non-overlapping receive beams, and together, these broad beams cover the area from which the PRACH may be received. In effect, the PRACH coverage is $n_{ant}/n_{TRX}$ worse than the maximum PDCH coverage. For instance, with 8 TRXs and 64 antennas, this corresponds to 9 dB. This needs to be accounted for in the dimensioning, but for many cases, PRACH coverage is not limiting. In this case, the spatial signature can be estimated from the combined outputs of the receive chains.

2 For cases with very large antenna arrays and/or very few receiver chains, the PRACH coverage is good enough if the previous procedure is used. The PRACH coverage may then be limiting performance, especially if we dimension for low uplink data rates. Basically, a higher antenna gain is desirable to be able to receive the PRACH. Here the receive beamformer is swept, while the UE repeats the PRACH transmission.

In what follows, it is assumed that the PRACH can be detected, and that a spatial signature, or a suitable downlink beam, can be established.

After having detected the PRACH, the eNB uses the AoA estimated from the PRACH transmission to form a beam to transmit the random access response (RAR), see section 3.2.5.2. The width of this beam is determined by the quality of the AoA estimation from the PRACH reception. The width of the beam can be controlled using the methods described in section 3.4.5.6, if necessary in the analog domain.

The UE receives msg2 and transmits msg3 over PDCH. The eNB receives msg3 using the information from the PRACH reception to improve reception and to refine the AoA estimate. Assuming that the AoA estimated from the PRACH is good enough, the reception of msg3 works for both digital and analog/hybrid beamforming. With the refined AoA estimate, msg4 can be transmitted in a quite narrow beam.

The procedure above sequentially improves the beam selection using the transmitted signals. Once a good enough beam is established so that communication maintained, the procedures in section 3.4.3 are used to refine the beam. In some cases, msg2 and msg4 can be transmitted without any beam refinement.

3.4.5.3 Beamfinding Beamforming

The use of beamforming in NX affects procedures for establishing a new link between the UE and the network. When data transmission employs beamforming, the link establishment includes determining the preferred transmission beam configuration, in addition to the traditional synchronization tasks.

Some examples of such procedures are switching to another set of nodes e.g., when changing the network layer (the current serving beam may then be irrelevant) or first access in a new frequency band (the spatial properties of the new and previous bands may differ significantly). When the UE has an established link to the network, at some node layer at some frequency, beam finding towards another layer or frequency is initiated by the network and typically handled as an active mode procedure. DL beam finding is based on providing a set of candidate beams in the DL for the UE to measure quality and report back to the network. The network configures the measurement and reporting modes, issues a measurement command to the UE, and turns on the MRS in relevant beams; see section 2.5.3. The MRS in the different beams are transmitted using beam sweeps in time, frequency, or code space, where the sweep may cover the full range of beam directions, or a reduced subset if usable prior info is available. The common MRS measurement configuration framework is used. UE reports after MRS measurements are then used to determine the first serving beam at the new layer/frequency.

In initial system access scenarios where no prior UE info and beam direction information is available, beam finding may be applied for making the random access procedure more efficient, or in some cases, possible. While control signaling does not typically require the same degree of beam refinement as high-performance data transmission, it is expected that some beam forming is required at higher frequency bands to receive system information and complete the RA procedure; see section 3.2.5.2. The SSI design includes beam sweeping mechanisms and identifications for the different DL beam configurations; see section 2.3.6.1. The UE reports back the best received option in the UL RA preamble. This beam finding info is then used by the responding node to direct the RAR and subsequent signaling in the direction of the UE.

3.4.5.4 Active Mode Mobility

The AMM solution in NX, described in section 3.5, is configured to manage mobility between beams, as opposed to the traditional cell mobility in LTE. Beam-oriented transmission and mobility introduce numerous features that differ from LTE cell mobility. Using large planar antenna arrays at access nodes, with the number of elements in the hundreds, fairly regular grid-of-beams coverage patterns with hundreds of candidate beams per node may be created. The beam widths of the individual beams in elevation and azimuth are determined by the number of element rows and columns in the array.

As illustrated in simulation studies, the coverage area of an individual beam from such array may be small, down to the order of some tens of meters in width. Channel quality degradation outside the current serving beam area is rapid, which may necessitate frequent beam switching to reap the full potential of the antenna array with low overhead. Static mobility signals in all beams are not feasible, so MRS need to be turned on only in relevant beams and only when needed; see section 3.5.3. The relevant beams are selected based on the UE position and prior beam coverage statistics for the different candidate beams, based on a SON database; see section 3.9.4. The SON data may also be used to trigger mobility measurement sessions when the serving beam quality degrades, without the need for continuous neighbor beam quality comparisons.

Evaluations indicate also that sudden beam loss is possible due to shadow fading, e.g., when turning a street corner. The AMM solution includes features that assist in avoiding or rapidly recovering from a sudden link quality reduction or out-of-synch condition; see section 3.5.6.

The AMM solution is presented in detail in section 3.5. This includes both lower-layer procedures (mobility trigger, measurements, beam selection, RS design, and robustness) and RRC topics (beam identity management, inter-node HO, and other higher-layer aspects).

The AMM solution described in section 3.5 supports both beam switches within one node and between different nodes using primarily measurements on MRS. Note that the procedures described in this section can be used to change beams within one node using measurements on CSI-RS. Or to be more precise: beam-switches using CSI-RS can be used for cases when the data plane does not have to be re-routed, and no resynchronization needs to be done. On these cases, the CSI-RS-based procedure is much leaner, and is also completely transparent to the UE.

Furthermore, the AMM solution distinguishes between link beams and mobility beams. Link beams are the beams used for data transmission, whereas mobility beams are used for mobility purposes. Hence, almost all the beams discussed in this chapter are link beams; the mobility beams are only described in this very subsection.

3.4.5.5 Multi-Antenna Functionality for Inactive UEs

In section 3.4.3 the multi-antenna procedures for dedicated data transmission are described. The description focuses on the case when data is continuously transmitted. However, packet data transmission is bursty by nature. Many packets are actually quite small, and idle periods between packets are common and of unknown and varying length. It is crucial that the multi-antenna functionality can handle this type of traffic patterns efficiently. A UE is moved to dormant state when no packets have been transmitted or received for some time. The working assumption is that the network loses all beam related information when this happens, and that the random access procedure described in section 3.4.5.1 is used to return to active state.

However, there is a time period between when the data transmission ends and the UE is moved to dormant. During this period, the UE applies micro-DRX, and it should be possible for the UE to resume data transmission or reception very quickly. This means that the network should maintain some notion of a suitable beam to use for data transmission. Reasonably accurate time-frequency sync should also be maintained, as well as an up-to-date node association.

For element-based transmission, it is assumed that transmissions of downlink reference signals continue also during idle periods. As mentioned in section 3.4.3.1, the different UEs may share the same pilots, so the amount of resources used for this RS transmission is limited irrespective of the number of UEs. Also, it may not be necessary to maintain the full bandwidth of the RS transmission.

For beam-based transmission, the situation is more complicated, since the RS are in general UE-specific. To maintain a suitable beam, the network and UE can rely on some sort of RSs. This may be done by having the UE measure quality on a set of downlink signals corresponding to different beams, and report the beam quality to the network, either periodically or in an event driven fashion. The downlink RSs that have been previously described are CSI-RS and MRS. Here the same principle as for data transmission is applied: use CSI-RS for intra-node beam switches, and activate MRSs from neighbor nodes when no intra-cell candidates are good enough.

The number of UEs that are simultaneously transmitting or receiving data is rather small. However, the number of UEs that are in the active state but not transmitting/receiving can be rather large. As MRSs are only activated when there are no good-enough intra-cell candidates, the number of MRSs is not a bottleneck. However, the CSI-RSs are transmitted periodically to estimate the quality of intra-node beams and with many UEs in active mode, the amount of CSI-RSs that need to be transmitted can be quite large.

To reduce the CSI-RS resource consumption, one or more of several methods can be applied:
  Transmit the CSI-RS more seldom;
  Transmit only low-rank CSI-RS;

Transmit CSI-RS only over part of the bandwidth;
Use wider candidate beams;
Allow UEs to share CSI-RSs.

When combined, these methods should make it possible to maintain quite many UEs in active mode, and to return to high-rate data transmission rather quickly.

For coherent reciprocity-based massive MIMO transmission, it is assumed that the network schedules transmission of RRSs with a suitable frequency to support a quick return to data transfer.

3.4.5.6 Variable Beam Width

Active antenna arrays such as ULAs and URAs offer many degrees of freedom to adapt beam patterns to channel conditions and scheduling needs. One typical beam example from a large antenna array is a narrow beam with high gain, possibly with extra low gain in selected directions for reduced interference spreading.

Such a narrow beam pattern may be typical for user data transmission (as elaborated in section 3.4.3) whereas other types of transmission, such as broadcasting of control information or when CSI is less reliable, sometimes require a wider beam pattern. By proper selection of precoders one can, for many array sizes, generate beams for which the beamwidth can range from very wide, similar to the element pattern, to very narrow. In many cases the precoding may be done by phase taper only, which is important for active antenna arrays since the total output power is given by the aggregated power from all power amplifiers and for pure phase taper the entire available power is used. The EIRP is lower for wider beams since the antenna gain decreases. This type of beamforming can be applied to linear as well as rectangular arrays, and independently per antenna dimension. The wider beam can, similar to the narrow beams, be steered in any direction.

The technique can be used to generate, for example, a beam with identical power pattern and orthogonal polarization in all directions, as well as beams using more ports, either arranged in one or two dimensions.

3.4.6 Hardware Aspects 3.4.6.1 Multi-Antenna Architectures

"Full-Dimension" Digital Beamforming

Ideally, the signals from/to all antenna elements should be digitally processed in the baseband domain so that all the degrees of freedom are available ("full-dimension" digital beamforming), as illustrated in FIG. 102 for the transmitting side. This gives total flexibility in the spatial and frequency domains for post-processing signals at reception and for precoding at transmission; thus, enabling full potential of massive MIMO features such as frequency-selective precoding and MU-MIMO.

FIG. 102 illustrates a simplified digital precoding-capable antenna architecture. For more antennas, the requirements on each radio chain can be relaxed, see section 3.4.6.2. Using a very large number of antenna elements (first NX macro eNBs operating at ~4 GHz are expected to have 64 elements, with one complete radio chain each (FFT, DAC/ADC, PA, etc.) is a radical change in building practices. This necessitates innovative design to keep in reasonable levels the cost, complexity, and power consumption.

Other practical limitations appear: the baseband unit (BU) can perform limited real-time computations (e.g., inverting 64×64 matrices at high rates may not be practical). Also, the data-rate of the radio interface between the radio unit (RU) and BU is limited and scales very poorly with the number of antenna elements (for a rough idea, it is seen reasonable to have about 30 Gbps between RU and BU, which can translate to about 8 streams of 20-bits I/Q data over 200 MHz).

Active Antenna Systems: Moving Processing from BU to RU

To decrease the bandwidth requirements between the BU and RU, some processing can be placed directly in the RU. For instance, the ND conversion and the time to frequency FFT conversion can be done in the RU, so that only frequency-domain coefficients are required to be sent through the radio interface, which can also reduce the necessary bandwidth. Some digital beamforming may also be included in the RU. This is illustrated in the example receiver shown in FIG. 102, for the uplink receiver case.

In the uplink receiver case, to further reduce the radio interface requirements, the number of streams can be reduced with preprocessing at the RU. The goal of this preprocessing is to map the dimension of the antenna elements into the dimension of "useful" streams that are processed by the BU. This may be done "blindly" e.g., based on pure energy detection in either in time or frequency domain (before or after the OFDM FFT), using DFT-based or SVD-based dimension decomposition and selecting the best dimensions for further processing; or may be done with assistance of the BU and results of the channel estimations.

In the downlink transmitter case, similar chain of processing can be done in the reverse order, although the precoding/beamforming commands have to be sent on the radio interface. The transmitter and receiver may have the same number of antenna elements, or they may have a different number of antenna elements.

Hybrid Analog-Digital Beamforming

Figure 104:
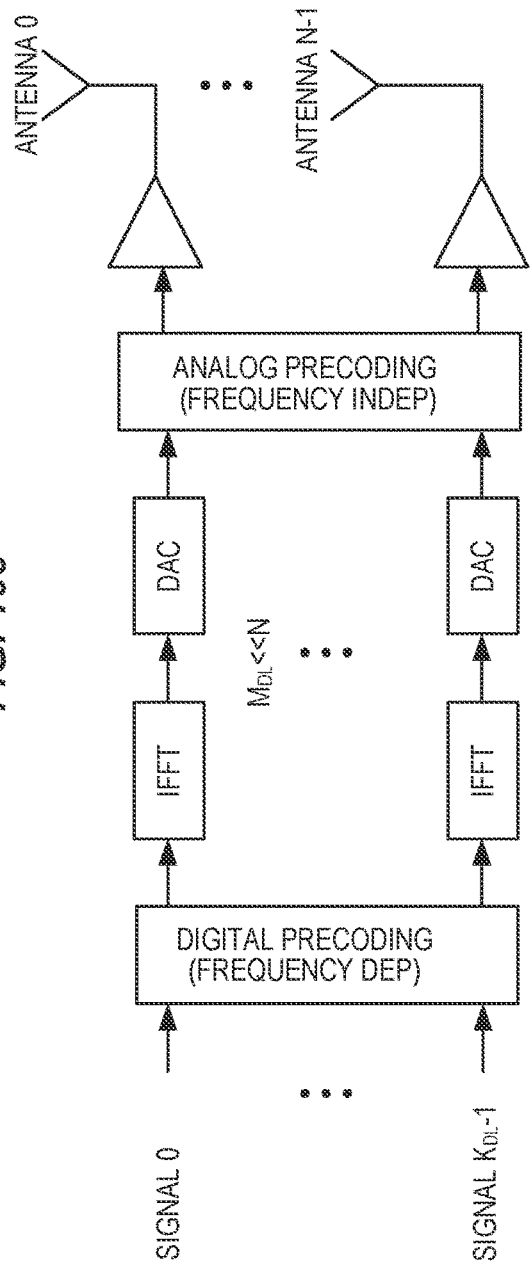
FIG. 104 is a simplified block diagram of hybrid beamforming.

Another solution that partly enables the benefits of large antenna arrays, while considering practical hardware limitations and having promising trade-offs, is the hybrid antenna architecture illustrated in FIG. 104. This usually comprises a two-stage beamforming where one digital stage is used for individual data streams (closer to the base-band) and another beamforming stage is made closer to the antenna elements to "shape" beams in the spatial domain. This second stage can have various implementations, but is usually based on analog beamforming.

Analog Beamforming

Analog beamforming is done in the analog (time) domain, after the DAC, for precoding. Analog beamforming is therefore frequency independent, in that it applies to the entire spectrum, and can be done directly in the RU.

Figure 105:
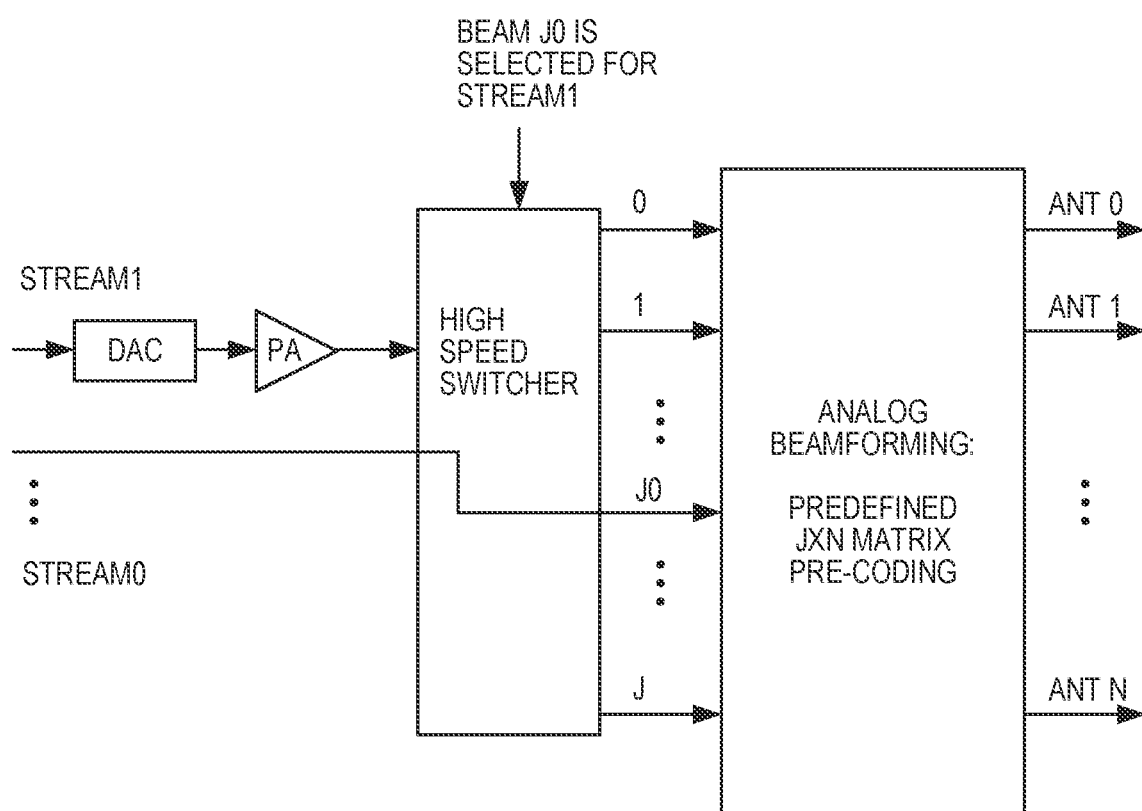
FIG. 105 is a block diagram illustrating analog precoding-capable antenna architecture.

FIG. 105 illustrates a simplified analog precoding capable antenna architecture. Analog beamforming implementations usually rely on predefined grid of beams that can be selected to transmit/received data streams, as illustrated in FIG. 105. Each beam corresponds to a phase-shifting precoder, which avoids having to control the amplitude as this would require additional PA. Beams can be set to form sectors, hotspots, or some spatial separations to allow user multiplexing. Antenna arrays spanning over 2 dimensions can perform both vertical and horizontal beam shaping.

Depending on the implementation, all or only parts of the elements can be used to form the analog beams. Using only a subset of the elements makes the implementation easier by having each beam formed by dedicated elements and thus avoids the issues of "analog summation" of signals. This however reduces the aperture of the antenna and in turn the beam gain. The selection of the beam to use for each stream has to be done with digital commands. It is currently assumed (to be confirmed) that the analog phase shifters can change the beam direction within a CP time (e.g., one or few μs). For shorter CP-durations, especially for the higher sub-carrier spacing, this could be an optimistic assumption. A related issue is how frequently one can actually command the switch to be done (e.g., once per TTI or symbol, depending on the interface . . . ).

3.4.6.2 HW Impairment and Scaling Laws

Much of the feasibility of using very large antenna systems is dictated by the required hardware quality. For example, to achieve coherent reciprocity (see section 3.4.2), requirements need to be specified. If stringent requirements are imposed on a per-antenna basis, the overall cost in terms of power consumption suffers as a result. However, with increasing array sizes, opportunities for reducing complexity and power consumption follow. Some trade-offs are discussed below. Much of the trade-offs are dependent on the channel or pre-coding conditions since this effects the (spatial) correlation between transmit/receive signals.

Data-Converters

To approach a fully digital, large antenna array, potentially large power savings can be reaped by reducing the data-converter resolution on a per-antenna port basis. This has been shown for the down-link, for several different array sizes. 1-bit quantization has also successfully been used in the uplink to recover high-order modulation formats in a multi-user massive MIMO setting. When the channel-vectors becomes highly correlated, as in a LoS case for example, it becomes impossible to resolve multiple users and higher order modulation. For the UL, resolving the near/far issue is still remaining, which may hamper the use of low-resolution converters.

Non-Linear, Efficient Power-Amplifiers and Mutual Coupling

Amplifier linearity and efficiency are flagged as important issues for two reasons, the first of which is the increased carrier bandwidth and carrier aggregation, which limits the linearization bandwidth available to perform correction for the non-linear transfer function of the power amplifiers. The second is the impact of mutual coupling, as dense, highly integrated arrays may reduce the isolation between branches. Both of these issues may result in a need for relaxing the linearity performance on a per-antenna basis, while keeping the performance up over the air.

The out of band radiation and its spatial properties have been studied. In a LoS channel, the gain-curve of out of band radiation follows that of the in-band, but with some attenuation. Thus, the worst case of out of band interference radiated may be found at the intended user rather than a potential victim user. For MU-MIMO over a NLoS channel (IID Rayleigh), the eigenvalue distribution of the transmit covariance matrix was studied in order to understand the spatial behavior of the out of band radiation. It was seen that for the multi-user case (10 UEs), the distribution of the power in the adjacent channel is spread in an omnidirectional fashion. For the single-user case, however, the radiation is beamformed toward the intended user.

Oscillator Phase-Noise

As operating frequency increases, deterioration in terms of phase-noise often follows. For a multi-antenna architecture this may have different effects depending on the oscillator distribution and/or synchronization. The wave-form specific issues (such as sub-carrier interference due to loss of orthogonality) following increased phase-noise are well known and left out here.

A challenge for large multi-antenna systems which follows is the distribution and/or synchronization of local oscillators (LO) in large antenna arrays which need phase-coherent RF in order to perform either beamforming or multi-user pre-coding. Taking a simplified approach, the impact of phase-noise and LO-synchronization can be modeled as a power loss at the receiving user. This in turn manifests itself as decreased SINR, causing performance degeneration as the ratio between signal and interference decreases. For multi-user pre-coding the performance loss depends on the relation between the phase-noise profile and channel coherence time. In the case of short coherence time, the impact of the low-frequency phase-noise is reduced.

Simulations show that for the case of independently free-running oscillators, all power is lost after a certain delay that depends on the phase-noise innovation or LO quality. For the case of low- or intermediate-frequency synchronization, the received power loss is limited only by the frequency stability of the LO's, whereas the power loss is finite even asymptotically.

Centralized or Distributed Processing

In order to fully utilize the large number of degrees of freedom introduced with the increasingly large antenna arrays, the radio signal processing performed likely needs to take an array-centric perspective through vector signal processing in order to fully use the available degrees of freedom. This stretches not only over multi-user pre-coding, but also into areas such as digital pre-distortion, crest factor reduction, etc.

3.5 Mobility

The NX system should provide seamless service experience to users that are moving, and is designed to support seamless mobility with minimal use of resources. In this section, the NX mobility is described. As mentioned in section 1.2, there is dormant mode and active mode in NX, which means that the mobility includes the dormant mode mobility and active mode mobility. The mobility in dormant mode (location update and paging) can be found in section 3.2. In this section, only the intra-NX active mode mobility is treated. Multi-point connectivity and related architecture aspects are discussed in section 3.12. The description of reference signals used for mobility procedures can be found in section 2.3.6. How to maintain beam neighbor lists is discussed in section 3.8.

3.5.1 Requirement and Design Principles

There are some specific needs that the mobility solution should preferably fulfill, which include one or more of:

- The mobility solutions shall support movement between beams without any packet loss. (In LTE packet forwarding is used—some temporary extra delay is OK but loss of packets is not.)
- The mobility solution shall support multi-connectivity, where coordination features usable for nodes connected both via excellent backhaul (e.g., dedicated fiber) as well as via relaxed backhaul (e.g., latency of 10 ms and above, wired, wireless).
- The mobility solutions should work for both analog beamforming and digital beamforming.
- Mobility and UE measurements shall work for both synchronized and unsynchronized ANs.
- The mobility solutions shall support radio link failure detection and recovery actions by the UE. The mobility solutions shall support movement between NX and all existing RATs with a tighter integration between NX and LTE with short inter-RAT handover interruption time.

Desirable design principles for active mode mobility include one or more of:

- A mobility framework built of configurable functions shall be used.

Mobility solutions shall have the flexibility that the DL and UL mobility can be triggered and executed independent to each other.

For active mode, mobility solutions shall be network controlled as a general rule, network configured UE control can be used to the extent there are proven large gains.

Mobility-related signalling shall follow the ultra-lean principle. Preferably it shall occur on-demand, to minimize measurement signal transmission. The signaling overhead and measurement overhead related to mobility should be minimized.

The mobility solutions shall always maintain a good-enough link between the terminal and the network (which is different from "always be on the best").

The mobility solutions should work independently of the "transmission modes".

3.5.2 Beam Based Active Mode Mobility

Multi-antenna transmission already plays an important role for current generations of mobile communication and takes on further importance in NX to provide high data rate coverage. The challenges facing active mode mobility in NX are related to supporting the high-gain beam forming. When the link beams are relatively narrow, the mobility beams should be tracking UEs with high accuracy to maintain good user experience and avoid link failure.

The DL mobility concept of NX is beam-based. In deployments with large antenna arrays and many possible candidate beam configurations, all beams cannot transmit reference and measurement signals in an always-on, static manner. Instead, the connected ANs select a relevant set of mobility beams to transmit when required. Each mobility beam carries a unique Mobility Reference signal (MRS). The UE is then instructed to measure on each MRS and report to the system. From a UE point of view, this procedure is independent on how many ANs are involved. As a consequence, the UE does not have to care about which AN is transmitting which beams; sometimes this is referred to as the UE being node-agnostic and the mobility being UE-centric. For mobility to work efficiently, the involved ANs need to maintain beam neighbor lists, exchange beam information, and coordinate MRS usage.

Tracking a moving UE is achieved by the UE measuring and reporting relevant candidate beams' quality, whereby the system can select beams for data transmission based on the measurements and proprietary criteria. The term beam switching is, in this context, used to describe the event when the ANs update the parameters, e.g., transmission point and direction of the beam. Thus, both intra- and inter-AN beam hand-overs can be seen as a beam switches. As a consequence, hand-over in NX is executed between beams rather than cells as in traditional cellular systems.

The beam type discussed in this section is mainly the mobility beam, which is the entity to update during mobility. Besides the mobility beam, there is also a 'geo-fence' beam which is introduced to ease inter-node mobility in some deployments.

The following two sections describes downlink mobility: choosing which beam/node to use for downlink transmission. One section describes downlink measurement-based mobility and one section describes uplink measurement-based. So far, it is assumed that the same beam/node is used for uplink communication. However, in some cases, it can be advantageous to use different beams/nodes for downlink and uplink communication. This is called uplink/downlink decoupling. In that case, a separate procedure may be used to select the best uplink beam/node. Uplink measurements are used to select the uplink beam/node, and the procedures described in 3.5.4 are used with minimum changes.

3.5.3 Downlink Measurement Based Downlink Mobility

Figure 106:
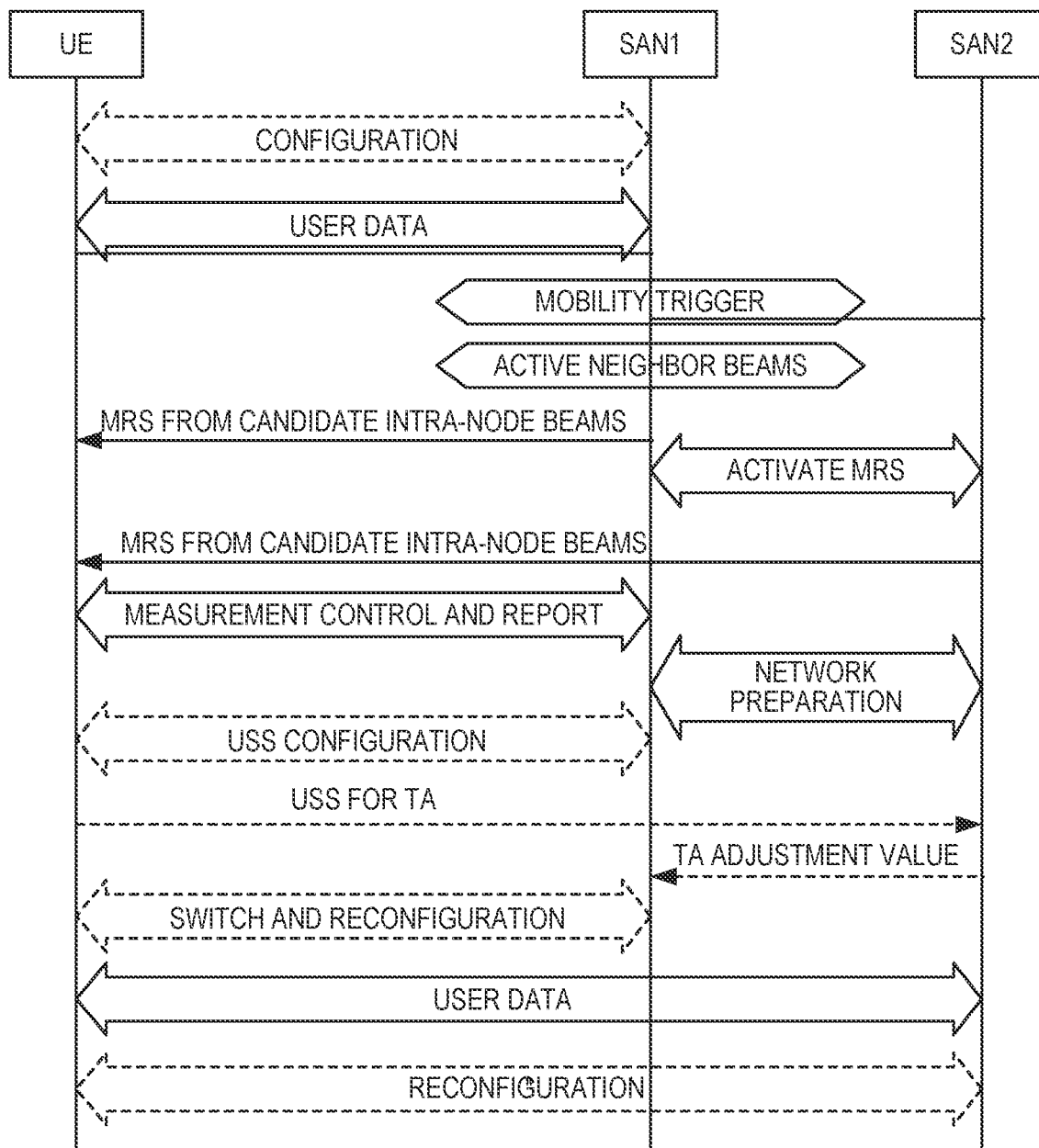
FIG. 106 is a signaling flow diagram illustrating an active-mode mobility procedure.

Several detailed studies of mobility solution options have been carried out, and all these formulations follow a common mobility framework, which can be summarized at a high level as in FIG. 106, which illustrates a generic active mode mobility (downlink measurement based) procedure. After it is decided to trigger a beam switch, a set of candidate beams are selected for activation and measurement. These beams may originate both in the serving AN and in potential target ANs. Measurements are based on Mobility Reference Signal (MRS) transmissions in mobility beams. The network decides the target beam after UE reports the result of the measurements to the network and optionally informs the UE of the selected target beam. (Alternatively, the UE may have been proactively configured to autonomously select the candidate beam with the best measurement result, and subsequently transmit the measurement report to the target beam.) The procedure includes one or more of: UE side:

1) Measurement configuration. UE receives the mobility configuration from network about which MRSs to measure (or the UE could also do a full blind search without a configured list), when to measure, how to measure, and how to report. The measurement configuration can be performed earlier (and continuously updated.)

2) Measurement. UE performs mobility measurements after UE receives measurement activation which is instructed to start measuring on some or all of the entries in the measurement configuration.

3) Measurement report. UE sends mobility measurement reports to the network

4) Mobility execution.

UE may receive a request to transmit USS in the UL for TA measurement and send the USS. The requirement to send USS can be part of measurement configuration.

UE may receive a command (reconfiguration) to perform beam switch, which may include a new beam ID and a TA adjust command. The switch command can also be first informed, and TA can be measured and adjusted in target node.

Or, if the DL sync and UL TA remain valid, and the additional configuration (new DMRS, security, etc.) is not required or can be informed via target node, the UE may not receive a switch command.

Network side:

1) Measurement configuration. Network sends mobility measurement configuration to UE.

2) Mobility trigger. Network determines whether to trigger beam switching procedure.

3) Mobility measurement. Network decides to execute mobility measurement procedure which includes:

Neighbor selection: Network selects candidate beams.

Measurement configuration. Network sends measurement configuration to UE if it is not configured in step 1.

Measurement activation. Network activates MRS in relevant beams and sends a measurement activation command to UE.

Measurement report. Network receives measurement report from UE.

4) Mobility execution.

Network may send a USS request command (reconfiguration) to UE to transmit USS for TA measurement.

The target node may measure the TA value and send the value to the node communicating with the UE who will send TA configuration to the UE.

Network may send beam switching (reconfiguration) command to UE.

Network can send measurement configuration to UE either before triggering beam switching procedure (step 1) or after (during step 3).

The outlined sequence is configurable with suitable settings to serve as a common framework for all active mode mobility-related operations: first-time beam finding, triggered beam mobility update in data transmission and monitoring modes, and continuous mobility beam tracking.

A configuration of the generic downlink active mode mobility procedure where the UE moves from Serving Access Node 1 (SAN1) to SAN2, as shown in FIG. 106, is described in the following section

3.5.3.1 Mobility Measurements

3.5.3.1.1 Measurement Configuration

The network may send a mobility measurement configuration to the UE. This configuration is transmitted in an RRC message and may contain information related to measurement events—"what" (e.g., which MRS indices) to measure, "when" and "how" to measure (e.g., start time or criterion and filtering duration), or "when" and "how" to send a measurement report (e.g., report time slot, report best beam IDs or also their powers, etc.). The list may be useful if only a small number of MRS are turned on and can be measured on. But sending the list can be optional for the NW and UE can perform measurements blindly, e.g., detecting all audible MRS signals. Another example of configurability could be inter-node measurements where longer filtering may be required to avoid ping-pong effects. For intra-node beam measurements, a short filter is used.

A measurement configuration may be sent by the network at any time. Typically, once the UE receives the configuration, it starts performing measurements. However, this procedure could be further enhanced by transmitting an activation command in the DCI field. Thus, the RRC message would only configure the measurement but may not necessary initiate the UE to start performing such measurements.

3.5.3.1.2 Measurement Report

The UE sends measurement reports based on the configuration provided by the network. Measurement reports are typically RRC messages sent to the network. However, in certain cases, some type of reports could be sent over MAC. For the L3 based report, different number of beams can be reported concurrently, allowing to find the preferred beam in a short time, however it requires more signaling overhead, and it is not easy to integrate beam switching with the scheduler. For L2 based reporting, there is less overhead, and it is easy to integrate with scheduler, however, a fixed maximum number of beam measurements can be concurrently reported.

3.5.3.2 Mobility Monitoring and Triggering/Execution

The MRS transmission and measurements are triggered based on the observed link beam/node quality when data transmission is ongoing, mobility beam quality in the absence of data, or reports sent by the UE. Other triggers such as load balancing may also trigger mobility measurement execution.

There are different trigger metrics and different conditions. The metric to reflect beam quality is either RSRP or SINR. The condition can be one or more of:

a1) comparison to one absolute value,
a2) comparison to multiple different relative values to a reference table according to position,
a3) comparison to values of other beams, or
a4) degradation rate of the link beam quality. Practical trigger mechanisms that react to changes in the current quality metric have also been demonstrated.

The observed beam can be one or more of the:

b1) current serving link beam (DMRS or CSI-RS),
b2) current serving link beam plus its 'sector' beam,
b3) current serving mobility beam (MRS).

The different types of switching (e.g., intra-node or inter-node) may have different thresholds. For example, when link quality is worse than threshold 1, intra-node beam switch is triggered. When link quality is worse than threshold 2, inter-node beam evaluation and switching is triggered. If excellent backhaul (e.g., dedicated fiber) is present and there is no problem with ping-pong effects, both intra-node and inter-node can use the same parameters.

When the network decides that a serving beam/node identity need to be changed/updated/modified, the network prepares the mobility procedure. This may imply some communication with other nodes in the network.

There are several options for reporting the MRS measurement results to the network:

c1) If the UE reports all measurements to the serving node, the serving node determines the node to switch to and signals to the UE. This approach relies on the existing serving link for all signaling during the mobility procedure. TA towards the new serving beam is estimated in conjunction with the switch command. Details of TA estimation are covered in section 3.5.3.4.

c2) If the UE reports the measurements back to the individual nodes where the different MRS came from, the reporting itself requires a previous USS transmission and TA estimation—it is then seen as part of the measurement procedure. Once the NW has decided the new serving node and signaled to the UE, the UE uses the already available TA towards the new serving node. This approach requires more UL signaling, but removes the critical dependence on the old serving link once the measurement command has been issued.

c3) Similar to c2), but the UE reports all the measurements back via the serving beam and via the best of the measured new beams. Then, only one TA estimation procedure should be conducted.

Eventually, the network may request the UE to apply a new configuration. There may be situations in which a reconfiguration could be transparent for the UE, e.g., in an intra-node beam switch. The reconfiguration then happens on the network side, a serving beam/node may be changed; however, the UE keeps the existing configuration. If a reconfiguration is needed, it can be configured before or after the switch.

3.5.3.3 Infra/Inter Node MRS Activation/Deactivation

In general, the MRS is only transmitted based on demand. The network decides which candidate beams, or neighbor beams, should be activated. Candidate beam selection can be based on, e.g., a beam relations lookup table. This neighborhood lookup table is indexed by either UE position or radio fingerprint. The position can be the accurate position (GPS info) or an approximate position (current serving beam info). Creating and maintaining the neighborhood lookup tables is a generalization of the automatic neighbor relations (ANR) management process, handled by the SON functionality in the network (cf. section 3.9.4). The tables can be used both for providing trigger criteria (section 3.5.3.2) to initiate a measurement session towards a given UE and for determining the relevant candidate beams for measurements and a possible beam switch. The beam in this lookup table can be either a normal mobility beam or a 'sector' beam. The neighbor beam relationship table size can be reduced; both from the memory consumption and from the signaling consumption perspective, if the candidate beams are wide and the number of beams is lower. In some network deployments, e.g., deploying NX in LTE frequency bands or in a high load and frequent handover area, it may be preferable to configure the MRS to be always-on, so that potentially many UEs that are covered by the same mobility beams can continuously track the quality of neighbour beams.

3.5.3.4 Timing Advance Update

To report MRS measurements to nodes other than the serving node, and to resume UL data transmission towards a new serving node, the UE needs to apply correct timing advance, which typically differs from the TA for the current serving node. In a non-synched NW, the TA estimation always needs to be performed. USS transmission is then configured per-measurement in the MRS measurement command or statically by RRC. The same applies in synched macro NWs, where the ISD exceeds or is comparable to the CP length.

In a tightly synched NW with short ISDs, on the other hand, the TA towards the old serving node may also work well for a new serving node. The UE can deduce whether that is the case from whether the old DL timing sync works for the new node. It would be efficient not to do new TA estimation unless really necessary. The NW-controlled approach is that the NW configures the UE to transmit the USS (or not) on a per-measurement basis in the MRS measurement command. TA is not estimated if the NW estimates that the old and new nodes can share the same TA value, otherwise the UE is requested to send USS. Alternatively, in a UE-controlled approach, the UE can omit sending USS in the UL if it determines that no re-sync was necessary to measure the new node's MRS. Here, the node still needs to reserve resources for USS reception.

If the TA is to be changed, this is conveyed using dPDCH or PCCH either over the old serving beam or from the new node (where the DL is already "operational" since the UE has synched to the MRS).

In MRS reporting solution c1 above, the USS may be sent in the UL and TA update in the DL may be sent as part of the beam switch command and handshake.

In MRS reporting solutions c2 and c3 above, the UE sends the USS as part of the measurement report procedure towards an MRS-transmitting node, and receives a TA update as a separate message.

In some deployments, where the UE position may be determined with high accuracy, the required TA correction when switching from old serving beam to a new one may be retrieved from a previously collected database. The database is created based on previous TA measurements managed according to SON principles.

3.5.3.5 Configurable Sequences

The mobility measurement sequences are essentially the same as in LTE. The mobility monitoring and triggering sequences are similar to those in LTE, but some details differ, e.g., the criteria of launching and the UE-specific signals available for mobility measurements. The MRS activation sequence where reference signals (MRS) are activated dynamically in a UE-specific candidate beam set is a new procedure in NX. Activating and deactivating MRS on request, and in a UE specific manner is critical for lean design. The main new challenge in NX is for the network to decide which candidate MRSs are activated, and when. The latter aspect may be especially critical at high frequencies due to shadow fading. Some preparations and signaling may be needed in the network when candidate beams are activated in several different nodes. Nevertheless, this procedure is transparent to the UE. The UE is only informed about the measurement configuration and the UE reports accordingly, without having associated the beams with specific nodes. The TA update sequences can also be measured and adjusted in target node after the switch command is first informed. Also the additional reconfiguration is probably required.

The beam switch triggering procedure differs depending on how MRS is designed and transmitted. More specifically there are three typical cases:

1. The beam MRS is only activated when serving beam quality degradation is detected. MRS for all relevant candidate beams in the lookup table are activated, no matter if the beam is from the same node or from a neighboring node. The table building can be part of the SON functions. The UE measures on all the MRSs and sends the measurement report.
2. Either all the sector MRSs in the lookup table or the sector MRS containing the serving beam for the active UE is configured and transmitted periodically. UE can also keep track of the quality of the transmitted sector MRS and report the quality periodically or in an event-based manner.
3. The serving mobility beam is adapted to continuously track the UE to maintain the maximum beam gain, which is similar to the CSI-RS procedures in section 3.4. The UE reports an error signal between the current serving beam direction and the estimated best beam direction, using additional beams in the neighborhood of the serving beam.

Case 1 is more suitable for services without strict QoS requirements, while case 2 is more suitable for time critical service with additional overhead. (There are also hybrid options, e.g., activating all the MRSs in the lookup table for a given UE, with additional overhead.) In case 3, with UE specific reference symbols, any modification of beam shape within one node can be transparent to the UE—no signalling is required, unless RX analog beamforming is applied in the UE side.

3.5.4 Uplink Measurement-Based Downlink Mobility

It is also possible to use uplink measurements to select downlink beam. On a high level, it can be assumed that such measurements are performed on demand, when a beam switch is deemed necessary. Hence, the concept of a mobility event still applies, and some sort of trigger to start the event is relied upon.

Since the downlink beam is being updated, it is natural to still monitor the downlink performance, using any of the measurements described in the previous section. For instance, CQI measured on CSI-RS or MRS may be monitored.

Using uplink measurements to choose the AN used for downlink transmission usually works well, providing that different ANs use the same transmit power and have the same antenna capabilities. Otherwise, this has to be compensated for.

To use uplink measurements to select downlink beam within one node, reciprocity between uplink and downlink is desirable. Passive antenna components and the propagation medium are physically reciprocal for TX and RX, but active components and RF filters in the RX and TX paths typically exhibit asymmetries and phase variations that do not yield automatic reciprocity in all cases. However, by introducing additional HW design constraints and calibration procedures, any desirable degree of reciprocity may be provided.

As discussed in detail in section 3.4, different levels of reciprocity may be distinguished:
- "Directional": Angles of arrivals/departures are reciprocal for RX and TX,
- "Stationary": Channel covariance matrix is the same for RX and TX,
- "Coherent": RX and TX channels match, as seen from baseband within coherence time/bandwidth.

For the purposes of mobility, generally aiming at a proper grid-of-beams beam selection across many fading cycles, directional reciprocity typically suffices. Pairwise antenna element calibration techniques in the TX and RX paths can provide the required inter-element phase coherence. "Directional" reciprocity allows using UL measurements for downlink TX mobility beam switching as well in the discussed grid-of-beams configurations.

To obtain the uplink measurement, the network requests the UE to send UL reference signals to the network. One possible reference signal for mobility measurements is the USS. The USS can be detected not only by the serving node, but also by the neighbor nodes. The neighbor nodes should hold transmissions of UEs that they are serving, to clear the transmission resources where the USS will occur.

If the coverage situation is challenging, the UEs may need to use TX beamforming to transmit the USS. In this case, the UE is required to transmit the USS in all candidate directions, and different USS identities may be allocated to different uplink TX beams in the UE side so that the network can feed back the best UE TX beam identities. If the UE cannot transmit in more than one direction simultaneously, the beams transmissions may be time-multiplexed. The USS can be transmitted from the UE periodically or be event triggered (when the quality of the link beams degrades). Such beam sweep configuration is more complicated in the UL than in the DL, due to the irregular UE antenna array layout. Suitable sweep patterns may be determined in several ways using prior calibration or on-the-fly learning by the UE.

In the network, the candidate AN attempts to detect the USS in different beams, and selects the best beam. If analog beam forming is used by the network, the nodes cannot perform the measurement of a large number of beams in one USS period. The AN can scan the USS using different RX beams sequentially. Coordination of UE TX and AN RX beam sweep patterns is complicated. Relying on this combination should only be considered if really mandated by the coverage requirements.

There are some requirements on signaling between UE and network, which include, e.g., the number of USS used in UE and the repetition period for network scanning. It may be assumed that the same procedure is adopted as for MRS configuration: configure USS transmission parameters using RRC, and activate transmission using MAC.

There are several alternatives to perform downlink beam switching based on the uplink measurement.
1. The narrow (link) beam can be selected directly based on the uplink measurement.
2. The beam selection based on the uplink measurement decides the mobility beam, and the narrow (link) beam can be selected based on the complemented downlink measurement later.
3. The mobility beam is first decided by the uplink measurement with a wider RX beam. After that, the narrow (link) beam can be further decided by uplink measurements with narrow RX beam. When deciding the narrow beam, the other RS might be measured in the narrow beams that are located within, or in the vicinity of, the selected RX beams in first part.

Figure 107:
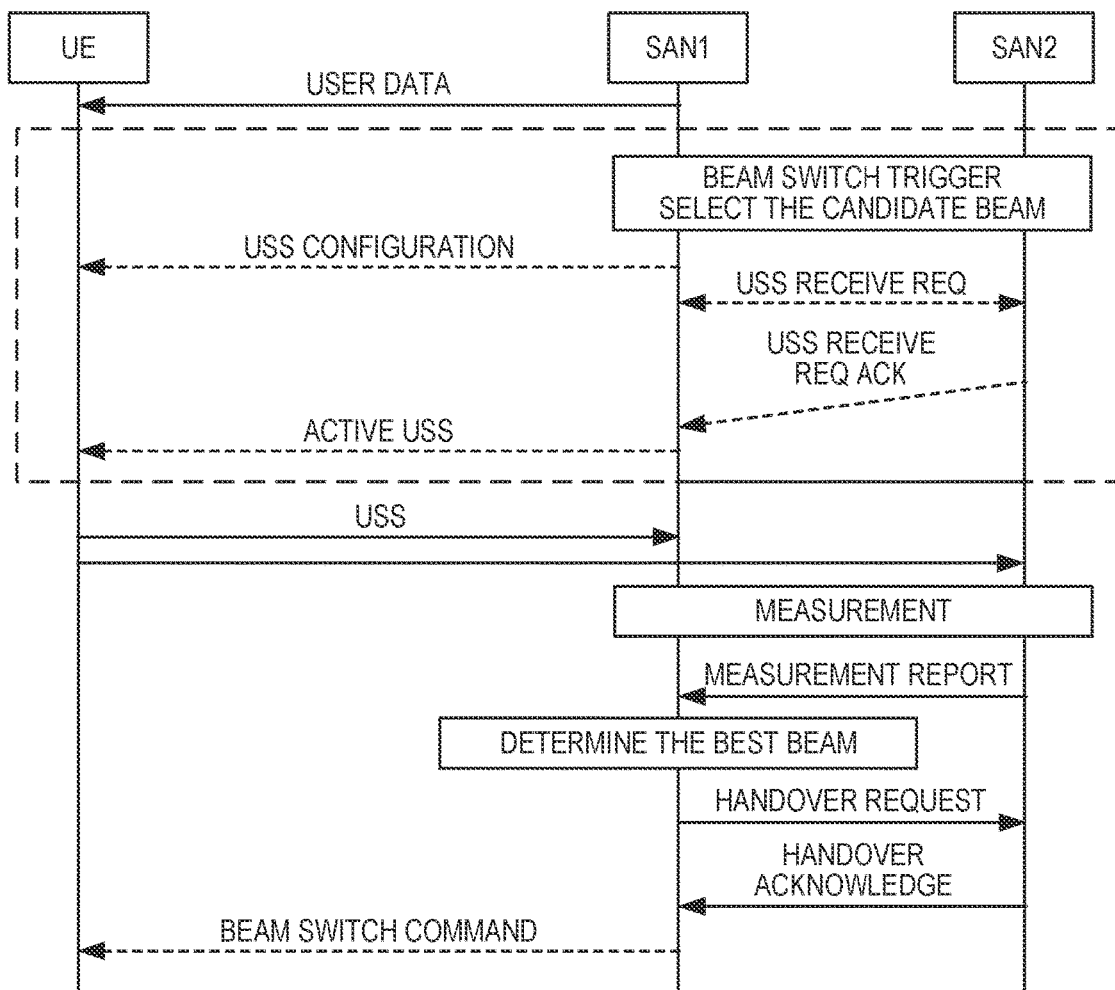
FIG. 107 is a signaling flow diagram illustrating beam selection based on uplink measurement.
Figure 108:
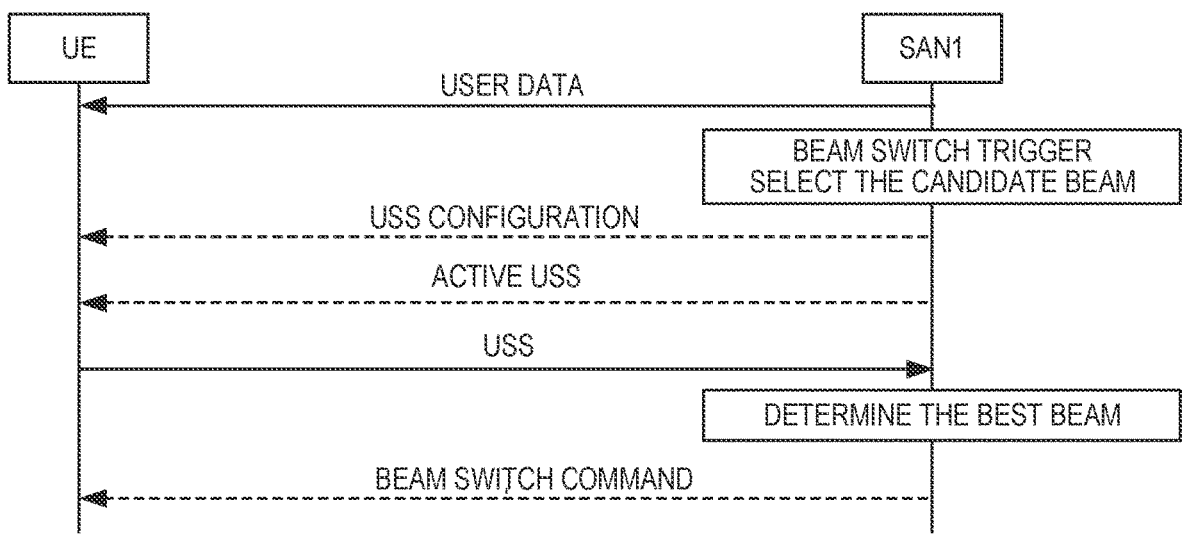
FIG. 108 is a signaling flow diagram illustrating intra-node beam selection based on uplink measurement.

In the three alternatives, the beam selection procedures (beam selection in alt. 1, wide beam selection in alt. 2 and alt. 3) are similar, illustrated in FIG. 107. The procedure of the beam selection based on the uplink measurement can briefly be expressed as follows:
1. Trigger beam switch
2. Activate USS reception between neighbor nodes in relevant beams
3. Activate USS transmission in UE
4. Perform USS measurement in network
5. Determine the best beam based on the measurement report
6. Prepare beam switch if needed
7. Issue beam switch command if needed As said previously, the USS can be transmitted from the UE periodically, or in an event-triggered manner. If the USS is transmitted periodically according to the early configuration, steps 1-3 can be ignored. If a timing advance update is needed, the TA value can be obtained from the USS measurement and the new TA value can be informed to UE during beam switch command. Details of TA estimation are similar to the description in section 3.5.3.4. In the narrow (link) beam selection of Alt3, there is only one small difference, where the beams from neighbor node are not involved. It is a kind of intra-node beam selection, which is illustrated in FIG. 108. Here the "USS" could also be other type of reference, such as RRS. The complemented downlink measurement in Alt 2 is similar as the intra-Node beam switch in case 2 of downlink measurement based method.

3.5.5 Radio-Link Problem

Given a system that is "ultra-lean" and uses massive beam-forming, the traditional definition of a "radio link failure" needs to be re-considered. When data is not transmitted in either uplink or downlink there might not be any signal that can be used to detect that the radio link is failing. Mobility reference signals may, for example, not always be present in an ultra-lean 5G system.

A user terminal may move out of coverage between packet transmission bursts without being noticed. If in-band and/or beam-formed control-information is relied upon, it may not always be possible to reach the intended receiver to continue data transmission to this UE. Alternatively, when a user wants to send data it may not be able to communicate this to the network and be scheduled. In such a scenario the UE has to perform a new random access procedure, which is associated with a significant delay and signaling overhead cost.

For this purpose, a new event denoted a radio link problem (RLP) is introduced. This is used to indicate that there is a mismatch between the network node and user terminal node configuration of the radio link. An RLP can be caused by a network node antenna pointing in a direction where the signal does not reach the intended UE. It may also be caused by an antenna configuration in the user terminal that is not tuned in properly towards the intended serving node in the network.

Note that this section considers only the case where there is a situation that is different from a traditional radio link failure (RLF) in the sense that a radio link problem (RLP) is not an "error event" but something that happens rather frequently. Instead of maintaining a radio link, it can be "fixed," when needed. An RLF type of event may also be used for NX, where the UE really attempts to re-establish using the "normal" access procedure. This may, for example, be triggered if RLP recovery fails. This is not considered in this sub-section.

A fast radio link problem (RLP) resolution procedure is designed to re-establish a radio link between a UE and the network if needed. The UE may detect an RLP event as one or more of:

- Expected DL signal "disappears" (e.g., scheduled or periodic DL-reference signal falls below a threshold). A timer may be configured for how long the signal needs to be below the threshold before RLP is detected.
- A monitored DL signal "appears" (e.g., scheduled or periodic DL-reference signal is above a threshold). A timer may be configured for how long the signal needs to be above the threshold before RLP is detected.
- No response on UL transmission (typically after a scheduling request transmission or a contention-based channel transmission). A counter may be applied for how many transmissions need to be un-responded before detecting RLP.

In addition, the NW node detects an RLP event as one or more of:

- Expected UL signal "disappears" (e.g., scheduled or periodic UL-reference signal falls below a threshold). A timer may be configured for how long the signal needs to be below the threshold before RLP is detected.
- A monitored UL signal "appears" (e.g., scheduled or periodic UL-reference signal is above a threshold). A timer may be configured for how long the signal needs to be above the threshold before RLP is detected.
- No response on DL transmission (typically UL grant or DL assignment). A counter may be applied for how many transmissions need to be un-responded before detecting RLP.

In case the normal (high bit-rate) data traffic occurs in a high antenna gain narrow beam, there may be a pre-configured fallback procedure defined that used another more robust beam (typically lower data rate, lower antenna gain, wider beam-width).

Figure 109:
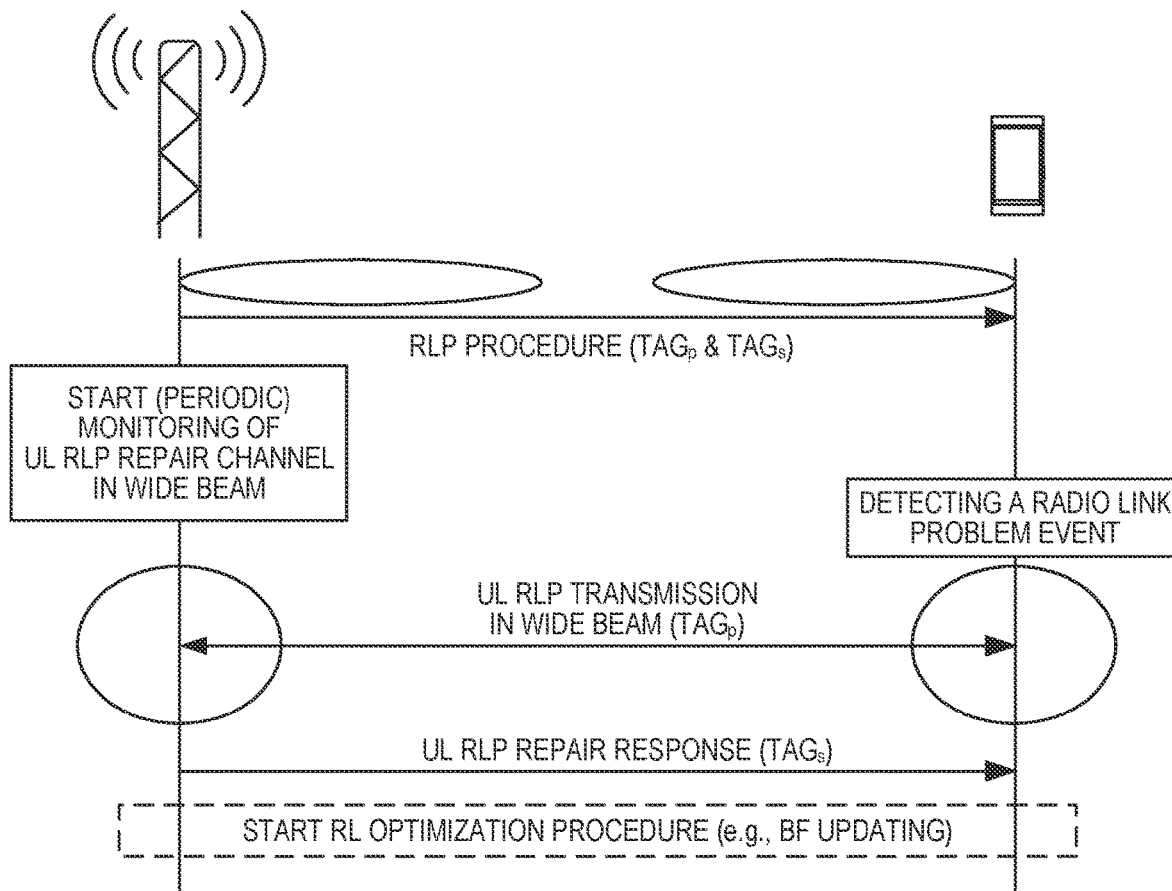
FIG. 109 illustrates an example in which a UE detects a radio link problem and a serving node resolves the problem.

In FIG. 109, which illustrates an example in which the UE detects a radio link problem and the serving node resolves the problem, the UE is the node that detects an RLP in the first (e.g., narrow beam) radio link. Note the narrow oval shapes that schematically depict the network side and the UE side antenna configuration for this first radio link. After detecting the RLP event, the UE sends an UL RLP transmission, possibly using a new antenna and more robust configuration (schematically depicted by the right-hand circle in FIG. 109). The serving network node starts, possibly after an inactivity timer has expired, an uplink monitoring for UL RLP transmissions from the served UE. This reception may be performed using a more robust (e.g., wider) beam (schematically depicted by the left-hand circle in FIG. 109). The UE may identify itself in the UL RLP transmission by using a pre-defined public identifier, here denoted $tag_p$, while the serving node may identify itself in the UL RLP repair response transmission using the identifiers, or tags $tag_p$ (public) and $tag_s$ (serving). When the serving node has several radio links active it knows by examining the received identifier ($tag_p$) which radio link that has a problem. When the UE is prepared to receive an UL RLP repair response from a non-serving node it then has the possibility to distinguish a non-serving node response (that uses the public identifier $tag_p$) from a serving node response (that uses a serving node identifier $tag_s$). Once both nodes, the serving node and the UE, are both aware of the RLP event, then the natural next step is to perform a new optimization procedure for the radio link. Alternatively, the radio link can be allowed to remain "broken" until it needs to be fixed for the purpose of transmitting user data again. In that case the next transmission should preferably start with a robust antenna configuration on both sides. A similar procedure is used in case the RLP is first detected in the NW node.

3.6 Self-Backhaul

One of the features of NX is the integration of access and backhaul using the same basic technology and possibly operating over a common spectrum pool, including operation over the same physical channel or within different channels in the same band. (The use of out-off band dimensioning of access and backhaul is not precluded.) As a desired result of such integration, a base station or an access node (AN) should be able to use the NX technology for both wireless access and wireless transport over, possibly, the same spectrum. This capability is herein referred to as self-backhauling, and self-backhauling in NX may therefore use the access components (e.g., multi-access, synchronization, multi-antennas, spectrum, etc.) supported in NX but for backhauling purposes.

3.6.1 Motivations and Scope

"Small-cell" access nodes can only cope with the anticipated growth in wireless data traffic in cooperation with a robust and capable transport network. There are situations in which no fixed backhaul connection such as optical fiber is available at locations exactly where additional base stations are needed. Dedicated carrier-grade wireless backhaul technology is a cost-effective alternative to fiber and is usually associated with high spectral efficiency, high availability, low latency, extremely low bit error rates, and low deployment cost. The use of wireless backhaul does not only put requirements on the technology itself but also requirements on interference handling which is usually done via careful planning and licensing. The traditional wireless backhaul deployment is typically a single LOS hop.

The continuous evolution of radio access drives the backhaul development, e.g., need for higher and higher capacities, densification, etc. Future wireless backhaul deployments will also in many cases face the same challenges as faced by radio access, e.g., NLOS channels with signal diffraction, reflection, shadowing, multipath propagation, outdoor-to-indoor penetration, interference, multiple access, etc. Wireless backhaul of moving base stations, e.g., those placed on high-speed trains, is an important use case. The performance requirements on backhaul are much higher than those placed on the access link, but the deployment scenarios are likely engineered carefully, often towards stationary scenarios. The high performance requirements may be met by the same techniques used for access networks, namely MIMO, multiple access, interference rejection, mobility etc. This forms the basis of access and backhaul convergence as well as self-backhauling.

The NX design supports both in-band (where access and transport use the same spectrum) and out-of-band (where separate spectra or carriers are used for access and transport) self-backhauling. In-band self-backhaul requires only a single block of radio spectrum for both access and transport and is attractive when acquiring a separate spectrum for transport over the entire coverage area is costly or difficult. In-band self-backhaul also simplifies the hardware, and reduces the associated cost, with a common set of radio transceiver and antenna system. However, when the intended coverage areas of access and transport are substantially different, out-of-band backhaul with separate spectra and dedicated hardware may be desirable. Moreover, in-band self-backhaul can cause mutual interference between access and backhaul links and is thus more challenging than its out-of-band counterpart. To mitigate the impact of mutual interference, radio resource may be shared between access and transport through a fixed allocation in time or frequency domain. Alternatively, the resource sharing may be accomplished in a dynamic manner according to the traffic demands through joint radio-resource management between access and transport to maximize spectral efficiency.

In order to support a variety of different target use cases described in the next subsection, the NX design also supports self-backhauling over multiple (two or more) hops, where the number of hops is counted only over backhaul links, excluding the access link. The multi-hop aspect poses challenges in protocol design, end-to-end reliability assurance, as well as radio resource management.

3.6.2 Target Use Cases

Figure 110:
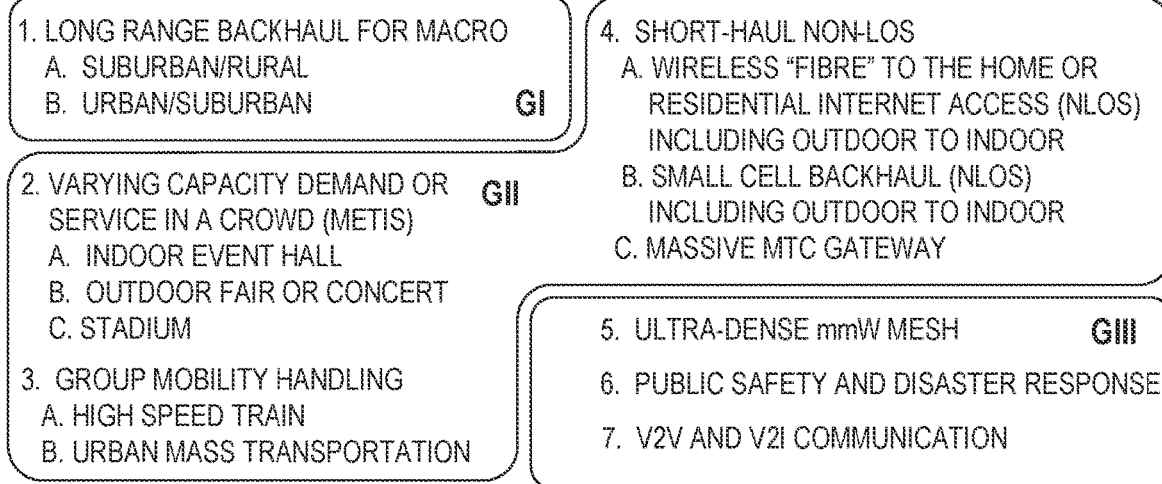
FIG. 110 shows use cases classified into three groups.

The target use cases for self-backhauling may be classified into three groups roughly differentiated on the basis of two main characteristics: topology and availability. The groups may be listed as:
I. Static or Deterministic topology, high availability,
II. Semi-static topology, medium availability, and
III. Dynamic topology, low availability,
where the availability varies as five nines (i.e., 99.999%), 3-4 nines, and 0-1 nine(s), respectively. Among all these use cases, some have been prioritized for attention, because they are either representative or exemplary use cases. FIG. 110 illustrates the prioritization of the use cases as the sequence II.4.b, II.2.b, II.3.a, I.1.a, II.2.c, III.6, III.7, I.1.b, II.2.a, II.3.b, II.4.a, II.4.c, III.5.

The topology of a self-backhaul network is generally a mesh, but it is expected that simpler routing constructs would be superimposed on the connectivity graph. There is usually a tendency to minimize the number of hops needed to traverse the local network; in most cases this leads to the maximum number of backhaul hops to be limited to 2-3 hops. There are however exceptions, such as the high speed train, where the number of hops may grow to a much higher number, such as the number of carriages in the train. (It is certainly true that train carriages can be connected with wired technology, but this brings the additional complication of having to bridge the initial backhaul access towards a wired LAN with adequate transport capacity.)

Figure 111:
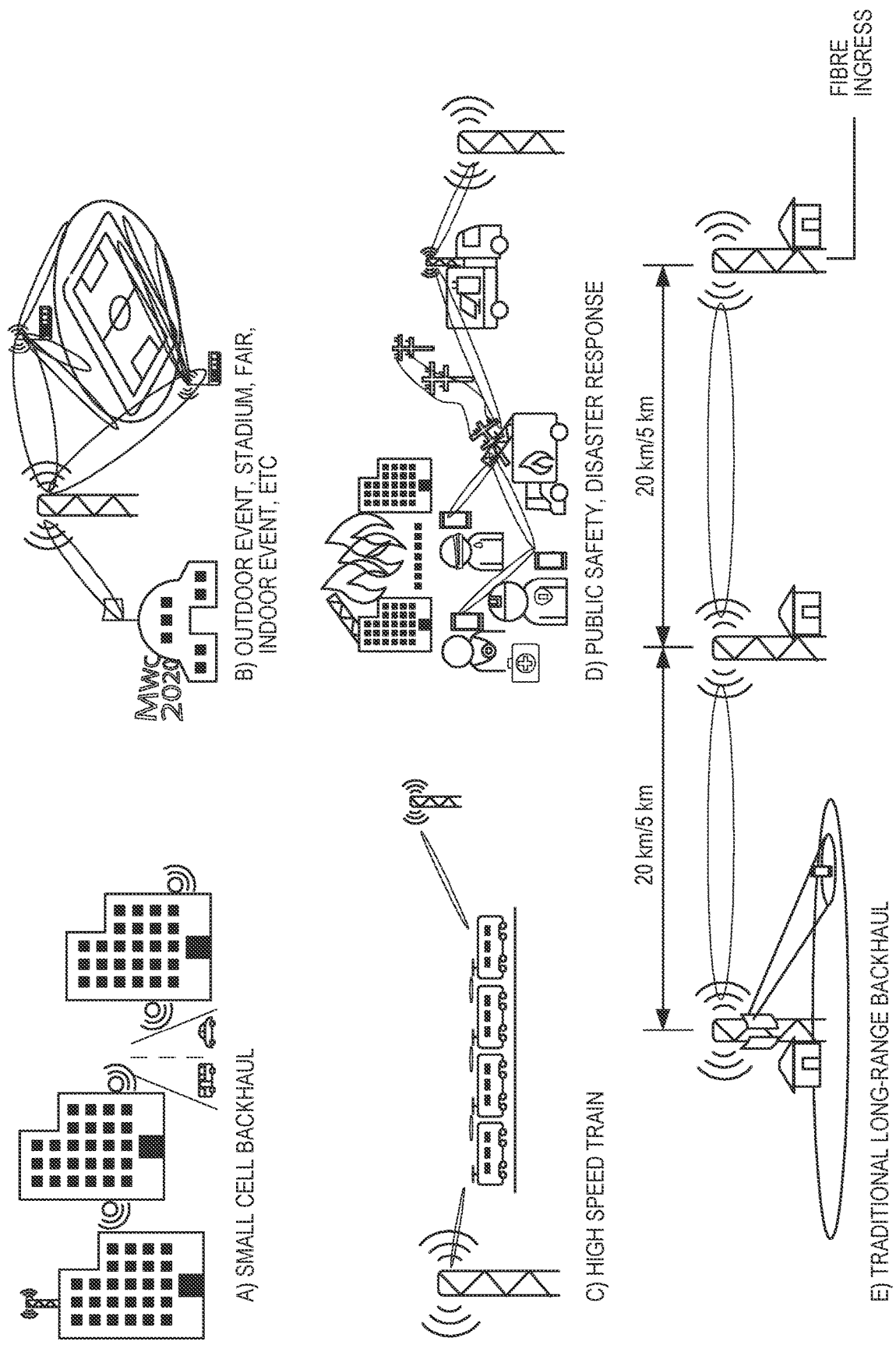
FIG. 111 depicts several use cases for self-backhaul.

The transport format on the backhaul should be flexible. Thus, while it is advantageous that the basic air interface used for NX multiple access and NX self-backhaul links be identical, the air interface should be capable of supporting a wide span of availability requirements ranging from 99.999% or five nines for traditional backhaul replacement to 0-1 nine(s) of availability for the V2V use case. (Many use cases for ITS are not subject to high reliability or low latency requirements, and there are limitations for provisioning high availability for large numbers of vehicles simultaneously.) Important use cases are described in detail below. FIG. 111 illustrates some cases of importance for self-backhaul with a diversity of performance requirements in terms of availability, latency and data rate requirements.

TABLE 15

A tabulation of important KPIs for self-backhaul

| KPI | Small Cell Backhaul | | Event | | Train | | Public Safety | Long-haul transport | |
|---|---|---|---|---|---|---|---|---|---|
| Link distance | 500 m | 5 km | 1 km | 100 m | 1 km | 500 m | 200 m | 20 km | 5 km |
| Frequency Band | 30 GHz | 6 GHz | 6 GHz | 30 GHz | 6 GHz | 30 GHz | >700 MHz | 6 GHz | 30 GHz |
| Hops (backhaul) | 1-2 | | 1-3 | | 1-10 | | 1-2 | 1-2 | |
| Bandwidth | 500 MHz | | 200-500 MHz | | 200-500 MHz | | — | 200-500 MHz | |
| Availability | 99.9-99.99% | | 95% | | 99.9% | | 99.9% | 99.999% | |
| Radio Latency | 50-100 μs | | 250 μs | | 250 μs | | — | 250 μs | |
| Total Latency (one way E2E) | 1-2 ms | | 1-2 ms | | 10 ms | | — | 500 μs | |
| Data Rate | 1-10 GB/s | | 200 Mb/s (user) | | 0.8 Gb/s | 2 Gb/s | 10 Gb/s | 2-10 Gb/s | |

3.6.3 Working Assumptions

To define the scope and set the focus of the NX self-backhaul concept, the following assumptions are made:
1. Self-backhauling (BH) access nodes (ANs) are intended to work in a time synchronized manner.
2. Multiple hops (unlimited) are supported, but performance is optimized for 2-3 hops at most.
3. In-band and co-channel use of access and backhaul are supported (access and backhaul do not necessarily share the same spectrum, but are allowed to do so).
4. Homogeneous backhaul links that only use NX interface.
5. Access interface is not necessarily NX (e.g., may be LTE or WiFi).
6. Routes are assumed to be fixed over significant time periods and may be switched at Layer-2 in local environments or at Layer-3 in the wide area.
7. The self-backhaul links support all necessary network interfaces, such as S1/X2 and BB-Cl/BB-CU, so that core network functionality can be maintained across backhaul links when used for transport. For distributed eNB implementation where higher layers may be conducted in cloud hardware, the support of other interfaces may also be needed.

3.6.4 Unified View of Access and Backhaul

Figure 112:
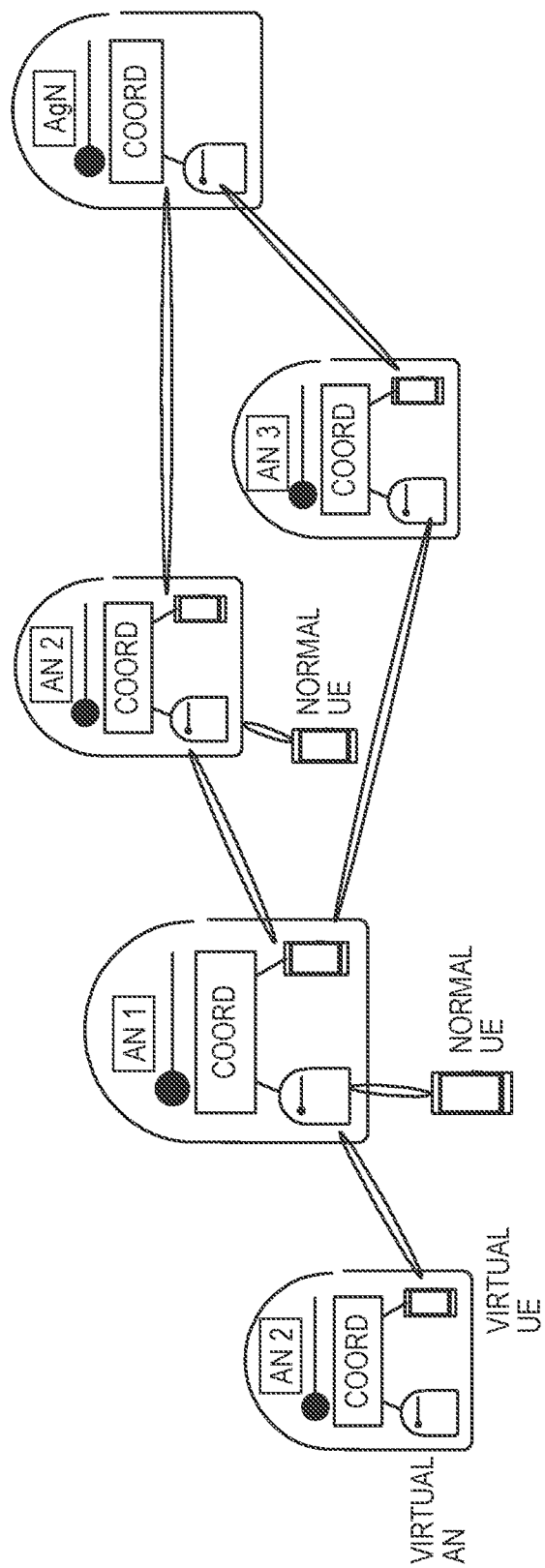
FIG. 112 illustrates a device co-location perspective of self-backhauling access nodes.

To achieve a harmonized integration of access and backhaul, a unified view of the access links (between UE and AN) and the backhaul links (between neighboring ANs) is highly desirable. As illustrated in FIG. 112, a self-backhauling base station or AN serves not only its own assigned UEs, referred to here as the normal UEs or just UEs, in its vicinity as a base station but also its neighboring access nodes as a relay to route data towards and from the core network. Each self-backhauling AN can be considered as a combination of a virtual AN and a virtual UE positioned at exactly the same physical location. An aggregation node (AgN) serves as a special, root node in such a network of ANs that has a fixed (wired) backhaul connection, where all data traffic originates from and terminates at. With this viewpoint, each backhaul link can be treated as an access link between a virtual UE of a downstream AN and a virtual AN of an upstream AN. The entire multi-hop network can thus be seen as a traditional cellular network with only single-hop access links between (virtual or normal) ANs and UEs. Both backhaul links and access links can be treated in the same manner, and any control channels and reference signals defined for access links can be re-used in backhaul links. However, as discussed later in the subsection on route selection, the NX design needs functionality that establishes a routing table at each self-backhauling AN. This may for example be achieved by means of a protocol layer such as the RLC or by an adaptation component of layer 3 such as the PDCP.

FIG. 112 illustrates a device co-location perspective of self-backhauling access nodes.

3.6.5 Multi-Antenna for Backhauling

High capacity and spectral efficiency are important for backhaul in much the same way as access. Multi-antenna technologies like MIMO and space diversity that traditionally have been adopted in radio access have also been adopted to increase spectral efficiency and reliability in dedicated wireless backhaul systems. Antenna diversity is commercially available and LOS MIMO is becoming commercial in microwave point-to-point backhaul (MINI-LINK). Future and more flexible deployments in heterogeneous networks are also making beamforming or beam steering interesting desirable features in wireless backhaul. Beamforming has the twofold advantage of improving received signal power, while reducing the amount of interference to other users by confining transmissions towards desirable directions.

The multi-antenna concepts developed for NX, for the above reasons, provide increased coverage, reliability, spectral efficiency, and capacity for self-backhauling use cases.

In contrast to an access link, a typical self-backhaul use case has an access node at each end of a link which makes it possible to have more advanced antenna systems in both ends. This opens up for possibilities to use higher order SU-MIMO to increase spectral efficiency and/or reliability. In some use cases, e.g., small-cell backhaul, MU-MIMO can advantageously be used. In an in-band self-backhauling implementation, MU-MIMO can also be applied to multiplex backhaul and access traffic over the same resources. MU-MIMO combined with multi-layer transmission to each self-backhauled access node may also have potential.

The performance of multi-antenna schemes depends on the quality of the CSI that is used to design the transmission/reception. If the radio base stations are fixed and the channel has longer coherence time, then there is also better possibility to acquire high-quality CSI to design more robust high-capacity multi-antenna transmission/reception schemes. Pilot contamination in reciprocity-based massive MIMO also becomes less of a problem if the channel does not have to be re-trained that often. Reciprocity-based multi-antenna techniques in NX rely on up-link measurements to design down-link transmissions to reduce or eliminate the need for CSI feedback. However, if the channel is more or less static which it might be in some backhaul scenarios then it can be possible to also consider FDD since associated overhead due to CSI feedback becomes smaller if the channel does not have to be trained that often thanks to longer coherence times. Reciprocity is easier to exploit with unpaired spectrum, but may also be achieved using statistical techniques for paired spectrum. (For example, covariance estimation can be used to determine dominant eigenmodes for the channel that are reasonably long-lived; these techniques can improve receiver SNR metrics without needing instantaneous channel information.) Additionally, it becomes much easier to set up a link and to identify the good beams in a beam-based system when the channel has a long coherence time and the locations of the nodes might even be known. Static backhauling applications have clear advantages which makes it possible to claim the full potential of multi-antenna systems.

Self-backhauling in NX should support both in-band and out-of-band operation which may put requirements on the antenna system used for backhaul. For example, if there is a large carrier frequency difference between access and backhaul links in an out-of-band solution then there is an obvious need to use separate antenna systems for access and backhaul that are adapted to their respective frequency. The same antenna system can in an in-band solution be used for both access and backhaul links. However, using the same antenna system has implications on the backhaul coverage area since all backhaul links need to be within the same coverage area as the access links which might not always be the case. If different coverage areas are desired for backhaul and access, then separate antenna systems should be considered also for the in-band case. Depending on the backhaul requirements, a separate antenna system may also be desirable to achieve a good enough link budget for the backhaul connection.

3.6.6 Protocol Architecture

An important issue is the protocol architecture for self-backhaul. From purely protocol architecture point of view, there are three main alternative approaches:

L2 relay
L2 relay (as per LTE relay)
L3 relay (as per WHALE concept)

Figure 113:
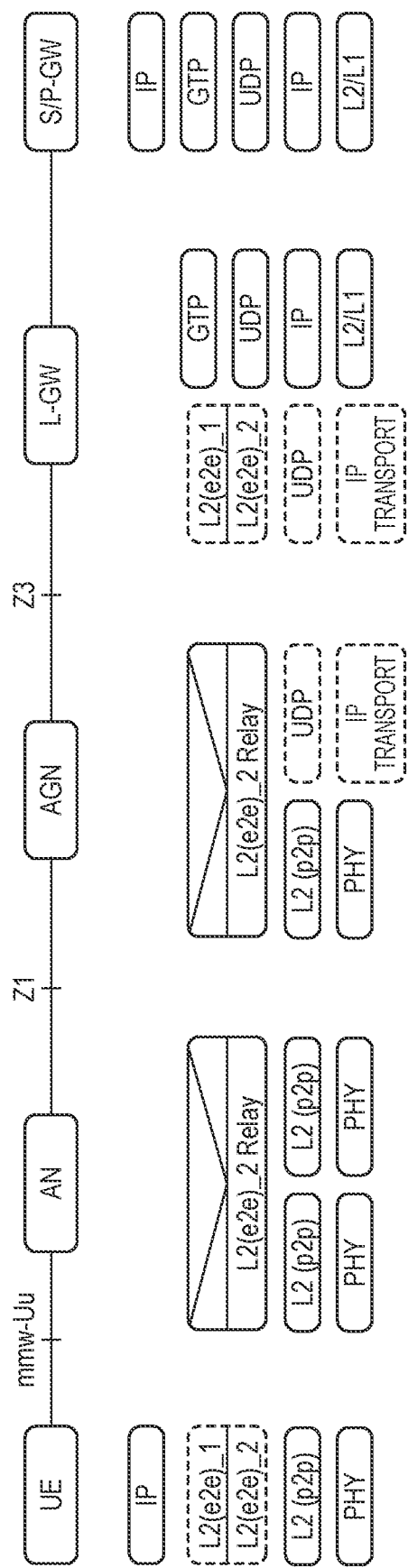
FIG. 113 shows a user-plane protocol architecture.
Figure 114:
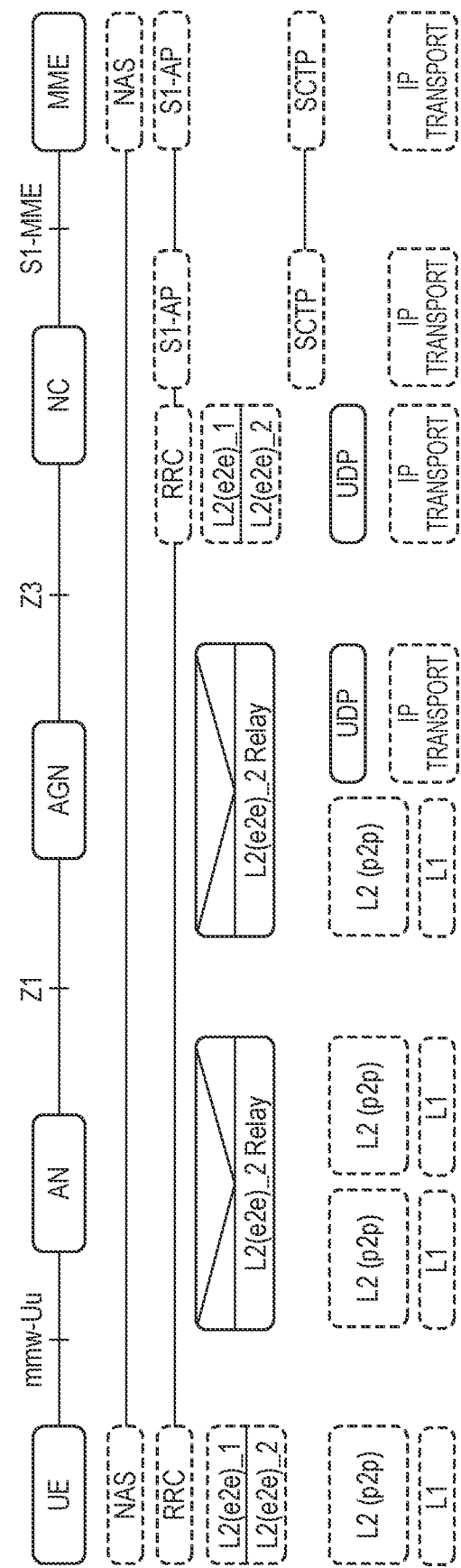
FIG. 114 shows a control-plane protocol architecture.

The present design focuses on the architecture described in FIG. 113 and FIG. 114 (L2 relay).

3.6.6.1 L2 Relay

FIG. 113 and FIG. 114 show, respectively, the protocol architectures of user plane and control plane for multi-hop self-backhaul, where each self-backhauling AN is treated as a L2 relay. In this architecture, each self-backhauling AN essentially serves as a L2 proxy of the downstream (virtual or normal) UE towards its upstream AN.

The L2 relay approach can be combined with multi-hop ARQ, as discussed more in detail in Sections 2.2.8.4 and 2.2.8.5.

3.6.6.2 L2 Relay (as Per LTE Relay)

Figure 115:
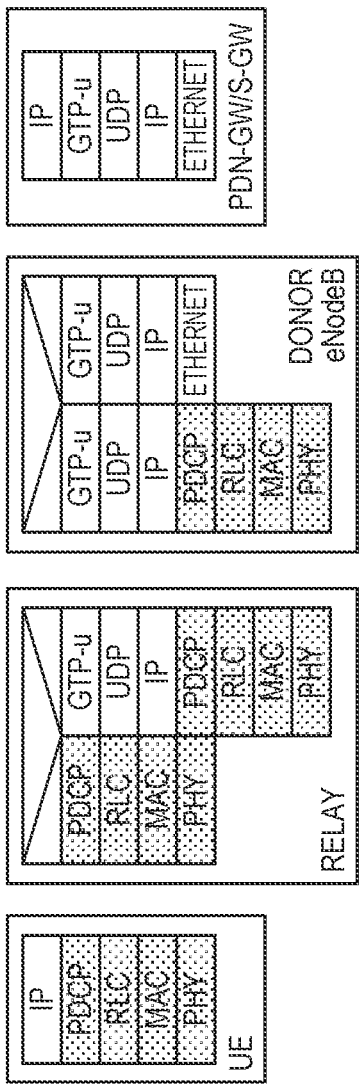
FIG. 115 shows a user-plane protocol architecture for LTE one-hop relaying.
Figure 116:
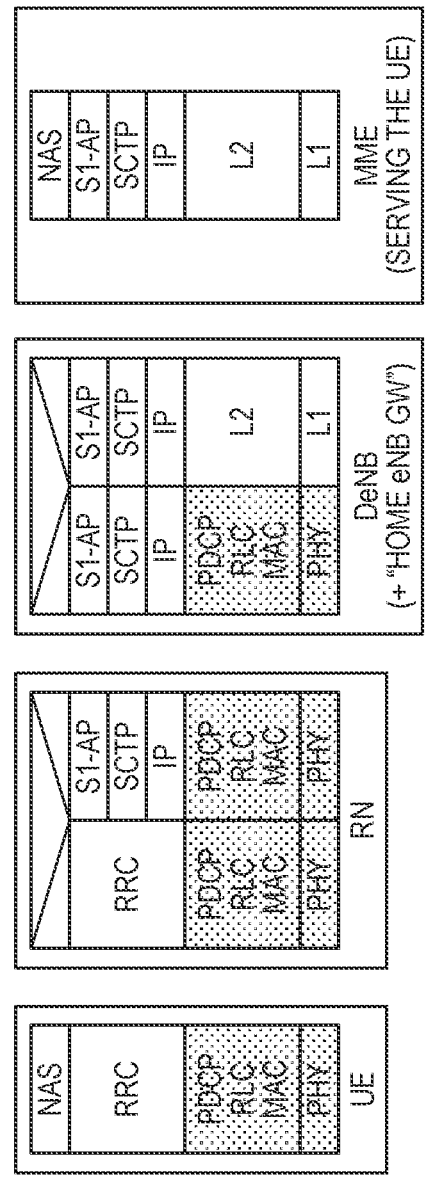
FIG. 116 shows a control-plane protocol architecture for LTE one-hop relaying.

Alternatively, FIG. 115 and FIG. 116 show the protocol architectures adopted by LTE relay concept, for one-hop relaying, for user plane and control plane, respectively. With this architecture, a self-backhauling AN corresponds to an LTE relay, and an aggregation node corresponds to a LTE donor eNB. With this architecture, a self-backhauling AN can be viewed as essentially serving as a proxy of the upstream AN towards its downstream (virtual or normal) UE. As a result, the backhaul links need to carry S1/X2/OAM signals with associated tight requirement on availability and latency. It is unclear whether this architecture can be extended to the cases with multiple (two or more) hops, and, if so, what the benefits of this architecture are compared to that described in FIG. 113 and FIG. 114.

3.6.6.3 L3 Relay

Figure 117:
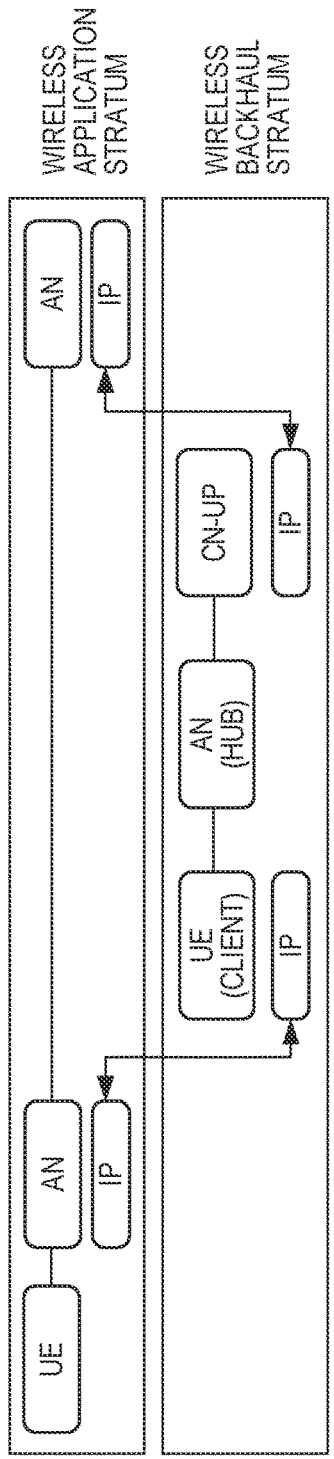
FIG. 117 shows a high-level architecture for L3 relay.

A third approach is to implement a separate underlying transport network using wireless technology (such as NX). This architecture can be described as one wireless application stratum on top of an underlying wireless backhaul stratum. In FIG. 117, a high level architecture for this alternative is illustrated. Even if the figure only illustrates a single hop in the backhaul stratum, this can be extended to multiple hops, by including L2 relay as part of the backhaul stratum, e.g., as described above in Sections 3.6.6.1 or 3.6.6.2.

As the application stratum interfaces wireless backhaul on the IP layer, this alternative can also be described as "L3 relay", note that the user plane core network nodes used by the application stratum are typically the same as those for the backhaul stratum, e.g., using piggybacking of the core network user plane nodes.

An important characteristic of this alternative is that the wireless backhaul is access-agnostic—the underlying wireless is a generic transport network that can be shared by several wireless network applications (different types of access nodes).

3.6.7 Route Selection

In order to transport information wirelessly from an aggregation node, which is assumed to have a wired connection to the core network, to a (normal) UE, or vice versa, through a network of self-backhaul ANs, each self-backhauling AN has to know where to forward a received NX PDU in the next hop for each individual (normal) UE and for at least one aggregation node. Hence, each self-backhauling AN should maintain a routing table that contains such next-hop routing information and context for all registered (normal) UEs. As the wireless environment can change over time, this routing table needs to be periodically updated at each self-backhauling AN, albeit relatively infrequently. These routing tables collectively determine a route between each (normal) UE and an aggregation node. In the following, several options for establishing these routing tables and the associated routes are considered for NX.

3.6.7.1 Fixed, Predetermined Routing

The routing table (and the associated routes) are predetermined during deployment, and do not change over time. In this case, no periodic routing functionality needs to be implemented in the network. Each virtual UE of a self-backhauling AN is assumed to be attached to at least one fixed virtual AN of another AN or aggregation node.

3.6.7.2 Implicit Routing through Serving-Node Selection

With the unified view of access and backhaul links described in Section 3.6.4, route selection may be accomplished implicitly by applying the traditional serving-node selection mechanism on the virtual UE of each self-backhauling AN. By restricting that the virtual AN of each self-backhauling AN can only be activated after a connection with the core network is established by the virtual UE of the self-backhauling node through other self-backhauling ANs or aggregation nodes, a tree topology of routes rooted at the core network can be established for all self-backhauling ANs. A routing table can thus be established at each self-backhauling AN by forwarding the identities of descendant ANs to the upstream AN on the route tree. A logical control channel should be made available in NX, for forwarding these AN identities or other routing information in general.

The advantage of such implicit routing through serving-node selection is that no explicit routing function is needed, and the mobility solutions developed for NX can be reused for routing purposes. When the channel condition between a virtual UE and a virtual AN changes, due to the change of the environment or the mobility of the ANs, the virtual UE should handover to a new virtual AN corresponding to another self-backhauling AN, and as a result, the routes of all descendent ANs of the virtual UE will change accordingly. A drawback of the implicit routing is that the selection of each link in the route tree is based purely on the local channel conditions (for handover) without considering the impact of the selection on the throughput of each route.

3.6.7.3 Explicit Routing

In order to optimize the throughput and the latency of self-backhaul connections, route selection should ideally take into account both the interference generated by neighboring links that constitute the route (intra-route interference) and the interference generated by links that constitute the other routes (inter-route interference). Such interference-aware routing can only be accomplished by an explicit, dynamic routing function. The explicit routing function can be implemented in a centralized or distributed fashion.

In a centralized (explicit) routing function, all routing and resource allocation decisions are taken by a single central node (e.g., an aggregation node) that is assumed to have access to all relevant channel state or distribution information about all nodes and links in the network. The centralized implementation allows the use of not only interference-aware routing solutions, but also energy-efficient network-coding-based routing solutions. Such a solution has therefore the potential of leading to the best overall selection of routes and radio resource allocations. However, it requires a significant amount of overhead to periodically forward all channel information to the central node over certain end-to-end logical control channel.

In distributed routing, the (explicit) routing function is collectively implemented by all self-backhauling ANs. Each node makes individual decisions on where to forward a packet to reach a target node based on local channel measurements and local exchanges of routing information with its neighbors. Collectively, the set of decisions made by all nodes forms the overall selected route(s) and allocated resources in the network. An advantage of distributed routing is that the routing function scales well with the network size. A challenge is to set up necessary control channels to facilitate the exchange of routing information among neighbor ANs.

The NX design initially supports the first two more basic routing solutions, namely, the fixed routing and the implicit routing, while paving the way for evolution to more sophistical explicit routing solutions in the future.

3.6.7.4 Physical-Layer Network Coding

Unlike wired networks, routes carrying different traffic cause undesirable mutual interference in wireless networks. This fundamentally limits the performance of routing as the routing solution was originally intended for wired networks with isolated connections and cannot easily be extended to cope with the interference in wireless networks. Physical-layer network coding (PLNC) schemes may be used for multi-hop communications in wireless networks. They have the ability to exploit the broadcast characteristics of wireless medium, treat the interference as useful signals, and disseminate data over multiple routes that naturally arise in a wireless medium. PLNC schemes may also be integrated with the routing paradigm by applying the PLNC schemes over routes that are severely interfering with each other.

Figure 118:
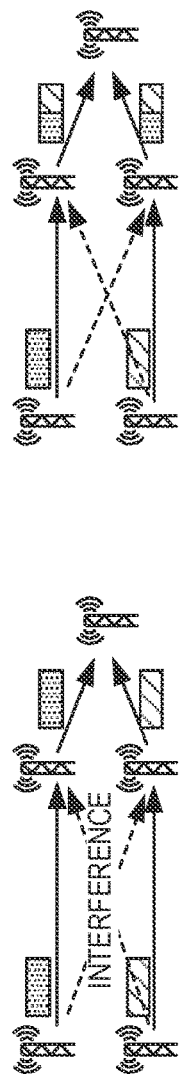
FIG. 118 shows routing versus PLNC.

FIG. 118 illustrates routing vs. PLNC. The left side of the figure shows routing of two packets on two separate routes.

Each relay node receives a mixture of the two packets and needs to reconstruct the desired packet. Therefore, packets create mutual interference at the relays. The right side of the figure shows the PLNC approach: both relay nodes forward the received mixture of packets. None of the packets is viewed as interference at the relays.

There are a number of different PLNC schemes, but the most promising ones are compute-and-forward (CF) and noisy network coding, which is also sometimes referred to as quantize-map-and forward (QMF). There are two important ideas behind these schemes that routing lacks. First, a relay AN does not have to decode every data packet it wishes to forward. Since decoding in a wireless channel is difficult due to the fading, noise, interference and limited received power, relaxing the decoding constraint boosts the network performance. Instead, the relay can send some quantized information about the received packet. This allows any node (even if it cannot decode) to forward data towards the destination, which in turn boosts the network robustness and flexibility. The main difference between CF and QMF lies in the way such quantized information is produced.

Second, a relay AN can simultaneously send information received from many transmitters. For example, the relay that receives a combination of multiple packets that sum together in the air can forward that combination of packets. The destination node receives in due course multiple different combinations of packets from the relays and resolves the individual packets via linear algebraic methods. Such simultaneous transmission of multiple packets leads to a more efficient bandwidth utilization. The same idea, which is also present in the traditional network coding, is illustrated in FIG. 118. In routing, packets sent via different routes are mutually interfering. In the PLNC approach, they are viewed as useful information at every relaying AN.

3.6.8 Multi-Hop Retransmission

Important use cases of self-backhaul, such as small-cell backhaul and event-driven deployment, impose new requirements on the protocol stack that are desirable to provide support for multi-hop communications. Different L2 protocol architectures result in different design options for L2 functionalities, such as the ARQ, regarding multi-hop communications.

For LTE relay, the relay takes on dual roles. It appears as a regular base station to its own UE and as a regular UE to its own base station, fully reusing the LTE radio interface with its protocols and procedures. Essentially the same radio protocols are reused on the backhaul, except for certain control plane protocol additions. This is to a large extent consistent with the unified view of access and backhaul described in Section 3.6.4. However, the LTE two-layered ARQ protocol, i.e., RLC ARQ and MAC HARQ, is originally designed for single hop communication only and is not directly extendable to support multi-hop communication.

Basically, there are several options for designing the multi-hop ARQ protocol architecture. The simplest way is that each hop performs independently ARQ and HARQ just like LTE single hop, which however cannot support end-to-end reliability. Alternatively, each hop can have independent HARQ but for the end node (BS and UE), a RLC ARQ is added to ensure end-to-end reliability. Yet another option is that a common ARQ can be introduced over multiple hops, utilizing Relay-ARQ. Here, ARQ timers and handling are improved by delegating responsibility of packet delivery to the next hop but still maintaining the data in the buffer until a confirmation of delivery to the final destination is received, this can improve efficiency compared to an end-to-end ARQ since messages only need to be retransmitted over the link that failed. Refer to Section 2.2.8.4 for more details.

3.6.9 Self-Interference Avoidance

Despite the recent advances in full-duplex communications, a majority of future 5G devices (base stations or UEs) is expected to be still only capable of half-duplex communications over any given frequency band. NX therefore supports such devices, which are restricted not to transmit and receive data at the same time over the same frequency band in order to avoid self-interference. As a result, at any given time over any given band, all the self-backhauling ANs in the network are classified into two distinct groups, one transmitting and the other receiving. Base stations or ANs that are in the same group cannot communicate with each other over the same band. Hence, a mechanism for allocating compatible radio resources across neighbor ANs is desirable.

3.6.9.1 Half-Duplex Constrained Resource Allocation

Assuming a tree topology of routes, a simple scheme for allocating radio resource to ensure that an upstream AN can communicate with a downstream AN can be used. In this scheme, an upstream AN always take precedence over a downstream AN in the decision on which radio resource is used for them to communicate with each other. Specifically, starting from the root node (e.g., an aggregation node) of a route tree, an upstream AN periodically receives from a downstream AN its buffer occupancy information, along with the typical channel quality information. Based on the received buffer and channel quality information, the upstream AN determines which radio resource (e.g., time slots) is used to transmit data to or receive data from the downstream AN and signals such resource allocation information to the downstream AN. Upon the receipt of such resource-allocation information from its upstream AN and the buffer occupancy information for its own downstream AN, the downstream AN then allocates parts of the remaining resources for transmitting data to and receiving data from its own downstream AN along the tree branch. The process continues until all the leaves of the route tree are reached.

Although this resource-allocation scheme is by no means optimal, it provides a simple and effective mean to cope with the half-duplex constraint. However, to realize such scheme, the resource allocation schedules among neighbor ANs along a tree branch should be properly offset. Also, a new logical control channel may need to be defined to convey buffer occupancy information from a downstream AN to an upstream AN.

3.6.9.2 Reference Signal Offsets

The half-duplex constraint also imposes restrictions on the transmission timing of reference signals among neighbor self-backhauling ANs. For example, in order to maintain time-frequency synchronization among neighbor self-backhauling ANs along a route or in order to perform re-training of transmit and receive beam directions when necessary, each AN should be able to listen to the reference signal transmitted by its upstream AN. This implies that such reference signal cannot be transmitted simultaneously from neighbor ANs. One solution is to offset the subframe timing of neighbor ANs by an integer multiple of the subframe period to allow the reference signals from different ANs to be staggered. Similar to the resource allocation solution described above, an upstream AN along a route can again take precedence in selecting the subframe timing offset and inform its downlink AN, which subsequently selects its own timing offset and propagates the offsets along the route.

3.6.9.3 Impact of Propagation Delay

Due to differences in propagation delay, different UEs finish their respective downlink reception, and thus can begin uplink transmission, at slightly different timing. The need to transmit according to different timing advances to align timing at the receiver further increases the problem. A guard period may need to be inserted at the transition of downlink and uplink transmission to allow an UE to switch from reception to transmission. Alternatively, one may also lengthen the cyclic prefix of the first uplink time slot after switching from downlink transmissions.

3.7 Tight Integration of NX and LTE Evolution

NX is designed so that it benefits from coordination with LTE—at least when both are deployed in the same operator's network. A future-proof solution for the tight integration of LTE and NX is an important feature from the very first release, but also long term.

Realizing tight integration is approached by enabling seamless connectivity to LTE and NX for a given UE. Different architecture solutions are presented in this chapter. A RAN-level integration with RRC/PDCP layer integration for LTE and NX is described in section 3.7.3. The challenges associated with a MAC-level integration (which would enable multi-RAT carrier aggregation) are also highlighted.

Section 3.7.1 contains some general motivations for LTE-NX tight integration. Section 3.7.2 shows potential network scenarios where tight integration is relevant, followed by device considerations in terms of multi-radio capabilities. In Section 3.7.3, different protocol solutions for the tight integration are described. In section 3.7.4, different multi-connectivity features like RRC diversity and user plane aggregation are presented. OAM aspects of the LTE-NX tight integration are not covered.

3.7.1 Motivation

Tight integration fulfills 5G user requirements such as very high data rates by user plane aggregation or ultra-reliability by user or control plane diversity. User plane aggregation is particularly efficient if NX and LTE offer similar throughput for a particular user so that the aggregation can roughly double the throughput. The occurrence of these cases will depend on the allocated spectrum, the coverage and the load of the two accesses. Ultra-reliability can be mandatory for some critical applications for which reliability and low latency are crucial to maintain.

In addition to these, it is worth mentioning that the tight integration also provides enhancements to existing multi-RAT features (such as load balancing and service continuity) thanks to a RAN level integration transparent to the CN (less signaling). Service continuity, in particular, is very desirable for early deployments, since it can be expected that early NX deployments will comprise islands in a wider LTE coverage.

The following focuses on characteristics that motivate support for multi-connectivity, for which LTE tight integration is one solution, to ensure service continuity.

3.7.1.1 Challenging Propagation Conditions for NX in High Frequency Bands

Figure 119:
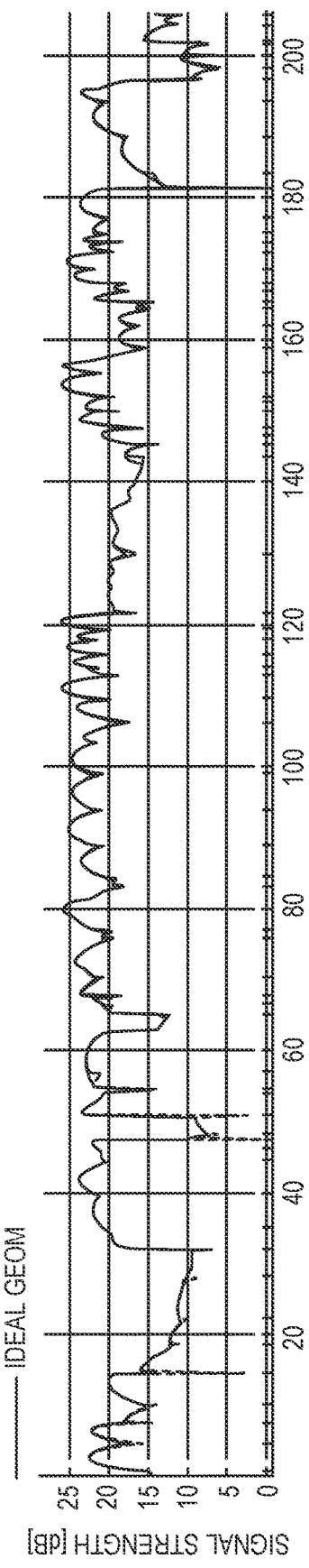
FIG. 119 illustrates best-beam SINR variations over a UE route.

In comparison with the current frequency bands allocated to LTE, much more challenging propagation conditions exists in higher bands, such as higher free space pathloss, less diffraction, and higher outdoor/indoor penetration losses, which means that signals have less ability to propagate around corners and penetrate walls. In addition, atmospheric/rain attenuation and higher body losses could also contribute to making the coverage of the new 5G air interface spotty. FIG. 119 shows an example of average SINR variations over a UE route in an urban deployment employing a large-array grid of beams, for a 15 GHz, comparing the optimal serving beam choice at all times with optimal beam switching delayed by 10 ms. The route demonstrates some deeper dips that indicate a sudden deterioration of the serving beam SINR due to shadowing, e.g., in "around the corner" situations. The serving beam SIR may drop by over 20 dB within 5-10 ms. Such occasional drops are unavoidable at above 10 GHz and they should be handled seamlessly—Either by rapid beam switching, see section 3.5, or by relying on some form of multi-connectivity until the connectivity has been restored. The latter is a strong motivation for tight LTE/NX integration e.g., to provide service continuity.

3.7.1.2 Massive Use of Beamforming

Beamforming, where multiple antenna elements are used to form narrow beams to concentrate the energy, is an efficient tool for improving both data rates and capacity. Its extensive use, in particular at the network side, is an important part of high-frequency wireless access in order to overcome the propagation challenges; see section 3.4. On the other hand, the reliability of a system using high-gain beamforming and operating in higher frequencies is challenging, due to the high directivity and selectivity of large antenna arrays. Thus, coverage might be more sensitive to both time and space variations.

3.7.2 Network and Device Scenarios

3.7.2.1 Network Scenarios

The network scenarios for LTE and NX may be very diverse in terms of coverage and co-location. In terms of deployments, LTE and NX can be co-located (where the baseband is implemented in the same physical node) or non-co-located (where the baseband is implemented in separate physical nodes with non-ideal backhaul).

Figure 120:
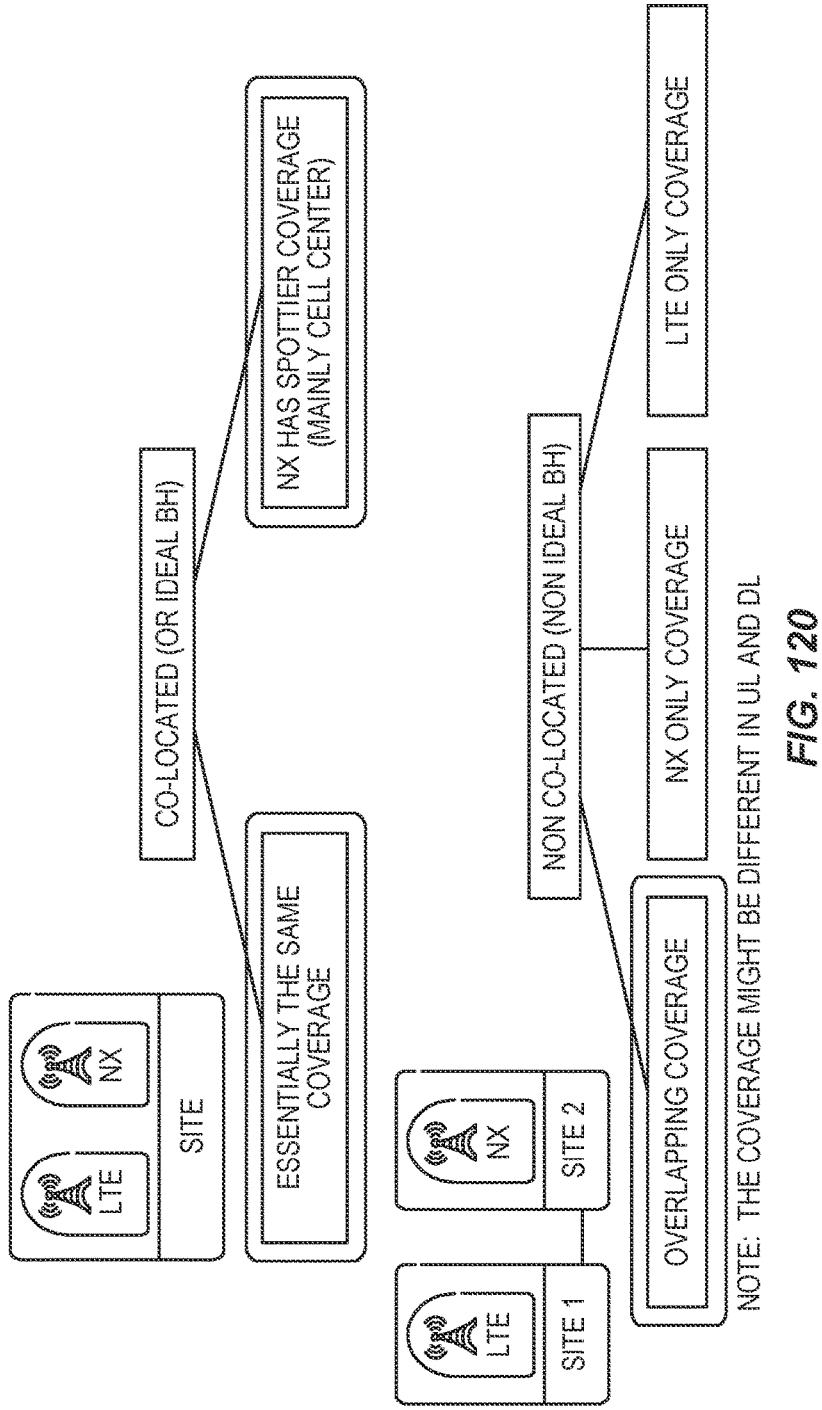

In terms of coverage, LTE and NX may have essentially the same coverage, e.g., in a situation where LTE and NX are deployed co-located and operating in a similar spectrum. This also covers the case where NX may have better coverage than LTE due to the usage of high-gain beamforming. Alternatively, NX may be deployed in a high frequency band which would result in a spottier NX coverage. The different options are summarized in FIG. 120.

3.7.2.2 UE Scenarios

Figure 121:
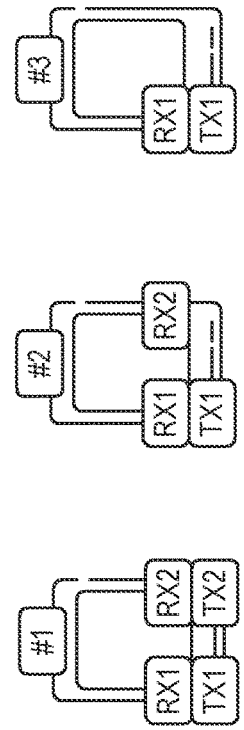

UE scenarios are presented here, as certain UE types may be limited in the kind of tight integration solutions they support. Characteristic of the different UE types is the number of receiver chains. It is expected that in 5G timeframe there will be UEs with dual radios, where each radio has both receiver and transmitter (RX/TX) and that these can be operated simultaneously. Such UEs will be able to be fully connected to LTE and NX at the same time without requiring time division operation on lower layers. From a specification point, tight integration is easiest to specify for this UE type, in the following referred to as UE type #1. However, from an implementation point of view, two transmitter chains (uplink) operating simultaneously introduces new challenges, including the need to split the limited TX power across the two TXs as well as intermodulation problems might prohibit dual UL TX in certain cases. Thus, there will also be UEs with dual RX but single TX, as these are easier to implement, and these are referred to as UE type #2. Finally, there will be single-radio low cost UEs capable of both air interfaces, but only one at a time, referred herein to as UE type #3. The main focus has been on type #1 and type #2 UEs, as type #3 UEs cannot benefit as much on the features enabled by the tight integration. The UE types are highlighted in FIG. 121.

3.7.3 RAN Architecture Supporting Tight Integration

In order to realize the tight integration of LTE and NX, the concept of an "integration layer" is introduced. A protocol entity of the (multi-RAT) integration layer interacts with the RAT specific lower layer protocols (for NX and LTE respectively). The NX architecture is described in section 3. In the following we show a summary of the pros and cons analysis for each integration layer alternative.

3.7.3.1 MAC Layer Integration

Using MAC as the integration layer means that the layers above would be common to LTE and NX, as shown in FIG. 122. The main advantage of low-layer integration is the potential of much tighter inter-RAT coordination features such as fast multi-RAT/multi-link switching and cross-RAT scheduling at the physical layer. MAC level integration would enable a Carrier Aggregation like operation between LTE and NX, allowing for a very dynamic distribution of traffic even for short-lived flows. For instance, RLC retransmissions can be scheduled on any access, enabling quick recovery if one access fails. On the other hand, reordering of packets received over the different accesses would be needed on either MAC or the RLC layer, which would delay the RLC retransmissions. Currently, the LTE RLC reordering timer can be tuned quite accurately due to the deterministic HARQ delays of the MAC layer, and this would no longer be the case for the more unpredictable reordering delays, which are depending on link quality and scheduling decisions of the respective links.

A further benefit of MAC layer integration is that it can support asymmetric UL and DL configurations. Poor UL NX coverage could be one driver for such solutions, and would enable using available NX DL spectrum in combination with LTE UL when there is poor UL NX coverage (especially for higher frequencies) could be a strong motivator to enable MAC level integration. However, this would require carrying of NX physical layer control information over the LTE uplink channels. Apart from mixing NX specifics into the LTE physical layer specifications, this would probably prove quite complex due to the different numerology and round trip times of LTE and NX. For example, the staggered stop and wait HARQ of LTE uses a fixed timing, whereas the target for NX is to support varying timing in order to support more flexible deployments in terms of baseband location.

The same argument applies to cross carrier scheduling between LTE and NX. This would cause strong dependencies in the specifications, and would limit the possibilities for physical layer optimizations of each access. The current stand of the internal NX concept is that the MAC operations for NX would differ quite much from LTE operations, complicating carrier aggregation like scheduling of UEs for LTE+NX. Therefore, if UL coverage turns out to severely limit the NX coverage, a solution with a NX DL carrier operating in high frequency could be combined with an NX UL carrier operating in low frequency, possibly multiplexed with a LTE UL carrier using similar techniques as for NB-IOT.

3.7.3.2 RLC Layer Integration

RLC layer integration allows independent optimization of the MAC and physical layer of each access, but still allows dynamic mapping of RLC transmissions and retransmissions on the different accesses; see FIG. 123. However, as for MAC level integration, the reordering timer of RLC would need to be increased to cover reordering due to different packet delivery times of the lower layers, which would slow down the RLC retransmissions. In normal conditions, RLC retransmissions are rare, and so is then the benefit of being able to reschedule a RLC retransmission between accesses.

The interface between RLC and MAC is tightly connected in LTE, where segmentation is performed on RLC and scheduling (basically telling RLC the requested RLC PDU size) is performed on MAC. The functional split between RLC and MAC for NX is not yet set, but if the same split is kept, RLC level integration has the same limitations as MAC level integration when it comes to the support of backhaul.

3.7.3.3 PDCP Layer Integration

PDCP functions for the control plane are ciphering/deciphering and integrity protection while for the user plane the main functions are ciphering/deciphering, header compression and decompression using ROHC, in-sequence delivery, duplicate detections and retransmissions (used in handovers). In contrast to the PHY, MAC and RLC these functions do not have strict time constraints in terms of synchronicity with the lower layers. The main benefit of PDCP layer integration is that it allows separate optimization of the lower layers for each access. A disadvantage is that this may require a fairly large remake of the MAC/PHY for NX, including new numerology and scheduling principles.

PDCP layer integration, illustrated in FIG. 124, also supports both ideal and non-ideal backhaul and can thus operate in both co-located and non-co-located deployments. Still some of the same coordination features as for lower layer integration can be supported, e.g., load balancing, user plane aggregation, control plane diversity, coordinated RAT scheduling, etc.. The difference is a lower granularity compared to lower layer integration. Here access can be selected per PDCP PDU and RLC retransmissions are access specific. One of the features that cannot be enabled by a PDCP integration is cross-carrier scheduling (as in carrier aggregation) where feedback of one access could be reported in another access.

One constraint with PDCP layer integration is that both uplink and downlink connectivity is required for each access, which means that asymmetric configurations with regard to UL and DL are not supported.

3.7.3.4 RRC Layer Integration

LTE-NX tight integration builds on RRC layer integration, illustrated in FIG. 125, to provide common control of connectivity, mobility, configurability and traffic steering between LTE and NX. Possible implementation alternatives of RRC for LTE-NX tight integration are discussed in section 2.1.

3.7.3.5 Conclusion

In existing multi-RAT integration (e.g., between LTE and UTRAN), each RAT has its own RAN protocol stack and its own core networks where both core networks are linked via inter-node interfaces. When it comes to the integration between NX and LTE, enhancements have been proposed.

A first step towards this direction is a common CN integration. In the case that each RAT has its own RAN protocol stack but the core network (and the CN/RAN interface) is common, new 5G core NFs can be used by both LTE and the new air interface. This has the potential to reduce hard handover delays and enable more seamless mobility. On the other hand, potential multi-RAT coordination is limited. Based on the design characteristics of NX and the analyses for the different alternatives for the integration layer, the integration is placed at PDCP/RRC layers.

3.7.4 Tight Integration Features

In this section it is described which features can be realized by the solution for the tight integration. A summary of the features is shown in FIG. 126, assuming an RRC implementation based on a common RRC with the LTE's RRC extended to cover NX new procedures and acting as sort of MeNB (see section 2.1).

3.7.4.1 Control Plane Diversity

RRC level integration for LTE and NX as described in section 2.1 provides a single point of control at the network and UE for dedicated signaling. To improve signaling robustness, messages from this point can be duplicated at the link layer, with copies of the RRC message transmitted via separate links to UEs with dual radio (UE type #1). In the preferred architecture, this split is performed at the PDCP layer, so that PDCP PDUs are duplicated at the transmission point and each copy send over individual link to the UE, and duplicate detection is performed in the receiving PDCP entity to remove redundant PDCP PDUs.

The feature can be applied to both uplink and downlink transmissions. In the downlink, the network may decide to use one link or another. One significant aspect of the feature is that no explicit signaling would be needed to switch the link which imposes that the UE transceiver should be capable of receiving any message on any link. The main benefit of this feature is to provide additional reliability without the need for explicit signaling to switch air interface, which might be important to fulfill the ultra-reliability requirements for certain applications in challenging propagation conditions where the connection on one air interface is lost so quickly that no explicit "switch signaling" could have been performed.

The feature could also be used, for example, during mobility procedures where NX links could degrade so quickly that the fact that the UE can just use the LTE link without the need to any extra signaling is beneficial. With diversity, the UE could send measurement reports via both LTE and NX so that up to date measurements are available at the network for handover decisions. In the same scenario, handover commands could be sent by both LTE and NX.

3.7.4.2 Fast Control Plane Switching

Fast control plane switching is one possible alternative to the control plane diversity, which relies on RRC level integration and which allows the UE to connect to a single control point via NX or LTE and switch very fast from one link to another (without requiring extensive connection setup signaling). The reliability might not be as high as in the Control Plane Diversity and additional signaling would be needed to enable the link switch compared to Control Plane Diversity. The solution does not allow simultaneous reception/transmission. On the other hand, one advantage is that the solution would work for all UE types defined in section 3.7.2.2.

These two solutions can be seen as alternatives but can also be complementary, where the first solution could be used only in critical scenarios to improve reliability. They can be seen as different operation modes configurable at the UE depending on the different procedures/messages or UE types.

3.7.4.3 UL Control Plane Diversity and DL Fast Control Plane Switching

Some potential issues have been identified for the fast control switching solution, e.g., the RLF handling. Then, as a more experimental alternative, a hybrid with the Control Plane Diversity has been proposed. This hybrid comprises a Control Plane Diversity in the Uplink (UE is capable of sending RRC messages via NX and/or LTE while the network is prepared to receive these messages from either/both accesses) and a Fast Control Plane Switching in the Downlink, where the UE is informed by the network which access it should listen to receive RRC messages and the network sends only via one access.

The solution can be considered as a fallback in the case the Control Plane Diversity solution is too complex e.g., in the case of UE type #3, which could be relaxed in the case of Control Plane Switching. Note that in case the two accesses are not tightly synchronized or are transmitting in different bands, the UE may need to re-acquire synchronization every time it needs to transmit over the other access, which could consume some time making it less suitable for some critical procedures. Another challenge to enable the usage of the feature by UE type #3 is the fact that it takes even longer to reliably discover that the UE failed on the "first" access and then to "find" the suitable connection on the other access. One way to address that issue is to configure the UE to constantly monitor a secondary access in order to be prepared. A possible drawback of this is that it can consume extra UE battery and enforce some additional DL transmissions on the NX side.

3.7.4.4 User Plane Aggregation

User plane aggregation has two different variants. The first variant is called flow aggregation which allows a single flow to be aggregated over multiple air interfaces. Another variant is called flow routing where a given user data flow is mapped on a single air interface, so that different flows of the same UE may be mapped either on NX or LTE. This option requires a mapping function of the flows to different bearers in the core network.

The benefits of user plane aggregation include increased throughput, pooling of resources and support for seamless mobility. The feature works only for UEs of type #1, if PDCP layer integration is assumed.

3.7.4.5 Fast User Plane Switching

For this feature, rather than aggregating the user plane, the UE uses only a single air interface at a time, relying on a fast switching mechanism between them. Apart from providing resource pooling, seamless mobility and reliability, a main advantage is that it applies for UE types #1, #2 and #3, where only one access is used at a time. It is expected that fast switching may be sufficient in a scenario where one access provides significantly higher user throughput than the other, whereas user plane aggregation provides additional significant throughput gains in scenarios where access performance is more similar.

3.8 Operation in Shared Spectrum

It is important that NX can be deployed in all frequency bands that are made available for 5G, including frequency bands allocated for shared operation. As a consequence, NX system should be able to share spectrum with other NX systems and/or different technologies, such as LTE and Wi-Fi, on the same carrier. Focus is on TDD operation assuming half-duplex transmission, but full duplex is possible and enables a more aggressive sharing mechanism.

3.8.1 Sharing Scenarios

FIG. 127 illustrates a summary of spectrum types and usage scenarios for NX systems. Besides licensed dedicated use, it is clearly seen that spectrum sharing is commonly divided into the following categories:

- Vertical sharing refers to spectrum sharing between systems of different priority (e.g., primary and secondary), with unequal rights of spectrum access.
- Horizontal sharing is sharing between systems that have the same priorities in the spectrum, where different systems have fair access rights to the spectrum. If the sharing systems in the spectrum adopt the same technology, it is called homogenous horizontal sharing, e.g., inter operator sharing in the same carrier/channel; otherwise heterogeneous horizontal sharing, e.g., LTE sharing with Wi-Fi. Homogenous horizontal sharing can also be applied in licensed mode between different operators typically using the same technology.

NX is expected to cover 1~100 GHz spectrum ranges, where the most promising shared spectrum lies in the following categories:

Case A: Unlicensed bands such as 5 GHz and 60 GHz which are already available for network deployment. This is the most typical case for sharing of spectrum and very promising for user deployed scenario (e.g., enterprise) since there is no need for user to coordinate with operators when operating in unlicensed band;

Case B: Co-primary licensed bands with inter-operator horizontal sharing especially above 30 GHz which is proved to have benefit. Spectrum efficiency may be improved a lot by introducing inter-operator sharing especially for low interference environment with massive MIMO in NX;

Case C: LSA bands operation as secondary systems without or with horizontal sharing. Vertical sharing techniques could open the door for 3GPP systems to use more spectrums and make global harmonization of spectrum easier. Similarly, inter-operator horizontal sharing can be valid as well in LSA bands.

3.8.2 Motivations and Requirements

Current 2G, 3G and 4G systems mainly use licensed dedicated spectrum for network deployment. However, NX systems aiming for 5G with massive bandwidth need significantly more spectrum than today and it is hard to find enough bands to achieve this by using licensed dedicated spectrum. Besides, NX systems are more likely to serve new application scenarios such as enterprise, which favor shared spectrum operation. Therefore, shared spectrum operation plays an important complementary role to use spectrum for NX systems.

In shared spectrum, where multiple systems can coexist and interfere with each other, there is a need for coexistence rules. In general, there is no protection that a user can expect from interference when operating in the unlicensed regime, but intentional radiators engaged in communication must follow rules designed to minimize interference to other devices using the band. The FCC has devised such rules for fair coexistence in unlicensed bands, as has CEPT in association with ETSI. Current regulations typically provide a spectral mask which limits the total power and power spectral density (PSD) that each transmitter can use. In addition, there are derived protocols that are sometimes quite liberal in the extent to which a transmitter can gain access to the channel, and at other times are more restrictive; the coexistence protocols typically followed in the 5 GHz band allow the liberal approach in the US and restrict users to following listen-before-talk in Europe.

The sharing problem is itself not new, as numerous devices on the 2.4 GHz and 5 GHz unlicensed bands already behave in a manner that is unfriendly to neighboring devices. Up to now, the FCC rules have been band dependent and technology-neutral. In 2.4 GHz and 5 GHz bands Wi-Fi is established as a dominating technology most often using some sort of Listen-before-talk mechanism (LBT) to enable fair coexistence and global relevance. This has established LBT as a de facto method for providing fairness. New technology such as licensed assisted access (LAA) for LTE has also adopted LBT to enable fairness. The IEEE 802.11 standard also proposes coexistence techniques in the new 'ad' amendment for 60 GHz, but common use of that band may not employ LBT uniformly, as it is expected that spatial isolation between users may often make active sensing of the channel unnecessary. Recently, the FCC has proposed expanding the 60 GHz band from its current 57-64 GHz to include 64-71 GHz as well.

New bands may be expected for shared spectrum use elsewhere in the future and NX should be able to operate within such spectrum. It remains to be seen how the regulators will handle fair coexistence when embracing new technology and new bands. For vertical sharing, the main work is in the regulatory bodies to establish coordination interface with primary systems, which has small impact on the radio design for NX systems, e.g., geolocation database (GLDB) support. So the following focuses on how NX systems are designed to solve horizontal sharing between different operators or systems. Unlicensed bands such as 2.4 GHz and 5 GHz are already used by a number of access technologies, e.g., 802.11 (Wi-Fi). Currently, licensed assisted access (LAA) is being developed in 3GPP to make LTE operate in unlicensed bands and coexist with Wi-Fi systems. LAA for LTE has the potential to offer better coverage and higher spectral efficiency comparing to Wi-Fi. This milestone to deal with horizontal sharing for 3GPP technology lays a solid base for NX operation in shared spectrum.

NX has some characteristics that ease operation in shared spectrum as compared to LTE:

Smaller granularity in time domain (see 2.3.2), e.g., 62.5 μs subframe.

Flexible HARQ scheme; no strict timing on ACK/NACK and retransmission (see 2.2.8).

Flexible TDD (see 2.3.2.1); UL transmission is scheduled and is allowed in any subframe.

Full duplex operation.

Contention-based uplink data transmission (see 2.2.6).

Massive MIMO with high-gain beamforming (see 3.4) provide isolation and reduces interference in many cases. However, high-gain beam forming may also bring challenges to coexistence mechanism like Listen-before-talk. Details are elaborated in later sections.

3.8.3 Coexistence Mechanism for Horizontal Sharing

Listen-before-talk (LBT) is the most flexible tool to support horizontal sharing for the following reasons: a) distributed structure without needing information exchanges between different networks or nodes; b) it may realize the coexistence support with different operators or systems simultaneously. Section 3.8.3.1 introduces LBT concept with high-gain beamforming and addresses possible problems brought by massive MIMO in combination with LBT. Then, in section 3.8.3.2, a Listen-after-talk (LAT) mechanism is introduced to solve some problems. Finally, section 3.8.3.3 summarizes the application scenarios for both mechanisms according to analysis.

3.8.3.1 Listen-Before-Talk with High-Gain Beamforming

An important idea of LBT is that the source node (SN) listens to check the channel status before it actually transmits to destination node (DN). In other word, the default mode of LBT for SN is 'not to send' and data is sent only when it is confirmed that the channel is available by listening. Here 'available' means that the planned transmission will neither interfere nor be interfered by current ongoing transmission. So the assumption behind this is that the sensed power at SN side represents the interference power at DN side. However, when the sensed power at SN side is much smaller than interference power at DN side, the hidden node problem may occur, where the channel is considered available but actually occupied. In contrast, the exposed node problem may occur when sensed power is much larger than interference power, where the channel is detected busy but is actually not occupied. In current Wi-Fi or LAA systems for LTE, these problems already exist, but they are not so severe and can be tuned by setting feasible detection threshold. The probability of such problems occurring when using LBT is acceptable according to evaluations and practical applications in current Wi-Fi or LAA systems for LTE. For LBT, how long time needs to be sensed for each transmission can also be considered. For this purpose, a back-off counter is introduced for LBT. The counter is generated randomly when SN wants to transmit data and decreases if the channel is sensed idle. When it expires, SN regards the channel as idle and could start to transmit data in the channel.

For NX systems with large antenna arrays, high-gain beamforming is available for data transmission. This exacerbates the hidden- and exposed node problems. Due to high-gain beamforming, the sensing power phase is done with a directional beamforming pointing towards the direction the node wants to transmit. In this case, differently oriented directions may result in different receiving powers.

FIG. 128 illustrates examples of the hidden node and exposed node problems. In FIG. 128a, AN1 is transmitting data to UE1 and AN2 is listening. Since it is not in TX coverage of AN1, AN2 considers the channel is available and thus starts to transmit data to UE2. But actually UE1 is interfered by AN2's transmission due to it is in AN2's TX coverage. A reason behind this is that sensed power at AN2 is much smaller than the interference power at UE1 side due to direction difference. In contrast, the exposed node problem is illustrated in FIG. 128b.

More antennas (e.g., 100 antennas at AN side) result in less correct LBT, with more severe hidden node problems and exposed node problems. Here, 'correct' means 'channel detected as busy, actually interfered' and 'channel detected as available, actually not interfered'. This can lead to performance degradation on both average system throughput and cell-edge user throughput.

Request to send/clear to send (RTS/CTS) handshaking mechanism is proposed in Wi-Fi systems to solve hidden node problem brought by physical carrier sensing. It is an additional method to implement virtual carrier sensing over physical carrier sensing. When physical carrier sensing indicates the channel is idle, data SN transmits RTS to DN and then DN responses one CTS to accomplish handshaking. Neighbor nodes hearing RTS and CTS defer their transmission so that hidden node problem doesn't exist. However, this makes exposed node problem more severe and also introduces more overhead for RTS/CTS transmission before data transmission. Considering the problems in high-gain beamforming case, exposed node problem is already a problem and RTS/CTS can pronounce it. Besides, interference probability is much smaller in high-gain beamforming case which means a lot of RTS/CTS overhead before data transmission is unnecessary. For these reasons, traditional RTS/CTS is not a good solution to solve hidden node problem and exposed node problem in high-gain beamforming case.

3.8.3.2 Listen-After-Talk (LAT) Mechanism

A so-called listen-after-talk mechanism is introduced to address the abovementioned hidden- and exposed-node problem in massive antennas case. A reason to have such severe problems for LBT is a large difference between sensed power at SN side (e.g., AN2 in FIG. 128) and interference power at DN side (e.g., UE1 in FIG. 128) in high-gain beamforming case. Thus, LAT involves the receiver to sense the channel directly. Another motivation for LAT is low interference situations, where there are fewer collisions for naive direct transmission. For this reason, LAT adopts opposite logic compared to LBT as follows: the default mode for transmitter is 'to send' and data is not sent only when it is confirmed that channel is occupied by interfering transmissions. An important idea is that the SN transmits anyway when data packets arrive and then solve collision detected by DN according to coordination signaling.

To address LAT clearly, the following definitions are assumed:

Idle time is assumed after continuous data transmission. This is reasonable for unlicensed band since there are always channel occupation limitation rules, e.g., the SN must stop transmitting and enter idle state after contiguous transmission time exceeds a given threshold;

Notify-To-Send (NTS) message: This message can be transmitted by SN or DN, including the link information which will transmit data and expected occupation time duration;

Notify-Not-To-Send (NNTS) message: This message is transmitted from DN, telling its SN not to transmit data in indicated duration.

A short description of procedures for SN and DN is given here. First, the listening function at DN side is triggered when it detects interference and fails to receive the data. Then the DN of victim link coordinates the data transmission with SN of the aggressor link(s). Finally, the coordination is performed in idle time of aggressor link. One example is shown in FIG. 129, where AN2→UE2 is interfered by AN1→UE1. When UE2 fails to decode the data, it starts to look for the idle period of aggressor link and send NTS message towards AN2 direction. Since UE2 is interfered by AN1, AN1 can receive the message as well and then defer the transmission as NTS indicates. Besides, NTS also indicates when AN2 will stop transmission and listen, the idle period of AN2→UE2. Then AN1 transmits NTS that can be received by UE2. Finally, NNTS is relayed by UE2 to let its transmitter AN2 know which resource is occupied by aggressor link and not transmit. By this scheme, the transmission of this interference pair (AN1-UE1 and AN2-UE2) is coordinated in distributed way to transmit data by turns.

3.8.3.3 Summary

Both LBT and proposed LAT scheme are aiming to solve the interference between operators or systems to achieve good coexistence. So taking into account their different design ideas, Table 16 summarizes the requirements and possible application case as follows:

TABLE 16

Comparison between Listen-before-talk and Listen-after-talk mechanism

| Coexistence scheme | Structure | Listening node | Signaling | Scenario |
|---|---|---|---|---|
| LBT | distributed | SN only | Optional | Small to middle antenna gain |
| LAT | distributed | Both SN and DN | Mandatory | Large antenna gain |

From the above comparison, LAT scheme involves RX's listening and thus signaling between data source node (SN) and data destination node (DN), e.g., NTS and NNTS. For LBT scheme, only data SN is listening while optional signaling may be adopted to solve the hidden node problem. In other words, RTS/CTS handshaking may be standardized in Wi-Fi protocol. However, RTS/CTS can't solve exposed problem which may severely degrade frequency reuse in massive antenna case.

LBT can work well to achieve coexistence using moderate antenna gain (AN with less than 16 antennas). However, for high antenna gain case, alternative solutions, including LAT, may be used.

3.8.4 LBT-Based Data Transmission

This section describes how to incorporate LBT in the NX frame structure for physical data and control channels defined in section 2.3.3. For the purposes of this section, it is assumed that both DL and UL data transmission are subject to LBT. This is motivated by the assumption that LBT is needed for operation in both 2.4 GHz and 5 GHz bands. For new frequency bands at higher frequencies where high antenna gain is expected to be used, other sharing mechanisms such as LAT may be used. For NX, data transmission-related channels are defined as introduced in 2.3.3, e.g., the physical downlink control channel (PDCCH) and physical data channel (PDCH). PDCCH is used to schedules PDCH which could accommodate either DL or UL data.

To reduce uplink transmission latency, cPDCH was introduced to enable contention-based access, as described in 2.2.3. With cPDCH, a semi-persistent grant that may be assigned to multiple UEs is introduced. Referring to the discussion in section 2.2.6, cPDCH is used for transmission of initial uplink data in a contention way. In section 2.2.6 there is also a description of how an LBT mechanism may be added to cPDCH for access in dedicated spectrum, to further improve performance.

3.8.4.1 DL LBT-Based Data Transmission

For DL data transmissions, there are two different kinds of opportunities to transmit DL data: PDCH scheduled by PDCCH, or one could apply contention-based resource handling similar to what has been devised for DL using cPDCH. In this section, these access methods have to be accompanied with LBT.

The principle of using PDCH for LBT-based DL transmission of data is illustrated in FIG. 130, which illustrates a PDCH-carried DL transmission example, at the eNB side. First, the eNB starts to sense the channel M symbols before PDCCH. Then, the back-off mechanism is performed to determine if it is OK to transmit data by physical carrier sensing. When the randomly generated back-off counter expires, the eNB inserts reservation signal to occupy the channel until PCCH boundary. If the carrier is determined to be idle, the eNB schedules the data transmission by transmitting PDCCH to the UE including a DL assignment indicator (all UEs that expect to receive data on a specific resource has to what PDCCH to monitor). Finally, the eNB transmits the data accordingly. PDCCH and PDCH are co-located in the continuous resource as mentioned in section 2.3.

In Section 2.2, cPDCH is discussed for UL transmission only. Here we show that the cPDCH can also be used for LBT-based DL transmission. Before DL transmission using cPDCH, the eNB needs to configure UEs to monitor shared resources to detect if there is cPDCH transmissions intended for them. If DL data to these configured UEs arrives, the eNB starts to sense the channel before these resources and perform Listen-before-talk, as illustrated in FIG. 131. (Note that a longer random back-off counter as compared to what is used for UL data provides priority to LBT based cPDCH-carried UL data). When determined idle, eNB sends DL data packet with special format as compared to PDCH-carried one in cPDCH immediately. The whole special packet includes preamble and header comprising of multiple fields (e.g., data duration, ID of DN and etc.) before the DL data payload so that the UE can know the beginning and end of the data designated for it.

Using cPDCH in DL in this way is similar in some respects to how Wi-Fi transit data in DL. However, the cPDCH resources are configured by MAC. So, it could be seen as contention MAC over scheduled MAC. When low load, resources for cPDCH can be configured large to have low latency for both UL and DL; when medium and high traffic load, the resources for cPDCH can be set small, to have more scheduling MAC.

3.8.4.2 UL LBT-Based Data Transmission.

For UL data transmission, there are also two options for LBT transmission: PDCCH-scheduled PDCH-carried UL, and cPDCH-carried contending UL. For UE-initiated transmission on PDCH, the UE first sends an UL scheduling request using cPDCH on a shared resource, and then PDCCH is used to inform the UE when it can transmit. To reduce delay, the cPDCH can be used to carry data directly, as outlined in section 2.2.6.

First, a cPDCH resource should be configured for the UE. Then, the UE with UL data starts to sense the channel at cPDCH staring boundary, as illustrated in FIG. 132, which shows an example of UL data transmission in cPDCH. LBT is performed at UE side until a back-off counter becomes expired. A shorter random back-off timer generation window is used, compared to that for DL data, to prioritize its transmission. When the channel is determined as idle, UE sends the UL data including buffer status report in cPDCH. Note that transmission in cPDCH is not limited to initial UL data.

Another UL data transmission option is PDCH-carried scheduling UL data. It is assumed here that UL scheduling request and buffer status report are already available at the eNB. There are two steps to perform this kind of transmission, as shown in FIG. 133, which shows an example of UL data transmission in PDCH. First, assume that the contention for PDCCH transmission is successful at eNB side. Then, the eNB transmits PDCCH including an UL grant scheduling grant for the UE. Then, the UE detects PDCCH and prepare to send UL data when LBT succeeds, after the LBT period shown in FIG. 133.

One problem with PDCCH scheduled PDCH-carried UL data is that the UL granted resource is not used if LBT at UE side fails, which results in resource waste. One solution to this problem is to apply grouped grant opportunity for different UEs in a partly overlapping resource. For example, as shown in FIG. 134, which illustrates the coupling of a DL and UL grant, one DL grant is scheduled to start shortly after the UL grant resource opportunity. In this way, the eNB first decodes in the first subframes: If CRC checks there is UL data, and the eNB can proceed to receive the rest of the UL data transmission; otherwise, the eNB starts DL LBT procedure to initiate DL transmission. Note that the UEs granted in overlapping resource are preferred to be carefully selected to increase the probability of successful contention for the resource. For example, if UEs with large distance in one cell is selected, it is reasonable to assume that they have different channel state. Then, as long as at least one of them is successful, the resource would be occupied.

3.8.5 LBT-Based Transmission for System Plane

To support stand-alone operation in shared spectrum, transmission of system plane (see section 3.2) should also be considered. As introduced in section 2.3.4.1, periodic system signature index (SSI) and access information table (AIT) transmissions are fundamental to UE initial access. However, shared spectrum operation may bring uncertainty of the periodical transmission and thus their transmission under LBT constraints needs to be carefully designed. The details are given in the following subsections.

3.8.5.1 SSI Transmission

In NX system design for licensed band, SSI is a strict periodic signal sequence transmission (e.g., every 100 ms), to provide synchronization. Further, the sequence is allocated in a pre-defined group of subcarriers, e.g., a small number of possible positions of the working carrier.

In shared spectrum band operation, a much larger number of candidate SSI sequences are desirable, to reduce the possibility that SSIs from different un-coordinated network nodes are different. On the other aspect, LBT should be performed in the process of SSI transmission. In particular, the eNB starts listening at a certain time (e.g., 4 subframes) before a periodic SSI transmission time. When the randomly generated back-off counter expires, a reservation signal is inserted until SSI transmission time, to avoid others jumping in. In order to prioritize SSI transmission compared to data transmission, a shorter contention window than for data transmission is used, e.g., Q=8 for SS and Q=20 for data, where [0, Q] is the range for random back off counter. Since SSI transmission is only located in a small number of possible positions in the carrier, DL data transmission or dummy signals are transmitted in other subcarriers at the same time, as shown in the SSI transmission example illustrated in FIG. 135, so that other listening devices can regard this carrier as busy or occupied by energy sensing. AIT or other useful system information could be put here as well.

However, it is possible that LBT fails at the transmission time of SSI. To alleviate such problem, multiple candidate positions for SSI transmission can be predefined, e.g., the three dashed resource blocks in FIG. 135. For the same SSI, additional sequences are used to indicate the transmission time offset. eNB still starts to monitor the carrier before the first candidate position. If LBT fails until starting point of the first one, eNB continues to monitor the channel and seeks opportunity to transmit SSI in the second or third candidate positions with different sequences. Note that different sequences are used to indicate the predefined offset in different position. One example is shown in FIG. 136, which shows SSI transmission contention: NX operator 1 (OP1) and operator 2 (OP2) have different back-off counters. When OP1 back-off counter expires, the eNB transmits SSI. Then OP2 considers this channel as busy and stops back-off. When SSI of OP1 ends, OP2 finish the rest back-off time and transmit.

3.8.5.2 AIT Transmission

In a manner similar to that used with SSI transmissions, the eNB starts LBT before periodical AIT transmission (e.g., every 100 ms). First, it is assumed that one or several sequences along with AIT are used for UEs to detect time position of AIT transmission, as introduced in section 2.3.3.4. Then, one predefined transmission window is introduced to allow AIT transmission when LBT succeeds. This transmission window (maximum offset) should be indicated to UE via signaling, for scanning AIT blindly. As discussed in section 3.2.2.2, SFN/Timing information is also provided in the AIT content. Here, SFN/Timing indicates the time in the granularity of 10 ms in NX, for example, instead of 1 ms in LTE. However, AIT transmission offsets may occur, as shown in FIG. 137, such that one additional field is desirable to indicate a millisecond-level (less than 10 ms) offset. Finally, the real AIT transmission time is a combination of SFN/Timing and the millisecond-level time offset.

3.8.5.3 UE Access Procedure

The UE searches for SSI and AIT to update system information needed for initial access. After power up, UE scans SSI first to know which node can be accessed. From SSI detection, UE can get coarse synchronization by adjusting SSI transmission time offset indicated by the SSI sequence ID. Simultaneously, the UE can know SSI from the detected sequence. If local AIT doesn't have information on needed information for detected SSI, UE needs to scan AIT by detecting the self-contained sequence. The real global time is calculated by adding global time field and time offset for further use. Referring to section 3.2.2.2.2, the UE access procedure is updated with offset indication in shared spectrum, as shown in FIG. 138, which illustrates the UE access procedure in shared spectrum. A difference (bold text in FIG. 138) from licensed operation is that synchronization offset is obtained from SSI detection, and thus synchronization implies further processing by complementing the detected offset. Further, the accurate global time from AIT detection should be obtained by considering AIT offset field as well, which may be used for SSI scanning.

3.9 Self-Organizing Networks

Self-organizing network (SON) features were listed among the LTE requirements, and some important concepts, functions and procedures significantly facilitated the introduction of new nodes as well as optimization of the operation of existing nodes. Therefore, it is natural for NX to provide at least a comparable level of automation.

This section describes some fundamental automation concepts for NX, mainly targeting the early deployment and operation phases. The text also comments on the differences from LTE. LTE BS automation was to a large extent influenced by the design choices implying that BSs broadcast fixedly allocated signals and identifiers. Such broadcasts served as a basis for a wide range of functions, including idle mode mobility, initial access, frequency selective channel estimation, mobility measurements, positioning etc. As described in the present document, the NX design avoids such broadcast as much as possible. Furthermore, as discussed in Section 3.10, it is desirable to avoid broadcast of a fixed sequence or identifier over time from the same BS or antenna configuration. Instead, it is possible to operate an NX network in a mode (obfuscated mode), where transmitted sequences and identifiers from an antenna configuration are changed regularly. These design choices have an impact on NX RAN SON.

The introduction of a new base station in an NX network is subject to several management and automation tasks to ensure a smooth introduction. These tasks are listed in sequence in FIG. 139, and are discussed in more detail below.

Site planning. Traditionally, base station sites are planned. The planning includes establishing a leasing agreement with a landlord and deciding an appropriate site location. Since NX introduces new concepts and features, also the site planning procedure is affected. Potentially, this step can be omitted in detail, in favor of a more ad hoc deployment procedure, where the BS is placed at an appropriate location during a site visit.

OAM system connection establishment. Once the BS is deployed, it needs to establish contact with the OAM system to confirm the deployment and to associate the BS hardware with the planned site. The OAM system also has the possibility to upgrade the BS software and obtain system parameters. The BS may also retrieve information about how to establish backhaul and fronthaul to realize transport network connections, core network connections, inter-basestation connections, etc.

System access establishment. The system plane is configured to provide UEs with system access. A new base station needs to be included in a set of base stations providing system plane access, and the system plane needs to be tuned accordingly.

BS relation establishment. By automatic establishment of inter-BS relations, the infrastructure is capable of establishing relations between the nodes that needs to interact and exchange information.

Beam relations establishment. With beam based communication between a base station and a UE, the network can benefit from establishing relations between beams at different transmission points and also between different beams from the same transmission point.

Mobility robustness optimization. The NX active mode mobility is supported by the transmission of beamformed mobility reference signals. The mobility procedure tuning includes deciding when it is appropriate to initiate mobility measurements, and when to initiate the handover procedure.

Self-optimization and healing. This section only addresses a limited set of SON procedures, and there are other procedures such as identity management, load balancing, coverage and capacity optimization, handling of disruptive events etc.

3.9.1 Site Planning, OAM System Connection Establishment and System Access Establishment Despite ambitions to make radio network node configuration and optimization extensively automatic, site planning involves manual work such as negotiating leasing agreements with landlords, and providing at least a set of candidate sites where site deployments can be realized. Part of the site planning can also be automatic, for example to select sites for deployment among a set of site candidates, and to define some basic configuration parameters such as base station type and capability, transport network type and capability, maximum transmission power, etc. The configuration can be separated into hardware configuration and parameter configurations. The latter includes pre-configurations of radio functions, identifiers, sequences, security, base station relations, inter-base station connections to be established etc., where some parameter configurations can be seen as optional.

The scope of the configuration can vary depending on the level of distributed automation of certain parameters and procedures, if this automation is conducted centrally, or if the parameters are pre-configured based on planning. It also depends on the considered deployment strategy (see also section 3.2), for example:

A. each base station (a traditional base station or a cluster of transmission points connected with good backhaul, sharing the same interface to other nodes) is configured with its specific system access configuration, and thereby a base station specific SSI.

B. system access configuration is shared between base stations in the same region, and the backhaul characteristics is very different between different base stations, and might not be known before the deployment.

C. System access configuration is shared between base stations of the same type, which for example can mean that macro base stations are configured with one SSI, and micro base stations with a different SSI.

In deployment strategy A, each base station provides its specific system access, and some preferably automatic planning can configure the system access. In case base stations in the form of clusters with transmission points, these may already initially have some pre-configured inter-transmission point connections within the cluster to enable coordination of receptions and transmissions. Once deployed, the system access configuration can be automatically reconfigured to adapt to the local conditions. These local radio conditions can be learned over time, based on a combination of UE and BS measurements.

In deployment strategy B, the ambition is to provide regional system access. Therefore, the system access configuration can initially be planned just as in strategy A. Once deployed, base stations can be reassigned to new system access regions based on the local radio conditions. These local radio conditions can be learned over time, based on a combination of UE and BS measurements. The backhaul can be very varying and subject to varying latency, limiting coordination capabilities.

In the event that NX is deployed in an area where there already exists a legacy system, then existing logical models (neighbor relations, tracking area configurations, random access procedure statistics) can be used to assign the base station to a system access region (strategy B) either in the planning phase, after establishing the connection to the OAM system, or once the relation between the new NX base station and the legacy network has been established.

Similarly, with NX deployed with different base station types in mind, each type can be associated to the same system access configuration (strategy C). This is reasonable for example if the system access configuration should be related to the transmission power of the base station.

One alternative is to deploy new base stations with a BS specific system access (strategy A) from a set of system access configurations only used for newly installed base stations. Once sufficient knowledge about the local conditions has been established, the base station is assigned to a system access region (strategy B).

Similarly, the tracking area configurations also can be subject to (automatic) planning prior to site installation, centrally determined as part of the initial OAM interactions, or distributedly reconfigured after the base station has been deployed. The tracking area may be dependent of existing tracking area configurations in legacy networks, and may be related to the system access regions.

In case obfuscated operations is considered (section 3.10.3), where some base station reference sequences and/or identifiers are obfuscated, the base station needs to establish a connection to the positioning management entity (PME). In this way, the base station obtains encryption details, validity times, etc., about such transmissions. Some of these configurations are for common positioning functions, and some for dedicated positioning functions. Random access configuration and optimization can be seen as two parts, first the random access parameter configuration of the system access needs to be tuned in relation to the configuration of the system access in adjacent regions, and second the random access handling within the system access region needs to be established.

For random access parameter configuration, the strategy can be that the base station or the OAM system gathers random access statistics based on base station measurements (no of received system access preambles, no of successful/failed system access procedures, no of received node-specific random access preambles, etc.), and/or UE measurement reports associated to the random access procedure (number of transmitted system access preambles and node-specific random access preambles, number of procedure failures due to contention, number of preambles transmitted at max power, etc.).

Once the system access is configured and the base station is operational, the base stations and nodes of the system access region need to establish knowledge of node reception and transmission coverage overlaps within the system access region and between system access regions. The parameter configuration and tuning aims at locally unique system access configurations, which means that the set of configured system access preambles and node-specific random access preambles, as well as the related resources in time, frequency and space can be altered due to overlaps with adjacent system access regions.

For deployment strategy A and B, such overlap statistics can also be used to understand which beams and nodes within the system access region that all are likely to receive a preamble from a UE, and also which are capable of transmitting a response to such a UE. Equally important is to establish which beams and nodes with the system access region that are not likely to receive the same preamble from a specific UE, or are incapable of transmitting a response to the same UE. This knowledge may be formalized as reception and transmission RA relations, as well as reception and transmission RA non-relation.

FIG. 140 illustrates an example of such overlap, where two different system access regions have an overlap and needs to align the system access configurations. Furthermore, within the system access region with SSI, nodes B1 and B2 have a RA relation (both reception and transmission for simplicity) as concluded based on statistics associated to UE1 and similar, while nodes B1 and B2 have a RA non-relation as concluded based on statistics associated to UE1 and UE2 and similar. In case of deployment strategy B, such relations can be used to coordinate RA responses, uplink configurations and contention handling between nodes. For deployment strategy C, the relations may instead be used when coordinating node-specific RA preambles and resources on a longer time scale.

3.9.2 Base Station Relation Establishment

Despite advanced radio network planning tools, it is very difficult to predict the radio propagation in detail. As a consequence, it is difficult to predict which base stations need to have a relation and may be also a direct connection prior to the network deployment. This was addressed in LTE, where UEs could be requested to retrieve unique information from the system information broadcast of unknown base stations and report to the serving base station. Such information was used to convey messages to the unknown base station via the core network, which maintained a lookup table from a unique identifier to an established S1 connection. One such message was used to request transport network layer address information necessary for a direct base station to base station connection for the X2 interface. For base station relations in the NX context, a base station is an entity that terminates the evolved X2 and/or S1 interfaces.

One approach for establishment of such base station relations is via pre-configuration and subsequent removal of unnecessary relations. The initial relations can be based on geographical information or logical information such as relations between all base stations within the same cluster interconnected via 'good' backhaul. Furthermore, the initial relations can be very lightweight to enable an extensive set of initial base station relations. The drawback is that some base station relations might not be relevant initially but after some time due to changes in the environment or in UE mobility patterns. An alternative is to regularly establish extensive base station relations and then subsequently remove unnecessary relations. For deployment strategy A with clusters of transmission points within the same base station, it is reasonable that some relations are needed within the cluster for example to coordinate system access, but there can still be a need for base station relations to base stations in different clusters and system access regions.

Therefore, it is concluded that there is a need for an Automatic Base station Relation (ABR) procedure in NX.

3.9.2.1 Ultra-Lean Broadcast of a Base Station Identifier

The ABR can be based on a similar foundation as ANR in LTE, where a UE is requested to retrieve system information from a different base station and report back to the serving BS. The procedure is thus based on broadcast of a base station identifier (BSID). One challenge is to combine this with an ultra-lean design, specifically relatively infrequent broadcast of the BSID compared to the SSI. The periodicity of the BSID could be on the same order as the AIT periodicity, and even associated to the AIT transmission for both base station and UE efficiency. Note that such infrequent BSID broadcasts most likely correspond to worse real time relation establishment performance compared to LTE, but that is an acceptable degradation, given the benefits from more ultra-lean transmissions.

Moreover, for efficient UE BSID retrieval, the UE benefits from knowledge about an approximate search space for BSIDs of non-serving BSs. The first alternative is based on the assumption that base stations are time aligned on millisecond level, for example via some network time protocol, and that BSIDs are transmitted in a network-wide, or at least regional common search space from a UE perspective. This enables an efficient BSID retrieval also for sparse BSID broadcasts.

The second alternative considers whether base stations are not time aligned, or whether it is desirable to support a more flexible BSID broadcast pattern between certain areas. Then, the BSID transmission pattern can be signaled as part of the AIT, and thereby be tied to the system access region. However, such a scheme requires that the UE is able to retrieve the AIT everywhere it is desirable to retrieve the BSID. For example, it can be relevant to broadcast the BSID everywhere the base station is reasonably able to serve connected UEs, which possibly could be a wider area than the SSI/AIT covers.

A third alternative is to rely on idle mode UE measurements. UEs can be configured to monitor and log SSI, AIT and BSID in addition to the tracking area information, as well as time stamps when in idle mode. Such a log can be provided to a serving base station when the UE has connected to the network. The log of transitions between different BSIDs can be used to identify BS relations. Either the serving BS that obtained the log can retrieve the BSID of an adjacent BS from the most recent visited cell, or the serving BS or a central entity like the OAM system can use the full log to establish BS relations corresponding to all BS transitions in the log.

A fourth alternative is to rely on radio link reestablishment procedures, where the UE provide a new serving base station with information about its previous serving base station. It is important to acknowledge that there might be a coverage hole between two base stations that caused the radio link failure. However, the BS relation can still be very relevant and an important part in an inter-BS coordination to compensate for the coverage hole.

FIG. 141 illustrates some possible BSID information that different UEs may retrieve from non-serving BS, upon request, to support automatic BS relations:

UE1, served by B1, can retrieve the ID of B2 using any of the four alternatives. It may also be configured to retrieve all BSIDs that have the same BSID search space configuration as its serving BS and also be able to retrieve the ID of B2.

UE2, served by B3, cannot retrieve any BSID.

UE3, served by B3, can retrieve the ID of B4 using any of the first, third and fourth alternative, but not the second alternative since the SSI/AIT cannot be retrieved in that location.

UE4, served by B3, can retrieve the ID of B4 using any of the four alternatives.

Moreover, not only the BSID but also the time of retrieval is needed in case the base stations broadcast the BSID in obfuscated mode, meaning that the BSID is only fixed during a validity time, and the BSID and retrieval time tuple is needed to correctly identify the BS. A signaling chart for the BSID and TNL address retrieval, and automatic X2 setup is provided by FIG. 142. Steps 1-5 illustrate the retrieval of a unique BSID from the PME (section 3.10) or similar despite obfuscation over the air, which is enough to establish a BS relation. In addition, it is also possible to automatically retrieve the TNL address information about the non-serving BS, either via a lookup table in a network node (step 6), or via a triggered request from the network node to the non-serving BS (step 6 and 7). The retrieved TNL address information can subsequently be used to establish an evolved X2 connection between the two BSs.

The transmission of BSID also needs to be evaluated and compared to other means to establish BS relations. One example is based on a central entity such as the PME coordinating the use of MRSs by the base stations. The base station regularly negotiates with PME which MRSs it can use. Then BS relations can be established based on MRS reports from UEs to a serving base station, which are sent to the PME for an association to a base station using the reported MRS. Such a solution comes at a coordination cost, but it enables a faster BS relation establishment, in the same order of the LTE establishment times.

3.9.2.2 Base Station Relations Based on Uplink Transmissions

An alternative to ultra-lean broadcast of BSIDs is to let served UEs to transmit in the uplink during a specific uplink search space. In a first alternative, the information about this BS search space can be valid network-wide, and the BSs are assumed to be time aligned on millisecond level. This enables efficient BS monitoring of the search space, provided that this search space is sufficiently limited in time and frequency. The serving BS configures the UE to send an uplink message including the BSID of the serving BS. A non-serving BS that retrieves the uplink transmission can extract the BSID or at least look it up via a different node, and thereby establish a BS relation.

An alternative supports non-time aligned BSs, or a more flexible assignment of the uplink search space between regions. It is based on that the definition of the BS search space for such uplink transmissions from non-serving UEs is included in the AIT or similar, and is therefore configured as part of the system access. This requires that the UE retrieves the SSI/AIT of the non-serving BS and reports to its serving BS.

Note that since the BSID in this case is not broadcasted by the nodes, the need for obfuscation is not as strong. Possibly, the uplink transmission could be obfuscated to be on the safe side. Signaling with some different options is illustrated by FIG. 143, which is a signaling chart for uplink-based ABR. Steps 1-2 are only needed if the uplink search space is defined by the SSI/AIT. Also, steps 5a and b are only needed if the BS needs to lookup the UBSID from PME based on the retrieved ULID and time. Again, steps 3-5 (1-2 optionally) are needed to establish a BS relation, while steps 6 and optionally 7 are needed to recover the TNL address and make the relation mutual, while steps 8-9 are needed to automatically establish an evolved X2 connection.

3.9.3 Beam Relations Establishment

When BS relations have been established, base stations can interact to coordinate and inform about transmissions. One possible use of such interactions is to establish relations between mobility beams of different base stations and nodes/transmission point associated to the base stations as discussed in section 3.5. Some important aspects when discussing relations between beams:

the relations should not be related to transmitted MRSs explicitly associated to beams to avoid an MRS planning problem.

the nodes should be able to benefit from altering beams by tuning beams, splitting beams, etc.

the relation could also be based on the uplink time alignment value to further narrow down the candidate beams for the handover of the UE.

the relation table supporting handover from a beam of the source node to a beam of the target node could reside in the source node or in the target node.

The relations between beams in NX can therefore be something different than the relations between cells in LTE.

In order to address the first two aspects, the notion of virtual mobility beams is introduced. A virtual beam of a node N is represented by an index i, i=1 . . . , M. In the sequel, the virtual beam i of node N is denoted VBNi, e.g., VB21. The considered procedure to automatically create mobility beam relations is therefore denoted Automatic Virtual beam Relations (AVR) to emphasize that the relations are between virtual beams. To support mobility, a node can realize a virtual mobility beam by one or more transmitted mobility beams, each assigned an MRS. The assignment of MRS to a mobility beam is not fixed and typically varies from one time window to the next. The virtual beam concept can also accommodate and support uplink based mobility, where a virtual beam can be associated to uplink reception, possibly with directivity. The discussion below is based on downlink based mobility, but the discussion more or less applies to uplink based mobility as well.

FIG. 144 provides some more insights into virtual beams and virtual beam relations, from the perspective of the virtual beam VB21 of node B2. It has one virtual beam relation to VB11 of node B1 and another to VB31 of node B3. The virtual beam VB11 is realized by a mobility beam assigned to MRS M1 and VB21 is realized by a mobility beam assigned to MRS M2. Furthermore, the virtual beam VB31 is realized by two mobility beams assigned to MRS M3 and M4 respectively. It is also reasonable to try to associate a served UE to a serving virtual mobility beam, either via direct measurements of periodically transmitted mobility beams from the serving node, or by associating the serving downlink or uplink beam (typically UE-specifically tuned) of the UE to a virtual mobility beam.

When node B2 triggers the need for mobility measurements on behalf of the depicted UE, the node takes advantage of the virtual beam relations between VB21 on one hand and VB11 and VB31 on the other. In this case, the realized mobility beam configured with MRS M3 is the most favorable alternative.

The virtual mobility beam relations can also be refined to be separate in the uplink and downlink, and may also consider the uplink time alignment to the serving node. In the following, uplink and downlink relations are assumed to be the same, and the serving node is the same in uplink and downlink, which means that the uplink time alignment is applicable also to the serving downlink beam. (In case of uplink and downlink split, the uplink time alignment reflects another node than the serving downlink node, which means that the uplink time alignment cannot be associated to the serving downlink beam.)

The uplink time alignment is put into the context of virtual mobility beam relations in FIG. 145. Here, the relations are not only between virtual mobility beams, but also including a TA range associated to the serving node. The virtual mobility beam VB21 now has one virtual beam relation from TA range TA1 to VB11 of node B1 and another from TA range TA2 to VB31 of node B3. When node B2 triggers the need for mobility measurements on behalf of the depicted UE with a TA within the TA range TA2, the node takes advantage of the virtual beam relations between VB21, TA2 on one hand and VB31 on the other. Thereby, only node B3 is asked to transmit mobility beams which are associated to virtual mobility beam VB31. Also in this case, the realized mobility beam configured with MRS M3 is the most favorable alternative. The TA ranges mentioned above are established from TA statistics based on successful handovers and will be improved over time with more statistics.

The concept of virtual mobility beams and virtual mobility beam relations means that the virtual mobility beam can be a mobility beam with any MRS, and is an alternative to a fixed association between beam and MRS which brings an MRS planning problem. A design based on a virtual mobility beam concept implies that an association between the logical virtual mobility beam and the realized mobility beam with its assigned MRS needs to be communicated to other nodes together with information about allocated resources via the evolved X2 or S1. Thereby, UEs can be informed about which search spaces the UE shall consider and/or which MRSs to search for. The design also ensures that any possible MRS collision from two different nodes can be predicted beforehand. Since the MRS to mobility beam allocation is not fixed in such a design, this enables obfuscated operation of mobility beams.

The virtual mobility beam relation table considered for a handover from a source node to a target node can reside in the source node or the target node. These are synchronized between target and source nodes, since the beam relation tables are needed for handover in both directions between two different nodes.

The relations between virtual mobility beams are established based on UE observations and reports. These observations are made when associated mobility beams are transmitted. Depending on the situation, the transmitted mobility beams can be initiated differently. Two situations are considered in the following two subsections. Moreover, establishing virtual mobility beam relations from RLF events is addressed in the subsequent subsection. A fourth alternative is where position information is available from GNSS or some other non-NX based system, which are addressed in the last subsection of virtual mobility beam relations section.

3.9.3.1 Establishment of a Green Field Network

When all nodes in an area are deployed at the same time, there are plenty of virtual mobility beam relations to establish, and the traffic is typically relatively low. Therefore, in order to establish the relations quickly, it is relevant to use the available UEs as much as possible for extensive observations. The green field deployment benefits from a dedicated training procedure, which is agreed upon once the base station relations have been established.

As illustrated by FIG. 146, which illustrates virtual mobility beam relation establishment for green field deployments, once the base station relations have been established, the base stations agree on a coordinated virtual mobility beam relation measurement phase. In the configuration, the base stations may coordinate the use of MRSs to avoid collisions, and to maximize the number of observations within a limited time. The configured MRSs are associated to virtual mobility beams as well as mobility beam realizations by each base station. Optionally, the virtual mobility beam relations are associated to the uplink time alignment and specifically different TA ranges.

3.9.3.2 Establishment of a New Node in a Mature Network

When a new node is established in a mature network, there is typically already a large amount of served UEs that trigger handover procedures. Every such handover procedure triggers transmissions of mobility beams configured with MRSs. It can therefore make sense to try to utilize these mobility beams for measurements by UEs served by the new node. This can be made in different ways:

The new node requests mobility beam information for all transmitted mobility beams from neighboring base stations. Whenever a base station initiates a mobility beam, it notifies the new node in time to allow that node to configure its served UEs for measurements.

The new node requests additional mobility beam transmissions from neighbor base stations, and to be informed when these are transmitted.

Both these are illustrated by FIG. 147, which illustrates virtual mobility beam relation establishment for mature deployments, with the optional step 2 addressing the request from the new base station to another base station to transmit excessive mobility beams. Step 1 concerns the request for mobility beam information to enable learning from mobility beams transmitted to support handover between existing base stations and transmission points. At the same time, the new BS transmits mobility beams for served UEs to measure on as well. In a similar manner, information about these mobility beams from the new base station to the neighboring base stations.

3.9.3.3 Virtual Mobility Beam Relations from RLF Reports

Inappropriate virtual mobility beam relations may lead to radio link failure (RLF) when the serving node cannot maintain the connection to the UE. Since the UE has an established context in the network, the UE does not initiate a completely new connection but tries to re-establish a connection to the network, typically towards a new/target base station. This can also be seen as a procedure to establish the required relations without any additional information broadcast from the nodes—though some of the initial UEs experience radio link failure, the procedure learns the required beam relations from such failures and becomes more robust in the future.

The steps 1-7 of FIG. 148 address the connection re-establishment as well as establishment of a virtual mobility beam relation, based on RLF reports:

1. The UE is informed about the BSID of the serving BS as part of some connection configuration procedure.

2. The UE is regularly associated to a virtual mobility beam, either via UE or BS measurements, or relating a serving data beam to the most appropriate virtual mobility beam.
3. The radio link of the UE fails. The source BS maintains the UE context.
4. The UE saves measurements, states and time of failure.
5. The UE re-establishes with the target BS or node, and provides UE ID and BSID at source BS to the target BS. The target BS either has been provided with the UE context already if handover has been initiated, or can retrieve the UE context from the source BS using the UEID and BSID. The UE context may include an association to a virtual mobility beam.
6. The target BS associates the UE to a virtual mobility beam in the target BS.
7. The target establishes a virtual mobility beam relation between the associated virtual mobility beams at source before the RLF, and at the target after the RLF (here, the source node is assumed to keep the UE context until receiving the re-establishment information for the UE after experiencing RLF for the UE). Optionally, the source TA is retrieved from the UE context and included in the relation, and/or the target TA is established and included in the relation.

Provided that the re-establishment procedure is reliable and prompt, then it can be seen as an adequate means for establishing virtual mobility beam relations. Maybe some RLFs can be considered a reasonable price compared to the limited overhead, but the associated performance needs to be related to customer requirements.

As the UE can be agnostic to the serving beam ID and/or serving BSID, the UE re-establishment procedure can be initiated by the source base station informing potential target base stations, as illustrated by FIG. 149, which shows a re-establishment procedure initiated by source BS with enhancements to virtual mobility beam relations. Based on the amount of information available to the UE at the moment of RLF, different amount of additional information might be exchanged between the original source BS and the re-establishment BS.

If the UE is agnostic to the serving BS and to the serving beam, then the serving BS needs to send notification to its neighbors about the UE, as shown in FIG. 149. By voluntarily acting to send the UE's RLF notice to the neighboring base stations, the serving base station opens up for future signaling from the re-establishment node. Note that the step-2 in FIG. 149 could be replaced with the UE notifying the re-establishment node about the previous serving node if the UE is only serving-beam agnostic rather than both serving-beam and serving-node agnostic.

In the step-4 of FIG. 149, information is exchanged not only about the UE's context but also information that aids in enhancing the virtual mobility beam relations. The re-establishment BS informs the original serving BS about the current virtual mobility beam that is being associated to the UE based on which the serving node can update its virtual mobility beam relations. Also the source node can re-evaluate the active mode procedure triggering thresholds in the UE's original serving beam configurations.

3.9.3.4 Position Information and Virtual Mobility Beam Relations

If a base station and UE are capable of regularly, or in an on-demand fashion, establishing a UE position estimate, then the virtual mobility beam relations can be based on the position information. This is also related to the considered positioning mechanisms and the associated positioning architecture. One advantage is that the source BS does not need to associate the UE to a virtual mobility beam at the source BS. On the other hand, the combination of an associated virtual mobility beam at the source BS as well as an uplink time alignment can in combination be seen as a coarse position estimate, and therefore the position information based virtual mobility beam relations can be seen as the same as discussed above. However, if the position information is independent from the mobility beams of the source BS, then the position to virtual mobility beam relations can be seen as a crowd sourcing of virtual mobility beam relations.

Building of such a table involves gradual learning, either via machine learning techniques or via SON research approaches or both, as to identify which radio feature best represents the position of the UE (when the geo-position of the UE is not available directly), relating the accuracy of the geo-location to the virtual mobility beams, as well as the associated mobility beams and continuously optimizing the contents of the table to suit the network changes (changes in the infrastructure of the city, changes in the deployment etc.). The position accuracy also has an impact on the reasonable size of the virtual mobility beams.

3.9.4 Mobility Robustness Optimization

The mobility procedure is explained in section 3.5. The explained beam-based procedure requires a self-organizing functionality in order to reduce the overhead of the MRS transmissions without a significant impact on the mobility robustness of the beam switch procedure. The SON features mentioned below assume the presence of base station relations and virtual mobility beam relations, as mentioned in sections 3.9.2 and 3.9.3. Also, a SON function similar to CIO (Cell Individual Offset) threshold tuning carried out in LTE but at the beam level is possible—the beam individual offset (BIO) tuning complements its LTE counterpart.

3.9.4.1 Handover Procedure Tuning Based on Virtual Mobility Beams Relation Tables The virtual mobility beam relations support the handover procedure to propose suitable virtual mobility beams. The serving node determines which virtual mobility beams (and associated mobility beams with configured MRSs) needs to be transmitted from itself and also either requests the neighboring nodes to transmit specific virtual mobility beams or informs the neighbors about the associated virtual mobility beam at source, which the neighbor uses to determine the related virtual mobility beams in the target node. The source and target BS uses the virtual mobility beams to generate associated mobility beams. For example, the virtual mobility beam can be associated to one or more mobility beams as illustrated by FIG. 144. The association between virtual mobility beams and mobility beams, as well as the mobility beam configuration itself, can be adapted over time.

Under the assumption that the AVR SON function is running for long enough duration to build a virtual mobility beam relation table with sufficient confidence, the HO procedure can be further refined to make it faster. A HO border scenario is shown in FIG. 150. The virtual mobility beam relation for a UE at the square is associated to one mobility beam A3 at the source node A and one mobility beam B2 at target node B. Since the UE is only requested to measure on only one target mobility beam, then a blind handover can be considered instead without configuring the UE to measure and report mobility beams. Therefore, all the steps until 'Network Preparation' stage in FIG. 106 could be avoided, to speed-up the HO procedure.

3.9.4.2 Dynamic Geo-Fence Management

The concept of geo-fence is mentioned in section 3.5.2. Just to summarize the concept of geo-fence again, it is the active mode UE coverage identifier for the node. Such a geo-fence could be used for pro-active (without waiting for the SINR to drop below certain threshold) triggering of the active mode handover procedure. A geo-fence is created with the help of a geo-fence beam (geo-fence beam is a MRS beam wider than the narrow MRS beam and this beam is transmitted periodically from the node when at least one active mode UE is connected to the node) and some relative thresholds in each narrow MRS beam directions. This method is further illustrated with the help of FIG. 151. In the figure, the narrow MRS beams are identified, and the geo-fence area is the shaded area overlapping the narrow MRS beams. In this method, the geo-fence area is generated with the help of a geo-fence beam, in that there is a physical beam transmitted from the node to create the shaded area in FIG. 151. The geo-fence area for such a geo-fence beam is defined with the help of thresholds in each of the narrow MRS beam. Therefore, when the UE is in narrow MRS beam-1 then the threshold-1 is used to identify the coverage of the geo-fence beam and when the UE is in narrow MRS beam-2 then the threshold-2 is used to identify the coverage of the geo-fence beam and so on. In this way, a UE in the narrow MRS beam 1 uses threshold-1 as a relative offset towards the signal quality of the geo-fence beam to trigger an event triggered measurement report.

In the initial deployment stages of the node, based on the drive test measurements or any other available pre-knowledge, OAM can identify the geo-fence for a given node and it can configure the node with corresponding geo-fence related thresholds directly. As one would prefer to reduce the drive tests, one could see this as a non-drive test based configuration, wherein the OAM configures each of the thresholds corresponding to the narrow MRS beams to the same value and lets the geo-fence management SON function optimize these thresholds.

A geo-fence can be further optimized based on different measurements collected by the node from the UEs and the performance of HO decisions. The shape of the geo-fence depends on the tuning of the beam relation parameters based on not only the performance of the HOs in the past, but also the node capabilities involved in the HO borders. As an example, the geo-fence beam's shape can differ significantly in certain narrow beam directions compared to other narrow beam directions. This is illustrated in FIG. 151. As shown in the figure, the coverage of the geo-fence beam can be limited via different thresholds in different directions based on the narrow MRS beams' quality and the performance of the neighboring node beam's (not shown in the figure but the current node is assumed to have neighbors) qualities. Also note that even though the signal strength measurements of the geo-fence beam of a particular node is better than the signal strength measurements of the geo-fence beam of another node at a particular position, it does not guarantee that the position belongs to the first node in terms of first node's geo-fence region, as the node capabilities in creating the narrow beams dictate how large or small the geo-fence of a node is.

Therefore, a dynamic geo-fence management SON function optimizes the active mode mobility procedure triggering location based on the HO statistics (Ping-Pong behaviors between the nodes, handover failures etc.), node (self and neighbor) capabilities and also possibly on load situations. The controlled parameter is the threshold value that is specific to a narrow MRS beam.

3.9.5 Self-Optimization and Healing

Several SON functions such as identity management, entity specific parameters, load management, coverage and capacity optimization, cognition and self-healing, are briefly commented upon in this section.

3.9.5.1 Identity Management

When operating the network in obfuscated mode, the ambition is to regularly change transmitted sequences and identifiers. This can also be seen as a way to avoid the planning problem of identifier assignment for local uniqueness. The identifiers mainly reside in the network and between network elements, and the transmitted identifiers and sequences are regularly changed in coordination with a PME.

3.9.5.2 Entity Specific Parameters

Detailed procedures of the network elements may be subject to automation, provided that there are systematic aspects such as radio conditions to adapt.

3.9.5.3 Enhanced Load Sharing Between Neighboring Nodes

A beam can potentially serve the UE with a good channel quality even when the UE is outside the geo-fence of a node. This is highly likely to be the case when the neighboring node is not interfering, e.g., due to lack of activity in the beam/s towards the UE. Though the neighbor is not transmitting any beams in the direction of the current UE, the neighbor could be overloaded due to high activity in other beams. This has an impact on the backhaul and other processing overhead in the neighbor. One example of a mobility load balancing scenario is shown in FIG. 152.

In FIG. 152, the UE moves from node A towards node B and once the UE goes outside the coverage of node A, then in the geo-fence based HO triggering method, the HO procedure is triggered towards node B. Based on the MRS measurement results, the node A recognizes that the HO candidate is node B and specifically beam B2 in node B. When the node A requests for the HO to beam B2 the node B can defer from accepting the HO if it realizes that the node A can serve the UE sufficiently well. (Note that node B is serving several other UEs in different beams which might cause more processing overhead and backhaul overhead in node B.) In such a load balancing feature, the node B can further only get certain measurements from the node A related to the UE to make sure that the UE is not suffering because of the in-efficient beam quality from node A.

3.9.5.4 Coverage and Capacity Optimization

With a beam-based system, the ambition is to always provide an adequate beam to the UE. At the same time, the network and service coverage should be maintained and predictable. Therefore, it is important to re-evaluate the coverage and capacity situation in the network to assess whether deployments of additional network elements are needed, or if the existing can be reconfigured to accommodate the needs of the users.

3.9.5.5 Cognition and Self-Healing

Much of the assessments and analysis today take advantage of the extensive broadcast of reference signals and identifiers. With more restricted transmission of such identifiers, it is important to still support root case and analytics use cases properly.

3.10 Positioning

Positioning in NX aims at addressing vastly different positioning needs and differentiation between users, device types, services etc. Signals and procedures for positioning in NX are flexible, to meet the requirements.

3.10.1 Requirements and Capabilities

With a multitude of potential applications and use cases, the requirements can be stated along multiple dimensions, as exemplified and illustrated by FIG. 153, which illustrates positioning requirements trade-offs, illustrated by a critical application (shaded area extending generally horizontally) such as an emergency call or autonomous vessel associated to a device, and a non-critical application (shaded area extending generally vertically) such as sensing or network management. The set of requirements is thus more heterogeneous than only accuracy requirements.

Physical Layer Requirements:
- Cost concerns CAPEX and OPEX costs of the operator associated to positioning, as well as radio resources allocated to positioning.
- Energy efficiency aspects can be relevant at both the network side and the device side and concerns to what extent energy efficiency is a consideration or not. Also related to costs.
- Accuracy requirements range from crude (100 m) to very accurate (submeter). A related requirement is regarding accuracy assessments, which implies that the estimated accuracy of an estimated position should be stated.

Protocol oriented requirements:
- Protocol aspects concerns whether the positioning is supported by a very specific protocol such as the LTE Positioning protocol between a UE and a network node, or if it is a mix of different protocols including user plane and control plane signaling, access and non-access stratum signaling, etc.
- Device type dependency concerns support for various limitations associated to devices and tags.
- State dependency is a requirement that dictates whether the device can be positioned in different states such as idle/dormant/active.

Architecture and deployment requirements;
- Deployment relates to whether positioning poses requirements that affect and influence the deployment configuration.
- Absolute/relative position requirements with estimates either related to a known geographical reference, or only to a logical entity, may be with uncertain or even unknown position.
- Time to fix, the time from when the positioning request is made, to when the position estimate is provided to the requester, can be of different importance and at different level depending on application. For example, vessel autonomy would have stricter requirements than an emergency call.
- Flexibility to support different requirements over time.
- Scalability to support applications with vast number of devices.
- Network architecture aspects are also related to time to fix and scalability, as well as the network slicing aspects. Some applications may require that a specific network node is involved, while others are fine with support from a logical network function that can be virtualized anywhere.

Higher layer requirements:
- Differentiation concerns the ability to simultaneously provide different grade of positioning performance to different applications, devices, services, etc.
- Privacy dictates whether positioning information should be anonymized for the operator, and whether the network supports anonymized UE-based positioning.
- Security concerns whether a third party can retrieve some positioning information.

FIG. 153 illustrates the requirements by two example use cases. The first use case represents a critical application where strict time to fix, accuracy, security, protocol aspects and state dependency requirements are most important and scalability is less strict. The second use case illustrates a non-critical application for sensing and network management where instead strict flexibility, scalability, cost and privacy requirements are most important, and requirements on accuracy, state dependency and protocol aspects are less strict.

The scope of positioning opportunities is also very much dependent on the capabilities of the terminal. FIG. 154 lists some typical capabilities, and some examples of different level of device complexity. Different device complexities can for example be associated to support of different numerology, where simple devices are limited in terms of supported bandwidth and symbol time etc. The device complexity can also be associated to how the device is powered, which is closely related to energy efficiency aspects. Some devices are pre-configured and cannot be re-configured once deployed, while others are capable of retrieving some common information, and even more capable devices can retrieve dedicated configuration information.

Devices can also have different capabilities when it comes to support of differently complex downlink reception and uplink transmission schemes. Simple devices may be configured to only transmit in the uplink, while slightly more complex devices can measure and report downlink measurements. Beam forming and codebook-based may require an even more advanced device etc. Also, some devices are capable to taking advantage of their own position, while simpler devices only enable some other node to determine its position and use in applications.

3.10.2 Common and Dedicated Functions

NX positioning components can be configured as common or dedicated components to enable both scalable and crude positioning as well as accurate and tailored positioning. Common Positioning Reference Signals (PRSs) and contention-based uplink signals can be configured via a specific Positioning Information Table (PIT) or some other table such as Access Information Table (AIT). Dedicated components include dedicated PRSs, dedicated Uplink Synchronization Signals (USSs), and dedicated procedures. A positioning procedure may be initiated via common procedure to be refined via dedicated procedures. The geographical association to a component can be included in assistance data to the UE (UE-based positioning), or be configured in a database in a network node, where the association is made based on UE feedback (UE-assisted positioning). Both positioning strategies are supported in previous generations, and are supported also in NX.

3.10.2.1 Common PRSs

Some common signals can be seen as instances of PRSs, such as the System Signature (SS). In addition, there can be additional common PRSs defined and the UE has to retrieve information about such PRSs via scheduled signaling in active mode. The configuration information is denoted the Positioning Information Table (PIT), which may be associated to a validity region characterized by a SSI or a tracking area. It is up to the UE to monitor the validity of the PIT and retrieve an update once the region has changed. This means that common PRSs can be monitored in essentially any state.

A common PRS may be node specific, or common for a set of nodes. It may also be beam specific. The common PRS may also be transmitted via a different RAT such as the existing PRSs of LTE.

3.10.2.2 Common Contention-Based Uplink Signals

Common uplink signals such as PRACH preambles can be used to establish uplink time synchronization at a node. Since the signals are common, contention has to be handled to ensure the true identity of the device. The configuration information about these common signals can be provided to the UE via broadcast information or scheduled information.

3.10.2.3 Dedicated PRSs

The PRSs can also be configured in a dedicated fashion, either to extend the common PRSs to enhance performance or to refine the resolution of PRSs in time and/or space. One typical PRS configuration is the Time Synchronization Signal (TSS) for timing estimation, typically in combination with a Mobility Reference Signal (MRS) to refine timing estimation and enable beam identification. A PRS is a configuration towards a UE, which means that given a transmitted TSS, one UE can be configured to use the TSS for timing estimation, while another UE is configured to consider the TSS as a realization of a PRS.

Furthermore, dedicated PRSs can also be configured by extending TSS and/or MRS in time and/or frequency. In one example, a node is configured to transmit identical sequences for TSS and MRS in two consecutive symbols. One UE is configured to utilize the transmission of the first symbol as a TSS/MRS, while another UE is configured to use the sequences of the two symbols as a PRS.

3.10.2.4 Dedicated Uplink Synchronization Signals (USS)

Time alignment during random access aims at aligning the time with respect to a node. The UE is assigned an USS to enable uplink timing estimation. The procedure can also be seen as a round-trip time estimation procedure, which potentially can use the USS as is or be refined by an enhanced USS with even better support for timing estimation.

Furthermore, multiple nodes may receive the USSs to enable uplink Time Difference of Arrival (TDOA). To support such positioning, the information about the USS needs to be signaled between nodes, or at least to the corresponding baseband processing unit.

3.10.2.5 Combining Common and Dedicated Components

FIG. 155 exemplifies some common and dedicated components, where the common components are defined in a validity region characterized by the SSI area. Positioning can be gradually refined from crude and supported by the common PRS transmitted by a set of nodes, to accurate and supported by some beam-specific dedicated PRSs. The UE needs to retrieve information about the dedicated PRSs in UE NX active state. Once retrieved, measurements can be aggregated and processed in any state (active, dormant, idle).

3.10.2.6 Network Synchronization Challenges

Some positioning frameworks such as uplink and downlink time difference of arrival are based on information about the relative timing between nodes or the corresponding baseband units. For crude positioning, the network synchronization is less of an issue, and the current network synchronization procedure based on Global Navigation Satellite Systems (GNSS) suffices. It implies a timing error standard deviation in the order of 50 ns [3GPP37.857] corresponding to 15 meters. However, for sub-meter accuracy requirements, this is not accurate enough. Therefore, clock synchronization based on over the air measurements is desirable. An alternative is to use mechanisms that utilize ranging and direction measurements, which in combination can provide accurate positioning without accurate inter-node synchronization.

3.10.3 Restricted Availability of Positioning Information

There can be several reasons to restrict the availability of positioning information. One is that regular transmission of PRSs has an impact on energy consumption of a node since it limits node sleep. If there are no UEs taking advantage of the PRSs, then their transmission should be avoided. Moreover, if such signals are semi-statically configured, then $3^{rd}$-party applications can be used to register the PRSs, associate them to geographical positions and store the data in a database. This database then enables $3^{rd}$ party applications to measure PRSs and correlate with the established database to enable positioning of the device. An operator might be interested in restricting the access to PRSs to only its customers, possibly with some differentiation. Restricted availability of and access to positioning information is a new concept for NX and is therefore described in more detail than the PRS components in the previous subsection.

In general, a PRS can be seen as sequences/resources/descrambling that are functions of time (t) and, frequency (f), node ID ($id_1$), system ID ($id_2$), PRS ID ($id_{PRS}$), etc that can be semi-statically configured. By adding a time-varying parameter $\alpha(t)$ that is altered regularly and has to be retrieved via dedicated signaling:

$$PRS_n = f(id_n, \ldots, \alpha(t)).$$

It is possible to define a PRS with a validity time or access time in the sense that a UE needs to retrieve information about $\alpha(t)$ once its current information has become outdated. Thereby, it is not possible to record PRSs via over the top applications since this information is only valid for a limited time.

This is exemplified in FIG. 156, where different nodes transmit different positioning reference signals. The signals are not fully useful for the UE unless it knows the time varying sequence $\alpha(t)$ used to generate the signals. In this example the time-varying parameter $\alpha(t)$ is denoted a "positioning key" since it enables the UE to unlock the high accuracy positioning capabilities provided by the network.

Example signaling is provided in FIG. 157. In this example, a network entity denoted Positioning management entity (PME) configures the network nodes with a time-varying dedicated PRS configuration. The network node n transmits a dedicated $PRS_n$ (on behalf of some other UE, probably) that is a function of the time varying PRS configuration. Since the UE in this example has no information about the current dedicated PRS configuration, it cannot perform a high accuracy positioning using the dedicated PRS signals. Optionally it may perform a low accuracy positioning e.g., using common PRS information that is not time-varying.

If the UE determines that it wants to perform a high accuracy positioning using dedicated PRS signals it sends a request to the network (typically via the currently serving node that may then forwards the request to the PME node) and receives in response the information required to perform high accuracy positioning.

After some time, the current positioning expires and the PME configures the network nodes with a new dedicated PRS configuration (or its reconfiguration pattern might be configured for a longer period of time). Unless the UE has received an update containing information related to this new configuration it can now no longer perform a high accuracy positioning.

Note that the example provided in FIG. 157 is just an example. Alternative solutions could be that the network nodes handles the PRS expiration timers and re-configuration autonomously, after an initial configuration, e.g., by an OSS (operation and support system) or SON (self-optimizing network) node.

Differentiated positioning accuracy can be enabled in many different ways e.g., by one or more of:

Providing a positioning key that is valid for a short time or for long time duration.

Providing information that enables the user terminal to decode only a selected sub-set of the available PRS signals transmitted from the network.

Making selected parts of the PRSs decodable to the UE (e.g., in time and/or bandwidth).

Providing additional PRSs in response to a higher accuracy request.

3.10.4 Flexible Reference Nodes

In previous generations, the positioning infrastructure has been network nodes such as base stations, transmission points, etc. However, in some use cases, the density and geometry of network nodes are insufficient to provide accurate positioning. Furthermore, some applications and use cases rely on relative positioning between entities, and accurate relative positions are more important than absolute positions. One example is use cases with autonomous vessels with humans in the vicinity. In such cases, the relative position is vital to avoid accidents.

Therefore, it is relevant to consider some devices to be part of the positioning infrastructure.

In order to be clear, the following distinction is made:

Positioning—determination of the whereabouts of a device, which can be estimated based on signals from infrastructure nodes and devices.

Location—whereabouts of a piece of infrastructure, which can be either network nodes or other devices. Note that the location of such a device can be determined via positioning.

Devices that support positioning may either have specific capabilities such as a capability of self-positioning in absolute terms (e.g., GNSS) or in relative terms (e.g., radar, sensors). These devices are referred to here as positioning support devices. These devices at least have the capability of transmitting a positioning reference signal, or even the capability of supporting a ranging and/or bearing estimation procedure.

FIG. 158 illustrates a signaling example with device 1 that acts as a positioning support device and thereby enhances the positioning of a device 2. The positioning support device informs the network node about its capability, and receives a PRS configuration. One example of a PRS is the sidelink discovery signal in LTE, enhanced with a reporting procedure.

3.10.5 Ranging Procedures

The purpose of uplink timing alignment is to establish an uplink timing that is approximately equal for all served UEs at the same node. It is typically established during random access and maintained during the duration of the connection based on feedback from the node to the UE with relative timing adjustments.

Ranging can also be an important component in positioning, but it requires range estimates from at least two to four nodes depending on whether a time series of measurements is available, and whether a 2D or 3D position is required. Therefore, it can be relevant to design a ranging procedure towards non-serving nodes. It is natural to base such a procedure on uplink time alignment which starts from random access. Hence, the UE needs to be authorized and configured to be able to initiate random access to a non-serving node. The configuration can be via one or more of:

the AIT providing system access information, where optionally some random access preambles may be restricted for access of non-serving devices.

the serving node, providing information about random access procedures to non-serving nodes, including both random access preambles as well as related downlink reference signals.

pre-configuration, where a specific downlink reference signal indicates acceptance of the reception of a random access preamble for non-serving ranging.

The UE initiates the ranging by monitoring a downlink reference signal (a PRS or some other DL RS) associated to non-serving node ranging. Based on the received timing of the downlink signal, or an uplink timing related to the serving cell, the UE transmits a random access preamble to the non-serving node, and awaits a response in a pre-configured or configured time/frequency resource or search space. The response may include an initial uplink timing, and may include an uplink resource and transmission configuration for subsequent uplink transmission. The transmission/response procedure may continue until a satisfactory ranging accuracy has been achieved. The procedure may comprise configuration of gradually wider uplink and downlink signals to enable gradual accuracy improvements.

3.10.6 Direction Estimation Procedure

The serving node interactions may include feedback about the favorable beam or beams, typically associated to an MRS. The feedback may also include the received signal strength of the MRS. The node can thereby associate to the UE a direction estimate based on the direction and width of the favorable beam. A prerequisite is that the beam has been calibrated to a spatial direction. Such calibration can be performed by gathering some accurate positions in a training phase via GNSS or similar, and associating such positions to favorable beams.

One way to refine the direction estimates is to not only request the UE to report the favorable beam but to configure multiple beams in the direction where the UE approximately roams, and request the UE to report the received signal strength from multiple beams. The feedback can be efficient if considering relative signal strength reports as the received signal strength relative to the strength of the favorable beam.

If the beams stem from the same node, and the radio propagation conditions can be considered to be the same, then the relative signal strength between two beams is equivalent to the relative antenna beam gain between the beams. With calibrated beams, this can be translated into very accurate direction estimates.

3.11 Device-to-Device Communication

While a first set of LTE D2D features were first added in Release 12, NX includes D2D capabilities as an integral part of the system. This includes peer-to-peer user-data communication directly between devices but also, for example, the use of mobile devices as relays to extend network coverage.

3.11.1 Basic Rationale and Desired Features for D2D Communications

In LTE, a rudimentary support for D2D communications was first added in Release-12. The main functionalities were developed for the public safety (PS) use case, including intra- and intercell (in-coverage), outside network coverage and partial network coverage scenarios. For non-public safety use cases only discovery within network coverage was supported. For Release-13 and Release-14 the scope of D2D communications will be extended both for PS and commercial use cases, including support for V2X communications. Still, the currently supported LTE D2D communications technology components are not designed to fully harvest the potential of the coverage, capacity and delay gains that D2D communications are expected to deliver.

For NX, D2D communications capabilities are supported as an inherent part of the system rather than as an "add-on" feature. The basic rationale for D2D communications as a technology component is that D2D transmission should be used whenever it is (1) more efficient in terms of spectral efficiency, energy efficiency, achievable latency or reliability or (2) can provide a better service experience than traditional cellular communication.

The D2D features that are or will be supported by Release-12, -13, -14 D2D are also supported by the NX D2D design. In addition, the NX D2D design supports additional features that are motivated by new use cases, requirements or performance enhancements. To summarize the D2D scenarios and to establish some basic D2D related requirement list, the D2D scenarios are summarized in FIG. 159. These scenarios may be helpful to identify desirable features and design options, but D2D technology components under discussion are not and should not be tightly connected to or limited by these scenarios.

FIG. 160 lists desirable features related to D2D and compares their current status with how that requirement applies to NX. Unicast (point-to-point) D2D communication can be seen as a base case, that—when mode selection, resource allocation and power control are properly applied—can much improve the network performance when proximal communication opportunities exist. Multicast and broadcast communication by means of D2D is supported from 3GPP Rel-12. In NX, there can be performance enhancements to support a longer multicast/broadcast range and higher rates without affecting the cellular layer. Support for D2D based relaying in partial network coverage situations exists already in Rel-12, but the performance both in terms of range extension and achieved end-to-end rates can be expected to increase by appropriate relaying device selection and RRM functions.

Cooperative communications enabled by network controlled and assisted D2D communications can take many different forms at various layers of the protocol stack, such as distributed device based content caching and distribution, cooperative MAC protocols and, for example, network coding enhanced cooperative relaying. Likewise, some forms of D2D communication outside NW coverage is supported already in Rel-12 (e.g., multicast/broadcast), but in NX D2D is further developed to cover larger areas in, for example, disaster situations and provide higher bit rate services even in (temporarily) out-of-coverage areas.

3.11.2 NX Design Principles and D2D

TABLE 17

NX design principles and their applications to D2D in NX

| NX design principles | Implications on D2D design in NX |
|---|---|
| Use ultra-lean transmission | Already that way compared to traditional cellular, possibility on R12/13 SLSS (side-link sync signal) reduction compared with Rel-12. |
| Use self-contained transmissions | Already that way compared to traditional cellular, possibility on integrated control channel and data channel |
| Avoid strict timing relations across subframes | Take advantage of UL/DL flexibility (no explicit restriction to constrain D2D to uplink resource/(either carrier for FDD or subframe for TDD)) |

TABLE 17-continued

NX design principles and their applications to D2D in NX

| NX design principles | Implications on D2D design in NX |
|---|---|
| Avoid slow reconfiguration of dynamically changing quantities | To enhance control plane reliability and flexibility (to support multi-hop/mesh D2D); |
| Support high-frequency friendly D2D | PHY numerology for NX-D2D Take advantage of advanced antenna solutions and high processing capabilities and large storage available in devices RAT/frequency selection/coordination |
| Bring "sufficient" NW control into the D2D sidelink management | To do relay at L2 instead of L3 type relay defined in Rel-13. Relaying UE should appear to be similar (at L1/L2) to an out of coverage UE as a BS. |

The NX design principles are applied to the D2D design as much as possible to ensure a smooth integration into the NX system and to allow for a gradual convergence between solutions for UL, DL, sidelink and possibly also for backhaul links. Table 17 lists some of the NX design principles are applied for D2D, and also two additional ones (the last two rows of the Table as above) as D2D-specific principles.

3.11.3 Spectrum for D2D and Duplexing Schemes

For LTE, D2D communication is supported in UL spectrum resources, in the UL band or UL subframes in the case of an FDD or TDD network respectively. The reasons for this decision are related to both regulatory and implementation aspects.

However, NX is designed to flexibly manage UL/DL resources and utilize different types of spectrum bands and therefore, NX D2D is also designed to be able to operate flexibly in UL as well as DL resources. Further, D2D should be able to operate both in licensed and unlicensed spectrum bands depending on the scenario, UE capabilities, coverage situation and other factors. For NX, in higher frequency bands (>6 GHz), the network will typically operate in TDD mode, whereas in lower frequency bands both FDD and TDD operations can be assumed. In FDD networks, the NX D2D link advantageously uses UL frequency resources, whereas in TDD networks, D2D operation is configured by the NW in line with the flexible duplex and dynamic TDD principles of NX.

In NX, the D2D sidelink is evolved such that the NX UL, NX DL, NX sidelink and backhaul links become similar in terms of PHY layer capabilities, including duplexing schemes. For proximity communication, that is when two devices are close to one another, bidirectional full duplex can also be a viable duplexing scheme.

Operating in unlicensed and licensed bands may require that the sidelink flexibly support scheduled and LBT type of MAC protocols (see section 3.8).

3.11.4 Basic Architecture for D2D Communications: Clustering Concept

FIG. 161 illustrates D2D communications supported by the clustering concept. The CH node can be in NW coverage or out of NW coverage. A UE in coverage can act as a source for synchronization signals or provide RRM information to a CH which is outside NW coverage.

The NX D2D design uses clusters to support the broad diversity of in-coverage, out-of-coverage and partial coverage use cases. The basic idea of the clustering is to extend the cellular concept to out of coverage situations by nominating a UE (handheld, truck mounted or provisionally deployed) to act as a resource owner and control node, similarly to a regular eNB. The cluster head (CH) node is thus very similar to an eNB, although differences in capabilities in terms of output power, number of UEs that it can support or mounted antennas can vary.

The CH, when outside NW coverage can get synchronization information or radio resource management information from a non-CH UE that is inside coverage and capable of relaying such information from an eNB (FIG. 161).

An inherent part of the cluster concept is the dynamic CH selection process. The clustering concept is a hybrid of distributed (CH selection) and centralized (CH itself acting as a central node within the cluster) elements. In short, the CH selection process is distributed, and uses discovery beacon signals transmitted from all devices, including meaningful information about its status to be able to be selected as a cluster head, and a selection of which peer device is to act as the cluster head for a particular device.

3.11.5 NX Network and UE Scenarios

FIG. 162 illustrates some combinations of NX deployment scenarios and UE capabilities. In the NX standalone case (left), the UE supports NX, whereas in the co-deployed (middle) and multi-site (right) cases, there may be a need for RAT selection for D2D.

As illustrated in FIG. 162, when NX is co-deployed or when NX and LTE are deployed at different sites, UEs with different RAT capabilities may be in the proximity of one another such that D2D communication can be a viable alternative provided that these UEs use compatible RATs. To facilitate D2D communications in such scenarios, RAT selection for D2D may be a desirable function to fully exploit the proximity of various devices.

Such RAT selection does not necessarily imply selecting only one of the available interfaces at a time: RAT selection may also mean the simultaneous usage of the available RATs as well. This can be the case in, for example, multihop scenarios.

3.11.6 Protocol Architecture

To support D2D in partial coverage and out-of-coverage situations, several design approaches can be viable, including a hierarchical architecture or a distributed (flat) architecture as a design base. A hybrid approach aims at electing a cluster head (CH) that takes a similar role to an eNB in case the infrastructure becomes dysfunctional. In this approach the CH selection and re-selection are distributed in the sense that nodes can elect the CH from among themselves without the help from a central entity. Once a CH is elected, it acts similarly to an eNB until re-selection.

When only group communications based on broadcast or multicast need to be supported, the CH based architecture and associated dynamic cluster organization procedures are not necessary. However, when point-to-point D2D communications and the possibility to reach a cellular base station through multiple hops are a requirement, the CH based approach can outperform completely flat architectures.

3.11.6.1 General

The protocol stack for the sidelink is, when possible and when it can be motivated, aligned with the protocol stack for the uplink/downlink. For example, a physical layer that is symmetric in uplink and downlink fits well for D2D communication. As another example, a cluster head for D2D communication may either be an eNB or a UE.

Moreover, the user plane protocol stack for different relaying cases involving a UE-UE direct interface (such as UE-to-network relay and UE-to-UE relay) should be aligned with any relaying cases for self-backhauling. Aligned protocol stacks have the following additional benefits:

RAN has the possibility to control which path that is used for a given traffic flow, and consequently control which type of radio resources that is used. This flexibility enables for example a UE-UE user plane to be relayed via RAN, as well as a UE-NW user plane to be relayed via a UE (acting as UE-to-NW relay), controlled by RAN.

Moreover, there is an opportunity for RAN to switch a traffic flow between different paths ensuring service continuity during the switch since the switch would be performed on layer 2 level, below the IP layer of the UE (like a handover). (To switch the traffic between e.g., UE-network path and UE-to-network relay path, the IP address used by the UE needs to be valid on both paths, which requires support by the core network.)

FIG. 163 illustrates Layer 2 switching of user data paths.

3.11.6.2 User Plane

The user plane protocol architecture for the single hop case is illustrated in FIG. 164. For the relaying cases, the main approach is to use L2 relay. (L2 relay does not, in principle, preclude that L3 (IP) relaying is performed using a UE as an IP router.) This is also in line with the main alternative for self-backhauling (see sections 3.6.6 and 2.2.8.4). FIG. 165 illustrates the user plane protocol architecture for UE-to-network relay. In this figure, a two-layered RLC solution is assumed, as further described as one of the alternative approaches in Section 2.2.8.4.

FIG. 166 illustrates the user plane protocol architecture for UE-to-UE relay.

3.11.6.3 Control Plane

For D2D communication and discovery, there are three potential control planes:

A UE-Cluster Head control plane: Used to assign the radio resources for D2D communication and discovery. In case the UE is in coverage, the eNB takes the role of the cluster head. In case the UE is outside coverage, a UE is selected as cluster head and takes that role.

An end-to-end UE-UE control plane. This protocol is typically not radio layer specific ("NAS") and is used for mutual authentication, setup of security and setup of bearer parameters for the UE-UE end-to-end user plane. This protocol corresponds to the PC5 Signaling Protocol specified for LTE-based D2D in 3GPP Rel-13. This control plane is connection-oriented, as protocol contexts/states would be needed in each peer UE.

A link-by-link UE-UE control plane. This protocol is radio layer specific and is used for the control of PHY, MAC and RLC configuration used over a single hop between two UEs. It may also be used for transfer of measurements on the UE-UE direct radio link. This control plane is typically connection-oriented.

Moreover, there is also a control plane needed for direct discovery, including multi-hop path discovery and relay selection/reselection. This control plane can be included as part of the end-to-end UE-UE control plane and/or link-by-link UE-UE control plane above.

FIG. 167 illustrates plane protocols used by D2D (UE3 is outside coverage).

3.11.7 D2D Technology Components

FIG. 168 illustrates some combinations of NX deployment scenarios and UE capabilities.

To realize the potential gains due to D2D communications, protect the network from interference caused by sidelink transmissions, and to smoothly integrate D2D operation in the NX system, some D2D specific technology components should be implemented in the network and devices. These are summarized in FIG. 168.

3.11.7.1 D2D Synchronization

The devices that participate in D2D (unicast, multicast and broadcast) communications should be synchronized in time and frequency. Good synchronization is necessary to ensure sidelink transmissions are according to the time/ frequency domain scheduling decisions, energy efficient discovery and communication operation and facilitate high quality data reception. D2D synchronization can be challenging in out of coverage and partial coverage situations.

A concept of synchronization source (SynS) provided by a UE is applicable to NX D2D. In LTE, D2D synchronization is facilitated by the PHY sidelink synchronization related procedures [TS 36.213]. A similar design is the foundation for NX D2D synchronization procedures, which can be extended to out of coverage situations (Scenario 4) using the concept of the SynS. A SynS can be a network node (BS), when available, or can be an in-coverage UE providing a synch signal to out-of-coverage UEs. The SynS can also be an out-of-coverage UE that obtains synchronization with the help of another (e.g., in-coverage) UE.

3.11.7.2 Device and Service Discovery

Device and service discovery can be part of a D2D session or it can be a standalone service. In both cases, discovery implies that a UE can take on the role of an announcing UE or a discovering UE or both announcing and discovering. In both cases, a prerequisite to starting the discovery procedure is service authorization and provisioning (See Section 3.11.5.3.). Similarly to LTE, two discovery models are supported and configured by the network, taking into account UE capabilities, user preferences, etc. Although these discovery models do not imply differences at the physical layer, they can lead to different performance in terms of overall consumed energy and discovery time due to the different beacon transmission patterns.

In the first discovery model (for LTE denoted 'Model A'), the announcing UE broadcasts discovery messages on specific radio resources configured by the network. Such network configuration can use broadcast information, preconfigured information and/or UE specific signaling (e.g., RRC signaling). The discovering UE can use the configuration information to capture and decode discovery messages in an energy efficient fashion, since it needs to monitor only the discovery resources.

In the second model (for LTE denoted 'Model B'), the discovering UE (rather than the announcing UE) broadcasts discovery messages, also according to configured and provisioned parameters and resources. The network assistance in the discovery procedures has been shown to be beneficial both in terms of discovery time and overall used energy during the discovery process.

In partial coverage and out-of-coverage situations, D2D discovery mechanisms depend on the basic architecture decisions regarding cluster based or flat architecture for D2D communications. When clusters are used, the distributed CH selection and re-selection and CH association procedures act as discovery procedures based on node autonomous (distributed) decisions on transmitting and detecting beacon and synchronization signals.

A special case of discovery is UE-to-Network relay discovery. A UE that is authorized by the network to act as a relay for remote UEs typically out of coverage (or inside coverage) participates in UE-to-Network relay discovery during which a remote UE selects which UE to be used as the UE-to-Network relay.

Moreover, the discovery mechanisms for NX need to support path selection for more complex cases such as UE-to-UE relaying and multihop relaying.

3.11.7.3 Service Authorization and Provisioning

Service authorization and provisioning allows a device to use radio and other resources for D2D discovery and communication purposes. The exact mechanisms for this may depend on the D2D use case (see Section 3.11.1) and can include one or more of the following main elements:

Pre-configured information in the device. Preconfigured information can contain the allowed frequency bands, associated transmit power levels and other parameters that the device may use for discovery and communication purposes. Pre-configuration may take place prior to accessing the NX system and/or through other accesses.

NAS signaling to exchange information with CN functions similar to the LTE ProSe function.

System information and UE specific (e.g., RRC) signaling when in NX coverage.

3.11.7.4 Sidelink Management

Sidelink management is responsible for the establishment, maintenance and termination of sidelink channels, including discovery and communication channels. These functions can be considered as the extensions and evolution of functions that are defined in LTE in [TS 36.213].

Examples of sidelink management include the triggering of broadcast discovery (announcing or inquiry) messages, establishing the sidelink shared channel with a specific peer device or triggering broadcast/multicast messages to a set of peer UEs on specific resources, etc.

FIG. 169 illustrates examples of sidelink management functions.

3.11.7.5 Measurement Reports and Radio Resource Management

FIG. 170 illustrates examples of measurement functions desirable for D2D communications.

Measurements and associated reporting provide important input to sidelink management and D2D related radio resource management functions so that D2D communication can indeed improve the overall spectral/energy efficiency and coverage and reduce latency without causing unacceptable interference to cellular traffic. The radio resource management functions that are desirable to realize these goals depends on the use case (see Section 3.11.1), availability of licensed/unlicensed spectral resources, traffic load, device capabilities (e.g., small battery driven device, smart phone, public safety device). The RRM functions are distributed between network nodes and the devices. Important aspects of the functional distribution between network nodes and devices are the level of network control and the time scale over which network and device RRM functions operate. The general principle for these aspects is that the network or the CH has tight control over resources owned by network or by the CH (e.g., licensed spectrum resources). Accordingly, two UEs, out of which none of them is CH capable, cannot communicate on licensed resources when out of coverage.

The RRM functions that are desirable for D2D communications involve standardized and proprietary elements and can partially reuse RRM functions designed for traditional cellular communications. Such RRM functions include one or more of:

Mode selection between cellular and direct D2D mode;
Sidelink resource allocation and scheduling;
Sidelink power control;
Out-of coverage and partial coverage cluster formation.

3.11.7.6 Multi-Antenna Schemes (UE Beamforming, Sidelink Beam Matching)

FIG. 171 illustrates how UE beamforming for D2D communications relies on network controlled service authorization, provisioning and local measurements. The eNB/CH control is at a much coarser time scale (~500 ms) than the D2D link control exercised autonomously within the constraints set by the eNB/CH.

UE beamforming can largely improve the D2D range and therefore can further improve the potential of D2D communications for, e.g., cellular coverage extension, increasing the number of devices reached by device discovery or reducing the number of devices needed to provide provisional coverage in a disaster situation. From a configuration and control perspective, the basic principle for supporting UE beamforming is similar to other device functions (see 3.11.7.3 and 3.11.7.5): the device operation relies on the service provisioning and configuration information and the supporting measurement procedures.

3.11.7.7 D2D Band Selection Strategy

For cases with multiple available bands, such as licensed and non-licensed bands, a negotiation and decision making strategy should be implemented to improve the balance of overall bandwidth efficiency and specific link benefits of side-links. For instance, high or lower frequency bands have distinct physical characteristics such as different propagation loss, bandwidth availability, coherent time of channels, spatial separation granularity. These aspects could be prudently considered for different D2D cases in term of different QoS requirements, link budgeting situation, interference status, etc. If multi-bands are available, optimized and dynamic choice of the band selection impacts substantially on D2D link-wise performance and NW-wise overall performance.

In practice, multiple mode UE devices are pervasively available. Integrating such modes and bands provides more opportunity to balance individual link performance and NW performance targets which is of a special interest to D2D cases to further extend the D2D capacity gains.

The strategy of band selection can take many factors into account, such as NW loading, non-licensed band availability and quality, common capability of UE pairs, side-link quality for different bands, latency requirement of traffic, side-link role as relay or direct communications, UEs' roles in wireless relay or simple single role as a destination/source of traffic.

At different bands, the UE or eNB may have a different MAC mode, which is optimized for this specific band. Namely, one node capable of operating at different radio resource partition possesses a multi-mode MAC transiting from one to another. Resource partitioning enables a simplified D2D integration to cellular access; Potentially, it may bring indispensable robustness for dense NW deployment and high loading cases and easy feature depreciation or adding-in for NX cellular NW with D2D.

3.11.7.8 D2D Scheduling, HARQ and DRX

FIG. 172 illustrates a sidelink scheduling operation.

L2 mechanisms proposed for D2D should enable energy-efficient, low latency and high reliability communications for both in-coverage and out-of-coverage scenarios e.g., by adopting the necessary L2 mechanisms e.g., DRX and HARQ.

The fast scheduling (small time scale operation) of the sidelink is managed autonomously by the devices, within the constraints configured by an eNB or by CH as shown in FIG. 172. Examples of sidelink operations configured by an eNB or CH include D2D slow (spectrum allocation, maximum transmit power etc.) scheduling, HARQ processes and DRX management.

Due to the fact that the eNB scheduling requires additional network processing and two hop message exchange for D2D scheduling, the disjunction of scheduling is used for D2D transmissions when an in-coverage scenario is assumed. This means that each D2D UE is responsible for its own transmission, and for each transmission, the fast scheduling information, which is a subset of slow scheduling grant, is self-contained within the sidelink transmission in order to enable frequency selective scheduling. It should be also noted that uplink and sidelink resource reuse (for the same UE) would be possible if that is jointly and semi-persistently configured by the eNB.

FIG. 173 illustrates sidelink HARQ operation. Similarly to NX DL HARQ (see Section 2.2.7.2 for further details), HARQ feedback can be sent as a sidelink MAC control element. By embedding HARQ feedback in MAC, it becomes CRC protected and ACK/NACK detection error can be minimized.

FIG. 174 illustrates DRX alignment of infrastructure-to-device (I2D) and D2D communications for maximizing OFF-duration. D2D-DRX and cellular-DRX (C-DRX) may be independent DRX mechanisms. Both configurations may only be visible to the CH. Therefore, the CH can align the D2D-DRX with C-DRX, when D2D and infrastructure-to-device (I2D) transmissions happen, so as to minimize the energy consumption by switching off more components of the terminal transceiver.

3.11.8 Mobility Aspects of D2D Communication

When it comes to mobility management, section 3.5 describes the beam-based mobility solution, yet for D2D connections, there are two main issues to be further discussed:

Change from maintaining single UE specific connection to more than one UE: traditionally, when there is a change of serving network node, the resource allocation to the moving UE may be reconfigured. However, this kind of resource allocation has to take into account of the status of the counterpart UE(s) evolving in the D2D communication, in order to minimize the D2D serving interruption due to the resource reconfiguration. This may require some enhancement on the cellular-oriented mobility management procedure.

The D2D communication in RRC dormant state (which is defined in Section 2.1): In this state, the resource usage of D2D link is controlled by UE themselves (although still within the resource pool defined by network using broadcast signaling), so when the UE movement is beyond the network node range, the resource configuration change cannot be known by the counterpart D2D UE(s) via network nodes. Therefore, in order for seamless/lossless switching, the resource re-configuration has to be notified to the counterpart UEs via D2D signaling over D2D control plane, which is to be enhanced to achieve that.

3.11.8.1 D2D-Aware Handover

FIG. 175 illustrates D2D cluster communicating over the cell borders. In case of in-coverage use cases where the eNB is the CH, RRC signalling for D2D control needs to be exchanged between D2D cluster and eNB in order to enable a reliable control plane and robust mobility. In this case, it may be costly for network to manage the control plane of a D2D cluster with multiple eNBs, due to the fact that the backhaul overhead in the radio network may be an issue. Therefore, it is beneficial to keep the control plane of D2D cluster under a single eNB. This is achieved by managing the mobility of a D2D cluster based on not only the channel quality of a single device but also the measurements from other devices in the cluster. This mechanism can be implemented on the network side by simply defining an additional handover criterion. Note that the complexity may increase if the optimal node needs to be selected for the D2D control since the coordinated measurement reporting (and the additional measurement configuration and reporting thereof) are then required.

3.12 Architecture Aspects of NX Multi-Point Connectivity

This section describes architecture solutions for supporting NX multi-point connectivity. The section is organized as follows: In Section 3.12.1, a brief background and motivation for multi-point connectivity is provided. Section 3.12.2 describes the higher layer protocol architecture for multi-point connectivity for NX. Section 3.12.3 elaborates on some multi-connectivity specific aspects of mobility. Then, Section 3.12.4 describes a method that can be used to relax the backhaul latency requirements by applying UE assisted multi-point diversity.

3.12.1 Background

NX is likely to be deployed in bands higher than those of current commercial RANs. At higher frequencies, shadowing of radio paths is much more severe as compared to radio shadowing at lower frequencies. Especially for high frequencies, line-of-sight may be needed for successful transmission. In such radio conditions, multi-point connectivity can be used to reduce interruptions in traffic. Capacity and user throughput improvements can also be achieved when multiple connection points can be maintained simultaneously. The NX design supports multi-point connectivity as an integral part of the concept. As discussed above, the DL mobility concept of NX is beam-based. From a UE point of view, the mobility procedures are the same, independently on how many eNBs that are involved. A consequence of this is that the UE does not have to care about which eNB is transmitting beams or not; sometimes this is referred to as the UE being node-agnostic and the mobility being UE-centric. For mobility to work efficiently, the involved eNBs need to maintain beam neighbor lists, exchange beam information, and coordinate MRS usage. The generic mobility approach for NX is described in Section 3.5. Fast switching of beams in a multi-point connectivity scenario requires fast communication between eNBs and may also require pre-caching and duplication of data; in many cases the data need to be duplicated and distributed to, and from, multiple eNBs. This requirement challenges the capability of backhaul connection in terms of capacity and delay. One option is to put a certain data splitting agency at EPC side so as to remove the loop at anchor-eNB S1 connection. Additionally, at air-interface, it is possible to reduce transmission possibility/ratio of such duplicated data between eNBs via an UE assisted flow control. Subsection 3.12.5 discuss that UE assistance in this regard can maximize multiple-point diversity performance.

In FIG. 176, the relation between different multi-connectivity modes in NX is illustrated. The connected transmission points can belong to one or multiple eNBs, typically referred to as intra-eNB multi-point connectivity and inter-eNB multi-point connectivity, respectively.

Different transmission/reception modes can be considered depending on the channel conditions, network deployment, available backhaul capacity and delay, and type of traffic. In the NX context, multi-point diversity (MPD), traffic aggregation and distributed MIMO are issues. Traffic aggregation usually refers to multi-connectivity operations at lower layers being independent and distinct in terms of resources and/or RATs, such as carrier aggregation or IP layer aggregations. Distributed MIMO involves multiple transmission points and assumes joint coding over the branches. Typically, it requires a backhaul with high capacity and low delay to deliver the expected performance. In this section the focus is on architecture and protocol aspects of multi-point diversity (MPD), and traffic aggregation.

Coordinated multi-point (CoMP) is a term that is used to describe a set of specific LTE features used for intra LTE multi-point connectivity. Usually, CoMP features tight coordination on MAC level. MAC coordination is desirable when co-channel radio resources are used for the different transmission points. The term CoMP is intentionally avoided in the NX context to avoid confusion.

Alongside measurement acquisition, a challenge associated with multi-point connectivity lies in limitations on capacity and delay in the backhaul links carrying the inter node interfaces. In many deployments, backhaul with limited capacity and large latency is the only option due to high cost involved in deploying fast backhaul. For example, in some cases, X2 connections are made available by an ordinary internet data link.

The multi-connectivity described in this section focus on the inter eNB case. The multi-connectivity solution for intra-eNB where eNB comprises a centralized RRC/PDCP and distributed RLC/MAC is an alternative embodiment.

3.12.2 Protocol and Architecture of Multi-Point Connectivity in NX 3.12.2.1 User Plane Protocol Architecture Multi-point connectivity on the user plane can operate at different layers. The integration layer for multi-point connectivity can be either PHY layer, MAC layer (which corresponds to Carrier Aggregation in the LTE context), or PDCP layer (which corresponds to Dual Connectivity in LTE) as mentioned in Section 3.7. In this section, the investigated multi-point connectivity solutions work at PDCP layer. This solution is viable also for slow backhaul, and in alignment with the proposal in section 3.7 for NX and LTE interworking. Other multi-point connectivity solutions, e.g., inter-node MAC split multi-point connectivity are also possible approaches. Inter-node MAC split is preferred considering the centralized RRC/PDCP architecture and fast backhaul. In this section, slow backhaul and PDCP spit are assumed. The user plane protocol stack for NX multi-point connectivity is shown in FIG. 177, taking two SeNBs as an example. It is suitable for both multi-point diversity and multi-point traffic aggregation modes.

3.12.2.2 Control Plane Protocol Architecture Alternatives

Section 3.7 discusses the RRC design for LTE and NX tight integration. Here the focus is on intra NX multi-point connectivity using PDCP as the integration layer. The question in focus is whether to have one centralized RRC entity in MeNB (Master eNB), which is termed as alternative 1 below, or multiple RRC entities distributed in both MeNB and each SeNB in multi-point connectivity, which is termed as alternative 2 below. (MeNB is the anchor point for UE from CN (core network) point of view and the radio link between MeNB and UE determine UE RRC state. SeNB assists MeNB to serve UE either to increase UE throughput or increase the radio link robustness between UE and RAN.)

The alternative 1 is similar to that defined for DC in LTE with some extensions. Beside one MeNB, more than one SeNB are involved in multi-point connectivity. There is only one RRC entity located at MeNB which communicate with the RRC entity at UE. When SeNB RRM function needs to configure its local radio resources between it and UE, SeNB needs to first encapsulate its RRC message into an X2 message and transmit it via backhaul to MeNB. And then MeNB forwards RRC message from SeNB to UE. Similarly, when UE sends measurement report, even this measurement report is SeNB related, this message is received by MeNB.

MeNB then checks the measurement report, if some of the information is related to SeNB, composes a new message and forwards it to SeNB via backhaul. The RRC diversity solution can be supported in this alternative which means RRC message from MeNB can be transmitted to UE via multiple legs to increase the robustness of signaling transmissions. The protocol architecture for alternative 1 is shown in FIG. 178, which illustrates that there is one RCC entity at the MeNB.

An advantage of this alternative is that it is simple, compared to alternative 2 (discussed below) and follow the same architecture as LTE DC. The UE only needs to maintain one RRC connection with MeNB, and it is not impacted by DL and UL decoupling. A disadvantage is that the response to some radio resource configuration at SeNB, e.g., UE beam switching within SeNB, may be slow, and when MeNB crashes the procedure to recover the whole multi-point connectivity could also be relatively time consuming compared to alternative 2.

In alternative 2, multiple RRC entities are setup at MeNB and SeNBs, as shown at FIG. 179. The RRC entity at SeNB can communicate with the RRC entity at UE. There is only one RRC state between UE and the multi-point connectivity which is determined by the RRC connection between UE and MeNB. The RRC at MeNB is a full stack RRC which can execute all RRC functionalities while the RRC at SeNB is a slim RRC which can only execute limited RRC functionalities, e.g., RRC connection reconfiguration can be executed to configure the radio resources between SeNB and UE, but RRC connection setup and release are excluded. The protocol architecture of alternative 2 is shown in FIG. 179.

An advantage of this alternative is that it can react fast to local radio resource configuration events between SeNB and UE. When MeNB crashes, assuming the connection between UE and SeNB is maintained, the time to recover the multi-point connectivity could be short if SeNB already has RRC related UE context e.g., security KEY stored plus S1 related UE context, e.g., S1AP UE ID. So either UE or SeNB, which takes the role as new MeNB, can send RRC message to its peer directly to take action without requiring re-establishment of the RRC connection. And the SeNB which is going to become a MeNB can also inform CN that it is the new MeNB to restore S1 connection. A disadvantage of this alternative is that it is more complicated. Since multiple network nodes can send RRC message to UE, several issues need to be solved. First, SRB (Signaling Radio Bearer) needs to be setup between each SeNB and UE. The security key used for the SRB between SeNB and UE need be configured by MeNB during the setup procedure. Second, the SRB between SeNB and UE need be configured with a unique logical channel ID within the multi-point connectivity so that UE can know from which node a RRC message comes and then deliver a response RRC message back according to the mapping relationship between logical channel ID and network node. Third, the UE internal RRC procedure handling needs to be enhanced to support parallel RRC procedures. That is, the RRC procedure from SeNB and MeNB can be executed concurrently. There may be a risk that the RRC request from MeNB and SeNB conflict with each other, e.g., the total flows to receive configured by network may exceed UE capability. If so, UE can report back to, e.g., SeNB that the total configured flows are over its capacity. After receiving this information, SeNB can reconfigure its message to UE to meet UE capability.

Since the alternative 1 is a centralized RRC protocol architecture, it is better that beam switching scheme could work at Layer 2 so that beam switching related command and message can be exchanged between SeNB and UE directly without requiring the involvement of MeNB. For alternative 2, it suits the beam switching scheme working on either Layer 2 or Layer 3, as mentioned in Section 3.5.

3.12.3 Architecture Aspects of Mobility for Multi-Point Connectivity

The signaling procedures on L3 for multi-point connectivity in NX include SeNB addition, SeNB release, SeNB change, SeNB modification, MeNB change, MeNB and SeNB role switch. For the procedure involving just SeNB, if different frequencies are used in multi-point connectivity, then the criterion and trigger condition for the procedures could be similar to that of LTE DC—an SeNB with good radio quality can be added into multi-point connectivity, and correspondingly an SeNB with worse radio quality can be released from multi-point connectivity. If single frequency is used in multi-point connectivity, which SeNB to add or release from multi-point connectivity need to consider the interference impact into this multi-point connectivity besides just radio channel quality which needs further investigation.

For MeNB change (a new eNB outside this multi-point connectivity becomes a new MeNB, and SeNB does not change), or MeNB and one SeNB switch roles—one SeNB switches to new MeNB and MeNB switches to new SeNB, the procedure defined in LTE DC is quite cumbersome: UE needs to first remove all SeNB in the multi-point connectivity, handover from old MeNB to new MeNB, then setup SeNB in new multi-point connectivity again. Since all the members in the multi-point connectivity are not changed after role switch, a fast and efficient procedure can be defined, as shown in FIG. 180.

That is, before role switch, the security KEY to be used between the SeNB (which will be upgraded to MeNB) and UE is also configured. UE maintains multiple security contexts. When role switch occurs, signaling between involved eNBs indicates this is a role switch, so that all the existing protocol entities and context in eNBs can be reused during role switch as much as possible. No additional L3 RRC signaling is needed to inform UE this role switch (updating of timing advance etc. are done independently of the role switch). Packet forwarding may be needed from old MeNB to new MeNB after role switch.

For link level related mobility, it includes add/remove/change of the serving links for a UE in multi-point connectivity. Depends on UE capability in communicating with multiple eNB in multi-point connectivity, and the network deployment, link level mobility could mean UE transmit/receive data using multiple links or legs concurrently, UE transmit/receive data using just one link/leg concurrently and fast switch within these links/legs or a combination. For example, one link/leg is always used for data transmission/reception, others links/legs are dynamically switched from one to the other.

3.12.4 Fast UE-Assisted Multi-Point Diversity for NX Radio Access

As mentioned in 3.12.1, both S1 and X2 connections between eNBs and EPC or inter-eNBs are usually made by non-dedicated cabling through ordinary internet connections. The resulting non-ideal backhaul capacity and delay performance becomes a bottleneck to performance gains by multi-point diversity. Facing this reality, this section introduces a method that can be used to speed up the control plane coordination when the backhaul is slow and the integration layer is on PDCP. An important idea of fast UE-assisted multi-point diversity is to employ UE assistance, or even a UE decision, to assist the MAC procedure, in order to speed-up MAC coordination between the involved eNBs.

An objective of this section is to propose a solution on multi-point diversity (MPD), for which it assumes: (i) A scenario of realistic non-ideal backhaul, (ii) Both downlink (DL) and uplink (UL) MPD diversity schemes are considered, (iii) Access links involved operate at the same frequency band. Hence, it is a scheme of intra-frequency multi-point diversity. Owing to aforementioned reasons, it has a wide applicability in reality.

In contrast to intra-carrier multi-point connectivity using relaxed backhaul for coordination, this approach relies on air-interface based coordination through assistance or decision of UE. Therefore, it can, in many cases, achieve lower control plane latency than coordination schemes relying on (relaxed) backhaul.

Note that this approach is still subject to backhaul latency impact on user plane delay, since the user plane data is still delivered via relaxed backhaul.

This design primarily includes two parts: (i) UE assisted MAC and (ii) UE assisted flow control, these two parts can work standalone or jointly to enhance the multi-point diversity gain. A generic description is that 'pre-grant' from NW and UE's decision & acknowledgement of the "pre-grant" plays a role in the operation. Firstly, the concept of UE assisted MAC is based on the fact that the UE owns timely information on link quality states itself so that it is suitable to dynamically conduct the resource coordination (in contrast to traditional DC scheme which relies on BH to do the coordination). It is proposed that the UE acknowledgement or rejection on "pre-grant" from the NW, aids the network to fast change resource share among each links to adapt to diverse link quality variations for links with the same frequency band.

Secondly, the main concept of UE assisted flow control is to introduce the decision entity at UE for the UE decision based flow control. The input information is obtained by UE local measurement, and UE makes the decision/suggestion on the PDU delivery routing on the multiple connectivity and send commands to each serving AP directly.

4 Discussion of Selected Terms
4.1 Antennas

Antenna port—An antenna port is defined such that the channel over which a symbol on the antenna port is conveyed can be inferred from the channel over which another symbol on the same antenna port is conveyed.

In practice a reference signal and an "antenna" as seen by the receiver. Two antenna ports are said to be quasi co-located if the large-scale properties of the channel over which a symbol on one antenna port is conveyed can be inferred from the channel over which a symbol on the other antenna port is conveyed.

Example: Cross-polarized beam=set of two antenna ports, mapped to two orthogonal polarizations, with QCL assumed wrt delay spread, Doppler spread, Doppler shift [list not exhaustive].

Beam—A beam is a set of beam weight vectors, where each beam weight vector has a separate antenna port, and all the antenna ports have similar average spatial characteristics. All antenna ports of a beam thus cover the same geographical area. Note however, that the fast fading characteristics of different antenna ports may be different. One antenna port is then mapped to one or several antenna elements, using a possibly dynamic mapping. The number of antenna ports of a beam is the rank of the beam.

4.2 Latency

Control plane latency—Control plane (C-Plane) latency is typically measured as the transition time from different connection modes, e.g., from idle to active state.

RAN User plane latency—The RAN user plane latency (also known as Radio-specific delay) is defined as the one-way transit time between an SDU packet being available at the IP layer in the user terminal/base station and the availability of this packet (protocol data unit, PDU) at IP layer in the base station/user terminal. User plane packet delay includes delay introduced by associated protocols and control signaling assuming the user terminal is in the active state.

Mobile Network User Plane Latency—The Mobile Network or PLMN user plane latency is defined as the one-way transit time between an SDU packet being available at the IP layer in the user terminal/Network Gateway and the availability of this packet (protocol data unit, PDU) at IP layer in the Network Gateway/user terminal. PLMN packet delay includes delay introduced by all transport tunnels that are controlled by the network operator, including a virtual network operator using physical infrastructure that is owned by a third party.

Application end-to-end delay—Application end-to-end delay represents the one-way transit time including framing delay and buffering delay at the source and all intermediate application-aware processing nodes during the transit of a packet or stream of packets between a service or software application on a terminal/server node communicating with another terminal or server node. Application delay is scenario specific and may include framing of information, transcoding or translation services, and network delays. In rare occasions where the application depends on two-way interactive communication, it may have to account for round-trip time.

Application jitter—Application jitter with respect to min delay corresponds to the variation in delay from a minimum value, and is measured using statistical expectation of the difference between instantaneous delay and the minimum possible delay. Application jitter with respect to mean delay logically follows.

4.3 Reliability and Service Availability

For 5G new use cases are foreseen in the area of critical machine-type communication, which is referred to by ITU as ultra-reliable and low latency communication. Example use cases are distribution automation in the smart power grid, industrial manufacturing and control, autonomous vehicles, remote control of machines, tele-surgery. For these use cases the requirements of reliability and availability are used, which we define in this section. The typical applications are control processes, which typically operate with some sort of a feedback loop and sensory input directing an actuator and depend on "deterministic" behavior of the underlying communication system. The reliability defines to what level the deterministic behavior can be met, e.g., the desired information is successfully received at the right time.

Reliability—The reliability of the connectivity is the probability that a message is successfully transmitted to a receiver within a specified delay bound. For example, the reliability may require that, control messages are delivered to the receiver with a 99.9999% guarantee and within a delay of 1 ms. This means that only 0.0001% of packets are either lost due to transmission errors or are delayed due to congestion or load on the channel, or too low achievable, data rate. This reliability is provided with regard to a maximum message size, so the latency can be linked to a required data rate. The reliability relates to the reliability of the connectivity provided from the sender to the receiver; the connectivity can be provided by a single radio link, but also by a set of radio links (e.g., on different frequency layers, with different antenna sites, or even based on different RATs) that jointly provide the connectivity. The reliability requires that a sufficient amount of radio resources is available for a transmission at sufficiently high SINR on the connectivity links. The SINR must enable the radio link to meet the required data rate and delay bound and also provide sufficient fading margins for the desired reliability level.

Service availability—For a certain reliable-low-latency service—a pair of reliability and latency bound—a service-availability can be defined, which defines to what level the reliability-latency is provided in space and time. In bounded environments high availability can be required, e.g., via a service layer agreement. For example, in an industrial plant an availability of e.g., 99.9999% can be specified, so that at 99.9999% of transmissions in time and space fulfil the reliability-delay requirements within the premises of the plant. This can be enabled by corresponding deployment and redundancy of the network. (The SLA may be further limited to, e.g., a maximum number of devices in the area or a maximum aggregate priority traffic load.) In spatially unbounded environments, like connected vehicles autonomously driving around anywhere on a continent, an availability cannot be easily guaranteed with any deployed infrastructure. Even with ad-hoc D2D communication between vehicles, the availability of a reliable-low-latency-service can only be provided for a certain range around the transmitter and possibly with further restrictions of a maximum vehicle density (and priority traffic load).

It should be noted that many control systems that require reliable-low-latency services can have several operation modes, depending on the connectivity reliability and delay. For example, a platoon of autonomously driving trucks may drive with 4 m inter-vehicle distance if the communication can be 99.9999% guaranteed within 5 ms, and may switch to an 8 m inter-vehicle distance if only a delay of 10 ms at 99% reliability can be provided. Similarly, the control cycle of a production plant can be reduced, or a remote-controlled machinery may only operate in a conservative control mode for inadequate reliability-delay levels. It is desirable that the communication system can inform a service about changes in the achievable service level so that the application may adapt. This concept is sometimes referred to as reliable service composition, where changes in service level are indicated in an availability indication.

5 Methods, Radio Network Equipment, and Wireless Devices

In this section, some of the many detailed techniques and procedures described above are generalized and applied to specific methods, network nodes, and wireless devices. Each of these methods, radio network equipment, and wireless devices, as well as the numerous variants of them that are described in the more detailed description above, may be regarded as an embodiment of the present invention. It should be understood that the particular groupings of these features described below are examples—other groupings and combinations are possible, as evidenced by the preceding detailed discussion.

Note that in the discussion that follows and in the claims appended hereto, the use of labels "first," "second," "third," etc., is meant simply to distinguish one item from another, and should not be understood to indicate a particular order or priority, unless the context clearly indicates otherwise.

5.1 Wireless Devices and Methods

As used herein, "wireless device" refers to a device capable, configured, arranged and/or operable to communicate wirelessly with network equipment and/or another wireless device. In the present context, communicating wirelessly involves transmitting and/or receiving wireless signals using electromagnetic signals. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a wireless device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user. It should also be appreciated that in the previous detailed discussion, the term "UE" is used, for convenience, even more generally, so as to include, in the context of the NX network, any type of wireless device that accesses and/or is served by the NX network, whether or not the UE is associated with a "user" per se. Thus, the term "UE" as used in the above detailed discussion includes machine-type-communication (MTC) devices (sometimes referred to as machine-to-machine, or M2M devices), for example, as well as handsets or wireless devices that may be associated with a "user."

Some wireless devices may support device-to-device (D2D) communication, for example by implementing a 3GPP standard tor sidelink communication, and may in this case be referred to as D2D communication devices.

As yet another specific example, in an Internet of Things (IOT) scenario, a wireless device may represent a machine or other device that performs monitoring and/or measurements, and transmits the results of such monitoring and/or measurements to another wireless device and/or a network equipment. A wireless device may in this case be a machine-to-machine (M2M) device, which may in a 3GPP context be referred to as a machine-type communication (MTC) device. As one particular example, a wireless device may be a UP implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a wireless device may represent a vehicle or other equipment that is capable of monitoring and/or reporting on its operational status or other functions associated with its operation.

A wireless device as described above may represent the endpoint of a wireless connection, in which case the device may be referred to as a wireless terminal. Furthermore, a wireless device as described above may be mobile, in which case it may also be referred to as a mobile device or a mobile terminal.

Although it will be appreciated that specific embodiments of the wireless devices discussed herein may include any of various suitable combinations of hardware and/or software, a wireless device configured to operate in the wireless communications networks described herein and/or according to the various techniques described herein may, in particular embodiments, be represented by the example wireless device 1000 shown in FIG. 181.

As shown in FIG. 181, example wireless device 1000 includes an antenna 1005, radio front-end circuitry 1010, and processing circuitry 1020, which in the illustrated example includes a computer-readable storage medium 1025, e.g., one or more memory devices. Antenna 1005 may include one or more antennas or antenna arrays, and is configured to send and/or receive wireless signals, and is connected to radio front-end circuitry 1010. In certain alternative embodiments, wireless device 1000 may not include antenna 1005, and antenna 1005 may instead be separate from wireless device 1000 and be connectable to wireless device 1000 through an interface or port.

Radio front-end circuitry 1010, which may comprise various filters and amplifiers, for example, is connected to antenna 1005 and processing circuitry 1020 and is configured to condition signals communicated between antenna 1005 and processing circuitry 1020. In certain alternative embodiments, wireless device 1000 may not include radio front-end circuitry 1010, and processing circuitry 1020 may instead be connected to antenna 1005 without radio front-end circuitry 1010. In some embodiments, radio-frequency circuitry 1010 is configured to handle signals in multiple frequency bands, in some cases simultaneously.

Processing circuitry 1020 may include one or more of radio-frequency (RF) transceiver circuitry 1021, baseband processing circuitry 1022, and application processing circuitry 1023. In some embodiments, the RP transceiver circuitry 1021, baseband processing circuitry 1022, and application processing circuitry 1023 may be on separate chipsets. In alternative embodiments, part or all of the baseband processing circuitry 1022 and application processing circuitry 1023 may be combined into one chipset, and the RF transceiver circuitry 1021 may be on a separate chipset. In still alternative embodiments, part or all of the RF transceiver circuitry 1021 and baseband processing circuitry 1022 may be on the same chipset, and the application processing circuitry 1023 may be on a separate chipset. In yet other alternative embodiments, part or all of the RF transceiver circuitry 1021, baseband processing circuitry 1022, and application processing circuitry 1023 may be combined in the same chipset. Processing circuitry 1020 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as relevant to a user equipment, MTC device, or other wireless device may be embodied in a wireless device or, as an alternative, may be embodied by the processing circuitry 1020 executing instructions stored on a computer-readable storage medium 1025, as shown in FIG. 181. In alternative embodiments, some or all of the functionality may be provided by the processing circuitry 1020 without executing instructions stored on a computer-readable medium, such as in a hard-wired manner. In any of those particular embodiments, whether executing instructions stored on a computer-readable storage medium or not, the processing circuitry 1020 can be said to be configured to perform the described functionality. The benefits provided by such functionality are not limited to the processing circuitry 1020 alone or to other components of the wireless device, but are enjoyed by the wireless device as a whole, and/or by end users and the wireless network generally.

The processing circuitry 1020 may be configured to perform any determining operations described herein. Determining as performed by processing circuitry 1020 may include processing information obtained by the processing circuitry 1020 by, for example, converting the obtained information into other information, comparing the obtained information or converted information to information stored in the wireless device, and/or performing one or more operations based on the obtained information or converted information, and as a result of said processing making a determination.

Antenna 1005, radio front-end circuitry 1010, and/or processing circuitry 1020 may be configured to perform any transmitting operations described herein. Any information, data and/or signals may be transmitted to a network equipment and/or another wireless device. Likewise, antenna 1005, radio front-end circuitry 1010, and/or processing circuitry 1020 may be configured to perform any receiving operations described herein as being performed by a wireless device. Any information, data and/or signals may be received from a network equipment and/or another wireless device.

Computer-readable storage medium 1025 is generally operable to store instructions, such as a computer program, software, an application including one or more of logic, rules, code, tables, etc. and/or other instructions capable of being executed by a processor. Examples of computer-readable storage medium 1025 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 1020. In some embodiments, processing circuitry 1020 and computer-readable storage medium 1025 may be considered to be integrated.

Alternative embodiments of the wireless device 1000 may include additional components beyond those shown in FIG. 181 that may be responsible for providing certain aspects of the wireless device's functionality, including any of the functionality described herein and/or any functionality necessary to support the solution described above. As just one example, wireless device 1000 may include input interfaces, devices and circuits, and output interfaces, devices and circuits. Input interfaces, devices, and circuits are configured to allow input of information into wireless device 1000, and are connected to processing circuitry 1020 to allow processing circuitry 1020 to process the input information. For example, input interlaces, devices, and circuits may include a microphone, a proximity or other sensor, keys/buttons, a touch display, one or more cameras, a USB port, or other input elements. Output interfaces, devices, and circuits are configured to allow output of information from wireless device 1000, and are connected to processing circuitry 1020 to allow processing circuitry 1020 to output information from wireless device 1000. For example, output interfaces, devices, or circuits may include a speaker, a display, vibrating circuitry, a USB port, a headphone interface, or other output elements. Using one or more input and output interfaces, devices, and circuits, wireless device 1000 may communicate with end users and/or the wireless network, and allow them to benefit from the functionality described herein.

As another example, wireless device 1000 may include power supply circuitry 1030. The power supply circuitry 1030 may comprise power management circuitry. The power supply circuitry may receive power from a power source, which may either be comprised in, or be external to, power supply circuitry 1030. For example, wireless device 1000 may comprise a power source in the form of a battery or battery pack which is connected to, or integrated in, power supply circuitry 1030. Other types of power sources, such as photovoltaic devices, may also be used. As a further example, wireless device 1000 may be connectable to an external power source (such as an electricity outlet) via an input circuitry or interface such as an electrical cable, whereby the external power source supplies power to power supply circuitry 1030.

Power supply circuitry 1030 may be connected to radio front-end circuitry 1010, processing circuitry 1020, and/or computer-readable storage medium 1025 and be configured to supply wireless device 1000, including processing circuitry 1020, with power for performing the functionality described herein.

Wireless device 1000 may also include multiple sets of processing circuitry 1020, computer-readable storage medium 1025, radio front-end circuitry 1010, and/or antenna 1005 for different wireless technologies integrated into wireless device 1000, such as, for example, GSM, WCDMA, LTE, NR, WiFi, or Bluetooth wireless technologies. These wireless technologies may be integrated into the same or different chipsets and other components within wireless device 1000.

Wireless device 1000, in various embodiments, is adapted to carry out any of a variety of combinations of the features and techniques described herein. In some embodiments, for example, processing circuitry 1020, e.g., using antenna 1005 and radio front-end circuitry 1010, is configured to receive a downlink signal comprising an uplink access configuration index, use the uplink access configuration index to identify an uplink access configuration from among a predetermined plurality of uplink access configurations, and transmit to the wireless communications network according to the identified uplink access configuration. As discussed in Section 3.22 above, this uplink access configuration index is a pointer into a table of uplink access configurations. This pointer may be retrieved, for example, from an SSI, as described above, while the uplink access configurations are received as an AIT. As discussed in detail above, an advantage arising from the use of an uplink access configuration index is that broadcasted information can be reduced. The plurality of uplink access configurations from which a particular uplink access configuration is retrieved, using, the uplink access configuration index, can be distributed separately from the broadcasting of the index itself.

Processing circuitry 1020 is also configured to receive, in a first subframe, a first OFDM transmission formatted according to a first numerology and receiving, in a second subframe, a second OFDM transmission formatted according to a second numerology, the second numerology differing from the first numerology. Note that a "numerology," as that term is used herein, refers to a particular combination of OFDM subcarrier bandwidth, cyclic prefix length, and subframe length. The term subcarrier bandwidth, which refers to the bandwidth occupied by a single subcarrier, is directly related to, and is sometimes used interchangeably, with subcarrier spacing. As discussed in detail above, e.g., in Section 2.3, the availability and use of different numerologies allows for better matching of the physical layer to specific applications and use case requirements.

In some embodiments, the components of wireless device 1000, and in particular processing circuitry 1020, are also configured to perform a method 18200 as illustrated in FIG. 182. The method 18200 includes receiving a downlink signal comprising an uplink access configuration index, using the uplink access configuration index to identify an uplink access configuration from among a predetermined plurality of uplink access configurations, and transmitting to the wireless communications network according to the identified uplink access configuration (block 18210). The method 18200 also includes receiving, in a first subframe, a first OFDM transmission formatted according to a first numerology and receiving, in a second subframe, a second OFDM transmission formatted according to a second numerology, the second numerology differing from the first numerology (block 18220). The first OFDM transmission may have a numerology according to the specifications for LTE.

As an example, the first and second numerologies may comprise subframes of first and second subframe lengths, respectively, where the first subframe length differs from the second subframe length. The first numerology may also have a first subcarrier spacing (or first subcarrier bandwidth) and the second numerology may have a second subcarrier spacing (or second subcarrier bandwidth), where the first subcarrier spacing differs from the second subcarrier spacing.

In some embodiments, the method 18200 discussed above or another method may further include receiving and processing first Layer 2 data on a first physical data channel and receiving and processing second Layer 2 data on a second physical data channel, as shown at blocks 18230 and 18232 of FIG. 183. Examples of these were provided above, where these first and second physical data channels were referred to as retransmitable and direct channels, or rPDCH and dPDCH, respectively. The receiving and processing of the first Layer 2 data comprises the use of soft HARQ combining, and the receiving and processing of the second Layer 2 data comprises no soft HARQ combining. This may include using a common set of demodulation reference signals for receiving both the first and second Layer 2 data. An advantage of this use of two types of physical data channels is that the error correction and overhead associated with each of the channels can be better matched to the specific types of data carried by the respective channels.

In some cases, a single Radio Resource Control (RRC) approach may be used for handling both the first and second OFDM transmissions, e.g., in combination with some or all of the features discussed above. This single-RHC approach was discussed above, for example, in Section 2.1.4. Note that in the detailed discussion above, the term "RRC" is frequently used as a shorthand for the more precise term Radio Resource Control protocol layer, or RRC protocol layer, which is the collection of procedures that provides Radio Resource Control, e.g., as specified by industry standards and as typically implemented with corresponding software modules in wireless devices and radio network equipment. For example, the method 18200 or another method, as shown in FIG. 184, may further include processing data from the first OFDM transmission using a first MAC protocol layer (block 18240) and processing data from the second OFDM transmission using a second MAC protocol layer, where the first MAC protocol layer differs from the second MAC protocol layer (block 18242). This method may further include processing messages received from each of the first and second MAC protocol layers using a single, common RRC protocol layer (block 18244). An advantage of this approach is that the RRC handling for the two physical channels, which may be an LTE-based and an NX-based channel, for example, is that the RRC handing is more tightly integrated and efficient.

In some cases, a dual-RRC approach may be used instead, again as discussed in Section 2.1.4, for example. In this case, the method 18200 or another method, as shown in FIG. 185, further includes processing data from the first OFDM transmission using a first MAC protocol layer (block 18250) and processing data from the second OFDM transmission using a second MAC protocol layer, where the first MAC protocol layer differs from the second MAC protocol layer (block 18252). The method 18200 may further include processing messages received via the first MAC protocol layer using a first RRC protocol layer and processing messages received via the second MAC protocol layer using a second RRC protocol layer, where the first RRC protocol layer differs from the second RRC protocol layer (block 18256). At least a first one of the first and second RRC protocol layers is configured to pass selected RRC messages to the other one of the first and second RRC protocol layers. The selected RRC messages are RRC messages received and processed by the first one of the first and second RRC protocol layers but targeted for the other one of the first and second RRC protocol layers. As was discussed in Section 2.1.4.2, this approach provides for independent specification of the RRC protocol layers in the context of operating with two different RATs (such as NX and LTE), and allows each RRC protocol layer to be modified independently of the other.

The method 18200 or another method, as shown in FIG. 186, may further include transmitting third Layer 2 data on a third physical data channel (block 18260) and transmitting fourth Layer 2 data on a fourth physical data channel (block 18262). The transmitting of the third Layer 2 data comprises the use of a HARQ process supporting soft combining, and the transmitting of the fourth Layer 2 data comprises no HARQ process. These third and fourth physical data channels correspond to the retransmitable and direct channels discussed in detail above.

In some cases, the method 18200 or another method, as shown in FIG. 187, includes operating in a connected mode for one or more first intervals and operating in a dormant mode for one or more second intervals, where the first and second OFDM transmissions are performed in the connected mode (block 18270). Details of such a dormant state in the NX context were provided above, e.g., in Section 1.2. Operating in the dormant mode comprises monitoring signals carrying tracking area identifiers (block 18272), comparing tracking area identifiers received during the monitoring with a tracking area identifier list (block 18274), and notifying the wireless communication network in response to determining that a received tracking area identifier is not on the list but otherwise refraining from notifying the wireless communication network in response to receiving changing tracking area identifiers (block 18276). Example details of this tracking-related behavior are described above, in Section 3.2.4.1. In the detailed discussion above, examples of these tracking area identifiers were referred to as Tracking RAN Area Codes (TRAC), which correspond to a particular Tracking RAN Area and which may be received in a Tracking RAN Area Signal Index. Note that this dormant state allows the wireless device to move around within a tracking area without reporting to the network, thus providing for more efficient operation and less signaling.

The method 18200 may include transmitting, to the wireless communications network, a capability pointer, the capability pointer identifying a set of capabilities, for the wireless device, stored in the wireless communications network. Details of this approach are provided above, in Section 2.1.5.3. As noted there, this approach allows for a continuing evolution of new wireless device capabilities, without requiring constant updates of the signaling to indicate those capabilities.

As discussed in extensive detail above, wireless devices according to many of the embodiments described herein may use scheduled transmissions, contention-based transmissions, or a combination of both. Thus, the method 18200 may include transmitting to the wireless communications network using a contention-based access protocol. The contention-based access protocol may comprise a listen-before-talk (LBT) access mechanism.

The method 18200 or another method, as shown in FIG. 188, may include measuring a first mobility reference signal on a first received beam (block 18280) and measuring a second mobility reference signal on a second received beam, where the second mobility reference signal differs from the first mobility reference signal (block 18282). These mobility reference signals are referred to as MRS in the detailed system described above, e.g., in the discussions of beam-based transmission and feedback in Section 3.4, and in the discussion of mobility in Section 3.5. The method 18200 may further include reporting results of measuring the first and second mobility reference signals to the wireless communications network (block 18284). The method 18200 may also include receiving, in response to reporting the results, a command to switch from receiving data on a current downlink beam to receiving data on a different downlink beam (block 18286). The method 18200 may include receiving a timing advance value for application to the different downlink beam (block 18288). This approach provides for a beam-based active mobility, detailed in sections 3.5.2 to 3.5.4, as distinct from the cell-based mobility used in conventional wireless systems.

5.2 Radio Network Equipment and Methods

As used herein, the term "network equipment" refers to equipment capable, configured, arranged and/or operable to communicate directly or indirectly with a wireless device and/or with other equipment in the wireless communication network that enable and/or provide wireless access to the wireless device. Examples of network equipment include, but are not limited to, access points (APs), in particular radio access points. Network equipment may represent base stations (BSs), such as radio base stations. Particular examples of radio base stations include Node Bs, and evolved Node Bs (eNBs). Base stations may be categorized based on the amount of coverage they provide (or, stated differently, theft transmit power levels) and may then also be referred to as femto base stations, pico base stations, micro base stations, or macro base stations. "Network equipment" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Yet further examples of network equipment include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network equipment may represent any suitable device (or group of devices) capable, configured, arranged, and/or operable to enable and/or provide a wireless device access to the wireless communication network or to provide some service to a wireless device that has accessed the wireless communication network.

As used herein, the term "radio network equipment" is used to refer to network equipment that includes radio capabilities. Thus, examples of radio network equipment are the radio base stations and radio access points discussed above. It will be appreciated that some radio network equipment may comprise equipment that is distributed—such as the distributed radio base stations (with RRHs and/or RRUs) discussed above. It will be appreciated that the various references herein to eNBs, eNodeBs, Node Bs, and the like are referring to examples of radio network equipment. It should also be understood that the term "radio network equipment" as used herein may refer to a single base station or a single radio node, in some cases, or to multiple base stations or nodes, e.g., at different locations. In some cases, this document may refer to an "instance" of radio network equipment, to more clearly describe certain scenarios where multiple distinct embodiments or installations of radio equipment are involved. However, the lack of reference to an "instance" in connection with a discussion of radio network equipment should not be understood to mean that only a single instance is being referred to. A given instance of radio network equipment may alternatively be referred to as a "radio network node," where the use of the word "node" denotes that the equipment referred to operate as a logical node in a network, but does not imply that all components are necessarily co-located.

While radio network equipment may include any suitable combination of hardware and/or software, an example of an instance of radio network equipment 1100 is illustrated in greater detail by FIG. 189. As shown in FIG. 189, example radio network equipment 1100 includes an antenna 1105, radio front-end circuitry 1110, and processing circuitry 1120, which in the illustrated example includes a computer-readable storage medium 1025, e.g., one or more memory devices. Antenna 1105 may include one or more antennas or antenna arrays, and is configured to send and/or receive wireless signals, and is connected to radio front-end circuitry 1110. In certain alternative embodiments, radio network equipment 1100 may not include antenna 1005, and antenna 1005 may instead be separate from radio network equipment 1100 and be connectable to radio network equipment 1100 through an interface or port. In some embodiments, ail or parts of radio front-end circuitry 1110 may be located at one or several locations apart from the processing circuitry 1120, e.g., in a RRH or RRU. Likewise, portions of processing circuitry 1120 may be physically separated from one another. Radio network equipment 1100 may also include communication interface circuitry 1140 for communicating with other network nodes, e.g., with other radio network equipment and with nodes in a core network.

Radio front-end circuitry 1110, which may comprise various filters and amplifiers, for example, is connected to antenna 1105 and processing circuitry 1120 and is configured to condition signals communicated between antenna 1105 and processing circuitry 1120. In certain alternative embodiments, radio network equipment 1100 may not include radio front-end circuitry 1110, and processing circuitry 1120 may instead be connected to antenna 1105 without radio front-end circuitry 1110. In some embodiments, radio-frequency circuitry 1110 is configured to handle signals in multiple frequency bands, in some cases simultaneously.

Processing circuitry 1120 may include one or more of RF transceiver circuitry 1121, baseband processing circuitry 1122, and application processing circuitry 1123. In some embodiments, the RF transceiver circuitry 1121, baseband processing circuitry 1122, and application processing circuitry 1123 may be on separate chipsets. In alternative embodiments, part or all of the baseband processing circuitry 1122 and application processing circuitry 1123 may be combined into one chipset, and the RF transceiver circuitry 1121 may be on a separate chipset. In still alternative embodiments, part or all of the RF transceiver circuitry 1121 and baseband processing circuitry 1122 may be on the same chipset, and the application processing circuitry 1123 may be on a separate chipset. In yet other alternative embodiments, part or all of the RF transceiver circuitry 1121, baseband processing circuitry 1122, and application processing circuitry 1123 may be combined in the same chipset. Processing circuitry 1120 may include, for example, one or more central CPUs, one or more microprocessors, one or more ASICs, and/or one or more field FPGAs.

In particular embodiments, some or all of the functionality described herein as being relevant to radio network equipment, radio base stations, eNBs, etc., may be embodied in radio network equipment or, as an alternative may be embodied by the processing circuitry 1120 executing instructions stored on a computer-readable storage medium 1125, as shown in FIG. 183. In alternative embodiments, some or all of the functionality may be provided by the processing circuitry 1120 without executing instructions stored on a computer-readable medium, such as in a hard-wired manner, in any of those particular embodiments, whether executing instructions stored on a computer-readable storage medium or not, the processing circuitry can be said to be configured to perform the described functionality. The benefits provided by such functionality are not limited to the processing circuitry 1120 alone or to other components of the radio network equipment, but are enjoyed by the radio network equipment 1100 as a whole, and/or by end users and the wireless network generally.

The processing circuitry 1120 may be configured to perform any determining operations described herein. Determining as performed by processing circuitry 1120 may include processing information obtained by the processing circuitry 1120 by, for example, converting the obtained information into other information, comparing the obtained information or converted information to information stored in the radio network equipment, and/or performing one or more operations based on the obtained information or converted information, and as a result of said processing making a determination.

Antenna 1105, radio front-end circuitry 1110, and/or processing circuitry 1120 may be configured to perform any transmitting operations described herein. Any information, data and/or signals may be transmitted to any network equipment and/or a wireless device. Likewise, antenna 1105, radio front-end circuitry 1110, and/or processing circuitry 1120 may be configured to perform any receiving operations described herein as being performed by a radio network equipment. Any information, data and/or signals may be received from any network equipment and/or a wireless device.

Computer-readable storage medium 1125 is generally operable to store instructions, such as a computer program, software, an application including one or more of logic, rules, code, tables, etc. and/or other instructions capable of being executed by a processor. Examples of computer-readable storage medium 1125 include computer memory (for example, RAM or ROM), mass storage media (for example, a hard disk), removable storage media (for example, a CD or a DVD), and/or any other volatile or non-volatile, non-transitory computer-readable and/or computer-executable memory devices that store information, data, and/or instructions that may be used by processing circuitry 1120, in some embodiments, processing circuitry 1120 and computer-readable storage medium 1125 may be considered to be integrated.

Alternative embodiments of the radio network equipment 1100 may include additional components beyond those shown in FIG. 189 that may be responsible for providing certain aspects of the radio network equipment's functionality, including any of the functionality described herein and/or any functionality necessary to support the solution described above. As just one example, radio network equipment 1100 may include input interfaces, devices and circuits, and output interfaces, devices and circuits. Input interfaces, devices, and circuits are configured to allow input of information into radio network equipment 1100, and are connected to processing circuitry 1120 to allow processing circuitry 1120 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from radio network equipment 1100, and are connected to processing circuitry 1120 to allow processing circuitry 1120 to output information from radio network equipment 1100. For example, output interfaces, devices, or circuits may include a speaker, a display, a USB port, a headphone interface, or other output elements. Using one or more input and output interfaces, devices, and circuits, radio network equipment 1100 may communicate with end users and/or the wireless network, and allow them to benefit from the functionality described herein.

As another example, radio network equipment 1100 may include power supply circuitry 1130. The power supply circuitry 1130 may comprise power management circuitry. The power supply circuitry 1130 may receive power from a power source, which may either be comprised in, or be external to, power supply circuitry 1130. For example, radio network equipment 1100 may comprise a power source in the form of a battery or battery pack which is connected to, or integrated in, power supply circuitry 1130. Other types of power sources, such as photovoltaic devices, may also be used. As a further example, radio network equipment 1100 may be connectable to an external power source (such as an electricity outlet) via an input circuitry or interface such as an electrical cable, whereby the external power source supplies power to power supply circuitry 1130.

Power supply circuitry 1130 may be connected to radio front-end circuitry 1110, processing circuitry 1120, and/or computer-readable storage medium 1125 and be configured to supply radio network equipment 1100, including processing circuitry 1120, with power for performing the functionality described herein.

Radio network equipment 1100 may also include multiple sets of processing circuitry 1120, computer-readable storage medium 1125, radio circuitry 1110, antenna 1105 and/or communication interface circuitry 1140 for different wireless technologies integrated into radio network equipment 1100, such as, for example, GSM, WCDMA, LTE, NR, WiFi, or Bluetooth wireless technologies. These wireless technologies may be integrated into the same or different chipsets and other components within radio network equipment 1100.

One or more instances of the radio network equipment 1100 may be adapted to carry out some or all of the techniques described herein, in any of various combinations. It will be appreciated that in a given network implementation, multiple instances of radio network equipment 1100 will be in use. In some cases, several instances of radio network equipment 1100 at a time may be communicating with or transmitting signals to a given wireless device or group of wireless devices. Thus, it should be understood that while many of the techniques described herein may be carried out by a single instance of radio network equipment 1100, these techniques may be understood as carried out by a system of one or more instances of radio network equipment 1100. In some cases in a coordinated fashion. The radio network equipment 1100 shown in FIG. 189 is thus the simplest example of this system.

In some embodiments, for example, a system of one or more instances of radio network equipment 1100, and in particular the processing circuitry 1120 in such radio network equipment 1100, e.g., using an antenna 1105 and radio front-end circuitry 1110, is configured to transmit a first downlink signal comprising an uplink access configuration index, the uplink access configuration index identifying an uplink access configuration from among a plurality of predetermined uplink access configurations, and subsequently receive a transmission from a first wireless device according to the identified uplink access configuration. Note that this transmitting of the uplink access configuration index may be a broadcast transmission, in that it is not necessarily targeted to any particular wireless device or group of wireless devices. It will be appreciated that these techniques complement the wireless device-based techniques described in Section 5.1, and provide the same advantages. The processing circuitry 1120 is also configured to transmit, in a first subframe, a first OFDM transmission formatted according to a first numerology and transmit, in a second subframe, a second OFDM transmission formatted according to a second numerology, the second numerology differing from the first numerology. Here, each of these first and second OFDM transmissions is typically (but not necessarily) targeted to a particular wireless device or group of wireless devices; the two transmissions here may be targeted to the same wireless device or to two different wireless devices. Again, these techniques complement those described in Section 5.1.

In some embodiments, a system comprising one or more instances of radio network equipment 1100 is configured to perform a method 19000, as illustrated in FIG. 190. The method 19000 includes transmitting a first downlink signal comprising an uplink access configuration index, the uplink access configuration index identifying an uplink access configuration from among a plurality of predetermined uplink access configurations, and subsequently receiving a transmission from a first wireless device according to the identified uplink access configuration (block 19010). The method 19000 also includes transmitting, in a first subframe, a first OFDM transmission formatted according to a first numerology and transmitting, in a second subframe, a second OFDM transmission formatted according to a second numerology, the second numerology differing from the first numerology (block 19020).

In some cases, transmitting the first downlink signal is performed by a first instance of radio network equipment, while the transmitting of the first and second OFDM transmissions is performed by a second instance of radio network equipment. The first OFDM transmission may have a numerology according to the specifications for LTE.

The first and second numerologies may comprise subframes of first and second subframe lengths, respectively, where the first subframe length differs from the second subframe length. The first numerology may have a first subcarrier spacing and the second numerology may have a second subcarrier spacing, where the first subcarrier spacing differs from the second subcarrier spacing.

The method 19000, as further shown in FIG. 190, may include transmitting a second downlink signal comprising an access information signal, the access information signal indicating a plurality of uplink access configurations, where the uplink access configuration index identities one of the plurality of uplink access configurations (block 19030). The transmitting of the second downlink signal may be performed by a third instance of radio network equipment.

In some cases, the method 19000 or another method, as shown in FIG. 191, includes processing and transmitting first Layer 2 data on a first physical data channel (block 19040) and processing and transmitting second Layer 2 data on a second physical data channel (block 19042). The processing and transmitting of the first Layer 2 data comprises the use of a HARQ process supporting soft combining, and the processing and transmitting of the second Layer 2 data comprises no HARQ process. The transmitting of the first and second Layer 2 data may be performed using a common antenna port, where the method 19000 further includes transmitting a common set of demodulation references, using the common antenna port, for use in receiving both the first and second Layer 2. Again, these techniques, and the corresponding techniques for receiving physical data channels discussed immediately below, complement the techniques discussed in Section 5.1, and provide the same advantages.

The method 19000, as shown in FIG. 192, may include receiving and processing third Layer 2 data on a third physical data channel (block 19050) and receiving and processing fourth Layer 2 data on a fourth physical data channel (block 19052), where the receiving and processing of the third Layer 2 data comprises the use of soft HARQ combining and the receiving and processing of the fourth Layer 2 data comprises no soft HARQ combining.

In some cases, the transmitting of the first and second OFDM transmissions may be performed by a single instance of radio network equipment, in which case the method 19000 or another method, as shown in FIG. 193, may further include processing data for the first OFDM transmission using a first MAC protocol layer (block 19060) and processing data for the second OFDM transmission using a second MAC protocol layer, where the first MAC protocol layer differs from the second MAC protocol layer (block 19062). The method 19000 may further include processing messages to be transported by each of the first and second MAC protocol layers, using a single, common RRC protocol layer (block 19064).

In other cases, the transmitting of the first and second OFDM transmissions is performed by a single instance of radio network equipment, in which case the method 19000 or another method, as shown in FIG. 194, may further include processing data for the first OFDM transmission using a first MAC protocol layer (block 19070) and processing data for the second OFDM transmission using a second MAC protocol layer, where the first MAC protocol layer differs from the second MAC protocol layer (block 19072). The method 19000 further includes processing messages to be transported by the first MAC protocol layer, using a first RRC protocol layer (block 19074), and processing messages to be transported by the second MAC protocol layer, using a second RRC protocol layer, where the first RRC protocol layer differs from the second RRC protocol layer (block 19076). At least a first one of the first and second RRC protocol layers is configured to pass selected RRC messages to the other one of the first and second RRC protocol layers, the selected RRC messages being RRC messages received and processed by the first one of the first and second RRC protocol layers but targeted for the other one of the first and second RRC protocol layers.

The method 19000 or another method, as shown in FIG. 195, may include receiving, from a second wireless device, a capability pointer, the capability pointer identifying a set of capabilities for the second wireless device (block 19080), and retrieving the set of capabilities for the second wireless device, from a database of stored capabilities for a plurality of wireless devices, using the received capability pointer (block 19082).

The method 19000 may include transmitting to a third wireless device, using a contention-based protocol. The contention-based access protocol may comprise an LBT access mechanism.

In some embodiments, the method 19000 or another method, as shown in FIG. 196, includes receiving a random access request message from a fourth wireless device, via an uplink beam formed using multiple antennas at one of the one or more instances of radio network equipment (block 19090), estimating an angle-of-arrival corresponding to the random access request message (block 19092) and transmitting a random access response message, using a downlink beam formed using multiple antennas at the one of the one or more instances of the radio network equipment (block 19094). Forming the downlink beam is based on the estimated angle-of-arrival. The uplink beam may be a swept uplink beam. A width of the downlink beam may be based on an estimated quality of the estimated angle-of-arrival. Note that exemplary details of a random access procedure in NX are described in Section 3.2.5.2, while multi-antenna aspects of the random access procedure are provided in Section 3.4.5.2.

The method 19000 or another method, as shown in FIG. 197, may include serving a fifth wireless device, where serving the fifth wireless device comprises sending data from the fifth wireless device to a first network node or first set of network nodes, according to a first network slice identifier associated with the fifth wireless device (block 19096). The method 19000 may also include serving a sixth wireless device, where serving the sixth wireless device comprises sending data from the sixth wireless device to a second network node or second set of network nodes, according to a second network slice identifier associated with the sixth wireless device (block 19098). The second network slice identifier differs from the first network slice identifier, and the second network node or second set of network nodes differs from the first network node or first set of network nodes.

5.3 Functional Representations and Computer Program Products

FIG. 198 illustrates an example functional module or circuit architecture as may be implemented in a wireless device 1000, e.g., based on the processing circuitry 1020. The illustrated embodiment at least functionally includes an access configuration module 19802 for receiving a downlink signal comprising an uplink access configuration index, using the uplink access configuration index to identify an uplink access configuration from among a predetermined plurality of uplink access configurations, and transmitting to the wireless communications network according to the identified uplink access configuration. The implementation also includes a receiving module 19804 for receiving, in a first subframe, a first OFDM transmission formatted according to a first numerology and receiving, in a second subframe, a second OFDM transmission formatted according to a second numerology, the second numerology differing from the first numerology.

In some embodiments, the implementation includes a receiving and processing module 19806 for comprising receiving and processing first Layer 2 data on a first physical data channel and receiving and processing second Layer 2 data on a second physical data channel, wherein the receiving and processing of the first Layer 2 data comprises the use of soft HARQ combining and wherein the receiving and processing of the second Layer 2 data comprises no soft HARQ combining.

In some embodiments, the implementation includes a transmitting module 19808 for transmitting, to the wireless communications network, a capability pointer, the capability pointer identifying a set of capabilities, for the wireless device, stored in the wireless communications network.

In some embodiments, the implementation includes a measuring module 19810 for measuring a first mobility reference signal on a first received beam and for measuring a second mobility reference signal on a second received beam, the second mobility reference signal differing from the first mobility reference signal. This implementation also includes a reporting module 19812 for reporting results of measuring the first and second mobility reference signals to the wireless communications network.

FIG. 199 illustrates an example functional module or circuit architecture as may be implemented in the radio network equipment 1100, e.g., based on the processing circuitry 1120. The illustrated embodiment at least functionally includes an access configuration module 19902 for transmitting a first downlink signal comprising an uplink access configuration index, the uplink access configuration index identifying an uplink access configuration from among a plurality of predetermined uplink access configurations, and subsequently receiving a transmission from a first wireless device according to the identified uplink access configuration. The implementation also includes a transmitting module 19904 for transmitting, in a first subframe, a first OFDM transmission formatted according to a first numerology and transmitting, in a second subframe, a second OFDM transmission formatted according to a second numerology, the second numerology differing from the first numerology.

In some embodiments, the implementation includes a transmitting module 19906 for transmitting a second downlink signal comprising an access information signal, the access information signal indicating a plurality of uplink access configurations, wherein the uplink access configuration index identifies one of the plurality of uplink access configurations.

In some embodiments, the implementation includes a processing and transmitting module 19908 for processing and transmitting first Layer 2 data on a first physical data channel and processing and transmitting second Layer 2 data on a second physical data channel, wherein the processing and transmitting of the first Layer 2 data comprises the use of a HARQ process supporting soft combining and wherein the processing and transmitting of the second Layer 2 data comprises no HARQ process.

In some embodiments, the implementation includes a receiving module 19910 for receiving, from a second wireless device, a capability pointer, the capability pointer identifying a set of capabilities for the second wireless device. This implementation also includes a retrieving module 19912 for retrieving the set of capabilities for the second wireless device, from a database of stored capabilities for a plurality of wireless devices, using the received capability pointer.

In some embodiments, the implementation includes a receiving module 19914 for receiving a random access request message from a fourth wireless device, via an uplink beam formed using multiple antennas at the radio network equipment. This implementation also includes an estimating module 19916 for estimating an angle-of-arrival corresponding to the random access request message and a transmitting module 19918 for transmitting a random access response message, using a downlink beam formed using multiple antennas at the radio network equipment, wherein forming the downlink beam is based on the estimated angle-of-arrival.

| APPENDIX: ABBREVIATIONS | |
|---|---|
| Abbreviation | Explanation |
| 2G | 2nd Generation |
| 3G | 3rd Generation |
| 3GPP | 3rd Generation Partnership Project |
| 4G | 4th Generation |
| 5G | 5th Generation |
| 5GPPP | 5G Infrastructure Public-Private Partnership |
| 5GTB | 5th Generation Testbed |
| ABR | Automatic Base station Relation |
| ACK | Acknowledgement |
| ADSS | Aligned Directional Sounding and Sensing |
| AGC | Automatic Gain Control |
| AGV | Automated Guided Vehicle |
| AIT | Access Information Table |
| AMM | Active Mode Mobility |
| AN | Access Node |
| ANR | Automatic Neighbor Relations |
| AP | Access Point |
| ARQ | Automatic Repeat reQuest |
| AS | Access Stratum |
| ASA | Authorized Shared Access |
| AVR | Automatic Virtual beam Relations |
| BB | Baseband |
| BBF | Baseband Function |
| BBU | Baseband Unit |
| BER | Bit Error Rate |
| BF | Beamforming |
| BH | Backhaul |
| BIO | Beam Individual Offset |
| BLEP | Block Error Probability |
| BLER | Block Error Rate |
| BRS | Beam Reference Signal |
| BS | Base Station |
| BS2BS | Base Station to Base Station |
| BSID | Base Station Identifier |

APPENDIX: ABBREVIATIONS

| Abbreviation | Explanation |
|---|---|
| BW | Band Width |
| CA | Carrier Aggregation |
| CAPEX | Capital Expenditures |
| CB | Contention-based |
| CCE | Control Channel Element |
| CCP | Cluster Coordinating Point |
| CDMA2000 | Cellular system specified by 3GPP2 |
| CEPT | Conférence européenne des administrations des postes et télécommunications |
| CF | Compute-and-Forward |
| CH | Cluster Head |
| CIO | Cell Individual Offset |
| CMAS | Commercial Mobile Alert System |
| C-MTC | Critical Machine Type Communication |
| CN | Core Network |
| COMP | Coordinated Multi-Point |
| CP | Cyclic Prefix |
| CPRI | Common Public Radio Interface |
| CQI | Channel Quality Information |
| CRC | Cyclic Redundancy Check |
| CRS | Cell-specific Reference Signal |
| CSI | Channel State Information |
| CTS | Clear to Send |
| D2D | Device-to-Device |
| DAC | Digital-to-Analog Converter |
| DC | Dual Connectivity |
| DCI | Downlink Control Information |
| DDOS | Distributed Denial of Service |
| DFT | Discrete Fourier Transform |
| DFTS | Discrete Fourier Transform - Spread |
| DL | Downlink |
| DLIM | Directional Link Interference Map |
| DMRS | Demodulation Reference Signal |
| DN | Destination Node |
| DRB | Dedicated Radio Bearer |
| DRX | Discontinuous Reception |
| DSSI | Directional Sounding and Sensing Interval |
| DSSP | Directional Sounding and Sensing Period |
| DSSW | Directional Sounding and Sensing Window |
| DTX | Discontinuous Transmission |
| E2E | End to End |
| E3F | Energy Efficiency Evaluation Framework |
| EAB | Extended Access Barring |
| ECGI | E-UTRAN Cell Global Identifier |
| ECM | EPS Connection Management |
| EGPRS | Enhanced General Packet Radio Service |
| EIRP | Equivalent Isotropically Radiated Power |
| eNB | Evolved Node B |
| EMBB | Enhanced Mobile Broadband |
| EMF | Electromagnetic Fields |
| EMM | EPS Mobility Management (Protocol) |
| EPC | Evolved Packet Core |
| EPS | Evolved Packet Subsystem |
| ETSI | European Telecommunications Standards Institute |
| ETWS | Earthquake Tsunami Warning System |
| EVM | Error Vector Magnitude |
| FCC | Federal Communications Commission |
| FDD | Frequency Division Duplex |
| FDMA | Frequency Division Multiple Access |
| FFT | Fast Fourier Transform |
| FPGA | Field-Programmable Gate Array |
| FPS | Frames Per Second |
| FRA | Future Radio Access |
| GB | Guard band |
| GERAN | GSM Edge Radio Access Network |
| GFTE | Group Function Technology |
| GLDB | Geolocation Database |
| GNSS | Global Navigation Satellite Systems |
| GPRS | General Packet Radio Service |
| GPS | Global Positioning System |
| GSM | Global System for Mobile communications (Groupe Speciale Mobile) |
| GW | Gateway |
| HARQ | Hybrid ARQ |
| HO | Handover |
| HW | Hardware |
| I2D | Infrastructure-To-Device |
| ID | Identity |
| IE | Information Element |
| IFFT | Inverse Fast Fourier Transform |
| IID | Independent Identically Distributed |
| IM | Interference Measurement |
| IMR | Interference Measurement Resource |
| IMSI | International Mobile Subscriber Identity |
| IMT | International Mobile Telecommunications |
| IMT2020 | International Mobile Telecommunications 2020 |
| IOT | Internet of Things |
| IP | Internet Protocol |
| IR | Incremental Redundancy |
| IRAT | Inter RAT |
| ISD | Inter Site Distance |
| ITU | International Telecommunication Union |
| IUA | Instant Uplink Access |
| KPI | Key Performance Indicator |
| L1 | Layer 1 |
| L2 | Layer 2 |
| L3 | Layer 3 |
| LAA | License Assisted Access |
| LAT | Listen-after-talk |
| LBT | Listen-before-talk |
| LCID | Logical Channel ID |
| LDPC | Low Density Parity Check |
| LO | Local Oscillator |
| LOS | Line of sight |
| LSA | License Shared Access |
| LTE | Long Term Evolution |
| MAC | Medium Access Control |
| MBB | Mobile Broadband |
| MBMS | Multimedia Broadcast Multicast Services |
| MBSFN | Multicast-broadcast single-frequency network |
| MCS | Modulation and Coding Scheme |
| METIS | Mobile and Wireless Communications Enablers for the 2020 Information Society |
| MIB | Master Information Block |
| MIMO | Multiple Input Multiple Output |
| MME | Mobility Management Entity |
| MMSE | Minimum Mean Square Error |
| MMW | Millimeter Wave |
| MPD | Multi-Point Diversity |
| MRS | Mobility and Access Reference Signal |
| MRT | Maximum Ratio Transmission |
| MTC | Machine Type Communication |
| MU | Multi User |
| NA | Not Applicable |
| NACK | Negative Acknowledgement |
| NAK | Negative Acknowledgement |
| NAS | Non-Access Stratum |
| NB | Narrow Band |
| NDI | New Data Indicator |
| NFV | Network Function Virtualization |
| NGMN | Next Generation Mobile Networks |
| NLOS | Non-Line-of-Sight |
| NNTS | Notify-Not-To-Send |
| NTS | Notify-To-Send |
| NR | New Radio |
| NW | Network |
| NX | The term NX is not an abbreviation, and is to be interpreted as a construct that denotes the "Next" generation, as well as a multiplier of capabilities |
| OAM | Operation-and-Maintenance |
| OCC | Orthogonal Cover Code |
| OFDM | Orthogonal Frequency Division Multiplex |
| OOS | Out Of Synch |
| OPEX | Operational Expenditures |
| OSS | Operation and Support System |
| OTT | Over The Top |
| PA | Power Amplifier |
| PACH | Physical Anchor Channel |
| PAPR | Peak to Average Power Ratio |
| PBCH | Physical Broadcast Channel |

APPENDIX: ABBREVIATIONS

| Abbreviation | Explanation |
|---|---|
| PCCH | Paging Control Channel |
| PDCCH | Physical Downlink Control Channel |
| PDCH | Physical Data Channel |
| PDCP | Packet Data Convergence Protocol |
| PDSCH | Physical Downlink Shared Channel |
| PDU | Packet Data Unit |
| PHR | Power Head-room Reporting |
| PHY | Physical (layer) |
| PICH | Paging Indicator Channel |
| PIT | Positioning Information Table |
| PLMN | Public Land Mobile Network |
| PLNC | Physical-Layer Network Coding |
| PMCH | Paging Message Channel |
| PME | Positioning Management Entity |
| PMI | Precoder Matrix Indicator |
| PPF | Packet Processing Function |
| PRACH | Physical Random Access Channel |
| PRS | Positioning Reference Signal |
| PS | Public Safety |
| PSD | Power Spectral Density |
| PSM | Power Saving Mode |
| PSS | Primary Synchronization Sequence |
| PUCCH | Physical Uplink Control Channel |
| PUSCH | Physical Uplink Shared Channel |
| PWS | Public Warning System |
| QAM | Quadrature Amplitude Modulation |
| QMF | Quantize-Map-and Forward |
| QPSK | Quadrature Phase Shift Keying |
| RA | Random Access |
| RACH | Random Access Channel |
| RAN | Radio Access Network |
| RAR | Random Access Response |
| RAS | Re-configurable Antenna Systems |
| RAT | Radio Access Technology |
| RB | Resource Block |
| RBS | Radio Base Station |
| RCF | Radio Controller Function |
| RF | Radio Frequency |
| RLC | Radio Link Control (Protocol) |
| RLF | Radio Link Failure |
| RLP | Radio Link Problem |
| RN | Radio Network |
| RNTI | Radio Network Temporary Identifier |
| RRC | Radio Resource Control (Protocol) |
| RRM | Radio Resource Management |
| RRS | Reciprocity Reference Signal |
| RS | Reference Signal |
| RSI | Reception Status Indicator |
| RSRP | Reference Signal Received Power |
| RTS | Request-To-Send |
| RTT | Round Trip Time |
| RU | Radio Unit |
| RX | Receive |
| S1 | Interface between RAN and CN in LTE |
| S1AP | S1 Application Protocol (signaling protocol) |
| S2 | Interface used for Wi-Fi integration in EPC |
| SA | System Architecture |
| SAN | Serving Access Node |
| SAR | Specific Absorption Rate |
| SC | Spatially-Coupled |
| SDN | Software Defined Networking |
| SeNB | Secondary eNB |
| SDU | Service Data Unit |
| SFN | Single Frequency Network |
| SG | Scheduling Grant |
| SI | System Information |
| SIB | System Information Block |
| SIM | Subscriber Identity Module |
| SINR | Signal to Interference and Noise Ratio |
| SIR | Signal to Interference Ratio |
| SLNR | Signal to Leakage and Noise Ratio |
| SLSS | Side-Link Sync Signal |
| SN | Source Node |
| SNR | Signal to Noise Ratio |
| SON | Self-Organizing Network |
| SR | Scheduling Request |
| SRB | Signaling Radio Bearer |
| SRS | Sounding Reference Signal |
| SRU | Sounding Resource Unit |
| SS | Signature Sequence |
| SSB | SSI Block |
| SSI | Signature Sequence Index |
| SSS | Secondary Synchronization Sequence |
| SU | Single-User |
| SW | Software |
| SVD | Singular Value Decomposition |
| SWEA | An Ericsson Standardization Program |
| TA | Timing Advance |
| TA | Tracking Area |
| TAU | Tracking Area Update |
| TB | Transport Block |
| TBD | To Be Defined |
| TCO | Temperature Controlled Oscillator |
| TCP | Transmission Control Protocol |
| TDD | Time Division Duplex |
| TDOA | Time Difference Of Arrival (positioning method) |
| TEA | The Ericsson Architecture |
| TM | Transmission Mode |
| TMSI | Temporary Mobile Subscriber Identity |
| TRA | Tracking RAN Area |
| TRAC | Tracking RAN Area Code |
| TRAS | Tracking RAN Area Signal |
| TRASI | Tracking RAN Area Signal Index |
| TRASS | Tracking RAN Area Signal Synchronization |
| TSS | Time and Frequency Synchronization Signal |
| TTI | Transmission Time Interval |
| TV | Television |
| TX | Transmit |
| UCI | Uplink Control Information |
| UE | User Equipment |
| UE2UE | UE to UE communication |
| UEID | UE Identity |
| UI | User Interface |
| UL | Uplink |
| ULA | Uniform Linear Array |
| UP | User Plane |
| URA | UTRAN Registration Area |
| URL | Uniform Resource Locator |
| US | United States (of America) |
| USIM | Universal Subscriber Identity Module |
| USS | Uplink Synchronization Signal |
| UTRA | UMTS Terrestrial Radio Access (3G) |
| UTRAN | UMTS Terrestrial Radio Access Network (3G RAN) |
| V2V | Vehicle to Vehicle |
| V2X | Vehicle to Anything |
| VB | Virtual Beam |
| WCDMA | Wideband Code Division Multiple Access (3G) |
| WINNER | Wireless world INitiative NEw Radio (EU project) |
| WRC | World Radiocommunication Conference (ITU) |
| X2 | Interface between eNBs in LTE |
| X2AP | X2 Application Protocol (signaling protocol over X2) |
| XO | Crystal Oscillator |
| ZF | Zero Forcing |

What is claimed is:

1. A method in a radio network node, the method comprising:
receiving a message from a first user equipment (UE) according to one of a plurality of uplink access configurations, the one of the plurality of uplink access configurations corresponding to an uplink access configuration index previously transmitted to the first UE; and
subsequently transmitting, to the first UE, a first Orthogonal Frequency-Division Multiplexing (OFDM) transmission having a first subcarrier spacing and a second OFDM transmission having a second subcarrier spacing, differing from the first subcarrier spacing.

2. The method of claim 1, wherein the method further comprises:
broadcasting system access information for accessing the wireless communications network; and,
transmitting additional system information in response to a request from the first UE.

3. The method of claim 1, wherein the method further comprises:
transmitting first and second mobility reference signals on first and second beams, respectively; and
receiving a report, from a user equipment (UE), the report comprising results of measurements of the first and second mobility reference signals.

4. The method of claim 1, wherein the method further comprises:
transmitting to the first UE, in a first-in-time OFDM symbol, downlink control signaling and dedicated user data.

5. The method of claim 1, wherein the method further comprises:
processing data for said first OFDM transmission using a first Medium Access Control (MAC) protocol layer and processing data for said second OFDM transmission using a second MAC protocol layer, the first MAC protocol layer differing from the second MAC protocol layer, and processing messages to be transported by each of said first and second MAC protocol layers, using a single, common, Radio Resource Control (RRC) protocol layer.

6. A method in a user equipment (UE) for operating in a wireless communications network, the method comprising:
transmitting a message to the wireless communications network according to one of plurality of uplink access configurations, the one of the plurality of uplink access configurations corresponding to an uplink access configuration index previously received by the first UE; and
subsequently receiving, from the wireless communications network, a first Orthogonal Frequency-Division Multiplexing (OFDM) transmission having a first subcarrier spacing and a second OFDM transmission having a second subcarrier spacing, different from the first subcarrier spacing.

7. The method of claim 6, wherein the method further comprises:
receiving broadcasted system access information and using the received system access information for accessing the wireless communications network; and
requesting additional system information from the wireless communications network.

8. The method of claim 6, wherein the method further comprises:
processing data from the first OFDM transmission using a first Medium Access Control (MAC) protocol layer and processing data from said second OFDM transmission using a second MAC protocol layer, said first MAC protocol layer differing from said second MAC protocol layer, and wherein the method further comprises processing messages received from each of said first and second MAC protocol layers using a single, common Radio Resource Control (RRC) protocol layer.

9. The method of claim 6, wherein the method further comprises:
measuring first and second mobility reference signals on first and second received beams, respectively, the second mobility reference signal differing from the first mobility reference signal; and
reporting results of measuring said first and second mobility reference signals to the wireless communications network.

10. A radio network equipment comprising
radio circuitry,
and processing circuitry operatively connected to the radio circuitry, wherein the processing circuitry in the radio network equipment is configured to:
receive a message from a first user equipment (UE) according to one of a plurality of uplink access configurations, the one of the plurality of uplink access configurations corresponding to an uplink access configuration index previously transmitted to the first UE; and
subsequently transmit, to the first UE, a first Orthogonal Frequency-Division Multiplexing (OFDM) transmission having a first subcarrier spacing and a second OFDM transmission having a second subcarrier spacing, differing from the first subcarrier spacing.

11. The radio network equipment of claim 10, wherein said processing circuitry is further configured to:
broadcast system access information for accessing the wireless communications network; and
transmit additional system information in response to a request from the first UE.

12. The radio network equipment of claim 10, wherein said processing circuitry is further configured to:
transmit to the first UE, in a first-in-time OFDM symbol, downlink control signaling and dedicated user data.

13. The radio network equipment of claim 10, wherein the processing circuitry is further configured to:
process data for said first OFDM transmission using a first Medium Access Control (MAC) protocol layer and process data for said second OFDM transmission using a second MAC protocol layer, the first MAC protocol layer differing from the second MAC protocol layer, and to process messages to be transported by each of said first and second MAC protocol layers, using a single, common Radio Resource Control (RRC) protocol layer.

14. A user equipment (UE), comprising
radio-frequency circuitry, and
processing circuitry operatively connected to the radio-frequency circuitry, wherein the processing circuitry is configured to:
transmit a message to the wireless communications network according to one of plurality of uplink access configurations, the one of the plurality of uplink access configurations corresponding to an uplink access configuration index previously received by the first UE; and
receive, from the wireless communications network, a first Orthogonal Frequency-Division Multiplexing (OFDM) transmission having a first subcarrier spacing and a second OFDM transmission having a second subcarrier spacing, differing from the first subcarrier spacing.

15. The UE of claim 14, wherein said processing circuitry is further configured to:
receive broadcasted system access information and use the received system access information for accessing the wireless communications network; and
request additional system information from the wireless communications network.

16. The UE of claim 14, wherein said processing circuitry is further configured to:
 process data from said first OFDM transmission using a first Medium Access Control (MAC) protocol layer and process data from said second OFDM transmission using a second MAC protocol layer, said first MAC protocol layer differing from said second MAC protocol layer, and
 process messages received from each of said first and second MAC protocol layers using a single, common Radio Resource Control (RRC) protocol layer.

17. The UE of claim 14, wherein the processing circuitry is further configured to:
 measure first and second mobility reference signals on first and second received beams, respectively; and
 report results of measuring the first and second mobility reference signals to the wireless communications network.

* * * * *

UNITED STATES PATENT AND TRADEMARK OFFICE
CERTIFICATE OF CORRECTION

PATENT NO. : 12,021,609 B2  
APPLICATION NO. : 18/093572  
DATED : June 25, 2024  
INVENTOR(S) : Parkvall et al.

Page 1 of 7

It is certified that error appears in the above-identified patent and that said Letters Patent is hereby corrected as shown below:

On the Title Page

Item (72), under "Inventors", in Column 1, Line 7, delete "Kvivsta (SE);" and insert -- Knivsta (SE); --, therefor.

Item (72), under "Inventors", in Column 1, Line 32, delete "Esbo (FI);" and insert -- Espoo (FI); --, therefor.

Item (56), under "OTHER PUBLICATIONS", in Column 2, Line 8, delete "RI-163114," and insert -- R1-163114, --, therefor.

Item (56), under "OTHER PUBLICATIONS", in Column 2, Line 17, delete "Rat"," and insert -- RAT", --, therefor.

Item (56), under "OTHER PUBLICATIONS", in Column 2, Line 64, delete "ystem" and insert -- system --, therefor.

Item (56), under "OTHER PUBLICATIONS", in Column 1, Line 58, delete "WG I" and insert -- WG1 --, therefor.

Item (56), under "OTHER PUBLICATIONS", in Column 2, Line 13, delete "(revision," and insert -- revision, --, therefor.

In the Drawings

In Fig. 3, Sheet 3 of 134, and on the Title Page, the illustrative print figure, delete "(RRC CONNECTED)" and insert -- (RRC_CONNECTED) --, therefor.

In Fig. 3, Sheet 3 of 134, and on the Title Page, the illustrative print figure, delete "RCC_CONNECTED ACTIVE" and insert -- RRC_CONNECTED ACTIVE --, therefor.

Signed and Sealed this  
Eighteenth Day of February, 2025

Coke Morgan Stewart  
*Acting Director of the United States Patent and Trademark Office*

CERTIFICATE OF CORRECTION (continued)
U.S. Pat. No. 12,021,609 B2

In Fig. 3, Sheet 3 of 134, and on the Title Page, the illustrative print figure, delete "RCC_CONNECTED DORMANT" and insert -- RRC_CONNECTED DORMANT --, therefor.

In the Specification

In Column 4, Line 29, delete "include," and insert -- include --, therefor.

In Column 16, Line 29, delete "how" and insert -- on how --, therefor.

In Column 16, Line 37, delete "sub state." and insert -- substate. --, therefor.

In Column 17, Line 27, delete "sub states," and insert -- substates, --, therefor.

In Column 17, Line 28, delete "which" and insert -- of which --, therefor.

In Column 17, Line 42, delete "yet" and insert -- yet been --, therefor.

In Column 18, Line 54, delete "section 2.2" and insert -- Section 2.2 --, therefor.

In Column 22, Line 33, delete "over the top" and insert -- over-the-top --, therefor.

In Columns 25 & 26, Lines 21 & 1, delete "ECM CONNECTED" and insert -- ECM_CONNECTED --, therefor.

In Columns 25 & 26, in TABLE 1, under "Relation to LTE", Line 9, delete "LTE" and insert -- LTE. --, therefor.

In Columns 25 & 26, in TABLE 1, under "Relation to LTE", Line 13, delete "eNode B ID." and insert -- eNodeB ID. --, therefor.

In Column 30, Line 66, delete "RRC IDLE to RRC CONNECTED" and insert -- RRC_IDLE to RRC_CONNECTED --, therefor.

In Column 32, Lines 54-55, delete "RRC CONNECTED" and insert -- RRC_CONNECTED --, therefor.

In Column 32, Lines 60-61, delete "RRC CONNECTED" and insert -- RRC_CONNECTED --, therefor.

In Column 32, Lines 65-66, delete "RRC CONNECTED" and insert -- RRC_CONNECTED --, therefor.

In Column 33, Line 32, delete "it was" and insert -- was --, therefor.

In Column 33, Lines 37-38, delete "RRC IDLE to RRC CONNECTED" and insert -- RRC_IDLE to RRC_CONNECTED --, therefor.

CERTIFICATE OF CORRECTION (continued)
U.S. Pat. No. 12,021,609 B2

In Column 34, Line 50, delete "2.16.1" and insert -- 2.1.6.1 --, therefor.

In Column 42, Line 17, delete "His." and insert -- TTIs. --, therefor.

In Column 42, Line 40, delete "So-labeled" and insert -- So labeled --, therefor.

In Column 43, Line 10, delete "data" and insert -- physical data --, therefor.

In Column 43, Line 17, delete "delete" and insert -- deleting --, therefor.

In Column 48, Line 31, delete "UE," and insert -- $UE_1$ --, therefor.

In Column 49, Line 49, delete "jointed" and insert -- joint --, therefor.

In Column 50, Line 36, delete "who" and insert -- whom --, therefor.

In Column 51, Line 29, delete "if" and insert -- of --, therefor.

In Column 52, Line 4, delete "Multi connectivity" and insert -- Multi-connectivity --, therefor.

In Column 55, Line 43, delete ""End to End" and insert -- "End-to-End --, therefor.

In Column 55, Line 62, delete "End to End" and insert -- End-to-End --, therefor.

In Column 56, Line 2, delete "End to End" and insert -- End-to-End --, therefor.

In Column 56, Line 11, delete "endpoint" and insert -- endpoint. --, therefor.

In Column 58, Line 12, delete "His," and insert -- TTIs, --, therefor.

In Column 61, Line 47, delete "improve" and insert -- improving --, therefor.

In Column 62, Line 34, delete "III," and insert -- TTI, --, therefor.

In Column 62, Line 34, delete "III" and insert -- TTI --, therefor.

In Column 63, Line 13, delete "node" and insert -- node. --, therefor.

In Column 63, Line 44, delete "next-next" and insert -- next --, therefor.

In Column 66, Line 6, delete "74:" and insert -- $T_{cp}$: --, therefor.

In Column 69, Line 3, delete "or/and" and insert -- and/or --, therefor.

In Column 69, Line 18, delete "ceil(5*40/4/4)=13 RE." and insert -- cell(5*40/4/4)=13 RE. --, therefor.

CERTIFICATE OF CORRECTION (continued)
U.S. Pat. No. 12,021,609 B2

In Column 69, Line 54, delete "1 E-9." and insert -- 1E-9. --, therefor.

In Column 70, Line 26, delete "every" and insert -- in every --, therefor.

In Column 70, Line 28, delete "every" and insert -- in every --, therefor.

In Column 73, Line 55, delete "Spatial-Coupled" and insert -- Spatially-Coupled --, therefor.

In Column 75, Line 7, delete "6" and insert -- $\delta$ --, therefor.

In Column 76, Line 63, delete "BRS" and insert -- BRS. --, therefor.

In Column 77, Line 8, delete "PDCCH" and insert -- PDCCH. --, therefor.

In Column 80, Line 36, delete "ran k 2;" and insert -- rank 2; --, therefor.

In Column 83, Line 61, delete "that the" and insert -- the --, therefor.

In Column 85, Line 47, delete "(WC)" and insert -- (MTC) --, therefor.

In Column 86, Line 22, delete "are" and insert -- 1-1e-4 --, therefor.

In Column 86, Line 26, delete "1-1 e-9" and insert -- 1-1e-9 --, therefor.

In Column 86, Line 31, delete "but" and insert -- 1-1e-6 but --, therefor.

In Column 88, Line 3, delete "some few" and insert -- few --, therefor.

In Column 89, Line 2, delete "using" and insert -- by using --, therefor.

In Column 93, Line 51, delete "Feature" and insert -- Function --, therefor.

In Column 95, Line 51, delete "reselection" and insert -- reselection. --, therefor.

In Column 99, Lines 19-20, delete "illustrate" and insert -- illustrates --, therefor.

In Column 99, Line 64, delete "(SSTs)." and insert -- (SSIs). --, therefor.

In Column 109, Line 15, delete "signatures" and insert -- signature sequence index --, therefor.

In Column 109, Line 23, delete "in" and insert -- is in --, therefor.

In Column 111, Line 1, delete "RRC CONNECTED" and insert -- RRC_CONNECTED --, therefor.

In Column 111, Line 2, delete "RRC CONNECTED" and insert -- RRC_CONNECTED --, therefor.

CERTIFICATE OF CORRECTION (continued)
U.S. Pat. No. 12,021,609 B2

In Column 113, Line 28, delete "the" and insert -- that the --, therefor.

In Column 114, Line 47, delete "(to" and insert -- to --, therefor.

In Column 117, Line 33, delete "serving" and insert -- of serving --, therefor.

In Column 117, Line 41, delete "every" and insert -- in every --, therefor.

In Column 117, Line 58, delete "every" and insert -- in every --, therefor.

In Column 120, Line 53, delete "may be hence" and insert -- may hence be --, therefor.

In Column 129, Line 54, delete "by" and insert -- that of --, therefor.

In Column 132, Line 47, delete "communication" and insert -- communication is --, therefor.

In Column 135, Line 56, delete "(first" and insert -- first --, therefor.

In Column 136, Line 8, delete "ND" and insert -- A/D --, therefor.

In Column 136, Line 51, delete "transmit/received" and insert -- transmit/receive --, therefor.

In Column 137, Line 16, delete "effects" and insert -- affects --, therefor.

In Column 139, Line 36, delete "on" and insert -- of --, therefor.

In Column 140, Line 20, delete "UE side:" and insert the same at Line 21, as a new point.

In Column 140, Line 33, delete "network" and insert -- network. --, therefor.

In Column 140, Line 55, delete "selection:" and insert -- selection. --, therefor.

In Column 141, Line 17, delete "section" and insert -- section. --, therefor.

In Column 142, Line 52, delete "Infra/Inter" and insert -- Intra/Inter --, therefor.

In Column 146, Line 5, delete "illustrated" and insert -- as illustrated --, therefor.

In Column 146, Line 17, delete "needed" and insert -- needed. --, therefor.

In Column 146, Line 26, delete "Alt3," and insert -- Alt. 3, --, therefor.

In Column 146, Line 32, delete "Alt 2" and insert -- Alt. 2 --, therefor.

In Column 148, Line 13, delete "out-off" and insert -- out-of --, therefor.

CERTIFICATE OF CORRECTION (continued)
U.S. Pat. No. 12,021,609 B2

In Column 157, Line 19, delete "architecture" and insert -- architectural --, therefor.

In Column 159, Line 53, delete "NB-IOT." and insert -- NB-IoT. --, therefor.

In Column 160, Line 27, delete "etc.." and insert -- etc. --, therefor.

In Column 166, Line 37, delete "transmit." and insert -- transmitted. --, therefor.

In Column 166, Line 45, delete "ideas," and insert -- ideas. --, therefor.

In Column 167, Line 19, delete "schedules" and insert -- schedule --, therefor.

In Column 183, Line 36, delete "requirements;" and insert -- requirements. --, therefor.

In Column 184, Line 58, delete "denoted" and insert -- denoted as --, therefor.

In Column 186, Line 8, delete "3$^{rd}$-party" and insert -- 3$^{rd}$ party --, therefor.

In Column 186, Line 30, delete "over the top" and insert -- over-the-top --, therefor.

In Column 186, Line 37, delete "a" and insert -- as a --, therefor.

In Column 189, Line 63, delete "channel" and insert -- channel. --, therefor.

In Column 189, Line 66, delete "TDD))" and insert -- TDD)). --, therefor.

In Column 190, Line 8, delete "D2D);" and insert -- D2D). --, therefor.

In Column 190, Line 12, delete "coordination" and insert -- coordination. --, therefor.

In Column 198, Line 66, delete "this" and insert -- if this --, therefor.

In Column 199, Line 48, delete "be" and insert -- to be --, therefor.

In Column 199, Line 50, delete "be" and insert -- to be --, therefor.

In Column 200, Line 41, delete "this" and insert -- of this --, therefor.

In Column 200, Line 47, delete "Depends" and insert -- Depending --, therefor.

In Column 202, Line 65, delete "achievable," and insert -- achievable --, therefor.

In Column 203, Line 24, delete "to," and insert -- to a --, therefor.

In Column 204, Line 46, delete "tor" and insert -- for --, therefor.

CERTIFICATE OF CORRECTION (continued)
U.S. Pat. No. 12,021,609 B2

In Column 204, Line 49, delete "(IOT)" and insert -- (IoT) --, therefor.

In Column 204, Line 56, delete "UP" and insert -- UE --, therefor.

In Column 205, Line 39, delete "RP" and insert -- RF --, therefor.

In Column 206, Line 59, delete "interlaces," and insert -- interfaces, --, therefor.

In Column 207, Line 48, delete "3.22" and insert -- 3.2.2 --, therefor.

In Column 208, Line 40, delete "retransmitable" and insert -- retransmittable --, therefor.

In Column 208, Line 54, delete "single-RHC" and insert -- single-RRC --, therefor.

In Column 209, Line 8, delete "handing" and insert -- handling --, therefor.

In Column 209, Line 43, delete "retransmitable" and insert -- retransmittable --, therefor.

In Column 210, Line 55, delete "theft" and insert -- their --, therefor.

In Column 211, Line 24, delete "eNodeBs." and insert -- eNodeBs, --, therefor.

In Column 211, Line 58, delete "ail" and insert -- all --, therefor.

In Column 212, Line 41, delete "manner, in" and insert -- manner. In --, therefor.

In Column 213, Line 18, delete "1120, in" and insert -- 1120. In --, therefor.

In Column 213, Line 45, delete "elements," and insert -- elements. --, therefor.

In Column 215, Line 25, delete "identities" and insert -- identifies --, therefor.

In Column 220, Line 63, delete "Over The Top" and insert -- Over-The-Top --, therefor.

In the Claims

In Column 224, Line 8, in Claim 10, delete "and" and insert the same at Line 7 after "circuitry," as a continuation sub-point.